US005189624A

United States Patent [19]

Barlow et al.

[11] Patent Number: 5,189,624

[45] Date of Patent: Feb. 23, 1993

[54] INTELLIGENT MACHINING WORKSTATION OPERATING LOGIC

[75] Inventors: Allan R. Barlow, Georgetown; Paul D. Colananni, Medway, both of Mass.; Daniel C. Garafola, Coventry, Conn.; Bryan E. Irving, Rochester, N.H.; Larisa A. Elman, Swampscott; William A. Hunter, Danvers, both of Mass.

[73] Assignee: General Electric Company, Cincinnati, Ohio

[21] Appl. No.: 825,741

[22] Filed: Jan. 27, 1992

Related U.S. Application Data

[63] Continuation of Ser. No. 415,496, Sep. 29, 1989.

[51] Int. Cl.[5] .................... G06F 15/46; G05B 19/417

[52] U.S. Cl. .................... 364/474.11; 364/131; 364/138

[58] Field of Search .................... 364/131, 133, 138, 468, 364/474.11, 478; 29/564, 783

[56] References Cited

U.S. PATENT DOCUMENTS

| | | | |
|---|---|---|---|
| 3,576,540 | 4/1971 | Fair et al. | 364/474.21 |
| 4,288,849 | 9/1981 | Yoshida et al. | 364/132 |
| 4,472,783 | 9/1984 | Johnstone et al. | 364/468 |
| 4,564,913 | 1/1986 | Yomogida et al. | 364/468 |
| 4,621,410 | 11/1986 | Williamson | 29/568 |
| 4,698,629 | 10/1987 | Mori et al. | 340/825.05 |
| 4,698,766 | 10/1987 | Entwistle et al. | 364/468 |
| 4,827,423 | 5/1989 | Beasley et al. | 364/468 |
| 4,829,445 | 5/1989 | Burney | 364/478 |
| 4,831,540 | 5/1989 | Hesser | 364/468 |
| 4,841,431 | 6/1989 | Takagi et al. | 364/187 |

*Primary Examiner*—Jerry Smith
*Assistant Examiner*—Paul Gordon
*Attorney, Agent, or Firm*—Jerome C. Squillaro; Nathan D. Herkamp

[57] ABSTRACT

A host computer is connected to one or more machining workstations, each having its own electronic controller. Each workstation controller contains an operating machine control logic module which controls the functioning of the workstation, such as the carrying out of the movement of a chuck holding a workpiece to be machined on a spindle with respect to a tool which does the machining. Each workstation controller also contains an automation machine control logic module which automates the operation of each of the workstations. In the example of the invention described here, each automation machine control logic module contains blocks which manage the initialization of the workstation, communication between the host and the workstation controller, quality control functions, the interfacing of automated guided vehicles with the workstation, the supply of coolant to the workstation, the removal of swarf from the workstation, the status and location of the workpieces in the workstation, the supply and exchange of tools for the workstation, the logging and reporting of data, the end of part program tasks, the aborting of the part program, and tool wear and break detection and recovery of the workstation from such occurrences.

7 Claims, 50 Drawing Sheets

CONTROL SYSTEM ARCHITECTURE

CONTROL SYSTEM ARCHITECTURE

SHOP FLOOR LAYOUT

INTELLIGENT MACHINING WORKSTATION OPERATING LOGIC

This is a continuation of application Ser. No. 07/415,496, filed Sep. 29, 1989 now abandoned.

FIELD OF THE INVENTION

This invention relates to the field of machining. More particularly, it relates to the field of intelligent machining apparatus which may used in an automated factory. One example of an environment in which the invention of this application is particularly useful is in an automated factory for making precision aircraft engine parts.

BACKGROUND OF THE INVENTION

There has been a concerted effort in manufacturing industries to increase the precision with which manufactured parts are fabricated. In addition to precision, a long sought after goal has been the development of an apparatus which is able to automatically fabricate parts with as little human intervention as possible and to do so with efficient utilization of the manufacturing apparatus.

Many different apparatus have been proposed and actually implemented in an effort to achieve that goal. All have suffered from insufficient automation and inefficient utilization. More specifically, many of the functions of the machining apparatus still had to be performed by a human operator and, for too much of the time, the machining apparatus was idle and not performing an actual machining operation. For example, should there have been a failure in some part of what purported to be the automated control circuitry for the machining apparatus, the apparatus would no longer be able to proceed with a machining operation until the failure was rectified. In other instances, delivery of parts, tools, and operating instructions were not efficiently managed so that the machining apparatus was not machining for as much of the time as possible.

One of the earliest attempts to automate a machining operation was a numerically controlled machining apparatus which moved a cutting element with respect to a workpiece along a cutting path stored on a recording medium such as magnetic tape or punched paper tape. All this arrangement accomplished was to free the machine operator from manually moving the cutting element to machine the workpiece. It did not eliminate the need for a human operator or provide for a significant increase in machine utilization.

Improvements to numerically controlled machining apparatus involved computerizing the numerical controller. This provided some measure of computational ability for the controller, which permitted it to do such things as calculate offsets to a part program.

A further effort, called distributed numerically controlled machining, involved connecting a number of computerized numerically controlled machining apparatuses to a host computer which was intended to coordinate the activities of all the machining apparatus.

In an attempt to completely automate a production facility, it has been proposed that automated part and tool storage apparatus, along with automated guided vehicles for carrying tools to be used for machining and parts to be machined to and from the storage apparatus and the machining apparatus, be coordinated through a host computer in a distributed numerically controlled machining system. In one form of such a distributed numerically controlled machining system, also known as a flexible machining system, each of the parts to be machined is attached to an appropriate fixture in a staging area associated with the part storage apparatus. The fixture permits each part to be attached to one of a plurality of different machining apparatus, such as a lathe, a grinder, a vertical machining center, and the like. An automated guided vehicle then transports the part attached to a fixture to an appropriate machining apparatus in accordance with instructions from the host computer. Also in a flexible machining system, a plurality of tools are loaded into a magazine at the tool storage apparatus and the magazine is transported to an appropriate machining apparatus in accordance with the instructions from the host computer. The host computer electronically transmits or down loads one or more machining instructions comprising machining programs to appropriate machining apparatus, which then machines the part delivered to it using the tools in the magazine, all in accordance with the machining programs.

The prior practices and proposals either fail to address or inadequately deal with items which permit unattended and efficient operation of machining apparatus. This has prevented the implementation of a completely automated multiple purpose production facility. Briefly, not enough of the functions of the machining apparatus have been automated to reduce significantly the number of human operators needed to run the machining apparatus. Also, too much of the automation that does exist resides in the host computer in the prior distributed numerically controlled machining systems and in the flexible machining systems. This means that, if the host computer were to cease functioning for some reason, the entire factory would cease to function. Without the host, the individual machining apparatus used in the past are just incapable of carrying on in any meaningful fashion.

The invention of this application addresses the problems of the prior machining systems and permits for the first time the actual implementation of a completely automated factory with a minimum of human attention.

SUMMARY OF THE INVENTION

It is an object of the invention to automate the operations of individual workstations controlled by a host computer.

It is an additional object of the invention to provide a workstation capable of machining workpieces, automatically without the need for a working host computer.

It is a further object of the invention to increase the ability of a workstation to operate while unattended by a human operator or by a host computer.

It is yet another object of the invention to increase the efficiency of utilization of a workstation.

It is an additional object of the invention to provide an intelligent machining workstation for an automated production facility.

It is an additional object of the invention to provide a machining apparatus comprising at least one intelligent machining work station loosely coupled to a host computer.

Other objects of the invention, as well as the advantages of the invention, are either specifically described elsewhere in this application, or are readily apparent from the description in this application.

The invention of this application involves automation of the operations of the individual workstations controlled by a host computer. Not only the functions normally performed by a human operator, but also the functions normally performed by the host computer and some functions not performed at all prior to this invention, are performed automatically by the individual workstations in the invention of this application.

One example of the invention involves the provision of operation control logic and automation control logic in a controller associated with each workstation. In that example of the invention, the operation control logic may control linear machine motions, spindle operations, tool turret operations, tool changer operations, workloader operations, and the operations of support systems such as coolant supplies, lubrication, hydraulics, air supplies, and a chip conveyor. The automation control logic may manage and automate certain functions such as the initialization of the machining apparatus, the communication between the machining apparatus and a host computer or cell controller, quality control functions, interchanges performed by automated guide vehicles, monitoring of coolant supplies, tool supply and exchange, workpiece status and location, data logging and reporting, and tool break detection and recovery. The automation control logic may also manage program abort functions and end of program operations.

SUMMARY OF THE DETAILED DESCRIPTION OF ONE EXAMPLE OF THE INVENTION

Figure 1:
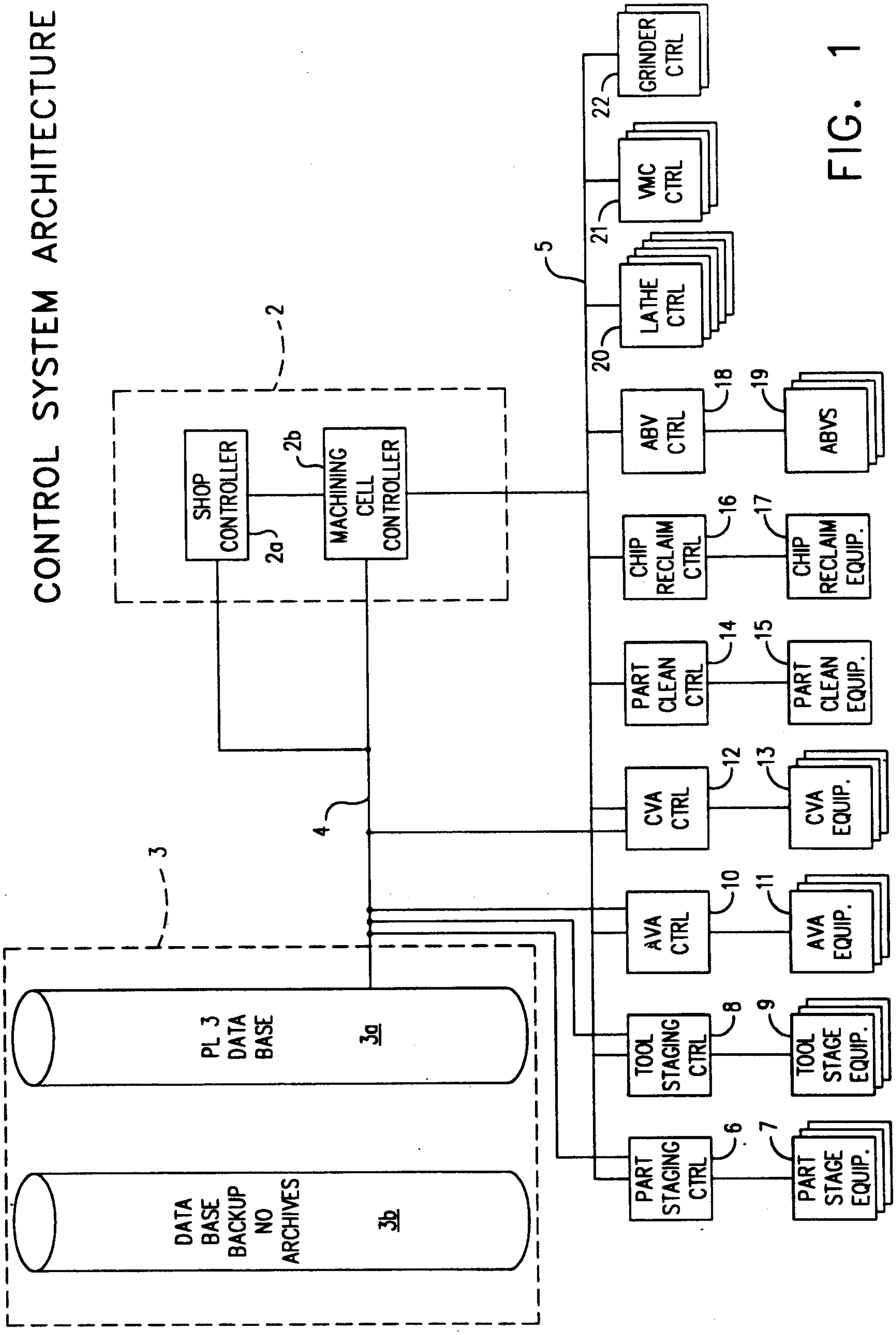
FIG. 1 is a block diagram of an example of an automated production facility in which the invention of this application is used.

I. BACKGROUND:

Prior to the advent of closed loop machining (CLM) described in U.S. Pat. No. 4,382,215 and computer numerically controlled (CNC) machine tool controls, automation of general purpose machine tools was impractical in the best cases and prohibitively expensive, if not quite impossible, in the worst cases. Automatic machine tools designed to do a single specific task have been available for many years. The production requirements of precision parts, such as aircraft engine parts made from high strength, high temperature, high cost, extremely difficult to machine alloys with exotic shapes to minimize weight while maintaining adequate strength, lend themselves best to batch processing on general purpose machines. Production quantities do not justify the very high expense of single purpose machines for each process step. With the development of modern computer numerical controls (CNC) and closed loop machining (CLM), the means became available to automate general purpose machine tools on a practical basis. (See U.S. Pat. No. 4,382,215, SYSTEM AND METHOD OF PRECISION MACHINING, issued May 3, 1983.) This invention provides a way of further automating general purpose machine tools in either a stand alone mode or as a part of a flexible manufacturing system.

II. DESCRIPTION AND OPERATION:

A. Prerequisites at or on the machine tool:

1. A CNC controlled machine tool such as the vertical machining center shown in FIG. 3 or the lathe shown in FIG. 4. The CNC control hardware and software must be structured such that they can accomplish the Operating Scenario in Section II.C. below.

2. A suitable magazine for storing cutting tools and measuring probes. The magazine must be such that it can be exchanged and its tools and probes easily refurbished.

3. Suitable mechanical devices for mounting and dismounting cutting tools and probes on the machine tool and exchanging them with cutting tools and probes stored in the magazine.

4. Suitable means for clamping workpieces, or workpieces mounted on standard fixtures, in the machine tool's working area.

5. Suitable platforms, bins, or racks for queueing processed and unprocessed workpieces either unrestrained or clamped in standard fixtures.

6. A suitable mechanical device for transferring workpieces between the queueing areas and the machine tool's working area.

7. Suitable mechanical equipment for removing swarf (chips) from the machine tool's working area to a storage container.

8. Suitable mechanical equipment for supplying coolant and compressed air to the machine tool's working area.

9. Suitable energy sources for powering these various mechanical devices connected to the CNC control in such a way that commands entered in the CNC control by pushing buttons, throwing switches, or other suitable means, such as program inputs, will cause these energy sources to move the mechanical devices in a manner that will accomplish a desired task.

B. Preferred prerequisites for logistical support of the machine tools:

1. A host computer or cell controller, also referred to as simply a host, loosely coupled to one or more work stations to act as a traffic director and coordinator for the supporting activities listed below.

2. An automated guided vehicle system (AGV system) or other suitable means of transportation for parts, fixtures, tool magazines, and swarf containers, capable of picking up and delivering these items at the machine tools and other appropriate destinations, such as tool or workpiece staging or storage areas.

3. Washing machines or other suitable cleaning apparatus equipped for delivery and pickup of parts and fixtures by the transportation equipment.

4. Coordinate measuring machines (CMM) or other suitable apparatus for inspection and measurement of parts and fixtures and equipped for delivery and pickup of parts and fixtures by the transportation equipment.

5. Part staging and destaging areas or apparatus where parts for machining are clamped or unclamped into or out of holding fixtures (if used) and equipped for delivery and pickup of parts and fixtures by the transportation equipment.

6. Part and fixture storage apparatus, such as an automatic storage and retrieval system (ASRS) made by Litton Industries, equipped and located for access by the part staging apparatus and for delivery and pickup of parts and fixtures by the transportation equipment.

7. Cutting tool and tool magazine staging and destaging areas or apparatus where cutting tool components (tool holders and cutting inserts) and probe components are assembled into specified tool types in specified quantities and are loaded into tool magazines to make tool magazine configurations suitable for specific machining operations. The tool and probe components are also unloaded from the tool magazines and disassembled in these areas. These staging areas are equipped for delivery and pickup of tool magazines by the transportation equipment.

8. Cutting tool and magazine storage areas or apparatus equipped and located for access by the tool staging areas and equipped for delivery and pickup of magazines and containers of tools and probes by the transportation equipment.

9. Coolant storage and processing apparatus where coolant is mixed, filtered and cleaned, cooled or warmed, and stored pending circulation to the machine tools either via a central distribution system or suitable portable apparatus for exchanging coolant in individual machine tools.

10. Swarf container dumping apparatus and swarf segregation and storage equipment where chip containers from individual machine tools may be dumped in such a way that different chip materials may be kept segregated and accumulated for easy shipping and reclamation. This apparatus is equipped for delivery and pickup of chip containers by the transportation equipment.

C. Operating Scenario:

1. See FIGS. 3, 4, and 4*a* for diagrams of two possible concepts for the work stations in accordance with this invention.

2. A person walks up to a CNC control, switches on the power, reference zeros the servo driven axes, selects the operating method, i.e. off line (stand-alone) or on line with the host computer or cell controller (this scenario assumes on line is selected), pushes a START button and leaves.

3. The CNC control requests the host to set its clock (time and date) and provides the host with: (a) indices for its part programs and other computer files, which may be in ASCII format, (b) an indication as to whether or not any parts, a tool magazine, or a chip container is present in the work station, and (c) the machine's most recent calibration dates and intervals. It responds to host requests to delete or receive new part programs and other computer files in its memory.

4. The CNC control checks if an unprocessed workpiece or part is waiting in a workpiece storage device, and if none, requests one from the host.

5. As soon as an unprocessed part is available, the CNC control requests an ASCII computer file from the host. This file, called a transfer file, tells the CNC control the name of the part program which guides the part's machining process. The control also initiates a part program timer which records the total processing time along with lost or down time and variance time (unplanned extra processing time).

6. Following transmittal of the transfer file to the CNC control, the control selects the program specified by the file provided it has it in memory. If not, the control requests transmittal of the part program computer file from the host, and when available in its memory, selects it, i.e. makes it active, so that the machining apparatus follows its commands in sequence, a process otherwise known as execution of the part program.

7. The CNC control checks its memory to see if it has executed that same program recently (recently is an adjustable period, e.g. in the past 24 hours). If so, it sets BLOCK DELETES (a means of skipping selected portions of the part program) in accordance with the instructions saved from the prior running of that program. If not, it turns off all BLOCK DELETES to avoid skipping any part of the program.

8. The CNC control checks the DELIVERY STATUS in the transfer file. If it is other than Normal, i.e. Rework, Incomplete, Special, or Dryrun, the control stops and requests intervention from the host. If the DELIVERY STATUS is normal, the CNC control proceeds with execution of the part program.

9. The early portion of the part program must convey certain information and contain some new commands to permit operation without a human operator.

10. A tool list showing the cutting tool type required for each item or cutting sequence, tool life required to start the cut, and actual tool life consumed by the cut is read from the part program and stored in the control.

11. The control searches a tool magazine configuration file to determine if the required tool types are available in sufficient quantity to machine the part. If there is no magazine configuration file present, it checks if a magazine is present on the machine. If only one or neither is present, the control requests from the host whichever item is missing and, when the requested item is transmitted or delivered, the control performs a tool search. If sufficient tools to perform the desired machining are not found in the tool magazine, the control makes a request to the host that the magazine be changed or refurbished.

12. The part program also informs the control of the running time for the part program. Following the tool search for the part about to be machined, the control does a second tool search assuming the next part will be the same as the current part. If sufficient tools for a second part are not found, it makes a request to the host that there be a magazine change or a refurbishing of the current magazine before the start of machining of the part following the one currently being machined.

13. The part program contains an M code (miscellaneous code) which commands the control to run a quality control management task. Quality control management checks the machine calibration dates and intervals against the clock and checks its list of parts sent for quality verification (inspection) for any rejections or overdue results. If any of these tests fail, the control stops, displays, and reports to the host a message showing the reason. Recovery is achieved by fixing the problem or overriding the stop.

14. The part program contains an M code which commands the control to run a chip management task. The chip management task checks if a chip bucket is present; if not, it requests one from the host. It also checks if the part material has changed from the previous part, and if so, it runs a chip conveyor long enough to purge a chip accumulation trough of chips and requests a chip bucket change from the host. If a chip container is available and the material has not changed, it checks that sufficient room is available in the container to hold the volume of chips to be generated by the upcoming machining operation; if not, it computes the length of time the machine can run with the conveyor operating and requests the host to see to it that the chip container is picked up within that time. If a chip container is not available or becomes unavailable before or during the machining process, the machine is still allowed to run for a length of time specified by the part program, i.e. until enough chips have accumulated that further machining would cause the conveyor to jam.

15. The part program contains an M code which commands the control to run a coolant management task. The coolant management task checks that the machine is set up to run from a local (self-contained) coolant supply or from a central (shop wide) coolant supply, as specified by the part program. If the coolant source does not conform to requirements, the control requests help from the host and displays an appropriate message. The coolant management task also tests for too little or too much coolant, and when either of these conditions is detected, the coolant management task initiates a FEED HOLD condition if the machining apparatus is stopped or traversing or an OPT STOP condition if the machining apparatus is cutting chips. The coolant management task also activates the appropriate valves to start or stop the flow of coolant from a central coolant supply when the machining apparatus is operating on coolant from such a central coolant supply.

16. The part program contains an M code which commands the control to run a preliminary workpiece status task. The preliminary workpiece status task provides a way of telling the host what it should be planning to do next with the part when machining is completed. It also advises of the estimated completion time. This permits the host to schedule the AGV system and next processing facility. Choices include Verification (inspection), No Verification Required, Incomplete (in case the machining process has to be aborted for some reason), and Dryrun for part program debugging with or without a workpiece. When the workpiece is delivered to the machine, the Transfer file indicates a Program Status. The choices are Tryout, Unapproved, Approved, and Superseded. Tryout is for program debugging; the control will require a human input for Workpiece Status and will not let the program start automatically. Unapproved means the part program appears to be debugged and now must prove it can make good parts; the control will designate a predetermined quantity of successive parts for Verification; that quantity is shown as the Approval Quantity in the Transfer file that is transmitted to the control when the part is delivered to the machine. Approved means the program has proven it can make good parts and verification sampling plans can be applied; the control will designate a sample part for Verification on both a part count and time lapse basis; whichever occurs first will reset the counters for both; the Verification Interval for both time and part count is specified in the Transfer file that is transmitted to the control when the part is delivered to the machine; the control will designate parts in between verification samples as No Verification Required. Superseded means the program was Approved at one time, but because of product design changes (not process changes) the program is no longer in production but available in case the need to rework or replace a superseded part should arise; the control will handle superseded programs the same as Approved programs.

17. The part program commands the machine to probe the chuck or fixture base to obtain data for the first set of hits for Part location Offsetting per U.S. Pat. No. 4,382,215.

18. The part program commands the machine to probe the chuck or fixture base to obtain data for the first set of hits for Initial Tool Offsetting per U.S. Pat. No. 4,382,215. The commands are prefixed with a Block delete designation which will cause them to be skipped when the corresponding block delete number is turned on in the CNC control.

19. The part program commands the machine to load and clamp the workpiece or workpiece holding fixture in the machine chuck or workholding device. Prior to executing this command, a part management task checks to make sure that the workpiece destination is open and then selects the oldest unprocessed workpiece at the machine for loading. When loading is completed, the control requests that the host deliver another workpiece, unless a previously completed workpiece is waiting to be picked up.

20. The part program commands the machine to make a tool sensor active. These commands are prefixed with a block delete symbol which will cause them to be skipped when the corresponding block delete number is turned on in the CNC control.

21. The part program commands the machine to probe a tool sensor with a part sensor for the second set of hits for Initial Tool Offsetting per U.S. Pat. No. 4,382,215. These commands are also prefixed with a block delete symbol.

22. The part program commands the machine to probe its tool sensor with its cutting tool edges for the third set of hits for Initial Tool Offsetting, to compute Initial Tool Offsets and update its tool offset table per U.S. Pat. No. 4,382,215. These commands are prefixed with a block delete symbol. The part program calls for a predetermined tool by a type number in a T code. The control looks for the type number in its magazine file and when found, checks for required cutting life. When the control finds the correct type with sufficient available cutting life, the magazine file tells it where to find that tool in the magazine. As each tool is removed from the magazine for the first time, its type identification is determined using a bar code reader, vision system, radio frequency identification system, or other suitable automatic means and compared with the type called for by the T code. If the type is correct, the tool is clamped in the machine, its serial number is recorded in the configuration file, and a symbol indicating it has been correctly identified is inserted in the configuration file, negating the need to determine its identity any subsequent times it is clamped in the machine. If the type is not correct, the tool is replaced in the magazine, a symbol is inserted in the configuration file indicating that identification failed thereby preventing subsequent selection of that tool, and another tool is selected.

23. The part program commands the machine to remove or deactivate its tool sensor. These commands are prefixed with a block delete symbol.

24. The part program commands the machine to insert or make available its Effective Tip Size Offsetting/System Accuracy Checking (ETSO/SAC) gauge. These commands are prefixed with a predetermined block delete symbol. See U.S. Pat. No. 4,382,215.

25. The part program commands the machine to perform ETSO (Effective Tip Size Offsetting) per U.S. Pat. No. 4,382,215 and to update an offset table. These commands are prefixed with the block delete symbol mentioned in paragraph 24 above.

26. The part program commands the machine to perform SAC (System Accuracy Checking) per U.S. Pat. No. 4,382,215 and to test for conformance to probing accuracy tolerances. These commands are prefixed With the block delete symbol mentioned in paragraph 24 above.

27. The part program commands the machine to remove or disable its ETSO/SAC gauge. These commands are prefixed with the block delete symbol of paragraph 24 above.

28. The part program commands the machine to probe the workpiece or its holding device to obtain data for the second hit of Part Location Offsetting per U.S. Pat. No. 4,382,215, to compute the Part Location Offset, and to update an offset table.

29. The part program commands the machine to machine the workpiece including roughing cuts and semifinish or gage cuts. Cutting tools are selected as described in paragraph 22 above.

30. The part program commands the machine to probe appropriate surfaces on the holding fixture and workpiece for Diametral Deviation Offsetting (DDO) and Surface Deviation Offsetting (SDO) per U.S. Pat. No. 4,382,215, compute the offsets, and update the appropriate offset tables.

31. The part program commands the machine to make the finish cuts on the workpiece per U.S. Pat. No. 4,382,215.

32. The part program commands the machine to probe the workpiece for Dimensional Measurement (DM) per U.S. Pat. No. 4,382,215. The DM results are recorded in data tables where the control tests them for conformance to tolerance requirements. If any out of tolerances are detected, the control stops and notifies the host. A person must come to the machine, review the out of tolerances, and tell the machine what to do about them, i.e. continue because there is no material or stock left for recutting, or recut because there is enough stock left to machine the dimensions correctly.

33. The part program contains an M code which commands the machine to attach the DM data to the Transfer file thereby identifying the data to a particular workpiece drawing number and serial number or lot number. Any out of tolerances are identified with an "*".

34. The part program contains an M code which commands the machine to unload the workpiece. Prior to executing this command, the control runs a Final Workpiece Status task which is identical to that described in Section II.C.16. above except that the Final Status writes over the Preliminary Status in the Transfer file. Then a Part Management task checks to make sure the unload destination is open. If the destination is occupied with a workpiece awaiting pickup, the machine has to wait until pickup occurs. If the destination is occupied with an unprocessed workpiece that has just been delivered, the control directs the workloader to move it out of the way to a queue position as soon as it has received a Transfer file for it. If the destination is unoccupied and a workpiece delivery request is active, the control asks the host if a workpiece is on the way. If the answer is yes, the machine waits until delivery occurs. If the answer is no, or if the destination is unoccupied and a workpiece delivery request is not active, the control directs the workloader to unload the workpiece and, when completed, it stops the program timer and asks the host to have the processed workpiece picked up.

35. The part program contains parameters which control the saving of data and which tell the control which block deletes need to be activated the next time the program is run and how much time can elapse before the block delete settings are no longer valid.

36. The part program contains an M code which commands the control to rewind the program back to the beginning. Prior to completing execution of this command, the control records in a recently run programs file the fact that it ran this program along with the block delete data and the workpiece material code. It also reduces its chip container volume available record by the volume of swarf created with the running of this part program.

37. The control reinitiates the automatic cycle by going back to step II.C.3.

38. An abort cycle is provided to remove workpieces when something goes wrong. The Abort M code causes the control to react as in paragraph IV.C.34 above, except that the Workpiece Status is coded Ixx for Incomplete at Item #xx, signifying an incomplete machining operation and identifying which operation was not completed.

39. The control will react to a tool break detection signal from an appropriate external device by applying Feed Hold and providing semi-automatic means of recovery through use of Retrace (of the cutting tool path) and (a) reinitiation of the cutting sequence or (b) exchange of cutting tools and then reinitiation of the cutting sequence.

40. The control manages automated guided vehicle (AGV) exchanges of workpieces, chip buckets, and tool magazines by requesting AGV service from the host, usually in anticipation of need, and with the time that service is needed included with the service request. AGV's are not allowed to engage in mechanical interfacing with the workstation unless the workloader is parked and the tool changer is at home, i.e. AGV's proceed to the workstation, stop at a ready position, and wait for permission from the machine control before doing any mechanical interfacing. AGV exchanges of workpieces and chip containers are permitted during machining, but the machine must be stopped for tool magazine exchanges. Conversely, the machine controller expects to receive communications from the AGV when it has completed mechanical interfacing and has returned to the ready position, thus allowing it to release any workloader or other functions it may have been delaying pending completion of the AGV service. The machine controller also checks its sensors to confirm any activities claimed to have been done by the AGV system and communicates confirmation back to the AGV.

41. Following AGV pickup service, the machine control transmits the appropriate transfer file with dimensional measurement data or tool magazine configuration file with current tool life data to the host when running with a host. Otherwise this may be done by a person at the machine control using a DNC system, personal computer, punched tape, or other suitable means. In addition, the machine control has its own data base which will save up to one hundred Transfer files and record the twelve most recently run part machining programs in the event that communications with the host or DNC system are interrupted for some period of time. If communications are interrupted for an extended period of time, the machine control will stop and warn of impending writeover of Transfer files so that other suitable means may be used to save the data. As already described above, immediately following or just prior to AGV delivery service, the appropriate Transfer files, part programs, and tool magazine configuration files are transmitted from the host to the machine control, or this may be done by a person at the machine control using DNC, a personal computer, or other suitable means. Ordinarily, the machine is running a part program while file transmittal is taking place.

42. Probing is not permitted during workloader operation, and conversely, workloader operation is not permitted during probing.

43. Coolant levels, high and low, are monitored during machine operation. Low coolant or high coolant will activate an optional stop (OPT STOP) condition if the machine is cutting and a FEED HOLD condition if the machine is traversing or is stopped.

44. Chip conveyor operation occurs intermittently during machine operation in accordance with part program instructions provided a chip container is present. Machining is permitted without a chip container for a pre-specified time period.

III. SOME ADVANTAGES AND NEW FEATURES:

A. Vastly Improved Productivity:

1. General purpose machine tools equipped with this system can run twenty-four hours per day, seven days per week, with a very low level of human attention; one person for each four to six machines to make repairs and adjustments as needed. Normal operator functions dealing with items such as mounting and dismounting tools and parts, measuring dimensions and adjusting offsets, and managing time are absent because they are done by the machine tool control.

2. The quality of the parts is much more uniform and greatly improved; the usual human interference, however well-intentioned, is no longer needed.

3. Logistical supporting functions of delivering and picking up parts and exchanging chip containers is performed during machining cycles. Machining does not stop except for probe calibration, part insertion and removal from the cutting position, and tool magazine exchange or refurbishing.

B. True FMS (Flexible Manufacturing System) operation is achieved:

1. As long as a machine is "fed" with appropriate parts, transfer files to tell what program to run with any particular part, and the correct cutting tools, it will run indefinitely with any mix of parts appropriate to its size and capability.

C. Standalone Automation:

1. The activities described in item II.C. are done by the work station controller. If they were done at all in prior FMS systems, they were done by the host.

2. While the above description includes a host computer, the big advantage of putting all the described activities into the individual machine tool control is safe, highly productive, automatic operation without a Host or any of the other ten optional supporting functions described in II.B.

3. The productivity advantages of automation are now available to individual general purpose machine tools. Somewhat more human attention is required without a host because someone has to read the messages at the machine control when there is no host to send them to, but the machine will work like a pieceworker and ask for whatever it needs.

4. The machine performs its own Quality Control functions. If its requests for service are honored and Closed Loop Machining programs are used, it will not make non-conforming parts provided it has been properly set up and aligned and is not working beyond its designed accuracy capability.

5. The automation functions can be turned off with MSD (Machine Setup Data) codes which restore the machine tool to normal manned operation. In addition, certain portions of Tool Management functions are optional using MSD codes such as a Tool Magazine option and a Tool Life option. Certain other automation features such as Coolant Management, Swarf Management, Quality Management, and Preliminary Dispositioning are called by M (Miscellaneous) Codes in the part program, and therefore, need not be exercised at the machine tool level if that is not desired.

Figure 3:
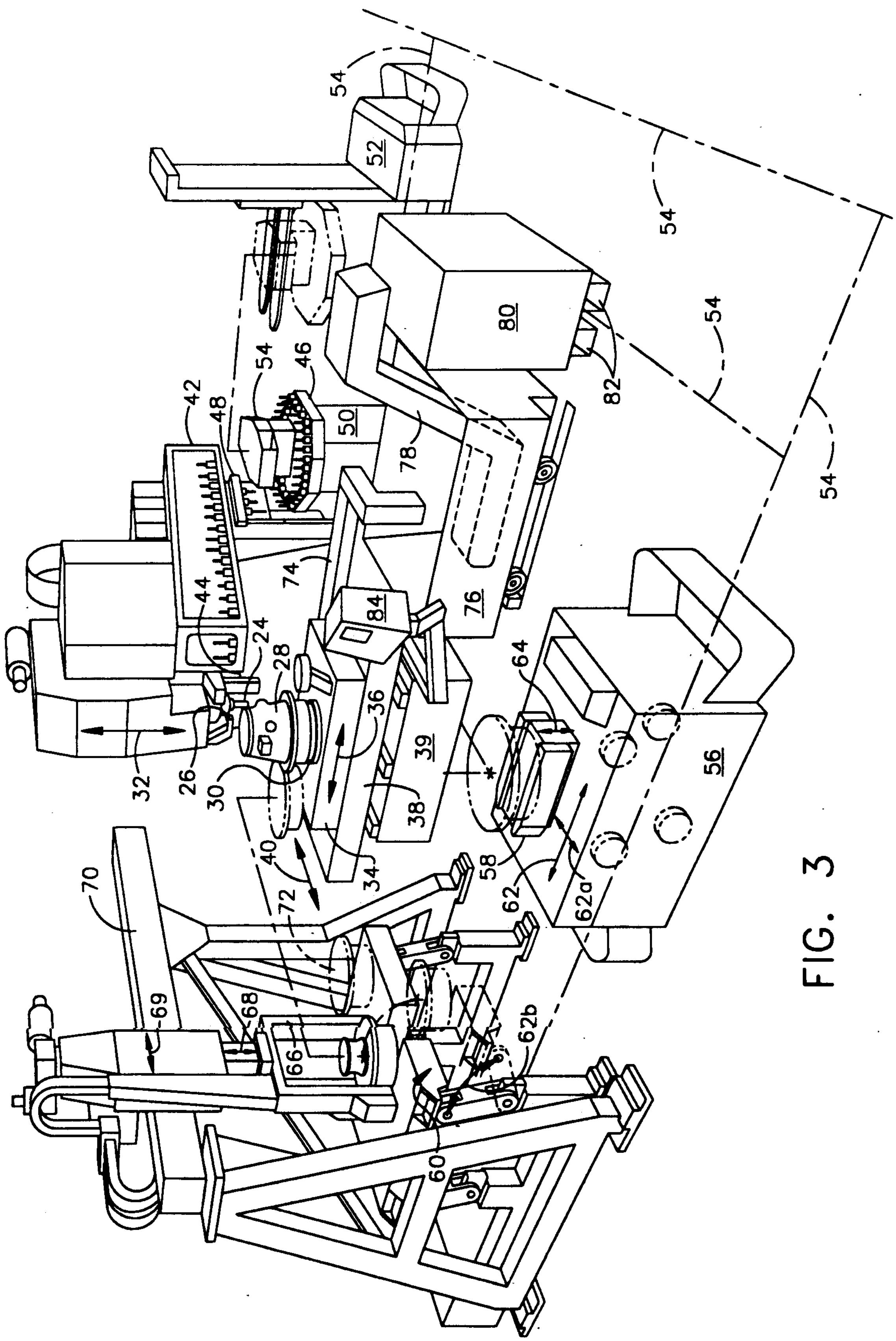
FIG. 3 is a drawing of an example of a machining workstation in the form of an automated, numerically controlled vertical machining center.
Figure 4:
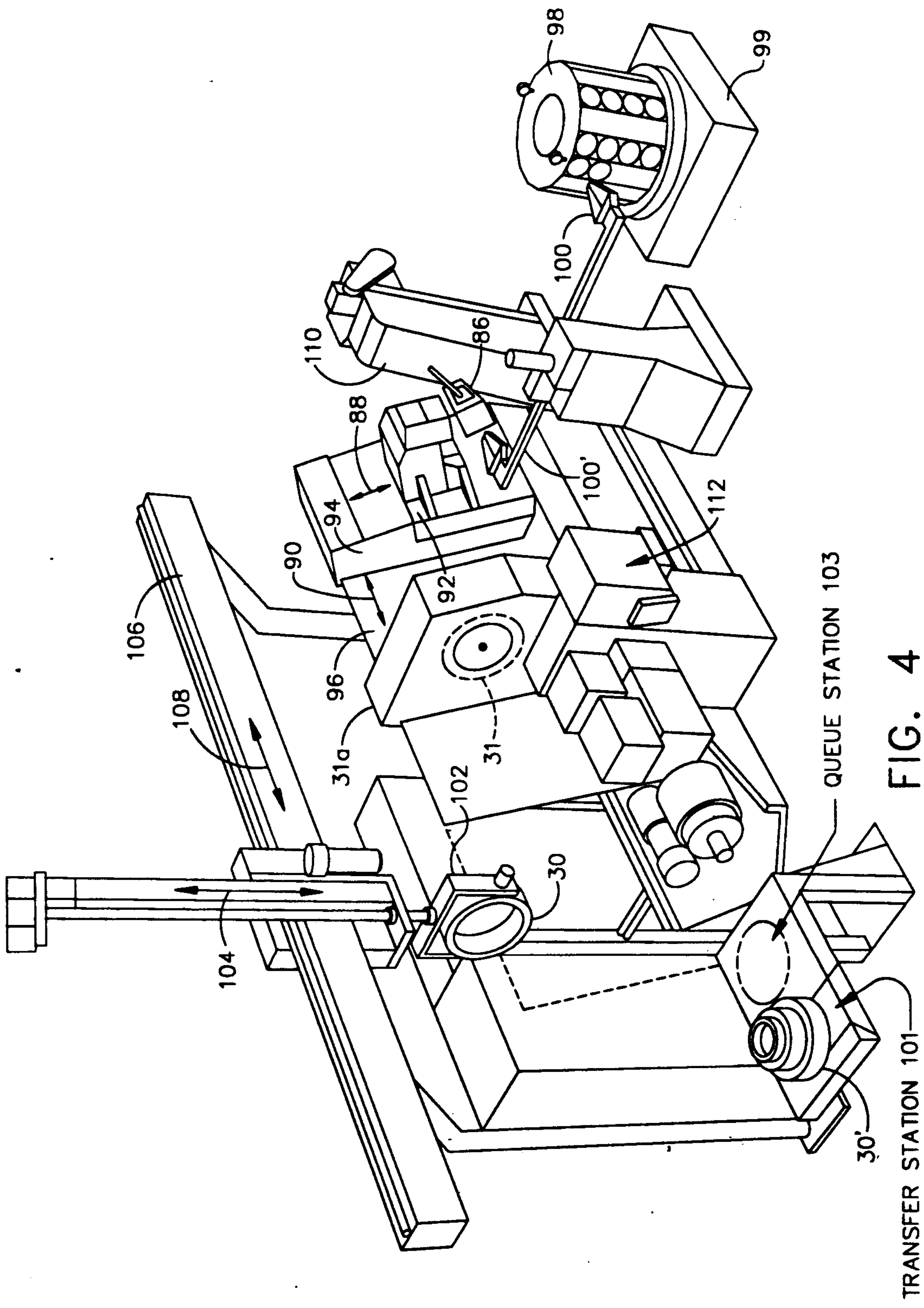
FIG. 4 is a drawing of an example of a machining workstation in the form of an automated, numerically controlled horizontal turret lathe.

IV. EXAMPLES OF ALTERNATIVES:

1. Two different types of tool magazines are shown in FIGS. 3 and 4. Others may be used. The only requirement is some means for the control to find the different types or configurations of tools it needs within the magazine, e.g. some kind of location identification code and the mechanical equipment necessary to provide access to that location.

2. FIGS. 3 and 4 show a transfer station and a queue station. There may be additional queue stations or one station may be reserved for part deliveries and another for part pickups. Queue stations may be built into the part holding fixture and become machining stations upon indexing the fixture, thereby allowing the transportation and workloading functions to be combined into a separate piece of equipment separately controlled from the machine tool. A robot may be used to move parts in and out of the machining position; the robot may be captive to a machine or centrally located in such a way that it can service several machines.

3. Chip and swarf containers may be shared among several machines.

4. The application of Closed Loop Machining, as defined by U.S. Pat. No. 4,382,215, is preferred, but not absolutely necessary to carry out the invention.

DETAILED DESCRIPTION OF AN EXAMPLE OF THE INVENTION

FIG. 1 shows the architecture of the electronic and mechanical elements making up an example of an automated production facility in which the invention of this application is useful. The production facility includes a host computer 2 which controls the overall operation of the facility, particularly a group of workstations which carry out the intended mission of the facility. The host computer may be viewed as comprising two parts, a shop controller 2a and a cell controller 2b. The shop controller 2a receives information relating to production requirements, that is, how many parts of a given type are to be made and in what time they are to be made. The shop controller then determines work queues for each of the workstations so that the production requirements may be fulfilled. In other words, the shop controller decides which workstations are to perform what operations to accomplish the necessary production. The cell controller 2b reads the work queues for each workstation, dispatches instructions to each workstation in accordance with its work queues, and generally coordinates the operations of the workstations. In the description below, host computer and cell controller are terms which are used interchangeably. The details of cell controllers and host computers are not part of this invention and are only described to the extent necessary to give a full understanding of the invention of this application.

A data base 3 is connected to the host computer 2 by way of a bus 4. The data base 3 stores all of the data used to run the automated production facility. For example, it contains data relating to the dimensions of all the parts expected to be produced by the facility and the part programs to be fed to work stations which machine workpieces to the stored dimensions.

An example of a host computer that may be used to carry out the operations described above is a cluster of VAX computers made by the Digital Equipment Corporation using a conventional memory, operating system, and relational data base software available for use with those computers.

As shown in FIG. 1, the cell controller portion of the host computer 2 is connected to a plurality of cells or work stations by way of a local area network (LAN) 5. The far left cell in FIG. 1 comprises a part staging controller 6 and part staging equipment 7. The purpose of this cell is to store parts which will be machined into finished product and to mount selected unfinished parts on fixtures or project plates which will permit the part to be mounted in a machining apparatus described below. Such equipment may be obtained from Litton Industries.

A tool staging cell comprises a tool staging controller 8 and tool staging equipment 9. This cell stores a plurality of tools for use in the production facility, prepares selected tools for insertion into a selected machining apparatus, and loads the selected tools into magazines for delivery to the machining apparatus. Such equipment may be obtained from ESCORP, TEI, and Gould.

Controllers 10 and 12 are connected to automated verification equipment 11 and conventional verification equipment 13, respectively. These cells measure the dimensions of machined parts to check if they have been machined to desired dimensions and tolerances. Corrective action may be taken in subsequent machining if the verification cells determine that parts are not being machined properly. Apparatus to implement the verification cells may be obtained from Sheffield.

A part cleaning cell comprises a part cleaning controller 14 and part cleaning equipment 15, which may be obtained from Industrial Washing Machine Corp. The part cleaning cell is desirable to remove any unwanted material adhering to the part after it has been machined, such as coolant which is used in the machining process.

As the materials being machined may be very expensive, it may be desirable to reclaim the material, also known as chips or swarf, removed from the workpieces during the machining process and to recycle it into usable items. This is particularly true in the manufacture of aircraft parts, some of which are made of expensive metals and alloys. Accordingly, the automated production facility shown in FIG. 1 includes a chip reclamation cell comprising a chip reclamation controller 16 and chip reclamation equipment 17, which may be obtained from National Conveyors Co., Inc.

In order to automate a facility such as the one being described, there must be some means of automatically transporting parts, tools, and material to be reclaimed between the various parts of the facility. This may be accomplished by way of a plurality of automated guided vehicles (AGV's) running along predetermined paths set out among the work stations in the facility. Accordingly, FIG. 1 shows an AGV controller 18 and an AGV system having a plurality of AGV's 19 controlled by the controller 18. Such an apparatus may be obtained from the Navigator Division of Portec, Inc.

The production facility also has a plurality of work station controllers associated with a number of machining workstations. In the embodiment of the invention shown in FIG. 1, there are a plurality of lathe controls 20, a plurality of vertical machining center controls 21, and a plurality of grinder controls 22. Each of the controls is associated with a respective machining work station, i.e. a lathe, a vertical machining center, or a grinder. Suitable lathes may be obtained, for example, from the Giddings & Lewis Company. Suitable vertical machining centers may be obtained, for example, from the Monarch Cortland Company. Suitable grinders may be obtained, for example, from the Heald Division of the Cincinnati Milacron Company. The number and nature of the machining work stations is such that there are sufficient workstations to carry out the desired machining. In addition to the kinds of machining work stations noted in FIG. 2, there may also be an appropriate number of milling machines or other kinds of cutting machines.

Although not shown explicitly in FIG. 1, each machining work station controller is connected to a mechanical apparatus which carries out a machining operation in accordance with instructions provided by the controller, some of which may be provided by the host computer in light of data it retrieves from the data base and in light of production requirements fed to the host from outside the facility. Some of the instructions may be provided by a human operator. As discussed in more detail below, the invention of this application provides the controllers in the individual machining workstations with more intelligence than has been provided in past machining workstation controllers. This increases the percentage of time that each workstation is actually machining parts, reduces the necessity of having a human operator attend to the operation of the workstations, reduces the computational load on the host computer, and provides a level of independence in the sense that failure or unavailability of any one piece of equipment in the production facility, most importantly, the host computer, will not cause a shut down of the entire facility.

Figure 2:
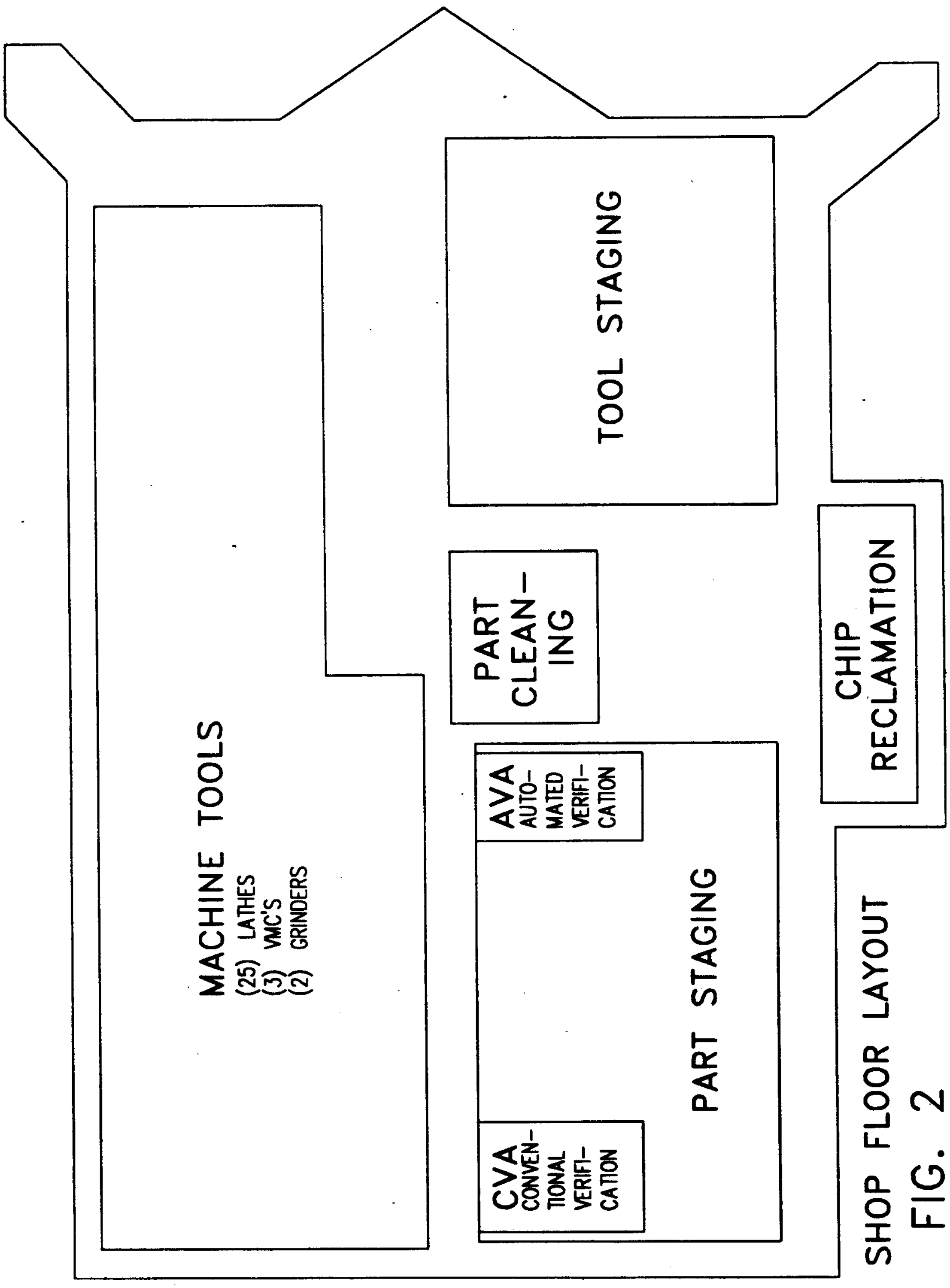
FIG. 2 is a diagram of an example of a possible floor plan useful for understanding the arrangement of elements making up the automated production facility of FIG. 1.

FIG. 2 shows a sample floor plan of a production facility which gives some idea how the apparatus shown in FIG. 1 may be actually arranged. The labeling in FIG. 2 is self explanatory and no further description is considered necessary. What is not shown in FIG. 2 is the AGV system, the host computer with the data base, and the controllers for each of the work stations or cells. The arrangement of these items in the production facility is apparent from the description of the other drawings in this application. The AGV system is arranged so that the AGV's are able to travel conveniently among the various apparatus they service. The host computer and the data base are conveniently located so that communication with the workstations they oversee may be easily maintained.

FIG. 3 shows an example of a workstation and a workstation controller useful for the invention of this application. In the case of FIG. 3, a vertical machining center is shown. The workstation and the workstation controller shown in FIG. 3 make up a machining cell. FIG. 3 also shows two AGV's for transporting parts, tools, and chip containers to and from the workstation.

The vertical machining center comprises a cutting tool 24 mounted in a chuck associated with a rotatable spindle 26. A drive mechanism not shown in FIG. 3 rotates the cutting tool 24 at a desired speed to machine a workpiece 28 attached to a project plate or universal fixture 30. Another drive mechanism, not shown in FIG. 3, moves the cutting tool vertically with respect to the workpiece as indicated by an arrow 32. Examples of the kinds of machining that may be accomplished with the apparatus described thus far include drilling holes in predetermined areas on the workpiece or tapping existing holes in the workpiece. Operations such as milling, boring, reaming, countersinking, and counterboring may also be accomplished with this apparatus.

As shown in FIG. 3, the project plate is fixed to a slide 34 which is movable by a drive mechanism not shown in FIG. 3 in a direction indicated by arrow 36. Slide 34 is situated o another slide 38 which is movable with respect to a stationary bed 39 by another drive mechanism, not shown in FIG. 3, in a direction indicated by arrow 40.

The vertical machining center of FIG. 3 has a tool storage chain 42 containing a plurality of pockets for tool holder mounted cutting tools. The cutting tools in the pockets may be of different types and sizes in accordance with the types of machining operations to be carried out by the machining center. A drive mechanism is connected to the chain 42 to position a selected tool pocket into position for a tool change mechanism 44 to remove the selected tool from its respective pocket and t insert it into the spindle 26.

The machining center of FIG. 3 also includes a tool magazine 4 containing tools in tool holders around the periphery of the magazine 46. The magazine 46 may be delivered to and picked up from the machining work station by an AGV 52. The tools in the magazine 46 may be transferred to the pockets in the chain 42 by way of a transfer mechanism 48 which lifts selected tools from their holders on the magazine 46 to their assigned pockets on the chain 42. A drive mechanism in base 50 supporting magazine 46 is capable of rotating the magazine 46 into a position where the tools slated for transfer to the chain 42 may be grasped by a tool loading mechanism 48.

The provision of a magazine 46, such as the one shown in FIG. 3, allows tools to be transported from a central storage and staging area to the machining center by means of a fork lift type automated guided vehicle (AGV) 52. Such an AGV travels along a predetermined path in a production facility between the storage and staging area and a number of machining workstations like the vertical machining center of FIG. 3. The predetermined path may be defined by wires 54 buried in the floor of the production facility. The AGV carries a magazine 46 on a pair of forks inserted in a fork receiving member 54 on the magazine 46. The AGV is capable of picking up and dropping off a magazine 46 on base 50 and transporting it to and from the storage and staging facility and the machining workstation. The details of how the AGV is directed to move between the storage and staging area and the machining workstation and how it is maintained on the predetermined path are known in the art. These details are not a part of the invention and disclosure of them is not necessary for a full understanding of the invention or for imparting the ability to carry out the invention. Thus they are not described further.

In addition to automating the supply of a wide variety and number of tools to the workstation, the AGV system for the workstation of FIG. 3 also has the capability of automating the supply to the workstation of a number of different workpieces to be machined. That capability is provided by a platform type AGV 56 which is configured and operates in a manner similar to that of AGV 52, except that it has a platform 58 capable of supporting and holding a project plate 30 containing a workpiece 28. The AGV 56 is capable of delivering and picking up project plates to and from a transfer station 60 in the machining workstation. The AGV may deliver project plates to and from a central workpiece staging and storage facility or to and from other workstations. A motive means is provided on the AGV 56 to raise and lower the platform along axis 64 so that the project plate may be presented to the transfer station at a proper height. Mechanical compliance of about one to two inches in each of the directions along axes 62 and **62*a* may be provided for the platform of the AGV, along with tapered or beveled guides on the transfer station and corresponding guide surfaces on the platform so that the project plate may be automatically aligned along axes 62 and 62*a* as the project plate is raised for insertion into the transfer station and as the guide surfaces on the platform engage the guides on the transfer station. Alternatively, motive means may be provided on the AGV 56 for adjusting the position of the project plate along axes 62 and 62*a* to correctly position the project plate for pick up or delivery. As shown in FIG. 3, a parallelogram arrangement of pivoting links, rotatable as indicated by an arrow 62*b*, may be provided in the workstation for lowering the transfer station 60** to a proper height for allowing the AGV to pick up and deliver project plates.

The workstation of FIG. 3 also includes a workloader mechanism for transporting project plates from the transfer station 60 to the slide 34, where a workpiece on the project plate may be machined. After the workpiece has been machined, the project plate may be returned to the transfer station and picked up by an AGV 56.

The workloader mechanism includes a U-shaped gripper 66 which is capable of grasping opposite sides of a project plate in the transfer station 60. The gripper 66 is driven along a vertical axis 68 by a drive mechanism not shown in FIG. 3 to raise and lower the project plate it has grasped toward or away from the transfer station 60. Another drive mechanism horizontally transports the gripper on rail 70 along axis 69 to move the project plate toward and away from the location where it is to be machined. In addition to being able to transport workpieces and project plates to and from the transfer station and the machining location, the workloader may be given the capability of transporting workpieces and project plates to and from one or more queue stations between the transfer station and the machining location, as shown by the project plate 72 shown in phantom in FIG. 3. Such an arrangement permits machining and workpiece pickup and delivery to occur simultaneously to increase the efficiency of the workstation.

As workpieces are machined, material is removed from the workpiece. That material, known as chips or swarf, must be removed from the machining environment so that it does not interfere with machining. If the material of the workpiece is valuable enough, it may be economical to reclaim that material and fabricate it into other useful items such as additional workpieces.

Chips are removed from the machining environment in FIG. 3 by a chip removal mechanism. That mechanism comprises an auger type conveyer 74 which transports the chips produced by machining to a bin 76 where a belt type conveyer 78 lifts the chips from the bin 76 and drops them into a chip container 80. The chip container 80 has a pair of fork receiving members 82 which may receive the forks of one of the AGV's 52 described above. The AGV may transport appropriate chip containers to and from the workstation so that the chips ma be collected during machining and removed from the workstation, either for reclamation or other disposition.

The entire workstation shown in FIG. 3 is controlled by a computer numerical controller (CNC) 84, which may be an MC2000 computer numerical controller available from the General Electric Company. As described below in terms of a specific example of the invention using that controller, the controller 84 is arranged so that it is loosely connected to the host computer in the production facility and the workstation is able to operate in an intelligent manner independently of human operators and other control circuitry such as a host computer. This reduces the costs of manufacturing and increases the efficiency of utilization of the machining apparatus used in the production facility.

Figure 4A:
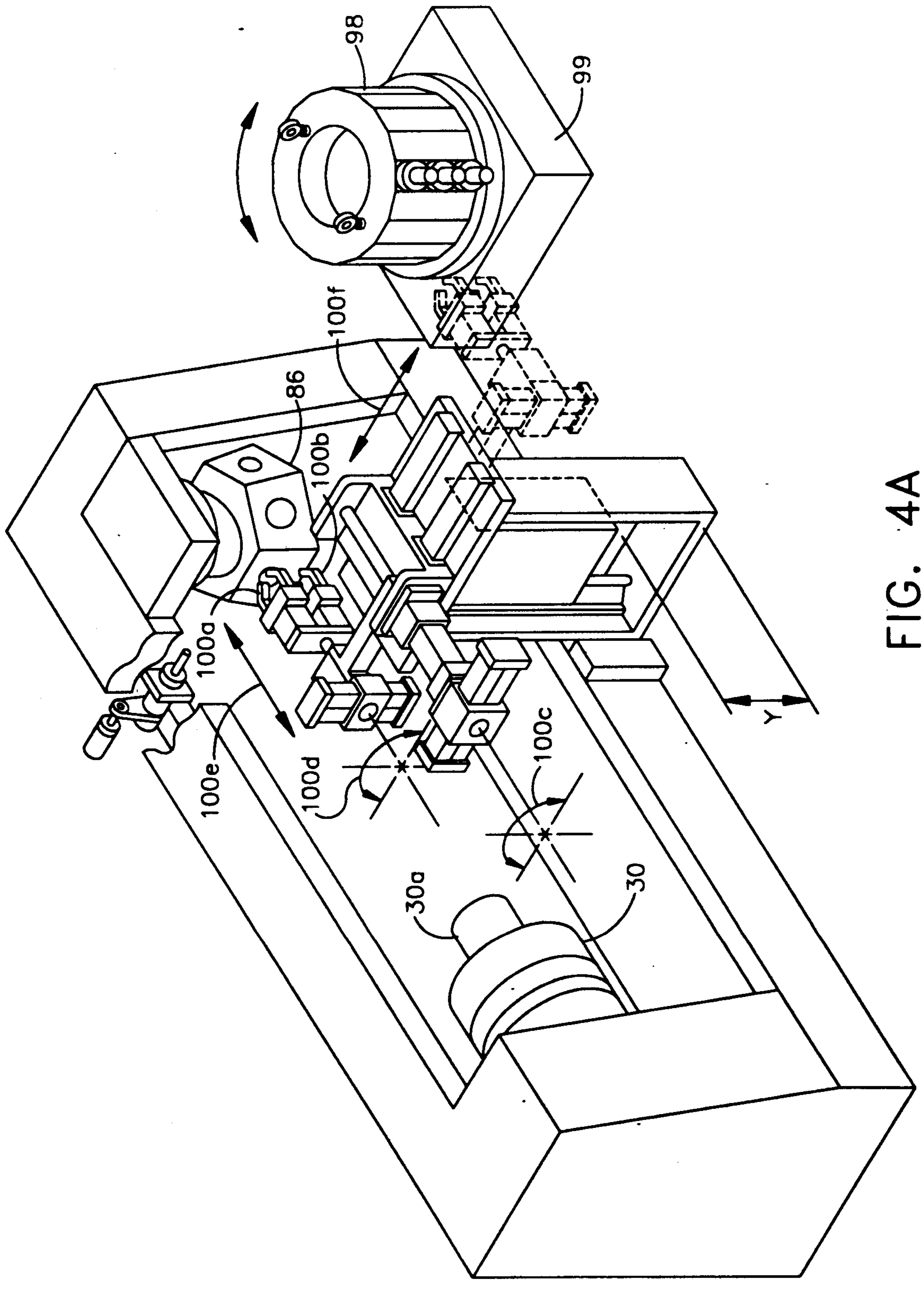
FIG. 4*a* is a more detailed view of a portion of the horizontal turret lathe shown in FIG. 4.

FIGS. 4 and 4*a* show another type of workstation in the form of a horizontal turret lathe which may be utilized in an automated production facility in accordance with the invention of this application.

A horizontal turret lathe such as the one shown in these Figures has a rotatable spindle having a chuck which is capable of holding a project plate on which is mounted a workpiece 30*a* to be machined. As in the case of the vertical machining center described above, each workpiece 30*a* is mounted in a project plate 30 which permits a plurality of different workpieces to be mounted on the spindle. A workpiece 30*a* and project plate 30 attached to the chuck and spindle are most clearly shown in FIG. 4*a*. A phantom representation of a project plate is depicted at reference numeral 31 in FIG. 4 to illustrate the location of a project plate and workpiece in position for machining on a side of a spindle supporting structure 31*a* which is not visible in FIG. 4.

The lathe in FIG. 4 has a rotatable turret 86 containing a plurality of cutting tools. The turret may also contain one or more probes used for position and dimension measuring operations, such as the closed loop machining procedures described in U.S. Pat. No. 4,382,215. A drive mechanism is capable of rotating the turret so that a desired tool is in a proper position for machining a workpiece on the spindle. After the desired tool is in such position, the turret is moved in two dimensions to machine a workpiece as follows. The turret 86 is attached to a slide 92 which is movable by a drive mechanism in a direction indicated by arrow 88. The slide 92 is situated on another slide 94 which is movable with respect to a stationary bed 96 by another drive mechanism in a horizontal direction indicated by arrow 90.

In addition to a supply of tools and probes in turret 86, the workstation of FIGS. 4 and 4*a* has available to it another supply of tools and probes located in a drum shaped tool magazine 98. A tool transfer mechanism 100 has one or more grippers for grasping a tool or probe in the magazine 98, removing it from the magazine, and inserting it in the turret. The tool transfer mechanism may also grasp a tool or probe in the turret, remove it from the turret, and place it in the tool magazine.

FIG. 4 shows a tool transfer mechanism with one gripper; the more detailed FIG. 4*a* shows a tool transfer mechanism with two grippers 100*a* and 100*b* situated one on top of the other. In FIG. 4*a*, gripper 100*a* is positioned so that it may either insert a tool in the turret 86 or remove a tool from the turret. The positions of grippers 100*a* and 100*b* may be interchanged so that gripper 100*b* may insert tools into or remove tools from the turret. As shown in FIG. 4*a*, the tool transfer mechanism is movable along a number of axes so that it may be positioned with respect to the turret, the magazine, and a bar code reader located between the turret and the magazine. Arrow 100*c* illustrates the capability of rotating the tool transfer mechanism so that it is either in the position shown in FIG. 4*a* where it can reach the turret or in the phantom position in FIG. 4*a* where it can reach the tool magazine. Arrow 100*d* illustrates the capability of rotating the wrist of the tool transfer mechanism so that the positions of the grippers 100*a* and 100*b* may be interchanged. This capability is useful in accomplishing efficient tool exchanges in the turret and the tool magazine. Arrows 100*e* and 100*f* illustrate the capability of moving the tool change mechanism respectively toward and away from the turret 86 and the tool magazine 98, on the one hand, and toward and away from the bed of the machine 96, on the other hand. Suitable drive mechanisms known in the art are provided to move the tool transfer mechanism along the axes indicated by the arrows 100*c*–100*f* in FIG. 4*a*.

A drive mechanism in base 99 is capable of rotating the tool magazine to a selected position so that a desired tool may be removed by the transfer mechanism and placed in the turret. After the transfer mechanism has removed a selected tool from the magazine 98, it rotates into a position indicated by reference numeral 100' so that it may insert the tool into a selected position in the turret 86 which has been indexed and positioned for receipt of a tool from the transfer mechanism 100.

An example of a tool change mechanism which may be used with the work station of FIGS. 4 and 4*a* is a MATS tool change system available from the Carboloy Company. See Table 10 for a description of the various tool handling cycles which may be used with a MATS system. Table 10 also describes various gripper operations.

Although not shown in FIGS. 4 and 4*a*, the tool magazine has fork receiving members which permit an AGV like the fork lift type AGV in FIG. 3 to pick up and deliver the tool magazine and to permit transportation of tool magazines between the workstation and a tool storage and staging area.

As in the workstation of FIG. 3, the workstation of FIG. 4 has a workloader mechanism for transporting project plates and workpieces between a transfer station 101, one or more queue stations 103 (one of which is shown in FIG. 4), and a position in which workpieces are machined, in this case on the spindle and in the chuck of the lathe. An example of a suitable workloader mechanism is a Gilman workloader available from the Giddings & Lewis Company run by a G.E. Series 6 Programmable Controller. As in the case of the workstation of FIG. 3, the project plates are delivered to the transfer station of the FIGS. 4 and 4*a* workstation by platform type AGV's like the one shown in FIG. 3.

The workloader mechanism comprises a U-shaped gripper which is able to grasp the edges of a project plate 30. The workloader mechanism further comprises a drive mechanism which is able to raise the project plate in a direction parallel to arrow 104 from the transfer or queue stations or from the spindle. It also includes a drive mechanism which is able to move the gripper along rail 106 in a direction parallel to arrow 108 to transport the project plate between the transfer station, the queue stations, and the spindle. One notable difference between the workloader of FIGS. 3 and 4 is that the workloader of FIG. 4 has a drive mechanism for rotating the gripper 102 so that the project plate may be either in a vertical orientation, as illustrated by the project plate 30 in the gripper, or in a horizontal orientation, as illustrated by the project plate 30' in the transfer station. This is needed in this example of a workstation because the platform type AGV which delivers project plates to the transfer station delivers the project plate in a horizontal position, while the project plate must be in a vertical position for placement on the spindle.

As in the work station of FIG. 3, the workstation of FIG. 4 includes a chip conveyor 110 to transport chips from the machining area to a chip container not shown in FIG. 4. Fork lift type AGV's pickup and deliver the chip containers as described above. The machining operation, tool exchanges, and transportation of workpieces between the transfer station, queue stations, and the spindle of the workstation in FIG. 4 is controlled by a controller 112, which may again be a General Electric MC2000 computer numerical controller.

Figure 5:
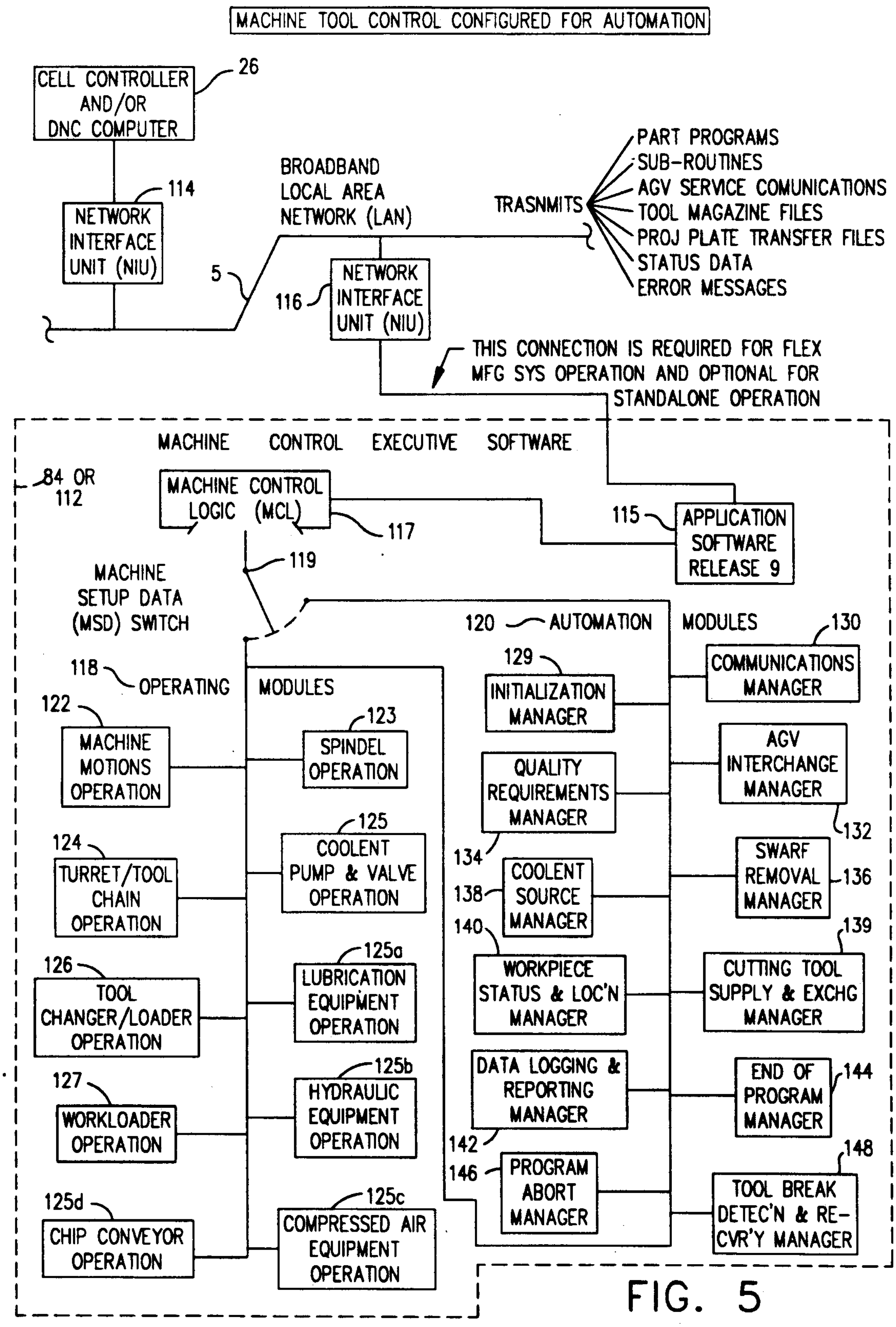
FIG. 5 is a block diagram illustrating the workstation automation features of the invention of this application.

FIG. 5 is a block diagram of the cell controller 2*b* of FIG. 1 and one of the machining work station controllers 84 or 112 of FIGS. 3 and 4, respectively. FIG. 5 illustrates the loosely coupled nature of the cell controller and the work station controller. The cell controller is a part of the host computer 2 of FIG. 1 and is connected to local area network (LAN) 5 by way of any suitable network interface unit (NIU) 114. The work station controller is connected to the local area network by way of another network interface unit (NIU) 116 The details of local area networks and network interface units are generally known, are not a part of the invention of this application, and are not needed for an understanding of how to carry out this invention. Thus, the details of these apparatus are described no further here.

A number of different kinds of communications occur between the cell controller in the host computer and the workstation controller. These include the uploading and downloading of part programs and subroutines which comprise digital words instructing the work station to perform one or more steps to accomplish a desired machining operation. Information regarding AGV service is also communicated back and forth between the host and workstation over the LAN and NIU's. More specifically, the workstation is able to notify the cell controller that it needs AGV service and the type of service it needs and the cell controller is able to notify the work station of the status of the AGV service request. Tool magazine configuration files are also uploaded and downloaded via the NIU's and LAN. These files contain data on the characteristics of tools stored in a tool magazine at the workstation, such as the tool magazine 98 shown in FIG. 4. In addition to tool magazine configuration files, project plate configuration files are uploaded and downloaded via the NIU's and LAN. These files contain data relating to the characteristics of a project plate at the workstation, such as an identification of where the project plate is located in the workstation and an identification of which part program is to be used to machine the workpiece attached to that project plate. Finally, status data and error messages are communicated between the cell controller and the workstation controller. The nature of all of these communications are described in more detail below.

In a preferred embodiment of the invention, the workstation controller 84 or 112 is programmable and contains logic in the form of software routines to carry out the operations of the work station. In other embodiments, the logic may be hardwired. In the example of the invention using the G.E. MC2000 computer numerical controller, the work station controller uses application software 115 available for use with the MC2000 controller, release 7 or higher, for example, release 9. After the MC2000 controller is programmed in accordance with the invention of this application or another controller is configured in accordance with the invention of this application, the controller will have a machine control logic 117 connected to the application software 115. The machine control logic 117 contains operating logic modules 118 and automation logic modules 120 which control the operation of the machine. A software switch 119 alternatively connects the automation modules 120 in series with the operating modules 118 or removes the automation modules 120 from such series connection. A module 122 controls the linear motions of the machining apparatus of the workstation, such as the motions of the slides 34 and 38 in FIG. 3 and the slides 92 and 94 in FIG. 4. Module 123 controls the operation of the spindle in the, workstation, in the case of the vertical machining center of FIG. 3 the spindle containing the cutting tool 24 and in the case of the turret lathe of FIG. 4 the spindle on which the project plate is mounted for machining a workpiece. Another module 124 controls the operation of either the tool chain in FIG. 3 or the tool turret in FIG. 4. Modules 125, 125*a*, 125*b*, 125*c*, and 125*d* control the operation of coolant supply to the machining environment, lubrication of the moving parts of the work station, supply of hydraulic and pneumatic fluids, and the chip conveyors. A module 126 controls the operation of the tool change mechanism and a module 127 controls the operation of the workloaders in the workstation.

In each case, the logic modules in the operating machine control logic take commands received from an external source such as a part program and cause the appropriate part of the workstation to execute the commands. In the past, the commands were received from human operators by way of manually loaded part programs such as tapes or by way of manual data entries such as those which might be made by way of a keyboard. This approach is costly because it is labor intensive and is subject to human error. To reduce the amount of human intervention in the machining process, the commands also may have been received from a central host computer which controls a number of work stations. With this arrangement, there was no way for the workstation to proceed with machining in the absence of a host computer, however. This problem could be remedied by providing a human operator for each work station at all times with the ability to load and run part programs for machining workpieces in the event a host computer were to be unavailable, but the advantage of less labor cost would be lost. Another way to overcome the problem of the loss of the host computer is to provide a backup capability in the form of another host computer to take on the tasks of the unavailable computer should it be unable to perform those tasks. This also adds unnecessary expense to the system as the backup computer is not used at all times and thus not as efficiently as it might have been used. With or without a backup host computer, the use of a host computer to completely control and automate a number of workstations involves great complexity and expense.

The invention of this application provides automation of the activities of the individual work stations to a degree not accomplished in the past to reduce the need of human operators. It also provides some amount of intelligence and independence from a host computer which controls a number of work stations so that the work station may perform machining functions in the absence of the control normally provided by the host computer, which increases the efficiency of utilization of the work station. The invention accomplishes this by the provision of, in addition to the operating machine control logic modules 118, the automation control logic modules 120 comprising a number of logic modules, which automate and manage various aspects of each work station. At this point, each module is described in broad functional terms to give a summary of the purpose of each module. A more detailed description of the logic circuitry to achieve the purposes of each module is given below in connection with the description of the flow charts in FIGS. 7–38.

An initialization manager 129 automates and manages the initialization of the controller 84 or 112 in the work station. First, it manages the performance of reference zero operations, which is a way to insure that the work station may accurately keep track of where the moving parts of the work station are at all times. Management of these operations are described in more detail below. The initialization manager also provides work station status selection, which has to do with the availability of the work station for automated operations, among other things. Initialization manager 129 also insures that the work station knows the time and date and keeps track of the dates that the machine must be calibrated and the intervals between calibrations. The initialization function of manager 129 also includes the updating of machining programs, selection of programs to be used by the work station, and automation of block deletes which is the skipping of selected blocks or portions of part programs as they are being executed. Finally, the initialization manager 129 automatically actuates the starting of the machine to execute selected part programs under certain circumstances.

The communication manager 130 manages the communications between the cell controller *2b* and the work station. It also may trigger the display of messages at desired locations, such as at the workstation, or in some remote central location in the factory, to alert an attendant of the condition of the work station and possible courses of action for the attendant to take if necessary.

The AGV interchange manager 132 specifies the type and timing of AGV service required by the work station. It also prohibits an AGV from picking up or delivering an item until the work station is ready for pickup or delivery and it prevents work station activity which might interfere with AGV pick up or delivery until the AGV is clear of the work station.

The quality requirements manager 134 sees to it that the work station conforms to predetermined calibration requirements. It also sees to it that verification results from measuring machined workpieces in verification stations 11 and 13 (FIG. 1) are reported in a timely fashion. It reacts to a rejection by one of those verification stations. It designates which machined workpieces are to be sent for verification and provides a disposition for all parts leaving the work station.

The swarf removal manager 136 starts and stops the chip conveyors, prohibits mixing of materials in the chip containers, assures the presence of a chip container in the work station, maintains records of how full the chip container is, and requests AGV service to pickup or deliver a chip container. The swarf removal manager further includes provision for the machine to run a predetermined time with the chip conveyor stopped and is capable of running the chip conveyor long enough to clear it after machining is stopped, unless the stop is due to specified emergency conditions.

The coolant source manager 138 insures that adequate coolant is available for machining and that the coolant comes from a desired source when more than one source of cooling fluid is available.

By means of a tool supply and exchange manager 139, the work station insures that a tool magazine is present in the work station and insures that the types of tools needed to perform a desired machining operation are available in the magazine. The tool supply and exchange manager tests for adequate tool life needed for the successful execution of predetermined parts of a part program and for the successful execution of predetermined numbers of part programs expected to be run in the future. For example, the tool supply and exchange manager may test for adequate tool life for successful completion of a given part program and an additional successful execution of the same part program expected to be run in the future. The tool supply and exchange manager also arranges for no action, a turret or tool chain index, or a tool exchange between the magazine and turret or tool chain depending on the tool life requirements of the particular part program being run. It empties the turret or chain of tools when the magazine is to be changed for a fresh tool magazine, but it may continue to store probes that have been installed in the turret or chain when the magazine is changed if the fresh tool magazine is to be used for the same part program. It monitors whether the correct tool is in the turret or chain, requests AGV service to pick up and deliver tool magazines in the work station, and takes into account the proper tool offsets when exchanging tools. Finally, an important feature of this part of the automation control logic is that the logic selects tools by type and not by location.

A workpiece status and location manager 140 maintains records of the status and location of workpieces in the work station. It keeps track of work station and work loader activities to protect against inappropriate machine motions or work loader cycling. It selects and activates a proper work loader task such as a reseating of a workpiece fixture if it is not properly seated in the machine chuck. It assures that a disposition has been assigned to each work piece before it is unloaded from the work station and updates quality parameters relating to part program approval. Finally, it requests AGV service for work piece pick up and delivery.

A data logging and reporting manager 142 saves closed loop machining dimensional measurement data, which is produced by probing a work piece during a machining operation. It displays data which is out of tolerance, selects proper verification procedures to check if workpieces have been machined properly, identifies closed loop machining dimensional measurement data sets, stores the identified dimensional measurement data sets in non-volatile memory such as bubble memory, provides for the output of stored data by means of a display, a printer, or an upload to the cell controller, and erases stored data no longer needed by the work station.

An end of program manager 144 updates block delete requirements, material identification records, and chip container records. It increments a part counter, rewinds the program, and reinitializes the process.

A program abort manager 146 guides the aborting of a program in response to intervention by a human operator. It updates workpiece status, obtains a disposition for the workpiece, unloads the work piece, and conducts a variety of end of program chores explained below.

A tool break detection and recovery manager 148 stops the machine when a tool break occurs or excessive tool wear is encountered, calls for human inspection unless overridden, activates automatic recovery or continues the cutting, depending on whether the tool break is real or a break signal from a tool break sensor is false, and restarts the cutting sequence whenever the tool is changed.

FIGS. 7-38 are logic diagrams or flow charts specifying and representing the characteristics of a specific example of electronic circuitry which accomplishes the functions of the automation machine control logic for a horizontal turret lathe such as the one shown in FIG. 4. None of the logic diagrams in FIGS. 7-38 deals exclusively with any particular manager module identified in FIG. 5. The components of the various manager modules are shown spread throughout one or more of FIGS. 7-38. For example, parts of the communications manager may be found in virtually all of FIGS. 7-38. Persons skilled in the art will be able to tell the module to which each part of the logic diagrams belongs.

In a specific example of the invention, the electronic circuitry may be software programmed into the G.E. MC2000 computer numerical controller identified above. Adaptation of such circuitry to the environment of a vertical milling machine, grinder, or other machining work station is straightforward and is not described here. This specific example of the invention involves the programming of a G.E. MC2000 controller. There are other ways of implementing the invention, including programming other commercially available computer numerical controllers or providing hard wired circuitry.

Figure 6:
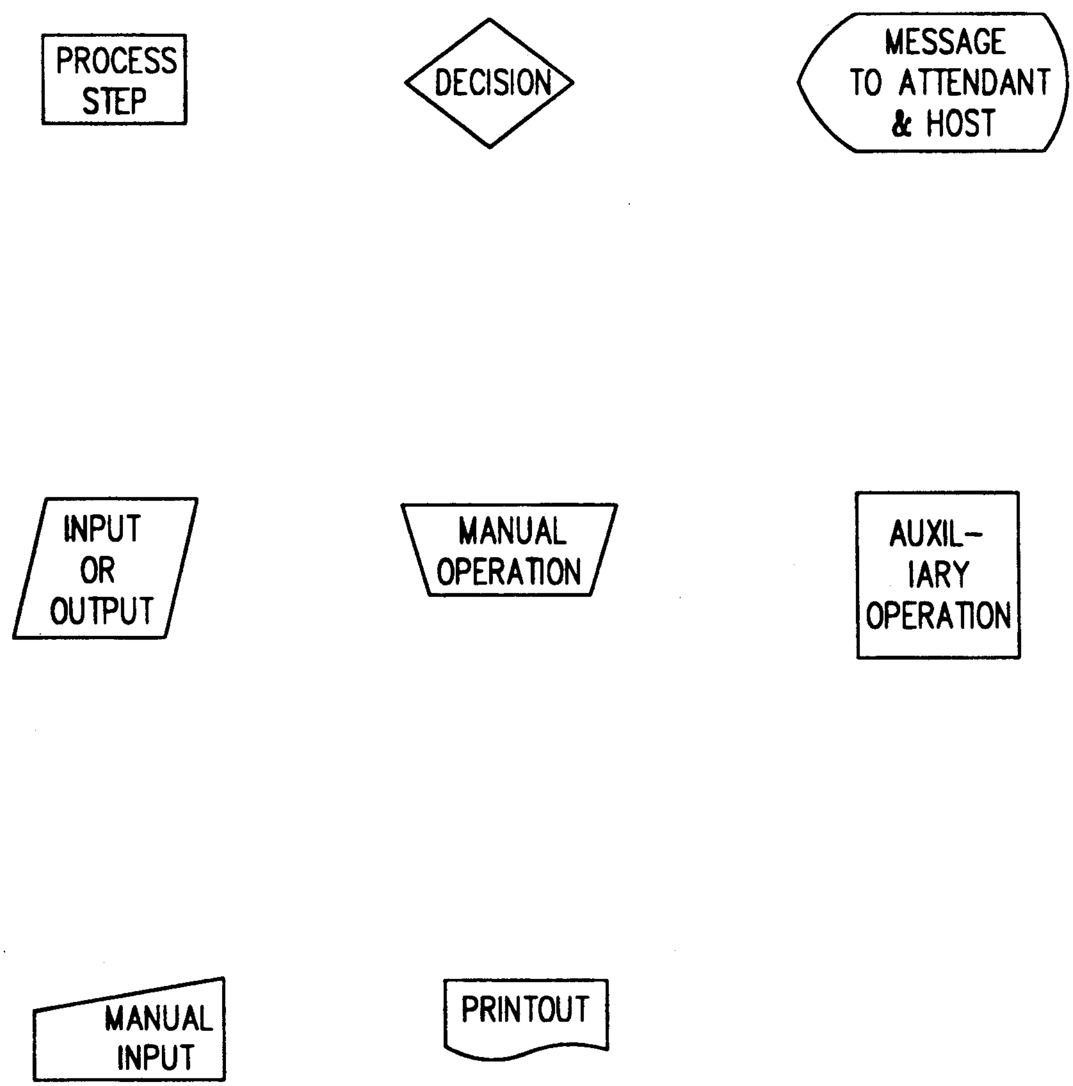
FIGS. 6–38 and 38A are high level functional flow charts representing electronic circuitry for accomplishing the invention of this application.

FIG. 6 shows the various symbols used in the flow charts of FIGS. 7-38. They are self explanatory and are not described further here.

Figure 7:
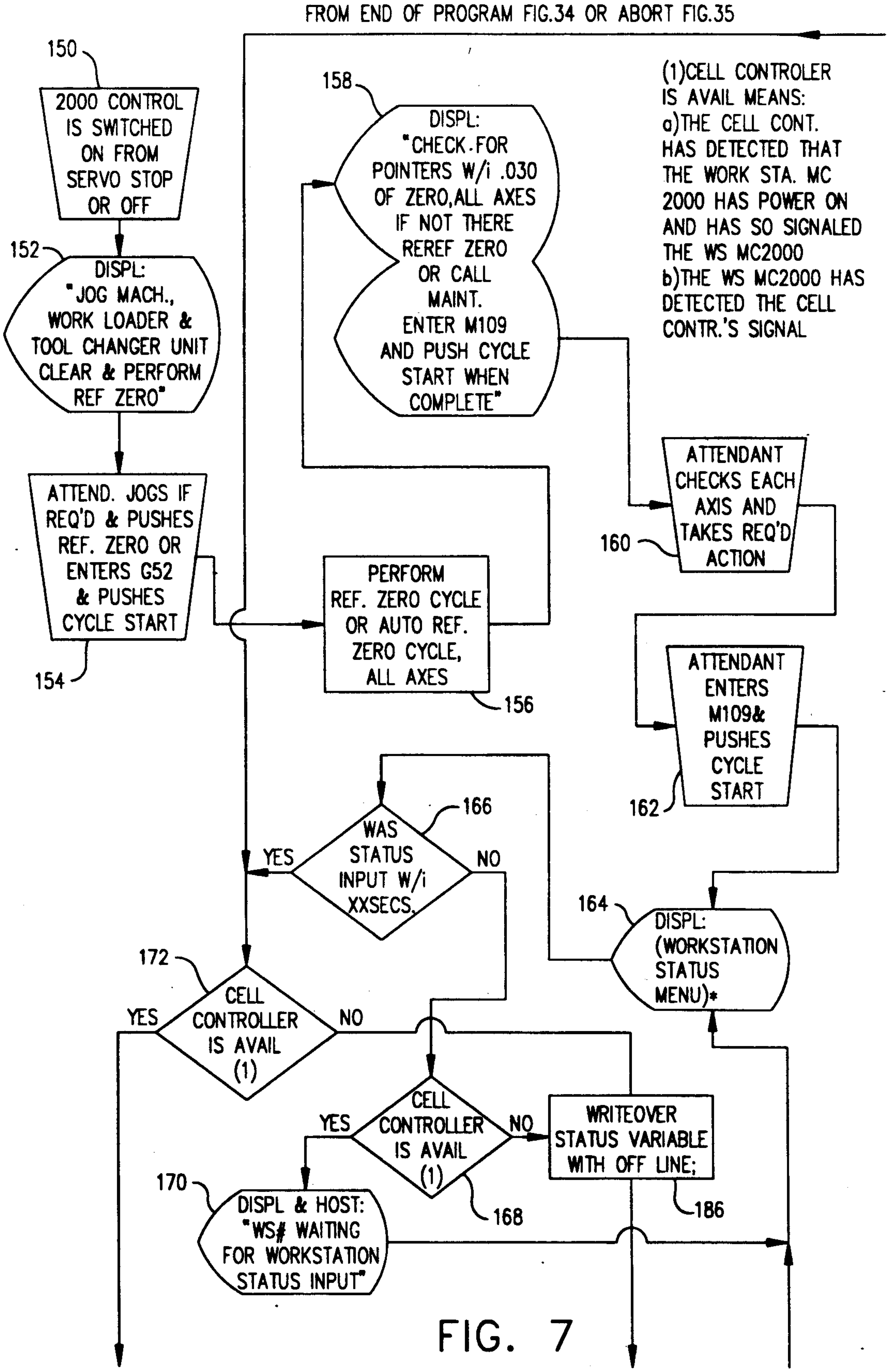
Figure 7A:
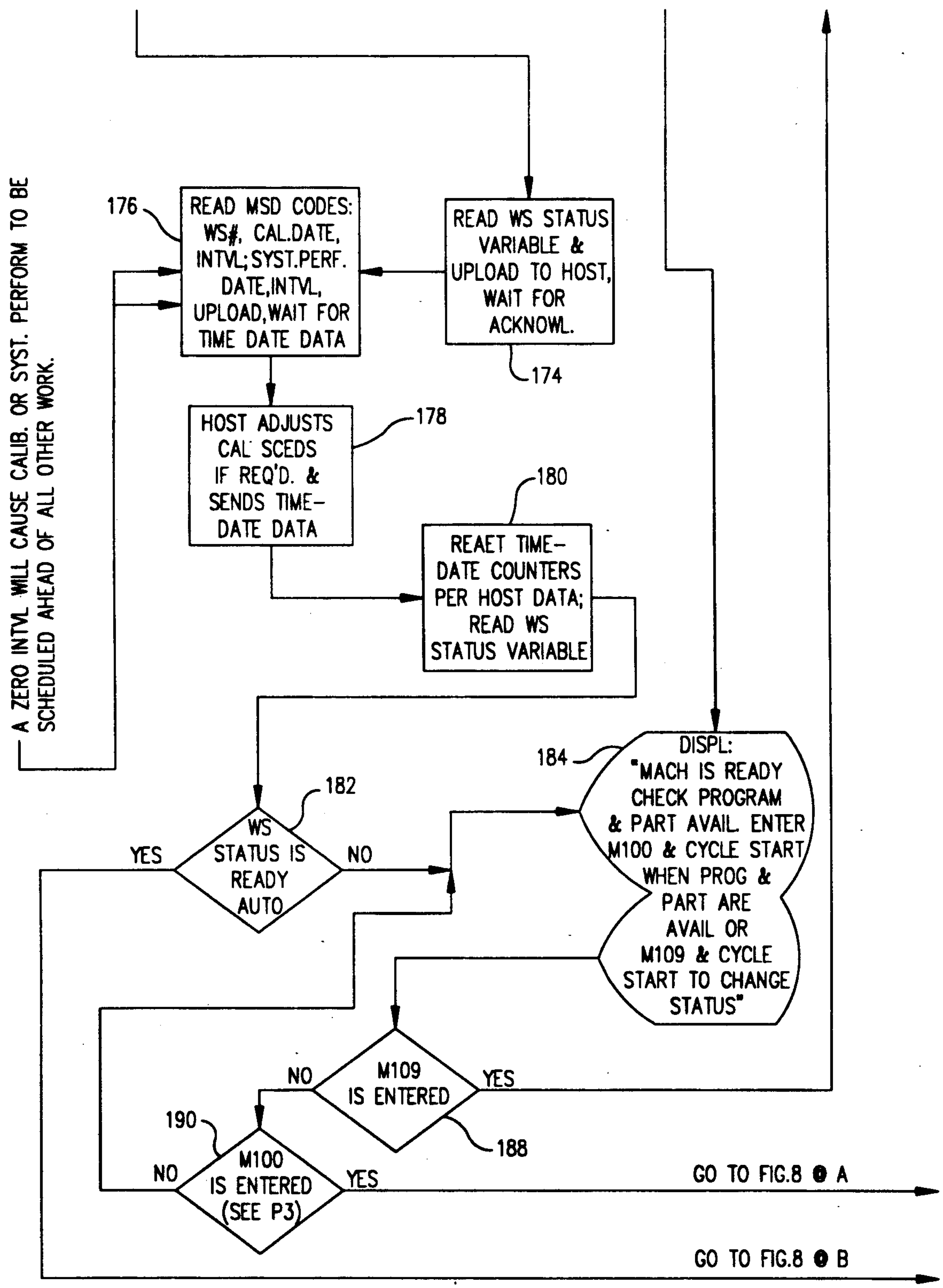
Figure 8:
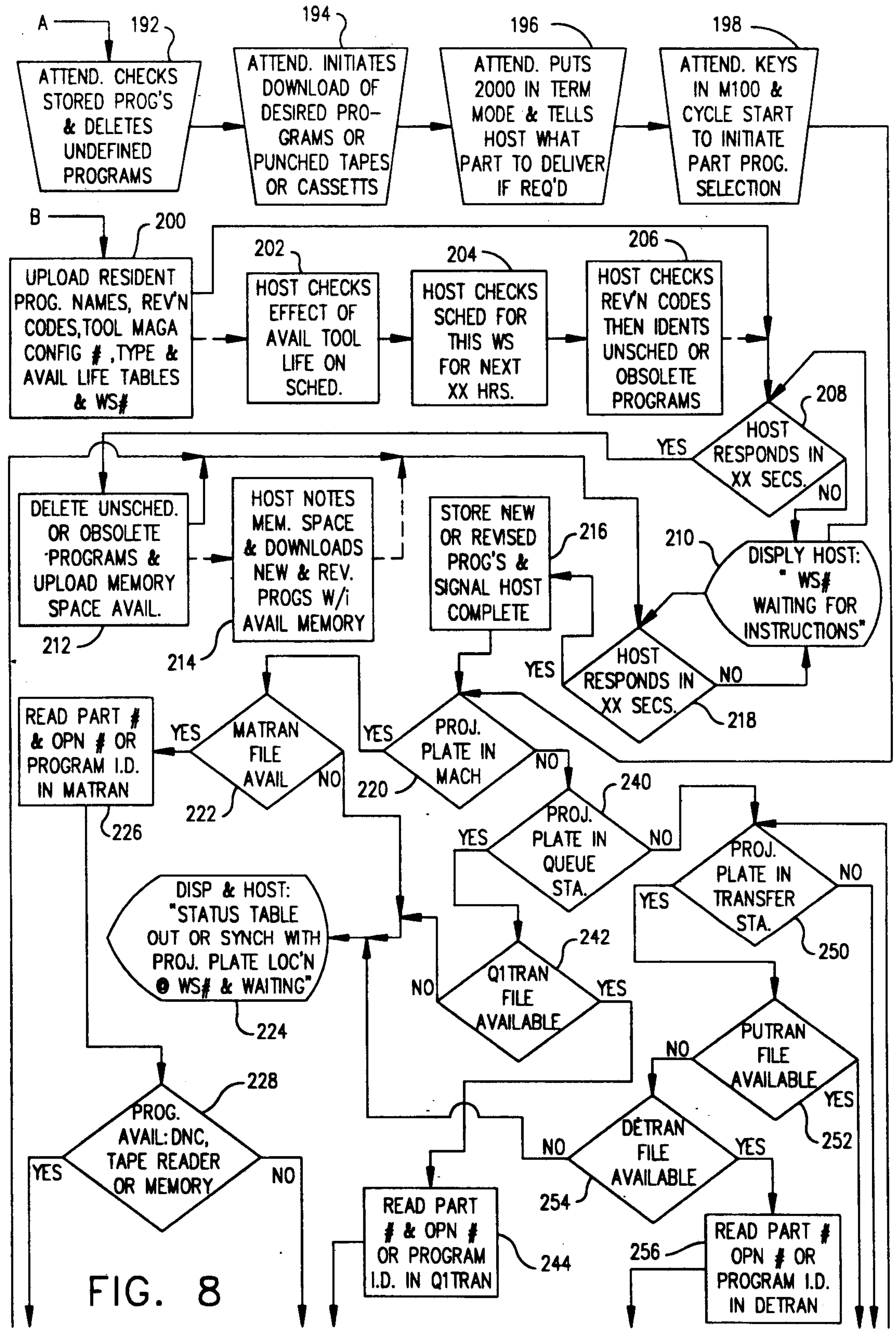
Figure 8A:
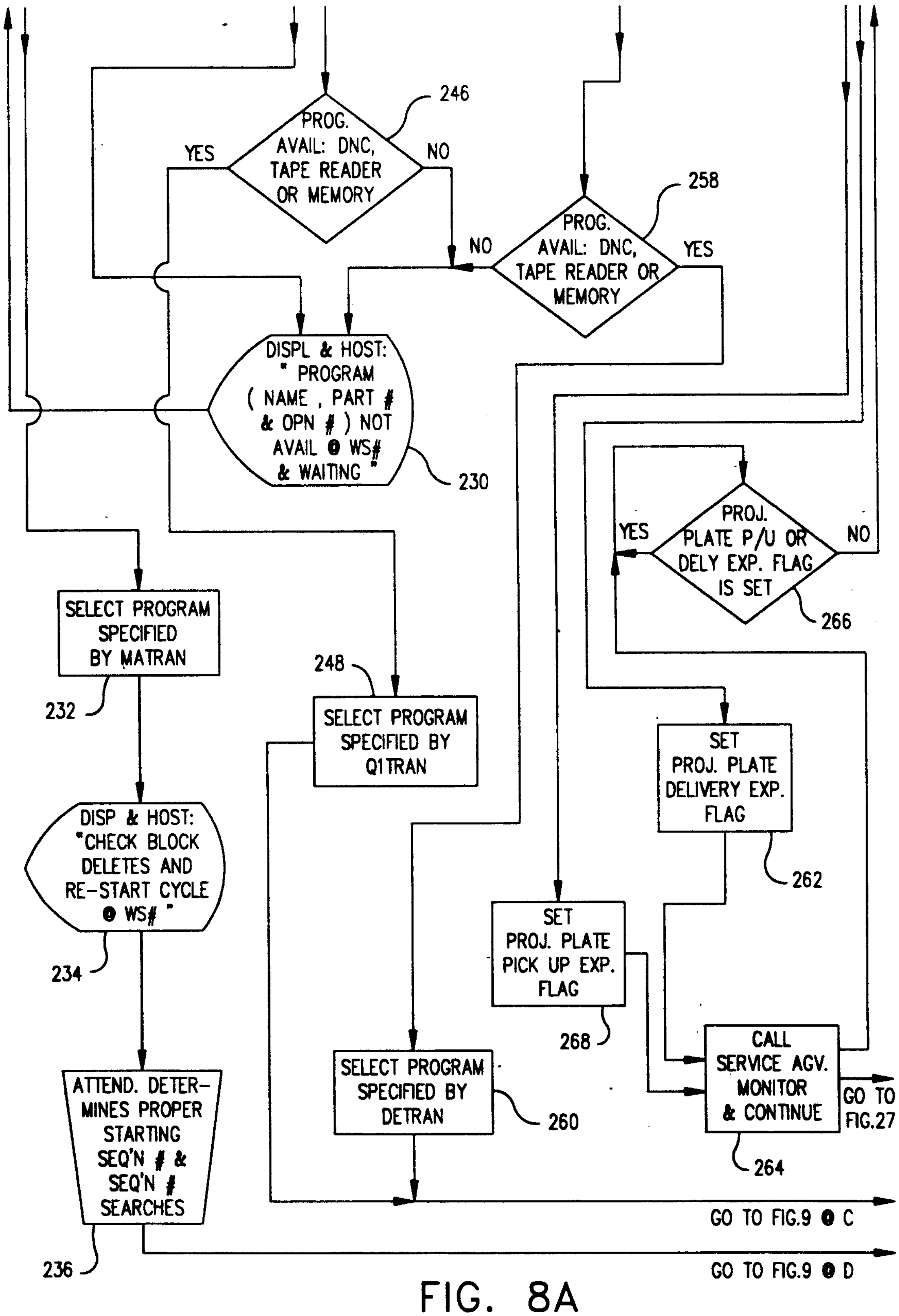
Figure 9:
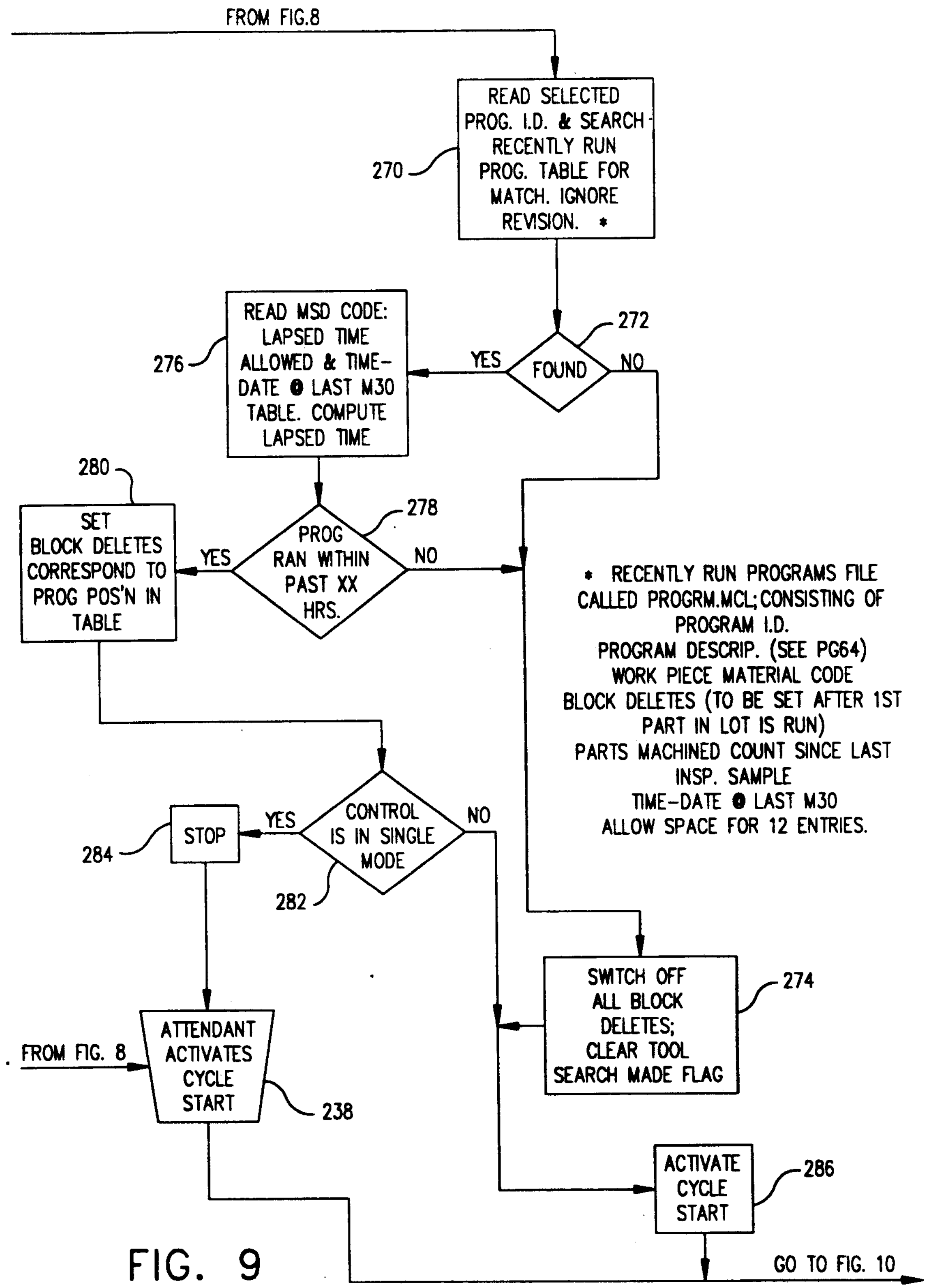

FIGS. 7-9 show a start up task for the workstation controller generally corresponding to the initialization manager identified above. The sequence of operation begins at block 150 in FIG. 7 where a human operator switches on the computer numerical controller (CNC). In response to switching the computer numerical controller on, as indicated at block 152, the display on the CNC directs the operator to jog the work loader and tool changer until they are clear of any obstructions and to perform an initialization or reference zero operation, which positions the turret in a predetermined reference position from which all movement is measured. This is necessary to insure that position sensors connected to the turret and other components of the workstation (specifically, position sensors which measure motion along axes represented by arrows 88, 90, 104, and 108 in FIG. 4 and arrow Y in FIG. 4*a*) are initialized or reference zeroed so that they will accurately measure the position of the turret and the other components. This referencing zeroing operation is necessary because the position sensors do not measure absolute position but changes in position. Block 15 indicates the actual performance of the jogging operation and the steps taken to initiate reference zeroing operations. In this case, after the machine is jogged, the operator may push a button on the CNC to initiate the reference zeroing operation or cycle. In such operation, the component being initialized and its associated position sensor are moved toward the reference zero position until a microswitch for the component and position is closed indicating that the component and sensor are at the reference zero position. This operation is indicated by block 156. The work station may automatically drive its movable components to a reference zero position by sensing a G52 code in a program in the machine, but this is only a positioning function and not a reference zero cycle.

After the completion of reference zeroing operations, the CNC displays at block 158 that the accuracy of the reference zero operation should be checked. This is done by checking the location of a pointer with respect to a precision scale on the machine. As indicated in block 158, the pointer should be within a predetermined distance of true reference zero. If not, reference zero operations are repeated or maintenance is called for, which is accomplished by the attendant at block 160. When this is complete, the attendant, as requested to do so in block 158, enters a code (M109) calling for a display of a flexible manufacturing system status menu for the work station. The attendant pushes a cycle start button to obtain that display.

The work station status menu is displayed at block 164. The status of the work station listed on the menu may be as follows. The work station may be in a Ready Automatic mode, which means that the work station is fully operative and waiting for host scheduled production or calibration work, or it is running in full automation, on line with a cell controller or host computer. When the cell controller is unavailable for some reason, the work station may automatically switch to a Standby mode in which it may continue with automated machining until it runs out of work or tools. When the cell controller returns, the work station may automatically switch itself back to the Ready Automatic mode if none of the controls have been touched while the work station was in the Standby mode. Another mode which may be on the status menu is a machine operable, but Not Available for production scheduling for a predetermined number of hours mode. In this mode, the work station is operable for use in such things as preventive maintenance, calibration, program debugging, special tests, and the like. In both the Ready Automatic mode and the Not Available mode, the cell controller monitors work station status and will respond to service requests. Yet another mode on the status menu may be an Off Line mode in which the work station is unavailable for automated production in the predictable future and there is no communication with the cell controller. No status monitoring is done in this mode.

A check is made at block 166 to see if a work station status has been selected within a predetermined time. If not, the program checks to see if the cell controller is available at block 168. If the cell controller is available when the check is made at block 168, a display is made at block 170 that the work station is waiting for input of a status selection, and then the program loops back to block 164 to display the status menu and await input of the work station status.

For purposes of carrying out this specific example of the invention, cell controller availability may mean that the cell controller has detected that the CNC has power on and has so signaled the CNC or that the CNC has detected the cell controller's signal.

If the work station status is selected by the attendant and is entered within the predetermined time, as determined at block 166, then a check is made at block 172 to see if the cell controller is available. If so, a work station status variable is read and uploaded to the cell controller at block 174. The work station status variable is a number stored in the CNC indicating the status selected from the menu. Once the uploading of the status variable is acknowledged by the cell controller, machine set up data (MSD) codes are read at block 176. The MSD code comprises a number representing which particular work station in the production facility these codes are for, the date when the machine last underwent calibration, the interval of time between calibrations, the date when a system performance check was last performed, and the interval between system performance checks.

Calibration of the machine involves commanding the machine to perform moves of predetermined amounts. A laser interferometer mounted on the machine is used to check the accuracy of the machine's movements as performed by the positional servomechanisms controlling those movements. If the machine's movements differ from the commanded movements as indicated by the interferometer, then adjustments may be made to the positioning system to take these differences into account.

A system accuracy check involves mounting a precisely dimensioned block on a project plate and mounting the project plate on the spindle of the lathe. The block is then touched by one or more probes situated in the turret. Each time a probe touches the block, the position of the turret as measured by the position sensors in the positional servomechanisms is recorded in memory. These positions may then be used to compute the dimensions of the block. The computed dimensions may be compared with the known dimensions of the block to check the accuracy of the machining system. More than one measurement and computation may be made for each dimension to perform a statistical analysis of system performance data.

After the MSD codes are read and uploaded to the cell controller, the cell controller adjusts the calibration and system performance check schedules if necessary at block 178. Also at that block, it sends data to the work station CNC regarding the present time and date. Time and date counters in the CNC are reset with data from the cell controller at block 180.

If the work station status is Ready Automatic, as determined at block 182, then the program proceeds to the flow chart shown in FIG. 8 beginning at the point labeled "B". If the work station status is not ready automatic, then the CNC displays at block 184 that the machine is ready. It also requests a check of program and part availability. The display indicates that if a part and program are available, manual processing may be initiated by entry of an M100 code and pressing the cycle start button. The display also indicates that if a status change is desired, an M109 code and cycle start is to be entered. The display of block 184 may also be achieved if it is determined that the cell controller is unavailable in blocks 168 or 172. If it is found that the cell controller is unavailable, the status variable is written over with an off line status at block 186 and the display of block 184 occurs.

If an M109 code is entered, as determined at block 188, then the work station status menu is displayed at block 164 at which time the status may be changed. If an M109 code has not been entered, a check is made at block 190 to determine if an M100 code has been entered. If so, the program proceeds to the flow chart of FIG. 8 beginning at the point labeled "A". If not, the message of block 184 is displayed until an M100 or M109 code is entered.

If an M100 code has been entered as determined at block 190 in FIG. 7, then the attendant checks the programs stored in the CNC and deletes unnecessary programs at block 192 shown in FIG. 8. The attendant then initiates the downloading of desired part programs from the host or manually loads desired part programs by way of punched paper tape or magnetic tape cassettes at block 194. At block 196, the attendant next puts the CNC in a terminal mode in which the work station controller acts like a computer terminal connected by way of the LAN to the host. This mode is entered by pushing an appropriate button on the face of the work station controller. In this mode, the attendant tells the host what part to deliver to the work station if it is not already there. At block 198, the attendant actually keys in the M100 code and pushes the cycle start button to initiate program selection.

If the work station status is Ready Automatic, as determined at block 182 in FIG. 7, numbers identifying the programs resident in the memory of the CNC, the revision codes for those programs, a tool magazine configuration number, a table reflecting the nature of the tools available for use by the work station in the turret and the tool magazine, a table identifying the life expectancy of each of the available tools, and the work station number are uploaded to the host at block 200. A more detailed description of the significance of this data is found where appropriate below. At block 202, the host checks the effect of available tool life on the production schedule. At block 204, it checks the schedule of this work station for a predetermined time in the future and, at block 206, it checks the revision codes and identifies unscheduled or obsolete programs.

The CNC checks, at block 208, to see if the host responds within a predetermined time after the information identified in block 200 is uploaded to the host. If not, the CNC makes a display at the workstation and sends a message to the host at block 210 that it is waiting for instructions. The program returns to block 208 and continues to test for host response within another of the predetermined time periods. The display of block 208 continues until the host responds.

If the host responds, as indicated by block 208, then the CNC deletes unscheduled or obsolete programs and uploads to the host the available memory space available for downloading additional part programs at block 212. The host notes the available memory space at block 214 and downloads new and revised programs capable of fitting into the available memory space.

After the deletion of unwanted programs at block 212, the CNC awaits the downloading of other programs from the host. At block 218, the CNC checks to see if the host does this in a predetermined time. If not, the message of block 210 is displayed and the test of block 218 is repeated. This is done until the host downloads the programs at which time the new or revised programs are stored at block 216 and the host is signaled that this has been completed.

After the attendant enters an M100 code and pushes the cycle start button (block 198) or part programs have been downloaded by the host (block 216), a check is made at block 220 to see if a project plate is in position for performing a machining operation, in this case, to see if a project plate is in the chuck on the spindle of the lathe. This may be accomplished in any known manner, for example, by the provision of a microswitch in a position to be closed by the positioning of a project plate on the spindle. The determination of block 220 may then be accomplished by checking to see if the microswitch is open or closed.

Each workpiece or part has associated with it some data in a project plate configuration (PPC) file, called a transfer file, which electronically travels around the production facility with the part. That data identifies the workpiece, what must be done to it, and the like, which is explained in more detail below as needed. One function of the transfer file is to indicate where the workpiece is located in a given work station. The transfer file, is assigned a name indicating a location of the workpiece associated with the file. The names are assigned to cover the various location possibilities in the particular work station being used. For example, the following transfer file names may be used for the work stations of FIGS. 3 and 4: (1) MATRAN, short for MAchine TRANsfer, signifying that the workpiece is on the spindle of the machine; (2) Q1TRAN, short for Queue Station No. 1 TRANsfer, signifying the workpiece is in Queue Station No. 1; (3) DETRAN, short for DElivery TRANsfer, signifying a fresh work piece in the transfer station following a delivery; and (4) PUTRAN, short for PickUp TRANsfer, signifying a processed part in the transfer station awaiting pickup. The CNC changes the name of the transfer file as the workpiece is moved from place to place in the work station. Rather than appropriately naming the transfer file to indicate part location, the location information may also be indicated by an appropriate designation written into a predetermined location in the transfer file in accordance with the location of the workpiece in the work station. The current designation may be written over with a new designation when the part is moved from one place to another in the work station.

A determination is made at block 220 to see if there is a project plate on the spindle. This determination may be made in any convenient, known way, for example, by sensing the opened or closed condition of a switch located on the spindle or its adjacent structure and which changes its state when a project plate is correctly seated on the spindle or is removed from the spindle. If there is a project plate on the spindle as determined at block 220, the transfer file for that project plate should be named MATRAN. An index containing the names of MCL files in the workstation control is checked at block 222 to see if there is a MATRAN file in the workstation. If there is no MATRAN file, then the transfer file for the part on the spindle is out of synch with the part's location in the work station. This condition is displayed and a message to that effect is sent to the host at block 224.

If the transfer file is in synch with the location of the part in the work station, then at block 226 a part number in the transfer file identifying the workpiece on the spindle is read along with an operation number in the transfer file for that workpiece identifying the program to be run at this time to machine the workpiece. At block 228, a check is made to ascertain if the part program called for in the transfer file is available to be run. In this case, a check is made to see if that program is available from the host in a direct numerical control arrangement, from a tape reader, or from the memory in the CNC. If the required program is unavailable, a message to that effect is displayed and sent to the host at block 230. The program of FIG. 8 then returns to block 218 and the work station awaits the arrival of the required program, as described above.

If the required program is available, it is selected at block 232 and a message is displayed at block 234 and sent to the host to the effect that block deletes are to be checked and the cycle is to be restarted at the work station. If a number of identical parts are to be made in succession with the same part program, some steps in the part program need not be repeated and block deletes are appropriate to avoid unnecessary steps. Block deletes are more fully discussed below.

The attendant then selects the proper starting sequence number and does a sequence number search to start the program at the desired line in the part program at block 236. The CNC proceeds to block 238 in FIG. 9 where the attendant activates the cycle start button and the part program begins at the selected sequence number.

If it is found that there is no project plate in the spindle at block 220, a check is made at block 240 to see if there is a project plate in the queue station. As in the case of the determination of whether there is a project plate on the spindle, the condition of one or more microswitches may be sensed to determine if a project plate is present in the queue station. If there is a project plate in the queue station, then a check is made in the MCL file index at block 242 to see if there is a Q1TRAN file indicating that the project plate in question is in the queue station. If there is no transfer file named Q1TRAN, an out of synch display is made at block 224 as described above.

If the project plate in the queue station is in synch with the contents of the part status table, then at block 244 the program causes the part number and operation number tables for the project plate in the queue station to be read to ascertain which part program is called for to machine the workpiece mounted on the project plate in the queue station. Block 246 then checks if the part program called for by the part number and operation number tables is available at block 246 in a manner similar to that of block 228. If it is not, then the display of block 230 is made and the work station waits for the program to become available by the program returning to block 218. If it is found that the part program is available at block 246, then that part program is selected at block 248 and the program continues in FIG. 9 beginning at a point labeled "C".

If no project plate is sensed in the queue station at block 240, the CNC senses if there is a project plate in the transfer station at block 250. If there is, then the CNC checks to see if a transfer file named PUTRAN is present indicating that the work piece has been machined at least partially. If there is no PUTRAN file, the CNC checks at block 254 to see if there is a transfer file named DETRAN indicating that the workpiece has not been machined and is in the transfer station waiting to be processed. If neither a PUTRAN file nor a DETRAN file is present, then an out of synch display is made at block 224. If a DETRAN file is present, then the part number and operation number tables are read at block 256, which indicates which part program is to be run to accomplish the machining desired for the workpiece on the project plate in the transfer station. After the part number and operation number tables have been read, the controller then determines at block 258 whether or not the desired program is available. If it is not, then the message of block 230 is displayed and sent to the host and the work station awaits the availability of the desired program by virtue of the program returning to block 218. If the desired program is available, then it is selected at block 260.

If there is no project plate in the transfer station, as determined at block 250, then a project plate delivery expected flag is set at block 262 and a call is made at block 264 to a subroutine (shown in FIG. 27 and described below) which monitors AGV servicing of the work station. The AGV service monitor keeps track of when a delivery of a project plate is completed, among other things, and clears the project plate delivery expected flag when this is accomplished. When a project plate has been delivered to the transfer station, the clearance of the project plate delivery expected flag is sensed by block 266 and the program returns to block 250. Before that flag is cleared, the operation of block 266 causes the program to wait for the clearance of the flag as is apparent from FIG. 8.

After the desired part program has been selected at either block 248 or 260, the CNC automatically designates appropriate blocks or program steps (sequence numbers) to be skipped in execution of the selected part program. The program steps which may be skipped have been prefixed by the part programmer with a special symbol. When a block delete switch on the CNC is turned on, it causes the CNC to skip the program steps which have been prefixed with the special block delete symbol. In the G.E. MC2000 control, there are nine different symbols or levels of block deletes. Block deletes are turned on when the program has been run within a preselected time prior to the time it is now to be run. Normally, a part program has associated with it a series of blocks or program steps relating to things such as tool or probe tip offsetting. See, for example, U.S. Pat. No. 4,382,215 for details of these operations. If the part program is to be run repeatedly within a short span of time, then some steps such as these calibration steps do not have to be repeated each time the part program is run. In that case, it would be appropriate to skip the unnecessary blocks in the part program when it is run again.

The circuitry to perform automatic block delete operations is represented by the flow chart or logic diagram shown in FIG. 9. Before describing the operation of the circuitry of FIG. 9, it must be noted that the CNC stores recently run program tables which indicate the recent past history of machining done by the work station. The recently run program table contains the program identification number, a program description (which may associate the program with a drawing number or a particular kind of machining cut, for example). the nature of the block deletes to be made after the first part in a lot is machined, the number of parts machined since the last sample part was inspected, and the time and date at the last completion of the program which is signified by an M30 code at the end of the program. A predetermined number of sets of this kind of data should be allowed for, such as provision of enough memory space to accommodate these kinds of data for twelve most recently run programs.

After a desired program is selected in either block 248 or block 260, the controller reads a program identification number associated with that program at block 270. The CNC then searches a recently run programs table containing program identification numbers associated with part programs that have been run within a predetermined time prior to the present time and looks for the identification of the now selected program to see if it has been run recently. If a match is not found at block 272, then all block deletes are switched off at block 274 and a tool search made flag is cleared.

If a match is found at block 272, then selected machine set up data codes are read at block 276. More specifically, the lapsed time allowed between running of the selected program without block deletes is read along with the time and date of the last completion of the selected program (occurrence of an M30 code which signifies the completion of the program). The lapsed time since the last completion of the selected program is then computed. If the selected program has not been run within the allowed lapsed time read at block 276, then at block 278 a decision is made to switch off all block deletes and to clear the tool search made flag, which is accomplished at block 274.

If the selected program has been run within the lapsed time, then block deletes are turned on at block 280 in accordance with the position of the program identification in the recently run program table. Several different levels of block deletes may be provided for depending on the position of the program identification number in the table. For example, one level of block deletes may skip program steps for both tool and probe tip offsetting. Another level of block deletes may skip program steps for only initial tool offsetting. The selection of the level of block deletes, or the selection of which block deletes are made in certain circumstances, is determined by which program steps are unnecessary in light of the past history of the running of the selected program.

After the block deletes have been set in block 280, a check is made in block 282 to see if machine tool control in the work station is in single mode. Single mode means that the control will only execute a single part program command statement, i.e. one single line of code, and then stop. If the control is in single mode, it stops at block 284, and the attendant must push the cycle start button at block 238 to begin running the program. If the control is not in single mode at block 282, it is assumed to be in auto mode, which causes it to execute one part program command statement after another as fast as it can. Then cycle start is automatically activated at block 286 and the running of the program begins. Alternatively, cycle start may be directly activated in block 286 after block deletes have been switched off and the tool search made flag has been cleared in block 274, without the test of block 282, the stop of block 284, and the attendant activation of cycle start in block 238.

Figure 10:
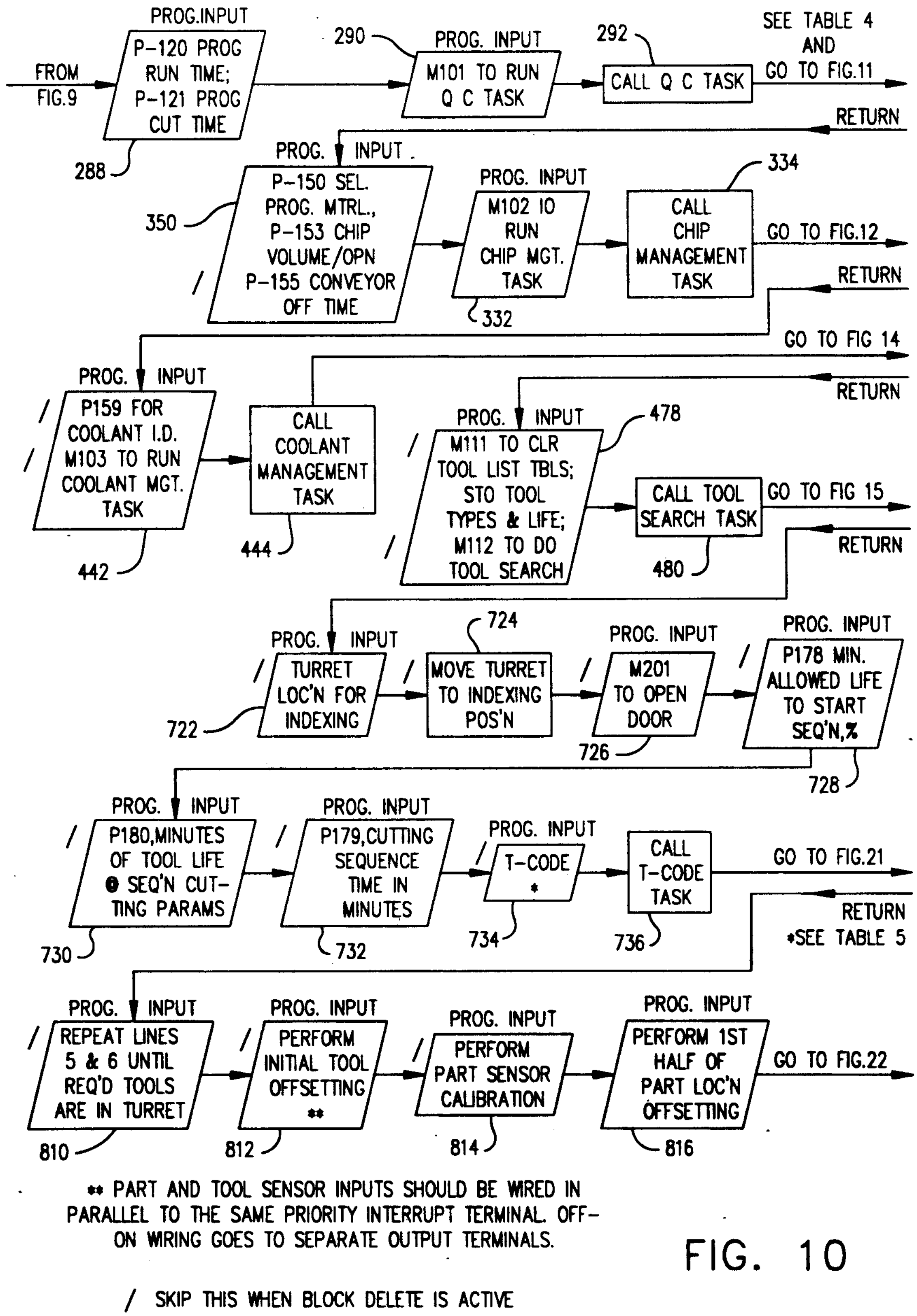

The beginning of the part program is shown in FIG. 10. First, the amount of time needed to run the program is input by the program at block 288 by way of a P120 code. Also at block 288, the program inputs the amount of time the work station will actually be performing a cutting operation during the execution of the program by means of a P121 code. At block 290, the program inputs a command (an M101 code) to run a quality control subroutine. A quality control subroutine is called at block 292.

Before describing the quality control subroutine, it should be pointed that all part programs are described by a drawing number which associates the program with a blueprint describing the nature of a finished workpiece to be produced by the part program. Also associated with each part program is an operation number which indicates the nature of the machining operation to be accomplished by the part program. For example, the program may be for performing a rough cut on the fore end of a workpiece, a rough cut on the aft end of the workpiece, or a finishing cut on either the fore or aft ends of the workpiece. The part program descriptions also include the date when the program was last revised and a program status code.

The program status code may indicate one of several conditions for the part program. An approved status (APD) indicates that the program has been approved for use in automatic machining and may be automatically downloaded from the host to the work station. This status indicates that the program has been used and checked enough times so that there is confidence that it will reliably produce desired results. This is not to say that the performance of the program should not be monitored. An inspection plan should be put in place to check the performance of the work station using the part program. By way of example, the first part made using a new tool magazine may be designated for inspection at one of the verification stations described above. Thereafter, a number of samples per unit time, for example, one machined part sent to verification every "n" hours of machining, or a number of samples per specified number of workpieces machined, for example, every "nth" machined part sent to verification regardless of time, will be designated for verification unless the tool magazine is changed or a disposition code, associated with the part and assigned to the part by the work station at the completion of machining, is changed deliberately by an attendant. In one case, the transfer file will specify a number called a verification interval in hours and, in the other case, the program will specify a verification interval in terms of a number of workpieces, which are used to determine which machined parts are given a disposition code indicating that they are to be sent to verification.

Another program status code is unapproved (UNA) which is assigned to part programs, which have been developed and debugged and for which there is no historical production record. A certain number of parts must be machined and checked before this program will be given approved (APD) status. A program with UNA status may be automatically down loaded. Each part machined with an unapproved (UNA) program is assigned for verification until a quantity of parts indicated by a transfer file specified APPROVAL QUANTITY is machined with the unapproved part program. The transfer file also specifies a number called a QUANTITY PENDING RESULTS which is a quantity of parts a work station may machine after the APPROVAL QUANTITY is reached while awaiting inspection results for sample parts sent to verification. After the QUANTITY PENDING RESULTS has been machined, the work station is prevented from machining any more parts of a type represented by a predetermined drawing and operation number before inspection results are obtained.

Yet another program status code may be a tryout status (TRY). In a program having this status, which program must be manually downloaded, the attendant must manually code the disposition table for the part machined with one of these programs if it is desired to inspect the part. Otherwise, the work station will code the part for scrap. Also, actual machining is not required for a program with this status. In order for actual machining to occur, a part that is to be machined must be manually scheduled in the host.

A superseded status (SSD) may also be established for part programs. This status is for previously approved programs which can only be manually downloaded.

Figure 11:
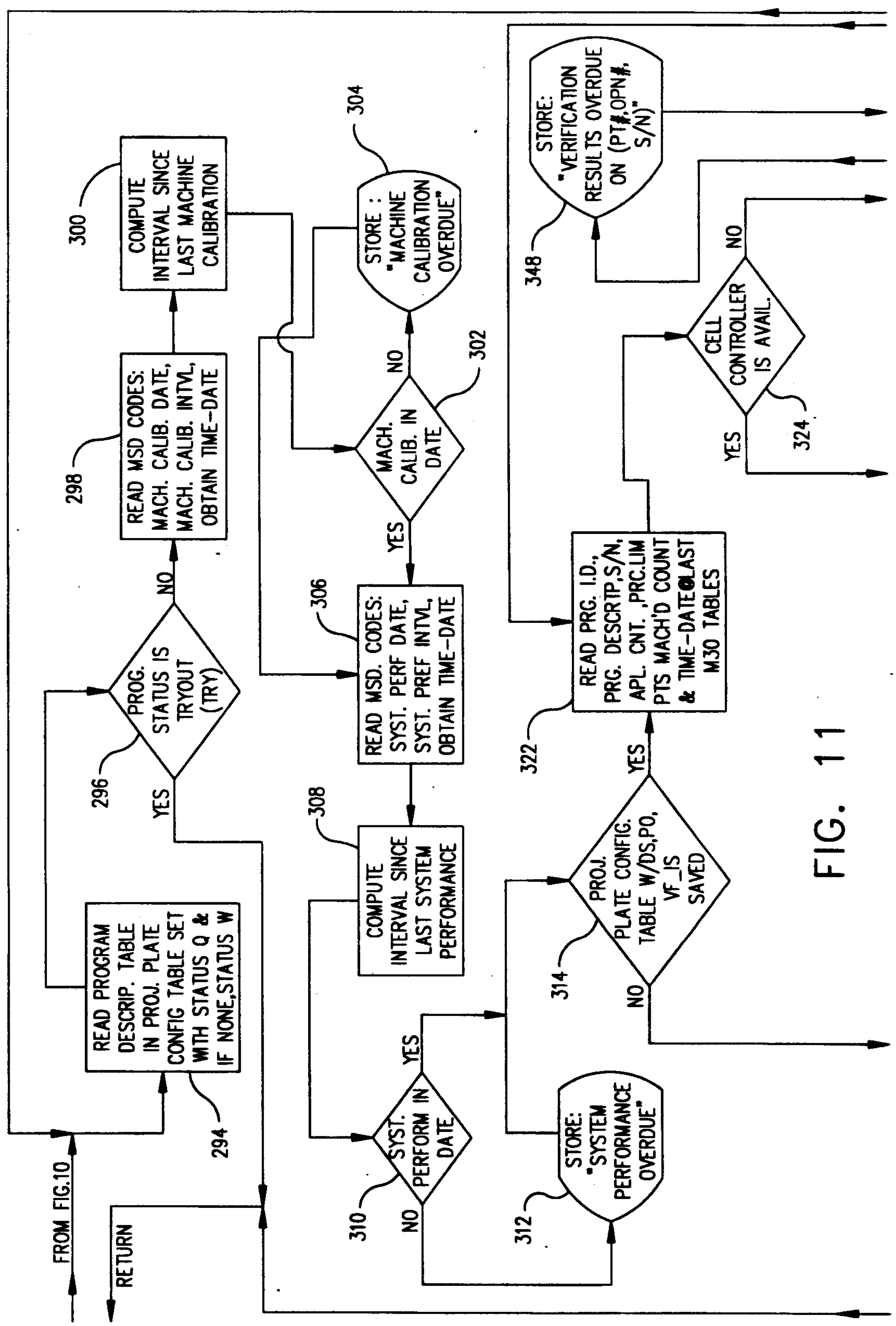
Figure 11A:
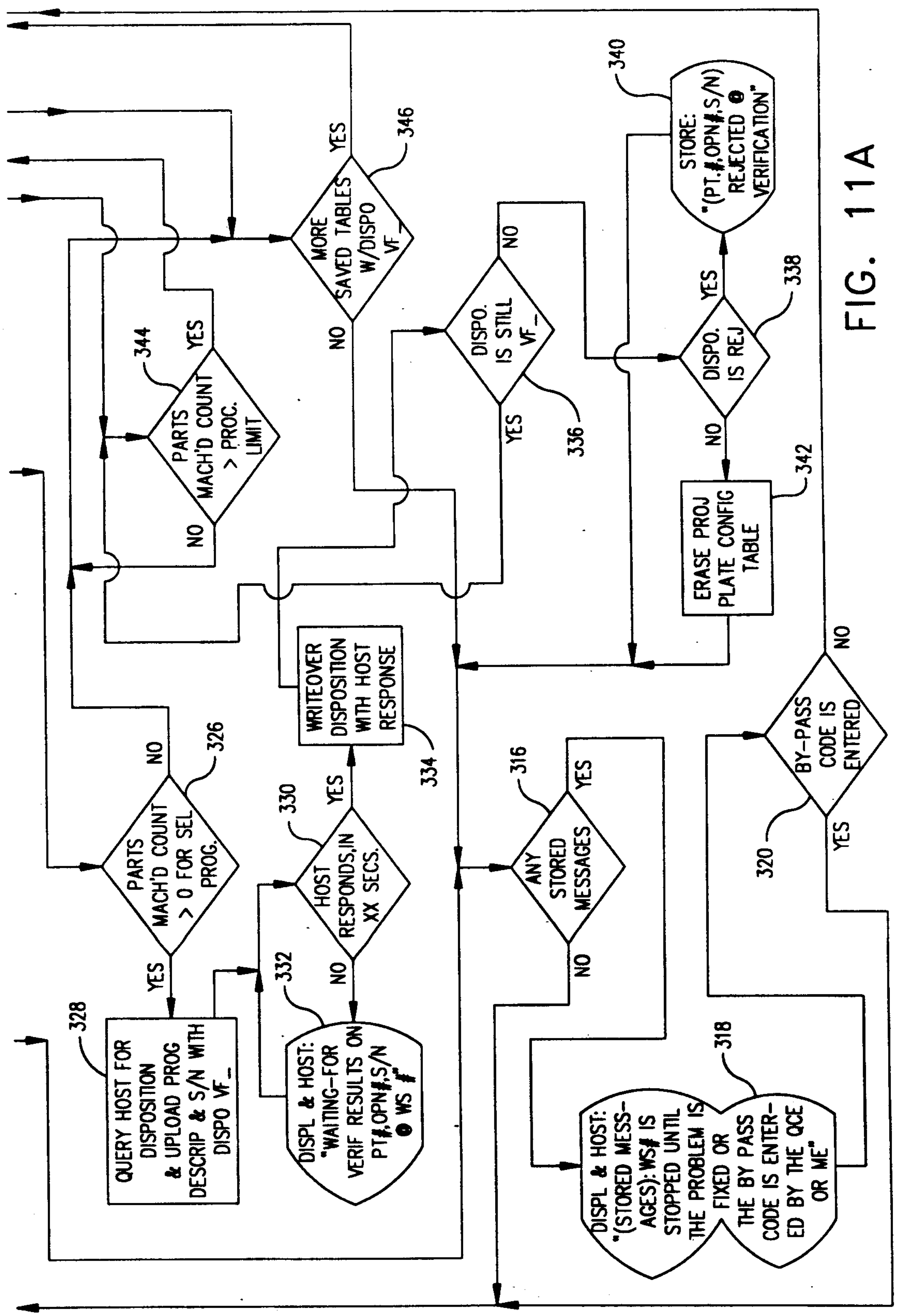

FIG. 11 is a flow chart or logic diagram representing the quality control subroutine called by the part program in FIG. 10. The first step in this subroutine occurs at block 294 and comprises checking for the presence of a Q1TRAN transfer file. If there is no Q1TRAN transfer file, then a check is made for the presence of a DETRAN transfer file. (One or the other of a Q1TRAN file or a DETRAN file must be present.) A determination then is made at block 296 as to whether the status of the program corresponding to the Q1TRAN or DETRAN file found above at block 294 is tryout status (TRY). If so, the quality control subroutine is exited and the program returns to the part program in FIG. 10.

If the part program is not in a tryout status, then selected MSD codes are read at block 298, including the date the machine was last calibrated and the allowed interval between calibrations. The current time and date are also obtained at this block. The interval since the last machine calibration, which may be a check of the x- and z-axes of the machine using a laser interferometer, is then computed at block 300. At block 302, a check is made to see if the machine is in need of calibration, in other words, to see if the machine was calibrated within the calibration interval prior to the present time. If the machine is in need of calibration, a message shown in block 304 to that effect is stored in the CNC for display later in the subroutine and the program proceeds to block 306.

If the machine is not in need of calibration, then the program proceeds directly to block 306 from block 302. At block 306, selected MSD codes are read including the date the last system performance check, which may be the actual measurement of an object similar to an actual part and having precisely known dimensions and which may involve comparison of the measured dimensions to the known dimensions, was made and the desired interval between system performance checks. The current time and date are also obtained at this time. Next, in block 308, the interval since the last system performance check was made is computed. It is then determined at block 310 whether or not the machine is in need of a system performance check. If so, the message of block 312 to that effect is stored by the CNC for display later in the subroutine and the program proceeds to block 314.

In block 314, a determination is made as to whether there is a previous part represented by the same drawing and operation number with a VF_workpiece status designation. After each part is machined, the work station assigns a disposition to the part by coding its transfer file accordingly. A VF_code signifies that the part is to be sent to verification to see if it has been machined to dimensions that are within desired tolerances. After the part leaves the work station, the CNC keeps a record of that part in its verify file. In block 314, the program is looking to see if any previously machined parts have been designated for verification.

If no such verification parts are found in a verify file, then a determination is made at block 316 as to whether or not there are any messages that have been stored earlier in the subroutine. If not, the subroutine is exited and the controller returns to where the part program called the subroutine of FIG. 10. If there are stored messages, they are displayed at block 318. Also at block 318, a message to the effect that the work station is stopped pending a resolution of the problem or the entry of a bypass code by a quality control engineer or a manufacturing engineer. If such code is entered as determined at block 320, then the subroutine is exited and the program returns to the part program of FIG. 10. If the code is not entered, the subroutine loops back to block 294 where the execution of the subroutine of FIG. 10 is begun anew.

If there is a record of a verification part in the verify file, as determined at block 314, then the identification number of that program, its description, serial number, approval count, quantity pending results, parts machined count, and the time and date at the last completion of that program is read at block 322. If the cell controller is available as determined at block 324, a check is made at block 326 as to whether the program being looked at has machined any parts. If so, the host is asked at block 328 for the disposition of the part, which will change from a VF_disposition based on the verification results for the part. The work station waits for the host to respond via block 330; the "no" route from block 330 to block 332 causes a display that the work station is waiting and a signal to the host to that effect. Once the host responds, the subroutine takes the "yes" route from block 330 and causes the program to write over the stored disposition with the response from the host at block 334. The disposition then is checked at block 336 to see if the host response has changed the disposition. If it has, then a check is made at block 338 to see if the disposition is now to reject the part. If so, a message to that effect is stored at block 340 and the subroutine proceeds to block 316 where the message is displayed and the machine is stopped unless corrective action is taken or a bypass code is entered, as described above in connection with the description of blocks 316, 318, and 320. If the new disposition is changed from VF_, but is not a reject, then the project plate configuration table being considered is erased at block 342 and the subroutine proceeds to block 316 and performs the operations described above in blocks 316, 318, and 320.

If the cell controller is unavailable as determined at block 324 or the disposition is unchanged by a response from the host as determined in block 336, a check is made at block 344 to see if the number of parts machined exceeds the quantity pending results. If not, a check is made at block 346 to see if there are more parts in the verify file. If so, the subroutine loops back to block 322 and repeats operations described above. If there are no more such verification parts, the program proceeds to block 316 and operates as previously described. If the number of parts machined does exceed the processing limit as determined at block 344, then a message to the effect that verification results are overdue is stored at block 348 and the subroutine proceeds to block 346 to accomplish results previously described.

This completes the description of the quality control subroutine of FIG. 11. It should be apparent that the subroutine of FIG. 11 insures that the work station is calibrated and undergoes system performance checks and that verification results are received in a timely fashion.

After completion of the quality control subroutine of FIG. 11, the controller returns to the part program in FIG. 10 at block 350. Here the part program enters a code (P150) indicating the kind of material that is to be machined by the work station in executing the part program. It also enters a code (P153) indicating the chip volume expected to be produced by the machining operations to be performed in connection with execution of the part program, a code (P154) indicating the chip conveyor off duty time in minutes and a code (P155) indicating the allowable machine running time in minutes with the chip conveyor off. The part program enters a code (M102) to run a chip management subroutine, shown in FIG. 12, at block 332. The part program actually calls that subroutine at block 334.

Figure 12:
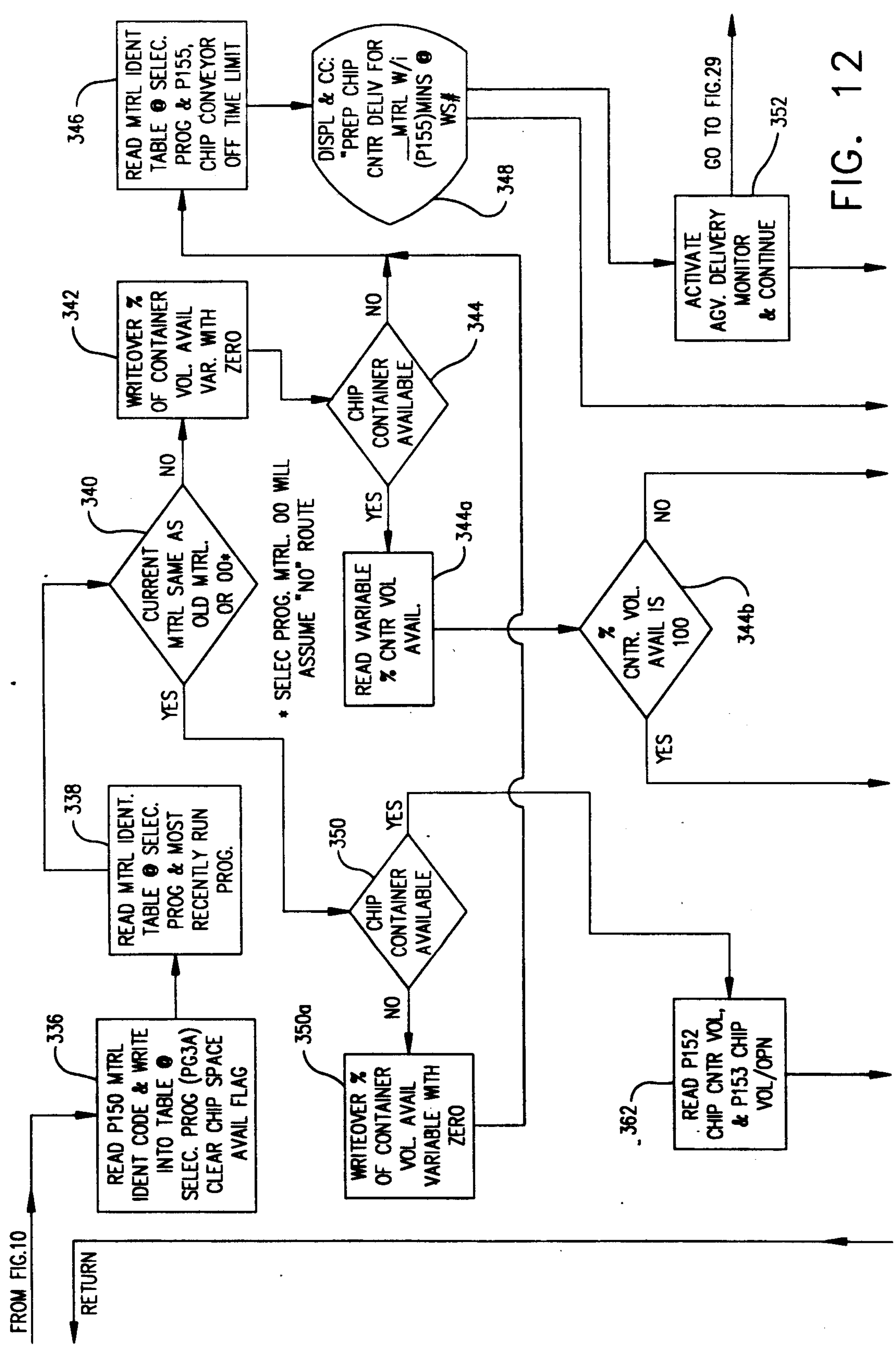
Figure 12A:
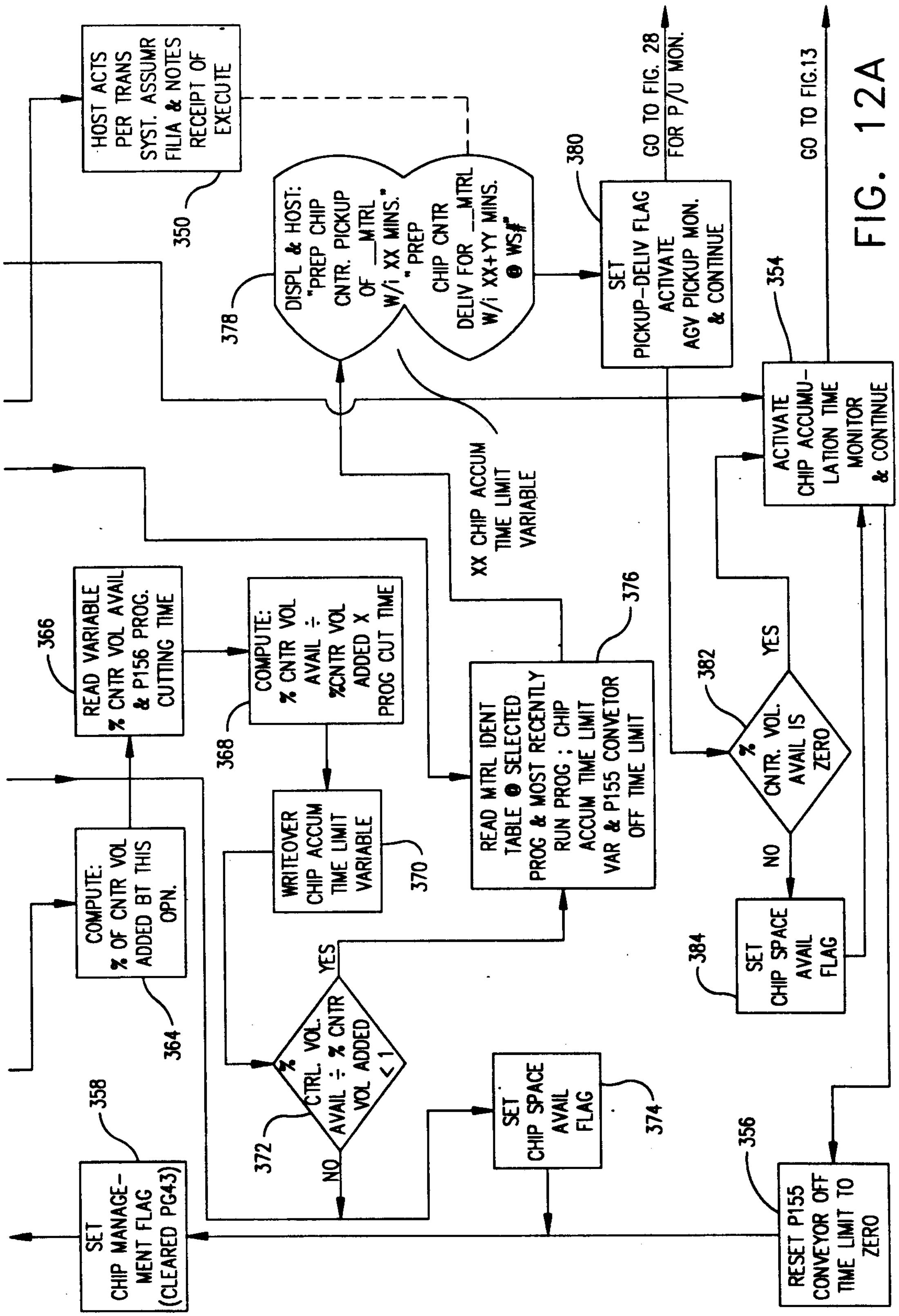

A flow chart in FIG. 12 represents the operation of the chip management subroutine. Basically, the chip conveyor runs whenever the part program commands it to do so by means of an M203 code inserted in the program by the part programmer. However, to reduce wear and tear on the chip conveyor and to lessen the amount of coolant dumped into the chip container, the chip conveyor is run only intermittently, defined by a code in the program specifying the off duty cycle of the conveyor, the P154 code mentioned above. Also, if there is no chip bucket present in the machine, or if the bucket contains material differing from the material being produced by the current machining operation, the control overrides the M203 command and prevents the chip conveyor from running until the container has been brought to the work station or has been changed. The conveyor is allowed to run for a period of time defined by the P155 code in the program mentioned above. The logic of the chip management subroutine begins at block 336 where the material identification code for the program now being run is read and is written into the appropriate location in the most recently run program table referred to in connection with the description of FIG. 9. Data for that table regarding the program now being run has already been entered in an appropriate place in the most recently run program table. A chip space available flag is also cleared at block 336.

At block 338, the chip management subroutine reads the material identification code for the program now to be run and for the most recent previously run program. Block 340 checks to see if the material to be machined in the program now to be run is the same as the material machined in the most recent previously run program by comparing the material identification codes for those programs. A "00" in the material identification code signifies that the chip container is to be picked up, emptied, and returned. If it is found that the material to be machined is not the same as the material previously machined, or if the material identification code is "00", then a value indicating the percentage of the chip container volume that is empty is written over with zero at block 342 and a check is made at block 344 to see if a chip container is in the work station. This check may be accomplished by sensing the condition of a microswitch which opens and closes in response to the presence of a chip container properly seated in the appropriate location in the work station for receipt of chips produced in the machining process.

If a chip container is present, then the material identification code for the program now to be run is read at block 346. The chip conveyor off time limit value, that is, the maximum machine running time with the chip conveyor off (P155 code) is also read at this block. The program at block 348 then displays a message at the work station and sends a corresponding request to the cell controller to the effect that preparations should be made to deliver a chip container to the work station for the new material within a predetermined amount of time indicated by the value of the chip conveyor off time limit P155. The host then acts upon the request at block 350 in accordance with transportation system assumptions described below and waits for the receipt of an execute command to pick up an old container and deliver a new one.

Figure 29:
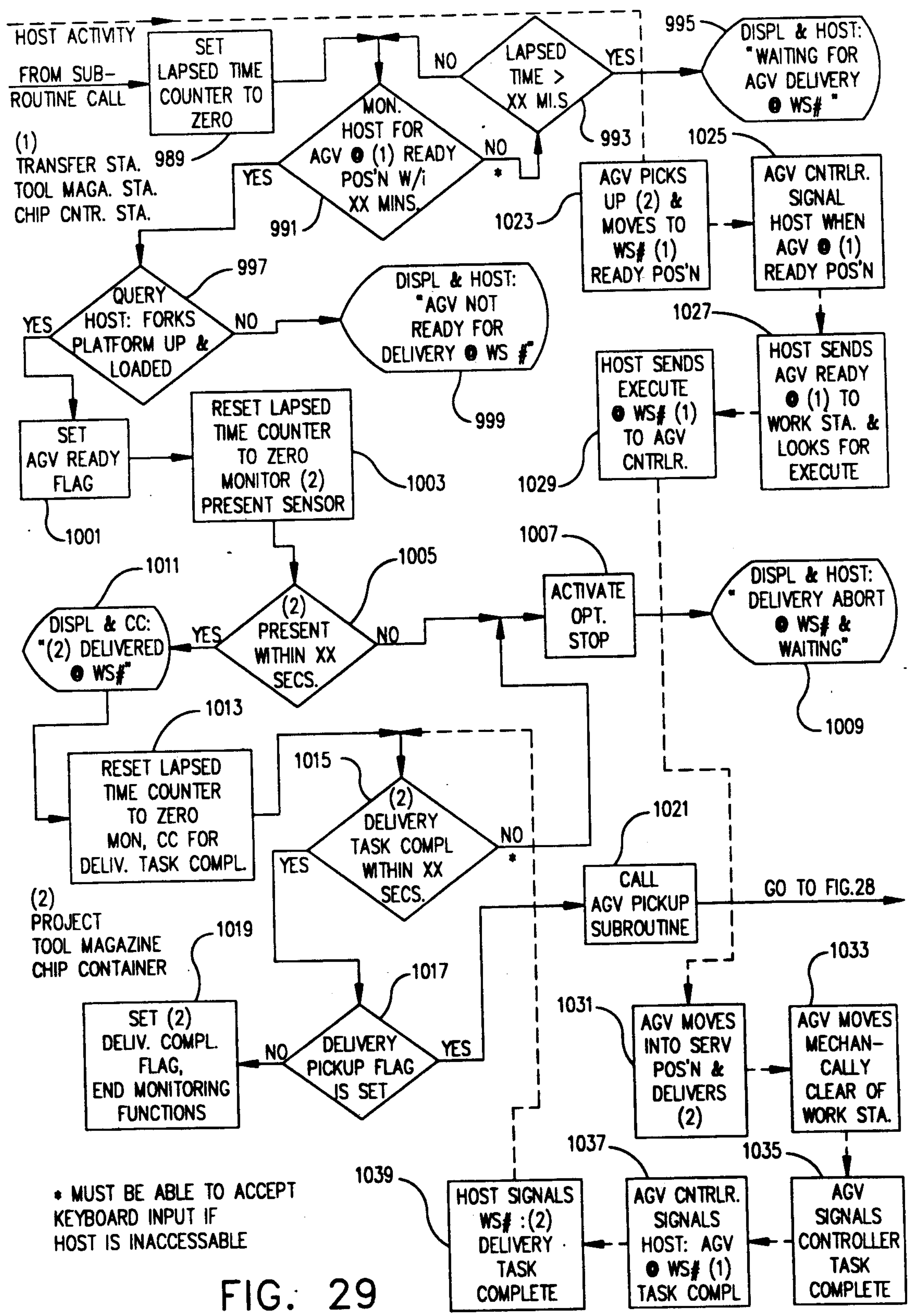

If a chip container is not in the work station, as determined at block 344, then the subroutine of FIG. 12 proceeds to activate an AGV delivery monitor at block 352 and a chip accumulation time monitor (FIG. 13) at block 354. The AGV delivery monitor is described more fully below and is shown in FIG. 29. The subroutine of FIG. 12 continues by resetting the chip conveyor off time limit to zero at block 356, setting a chip management flag at block 558, and returning to the part program in FIG. 10 to the place where the chip management subroutine was called.

If at block 340 it is found that the material to be machined by the part program to be run now is the same as that machined by the immediately previous program, then a check is made at block 360 to determine if a chip container is in the work station. If not, the subroutine proceeds to block 352 and begins the process of obtaining a chip container by way of block 348.

If there is a chip container in the work station as determined at block 360, then the parameter indicating the volume of the chip container (P152) is read at block 362 along with the code P153 indicating how much of the chip container is expected to be filled by the machining operation performed by execution of this part program. At block 364, the subroutine computes the percentage of the container that will be filled by the machining operation, that is, P153 divided by P152. Next, a variable relating to the percentage of the container which is empty and a parameter representing the amount of time spent actually cutting during the execution of the part program (P156) are read at block 366. At block 368, the amount of time the work station can perform machining before the chip container fills is computed, that is, the percentage of the chip container which is empty from block 366 divided by the result of the computation in block 364 times the program cutting time P156. The chip accumulation time limit variable, which indicates the length of time the machine can run with the chip container currently at the work station, is overwritten with the result of this computation in block 370.

A check then is made at block 372 to see if the machining operation called for by this part program may be completed without the chip container becoming full. This is accomplished by observing the result of dividing the percentage of the container that is empty by the amount of the container expected to be filled by the machining operation to be performed by this part program as shown in block 372, to see if that result is less than one. If the result of the division is greater than or equal to one, indicating that the container in the work station will hold all the chips produced by this part program, then the subroutine sets a flag, hereafter referred to as a chip space available flag at block 374 and returns to the part program by way of block 358 as explained above.

If the container in the work station will not hold all the chips that will be produced, as determined at block 372, then the material identification codes of the program to be run now and the program that was most recently run are read at block 376. The chip accumulation time limit variable, computed at block 368 and recorded at block 370, and the maximum machine running time with the chip conveyor off (P155 parameter) are also read at this block. As indicated in block 378, a message is then displayed at the work station and a request is sent to the host to prepare to pick up the chip container in the work station within a predetermined time set by the chip accumulation time limit variable. As also indicated in block 378, a message is displayed at the work station and a request is sent to the host to prepare for delivery of an appropriate chip container within a predetermined time indicated by the sum of the chip accumulation time limit variable and the maximum machine running time with the chip conveyor off parameter P155. The host acts on the requests in block 350 as described above.

After these messages and requests, the subroutine sets a pick up delivery flag and activates an AGV pickup monitor at block 380 described below and shown in FIG. 28. The subroutine of FIG. 12 proceeds to block 382 where a determination is made as to whether the chip container is full. If it is full, the chip accumulation time monitor (FIG. 13) is activated at block 354 and the subroutine performs the operations of blocks 356 and 358 as described above and returns to the part program. If the chip container is not full, the chip space available flag is set in block 384 and the chip accumulation time monitor is activated in block 354 with the subroutine returning to the part program via blocks 356 and 358.

Figure 13:
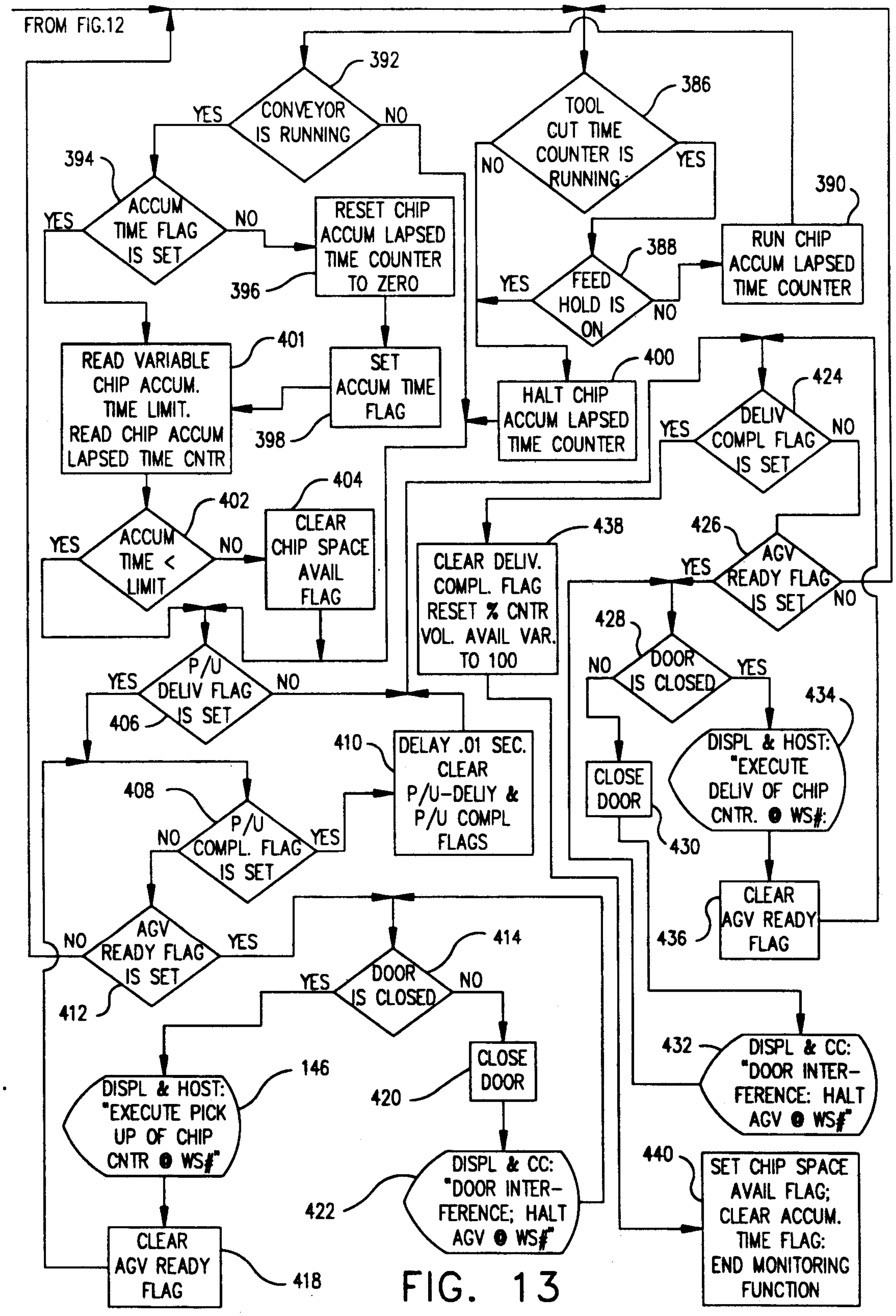

The chip accumulation time monitor is a subroutine shown in detail in FIG. 13 and is accessed by block 354 in the chip management subroutine depicted in FIG. 12. The chip accumulation time monitor runs a chip accumulation time counter whenever the machine is running and the chip conveyor is stopped. The chip accumulation time monitor stops the chip accumulation time counter when both the machine and conveyor are running, as well as when the machine is stopped. When the chip accumulation time counter is running, it compares the lapsed time with a chip accumulation time limit. When the lapsed time exceeds the time limit (note FIG. 13, block 402), the chip space available flag is cleared, stopping the conveyor (note FIG. 36, block 1096) and starting a conveyor off time monitor (note FIG. 36, block 1130). The first step in this subroutine is a check in block 386 to see if the work station is machining. This is accomplished by detecting whether or not a tool cut time counter is running. This counter is counting whenever machining is taking place. If the work station is machining, then a check is made at block 388 to see if the work station is in a feed hold condition in which the slides moving the turret to machine a work piece are being held and prevented from moving for some reason. If the work station is not in a feed hold condition, a chip accumulation lapsed time counter is run at block 390.

A check then is made at block 392 to see if the chip conveyor is running. This may be accomplished in any of a variety of well known techniques for sensing whether or not a mechanical apparatus is operating. For example, on or off condition of a switch connecting the drive mechanism for the conveyor to a source of electrical energy may be sensed. If the conveyor is running, then a check is made at block 394 to see if an accumulation time flag is set. The accumulation time flag is an indicator which tells the software to either continue accumulating time (flag set) or to reset to zero the lapsed time counter (flag not set) and start counting over again. If it is not set, the chip accumulation lapsed time counter is reset to zero in block 396 and the accumulation time flag is set in block 398.

If the tool cut time counter is not running as determined at block 386, or if the work station is in a feed hold condition as determined at block 388, then the chip accumulation lapsed time counter is halted in block 400. If the accumulation time flag is set, as determined at block 394, or after the accumulation time flag has been set in block 398, then the chip accumulation time limit and the chip accumulation lapsed time counter are read at block 401. The chip accumulation time limit (value of P155) is the length of time the machine can run with the chip conveyor off. Next, a check is made in block 402 to see if the accumulation time, as reflected by the state of the chip accumulation lapsed time counter, is less than the chip accumulation time limit. If not, the chip space available flag is cleared in block 404.

If the conveyor is not running as determined at block 392, if the chip accumulation lapsed time counter has been halted in block 400, if the chip space available flag has been cleared in block 404, or if it has been determined at block 402 that the accumulation time is less than the accumulation time limit, then a check is made at block 406 to see if the pick up delivery flag is set. This flag is set at block 380, FIG. 12, and signifies that a chip container pickup and delivery have been requested from the host. If it is set, a check is made at block 408 to see if the pick up completed flag is set. This flag is set by the AGV pickup monitor, FIG. 28, upon a signal from the host that pickup is completed and a signal from the presence/seated sensors that the pickup location has been emptied. If the pickup completed flag is set, the program delays for a predetermined time, for example, 0.01 seconds, and then clears the pick up delivery flag and the pick up completed flag at block 410.

If the pick up completed flag is not set at block 408, then a check is made at block 412 to see if an AGV ready flag is set. The AGV ready flag is set by the AGV pickup monitor upon signal from the host that an AGV is present at a location near the work station and is ready for the requested activity. If the AGV ready flag is not set, the subroutine of FIG. 13 returns to block 386. If the AGV ready flag is set, then a check is made at block 414 to see if there is any obstruction to an AGV making a pick up of the chip container. One possible obstruction would be a matching safety door which opens into the path of the forked AGV coming in to pick up the chip container when it is positioned for the receipt of chips. Any attempt to remove the container would damage the door. Of course, if the arrangement of the chip container and the chip conveyor is such that there is no such door or any other obstruction which would interfere with pickup of the container, then the steps of the subroutine being described for checking for an obstruction may be dispensed with.

If there is no obstruction, that is, if the "yes" route is followed from block 414, then a message is displayed, and a request is sent to the host, at block 416, to the effect that pickup of the chip container should be executed at the work station. Thereafter, the AGV ready flag is cleared at block 418 and the subroutine of FIG. 13 returns to block 408. If the obstruction is present, that is, if the subroutine follows the "no" route at block 414, then a command is issued at block 420 to remove the obstruction, for example, to close the chip door. Then, at block 422, a message is displayed, and a corresponding message is sent to the cell controller, that there is interference with the pickup of the chip container and that the AGV making the pick up should be halted, whereupon the subroutine returns to block 414 to monitor whether the obstruction is removed.

If the pick up delivery flag is not set, as determined at block 406, a check is made at block 424 as to whether a delivery complete flag is set. If it is not set, meaning that no delivery of a chip container has been made, then a check is made at block 426 to see if the AGV ready flag is set. If not, the subroutine returns to block 386. If it is set, a check is made at block 428 to see if there is an obstruction, that is, a check to see if the chip door is closed or the like. If the door is not closed, the subroutine commands the work station to close it in block 430. A message is displayed at the work station that there is door interference, and a request is sent at block 432 to the cell controller to halt the AGV which is to make a delivery of a chip container, at which time the subroutine of FIG. 13 returns to block 428 to continue monitoring whether or not there is an obstruction preventing proper delivery of a chip container.

When the obstruction is not present, as indicated by the "yes" route from block 428, then a message is displayed at the work station pursuant to block 434, and a request is made of the host, to the effect that a delivery of a chip container should be made to the work station. Afterwards, the AGV ready flag is cleared at block 436 and the subroutine returns to block 424.

When delivery of a chip container has been accomplished, as determined at block 424, block 438 directs that the delivery complete flag be cleared and the percentage of the container volume available variable be reset to 100, meaning that an empty chip container is in the work station. Then, block 440 sets the chip space available flag, clears the accumulated time flag, and ends the chip accumulated time monitoring function of the FIG. 13 subroutine.

When the program returns to the part program in FIG. 10 after having completed the chip management task called at block 334, the part program inputs a coolant identification code (P159) at block 442 and a code (M103) signifying that a coolant management task is to be run. The coolant management task is actually called at block 444 in the part program.

Figure 14:
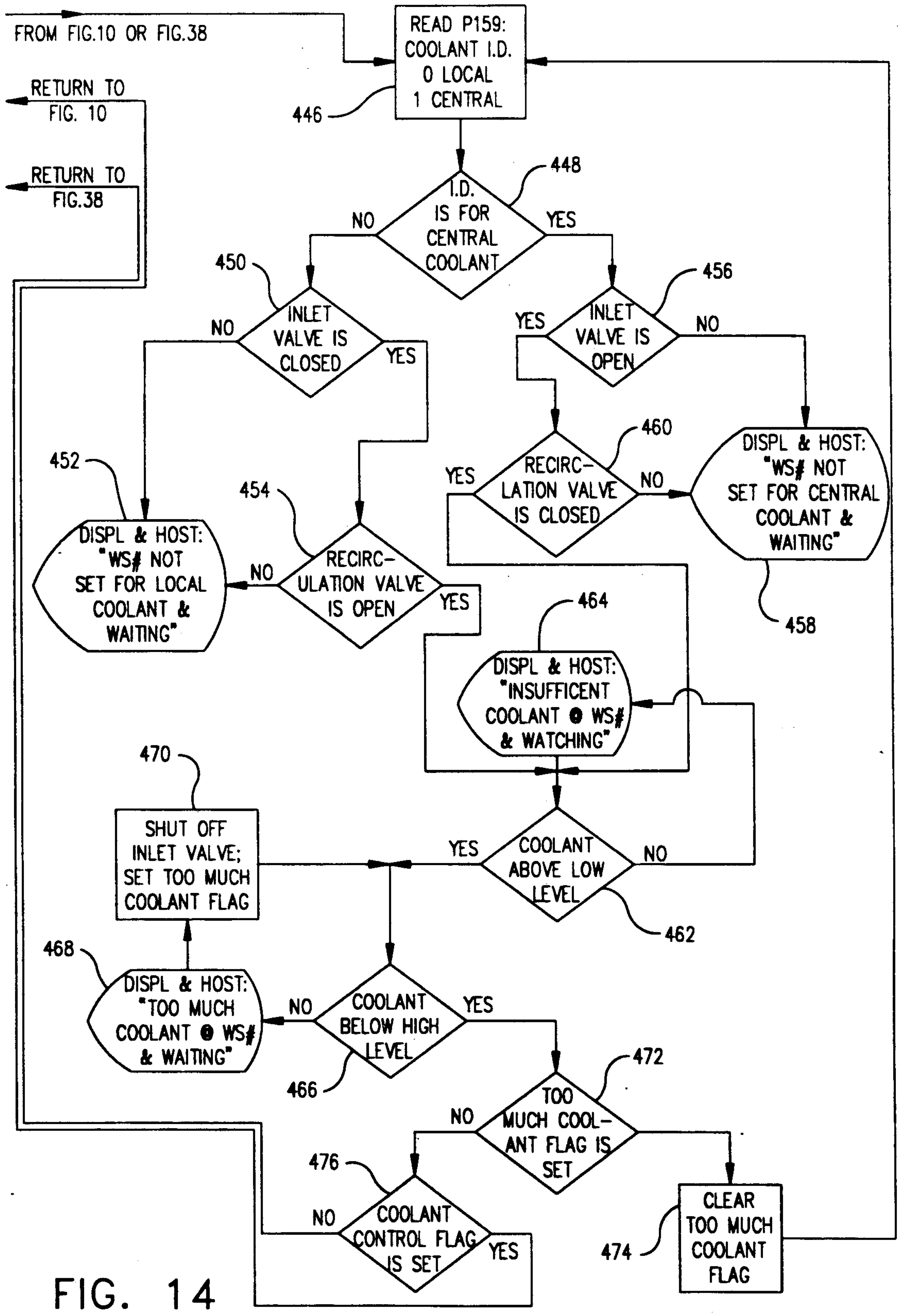

FIG. 14 shows the coolant management task or subroutine. This subroutine checks, using P159, if the program requires local or central coolant; it checks that valves are set for the required coolant source; and it checks that the coolant level in the machine sump is neither too high nor too low. As is commonly done in machining, coolant is sprayed on the work piece and tool during cutting operations to prevent damaging heat buildup which may occur because of the machining process. The machining environment is enclosed to prevent coolant from being sprayed in unwanted areas in the production facility. The coolant which is sprayed on the work piece and tool during machining may be drained into a sump and recirculated back to a pump to be again sprayed onto the work piece and tool.

In the example of the invention shown in FIG. 14, it is assumed that coolant may be supplied to the machining environment from one of two sources. One source is a central coolant source for the entire production facility which may directly supply coolant to any of a number of machine sumps. There may be one sump per machine or work station. Each of the machine sumps may be operated independently of the central coolant supply if, for some reason, a special coolant is needed at any particular machine, or if the central coolant source is not operating for some reason.

The coolant source associated with each work station may include a pump compartment and an accumulation reservoir or sump connected together by way of a recirculation valve. The pump compartment is connected to the central coolant supply by means of an inlet valve. It also contains a pump which delivers coolant from the pump reservoir to the machining environment. The accumulation reservoir collects the coolant which has been sprayed into the machining environment and either returns it to the central coolant supply via an overflow drain return line or to the pump compartment via the recirculation valve. When the coolant is being supplied to the work station from the central coolant supply, the inlet valve is open to admit coolant into the pump compartment where it may be pumped to the machining environment. The coolant drains into the accumulation reservoir and returns to the central coolant supply. The recirculation valve is closed to prevent coolant returning from the machining environment from entering the inlet pump compartment. When coolant is being supplied from the dedicated work station coolant supply, the inlet valve is closed and the recirculation valve is open. Coolant thus is pumped from the inlet pump compartment to the machining environment, drained into the accumulation reservoir, and returned to the pump compartment via the recirculation valve where it may be repumped to the machining environment.

The first step at block 446 in the coolant control subroutine of FIG. 14 is to read the coolant identification code (P159) entered by the part program at block 442. The code identifies the desired source of the coolant for the machining operation defined in the part program, either the central factory coolant supply or the work station coolant supply. A check of the coolant identification code then is made at block 448 to see if coolant is to be supplied from the central coolant source or the work station coolant source. If coolant is to be supplied from the work station source, then a check is made at block 450 to see if the inlet valve described above is closed. If it is not, at block 452, the work station displays a message at the work station and sends a message to the host that the work station is not set for coolant being supplied from the work station source and is waiting. If the inlet valve is closed, then a check is made at block 454 to see if the recirculation valve described above is open. If it is not open, the message of block 452 is displayed and sent to the host. If the inlet valve is closed and recirculation valve is open, then the subroutine proceeds to check the level of coolant in the work station coolant source, at block 462.

If the coolant is to be supplied from the central coolant source, as determined at block 448, then a check is made at block 456 to see if the inlet valve is open. If it is not open, a message is displayed at the work station, and sent to the host, at block 458, that the work station is not set for receipt of coolant from the central source and is waiting. If the inlet valve is open at block 456, then a check is made at block 460 to see if the recirculation valve is closed. If not, the display of block 458 is made at the work station and sent to the host. If the recirculation valve is closed, then the subroutine checks coolant level in the supply at block 462.

When it is found that the conditions of the inlet and recirculation valves are correct for receipt of coolant from the designated source, the coolant control subroutine detects whether there is a minimum amount of coolant in the system at block 462. This may be accomplished by provision of a float switch at an appropriate location in the inlet reservoir and sensing the open or closed condition of that switch at block 462. Other known fluid level sensing mechanisms may be used. If the amount of coolant in the system is not above a predetermined low level, then the subroutine at block 464 displays a message at the work station, and sends the message to the host, that there is insufficient coolant and the work station is waiting. The subroutine then returns to the input of block 462 and repeats the check of block 462.

If the coolant level is above the predetermined low level, then a check is made at block 466 to see if the coolant is below a second level higher than the first level. Again, any known fluid level sensing apparatus may be used for this purpose. If the coolant is above the second level, block 468 causes a display at the work station, and the sending of a message to the host, that there is too much coolant. Block 470 then directs that the inlet valve be shut off and a too much coolant flag be set. The subroutine then returns to the input of block 466. If the coolant is below the second predetermined level as determined at block 466, then a check is made to see if the too much coolant flag is set in block 472. If that flag has been set, it is cleared in block 47 and the subroutine returns to block 446 where the subroutine is executed again. If the too much coolant flag has not been set at block 472, a check is made at block 476 to see if a coolant control flag has been set. The coolant control flag indicates, by being set, that something went wrong during coolant flow monitoring, e.g. level too high or too low. If the coolant control flag has been set, the subroutine proceeds to a coolant flow monitoring subroutine described in detail below and shown in FIG. 38. If the coolant control flag has not been set, the subroutine returns to the part program whence it was called.

Once there is a return to the part program, the part program inputs at block 478 an M111 instruction which erases a series of tool list tables stored in the controller. The tool list tables show the tool type required for each cutting sequence or item number in the part program, the minimum % of tool life which must be available on a tool in order to use it for each cutting sequence and the % of tool life consumed by each cutting sequence. Also at block 478, information relating to the types of tools needed to accomplish the cutting operation defined by the part program are stored in the cleared tool list tables. Information relating to the amount of tool life required for each of the needed tools is also stored in these tables. Finally, the part program inputs an M112 instruction which causes a tool search task to be called at block 480. The tool search task essentially determines if there are available to the workstation, in the turret and tool magazine, tools of the proper type having enough useful life to accomplish the cutting sequences defined by the part program. A machining operation is a series of cutting sequences which removes material from the workpiece until a predefined configuration is obtained. A separate machining program is normally required for each machining operation. A typical series of machining operations might be: opn 010, rough forward end; 020 rough aft end; 030 finish forward end; and 040 finish aft end. A cutting sequence or item number is a complete cutting cycle with a single tool, i.e., the machine turret goes from the tool change position to the part, cuts the part, and returns to the tool change position.

Figure 15:
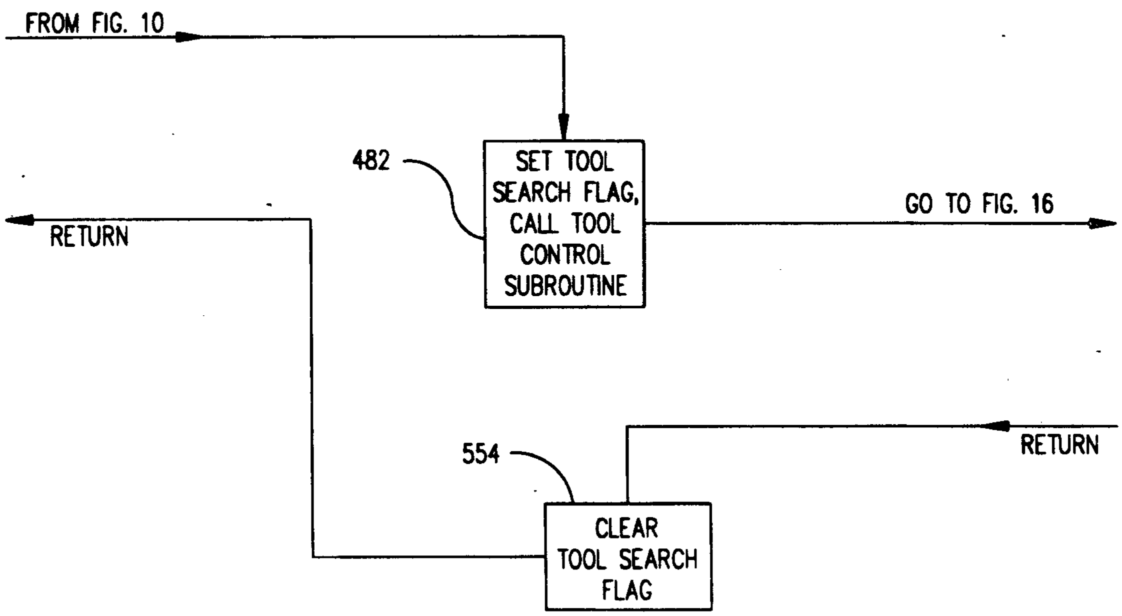
Figure 18:
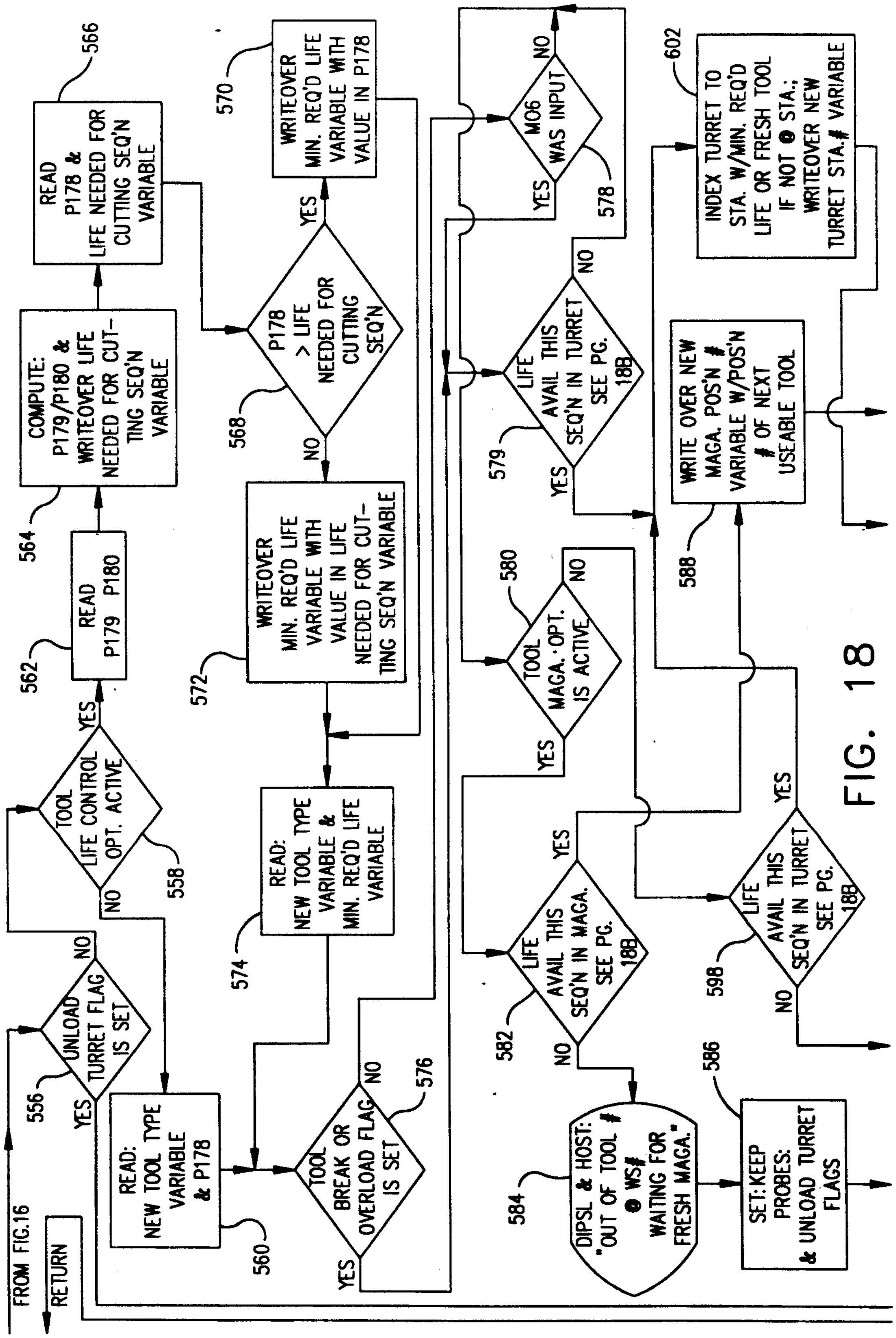
Figure 18A:
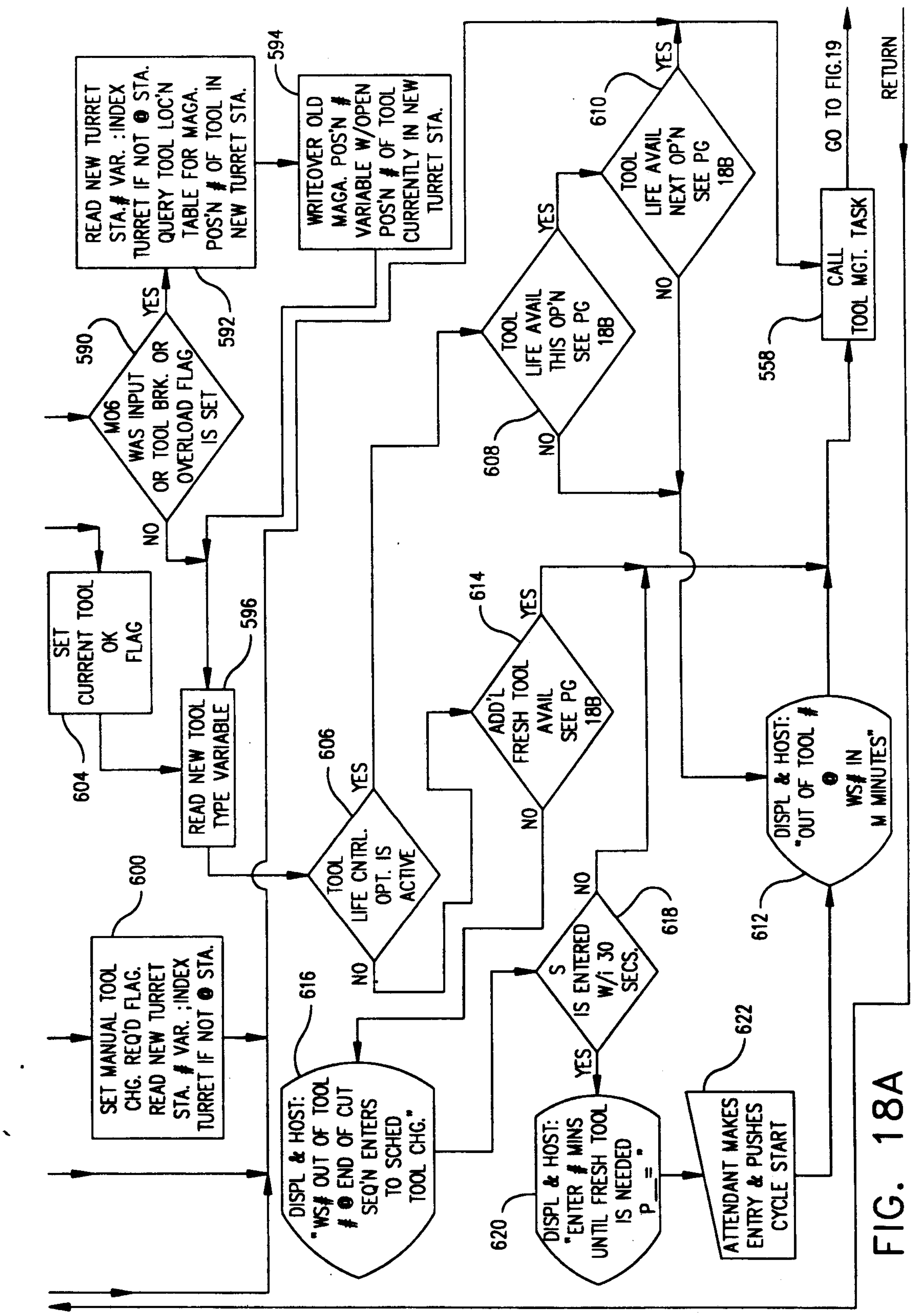

The tool search task begins in the flow chart of FIG. 15 at block 482 where a tool search flag is set and a tool control subroutine is called. The controller then proceeds to block 484 in FIG. 16 where a test is made as to whether the workstation is using a tool magazine in addition to a turret, in other words, a check to see if the tool magazine option is active. If it is not active, the controller proceeds to block 486 where a keep probes flag is cleared if it had been set and a tool life subroutine shown in FIG. 18 is called. This routine is described in detail below. See Table 8.

If the tool magazine option is active, then the controller proceeds to block 488 where a check is made to see if a tool magazine is present. This check may be made by checking the state of a switch which is responsive to the proper seating of a tool magazine in the workstation. If there is no magazine present, then the workstation controller displays at block 490 a message to the effect that there are no tools present at the workstation and that the workstation needs tools for the particular part program being run at that time. This message is sent to the host controller as well as displayed at the workstation. After this display and message to the host, in block 492, the controller calls an AGV delivery monitor routine shown in FIG. 29 and described below.

Figure 16:
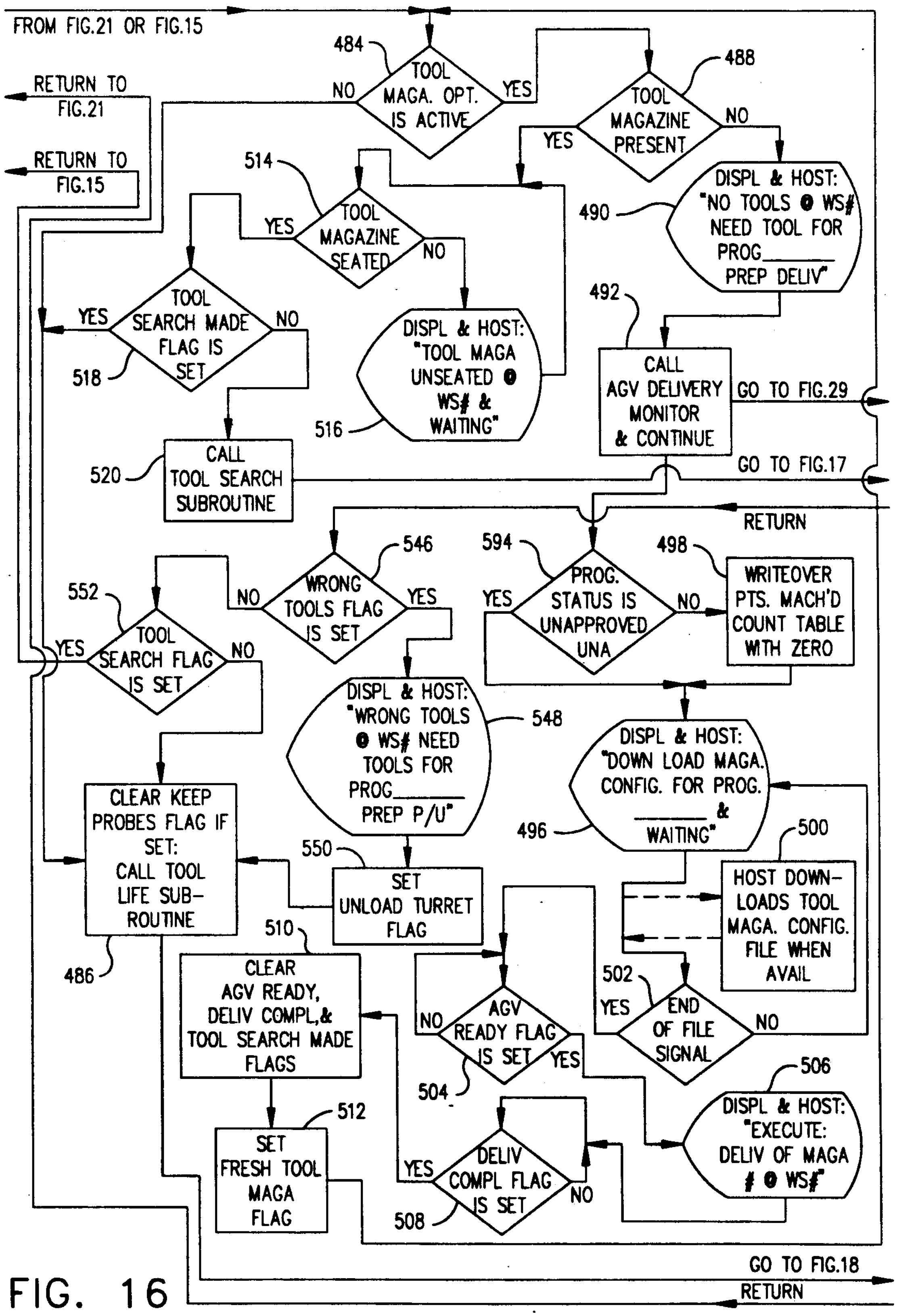

The routine of FIG. 16 continues to block 494 while the AGV delivery monitor is running. At block 494, a check is made as to whether the status of the part program is unapproved UNA. If so, at block 496, the workstation controller requests that the host download the magazine configuration file for the part program being run and a message is displayed at the workstation that the workstation is waiting for this to occur. If the program status is not UNA, a parts machined count table is written over with zero in block 498 prior to the request and display of block 496. The control increments the number in a parts machined count table each time it completes a part, thus keeping a record of the quantity, or count, of the parts it machines. In block 500, the host proceeds to download the magazine configuration file for the tool magazine in the machine, or the tool magazine to be delivered to the machine, when the file becomes available. The display and request of block 496 are continued until an end of file signal is sensed in block 502.

Once the magazine configuration file has been completely downloaded, as sensed in block 502, a check is made at block 504 to see if an AGV ready flag is set. The program of FIG. 16 loops back to the input of block 50 until that flag is set indicating that an AGV is at a ready position near the workstation poised to deliver a tool magazine to the workstation. Once the flag has been set, a message is delivered to the host in accordance with block 506 that the delivery of a tool magazine should be executed. A message to that effect is displayed at the workstation. A check is then made at block 508 to see if a delivery complete flag is set, indicating that delivery of the tool magazine has been accomplished. The program of FIG. 16 loops back to the input of block 508 until this flag has been set indicating that a tool magazine has been delivered to the workstation. When a tool magazine has been successfully delivered to the workstation and the delivery complete flag has been set, the AGV ready flag, the delivery complete flag, and the tool search made flag are cleared in block 510. The tool search made flag indicates the control has done a tool search on the magazine configuration file in accordance with the tool list in the part program. This allows the tool search software to be skipped until that flag is cleared which is usually at the completion of the program or when a fresh tool magazine is delivered. A fresh tool magazine flag is set in block 512. The fresh tool magazine flag is an indicator to the software that it must perform a tool search when that flag is tested, i.e. before it can proceed with machining, even though it may already have done a tool search on the prior magazine at the beginning of the program. The program of FIG. 16 then returns to the input of block 484.

If, in block 488, it is found that a tool magazine is present, then, at block 514, a check is made to see if a tool magazine is properly seated in the workstation, such as by sensing the condition of a switch operated by proper seating of the magazine in the workstation. If it is not seated, a message is displayed pursuant to block 516 to the effect that the tool magazine is not properly seated in the workstation. The same message is sent to the host. The program of FIG. 16 loops back to the input of block 514 and the message of block 516 is continually displayed until the magazine is properly seated, usually through the intervention of a human operator.

When proper seating of the magazine has been sensed, a check is made at block 518 to see if the tool search made flag is set. If it is set, the program of FIG. 16 clears the keep probes flag and calls the tool life subroutine of FIG. 18 in accordance with the dictates of block 486. If the tool search made flag has not been set, a tool search subroutine is called in block 520.

Figure 17:
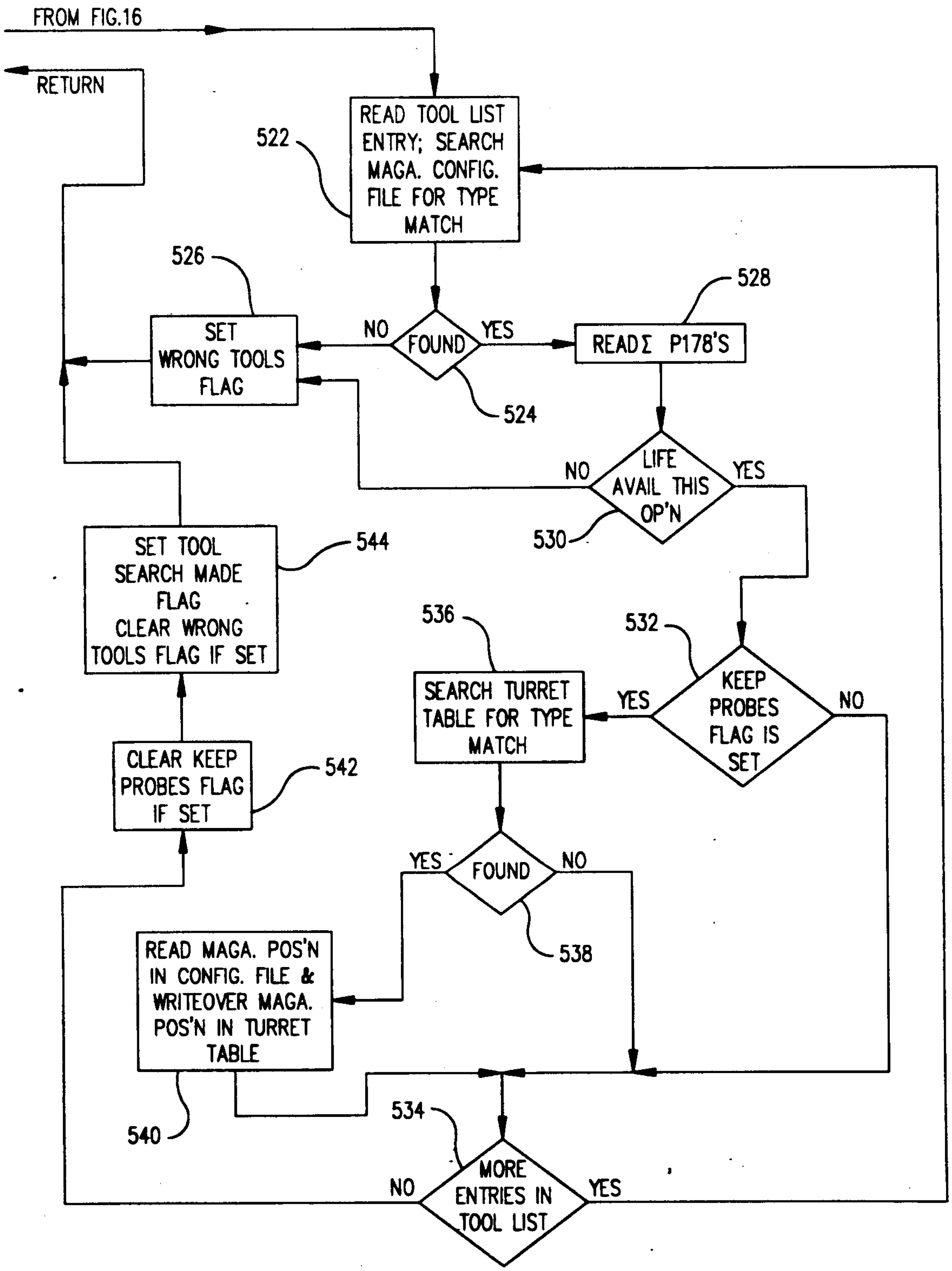

The tool search subroutine is shown in FIG. 17. It, along with the tool life subroutine of FIG. 18, accomplishes a check of the tool magazine at the workstation to see if enough tools of the proper type and with enough cutting life are in the tool magazine to accomplish the cutting operation called for by the present part program.

The subroutine begins at block 522 where the first entry is read from a tool list table in the part program containing information relating to the kinds of tools needed to perform the cutting operations of the part program. The magazine configuration file in the controller is searched at block 522 to see if there are any tools of that type available at the workstation. If no tools of the right type are found as a result of the test of block 524, then a wrong tools flag is set in block 526. The routine of FIG. 17 then returns to the routine of FIG. 16.

If a tool of the correct type is found pursuant to the test of block 524, then a summation of variables P178 for all of the times that particular tool type is used by the part program is read at block 528. The P178 variable indicates the amount of tool life necessary to start the cut called for by the part program. In response to this reading of the sum of P178 variables, a determination is made at block 530 as to whether or not there is sufficient tool life available for the operation called for by the part program. If not, the wrong tools flag is set in block 526 and the routine of FIG. 17 returns to the routine of FIG. 16 as described above. If there is sufficient available tool life, as determined in block 530, then a check is made at block 532 to see if a keep probes flag is set. The keep probes flag notifies the control that the new magazine is configured with the same quantities and types of tools as the old magazine; therefore the probes do not have to be returned with the expended tools in the old magazine. If the keep probes flag is not set, the routine of FIG. 17 returns to block 522 if it is found at block 534 that there are more tools in the tool list. If the keep probes flag is set, then a turret table is searched for a tool type match at block 536. The turret table indicates the type, the available life, the turret station location, and the magazine position, from which they came, of all the tools in the turret. If a match is found, as indicated by the results of the operation of block 538, the magazine position in the configuration file is read and the magazine position in the turret table is written over in block 540 This tells the turret tables where the probes (kept in the turret) go in the new tool magazine. If there are any more entries in the tool list, the subroutine returns to block 522 to deal with the next entry. If there are no more entries in the tool list as determined at block 534, then the keep probes flag is cleared at block 542. The tool search made flag is set and the wrong tools flag is cleared at block 544.

As in the case where the wrong tools flag is set in block 526, the subroutine then returns to the routine of FIG. 16 at block 546 where a check is made to see if the wrong tools flag is set. If it has been set, the workstation displays in block 548 that the wrong tools are at the workstation, the workstation needs tools for the specific part program that is being run, and that a pickup of the tool magazine should be made. This information is sent to the host. Next, in block 550, an unload turret flag is set. The unload turret flag, if set, signals the tool management task to remove the tools from the turret in preparation for pickup of the tool magazine. Following the setting of this flag, the keep probes flag is cleared and the tool life subroutine is called in block 486. If the wrong tools flag is not set as determined in block 546, then a check is made to see if the tool search flag is set in block 552. If it is not set, then the operations of block 486 are carried out as described above. If the tool search flag is set, then the routine of FIG. 16 returns to block 554 in FIG. 15 where the tool search flag is cleared. From block 554, the routine of FIG. 15 returns to the part program of FIG. 10 as indicated in the drawings.

Figure 19:
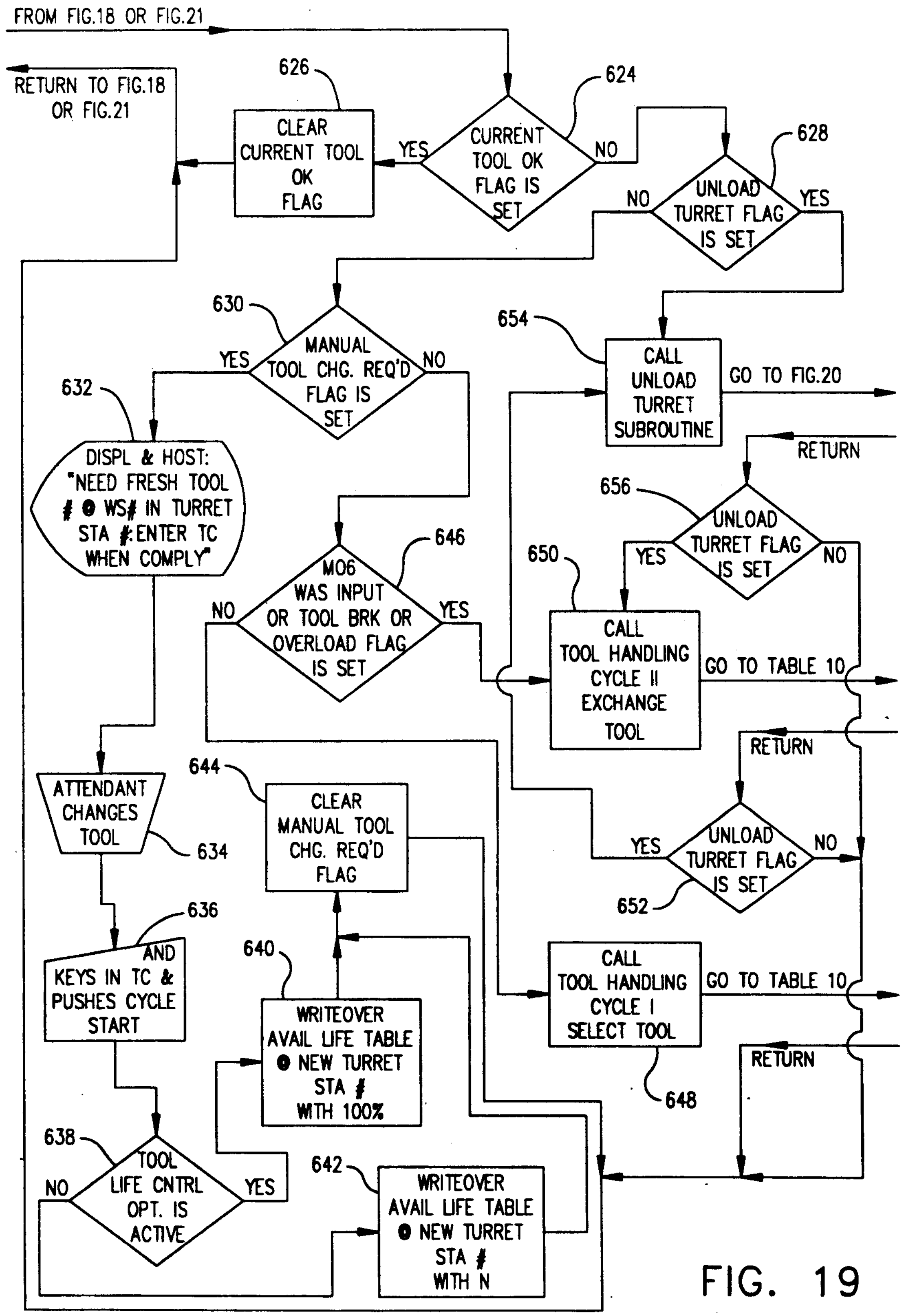

The tool life subroutine of FIG. 18 locates a T-code specified tool type which has the necessary life to complete the machining called for by the part program and arranges to get that tool into the cutting position. The tool life subroutine looks in the turret first, and if the proper tool is available there, it indexes the turret if necessary to get the tool into cutting position. If the proper tool is not in the turret, the tool life subroutine looks in the tool magazine, and if the tool is there, the routine arranges to have the tool transferred from the tool magazine to the turret. If the proper tool is not found in the tool magazine, then the tool life subroutine arranges to have the magazine changed. If the tool life subroutine shown in FIG. 18 should be called in block 486 of FIG. 16, first a check would be made in block 556 to see if the unload turret flag is set. If this flag is set, then a tool management task is called in block 558 shown at the bottom of FIG. 18. The details of the tool management task are shown in FIG. 19 and described below.

If the unload turret flag is not set, then a check is made at block 558 to see if a tool life control option is active. Tool life control or management is an option that may be turned off and on with an MSD (machine setup data) code. If turned off, the control ignores tool life requirements and exchanges the tool each time it is told to do s by the part program. If this option is not active, then a new tool type variable and a P178 parameter are read in block 560. The new tool type variable indicates the tool type input by the part program via a T-code. The P178 parameter indicates the minimum allowed tool life needed to start the cutting sequence called for by the part program currently being run. If the tool life control option is active, then P179 and P180 parameters are read in block 562. The P179 parameter indicates the time it will take to perform the cutting sequence called for by the part program; and the P180 parameter indicates how long a life a tool will have under the conditions of the specified cutting sequence.

The value of the P179 parameter is divided by the value of the P180 parameter in block 564. The results of the division are written into a memory location containing a life needed for cutting sequence parameter. At block 566, a P178 parameter and the life needed for cutting sequence parameter are read. The P178 parameter indicates the minimum allowed tool life to start the cutting sequence. If the P178 parameter is greater than the life needed for the cutting sequence, as determined in block 568, then the minimum required life parameter is written over with the value of the P178 parameter in block 570. If the value of the P178 parameter is not greater than the value of the life needed for the cutting sequence parameter, then the minimum required life parameter is written over with the value of the life needed for the cutting sequence parameter in block 572. After this, a new tool type parameter (note FIG. 21, block 778) and a minimum required life parameter described above are read in block 574.

Once the operations of either block 560 or block 574 have been accomplished, the routine of FIG. 18 checks at block 576 whether or not a tool break or overload flag is set. Setting of these flags indicates that a tool break has occurred during machining or the tool has worn out. Known load sensors may be used to ascertain either of these conditions. If it is found that these flags have not been set, a check is made at block 578 to see if an M06 command has been input. The M06 command is a tool exchange command. If the command has not been input, then a check is made at block 580 to see if the tool magazine option is active. If so, a check is made at block 582 to see if there is sufficient tool life available in the magazine. If not, at block 584, a message is displayed at the workstation that the workstation is out of tools of the type needed and the workstation is waiting for a fresh tool magazine. This is also relayed to the host. The keep probes flag and the unload turret flag are then set in block 586. The routine of FIG. 18 then calls the tool management task of FIG. 19 in block 558.

If there is sufficient available tool life in the magazine for the cutting sequence, as determined at block 582, then, in block 588, the new magazine position number is written over with the position number of the next useable tool. The new magazine position number variable tells the control where to find the tool of the type it is looking for which has sufficient life to perform the cutting sequence at hand. A check then is made at block 590 to see if there was an M06 input or a setting of the tool break or overload flags. If any one of these events has occurred, a new turret station number variable is read and the turret is indexed to that station in block 592. Also at block 592, the tool location table, which is one of several tables that make up the turret tables, is queried for the magazine position number of the tool in the new turret station. Then, the magazine position number variable is written over with the open position number of the tool currently in the new turret station in block 594. The open position number is the magazine position number in which the tool in the turret belongs. It is obtained from the tool location table, i.e., the turret tables. The new tool type variable is then read at block 596. That variable is also read if it is found that there was an M06 input or a setting of the tool break or overload flags in block 590.

If it is found, in block 580, that the tool magazine option is not active, then a check is made at block 598 to see if there is sufficient tool life available with the tools currently in the turret to accomplish the cutting sequence. It there is not, at block 600, a manual tool change flag required flag is set, the new turret station number variable is read, and the turret is indexed to that station. The routine of FIG. 18 then calls the tool management at block 558. If there is enough available tool life in the turret, as determined at block 598, then, at block 602, the routine of FIG. 18 indexes the turret to the station with a tool having the minimum required life or with a fresh tool. Also at block 602, a new turret station number variable is written over.

After these operations, a current tool OK flag is set in block 604. The current tool OK flag if set, signals the tool management task, that it does not have to do anything. If not set, then the tool management task has to get the tool changed by some means. Next, the new tool type variable is read at block 596. A check is made at block 606 to see if the tool life control option is active. If it is active, then a check is made at block 608 to see if there is sufficient tool life to accomplish this cutting operation. If there is sufficient tool life available, then a check is made at block 610 to see if there is sufficient tool life to accomplish the next cutting operation. If there is, then the tool management task is called in block 558.

If there is insufficient tool life available to complete the current cutting operation or the next cutting operation, a display is made at the workstation in block 61 that the workstation will be out of a specified tool type in a certain period of time (M minutes). This message is also sent to the host. The tool management task is then called in block 558.

If the tool life control option is not active as determined in block 606, then a check is made at block 614 to see if an additional fresh tool is available. If it is available, then the tool management task is called in block 558. If an additional fresh tool is not available, then a display is made at the workstation in block 61 that the workstation is out of a specified tool type at the end of the current cutting sequence. The display also requests entry of an S code which schedules a tool change. This message is also sent to the host. If the S code is entered within 30 seconds, then, at block 620, a display is made at the workstation and a message sent to the host to enter the number of minutes until a fresh tool is needed. The attendant then makes the entry and pushes the cycle start button at block 622. The display of block 612 then is made and the tool management task is called at block 558. If the S code is not entered within 30 seconds as determined in block 618, then the tool management task is called directly after the check of block 618 is made.

If there was no M06 input, as determined in block 578, then a check is made at block 579 to see if there is sufficient tool life available in the turret for the current cutting sequence. If there is, the turret is indexed so that a station containing a tool with minimum required life to start a cut is positioned for machining or so that a station containing a fresh tool is positioned for machining, in block 602. The operation of block 604 and succeeding blocks are then accomplished as described above. If sufficient tool life is not available in the turret, as determined at block 579, then the routine of FIG. 18 returns to the input of block 580, the operation of which is described above.

The tool management task is shown in FIG. 19. The tool management task obtains a correct tool by some means: (1) a call for manual intervention; (2) by unloading the turret in preparation for a magazine exchange; (3) by exchanging the tool in the turret with one in the magazine; or (4) by loading a tool from the magazine if the turret station is empty. It begins at block 624, where a check is made to see whether or not the current tool OK flag is set. If it is set, the routine of FIG. 19 clears the current tool OK flag in block 626 and the program returns to the routine of FIG. 18. If the current tool OK flag is not set, then a check is made at block 628 to see if the unload turret flag is set. If this flag is not set, then a check is made at block 630 to see if a manual tool change required flag is set. The manual tool change required flag signals the tool management task that a manual change is required, i.e. the tool cannot be replaced by automatic means. If this flag is set, then, at block 632, a display is made at the workstation to the effect that a fresh tool of a specified type is needed at the workstation in a specified turret station and that a T-code for that tool should be entered for the new tool. The attendant accomplishes these actions and pushes the cycle start button at blocks 634 and 636. A check then is made at block 638 to see if the tool life control option is active. If it is, the available life table at the new turret station number is written over with 100% in block 640. If the tool life control option is not active, then the available life table at the new turret station number is written over with N (meaning NEW tool) in block 642. Once either of the operations of blocks 640 or 642 have been accomplished, the manual tool change required flag is cleared at block 644 and the routine of FIG. 19 returns to the routine of FIG. 18.

Figure 20:
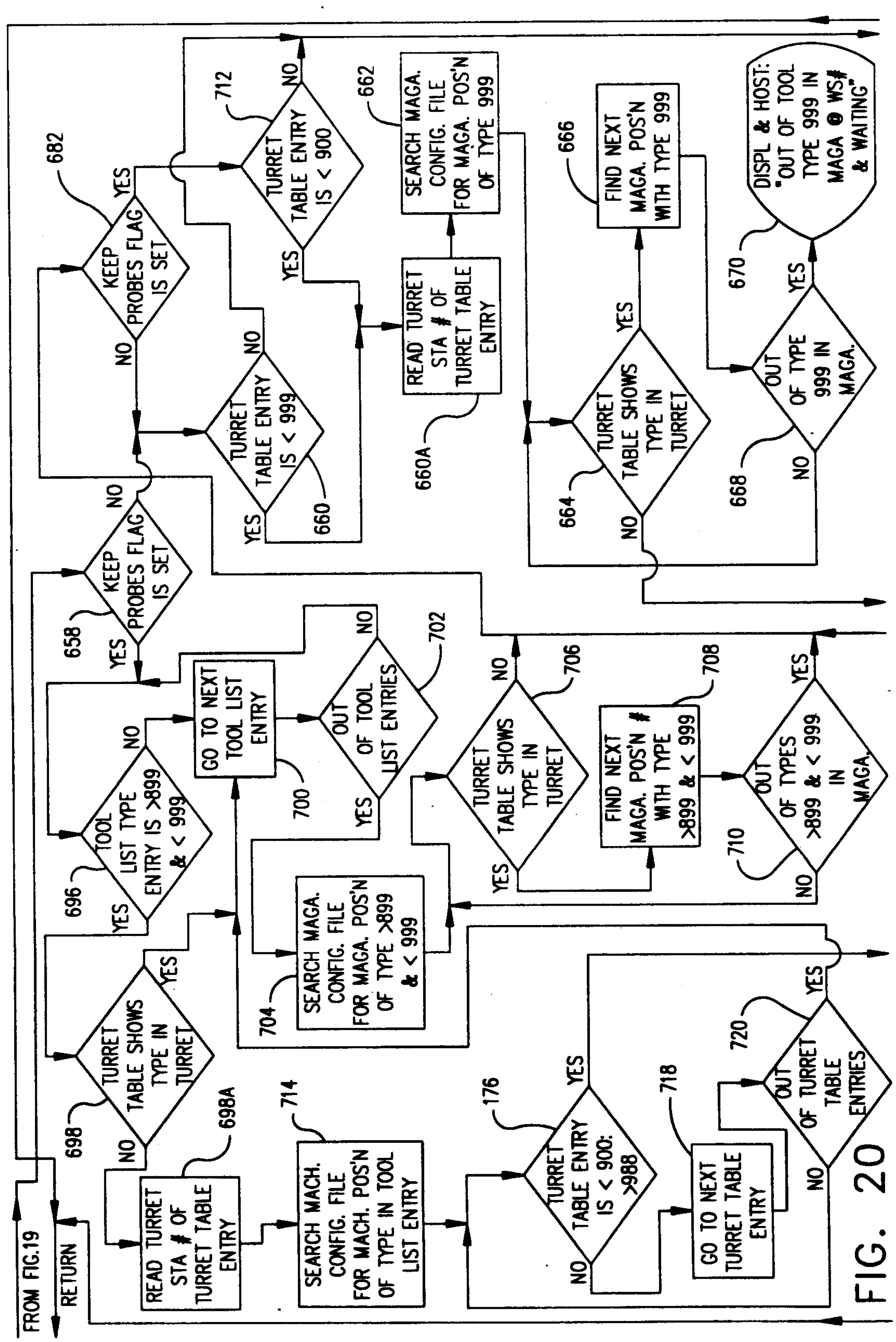
Figure 20A:
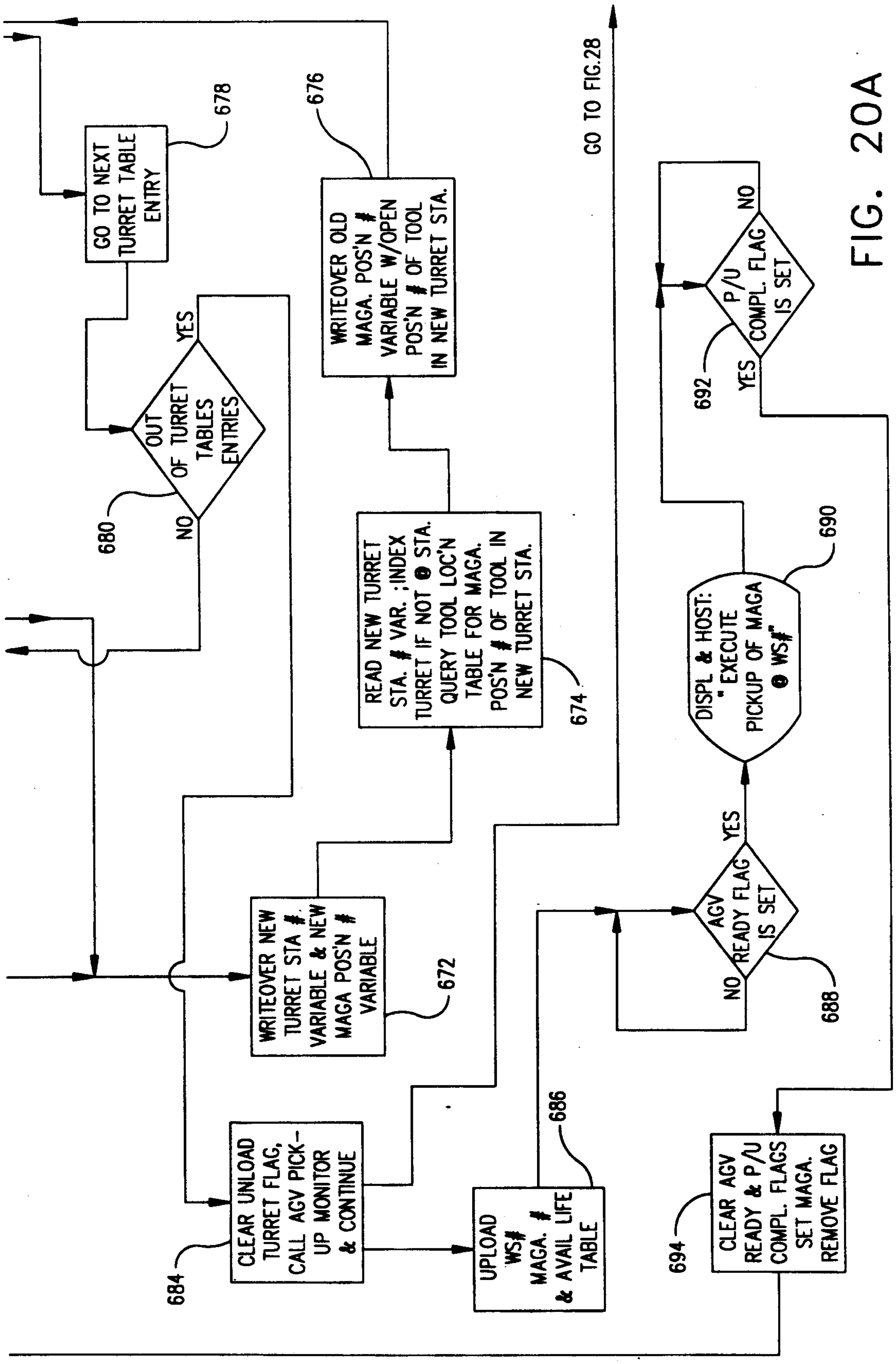

If the manual tool change required flag is not set, as determined in block 630, a check is made at block 646 to see if an M06 code described above has been entered of if either of the tool break or overload flags have been set. If these things have not occurred, a tool handling cycle, described in greater detail in Table 10, is called in block 648. This tool handling cycle selects a tool from a predetermined place in the tool magazine. After this tool handling cycle is completed, the routine returns to the routine of FIG. 18. If the opposite determination is made in block 646, then another tool handling cycle is called in block 650, which exchanges the tool in the turret for a fresh tool. This tool handling cycle is also described in Table 10. When this tool handling cycle is completed, a check is made at block 652 to see if the unload turret flag is set. If it is set, the routine of FIG. 19 calls an unload turret subroutine in block 654. The unload turret subroutine is also called in response to the determination of a set condition of the unload turret flag in block 628. The unload turret subroutine is shown in FIG. 20 and is described below. When the unload turret subroutine has been run, the controller returns to block 656 where a check is made to see if the unload turret flag is set. If this flag is set, the tool handling cycle which exchanges the tool in block 650 is called. If the unload turret flag is not set, as determined by the test of block 656, the routine of FIG. 19 returns to the routine of FIG. 18.

FIG. 20 shows the unload turret subroutine. The unload turret subroutine removes the tools from the turret and stores them in the magazine in preparation for a magazine exchange. It may or may not remove the probes depending on whether or not the keep probes flag is set. All removed tools are replaced with dummy plug type tool holders to protect precision machined locating surfaces on the turret. The subroutine begins at block 658 where a check is made to see if the keep probes flag is set. If that flag is not set, a check is made at block 660 to see if the turret table entry indicates whether or not a dummy tool is present in the turret position being considered (i.e.. a check is made as to whether or not the turret table entry is less than 999). If the turret table entry is less than 999, the turret station number of the turret table entry is read at block 660A and the magazine configuration file is searched in block 662 for a magazine position of type 999, in other words, for the location of a dummy tool. Then, a check is made at block 664 to see if the dummy tool from that location is already in the turret. If so, then the next magazine position containing a dummy tool is found in block 666. Then a check is made at block 668 to see if the magazine is out of dummy tools. If so, the workstation at block 670 displays a message that it is out of dummy tools and is waiting. This message is also sent to the host. If the workstation is not out of dummy tools, the routine of FIG. 20 returns to the input of block 664. If the operation of block 664 indicates that the dummy tool from the magazine is not already in the turret, then the new turret station number variable and the new magazine position number variable are written over in block 672 with data read at block 662. The new turret station number variable is read in block 674 and the turret is indexed to the station indicated by that number. Also at block 674, the tool location table is queried for the magazine position number of the tool in the new turret station. Block 676 then writes over the old magazine position number with the open position number of the tool in the new turret station. The subroutine of FIG. 20 then returns to block 656 in FIG. 19.

If a dummy tool is found in the turret position under consideration in block 660, that is, if the turret table entry is not less than 999, then the routine of FIG. 2 proceeds to the next turret table entry in block 678. A check is then made at block 680 to see if all the turret entries have been considered. If they have not, then the routine of FIG. 20 proceeds to block 682 where a check is made to see if the keep probes is set. The description thus far has assumed that the flag is not set. In that case, the routine of FIG. 20 then performs the operation of block 660, as described above. Once all of the entries in the turret table have been considered, as determined in block 680, the routine of FIG. 20 clears the unload turret flag and calls the AGV pickup monitor routine in block 684, the details and operation of which are illustrated in FIG. 28 and in the description of that Figure. The routine of FIG. 20 then continues to block 686 where the workstation number, the magazine number, and the available tool life table are uploaded to the host. A check then is made at block 688 to see if the AGV ready flag is set. The FIG. 20 routine then loops back to the input of block 688 until that flag is set indicating that an AGV is at a ready position near the work station to pickup the tool magazine currently at the workstation. A display then is made at the workstation in block 690 that the pickup of the magazine by the AGV should be executed. This message is sent to the host. The routine of FIG. 20 then checks to see if the pickup complete flag is set in block 692 indicating that the magazine has been picked up. The routine loops back to the input of block 692 until that flag is set, indicating that the tool magazine has been picked up by an AGV, at which time the AGV ready flag and the pickup complete flag are cleared and the magazine removed flag is set in block 694. The routine then returns to block 656 in FIG. 19.

If the keep probes flag is set, indicating that only the tools in the turret, and not the probes, are to be unloaded from the turret, as determined in block 658, then a check is made at block 696 to see if the first entry in the tool list table is between 899 and 999, in other words, if that entry indicates that the corresponding tool is a probe. If so, a check is made in block 698 to see if the probe is in the turret. If it is, then the next entry in the tool list is gone to in block 700. A check is made at block 702 to see if all the entries in the tool list table have been considered. If they have not, then the routine of FIG. 20 proceeds to the input of block 696. If all of the entries have been considered, then the routine proceeds to block 704 where the magazine configuration file is searched for magazine positions reserved for probes. A check then is made at block 706 to see if the turret table shows that the probe for that magazine position is in the turret. If it is, the next magazine position for a probe is found in block 708. A check then is made at block 710 to see if the magazine is out of probes. If it is not, the routine of FIG. 20 proceeds to the input of block 706. If the magazine is out of probes, or if the probe found in the search of block 704 is not in the turret as determined in block 706, then the routine of FIG. 20 proceeds to block 682 where it is determined whether or not the keep probes flag is set. In this part of the description, it is assumed that this flag has been set, and thus the routine proceeds to block 712 where a check is made to see if the turret table entry is less than 900 meaning that the corresponding tool is an actual tool used to machine a workpiece. If it is not, the routine of FIG. 20 proceeds to block 678, and if it is, the routine of FIG. 20 proceeds to block 662.

If the entry in the tool list table corresponds to a probe as determined in block 696 and the probe is in the turret as determined in block 698, then the turret station number of the turret table entry is read in block 698A and the magazine configuration file is searched for the magazine position of the type of tool corresponding to the entry in the tool list table being considered. A check then is made to see if the turret table entry indicates that something other than a probe is present in the turret station corresponding to that turret list entry. If so, the routine proceeds to block 672. If not, the routine goes to the next turret table entry in block 718 and checks in block 720 if all of the turret table entries have been considered. If not all entries have been considered, the routine returns to the input of block 716. If all entries have been considered, the routine goes to the input of block 700.

After the tool search task called by the part program in block 480 shown in FIG. 10 has been completed, the part program of FIG. 10 proceeds to block 722 where it inputs data indicating the desired position of the turret when it is indexed. The turret is actually moved or indexed to that position in block 724. The part program at block 726 then inputs an M201 code which instructs the workstation to open a door which is closed during machining to shield the surroundings of the workstation from the debris produced during the machining operation and from the coolant sprayed on the tool and workpiece at that time. The part program also inputs data (a P178 code) in block 728 relating to the minimum allowed tool life to start the present cutting sequence. This data is stored in the tool list tables for each item number. The part program also inputs data (a P180 code) at block 730 which indicates the minutes of tool life expected under the conditions of the cutting sequence. At block 732, the part program inputs data (a P179 code) which indicates the amount of time needed to complete the cutting sequence. Rather than inputing separate P179 and P180 codes, the part program may input a single code (P181) relating to the percentage of the useful tool life which will be used in the cutting sequence. The P181 data is also stored in the tool list tables for each item number.

Figure 21:
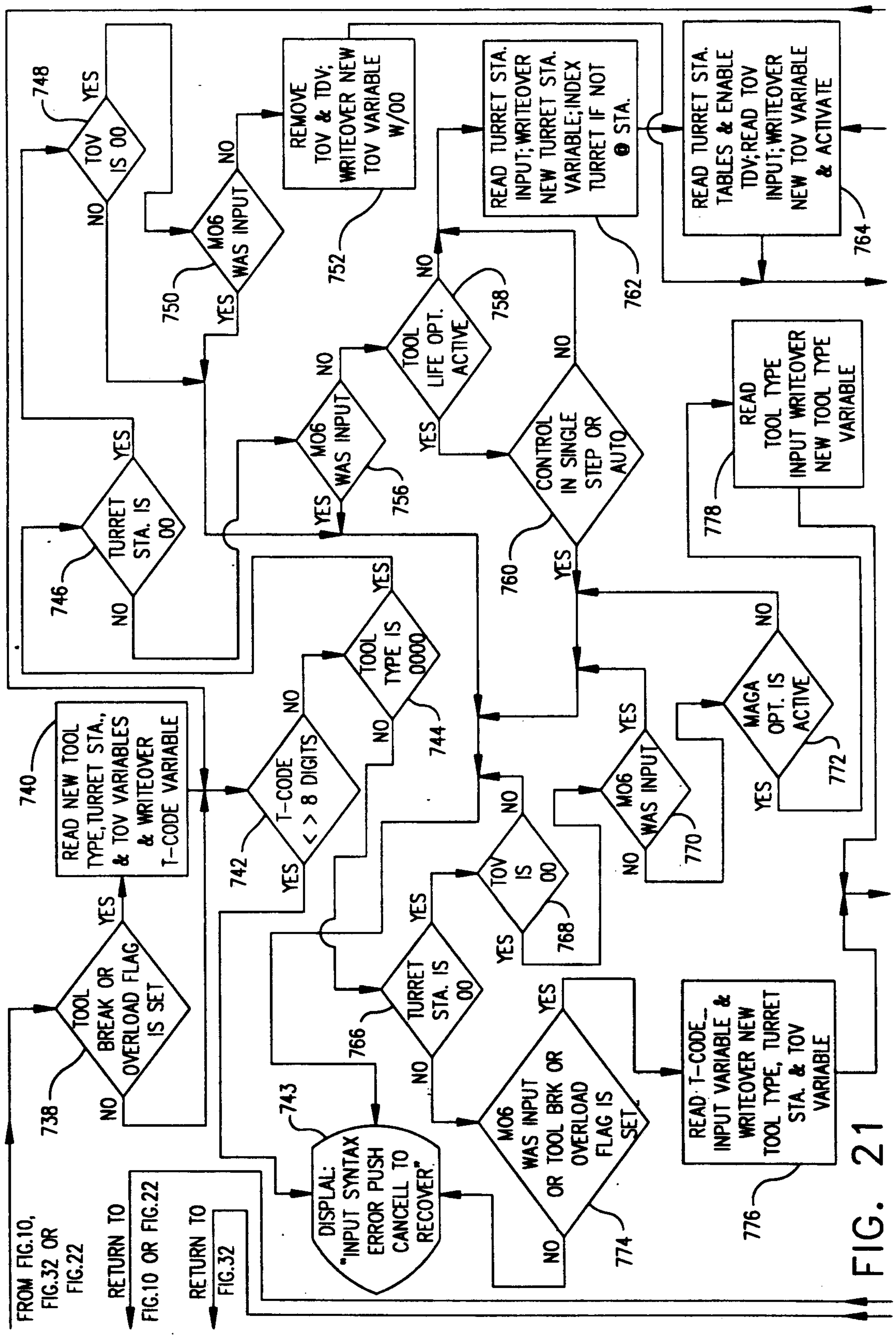
Figure 21A:
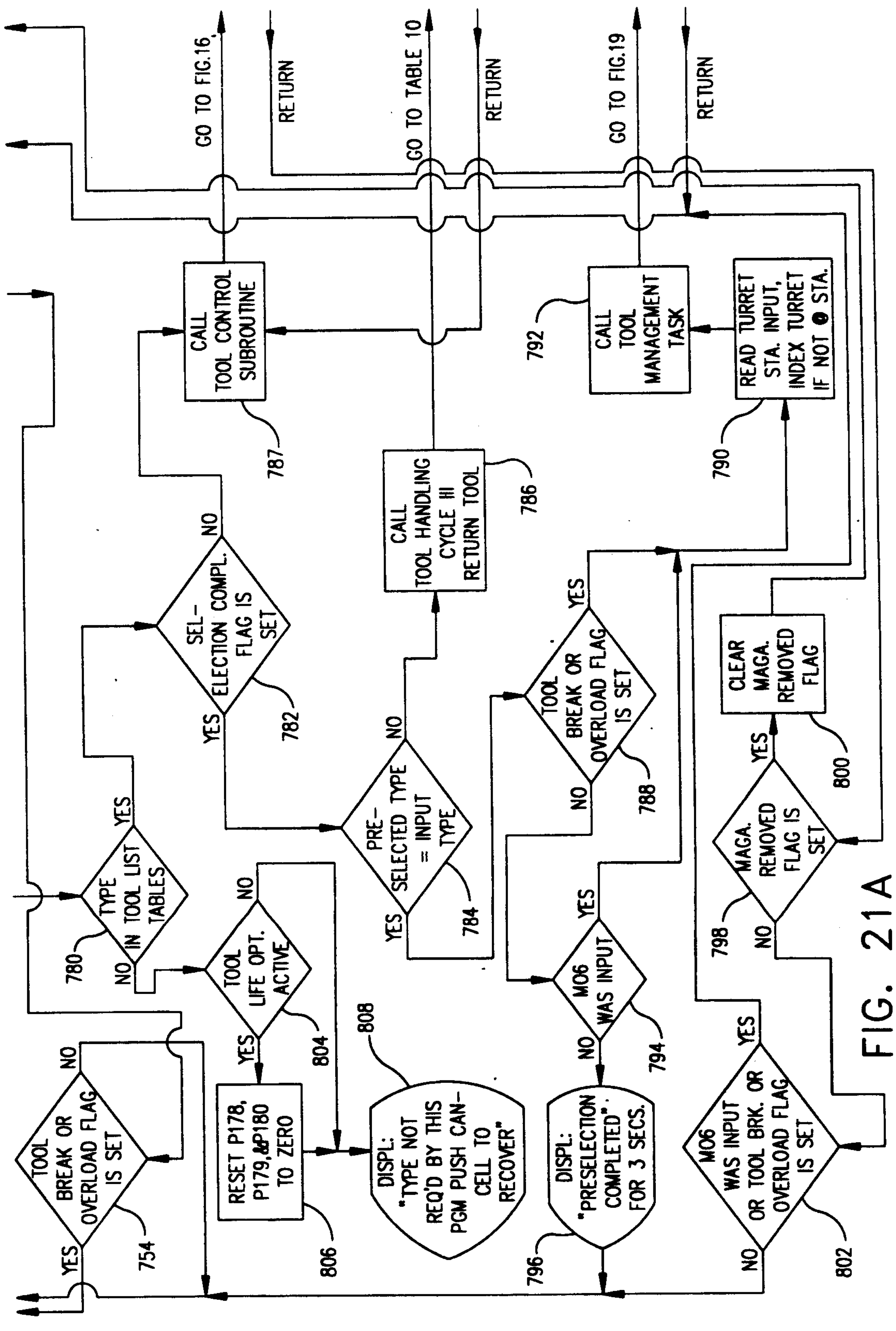

After the input of the P178, P179, and P180 codes, the part program inputs data (a T-code) in block 734 relating to the characteristics of the tool to be used to accomplish the cutting sequence. The T-code consists of a tool type variable indicating the kind of tool to be used to accomplish the cutting sequence, a turret station number variable to indicate where in the turret the tool is to be located, and a tool offset variable (TOV) indicating a table location where it can obtain the amount of offset associated with the tool. After the input of the T-code, the part program calls a T-code task in block 736. The details of the T-code task are shown in FIG. 21. The T-code task decides whether or not the turret needs to be indexed, whether or not the tool type needed is available in the turret, arranges for appropriate action, and activates the proper offsets.

The T-code task begins at block 738 where it is determined whether or not the tool break flag or the overload flag is set. If either of these flags is set, then block 740 causes the routine to read new tool type, turret station, and tool offset variables. The new tool type, turret station, and tool offset variables are where the control saves the tool type from the most recently executed T-code, permitting it to exchange tools automatically without a T-code when a tool breaks or wears out during a cutting sequence. The T-code variable is written over with these variables. After completion of the operation either block 738 or block 740, the T-code is tested at block 742 to see if it contains eight digits. If it does not, a display is made at block 743 that there is a syntax error. A cancel button must be pushed to recover from this condition.

If there is no syntax error, a check is made at block 744 to see if the tool type listed in the T-code is 0000. If it is, then a check is made at block 746 to see if the turret station specified in the T-code is 00 A 00 turret station number means no turret index is required. This is normally used when a change in offset number is desired without a tool change. If the turret station number is 00, a check is made at block 748 to see if the tool offset variable is 00. If it is, a check is made at block 750 to see if an M06 code (tool change code) has been input. If an M06 code was input, or if the tool offset variable is 00 as determined at block 748, then the display of block 743 is made. If the M06 code has not been input, then the tool offset variable (TOV) and the tool data variable (TDV) are removed in block 752. The tool offset variable describes a table location where the control obtains a numerical value to be used as the tool wear offset. The tool data variable describes another table location where the control obtains a numerical value which describes the variation or active locations of the tool cutting edges relative to their locating surfaces, as specified by a drawing for the particular tool being selected or used. The new TOV variable is written over with 00 at this block. After the operation of block 752 is completed, the routine of FIG. 21 checks at block 754 to see if the tool break flag or the overload flag is set. If either of those flags has been set, the routine of FIG. 21 proceeds to the broken or worn tool interrupt subroutine of FIG. 32. If none of those flags has been set, then the routine of FIG. 21 returns to the part program either in FIG. 10 or in FIG. 22 depending on which part of the program called the routine of FIG. 21.

If the turret station is not 00 as determined in block 746, a check is made at block 756 to determine if an M06 code has been input. If such a code has been input when the check of block 756 is made or when the check of block 750 is made, if the turret station is not 00 as determined in block 746, or if the tool offset variable is 00 as determined in block 748, the syntax error display of block 743 is made. If the M06 code was not input, as determined in block 756, then a check is made at block 758 to see if the tool life option is active. If it is, a check is made in block 760 to see if the control is in single step or auto modes of operating the control. In the single step mode, the work station executes one program block or command at a time and stops. It is normally used for debugging part programs. In the auto execute mode, the work station executes the program blocks or commands, sequentially, without stopping, as fast as it can. It is normally used for running fully debugged part programs. If the answer is yes in block 760, the syntax error message of block 743 is displayed. If the answer is no, or if the tool life option is inactive, as determined in block 758, then the turret station input (digits 5 and 6 of the T-code specifying the desired turret station number for the location of the tool type specified by digits 1 through 4 of the T-code) is read at block 762. Also at block 762, the new turret station variable is written over with the turret station input read at block 762 and the turret is indexed to the station indicated by the new turret station variable. The turret station tables are then read and the tool data variable is enabled in block 764. Also at block 764, the tool offset variable input is read and the new tool offset variable is written over with the variable that has been read and is activated. The routine of FIG. 21 then proceeds to the operation of block 754 as described above.

If the tool type is determined to be something other than type 0000 in block 744, a check is made in block 766 to see if the turret station is 00. If it is, a check is made at block 768 to see of the tool offset variable is 00. If the variable is 00, then a check is made at block 770 to see if an M06 code has been input. If that code was not input, then a check is made at block 772 to see if the magazine option is active. If the magazine option is not active as determined in block 772, if an M06 code has been input as determined in block 770, or if the tool offset variable is not 00 as determined in block 768, then the syntax error of block 743-is displayed.

If the turret station is determined to be something other than 00 in block 766, then a check is made at block 774 to see if an M06 code has been input or the tool break flag or the overload flag is set. If not, the syntax error message of block 743 is displayed. If any of the items of block 774 are found to be true, then the T-code input variable is read at block 776. The tool type, turret station, and TOV variables are written over with the information obtained from reading the T-code input variable.

If the tool magazine option is active as determined in block 772, then the tool type input is read at block 778. The new tool type variable is written over with the information read at block 778.

Once the operation of either block 776 or block 778 has been completed, a check is made at block 780 to see if the tool type is in the tool list tables. If it is, a check is made to see if the selection complete flag is set in block 782. The selection complete flag is set by tool handling cycle I and signifies that a tool has been preselected and is waiting in the grippers of the tool changer for a command to complete a tool exchange. If the selection complete flag is set, a check is made in block 784 to see if the preselected tool type is the same as the input tool type. If it is not, the tool handling cycle III, described in detail in Table 10, is called in block 786. The tool handling cycle III causes the tool to be returned to its original location in the tool magazine. At the completion of the tool handling cycle III, the tool control subroutine of FIG. 16 is called at block 787.

If the preselected tool type is the same as the input tool type, as determined in block 784, a check is made at block 788 to see if the tool break flag or the overload flag is set. If either of those flags is set, the turret station input is read at block 790 and the turret is indexed to that station if it is not already there. Then, the tool management task of FIG. 19 is called in block 792. When the tool management task is completed, as described above, the program returns to the routine of FIG. 21 at block 764 and subsequent blocks which perform as described above.

If the tool break flag or the overload flag is not set, as determined in block 788, then a check is made at block 794 to see if an M06 code has been input. If that code has been input, then the operation of block 790 is performed and the routine proceeds as described above. If there has been no M06 input, then a display is made in block 796 for a predetermined time, for example, three seconds, that preselection has been completed. The routine of FIG. 21 then proceeds back to the part program whence it was called.

If the selection complete flag is not set as determined in block 782, then the tool control subroutine is called in block 787 as it would be called at the completion of a tool handling cycle III described above. When the tool control subroutine is completed, the program proceeds to block 798 where a check is made to see if the magazine removed flag is set. If that flag is set, it is cleared in block 800 and the routine of FIG. 21 returns to the input of block 742. If the magazine removed flag is not set, a check is made at block 802 to see if an M06 code has been input or if the tool break flag or the overload flag is set. If any of these things is true, then the routine of FIG. 21 proceeds to perform the operation of block 764 and subsequent blocks.

If the tool type is not in the tool list tables as determined in block 780, then a check is made in block 804 to see if the tool life option is active. If this option is active, the P178, P179, and P180 codes are set to zero in block 806. If the tool life option is not active, as determined in block 804, or after the resetting of the P-codes in block 806, then a display is made at block 808 that this tool type is not required by this program. The cancel button must be pushed to recover.

After completion of the T-code task in FIG. 21, the controller returns to the part program in FIG. 10 at block 810 which instructs the controller to repeat the operations of blocks 730, 732, 734, and 736 until all of the tools required to accomplish the part program are in the turret. The part program next inputs an instruction to perform initial tool offsetting in block 812, part sensor calibration in block 814, and the first half of part location offsetting in block 816.

Figure 22:
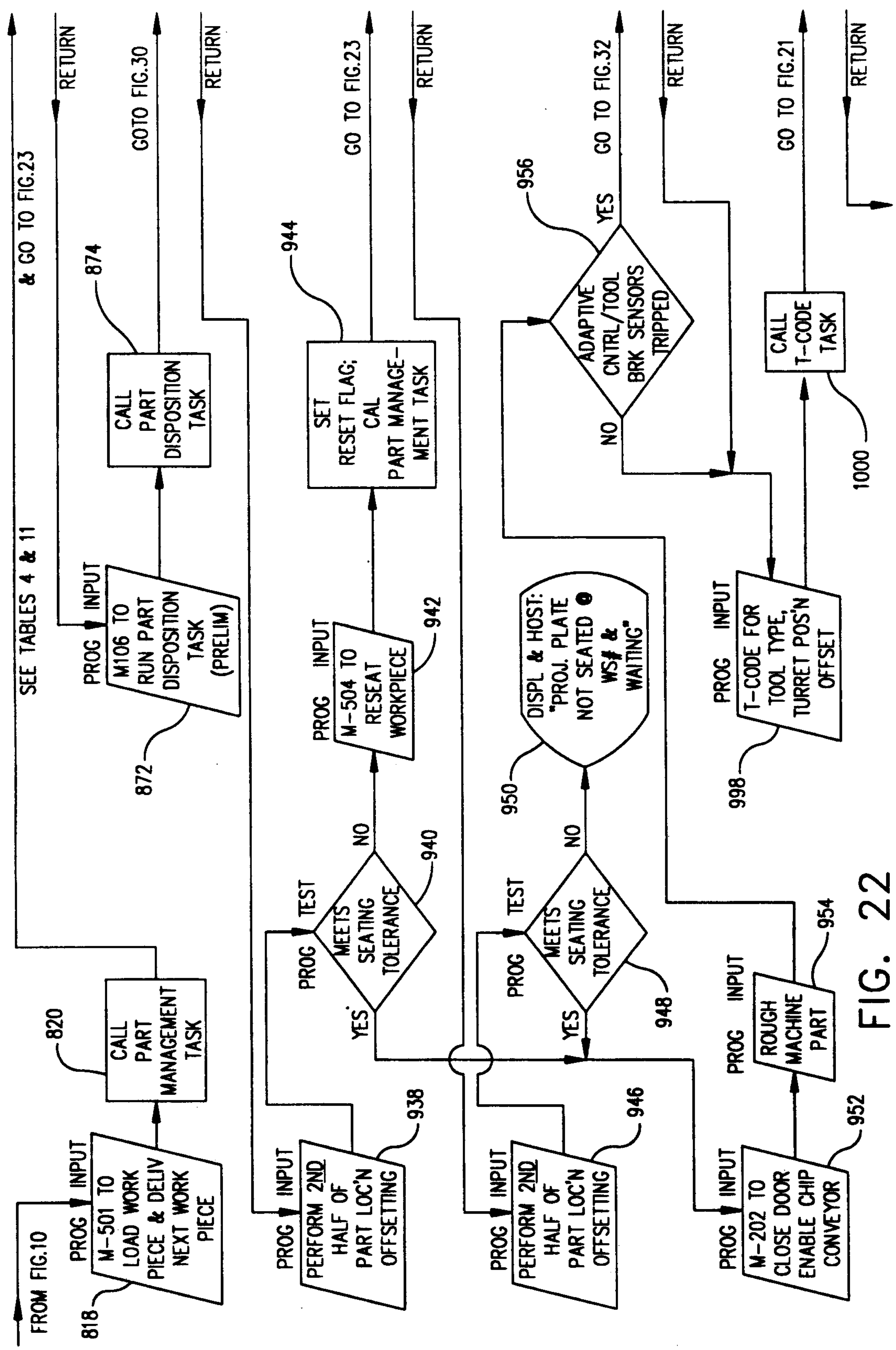
Figure 22A:
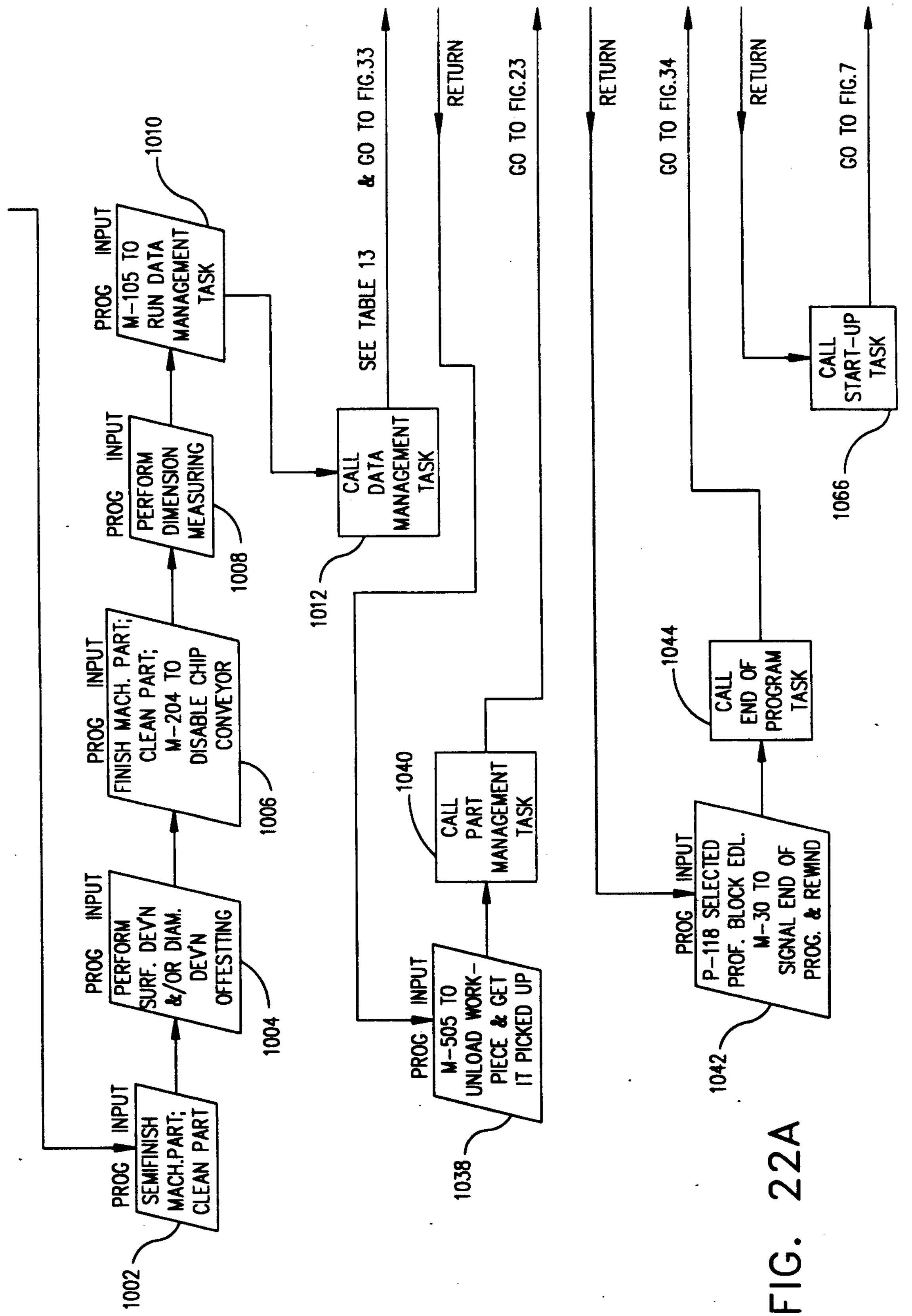

Continuation of the part program is shown in FIG. 22. At block 818, an M501 code is input by the part program which instructs the workstation to load the workpiece to machined on the spindle of the machine. That code also instructs that the next workpiece be delivered to a position in the workstation ready to be loaded on the spindle. Next, a part management task is called in block 820.

Figure 23:
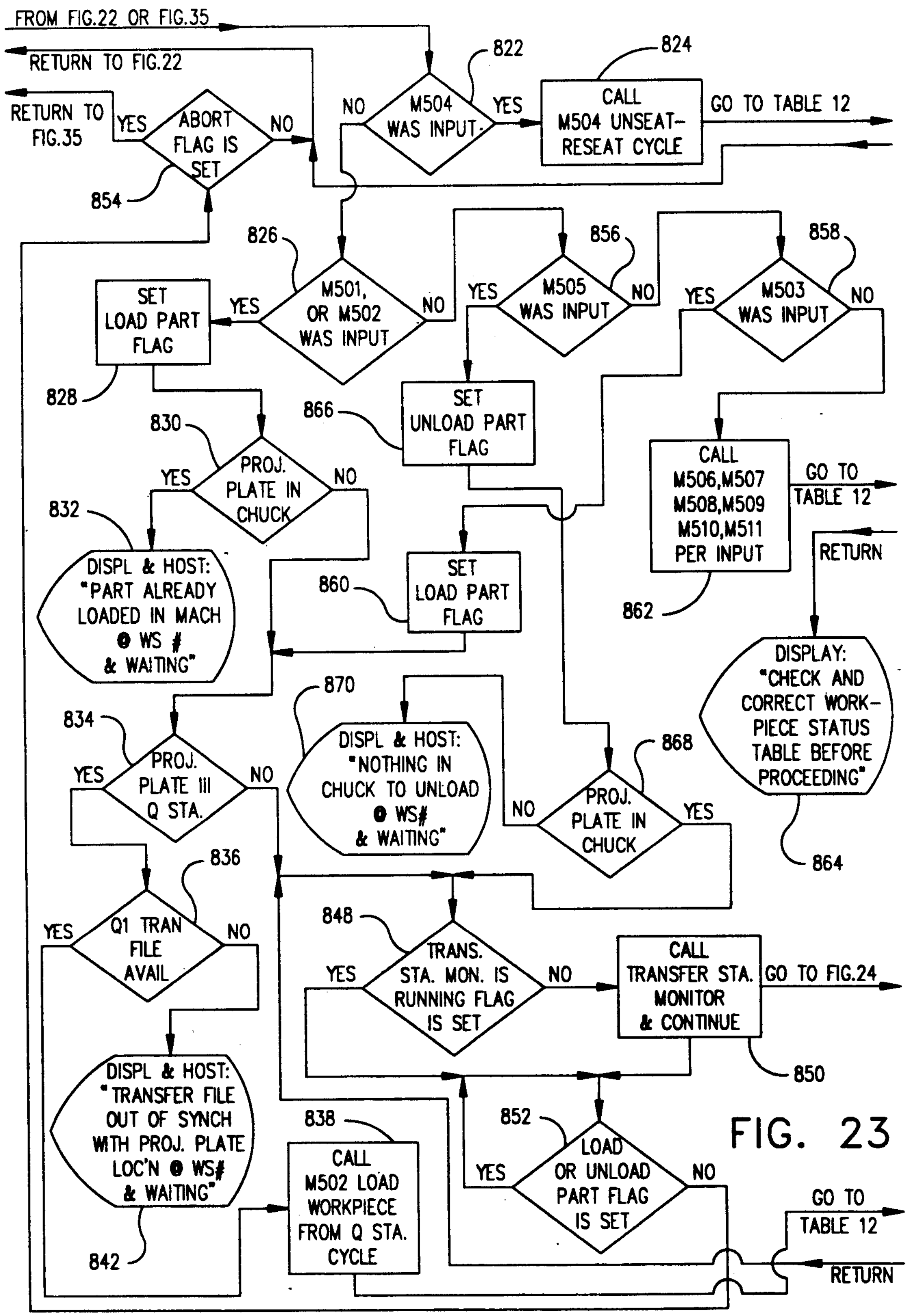

The part management task is shown in FIG. 23. The part management task is triggered by the input or reading of workloader command codes, M501 through M513. The part management task interrupts these M-codes, decides if they can be executed, how they should be executed, and records what happened following execution. Basically, the workloader commands move the workloader, with and without a workpiece through a variety of cycles that includes loading and unloading the workpiece on the machine spindle and moving the workpiece among the transfer, queue, and machining locations at the work station. The part management task also requests pickup and delivery of work pieces and assures that one workpiece location at the work station is always open, permitting workpiece movement within the work station to take place.

The part management task begins at block 822 where a check is made to see if an M504 code has been input. An M504 code signifies that an unseat-reseat cycle specified in Table 12 should be carried out, which will essentially make sure that a workpiece is properly seated on the spindle of the machine by taking the workpiece off the spindle and reseating it there. If an M504 code has been input, an unseat-reseat cycle, described in detail in Table 15, is called in block 824. When the unseat-reseat cycle has been completed, the part management task of FIG. 23 returns to the next step in the part program after the call of the part management task.

If an M504 code has not been input, as determined in block 822, a check is made at block 826 to see if either an M501 code or an M502 code has been input. An M501 is an instruction to load a workpiece from the transfer station to the machine chuck. An M502 code is an instruction to load a workpiece from the queue station to the machine chuck or spindle. If either of those codes has been input, a load part flag is set in block 828 A check is then made to see if a project plate is in the chuck at block 830. If there is a project plate in the chuck, a display is made at block 832 to the effect that there is already a part loaded in the machine. The machine sends this message to the host and waits.

If there is no project plate in the chuck, as determined in block 830, then a check is made at block 834 to see if a project plate is in the queue station. If there is, a check is made at block 836 to see if a Q1TRAN transfer file is available. If there is, an M502 load workpiece from the queue station cycle is called in block 838. This cycle is described in detail in Table 12. If there is no Q1TRAN transfer file available, a display is made at the workstation in block 842 to the effect that the transfer files are out of synch with the project plate location. This message is sent to the host and the workstation waits.

Figure 35:
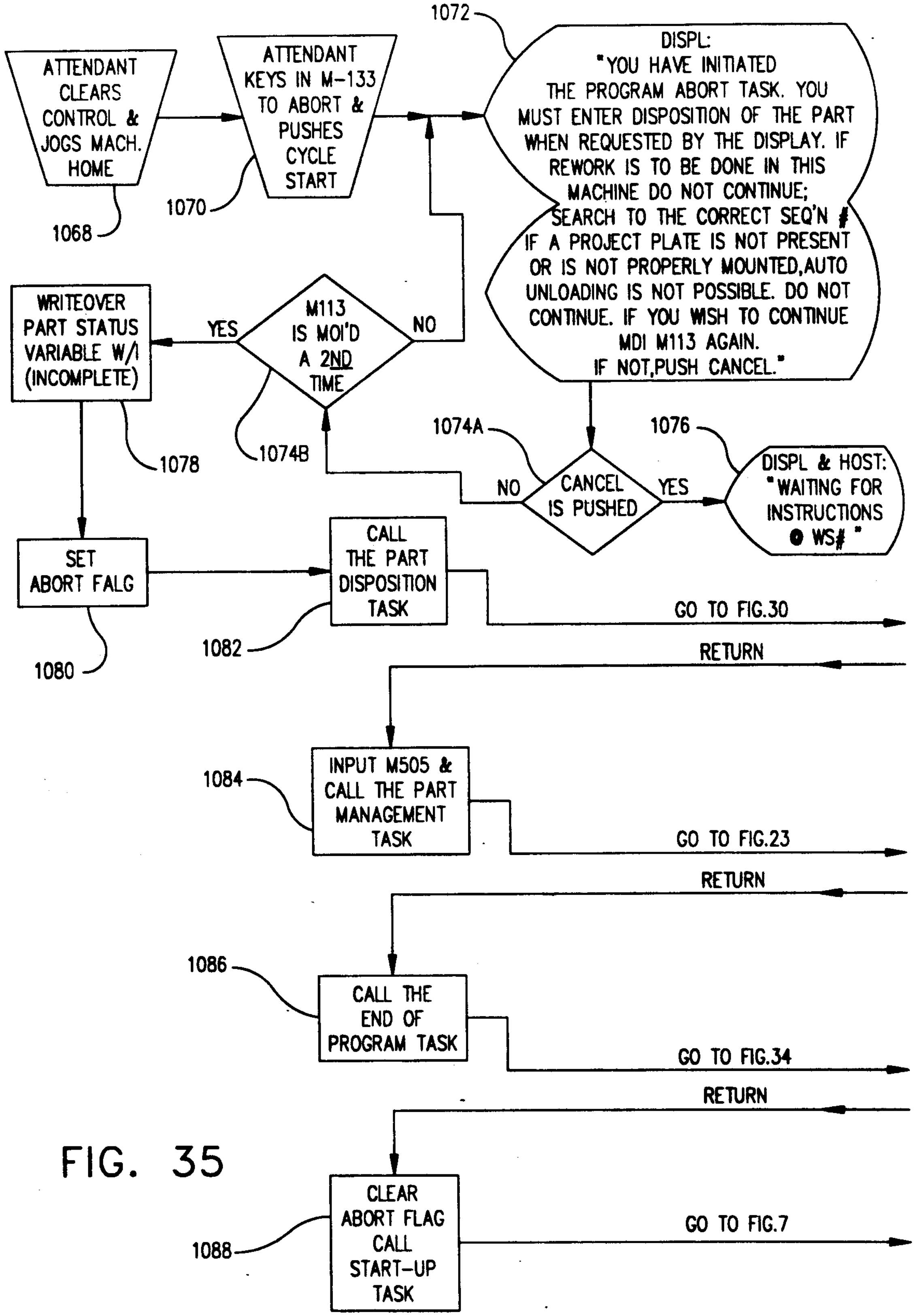

After the completion of the loading cycle called in block 838, the task of FIG. 23 is returned to in block 848, where a check is made to see if a transfer station monitor running flag is set. The transfer station monitor running flag indicates whether or not the transfer station monitor task is running. The transfer station monitor task "watches" the transfer station and activates the required AGV interfacing subroutines and work loader commands depending on what is going on in the transfer station. This allows the machine to keep on machining a workpiece while another workpiece is being picked up, dropped off, or moved from the transfer station to the queue station. If the transfer station monitor running flag is not set, a transfer station monitor is called at block 850 and the routine of FIG. 23 proceeds to block 852 where a check is made to see if a load or unload part flags are set. The load or unload part flags, if either is set, signal the part management task to temporarily stop running until workpiece loading or unloading on the machine spindle is completed. The routine of FIG. 23 then loops back to the input of block 852 until the load or unload part flags are no longer set. When that happens, the routine of FIG. 23 proceeds to block 854 where a check is made to see if an abort flag is set. The abort flag is set by the input of an M113 code, the program abort command. M113 routes the abort process through the part management task to unload the workpiece and if the abort flag is set the software execution is routed back to an abort task (FIG. 35) instead of to the part program. If the abort flag is set, the routine of FIG. 23 returns to an abort task which is shown in FIG. 35. If that flag is not set, the subroutine of FIG. 23 returns to the part program in FIG. 22.

If there has been no input of an M501 code or an M502 code, as determined in block 826, a check is made at block 856 to see if an M505 code was input. An M505 code is an instruction to unload a workpiece from the the chuck and place it in the transfer station. If there was no M505 input, then a check is made at block 858 to see if an M503 code has been input. An M503 code is an instruction to move a workpiece from the transfer station to the queue station. If there has been an input of an M503 code, then a load part flag is set in block 860 and the operations beginning with block 834 are performed. If an M503 code has not been input, then, in block 862, routines are called which will execute the instructions commanded by the input of M506, M507, M508, M509, M510, or M511 codes, depending which ones of these codes have been input by the part program. The details of the operation of the work station in response to the inputs of these M-code commands are described in Table 15. After executing these instructions, a display is made at block 864 to check and correct workpiece status table before proceeding.

If it is determined at block 856 that an M505 code has been input, then the unload part flag is set in block 866. A check then is made in block 868 to see if a project plate is in the chuck. If not, a display is made at block 870 to the effect that there is nothing in the chuck to unload. A like message is sent to the host at this time. If there is a project plate in the chuck, then the previously described operations of block 848 and succeeding blocks are carried out.

Figure 24:
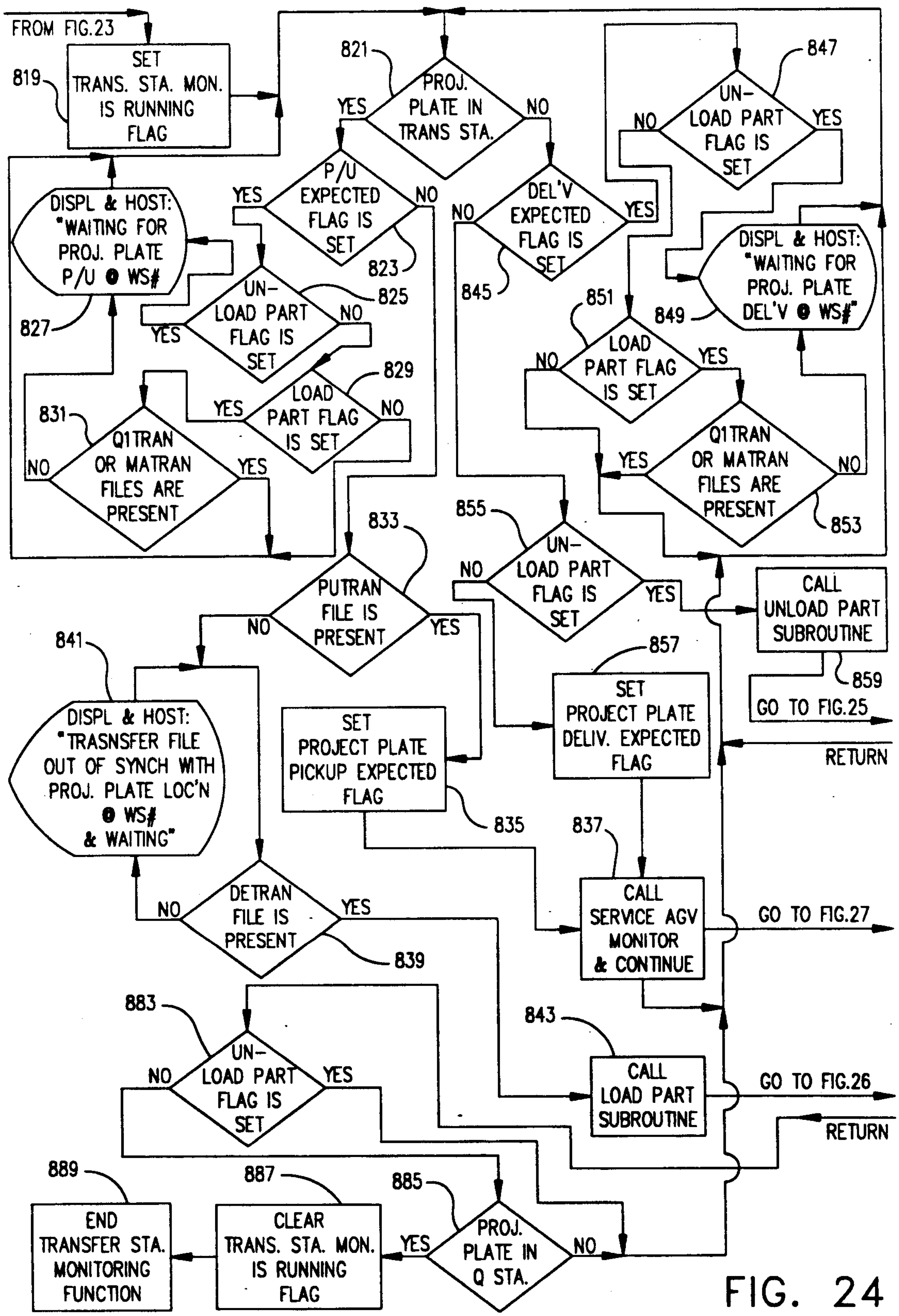

The transfer station monitor called at block 850 in FIG. 23 is shown in detail in FIG. 24. This monitor begins by setting the transfer station monitor is running flag in block 819. A check then is made in block 821 to see if there is a project plate in the transfer station. If there is, then a check is made at block 823 to see if a pickup expected flag is set. Setting the pickup expected flag is how the control remembers that it has a completed workpiece waiting for pickup. This flag also triggers a message to the host to send an AGV to pick up the part. If this flag is set, then a check is made in block 825 to see if the unload part flag is set. If that flag is set, then a display is made at block 827 that the workstation is waiting for a project plate pickup. A message to this effect is sent to the host and the routine of FIG. 24 returns to the input of block 821. If the unload part flag is not set, as determined at block 825, then a check is made at block 829 to see if a load part flag is set. If it is set, a check is made at block 831 to see if a Q1TRAN or MATRAN transfer file is present. If the part status table does not show either of those designations then the display and message of block 827 are produced. If the part status table does show either of those two designations, then the routine of FIG. 24 returns to the input of block 821.

Figure 26:
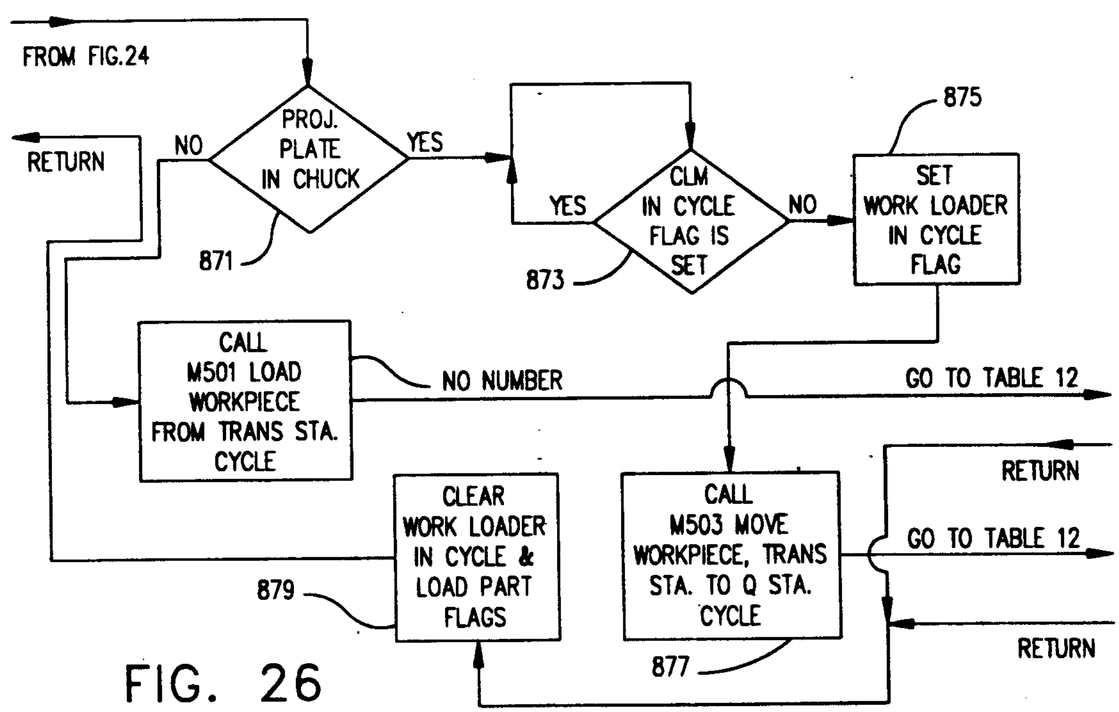
Figure 27:
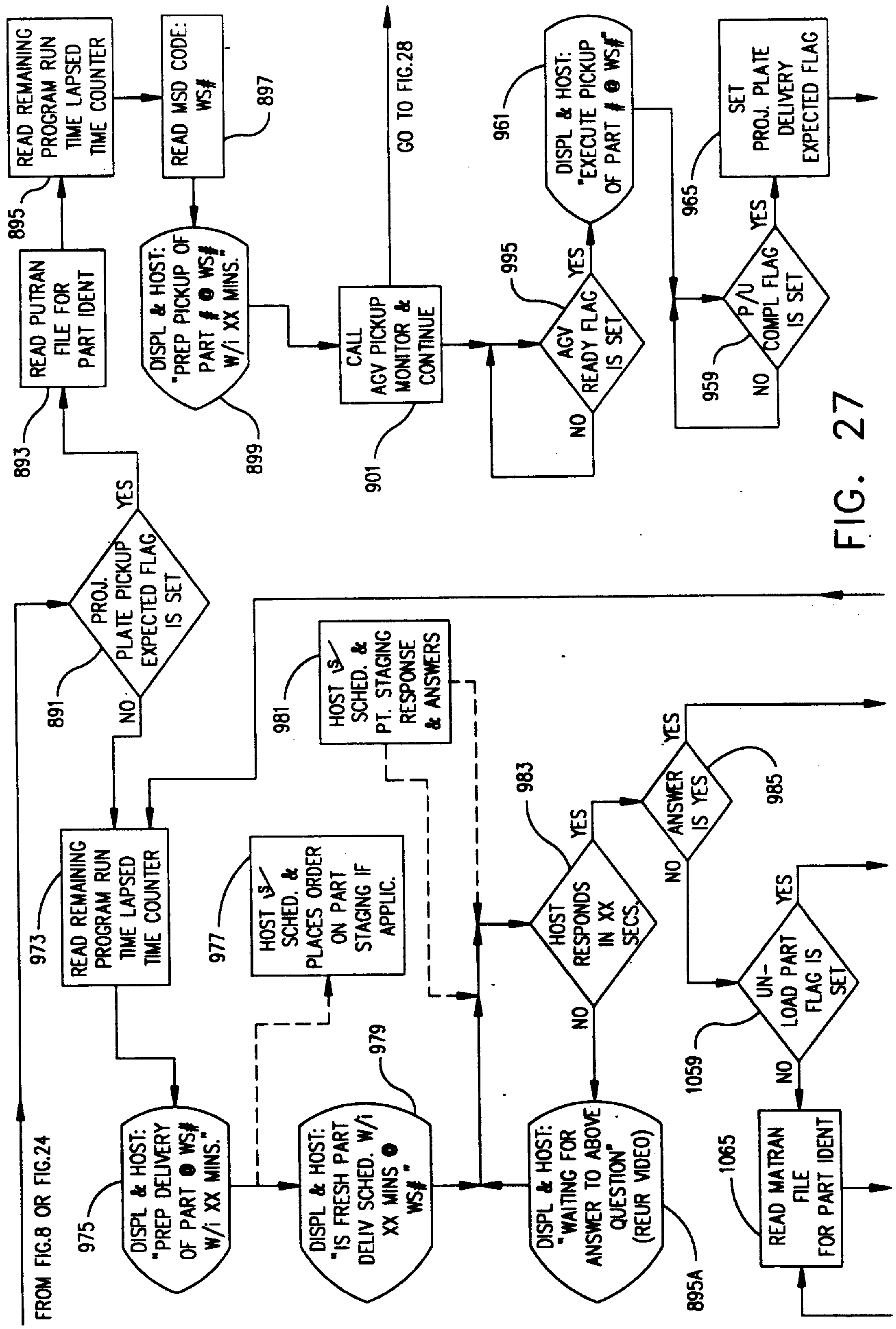
Figure 27A:
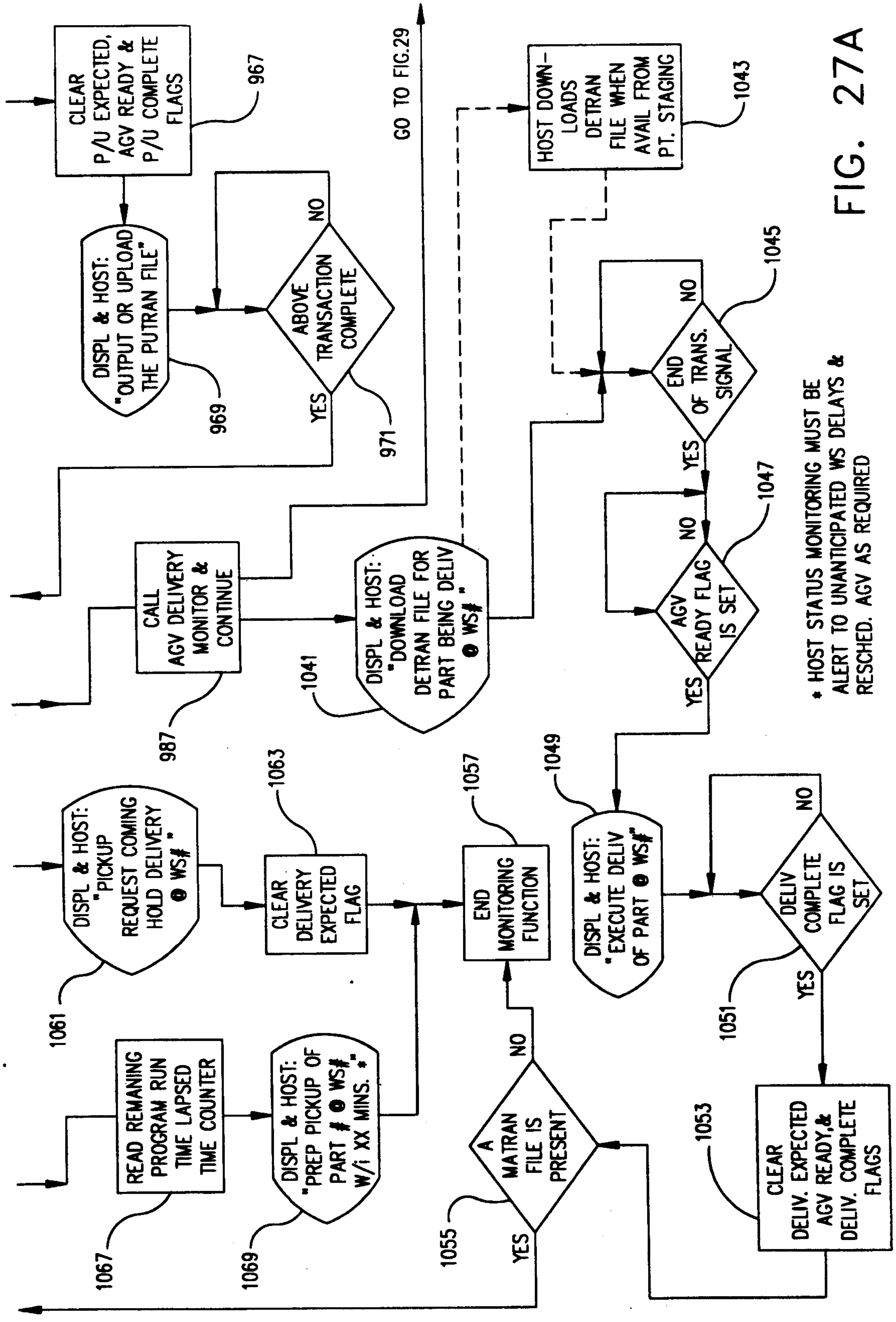

If the pickup expected flag is not set, as determined in block 823, then a check is made at block 833 to see if a PUTRAN transfer file is present, the name PUTRAN indicating that the corresponding workpiece is completed, on the transfer station, and ready to pick up. If there is a PUTRAN file, then the project plate pickup expected flag is set in block 835. The service AGV monitor shown in FIG. 27 is called in block 837. If a PUTRAN file is not present, as determined in block 833, then a check is made in block 839 to see if there is a DETRAN file present, indicating that there is a workpiece which has been delivered to the transfer station and is awaiting machining. If there is no DETRAN file, a display is made at the workstation in block 841 that the transfer file is out of synch with the project plate location. A message is sent to the workstation to this effect. The routine of FIG. 24 then makes the check of block 839. When there is a DETRAN file, as determined in block 839, then a load part subroutine shown in FIG. 26 is called in block 843.

If there is no project plate in the transfer station, as determined at block 821 in FIG. 24, then a check is made at block 845 to see if the delivery expected flag is set. If it is set, a check is made at block 847 to see if the unload part flag is set. If the unload part flag is set, then a display is made at block 849 to the effect that the workstation is waiting for a project plate delivery. A message to this effect is sent to the host, after which the routine of FIG. 24 returns to the input of block 821. If the unload part flag is not set, as determined at block 847, then a check is made at block 851 to see if the load part flag is set. If this flag is set, then a check is made at block 853 to see if there is a Q1TRAN file or a MATRAN file present. If any of these files is present, the routine of FIG. 24 returns to the input of block 821. If none of these files is present, then the display and message of block 849 are produced.

Figure 25:
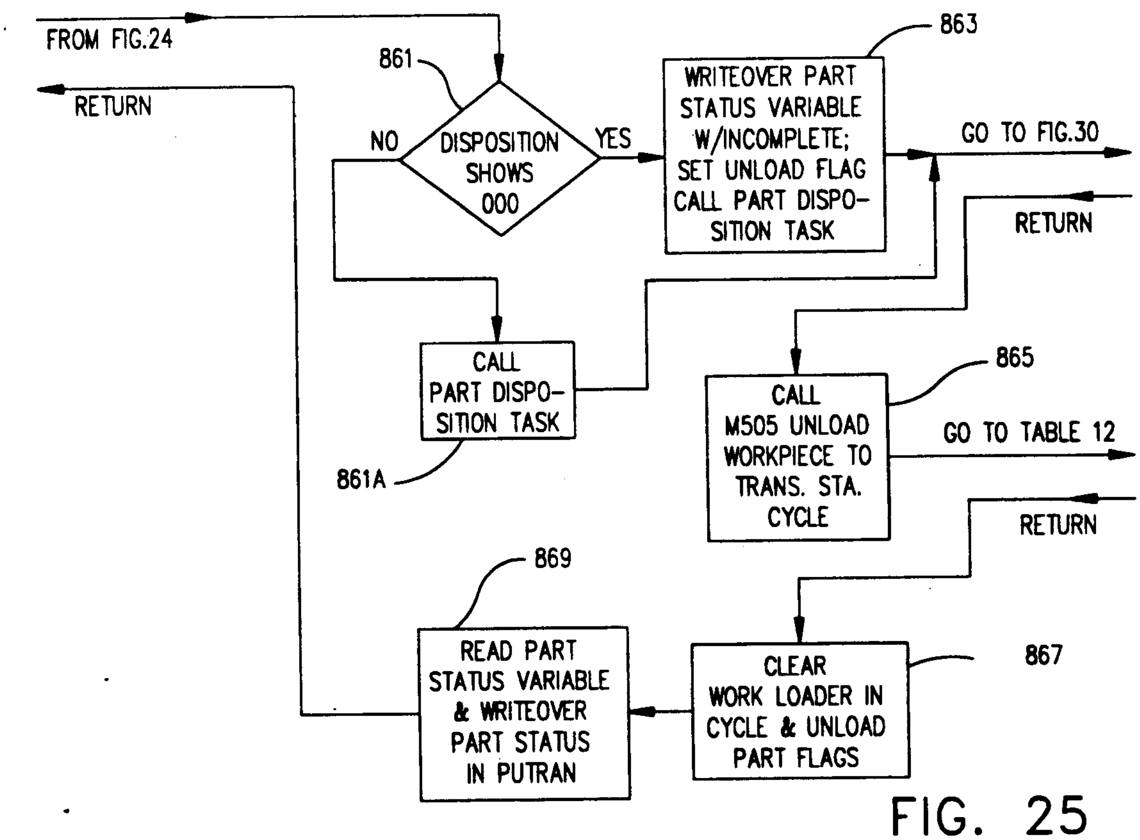

If the delivery expected flag is not set, as determined in block 845, then a check is made at block 855 to see if the unload part flag is set. If it is not set, then the project plate delivery expected flag is set in block 857 and the service AGV monitor routine of FIG. 27 is called in block 837. If the unload part flag is set, as determined in block 855, then the unload part subroutine of FIG. 25 is called in block 859.

Figure 30:
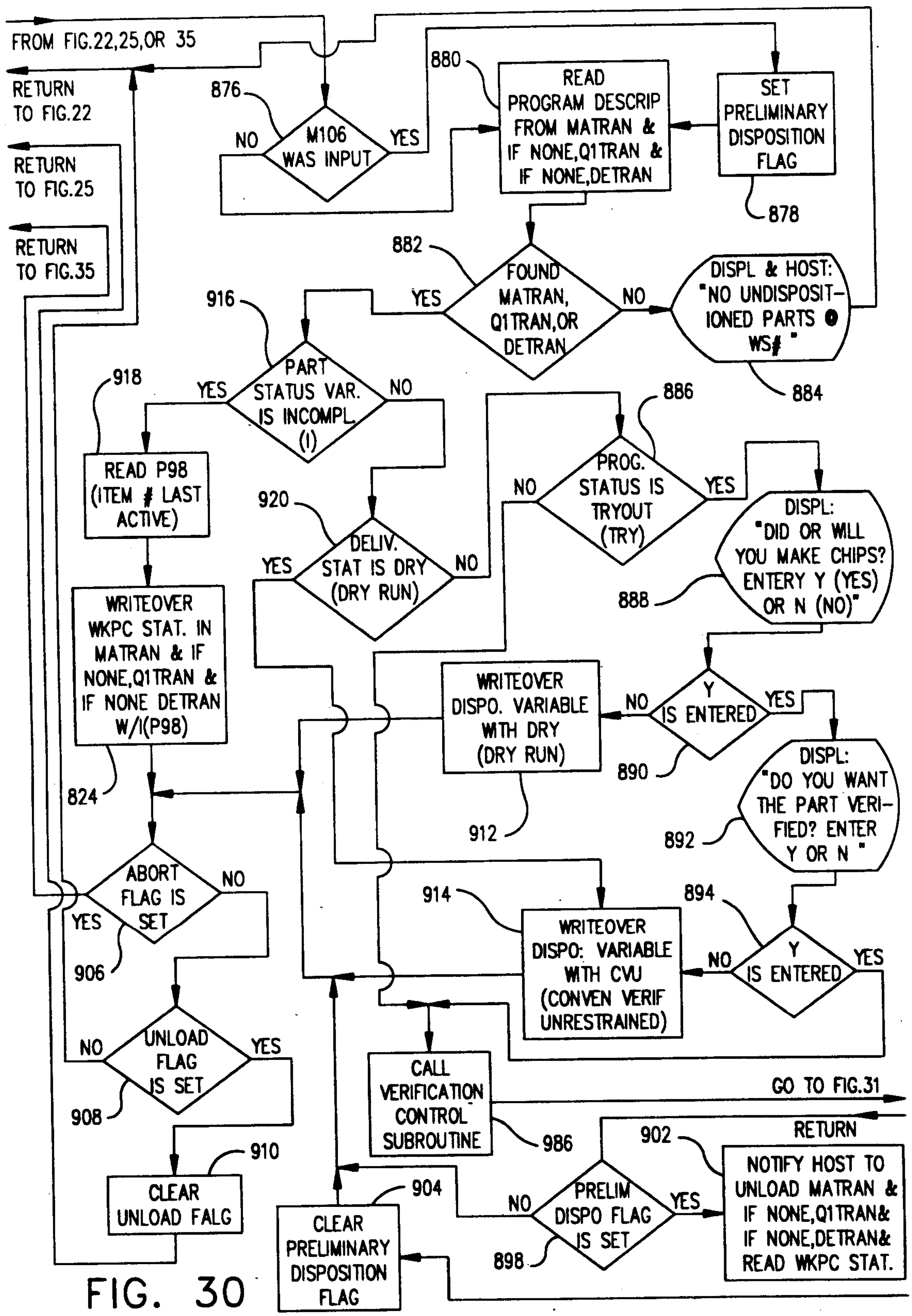

The unload part subroutine insures that the workpiece is dispositioned, i.e. the host knows what to do with it next, when it leaves the workstation. The unload part subroutine of FIG. 25 called at block 859 in FIG. 24 begins at block 861 where a check is made to see if the workpiece has a 000 status i.e. it has not been dispositioned. If it has not been dispositioned, the part status variable is written over with "incomplete", the unload part flag is set, and the part disposition task of FIG. 30 is called in block 863. Once that part disposition task is completed, the subroutine of FIG. 25 is returned to at block 865. If the workpiece does not have a 000 status, then the part disposition task is called at block **861*a*. When that task is completed, the unload part subroutine is returned to at block 865 which causes the workpiece to be unloaded from the spindle and placed in the transfer station. The details of this procedure are described in Table 12. When the workpiece has been unloaded, a workloader in cycle flag is cleared in block 867. The workloader in cycle flag is set whenever the workloader is in operation. It is used to signal the control not to do any probing when the workloader is in operation. The unload part flag is also cleared in block 867. The part status variable is read at block 869. Also at block 869, the part status in the PUTRAN file is written over with the data of the part status variable. The subroutine o FIG. 25 then returns to the routine of FIG. 24 at the input of block 821**.

The load part subroutine of FIG. 26 called at block 843 in FIG. 24 begins at block 871 where a check is made to see if there is a project plate in the chuck. If there is, then a check is made at block 873 to see if a closed loop machining in cycle flag is set. The CLM in cycle flag is set whenever probing is taking place. It is used to signal the control not to operate the workloader while probing is taking place. The routine of FIG. 26 returns to the input of block 873 until the closed loop machining in cycle flag is not set, meaning that closed loop machining is completed, at which time the workloader in cycle flag is set in block 875 and a procedure to move the workpiece from the transfer station to the queue station is initiated in block 877. This procedure is described in detail in Table 12. When this procedure is completed, the workloader in cycle flag and the load part flag are cleared in block 879 and the subroutine of FIG. 26 returns to the transfer station monitor of FIG. 24. If there is no project plate in the chuck, as determined at block 871, then a procedure is initiated at block 881 which will load a workpiece from the transfer station onto the chuck. The details of this procedure are described in Table 12. When this procedure is completed, the operation of block 879 described above is carried out and the subroutine of FIG. 26 returns to the transfer station monitor of FIG. 24.

When the transfer station monitor is returned to from the subroutine of FIG. 26, a check is made at block 883 to see if the unload part flag is set. If it is set, the routine of FIG. 24 returns to the input of block 821. If the unload part flag is not set, then a check is made at block 885 to see if there is a project plate in the queue station. If there is no project plate in the queue station, then the routine of FIG. 24 returns to the input of block 821. If there is a project plate in the queue station, then the transfer station monitor running flag is cleared in block 887 and the transfer station monitoring function is ended at block 889.

The service AGV monitor called in block 837 in FIG. 24 is shown in detail in FIG. 27. The service AGV monitor requests AGV service to pick up completed workpieces, calls an AGV pickup monitor subroutine to accomplish pickup interface logic, uploads the PUTRAN file, requests delivery of another workpiece, calls an AGV delivery monitor subroutine to accomplish delivery interface logic, and down loads the DETRAN file. In the event that another workpiece is not delivered before the workpiece in the machine is completed, it checks with the host to determine if another workpiece is on the way, and if so, prohibits the unloading of the workpiece on the machine until the workpiece on the way is delivered. The service AGV monitor begins at block 891, where a check is made to see if the project plate pickup expected flag is set. If that flag is set, the routine of FIG. 27 reads the part identification in the PUTRAN file at block 893. Then, the routine reads the remaining program run time lapsed time counter in block 895 and reads the MSD code for the workstation number in block 897. A display is made at block 899 to prepare for pickup of the part at the workstation within a predetermined period of time (XX minutes). This message is sent to the host.

Figure 28:
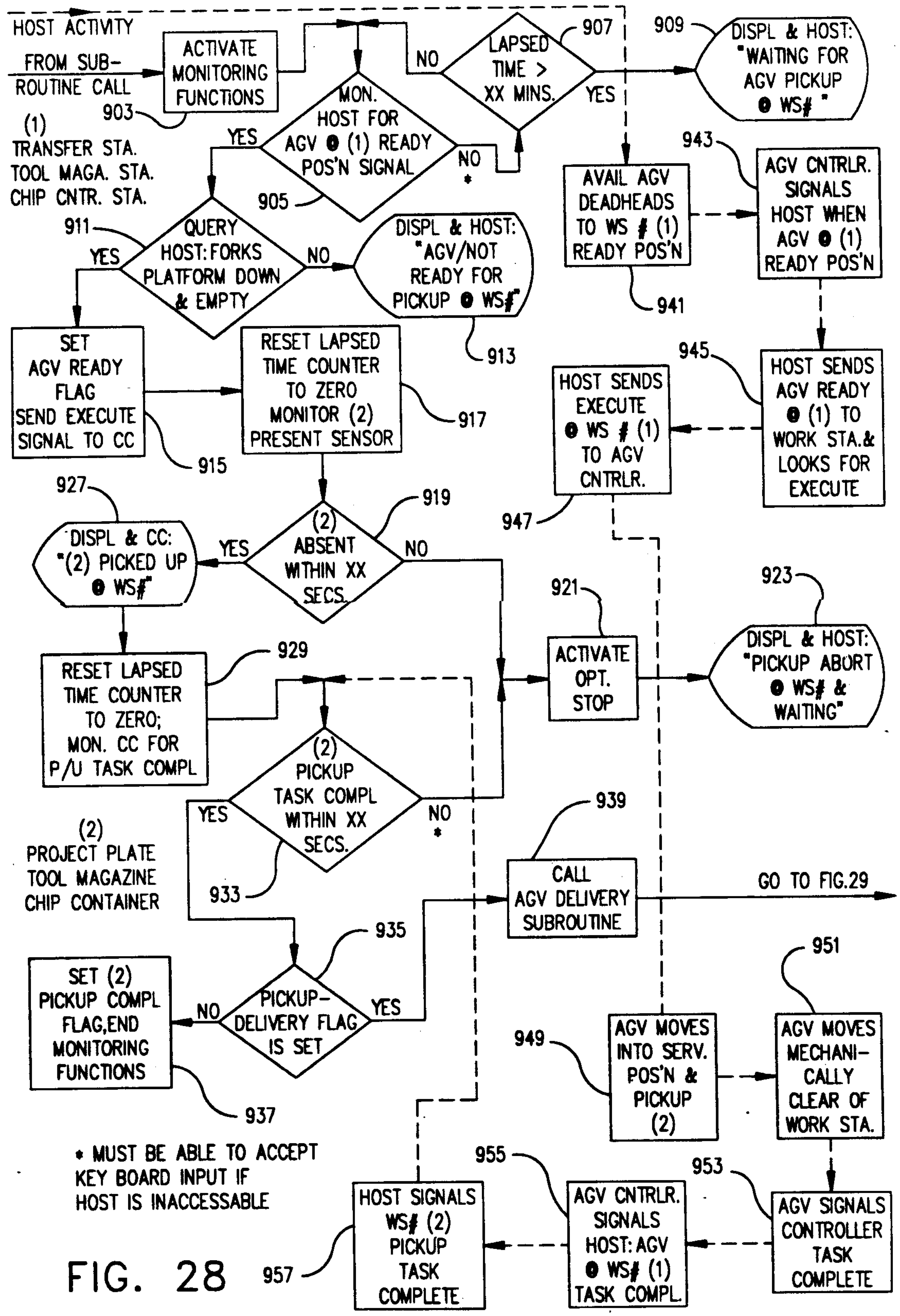

The AGV pickup monitor of FIG. 28 then is called in block 901. The AGV pickup monitor, when activated, watches the host for a signal that an AGV is at the READY position prepared to make a pickup. When the host so reports, the AGV pickup monitor starts a timer and sets the AGV READY flag to so notify the subroutine that requested the AGV service. Then the AGV pickup monitor watches the work station present/seated sensors for an absent signal and the host for a pickup completed signal. When both are true, it sets the pickup completed flag to so notify the requesting subroutine, if the timer has not run out. The AGV pickup monitor begins a block 903 where monitoring functions are activated and a lapsed time counter is set to zero. A test is made at block 905 to see if an AGV is ready to make a pickup at either the transfer station, the tool magazine station, or the chip container station, whichever is appropriate. If there is no AGV ready to make a pickup, a check is made in block 907 to see if the lapsed time is greater than a predetermined amount of time. If not, the routine returns to the input of block 905. If the predetermined amount of time has elapsed, then at block 909 a display is made at the workstation and a message is sent to the host that the workstation is waiting for a pickup. The routine then returns to the input of block 905.

When it is determined in block 905 that an AGV is ready to make a pickup, the host may be queried in block 911 to see if the forks or platform of the AGV is empty and located in a down position. Any known position sensing mechanism, such as a switch at an appropriate location on the AGV, may be used to sense the position of the forks or platform. If not, at block 913, a display may be made at the workstation and a message sent to the host that the AGV is not ready to make a pickup. When the AGV is ready, as determined in block 911, then the AGV ready flag is set in block 915, and the subroutine requesting the AGV service detects the flag and sends an execute command to the host. The lapsed time counter is set to zero in block 917. Also at block 917, a sensor is monitored. The sensor may be any known presence sensing mechanism, such as a switch at an appropriate location, that indicates the presence or absence of a project plate, tool magazine, or chip container, whichever is being picked up, at its proper location in the workstation. A check is made at block 919 to see if the item being picked up from the workstation is removed from its place in the workstation within a predetermined time (XX seconds). If the item is not removed within the predetermined time, then an optional stop (OPT STOP) condition is activated in block 921 and a display is made at the workstation and a corresponding message sent to the host, at block 923, that there has been an aborted pickup at the workstation. OPT STOP is a non-emergency way of stopping the machine. When OPT STOP is activated, the machine will stop machining when it reads an M01 command in the part program. Typically, a program contains OPT STOP commands just before and after each cutting sequence and each time the turret is moved to "home" position. If the item to be picked up has been removed from the workstation within the predetermined time, as determined at block 919, then a display is made at the workstation and a corresponding message is sent to the host, at block 927, that the item was picked up. The lapsed time counter then is reset to zero in block 929 and the host is monitored for an indication that the pickup task has been completed. A check is made at block 933 to see if a pickup task complete signal is received from the host within a predetermined period of time (XX seconds). If that signal is not so received, then the optional stop operation of block 921 is carried out and the display and message of block 923 are produced. If that signal is received within the predetermined time period, then a check is made at block 935 to see if the pickup delivery flag is set. In some cases, such as tool magazine replacement and chip container replacement, a delivery is needed immediately following pickup and the request made of the host for such delivery ought to be made as quickly as possible. When such is the case, a pickup delivery flag is set to "short-circuit" the time and steps of another pass through the logic needed to set a delivery needed flag. If the pickup delivery flag is not set, as determined in block 935, then a pickup at appropriate station complete flag is set at block 937 and the monitoring functions of FIG. 28 are ended. If the pickup delivery flag is set, as determined in block 935, the AGV delivery routine of FIG. 26 is called in block 939.

While the AGV pickup monitor is running, in block 941, an empty AGV deadheads to a ready position near the workstation. In block 943, the AGV controller 18 signals the host when the AGV has reached the ready position. The host, in block 945, then sends a signal to the workstation that an AGV is at the ready position. The host looks for a command from the workstation controller to execute the pickup, the execution command being sent by the host to the AGV controller 18 in block 947. In block 949, the AGV moves into a service position where it actually picks up its intended cargo. The AGV then moves clear of the workstation in block 951 and signals its controller that the task is complete in block 953. The AGV controller then signals the host that the pickup task is complete in block 955 and the host signals the workstation of that fact in block 957. This completion of the pickup task is monitored in block 933 as shown in FIG. 28.

When the AGV pickup monitor is called in block 901 in FIG. 27, a check is made to see if the AGV ready flag is set in block 959. The routine of FIG. 27 loops back to the input of block 959 until that flag is set. When it is set, at block 961, a display is made at the workstation and a corresponding message is sent to the host to make a part pickup. At block 963 a check is made to see if the pickup complete flag is set. The routine of FIG. 27 loops back to the input of block 963 until that flag is set. When it is set, the project plate delivery expected flag is set in block 965 and the pickup expected flag, the AGV ready flag, and the pickup complete flag are cleared in block 967. At block 969, a display is made at the workstation and a message sent to the host to output or upload the PUTRAN file. Block 971 monitors the completion of the operations indicated in the display and message of block 969.

When those operations are complete, or when it is found in block 891 that the project plate pickup expected flag is not set, the remaining program run time elapsed time counter is read at block 973. A display is made at the workstation and a message sent to the host at block 975 to prepare for delivery of a part to the workstation within a predetermined amount of time (XX minutes). The host, at block 977, checks its schedule and places an order for a part with the part staging area in the factory. At block 979, a display is made at the workstation and a message sent to the host asking if a fresh part is scheduled to be delivered within the predetermined time period. The host checks its schedule and the response from the part staging area in block 981 and answers the query of block 979. Block 983 checks to see if the host provides that answer within a predetermined time period (XX seconds). If it is not received within the predetermined time period, a display is made at the workstation and a corresponding message is sent to the host in block **985*a* that the workstation is waiting for a response to the question of block 979. When the host responds, as determined in block 983, a check is made at block 985 to see if the answer is yes. If it is yes, the AGV delivery monitor of FIG. 29 is called in block 987**.

The AGV delivery monitor of FIG. 29, when activated, watches the host for a signal that an AGV is at the READY position prepared to make a delivery. When the host so reports, the AGV delivery monitor starts a timer and sets an AGV ready flag to so notify the subroutine that requested AGV service. Then the AGV delivery monitor watches the work station present/seated sensors for a present signal and the host for a delivery completed signal. When both are true, it sets a delivery completed flag to so notify the requesting subroutine, if the timer has not run out. The AGV delivery monitor begins at block 989 where a lapsed time counter is set to zero. A test is made at block 991 to see if an AGV is ready to make a delivery at either the transfer station, the tool magazine station, or the chip container station, whichever is appropriate. If there is no AGV ready to make a delivery, a check is made in block 993 to see if the lapsed time is greater than a predetermined amount of time. If not, the routine returns to the input of block 991. If the predetermined amount of time has elapsed, then at block 995 a display is made at the workstation and a message is sent to the host that the workstation is waiting for a delivery. The routine then returns to the input of block 991.

When it is determined in block 991 that an AGV is ready to make a delivery, the host may be queried in block 997 to see if the forks or platform of the AGV is properly loaded and positioned in an up position. Any known sensing mechanism, such as appropriately located switches, may be used to sense these conditions. If not, at block 999, a display may be made at the workstation and a message sent to the host that the AGV is not ready to make a delivery. When the AGV is ready, as determined in block 997, then the AGV ready flag is set in block 1001 causing the subroutine requesting the AGV service to send an execute command to the host. The lapsed time counter is set to zero in block 1003. Also at block 1003, a sensor is monitored. The sensor may be any known presence sensing mechanism, such as a switch appropriately located, that indicates the presence of the delivered item at its proper location in the workstation. A check is made at block 1005 to see if the item being delivered to the workstation is properly located in its place in the workstation within a predetermined time (XX seconds). If the item is not present within the predetermined time, then an OPT STOP condition described above is activated in block 1007 and a display is made at the workstation and a corresponding message sent to the host, at block 1009, that there has been an aborted delivery at the workstation. If the delivered item is present at its proper location in the workstation within the predetermined time, as determined at block 1005, then a display is made at the workstation and a corresponding message is set to the host, at block 1011, that the item was delivered. The lapsed time counter then is reset to zero in block 1013 and the host is monitored for an indication that the delivery task has been completed. A check is made at block 1015 to see if a delivery task complete signal is received from the host within a predetermined period of time (XX seconds). If that signal is not so received, then the OPT STOP of block 1007 is carried out and the display and message of block 1009 are produced. If that signal is received within the predetermined time period, then a check is made at block 1017 to see if the delivery pickup flag is set. If it is not set, then a delivery at appropriate station complete flag is set at block 1019 and the monitoring functions of FIG. 29 are ended. If the flag is set, the AGV pickup routine of FIG. 28 is called in block 1021.

While the AGV delivery monitor is running, in block 1023, an AGV picks up a project plate, a tool magazine, or a chip container, whichever is called for, from its storage location remote from the workstation and moves to a ready position near the workstation. In block 1025, the AGV controller 18 signals the host when the AGV has reached the ready position. The host then sends a signal to the workstation in block 1027 that an AGV is at the ready position. The host looks for a command from the workstation controller to execute the delivery, which the host then sends to the AGV controller 18 in block 1029. In block 1031, the AGV moves into a service position where it actually delivers its cargo. The AGV then moves clear of the workstation in block 1033 and signals its controller that the task is complete in block 1035. The AGV controller then signals the host that the delivery task is complete in block 1037 and the host signals the workstation of that fact in block 1039. The completion of the delivery task is monitored in block 1015 as shown in FIG. 29.

While the AGV delivery monitor is running, after having been called in block 987, a display is made at the workstation and a message sent to the host to download the next DETRAN file to the workstation in block 1041. The host then downloads that DETRAN file when it is made available by the part staging controller, as indicated in block 1043. Completion of the downloading procedure is monitored in block 1045 and setting of the AGV ready flag is monitored in block 1047. When the downloading of the DETRAN file has been completed and when the AGV ready flag is set, a display is made at the workstation and a message sent to the host in block 1049 to execute delivery of the part to the workstation. The setting of a delivery complete flag is monitored in block 1051. When that flag is set, the delivery expected flag, the AGV ready flag, and the delivery complete flag are cleared in block 1053. A check then is made at block 1055 to see if there is a MATRAN file. If there is no MATRAN file, then the monitoring function of FIG. 27 is ended in block 1057.

If it is determined that the answer from the host is "no" in block 985, that is, there is no part scheduled to be delivered to the workstation, a check is made at block 1059 to see if the unload part flag is set. If this flag is set, a display is made at the workstation and a message sent to the host in block 1061 that a pickup request is coming and that the delivery should be held. The delivery expected flag is cleared in block 1063 and the monitoring function of FIG. 27 is ended in block 1057. If the unload part flag is not set, as determined in block 1059, or if there is a MATRAN file, as determined in block 1055, then the MATRA file is read at block 1065 for the part identification. Then, the remaining program run time lapsed time counter is read in block 1067. A display then is made at the workstation and a message is sent to the host at block 1069 to prepare for pickup of the part within a predetermined time period. The monitoring function of FIG. 27 then is ended in block 1057.

After completion of the part management task called by the part program in block 820 in FIG. 22, the part program inputs an M106 code at block 872 which instructs the controller to run a preliminary part disposition task. Input of an M106 code causes the calling of the part disposition task in block 874 of the part program.

The part disposition task is shown in FIG. 30. The part disposition task determines the probable part disposition near the beginning of the part program (preliminary part disposition) and notifies the host of the preliminary part disposition so that the host can schedule the part inspection facility in the factory. It also determines the final disposition on all parts, automatically, if the part is normal, and requires manual input if the part is out of tolerance or if the part is some kind of special case. It begins at block 876 where a check is made to see if an M106 code has been entered. If it has, a preliminary disposition flag is set in block 878. If there was no M106 code input, the preliminary disposition flag is not set. Then, the program description in the MATRAN file is read in block 880. If there is no MATRAN file, then the program description in the Q1TRAN file is read. If there is no Q1TRAN file, then the program description in the DETRAN file is read. A check is then made in block 882 to see if there is a MATRAN, Q1TRAN, or DETRAN file. If none were found, the routine of FIG. 30 displays in block 884 that there are no undispositioned parts at the workstation and then returns to the part program in FIG. 22.

Figure 31:
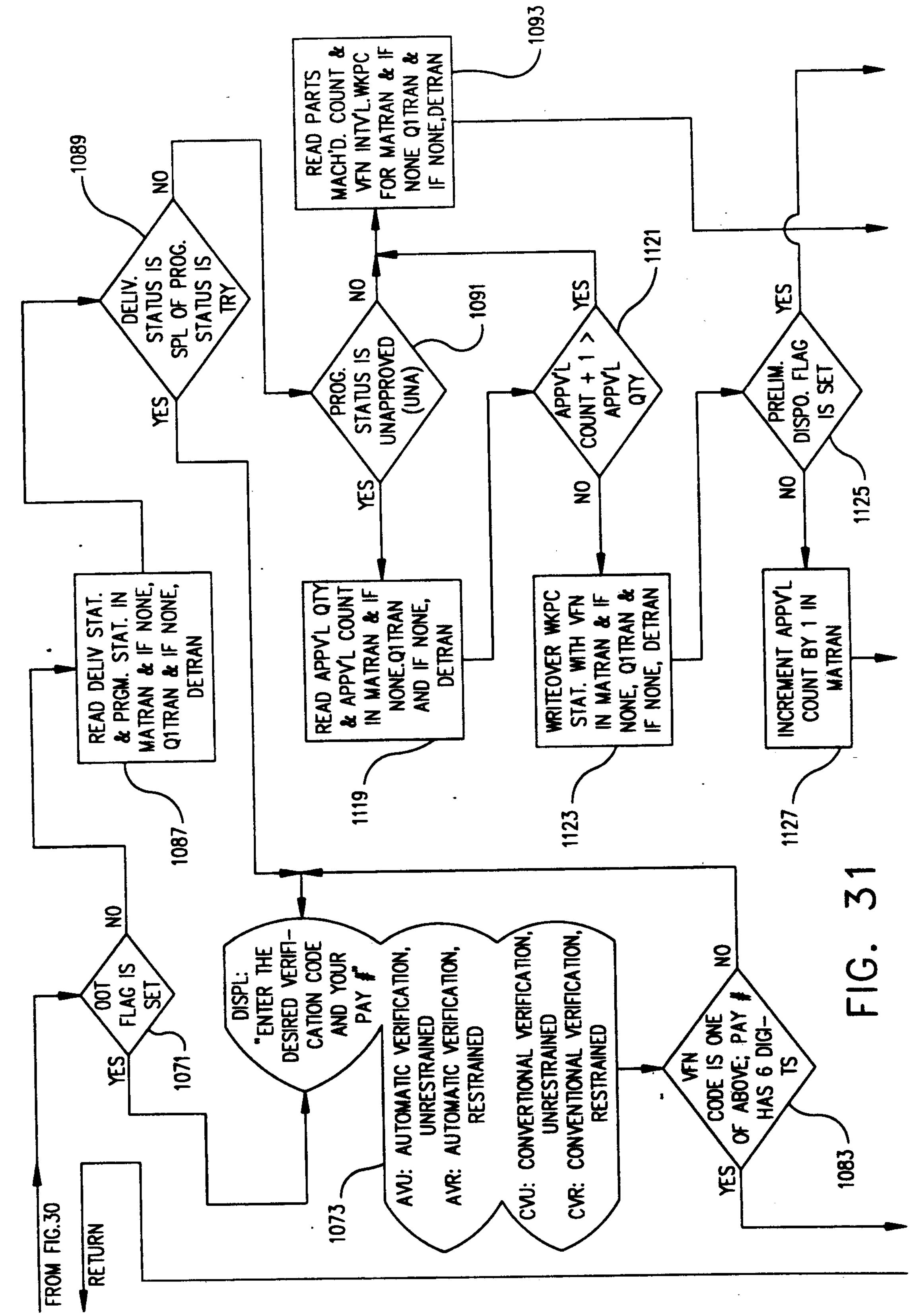
Figure 31A:
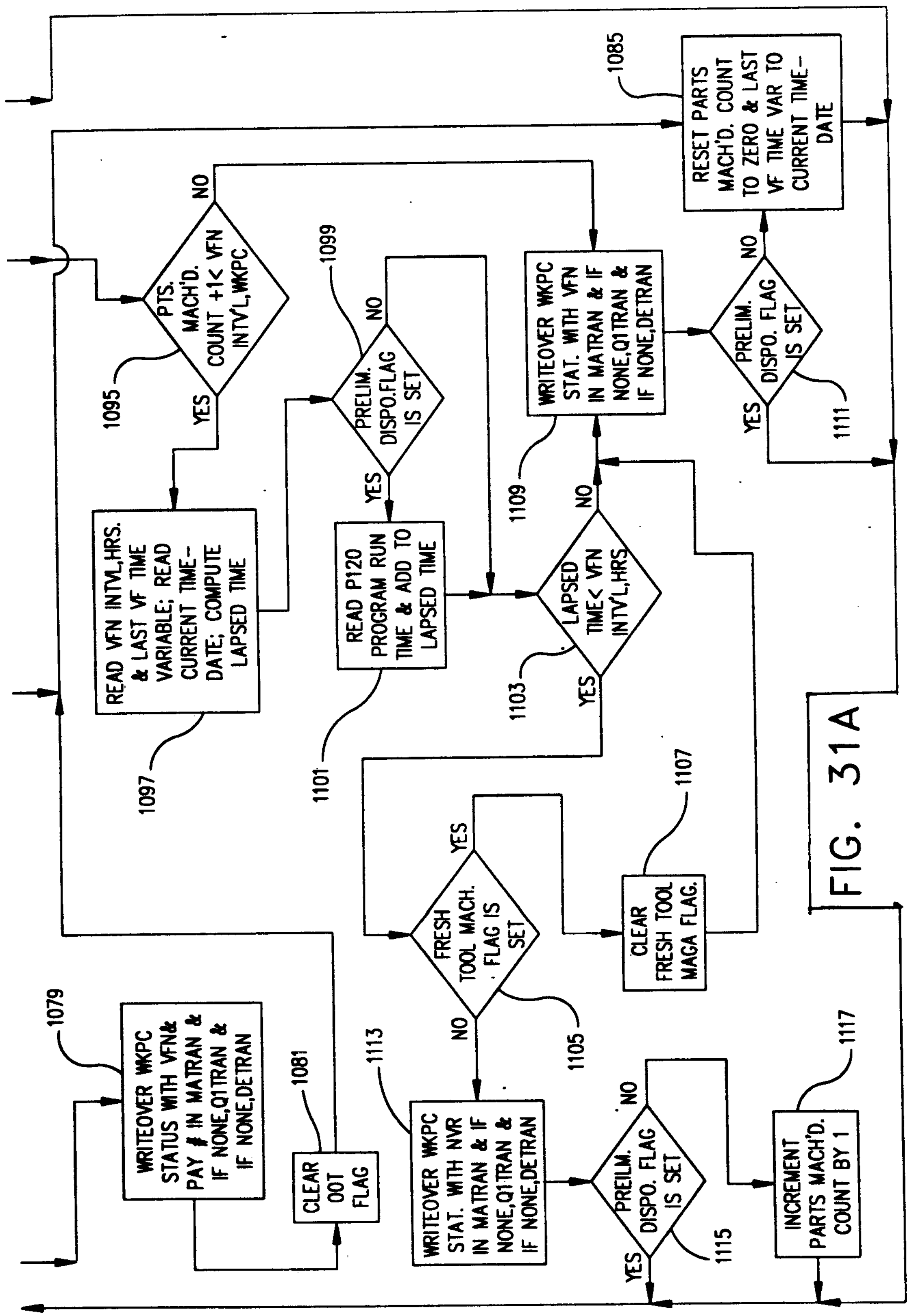

If a MATRAN, Q1TRAN, or DETRAN file is found, then a check is made in block 916 to determine if the part status variable is incomplete, i.e. if an ABORT command has been entered. If not, a check is made at block 920 to determine if the delivery status is dry run. If not, a check is made in block 886 to see if the part program being run is tryout TRY status. If so, at block 888, a display is made asking a question requesting a yes or no answer from an attendant regarding whether or not chips were or will be made by the part program. A check then is made at block 890 to see if yes has been entered. If yes has been entered, a display is made at block 892 asking a question requesting a yes or no answer from an attendant regarding whether or not the part made by the part program should be verified. A block 894 determines if yes is entered and, if it has, then a verification control subroutine shown in FIG. 31 is called in block 896. When the verification control subroutine is completed, the part disposition task is returned to in block 898 where a check is made to see if the preliminary disposition flag is set. If the flag is set, then the host is notified in block 902 to read the workpiece status in the MATRAN file. If there is no MATRAN file, then the workpiece status in the Q1TRAN file is read at block 902. If there is no Q1TRAN file, then the workpiece status in the DETRAN file is read at block 902. After the operation of block 902 is completed, the preliminary disposition flag is cleared in block 904. When the operation of block 904 is completed or when it is found in block 898 that the preliminary disposition flag is not set, the routine of FIG. 30 proceeds to block 906 where a check is made to see if the abort flag is set. The preliminary disposition flag is a means of getting the logic to skip certain actions that must be done when determining final disposition, such as resetting the parts machined counter and resetting the current time and date variable. The abort flag is set by inputing an M113 code and is primarily a means of selecting a desired route through the logic steps instead of repeating many of the logic steps which would require a greater amount of memory. If the abort flag is set, the routine of FIG. 30 returns to the abort task of FIG. 35 to the next operation to be performed in that task after the abort task's call of the part disposition task. If the abort flag is not set, a check is made at block 908 to see if the unload flag is set. If the unload flag described above is not set, the routine of FIG. 30 returns to the part program in FIG. 22. If the unload flag is set, it is cleared in block 910 and the routine of FIG. 30 returns to the unload part subroutine of FIG. 25 to the next operation in that subroutine after its call of the part disposition task.

If no is entered by the attendant, as determined at block 890, then the part disposition variable is written over at block 912 with a code DRY indicating that this is to be a dry run of the part program with no machining of parts. The operations of block 906 and successive blocks described above are then carried out. If no is entered by the attendant, as determined at block 894, then the part disposition variable is written over at block 914 with a CVU code indicating that the part machined with the part program is to be removed from its holding fixture and sent for conventional inspection (as opposed to automatic inspection).

If a MATRAN, Q1TRAN, or DETRAN file is found in block 882, then the part disposition task proceeds to the input of block 916. If the determination made in block 916 is that the part status variable is incomplete (I), then a P98 code is read at block 918 which is the last active item number. In block 924, the P98 code read in block 918, is used to write a part status of Ixx, where the value of P98 is substituted for xx, in the MATRAN file. The operations of block 906 and subsequent blocks described above are then carried out after the operation of block 924 is completed.

The verification control subroutine called in block 896 in FIG. 30 is shown in detail in FIG. 31. The verification control subroutine of FIG. 31 insures that the process inspection plan, specified in the MATRAN file, is carried out by forcing a human disposition input when needed or by entering a machine disposition in the MATRAN file if the workpiece is acceptable to the Closed Loop Machining (automatic) inspection procedure and its process is approved for automatic processing. The first step after the subroutine call is a check in block 1071 to see if the out of tolerance (OOT) flag is set. When the control reads on M105 (Data Management task command) it, among other things, checks the data for out of tolerance conditions, and if any are found, it sets the OOT flag which warns other sections of the logic to take appropriate action. If it is set, then a display is made at the workstation in block 1073 that the attendant should enter a desired verification code and an identification number such as his pay number. The possible verification codes are as follows: AVU—automatic verification, unrestrained, i.e. remove the part from fixture and send it to the automatic coordinate measuring machine; (2) AVR—automatic verification, restrained, i.e. leave part in fixture and send it to the automatic coordinate measuring machine; (3) CVU—conventional verification, unrestrained, i.e. remove part from fixture and send to a conventional inspection area; and (4) CVR—conventional verification, restrained, i.e. leave part in fixture and send to a conventional inspection area.

After the display of block 1073, a check is made in block 1083 to see if the verification code entered was one of the ones of block 1073 and that the identification number entered contained the correct quantity of digits. If this check fails, the logic returns to block 1073, where the display produced by the block is maintained. When the VFN code and identification number have been entered successfully, as determined in block 1083, the workpiece status in the MATRAN file is written over with the VFN code and identification number at block 1079. If there is no MATRAN file, then the write over operation of block 1079 is carried out on the Q1TRAN file. If there is no MATRAN or Q1TRAN file, then the write over operation of block 1079 is carried out on the DETRAN file. At the completion of the operation of block 1079, the out of tolerance flag is cleared at block 1081 and the routine of FIG. 31 resets the parts machined count to zero in block 1085. The parts machined count is where the control keeps a record of the quantity of parts it has machined after designating a sample part for verification or inspection. This allows it to designate sample parts for inspection on a parts count basis. Block 1085 also sets the last verification time variable to the current time and date. The last verification time variable is where the control keeps a record of the time-date it last sent a part for verification. This allows it to designate sample parts for inspection on a time basis. The routine of FIG. 31 then returns to block 898 in the part disposition task of FIG. 30.

If it is determined in block 1071 that the out of tolerance flag is not set, then at block 1087 the delivery status code and the program status code for the MATRAN file are read. The delivery status code is supplied by the transfer file and can be any one of the codes described in Table 4. The program status codes also are described in Table 4. If there is no MATRAN file, then those two parameters are read from the Q1TRAN file. If there are no MATRAN or Q1TRAN files, then the parameters identified in block 1087 are read from the DETRAN file. Next, a check is made at block 1089 to see if one of the following is true; (1) the delivery status is SPL, that is, special verification is required, as explained in Table 4, or (2) the program status is TRY, also explained in Table 4. If either of these conditions is true, the display of 1073 is made and the operations of the successive blocks described above are carried out. If neither of these conditions is present, a check is made at block 1091 to see if the program status is unapproved (UNA) as explained in Table 4. If the program status in not a UNA status as determined in block 1091, the parts machined count and the verification interval, workpiece, data is read from the MATRAN file in block 1093. If there is no MATRAN file, then the read operation of block 1093 is carried out on a Q1TRAN file. If there is neither a MATRAN file nor a Q1TRAN file, then the read operation of block 1093 is carried out on a DETRAN file.

After the operation of block 1093 is completed, a check is made at block 1095 to see if the parts machined count plus 1 is less than the verification interval, workpiece. If so, the verification interval, hours, variable and the last verification time variable are read at block 1097. Also at block 1097, the current time and date is read and the lapsed time is computed. Then a check is made to see if the preliminary disposition flag is set in block 1099. If it is set, the program run time is read in block 1101 and this program run time (P120) is added to the lapsed time. After the operation of block 1101, or if the determination of block 1099 indicates that the preliminary disposition flag is not set, the routine of FIG. 31 makes a check at block 1103 to see if the lapsed time is less than the value of the verification interval, hours, variable. If that is the case, a check is made in block 1105 to see if the fresh tool magazine flag is set. If the fresh tool magazine flag is set, then it is cleared in block 1107 and the workpiece status is written over with the VFN code in the MATRAN file in block 1109. If there is no MATRAN file, the write over operation of block 1109 is carried out on a Q1TRAN file. If there is neither a MATRAN file nor a Q1TRAN file, then the operation of block 1109 is carried out on a DETRAN file. As shown in FIG. 31, the operation of block 1109 also is carried out if the determination made in block 1103 indicates that the lapsed time is not less than the value of the VFN time interval, hours, variable. After the completion of the operation of block 1109, a check is made in block 1111 to see if the preliminary disposition flag is set. If it is set, then the routine of FIG. 31 returns to the input of block 898 in FIG. 30. If the preliminary disposition flag is not set then the operation of block 1085 described above is carried out before returning to block 898 in FIG. 31.

If the determination made in block 1105 indicates that the fresh tool magazine flag is not set, then the routine of FIG. 31 writes over in block 1113 the workpiece status in the MATRAN file with an NVR code, meaning no verification is required. If there is no MATRAN file, then the operation of block 1113 is carried out on a Q1TRAN file. If there is no MATRAN file or a Q1TRAN file, then the operation of block 1113 is carried out on the DETRAN file. After the completion of the operation of block 1113, a check is made at block 1115 to see if the preliminary disposition flag is set. If it is set, then the routine of FIG. 31 returns to the routine of FIG. 30 as described above. If the preliminary disposition flag is not set, the routine of FIG. 31 increments the parts machined count by one in the MATRAN file in block 1117 before returning to the routine of FIG. 30.

If the program status is unapproved (UNA), as determined in block 1091, then the routine of FIG. 31 reads in block 1119 the approval quantity and the approval count from the MATRAN file. The approval count is where the control keeps a record of the quantity of parts it has designated for verification when working on the approval quantity required to obtain part program approval (APD program status) from the MATRAN file. If there is no MATRAN file, then the routine of FIG. 31 reads these two values from the Q1TRAN file. If there is neither a MATRAN file nor a Q1TRAN file, then the routine reads the two values from the DETRAN file. A check then is made at block 1121 to see if the approval count plus one is greater than the approval quantity. If this is the case, the operation of block 1093 and successive blocks are carried out as described above. If the approval count plus one is not greater than the approval quantity, the workpiece status is written over in block 1123 with VFN in the MATRAN file. If there is no MATRAN file, then the operation of block 1123 is carried out on the Q1TRAN file. If there is neither a MATRAN file nor a Q1TRAN file, then the operation of block 1123 is carried out on a DETRAN file.

After the operation of block 1123 is completed, a check is made at block 1125 to see if the preliminary disposition flag is set. If the flag is set, the routine of FIG. 31 returns to the routine of FIG. 30. If the flag is not set, the approval count table is incremented by one in block 1127 in the MATRAN file. Then the routine of FIG. 31 proceeds to block 1085 where its operation and the operation of successive blocks are carried out as described above.

When the part program of FIG. 22 is returned to after the part disposition task is completed pursuant to the call of block 874 and when the work station control is on line, i.e. communicating with the host, the part program inputs a command to perform the second half of the part location offsetting operation in block 938. A test then is performed at block 940 to see if the workpiece is properly seated on the chuck. If a seating tolerance is not met, then the program inputs an instruction (M504 code) in block 942 to reseat the workpiece. Seating is checked by probing a face surface and a circumferential surface on the part or fixture, i.e. face and radial runout or TIR (Total Indicator Reading) checks are made. This is done by probing the part, rotating the spindle, e.g. 15 degrees, and probing again. This rotation and probing are repeated until the spindle has made one complete revolution. Then the difference between the maximum and minimum readings are compared with tolerance limits. The part management task of FIG. 23 then is called in block 944. After completion of the part management task, the part program again inputs an instruction that the second half of the part location offsetting should be performed in block 946. Another test is made at block 948 to see if the seating tolerance is met. If not, a display is made at block 950 that the project plate is not seated and the workstation is waiting. A message to that effect is sent to the host.

If the seating tolerance is met as determined in either of block 940 or 948, then the part program inputs, in block 952, a command to close the door enclosing the machining environment (M202) and a command to enable the chip conveyor (M203). The part program then issues the necessary series of commands in block 954 to rough machine the part, which is accomplished by the operating MCL as is known in the art. Meanwhile, the automation MCL is responsive to tool break sensors and adaptive overload sensors, as indicated in block 956, during the rough machining operation.

Figure 32:
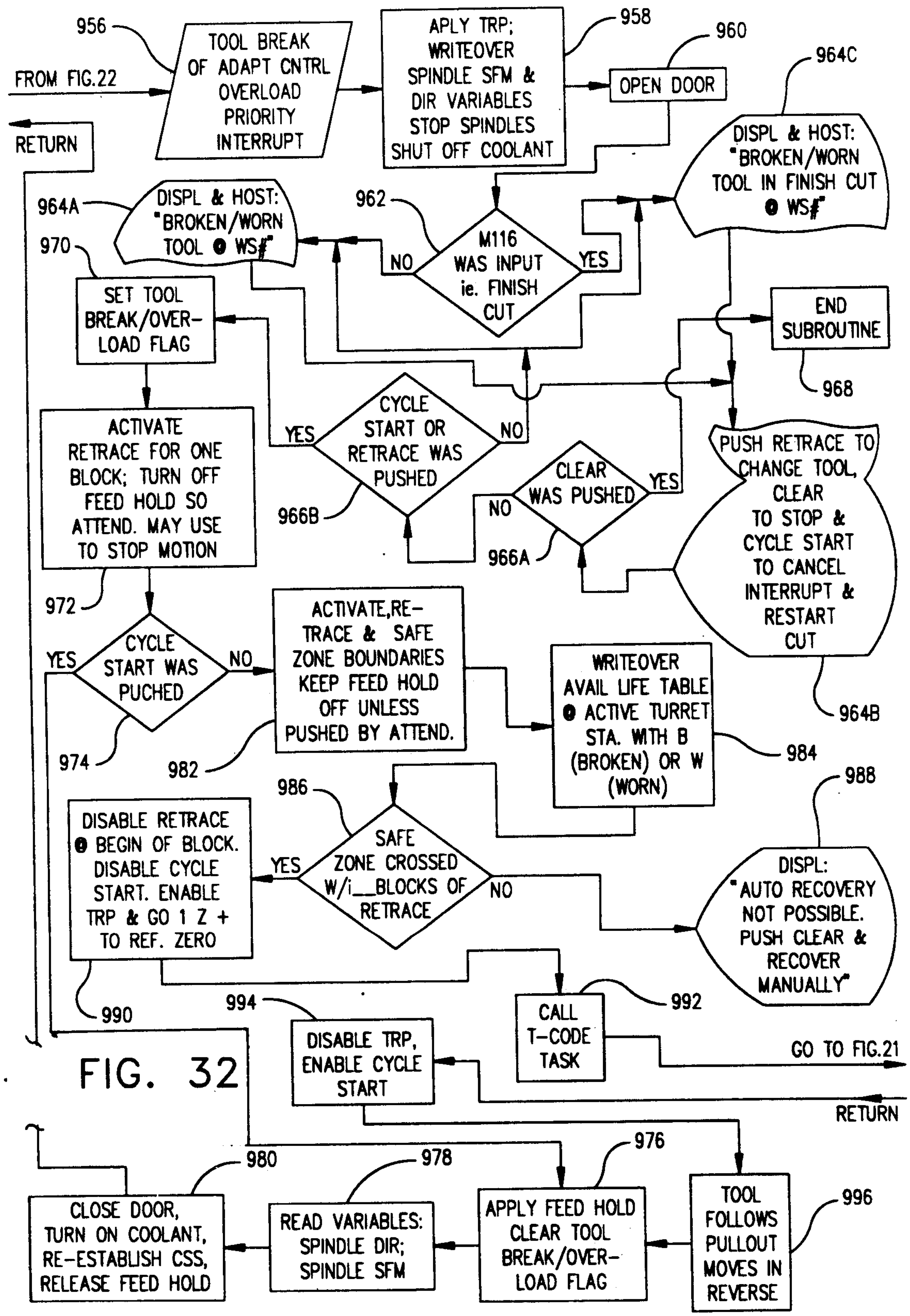

If sensors on the machine indicate that the tool is broken or it has worn out, a broken/worn tool interrupt subroutine is called. This subroutine is shown in FIG. 32. This subroutine permits automatic replacement of the cutting tool and resumption of the machining process following detection of a broken or worn out cutting tool in accordance with U.S. Pat. No. 4,799,408. The subroutine begins at block 956 in FIG. 32 where a tool break or adaptive overload priority interrupt is input. Next, a tool recovery program (TRP) is applied in block 958. TRP is a control operating mode button which, if pushed, causes the control to remember manual jogging moves made by an attendant to get the tool away from the part. When TRP is removed, the machine will go through the jogging moves automatically in reverse order. Also at block 958, the spindle SFM and DIR variables are written over with their current values. SFM means surface feet per minute and is a method of specifying the speed of spindle rotation. DIR means direction and specifies the direction of rotation of the spindle, i.e., clockwise or counterclockwise. Also at block 958, the spindle is stopped and the coolant is shut off. The door enclosing the machining environment is opened at block 960.

A check then is made at block 962 to see if an M116 code has been input. In other words, a check is made to see if a finish cut was being made when the tool break occurred or the tool became worn. If an M116 code was not input then a display is made at blocks 964*a* and 964*b* to the effect that a broken or worn tool is in the workstation, the retrace button must be pushed to change the tool (see U.S. Pat. No. 4,799,408 which describes the details of the retrace operation), the clear button must be pushed to stop the program execution and the cycle start button must be pushed to cancel the interrupt and restart the cut. A similar message is sent to the host. If there was an M116 code at block 962, then a display is made and a message sent to the host at blocks 964*b* and 964*c* which is the same as the display and message of blocks 964*a* and 964*b* except that the display and message say that the broken or worn tool was involved in a finish cut.

After one of the displays and messages described above, a check is made at block 966*a* to see if a CLEAR button was pushed. If it was, the subroutine ends in block 968. If the CLEAR button was not pushed, a check is made at block 966*b* to see if the cycle start button or the retrace button was pushed. If one of those buttons was not pushed, the appropriate message in blocks 964*a* or *b* and *c* continues to be displayed depending on the results of the check of block 962. If one of those buttons was pushed, a tool break/overload flag is set in block 970. The tool break/overload flag, when set, signals the T-code task to exchange the tool without an M06, command, and when completed, routes the logic execution back to the Broken/worn Tool Interrupt subroutine. The retrace operation is then activated for one block of the part program in block 972. In effect, the most recently executed block of the part program is executed in reverse to retract the broken or worn tool from the workpiece. A feed hold function, if activated, is turned off at this time to permit the attendant to use it to stop motion. A push on a feed hold button stops machine axes motion; a subsequent push releases machine axes motion. Next, a check is made at block 974 to see if the cycle start button was pushed. If that button was pushed, feedhold is applied and the tool break/overload flag is cleared in block 976. The spindle DIR and spindle SFM variables are read in block 978. The door enclosing the machining environment is closed, the coolant is turned on, and constant surface speed (CSS) cutting mode is reestablished, i.e. the spindle re-starts and runs at the previously specified SFM (surface feet per minute.). Feedhold also is released in block 980. The subroutine of FIG. 32 then returns to the part program in FIG. 22.

If the cycle start button is not pushed, as determined in block 974, then the retrace operation is activated and safe zone boundaries used in that operation are checked in block 982. The tool retraces the prior execution of the part program in reverse until safe zone boundaries are reached at which point the tool can be commanded to execute simple and rapid homing moves to a point at which the tool can be changed. Safe zone boundaries, retracing steps, and homing moves are used to insure that the workpiece is not damaged as the tool is retracted, while at the same time to permit rapidly moving the tool to the tool change position. Feedhold is kept off unless activated by the attendant. The available tool life table at the active turret station then is written over with a B broken) code or a W (worn) code in block 984. A check then is made at block 986 to see if the safe zone set up for the retrace operation will be crossed within a predetermined number of part program blocks during the retrace. If not, a display is made at block 988 to the effect that automatic recovery is not possible. In this situation, the display instructs an attendant that the CLEAR button be pushed and that recovery be accomplished manually. If the safe zone boundary will be crossed within the predetermined number of part program blocks, as determined in block 986, then the retrace operation continues until it is disabled at block 990, at the beginning of the part program block, the execution of which, in reverse, has caused the tool to cross the safe zone boundary. Cycle start is also disabled and, with the TRP active, the tool is moved along the x and z axes to a Reference Zero or tool change position by means of homing moves. The T-code task of FIG. 25 is called in block 992. The functions of the T-code task are performed as described above and the controller returns to the subroutine of FIG. 32 at block 994 where TRP is disabled and cycle start is enabled. The tool then makes the moves in reverse it followed to move away from the workpiece in block 996, after which the operations of block 976 and succeeding blocks described above are performed.

At the completion of the rough machining operation in block 954 in FIG. 22, the T-codes for the tools needed in a semi-finish machining operation are input from the part program at block 998. The T-code task is called in block 1000 which operates as described above to make sure that tools of the proper kind and with sufficient life are available to accomplish the semi-finish machining. Once the T-code task has been completed, the part program inputs a command to perform the semi-finish machining operation and to clean the part in block 1002. Although not shown in FIG. 22, adaptive overload/tool break sensors may be monitored and the broken/worn tool interrupt subroutine may be executed, if necessary, while semi-finish machining is carried out, as described above for the rough machining operation. After the semi-finishing and cleaning operations are completed, the part program inputs a command to perform either surface deviation offsetting, diameter deviation offsetting, or both in block 1004. Then, the part program in block 1006 commands that the workpiece be subjected to a finish machining operation and another cleaning operation. Although not shown in FIG. 22, adaptive overload/tool break sensors may be monitored and the broken/worn tool interrupt subroutine may be executed, if necessary, while finish machining is carried out, as described above for the rough machining operation. Also at block 1006, the part program inputs a command (an M204 code) to disable the chip conveyor. At block 1008, the part program instructs the machine to perform dimension measuring operations on the machined part. After this, a command (an M105 code) is input at block 1010 by the part program to run a data management task, which is called at block 1012.

Figure 33:
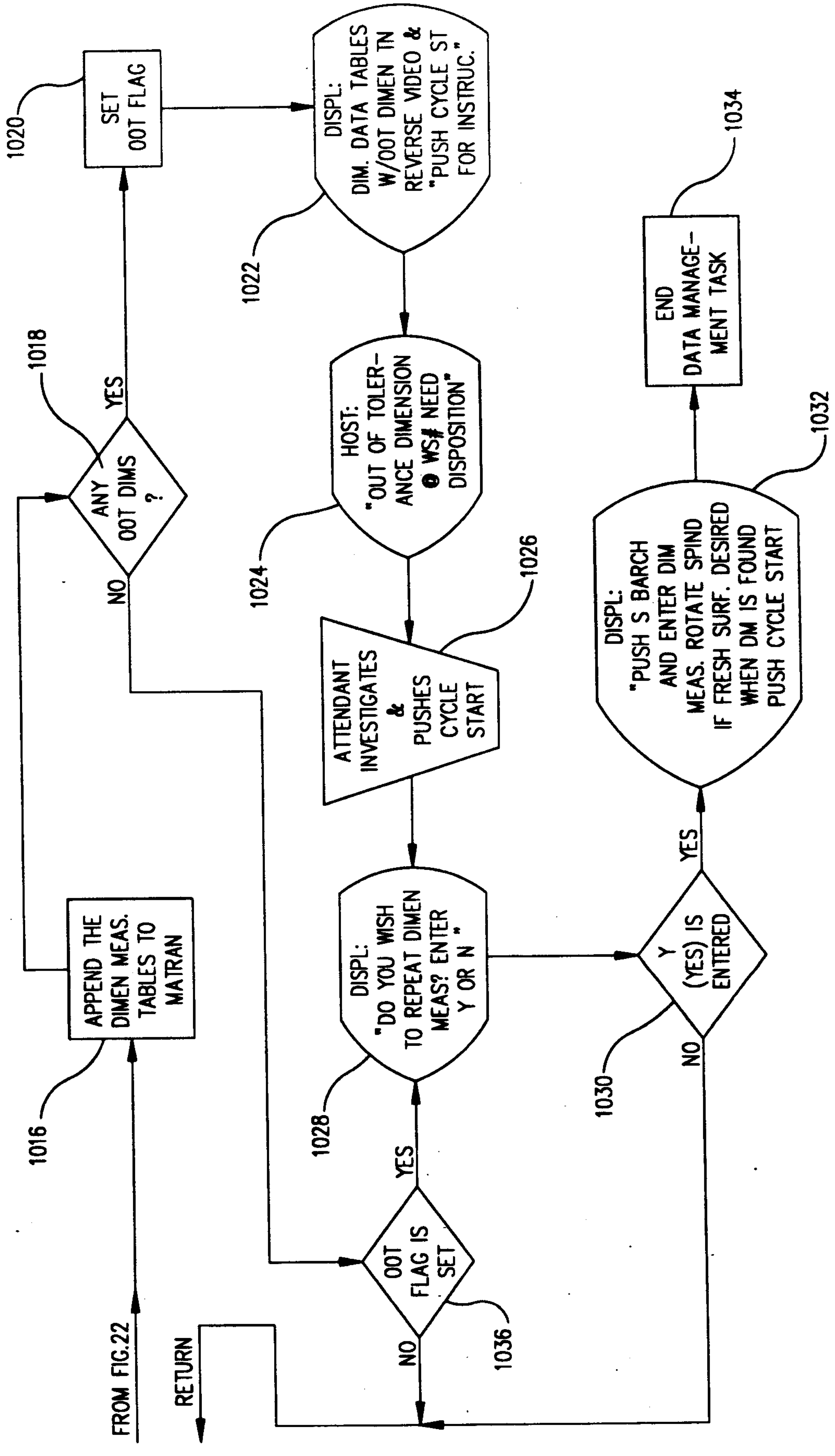

The data management task, shown in detail in FIG. 33, appends dimensional data tables to the MATRAN file, thereby providing the data with positive identification. It also checks the data for out-of-tolerance conditions, and if any such conditions are found, it stops the machine and requests a human disposition input by displaying messages and sending messages to the cell controller. See Table 13. First, the data obtained in a dimensional measuring operation is appended in block 1016 to the MATRAN file, namely, the transfer file for the part on the chuck associated with the machine spindle. A check then is made at block 1018 to see if any of the measured dimensions are out of tolerance. If there is an out of tolerance condition, then an out of tolerance flag is set in block 1020 and a display is made at the workstation as indicated in block 1022. A message is sent to the host in block 1024 that there is an out of tolerance dimension at the workstation and that the workstation needs a disposition for the workpiece having the out of tolerance condition. The attendant then investigates the situation (i.e. he checks to see if the probe or the probe stylus may be loose, the probe could have hit a machining chip that did not get cleaned off the part, or a coolant drip could have hit the probe stylus and tripped the probe instead of the part surface tripping the probe), block 1026 He then pushes cycle start. A display is made at block 1028 asking if the attendant wishes to perform another dimensional measuring operation. If the attendant enters yes, as determined at block 1030, then a display is made at block 1032 instructing the attendant to push the appropriate buttons on the controller which will reinitiate the dimensional measuring operation, to rotate the spindle if a fresh surface of the workpiece is to be probed, and to push cycle start when the desired starting point or item in the part program has been found. The data management task is ended in block 1034. However, if the attendant elected to repeat dimensional measurement, the data management task will also be repeated following completion of the repeated dimensional measurement. If the attendant does not enter a desire to perform another dimensional measurement operation, as determined in block 1028, a check is made in block 1036 to see if the out of tolerance flag is set. If the flag is set, the display of block 1028 is made and operations of the blocks coming after block 1028 are made as described above. If the out of tolerance flag is not set, then the data management task of FIG. 33 returns to the part program of FIG. 22. The reason for setting the OOT flag and testing it before the logic returns to FIG. 22 is to prevent automatic removal of an out of tolerance part without human approval in the event of a power failure or some other kind of problem while this logic is executing.

At the completion of the data management task, the part program in FIG. 22 then inputs an M505 code at block 1038 which commands that the workpiece be unloaded and picked up. The part management task is called in block 1040. After completion of this task, the operation of which is described above, the part program of FIG. 22 inputs at block 1042 a P118 code which indicates selected program block deletes. An M30 code is also input signaling the end of the program and commanding a rewinding of the program to the beginning.

An end of program task is called in block 1044. The end of program task makes a record of the program that was just run and the block delete settings that go with it, updates the space available in the chip container, increments the parts machined counter, and "rewinds" the part program to the beginning. The end of program task is shown in detail in FIG. 34. It begins at block 1046 where an available space in the recently run programs tables or the oldest entry in those tables is written over with information for the just run part program. At block 1048, selected program block deletes are read. Also at that block, the selected program name and the current time and date are read. The recently run programs tables, the block deletes, and the time and date tables are updated in block 1050. The material code for the part which was just machined is read at block 1052. The chip volume per operation, the chip container volume variable, and the percentage of the chip container volume available variable are also read at block 1052. The control estimates the volume available by deducting the estimated chip volume generated by each machining operation at the end of the operation. The old material identification variable is written over with the just read material identification in block 1054. The percentage of the container volume filled by the just completed operation of the part program is computed in block 1056. The computed percentage is deducted from the percentage of container volume available variable at block 1056. The percentage of the container volume available variable is then written over in block 1058 with the new computed value. Also, the chip management flag is cleared in block 1058. When the chip management flag is set, the control will not run the chip management task. Clearing the flag insures that the control will run the chip management task on the next part. The parts machined count table for the just run part program is incremented at block 1060 and the program is rewound at block 1062. A check then is made at block 1064 to see if the abort flag is set. If the flag is set, the end of program task of FIG. 34 returns to the abort task shown in FIG. 35 and described below. If the flag is not set, routine of FIG. 34 returns to 1066 in FIG. 22, where the start up task of FIG. 7 is called beginning at block 172.

Figure 34:
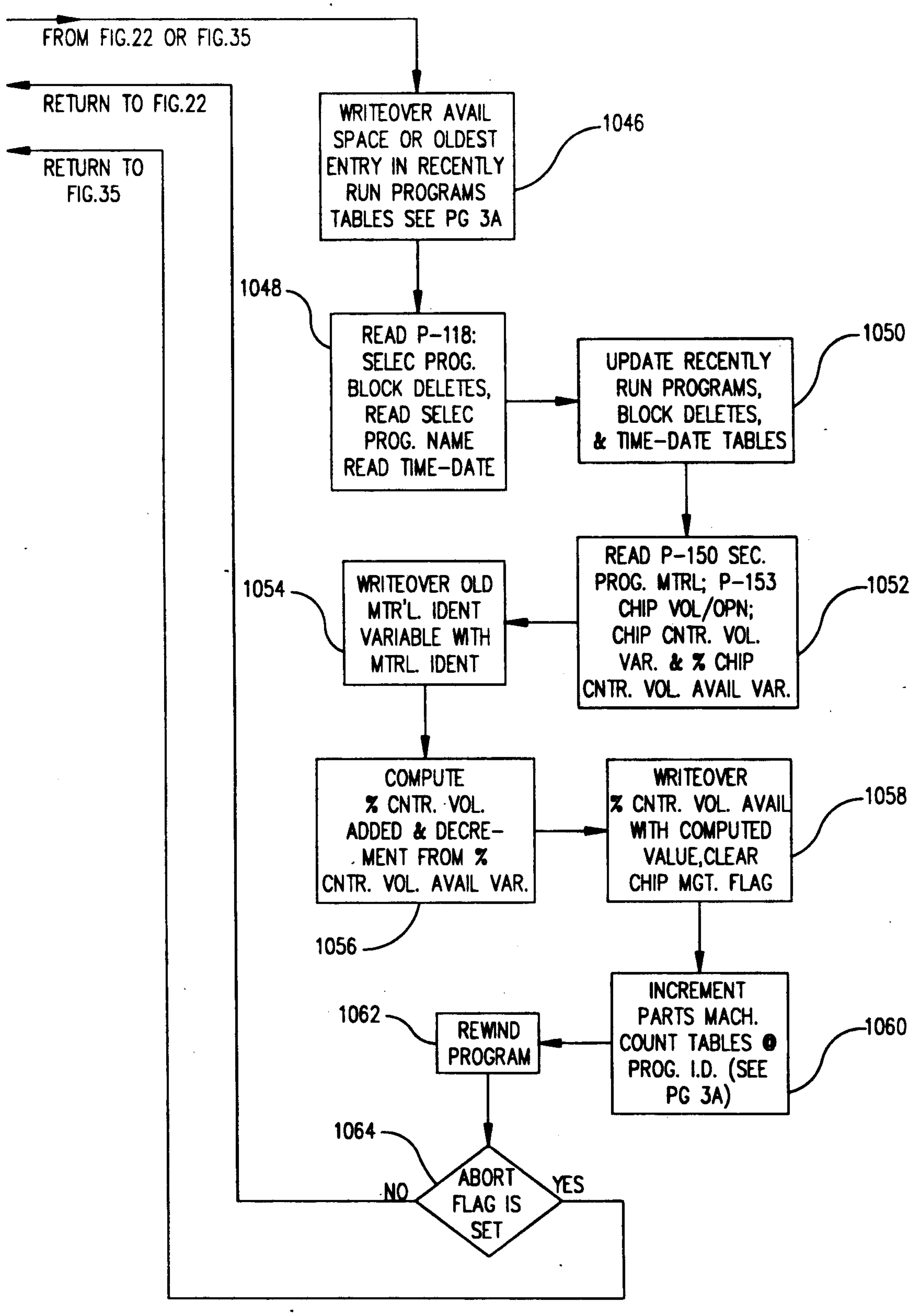

The abort task in FIG. 35 is called by the attendant and is for the purpose of halting the program before it has had a chance to finish. The attendant first clears the workstation controller and jogs the machine to the home position at block 1068. The attendant then keys in a code (M113) to initiate the abort of the machine in block 1070 and pushes the cycle start button. The workstation displays the message shown in block 1072. Among other things, the message asks the attendant if he wishes to continue with the abort procedure. A check is made at block 1074 to see if a cancel button was pushed. If it was, the workstation at block 1076 displays that it is waiting for instructions. A similar message is sent to the host. If the attendant wishes to proceed and enters an M113 code again via the MDI M113 at block 1074*a*, the part status variable is written over in block 1078 with incomplete (I status). The abort flag then is set in block 1080 and the part disposition task shown in FIG. 30 is called in block 1082. The part disposition task operates as described above and, when it is complete, the abort task is returned to at block 1084 where an M505 code is input commanding that the workpiece be transferred from the chuck to the transfer station. Also at block 1084, the part management task of FIG. 23 is called. The part management task operates as described above and, when its operation is completed, the abort task is returned to at block 1086 where the end of program task of FIG. 34 is called. The end of program task operates as described above and, when its operation is complete, the abort task of FIG. 35 is returned to in block 1088 where the abort flag is cleared and the start up task of FIG. 7 is called which begins operation at block 172.

Figure 36A:
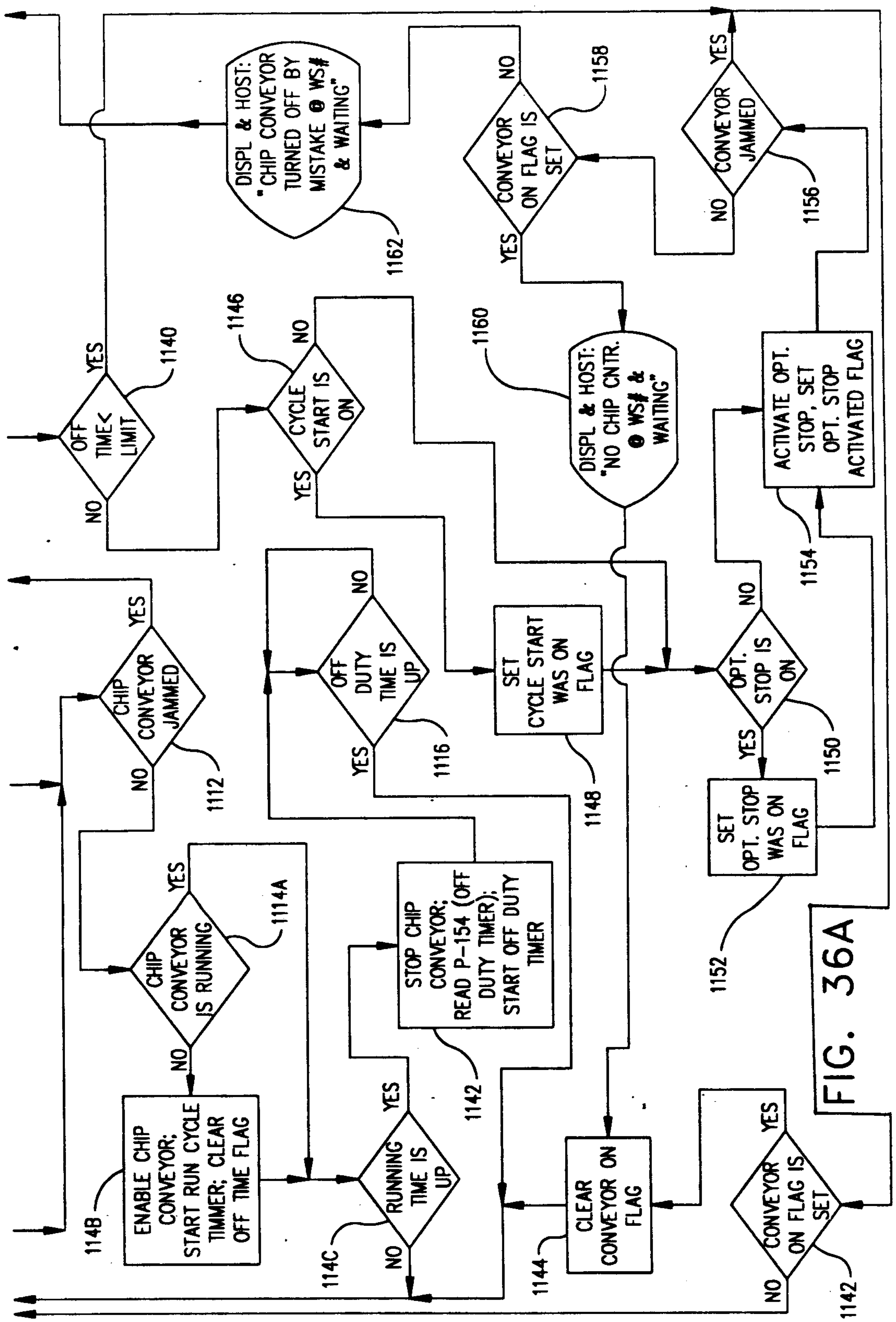
Figure 36:
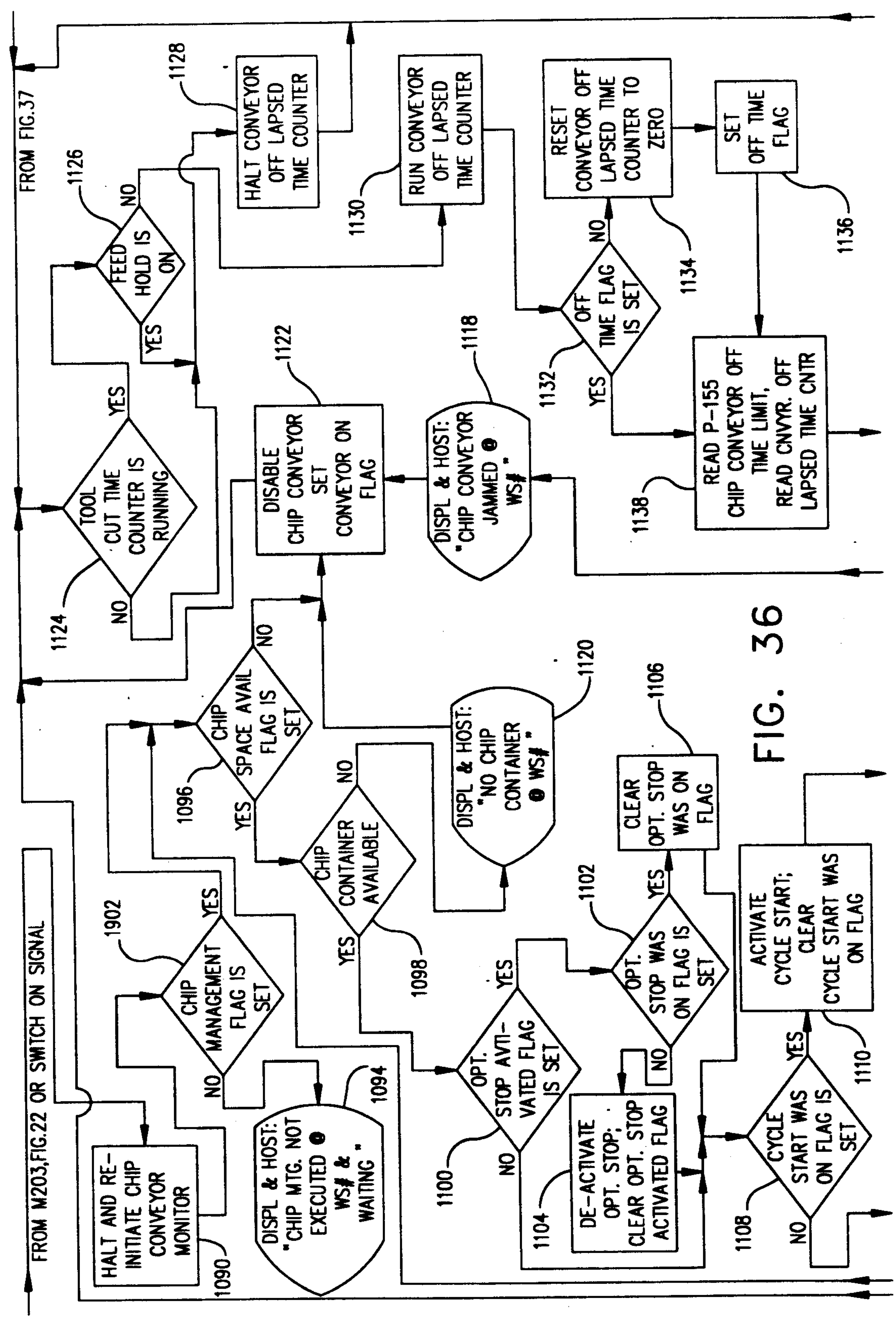

Whenever an M203 code enabling the chip conveyor is input by the part program, such as at block 952 in FIG. 22, or when manually commanded by the attendant, a run chip conveyor monitor shown in FIG. 36 is run. The run chip conveyor monitor is also run in response to a switch on signal from the operator's control station. The run chip conveyor monitor permits the chip conveyor to run when it is commanded to do so, and when it is appropriate to do so. It does this by checking that the chip management task has been run, checking that space is available in the container, monitoring that a chip container is available, monitoring that the conveyor does not jam, cycling the conveyor on and off to reduce wear and tear, and monitoring the conveyor stopped time when no chip container is present or when the one that is present contains the wrong material. The monitor begins at block 1090 where the run chip conveyor monitor is halted and reinitialized if it had been run before. A check then is made at block 1092 to see if the chip management flag is set. The chip management flag, when set identifies to other software tasks that the chip management task has been run for the part program currently being executed. If it is not set, then a display is made at the the workstation in block 1094 to the effect that the chip management function has not been executed and the workstation is waiting. A like message is sent to the host. If the chip management flag is set, then a check is made at block 1096 to see if the chip space available flag is set. The chip space available flag, when set, identifies to other software tasks that the chip space calculation was done and chip space available was found, negating the need to redo the calculation until the part program currently being executed is completed. If the chip space available flag is set, then a check is made at block 1098 to see if a chip container is available. If it is found in block 1098 that there is no chip container available, a display is made at the workstation to that effect and a corresponding message is sent to the host in block 1120. If a container is available, then a check is made at block 1100 to see if the OPT STOP activated flag is set. The OPT STOP activated flag, when set, identifies that the run chip conveyor monitor activated OPT STOP as opposed to human activation or activation from some other software module. If that flag is set, then a check is made at block 1102 to see if the OPT STOP was on flag is set. The OPT STOP was on flag, when set identifies that a human or some software module had turned on OPT STOP. The purpose of the OPT STOP activated and OPT STOP on flags is to make sure the run chip conveyor module does not turn off OPT STOP when it was activated by human input or software module. If the OPT STOP was on flag is not set, then OPT STOP is deactivated in block 1104 and the OPT STOP activated flag is cleared. If the OPT STOP was on flag is not set, then the OPT STOP was on flag is cleared in block 1106.

If the OPT STOP activated flag is not set, as determined in block 1100, or when the operation of either block 1104 or block 1106 has been completed, then a check is made at block 1108 to see if the cycle start was on flag is set. The cycle start was on flag, when set, indicates that the machine was running when it was interrupted by the run chip conveyor monitor. If this flag is set, cycle start is re-activated in block 1110 and the cycle start was on flag is cleared. If the cycle start was on flag is not set, as determined in block 1108, or after the completion of the operation of block 1110, a check is made in block 1112 to see if the chip conveyor is jammed. If it is not jammed, a check is made in block 1114*a* to see if the chip conveyor is already running. If it is not, the chip conveyor is enabled in block 1114*b*. The running cycle timer is started and the off time flag is cleared in block 1114*b*. Next, a check is made at block 1114*c* to determine if the conveyor running cycle time is up. This check is also made if the conveyor is already running as determined by block 1114*a*. If the running time is up per block 1114*c*, the chip conveyor is stopped in block 1114*d*, the off duty time is obtained from parameter P154 and the off duty timer is started. The off duty timer is tested in block 1116 and if not expired it continues to be tested. If the off duty timer has expired, as determined by block 1116 or if the running time has not expired as determined by block 1114*c*, then the check of block 1096 is repeated. If the conveyor is jammed, as determined in block 1112, then a display is made at the workstation in block 1118 that the chip conveyor is jammed. This message is also sent to the host.

If it is determined in block 1096 that the chip space available flag is not set, or if either of the displays and messages of blocks 1118 or 1120 has been made, the routine of FIG. 36 disables the chip conveyor and sets the chip conveyor on flag in block 1122. Then a check is made at block 1124 to see if the tool cut time counter is running. If it is running, a check is made at block 1126 to see if the feed hold function is on. If feed hold is on, or if it is determined in block 1124 that the tool cut time counter is not running, then the conveyor off lapsed time counter is halted in block 1128 and the routine of FIG. 36 returns to the input of block 1124. If feed hold is not on, as determined in block 1126, then the conveyor off lapsed time counter is run in block 1130. A check then is made at block 1132 to see if the off time flag is set. The conveyor off time flag, if set, signals the run chip conveyor monitor to keep "track" of the conveyor off time and stop the machine if or when the time runs out. If it is not set, then the conveyor off lapsed time counter is reset to zero in block 1134 and the off time flag is set in block 1136. If the off time flag is set in block 1132, or the off time flag has been set in block 1136, then the conveyor off time limit (P155 code) is read in block 1138. The conveyor off lapsed time counter is also read in block 1138.

After the completion of the operations of block 1138, a check is made in block 1140 to see if the off time is less than the limit. If it is less than the limit, a check is made at block 1142 to see if the conveyor on flag is set. If the flag is set, it is cleared in block 1144 and the subroutine of FIG. 36 returns to the input of block 1096. If the conveyor on flag is not set, as determined in block 1142, then the routine of FIG. 36 returns to the input of block 1124.

If the off time is not less than the limit, as determined in block 1140, then a check is made in block 1146 to see if cycle start is on. If cycle start is on, the cycle start was on flag is set in block 1148. After the completion of the operation of block 1148, or if it was determined that cycle start was not on in block 1146, a check is made at block 1150 to see if OPT STOP is on. If it is on, the OPT STOP was on flag is set in block 1152. After the flag is s®t in block 1152, or if it was determined in block 1150 that OPT STOP is not on, then OPT STOP is activated and the OPT STOP activated flag is set in block 1154.

Next, a check is made at block 1156 to see if the conveyor is jammed. If it is jammed, the routine of FIG. 36 proceeds to the input of block 1142 where its operation and the operation of successive blocks is carried out as described above. If the conveyor is not jammed, a check is made at block 1158 to see if the conveyor on flag is set. The conveyor on flag, when set, indicates that the chip conveyor was running when it was halted for some kind of problem, and that, when that problem is solved, it should be restarted. If it is set, a display is made at the workstation in block 1160 that there is no chip container at the workstation. A like message is sent to the host. The routine of FIG. 36 then proceeds to block 1144 and carries out its operation as well as the operation of successive blocks described above. If the conveyor on flag is not set, as determined at block 1158, then a display is made at the workstation in block 1162 to the effect that the chip conveyor has been turned off by mistake and the workstation is waiting. The routine of FIG. 36 then proceeds to the input of block 1124.

When the part program inputs a command to stop the chip conveyor, such as when an M204 code is entered in block 1006 in FIG. 22, or when the attendant manually commands the chip conveyor to be stopped, a stop chip conveyor subroutine is run. The stop chip conveyor subroutine looks at where the stop signal came from. If it came from a switch at the operator's control station, the conveyor is stopped immediately. If it came from the input of a command code (e.g. M204), it allows the conveyor to run for a pre-defined period of time to empty or clear itself of any chip accumulations before stopping. The stop chip conveyor subroutine begins with a check in block 1164 to see if the signal to stop the chip conveyor came from an M204 code. If the stop signal did not come from an M204 code, the chip conveyor is disabled in block 1166 and the chip conveyor monitor of FIG. 36 is halted in block 1168 and reinitiated in block 1170. The routine of FIG. 37 then proceeds to the run chip conveyor monitor of FIG. 36.

If the chip conveyor stop signal is due to the entry of an M204 code, a variable relating to the amount of time it takes the chip conveyor to be cleared of swarf, when no new swarf is being added to the conveyor, is read at block 1172. The conveyor off lapsed time counter is then set to zero in block 1174. Block 1176 then checks to see if the time accumulated in the counter is less than the clearing time. When the conveyor is cleared, it is disabled in block 1166 and the routine of FIG. 37 proceeds as described above.

Figure 38:
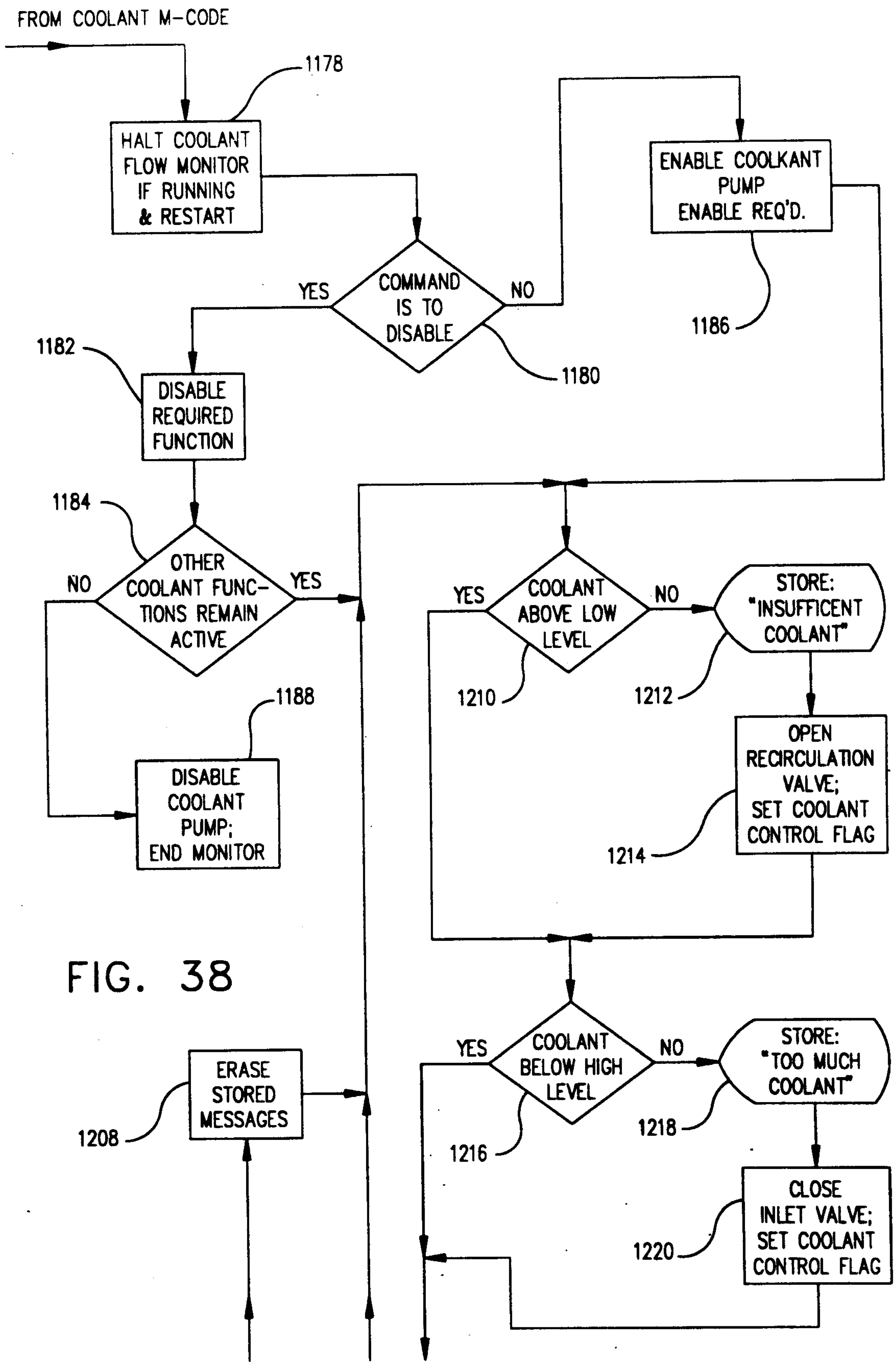
Figure 38A:
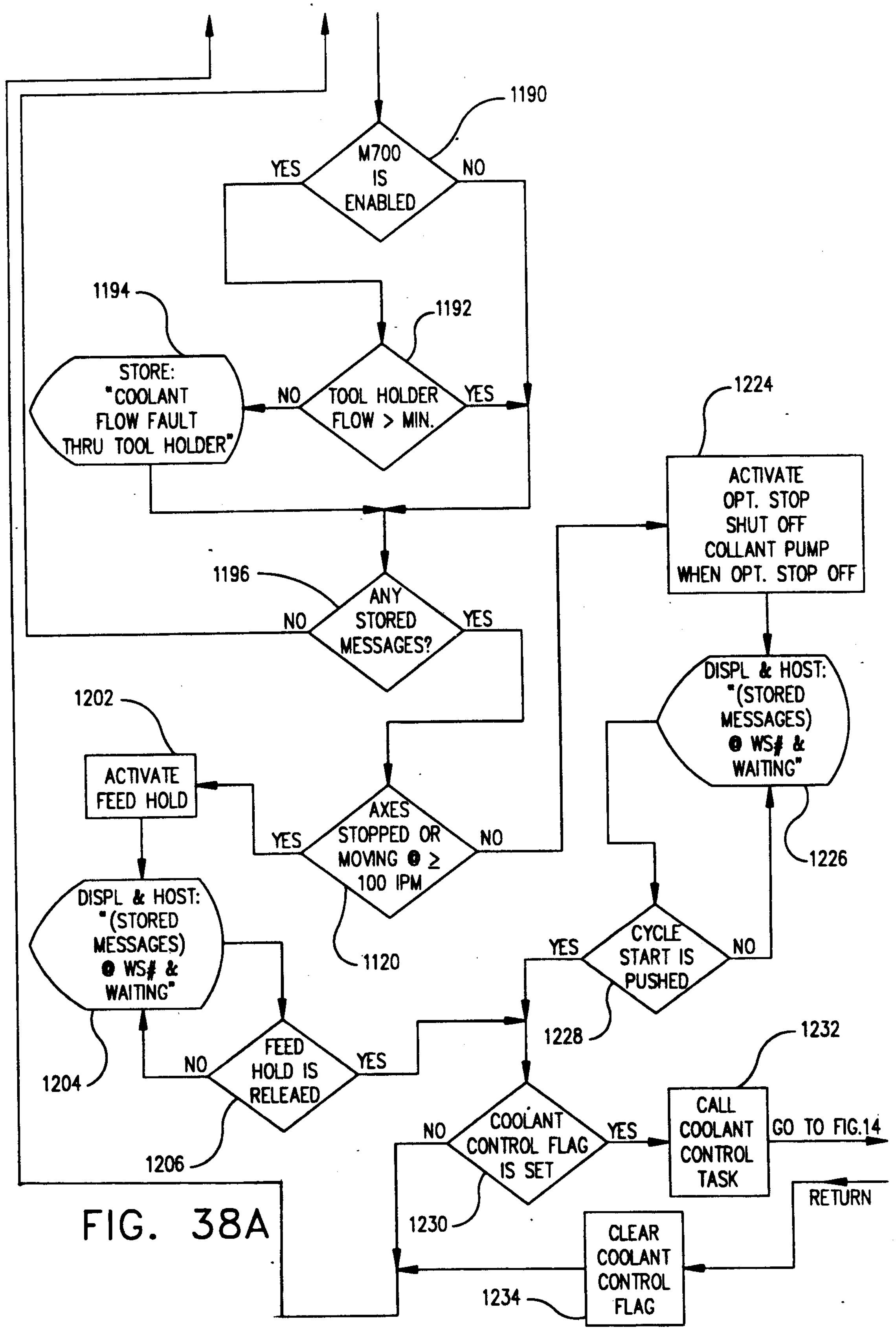

A coolant flow monitor is shown in detail in FIG. 38. The coolant flow monitor makes sure that the coolant level stays above a low level limit, the coolant stays below a high level limit, and the coolant is flowing when it is supposed to be flowing. It is set into operation whenever the part program inputs an M-code involving cooling or cleaning. See Appendix B. The coolant flow monitor begins at block 1178 where the routine is halted if it is running and it is restarted. A check then is made at block 1180 to see if the cooling or cleaning command is a disable command. If it is a disable command, the specified function is disabled in block 1182. If no other coolant functions are active as determined at block 1184, the coolant pump is disabled and the monitoring function ends at block 1188. If the command is an enable command, the coolant pump is enabled in block 1186 along with the required function. If a coolant function is enabled at block 1186 or if other coolant functions remain active at block 1184, a check is made at block 1210 to see if the coolant in the coolant supply is above a predetermined low level. Any known fluid level sensor may be employed for this purpose. If it is below that level, then a message is stored at the workstation in block 1212 that there is insufficient coolant. The recirculation valve is opened and the coolant control flag is set in block 1214. The coolant control flag, if set because the coolant source valves have been reset, causes the coolant flow monitor to redo the coolant control task to make sure the valves are set correctly to continue machine operation. By to the coolant flow monitor. If the coolant is above the low level as determined in block 1210, or after the operation of block 1214, a check is made at block 1216 to see if the coolant is below some second higher level. Any known fluid level sensor may be used to sense this condition. If it is not, a message is stored at the workstation in block 1218 that there is too much coolant. The inlet valve then is closed and the coolant control flag is set in block 1220. If it is found that the coolant is below the second higher level in block 1216, or after the completion of the operation of block 1220, a check is made in block 1190 to see if an M007 code has been enabled. That is, a check is made to see if coolant has been enabled to the tool holder. If such coolant flow has been enabled, a check is made at block 1192 to see if the coolant flow is greater than some predetermined minimum. This may be accomplished by any well known flow rate sensor at an appropriate location in the coolant flow lines. If the coolant flow is less than the minimum, then a message is stored in the workstation in block 1194 that the coolant flow is faulty through the tool holder. After the storage of the message, or if it is determined that the coolant flow is greater than the predetermined minimum in block 1192, then a check is made at block 1196 to see if there are any stored messages. If there are no stored messages, the logic proceeds to block 1210. If there are stored messages, a check is made at block 1200 to determine if the machine axes are stopped or moving at or faster than 100 inches per minute. If they are, the feed hold operation is activated in block 1202 and the stored messages are displayed at the workstation and sent to the host in block 1204. A check then is made at block 1206 to see if the feed hold is released. If not, the messages remain displayed.

If at block 1200, the axes were moving, but at a rate of less than 100 inches per minute, i.e. if the machine is cutting, then OPT STOP is activated in block 1224 and the coolant pump is shut off when OPT STOP stops the machine. Next, the stored messages are displayed and sent to the host at block 1226. A check then is made at block 1228 to see if cycle start has been pushed and, if not, the messages remain displayed. When cycle start is pushed or feed hold is released at block 1206, a check is made at block 1230 to see if the coolant control flag is set. If it is set, then the coolant control task of FIG. 14 is called in block 1232. The coolant control task operates as described above and, when its operation is complete, the coolant flow monitor is returned to in block 1234, where the coolant control flag is cleared and then the coolant flow monitor proceeds to block 1208 which erases the stored messages. The coolant flow monitor then continues with the operation of block 1210 and successive blocks as shown in FIG. 38 and as described above.

Tables 1-13 summarize the salient operational characteristics of various aspects of the example of the invention represented by the flow charts of FIGS. 7-38. Appendix A is a list of messages and cause codes for the MC2000 controller used in the example of the invention represented by the flow charts of FIGS. 7-38. Appendix B is a list of P-code and M-code assignments for the MC2000 controller used in the example of the invention represented by the flow charts of FIGS. 7-38. Appendix C is a list of message texts.

Appendix D is a source code listing representing a computer program which is a specific example of the automation MCL portion of an example of the invention for a horizontal turret lathe like the one shown in FIGS. 4 and 4*a*. Appendix E is a source code listing representing a computer program which is a specific example of the automation MCL portion of an example of the invention for a vertical machining center like the one shown in FIG. 3. In both cases, the source code listing is written in the Programmable Control Language (PCL), an ADA-like language, which may be compiled for use on the MC2000 controller by using a compiler available from GE-Fanuc Automation North America, Inc. Charlottesville, Virginia, entitled IBM MCL SUPPORT, V-2.2, Part Number 44S723838-G01R03. As the language, compiler, and controller are well known to those skilled in the art, no further description is given here.

TABLE 1

CONTROL INITIALIZATION FEATURES

FIGURE 7 - INITIALIZATION PROCEDURE a) Actuated by switching control on or by entry of an M30 code;

b) Insures all servo driven axes are reference zeroed;

c) Reports last calibration dates and intervals for host sche··ing; and d) Assumes manual operation unless put in automatic by an attendant.

FIGURES 8 AND 9 - STARTUP a) Activated by operation of routine of Figure 7;

b) Uploads resiuent program names and tool magazine configuration file;

c) Obtains correct revisions of programs scheduled to run during next xx hours;

d) Selects program for part in machine, and if none, for part in Queue Station, and if none, for part in Transfer Station, and if none, for part to be delivered; and e) Selects Block Deletes based on how recently the selected program has run at that workstation.

FIGURES 10 AND 22 - PART PROGRAM a) Activated by attendant or control selection and cycle start; and b) Shows major inputs from program and how the control reacts to them.

FIGURE 11 - QUALITY CONTROL SUBROUTINE a) Activated by an M-code (M101) in the part program;

b) Tests for laser interferometer calibration and master part performance tests in-date; and c) Tests for timely completion of required part verifications for:

1) Program Approval if unapproved; and
2) Time or quantity interval sampling requirements.

TABLE 2

ASSUMED AGV PROCEDURE

To Service Any Workstation

A. There are two types of AGV's:

1. Platform lift for parts mounted on project plates (shuttle fixtures); and

2. Fork lift for tool magazines and chip buckets.

B. Requests for AGV service will be initiated per the following matrix where W = Workstation initiated, H = Host initiated, and blank = no requests anticipated:

| Workstation Type | Proj P/U | Plate Deliv | Tool P/U | Maga Deliv | Chip P/U | Cont Deliv | Pallet P/U | Pallet Deliv |
|---|---|---|---|---|---|---|---|---|
| HTL | W | W | W | W | W | W | | |
| VMC | W | W | W | W | W | W | | |
| Grinder | W | W | | | | | | |
| CMM | W | H | | | | | W | H |
| Cleaning | W | H | | | | | | |
| Part Staging | W | H | | | | | | |
| Tool Staging | | | W | H | | | | |
| Benching | W | H | | | | | W | H |
| Rework | W | H | | | | | W | H |
| Shipping | | | | | | | W | H |
| Receiving | | | | | | | W | H |
| Matr'l Disposition | W | H | | | | | W | H |
| ASRS | | | | | | | W | H |
| Cutter Grinding | | | | | | | W | H |
| Chip Disposal | | | | | | | | |
| Tool Crib | | | | | | | W | H/W |
| Tool Maint. | W | H | | | | | W | H |

C. All requests for service from a workstation or the host will be done with two separate signals, (1) PREPARE and (2) EXECUTE. The AGV controller must respond as follows:

1) Upon receipt of a "PREPARE" signal from the host, send nearest available AGV of correct type. Stop it mechanically clear of workstation, if an "EXECUTE" signal has not been received, and report AGV #__ ready through the AGV controller to the host.

2) Upon receipt of an "EXECUTE" signal from the host, move AGV into service position, perform station task (pick up or drop off), get AGV mechanically clear of workstation and signal host "TASK COMPLETED, AGV # _ AWAITING ORDERS". Failure of AGV controller to receive an "EXECUTE" signal within a programmable time period will cause it to report an error message on its terminal and to host.

D. If the host has not received an "EXECUTE" request from the workstation, it will notify the workstation "AGV READY".

E. When the workstation or host issues an "EXECUTE" request, it will have disabled all tasks which could cause mechanical interference with the AGV's task. The workstation or host will be looking for the "TASK COMPLETED" signal. To minimize the possibility of mechanical crashes the "TASK COMPLETED" signal may be hardware initiated; i.e., closing or opening of a limit switch, servo "in position" signal, etc., on or by the individual AGV.

F. The AGV controller is equipped with a terminal for manually directed operation in the absence of, or to supersede, host or workstation input. However, all normal automatic transactions between workstations and the AGV controller will be routed through the host.

G. The host will monitor vehicle locations, set priorities, and schedule and/or sequence requests for service to ensure efficient movement of vehicles. The AGV controller will keep track of vehicle locations and report same to host. It will also control traffic flow, stops, starts, speeds, etc. to avoid collisions, and it will control or direct the execution of station tasks (picks ups or drop offs).

H. Vehicle destinations, speeds, workstation tasks, platform heights, fork heights, and fork positions etc. are programmable or program selectable and software routines for their accomplishment may be selected by the host computer or manual input.

J. Individual vehicles are equipped with collision safety devices which will "Feed Hold" motion when activated, and at least one emergency stop switch. The AGV controller is equipped with a system emergency stop switch and means of aborting the active service procedure for any individual vehicle. The system E-stop and service abort are also accessible to the host. The capability of feedholding individual vehicles from the AGV controller and the host is desirable.

K. Workstations will be capable of detecting "presence" and "seating" of objects delivered or to be picked up by an AGV. Corresponding capability on board individual AGV's is desirable.

L. Servo driven motions with incremental positioning systems are capable of being zeroed or "Homed" automatically or semi-automatically after any shut down or E-stop and restored to the correct position for the task being performed at the time of shut down.

M. An AGV cycle is:

| | |
|---|---|
| 1)WAIT | for orders, empty. |
| 2)PREPARE | by deadheading to ready position near station to be served. |
| 3)EXECUTE | pickup of load and move clear of station. |
| 4)WAIT | for orders, loaded. |
| 5)PREPARE | by transporting load to ready position near destination station. |
| 6)EXECUTE | delivery of load and move clear of station. |
| 7)GO TO 1) | |

N. Smallest workable elements are:

1) One part-sta[illegible] stand services two machines.

2) One AGV services two part-staging stands and four machines.

O. Only two project plates (shuttle plates) per machine may be in service at one time. A third project plate per machine will result in system "lock-up" unless project plates can be stored temporarily at the cleaning station, the CMM, or on a second AGV.

P. Pre-empts of AGV service are allowed only during deadhead moves as follows:

1) Project plate service whenever the time required at the workstation is earlier than that of current service in progress.
2) Tool magazine service over chip service or pallet service.
3) Chip service over pallet service.

Q. Service requests will be scheduled:

1) Per the time required at the workstation.
2) Then in the order received.

R. AGV's have trackage rights: [illegible]

1) Per the time required at the workstation.
2) Then in the order the service request was received.

S. The host has to know (from the part programs) the Queue Station to Transfer Station time for:

1) Part in the machine.
2) Part in the Queue Station.

T. The host has to know the tool magazine life for the operations for which it is configured (from the magazine configuration file).

U. The host schedules the machines and tentatively schedules part staging and tool staging based on expected times for service requests. (Chip containers are serviced on demand.) Then:

1) The workstation notifies the host when it has a project plate, tool magazine, or chip container for pickup.
2) The host adjusts its schedule and queues the requests accordingly.
3) When the delivery station is open or the host detects from AGV service requests that it will open shortly, the host requests AGV pickup for U.1) above.
4) An AGV performs the pickup, makes any intermediate stops, e.g., cleaning or CMM, and delivers to the open part staging, tool staging, or chip reclamation area.
5) The workstation notifies the host that its queue station, tool magazine station, or chip container station is open along with appropriate replacement time data.
6) The host computes the allowable replacement time, adjusts the schedule accordingly, and looks for the appropriate replacement ready signal.
7) Upon receipt of the replacement ready signal, the host requests appropriate AGV pickup service.
8) The AGV picks up the replacement project plate, tool magazine, or chip container.
9) The host requests delivery to the workstation.
10) The AGV delivers the project plate, tool magazine, or chip container.

TABLE 3

PART PROGRAM STEPS

| | | FIGURE |
|---|---|---|
| 1. | Initiates chips bucket control subroutine. | 12+13 |
| 2. | Initiates coolant type control subroutine. | 14 |
| 3. | Utilizes T-codes to initiate the tool management procedure. | 15-21 |
| 4. | Performs Initial Tool Offsetting. | 10 |
| 5. | Performs Part Sensor Calibration. | 10 |
| 6. | Performs Part Location Offsetting. | 10+22 |
| 7. | Utilizes M-codes to initiate the part management. | 23-26 |
| 8. | Rough machines the part. | 22 |
| 9. | Allows a manually entered M-code to abort the process and remove the part. | 35 |
| 10. | Reacts to the Tool Break Sensor or Adaptive Control Overload | 32 |
| 11. | Repeats 3 to check tool life. | 15-21 |
| 12. | Semi-finish machines the part. | 22 |
| 13. | Performs Surface Deviation Offsetting and/or Diametral Deviation Offsetting. | 22 |
| 14. | Finish machines the part. | 22 |
| 15. | Performs Dimension Measuring. | 22 |
| 16. | Utilizes M-codes to initiate data management and Inspection Control. | 30,31,33 |
| 17. | Repeats 7 to exchange parts. | 23-26 |
| 18. | Signals end of program (M30). | 34 |
| 19. | Calls Run Chip Conveyor Monitor, Stop Chip Conveyor Subroutine, and Coolant Flow Monitor via M-codes. | 36-38 |
| 20. | Service AGV Monitor, AGV Pickup Monitor, and AGV Delivery Monitor activated by subroutines called by the part program. | 27-29 |

TABLE 4

QUALITY CONTROL and PART MANAGEMENT SUBROUTINES

MISCELLANEOUS SPECIFICATIONS

A. All Transfer Files will be identified as follows:

```
(ID.MCL,DETRAN,F0130,00)
  |        |      |    |  File protection code
  |        |      |    |  indicating the software
  |        |      |    |__privilege level required
  |        |      |       to view, edit, and delete
  |        |      |       this file.
  |        |      |___Individual project plate
  |        |          identification number.
  |        |      File name identifying the project
  |        |______plate location and status, see
  |               Note 1.
  |          Heading, identifying this as an ASCII,
  |__________Machine Control Logic file, to the MC2000
             control.
```

B. All Transfer Files will be configured as follows:

```
(ID,MCL,PUTRAN,F0130,00) [See Note 1]                          *
WK STA #         -L298                                         *
DELIVERY STATUS -NML      [See Note 2]                         *
PROGRAM          -PR1234  [See Note 3]             <--sp #66   *
WORKPIECE        -17A164-001P02 COOLING PLATE                  *
OPERATION        -200 DRILL FWD HOLES     [See Note 4]         *
PRGM STATUS      -APD     [See Note 5]                         *
APPVL QUANTITY   -010     [See Note 6]                         *
APPVL COUNT      -000     [See Note 7]                         *
VFN INTVL, WK PC-008      [See Note 8]                         *
VFN. INTVL, HRS  -024     [See Note 9]                         *
QTY PEND RSLTS   -010     [See Note 10]                        *
STARTED          -                                             *
COMPLETED        -<--sp#17                                     *
LOST TM/PT, HRS  -        [See Note 11]                        *
LOST TIME MSG'S  -   [Sep by a space, See Note 12]             *
CIM TM/PT, HRS   -   [E suffix if error See Note 13]           *
VARIANCE TM/PT   -        [See Note 14]                        *
VARIANCE MSG'S   -   [Sep by a space, See Note 15]             *
LCN 01---------------------------------------------------------*
      IDENT      -P123456                                      *
      WK PC STAT-NVR                                           *
LCN 02---------------------------------------------------------*
      IDENT      -                                             *
      WK PC STAT-                                              *
LCN 03---------------------------------------------------------*
      IDENT      -P345612                                      *
      WK PC STAT-AVU, J. DOE      [See Note 16]                *
LCN 04---------------------------------------------------------*
      IDENT      -P456123                                      *
      WK PC STAT-NVR                                           *
LCN 05---------------------------------------------------------*
      IDENT      -P561234                                      *
      WK PC STAT-NVR                                           *
****************************************************************
REF-IT-CD   PRB ID     MIN      MAX      ACT      DEV     OOT  CAUSE*
****************************************************************
(LCN 01)--------------------------------------------------------
023 19 OD  09020013  XX.XXXX XX.XXXX XX.XXXX -0.0013  0.0000
024 19 DS  09020013  ZZ.ZZZZ ZZ.ZZZZ ZZ.ZZZZ  0.0004  0.0000
(LCN 03)--------------------------------------------------------
023 19 OD  09020013  XX.XXXX XX.XXXX XX.XXXX -0.0102 -0.0002*
024 19 DS  09020013  ZZ.ZZZZ ZZ.ZZZZ ZZ.ZZZZ  0.0003  0.0000
(LCN 03)--------------------------------------------------------
```

```
023 19 OD  09020013  XX.XXXX XX.XXXX XX.XXXX -0.0103 -0.0003*1712
024 19 DS  09020013  ZZ.ZZZZ ZZ.ZZZZ ZZ.ZZZZ  0.0002  0.0000
(LCN 04)---------------------------------------------------------
023 19 OD  09020013  XX.XXXX XX.XXXX XX.XXXX -0.0008 -0.0000
024 19 DS  09020013  ZZ.ZZZZ ZZ.ZZZZ ZZ.ZZZZ  0.0000  0.0000
(LCN 05)---------------------------------------------------------
023 19 OD  09020013  XX.XXXX XX.XXXX XX.XXXX -0.0010  0.0000
024 19 DS  09020013  ZZ.ZZZZ ZZ.ZZZZ ZZ.ZZZZ  0.0003  0.0000
*****************************************************************
(END,MCL)
```

NOTES:

1. The Transfer (Project Plate config) file name changes with project plate status:

(ID,MCL,DETRAN,F0130,00) - At or pending delivery to the Transfer Station.

(ID,MCL,Q1TRAN,F0130,00) - At Queue Station #1.

(ID,MCL,MATRAN,F0130,00) - At Machine Chuck.

(ID,MCL,PUTRAN,F0130,00) - At Transfer Station waiting for pickup.

2. DELIVERY STATUS tells the control how to handle the workpiece:

NML (Normal) - First time at workstation for operation shown, process automatically.

RWK or R17 (Rework Item 17) - At workstation for recutting Item 17 of the operation shown, stop and request human assistance at beginning of program.

I22 (Incomplete from Item 22) - At workstation for completion starting at Item 22, stop and request human assistance at beginning of program.

SPL (Special) - At workstation for some kind of special activity; e.g. testing of a new probe stylus configuration.

DRY (Dryrun) - At workstation for program debugging.

3. PROGRAM is a unique, six-character name, assigned by the host to the part program which performs the machining operation described below.

4. WORKPIECE and OPERATION describe the drawing number, part name, operation number and operation description performed by the above part machining program.

5. PROGRAM STATUS is a code meaning the following:

APD - Approved. The program has been tested, debugged, and proven capable of reliably machining parts to drawing requirements. Automatic part program downloading and automatic machining are permi+ted. The machine control will designate sample parts for verification in accordance with the VFN INTVL's described below.

UNA - Unapproved. The program has been tested and debugged but is not yet proven capable of reliably machining parts to drawing requirements. Automatic part program downloading and automatic machining are permitted. The machine control will designate each part for verification until the APPVL QUANTITY, described below, has been reached. Thereafter the QTY PEND RSLTS, described below, applies pending the results of the verification.

TRY - Tryout. The program is ready for testing and debugging on a machine. Manual downloading through the DNC system is required. Actual cutting of a part is not required, but if a part is cut, opportunity for manually designating the WK PC STAT, described below, is provided by the machine control.

6. APPVL QUANTITY is the quantity of parts which must be verified (inspected) and found acceptable from a UNA program to achieve APD status.

7. APVL COUNT is the quantity of parts which the machine control has designated for verification from a UNA program. This allows multiple machines to help establish program approval more or less simultaneously through the Cell Controller.

8. VFN INTVL, WK PC is the verification sampling rate in terms of part count for an APD status program, e.g. if the number is 008, this means the 1st, 9th, 17th, etc., parts machined of the designated WORKPIECE and OPERATION are given a VFN (explained below) WK PC STAT by the control.

9. VFN INTVL, HRS is the verification sampling rate in terms of time for an APD status program, e.g. if the number is 024, this means the 1st part machined and, following a 24 hour interval, the next part machined of the same WORKPIECE and OPERATION are given a VFN (explained below) WK PC STAT by the control. Time and workpiece counts are mutually exclusive, i.e. whichever occurs first resets the other; double sampling is not incurred.

10. QTY PEND RSLTS is the quantity of parts of the designated WORKPIECE and OPERATION the control may process while waiting for verification results on a sample part.

11. LOST TM/PT is non-productive time which is not part related, divided by the quantity of parts on the project plate. It consists primarily of equipment failures. Time is in hours as XXXX.XXX.

12. LOST TIME MSG's are 4-digit message numbers describing reasons for Lost Time. If more than 8 numbers occur, the oldest is written over and lost. When there are multiple parts on the Project Plate, all reported numbers are saved in the data base for each part even though all may not have occurred during machining of each part. The 1st of two lone numbers appearing at the right end of the line is the quantity of active messages and the 2nd is the left-to-right position number of the last message entered.

13. CIM TM/PT is COMPLETED time minus STARTED time minus LOST TIME all divided by the quantity of parts on the Project Plate. STARTED time notes arrival of the 1st Project Plate at the Transfer Station when there are no other Project Plates at the machine. Otherwise it is the starting time of the Auto MCL for the part on the Queue Station. CIM TM/PT is suffixed with an E (for error) in the 4th decimal place when power is shut off with the control in servo-stop.

14. VARIANCE TM/PT or Excess Over Planned Time is time spent reworking stock-on OOT's, remeasuring after answering YES to the question, "Do you wish to rework or remeasure?", and certain other abnormal conditions resulting from human interaction with the process. VARIANCE TM/PT is included in CIM TM/PT.
15. VARIANCE MSG's are similar to LOST TIME MSG's in Note 4 above except they describe reasons for differences (variance) between actual CIM TM/PT and expected floor-to-floor processing time.
16. WK PC STAT tells the Cell Controller what to do next with the workpiece:

| | |
|---|---|
| 000 | Not yet determined; assigned by Cell Controller prior to downloading DETRAN. |
| ACC | Accept process OOT's within product drawing tolerance; assigned by human input to a CLM rejected part to cause CC to skip verification. |
| AVU | Automatic Verification, Unrestrained; assigned by human input to a CLM rejected part which cannot be reworked or a TRY program when chips are cut and data is needed. |
| AVR | Automatic Verification, Restrained; assigned same as AVU. |
| CVU | Conventional Verification, Unrestrained; assigned by human input to a CLM rejected part or a TRY program part which appears to be scrap. |
| CVR | Conventional Verification, Restrained; assigned by human input to a CLM rejected part or a TRY program when chips are cut and data is needed. |
| DRY | Dryrun; assigned by the MC2000 on TRY programs when the answer to the chips cut question is NO. |

Ixx Incomplete operation at Item__; assigned by the MC2000 after an M113, Abort, MDI command.

NVR No verification required; assigned by the MC2000 because the part is CLM acceptable, a time or count verification sample is not due, and the PRGM STATUS is APD.

VFN Verification required; assigned by the MC2000 because the part is CLM acceptable and a time or count sample is due on an APD program or the program status is UNA.

A person inputing a PART STATUS must also input his/her name or badge number. Remaining space on the line may be used to enter comments about the status.

TABLE 5

T-Code and M06 Specifications

A. The T-code is structured as follows:

```
Tx x x x  Tool Changer Option Inactive, 4 digits
 | | 0 0 ┐
 | | 0 1 │
 | | . . ├_Specifies the desired Tool Offset
 | | . . │
 | | . . │ number.
 | | 9 9 ┘
 0 0 ┐
 0 1 │
 . . ├_Specifies the desired turret station
 . . │ number.
 . . │
 9 9 ┘

Tx x x x x x x x  Tool Changer Option Active, 8 digits
 | | | | | | 0 0 ┐
 | | | | | | 0 1 │
 | | | | | | . . ├_Specifies the desired Tool Offset
 | | | | | | . . │ number
 | | | | | | . . │
 | | | | | | 9 9 ┘
 | | | | 0 0 ┐
 | | | | 0 1 │
 | | | | . . ├______Specifies the desired turret station
 | | | | . . │      number
 | | | | . . │
 | | | | 9 9 ┘
```

```
0 0 0 0 ┐
0 0 0 1 │
. . . . ├──────── Specifies the desired tool type.
. . . . │
. . . . │
9 9 9 9 ┘
```

B. The T-code indexes the turret, checks tool availability, and positions the magazine for the next change.

C. M06 executes a tool exchange. If the Tool Life Control Option is active and a correct tool with sufficient life is in the active turret station, there will be no response to M06. If the Tool Life Control Option is not active, M06 will always execute a tool change as long as the magazine contains an unused tool of the right type.

D. ALLOWABLE T-CODES WITH TOOL LIFE OPTION INACTIVE (ALL OTHER COMBINATIONS ARE ERRORS)

| | TYPE | TUR STA | TOV | -M- CODE | ACTION |
|---|---|---|---|---|---|
| 1. | 0000 | 00 | 00 | NO | a) Deactivates Tool Offset Variable TOV and Tool Data Variable TDV offsets and Exits. |
| 2. | XXXX | 00 | 00 | NO | a) Checks if magazine option is active. If yes, checks if tool type is available in magazine. If not, indicates an error, clears P-codes, and stops. |
| | | | | | b) Checks if preselection of a tool already made; if so and the tool types do not match, returns pre-selected tool. If types do match, reports, "PRESELECTION COMPLETE" and goes to d). |
| | | | | | c) Checks if fresh tool is available in magazine; if so, preselects from first available location; if not, requests a new magazine. |
| | | | | | d) Exits. |
| 3. | XXXX | XX | XX | YES | a) Checks if tool type is available; if not, indicates an error and stops. |
| | | | | | b) Checks if preselection already made; if so and tool types do not match, returns preselected tool. If types do match, exchanges tool in specified turret station and goes to d). Codes tool being returned to magazine as used. |

| | | | | | |
|---|---|---|---|---|---|
| | | | | | c) Indexes turret to specified station if not there and checks for type coded unused in magazine. If available, preselects and exchanges tool in specified turret station and codes tool being returned to magazine as used. If unused tool not available in magazine, requests new magazine.<br>d) Removes active TOV; activates specified TOV offsets.<br>e) Removes active TDV; enables specified TDV offsets.<br>f) Clears preselect indicator.<br>g) Exits. |
| 4. | 0000 | XX | XX | NO | a) Indexes turret to specified station if not there.<br>b) Removes active TOV; activates specified TOV offsets.<br>c) Removes active TDV; enables specified TDV offsets.<br>d) Exits. |

E. ALLOWABLE T-CODES WITH TOOL LIFE OPTION ACTIVE (ALL OTHER COMBINATIONS ARE ERRORS)

| | TYPE | TUR STA | TOV | M-CODE | P-CODES | ACTION |
|---|---|---|---|---|---|---|
| 1. | 0000 | 00 | 00 | NO | NO | a) Removes TOV and TDV; clears P-Codes and exits. |
| 2. | XXXX | 00 | 00 | NO | YES | a) Checks if magazine option is active. If yes, checks if tool type is available in magazine. If not, indicates an error, clears P-codes, and stops.<br>b) Checks if preselection done; if yes, checks if tool types match; if not, returns preselected tool; if yes, reports "PRESELECTION COMPLETE", and goes to d).<br>c) Checks if sufficient tool life in magazine. If yes, preselects at first location with sufficient tool life in magazine. If no, requests new magazine.<br>d) Clears P-codes and exits. |
| 3. | XXXX | XX | XX | YES | * | a) Checks if tool type available; if not, indicates an error, clears P-codes and stops.<br>* no, if tool type was preselected; yes, if tool type was not preselected. |

| | | | | | |
|---|---|---|---|---|---|
| 3a. | 0000 | 00 | XX | NO | NO |

b) Checks if preselection was done; if yes, checks if tool types match; if no, returns preselected tool; if yes, indexes to specified turret station, if not there, exchanges tool, and goes to d).

c) Checks if a tool type with sufficient life is in the specified turret station. If yes, indexes turret if required. If no, checks remaining turret stations for type and, if found, indexes to station with minimum sufficient life. If not found, indexes to specified station, if not there, and checks if type with sufficient life is in the magazine. If available, preselects and exchanges tool in specified turret station. If not, requests a new magazir[illegible]. unloads turret, and wa[illegible]

d) Removes active TOV; activates specified TOV offsets.

e) Removes active TDV; enables specified TDV offsets.

f) Clears P-codes and preselect indicator and exits.

| | | | | | |
|---|---|---|---|---|---|
| 4. | 0000 | XX | XX | NO | NO |

a) Indexes turret to specified station if not there.

b) Removes active TOV; activates specified TOV offsets.

c) Removes active TDV; enables specified TDV offsets.

d) Exits.

RESTRICTIONS: MDI only with tool life option active. Input in single step or auto mode will cause error. Control remembers last 3 type T-word input in single step or auto, and reactivates the remembered T-word upon activation of cycle start in single step or auto mode within an active program.

F. RECOMMENDED T-CODES FOR BASIC TOOL MANAGEMENT

| | TYPE | TUR STA | TOV | M-CODE | ACTION |
|---|---|---|---|---|---|
| 1. | 000 | 00 | 00 | NO | a) Removes TOV and TDV offsets and exits. |

| | | | | | |
|---|---|---|---|---|---|
| 2. | XXXX | XX | XX | NO | a)Checks if preselection already made. If so and types do not match, returns preselected tool and clears preselect indicator. If types do match, no response, goes to c)<br>b)Checks if a fresh tool is available in the magazine. If so, preselects from first available location and sets preselect indicator. If not, error.<br>c)Exits. |
| 3. | - | - | - | YES | a)Checks if preselection is already made. If so, indexes turret to previously specified station, if not there, and exchanges tool. If preselection was not made, no response, goes to e).<br>b)Removes active TOV; activates specified TOV offsets.<br>c)Removes active TDV; enables specified TDV offsets.<br>d)Clears preselect indicator.<br>e)Exits. |
| 4. | XXXX | XX | XX | YES | a)Checks if preselection is already made. If so and types do not match, returns preselected tool, clears preselect indicator. If types do match, goes to c).<br>b)Checks if fresh tool available in magazine. If so, selects from first available location. If not, indicates an error and goes to g).<br>c)Indexes turret to specified turret station if not there.<br>d)Exchanges tool and clears preselect indication.<br>e)Removes active TOV; activates specified TOV offsets.<br>f)Removes active TDV; enables specified TDV offsets.<br>g)Exits. |
| 5. | 0000 | XX | XX | NO | a)Indexes turret to specified station if not there.<br>b)Removes active TOV; activates specified TOV offsets.<br>c)Removes active TDV; enables specified TDV offsets. |

G. <u>T-Code and M06 Specifications</u>

1. The part programmer prepares the tool magazine configuration file or selects an appropriate set from among those already existing.

2. All tool magazine configuration files will be identified as follows:

```
(ID,MCL,CONFIG,MAG0027,00)
 |      |      |       |
 |      |      |       |___File protection code
 |      |      |           indicating the software
 |      |      |           privilege level required
 |      |      |           to view, edit, and delete
 |      |      |           this file.
 |      |      |___Individual Tool Magazine
 |      |          identification number.
 |      |___File name identifying this as a tool
 |          magazine configuration file.
 |___Heading, identifying this as an ASCII, Machine
     Control logic file, to the MC2000 control.
```

3. All configuration files will be formatted as follows:

```
(ID,MCL,CONFIG,MAG0027,3D)   (1)
CONFIGURATION ID - 00180     (2)
MAGAZINE SERIAL  - MAG0016   (3)
RUN              - 1.0       (4)
 (5)  (6)   (7)      (8)                    (9)      (10)
POSN TYPE  TOOL  TOOL HOLDER               AVAIL    SERIAL
 NO        STAT  X O/S      Z O/S          LIFE      NO
 01  0527   0   0.000000   0.000000 1.000000   0381                  *
 02  0527   0   0.000000   0.000000 1.000000   0392 SPACE #66-->*
 .    .     .      .          .         .        .                   .
 .    .     .      .          .         .        .                   .
 .    .     .      .          .         .        .                   .
 71  0999   0   0.000000   0.000000 1.000000   0018                  *
 72  0999   0   0.000000   0.000000 1.000000   0004                  *
(END,MCL)
```

(1) See paragraph 2. above.

(2) A control number assigned by Tool Staging or the programmer.

(3) Identifies the individual tool magazine assigned by the programmer or Tool Staging to this particular configuration.

(4) The quantity of parts or program "runs" which this magazine can complete before it needs to be replaced or refurbished.

(5) The magazine position number in which the tool is located.

(6) The tool type identification number, usually the last four digits of its tool drawing number.

(7) The tool status code, consists of 3 digits as follows:

0 As received from Tool Staging and not yet identified by the workstation.

xx0 Located in the magazine.

xx4 Located in turret station #4. (Available turret stations are 1 through 6.)

x10 Passed identification check; i.e. the electronic identification check (e.g. a bar code reading) agrees with the config file and the T-code.

x20 Failed identification check but tool is correct type; i.e. the identification system could not get a reading (e.g. the bar code label is unreadable) but a human overrode the hangup because his visual inspection revealed the tool is the type called for.

x60 Tool is worn out as determined by the adaptive control system.

x70 Tool broke during cutting per the tool break detection system.

x80 Failed identification check because the type disagrees with the configuration file and/or the T-code.

x90 Failed identification check because the identification system could not get a reading or the tool is missing.

1xx Tool has completed Initial Tool Offsetting per patent #4,382,215.

2xx A problem was found with the tool (from human inspection).

230 Insert mistaged.

237 Wrong insert.

238 Loose insert.

239 Incorrect toolholder offset (TDV).

240 Probe mistaged.

247 Wrong probe/toolholder.

248 Broken insert.

249 Toolholder damaged.

250 Defective insert.

257 Defective insert clamp.

(8) Toolholder offsets (TDV's) as supplied by Tool Staging.

(9) Available tool life where 1.000000 means 100%, .5000000 means 50%, etc., and in the case of probes (type between 900 and 998), 1.000000 means 1,000,000 hits or probing cycles available.

(10) Toolholder serial number within the type. This is permanently marked on the toolholder and is also included in the machine readable tool identification system (e.g. on the bar code label if that is the system used.)

4. The machine control updates the TURRET FACE TABLES to aid in its management of tools going in and out of the turret. The TURRET FACE TABLES are formatted as follows:

TURRET FACE TABLES

| TURRET NO. | TOOL TYPE | (1) MAGAZINE POSITION | (2) TOOL LIFE | SERIAL NO. |
|---|---|---|---|---|
| 1 | 532 | 59 | 0.000000 | 77 |
| 2 | 527 | 23 | .500000 | 145 |
| 3 | 999 | 69 | 1.000000 | 10 |
| 4 | 904 | 66 | .999324 | 22 |
| 5 | 999 | 71 | 1.000000 | 6 |
| 6 | 999 | 72 | 1.000000 | 13 |

(1) The magazine position from which the tool came and to which it will be returned.

(2) The Tool Life is the active record of tool life. The Available Life in the Configuration file is updated with the data from the Tool Life table above when the tool is returned to the magazine.

5. The part programmer, near the beginning of each part program, must include a tool list for that part program. The tool list specifies the tool types needed to run that program in the order in which they are used along with certain necessary information about tool life. The part program uses STO commands to enter the Tool List data. Entry of the Tool List ..st be preceded by an M111 command to erase the Tool List data from the previous part and followed by an M112 command to cause the control to search its Configuration file to determine if it has the required tool types in sufficient quantity and with sufficient Available Life to machine the part it is about to start and a subsequent part just like it.

6. The machine control uses the Tool List data to create the Tool List Tables:

TOOL LIST TABLES

| (1) ITEM NO. | (2) TOOL TYPE | (3) LIFE REQUIRED TO START CUT (P178) | (4) LIFE CONSUMED BY CUT (P181) | (5) SERIAL NO. |
|---|---|---|---|---|
| 1 | 527 | 1.000000 | 1.000000 | 282 |
| 2 | 527 | 1.000000 | .500000 | 115 |
| 3 | 902 | .000100 | .000004 | 33 |
| 4 | 527 | .500000 | .500000 | 115 |
| . | | | | |
| . | | | | |
| . | | | | |
| 32 | 901 | .000100 | .000022 | 17 |

(1) Input from the part program. An Item is the series of program commands required to put a tool in the turret, move the turret to the workpiece, make a machining cut or series of cuts, or, in the case of the probe, a probing sequence, and move the turret back to the tool changing position.

(2) Input from the part program. The tool type describes the required tool configuration for performing the cutting or probing sequence commanded by that particular Item.

(3) Input by the part progrэ. Life required to start the cut allows the part programmer to force the use of a fresh tool or insure the use of the tool most recently used as illustrated in the example above by a roughing cut (Item 1), a semi-finish or gaging cut (Item 2), a Surface Deviation Offsetting or Diameter Deviation Offsetting probing sequence (Item 3), and a finishing cut (Item 4).

(4) Input by the part program. Life consumed by the cut is also used by the part programmer to insure the action described in (3) above.

(5) The tool serial number is entered by the machine control to identify the actual tool used to perform the cutting or probing sequence. This is very helpful in determining the cause when something goes wrong and in getting the correct tool back in the turret in the rare instances that rework is required.

NOTES ON PROBES AS TOOLS (Reference Figure 18, block 586):

1. Probes are to be considered special cutting tools. If the available tool life is 1.000000, this means one million (1,000,000) probe hits are allowed for the corresponding probe. Typically, the minimum tool life to start the cutting (or probing) sequence in this case might be P178=0.000400, meaning 400 probing hits and the percentage life used by the cutting (probing) sequence might be P181=0.000025, meaning 25 probing hits.

2. Keep probes if:
   a) The tool search shows all tools including probes are present but one or more has insufficient tool life.
   b) The tool search shows insufficient tool life.

3. Return probes if:
   a) The tool search shows one or more tools not present.

4. Empty slots in a fresh magazine for kept probes do not have to be the same as in the spent magazine.

5. Erase and write these tables each time program is run.

6. <u>Life Management with tool life control option active</u>

A. Tool or life available this sequence.

1) Search Tool Magazine Configuration Table for Tool Type Number in T-code.

2) When found, read available life in the Tool Magazine Configuration Table.

3) Read tool type number and life to start tables at the item number.

4) Tool type numbers must agree. Life to start is less than or equal to available life, else test next replication of the tool type.

5) If none, request fresh magazine.

B. Tool or life available this operation. (M112 or fresh magazine)

1) Starting at active item number, test for life consumed less than or equal to remaining life. If true, subtract life consumed from remaining life. If false, test next replication of tool type.

2) If out of tools, request a fresh magazine.

C. Tool or life available next operation. (M112 or fresh magazine)

1) Complete 7B above successfully.

2) Repeat B1) except start at first item number.

3) If out of tools, request a fresh magazine.

7. <u>Life management with tool life control option not active</u>

A. Tool or life available this sequence.

1) Search magazine file for type number.

2) When found read available life table.

3) Availability life table must show 01.00 else test next replication of tool type number.

4) If none, request fresh magazine.

8. <u>Information for staging magazines</u>

A. Quantity of each tool type = quantity of parts to be machined x (Life to start - Unused life)

TABLE 6

CHIP AND COOLANT CONTROL FEATURES

SENSORS: One, for presence of chip container

IDENT: None, dependent on host and chip reclamation system

FIGURES 12 and 13 - CHIP MANAGEMENT SUBROUTINE and CHIP ACCUMULATION TIME MONITOR a) Actuated by an M-code, via the part program or MDI.

b) Tests for presence of a chip container.

c) Tests for a change in material from previously run program.

d) Tests for space available in chip container.

e) Allows machine to start another operation without sufficient chip space to complete the operation, if material is the same.

f) Requests AGV service with time limits for chip container pickup and/or delivery if needed, along with selected and old program material types.

g) Updates chip space records when container is replaced.

h) M30 (end of program-rewind signal) updates chip space records when operation is completed.

FIGURE 36 - RUN CHIP CONVEYOR MONITOR a) Activated by a switch signal or an M-code.

b) Tests for current execution of the chip management subroutine.

c) Runs chip conveyor in accordance with an on duty-off duty convention (ie. intermittently) to minimize wear and tear on the mechanical parts of the chip conveyor and to allow coolant to drain back into the machine sump instead of into the chip container, as long as chip space and a container are available.

d) Allows conveyor to be stopped for a program specified time period while machine is cutting to permit a chip container exchange.

e) Activates Optional Stop and sends/displays an error message if allowable conveyor off time runs out.

Figure 37:
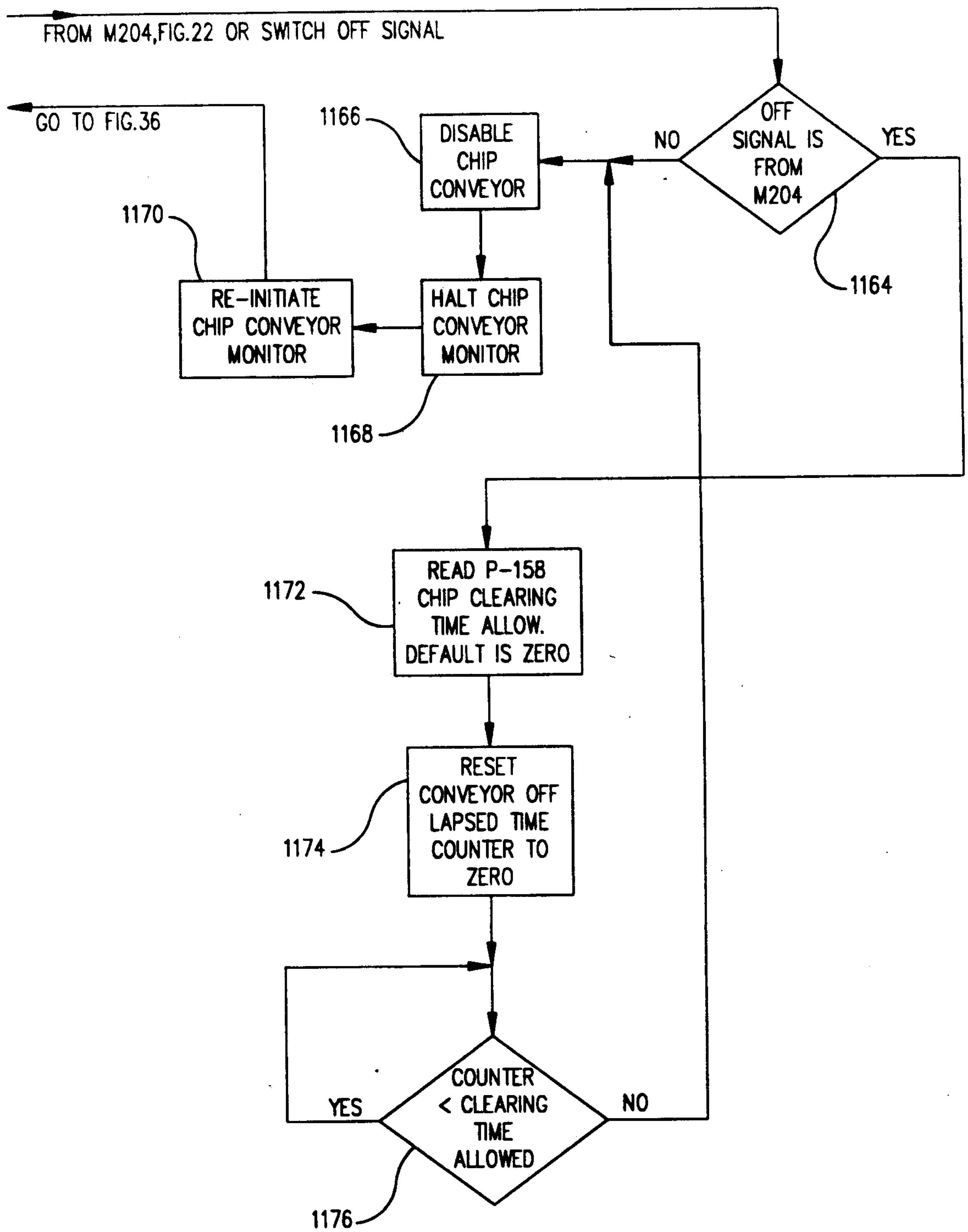

FIGURE 37 - STOP CONVEYOR SUBROUTINE a) A switch signal stops the conveyor directly.

b) An M-code stops the conveyor after allowing it to run a program specified time period to clear itself of chips.

FIGURE 14 - COOLANT CONTROL SUBROUTINE a) Activated by an M-code via the part program or MDI.

b) Tests if the machine is connected to the central coolant system.

c) Tests if there is sufficient coolant to operate.

TABLE 7

AGV P/U AND DELIV MONITOR FEATURES

SENSORS: Covered by other MCL routines

IDENT: None

FIGURE 29 - AGV DELIVERY MONITOR a) Activated by other MCL routines as needed.

b) Tests host for AGV at ready position signal.

c) Tests presence sensor for whatever is being delivered.

d) Tests host for delivery task complete signal.

e) Tests if a pickup is also expected.

f) Calls AGV pickup monitor or terminates function.

FIGURE 28 - AGV PICKUP MONITOR a) Activated by other MCL routines as needed.

b) Tests host for AGV at ready position signal.

c) Tests presence sensor for absence of whatever is being picked up.

d) Tests host for pickup task complete signal.

e) Tests if a delivery is also expected.

f) Calls AGV delivery monitor or terminates function.

A. When the AGV controller gets a request for service and there is no communication with the cell controller:

1. The AGV controller will send a vehicle (AGV) to the requested destination ready position, set the platform or fork height, as appropriate, for accomplishing the desired task, and turn over the control to the controls on the vehicle;

2. The vehicle will await the pushing of an EXECUTE button and, when pushed, the vehicle will execute the task, and then return to the destination ready position; the height of the platform or fork, as appropriate is adjusted for travel; and 3. The vehicle will await the pushing of the PROCEED button and, when it is pushed, will return control to the AGV controller for travel to a destination over a predetermined route.

B. When the cell controller gets a request for AGV service from the work station controller and there is no communication with the AGV controller:

1. The cell controller will not respond to the work station controller if there is no communication with the AGV system, but will send messages to a factory operations room that work station # __ needs help;

2. A machine attendant will go to the workstation and substitute for the cell controller communications by reading messages and pushing AGV buttons when appropriate;

3. The MC2000 will flash an AGV button when looking for cell controller input;

4. The MC2000 will keep the AGV button lit while an AGV or its equivalent is executing its task; and 5. The MC2000 will turn off the AGV button when pushed to indicate that the task is complete.

TABLE 8

TOOL MANAGEMENT FEATURES

SENSORS: Three for Tool Magazine Seated
Fixed Bar Code Reader for tool type identification
Others, in Tool Changer

FIGURE 21-T-CODE TASK

Activated by a T-code in the part program or MDI.

b) Tests for correct quantity of digits in T-code.

c) Activates specified tool offset when tool type and turret station are OK.

d) Calls the Tool Control subroutine, FIGURE 16.

FIGURE 19-TOOL CHANGE TASK a) Activated by an M-code in the part program or by MDI, or by the Tool Life Subroutine Figure 18.

b) Position machine axes for a tool change.

c) Calls the unload turret subroutine, Figure 20, if a magazine change is required.

d) Calls the appropriate tool changing procedure: manual, turret index, and/or automatic tool changer (Tool Handling Cycles, Table 10).

FIGURE 16-TOOL CONTROL SUBROUTINE a) Activated by the T-code Task or Tool Break/Adaptive Control Overload Subroutine.

b) Tests if the tool magazine (changer) option is active; if not, skips to e) below.

c) Tests if a tool magazine is seated. If there is no seated tool magazine, requests that a magazine be delivered.

d) Tests that the magazine configuration file is downloaded by the host and contains the tools specified in the tool list of the selected part program. If not, requests a magazine change and initiates preparations for the change.

e) Calls the Tool Life Subroutine, FIGURE 18.

FIGURE 20-UNLOAD TURRET SUBROUTINE (Tool Changer is active)

a) Activated by the Tool Change Task, FIGURE 19.

b) Tests if probes should be kept, i.e. replacement magazine configuration is the same as the current one.

c) Tests for tools in the turret and systematically arranges for their replacement with dummy tool holders, including probes if the magazine configuration is to be changed.

d) Tests for probes in the magazine and arranges to put them in the turret if probes are to be kept.

e) Requests AGV pickup service when ready.

f) Tests for completion of AGV pickup.

FIGURE 18-TOOL LIFE SUBROUTINE a) Activated by the Tool Control Subroutine, FIGURE 16.

b) Tests for a tool or life available for the upcoming cutting sequence for the T-code specified tool type.

c) Tests for tools or life available for the current operation for the T-code specified tool type.

d) Tests for tools or life available, next part, same operation for the T-code specified tool type.

e) Notifies the host of time to a tool or magazine change if a tool availability or a life limitation is uncovered per b), c), or d) above.

f) Arranges for a magazine change, tool change, or a turret index and calls the Tool Change Task, FIGURE 19, or takes no action if appropriate.

FIGURE 32-BROKEN/WORN TOOL INTERRUPT SUBROUTINE a) Activated by a tool break or adaptive control priority interrupt.

b) Stops machine, all motions.

c) Requires attendant to investigate but provides brief opportunity to bypass investigation.

d) Activates automatic tool recovery.

e) Utilizes the Tool Control Subroutine, FIGURE 16, as previously described.

f) Re-starts machine.

TABLE 10-EXCHANGE TOOLS SUBROUTINE a) Activated by the Tool Change Task, FIGURE 19, and the Unload Turret Subroutine, FIGURE 20.

b) Positions the magazine.

c) Extracts fresh tool from magazine.

d) Reads bar code.

e) Tests bar code against T-code.

f) Rotates arm to turret, extracts spent tool.

g) Rotates wrist, inserts fresh tool.

h) Updates tool location table.

i) Calls the Return Tool to Magazine Subroutine, TABLE 12.

TABLE 10-RETURN TOOL TO MAGAZINE SUBROUTINE a) Activated by the Exchange Tools Subroutine, TABLE 10.

b) Rotates magazine to spent tool position and rotates arm to magazine.

c) Inserts spent tool in magazine and returns arm to home.

d) Updates tool location.

TABLE 9
COOLANT FUNCTIONS

A. M219 - Use central coolant (overrides M221 thru M224)

*(1) Open inlet solenoid valve

*(2) Close recirculation solenoid valve (provide Boolean indication of commanded valve positions)

B. M220 - Use machine coolant (overrides M221 thru M224)

(1) Close inlet solenoid valve; and (2) Open recirculation solenoid valve (provide Boolean indication of commanded valve positions)

C. M221 - Open inlet solenoid valve (overrides M220 or M222)

D. M222 - Clos inlet solenoid valve (overrides M219 or M221)

E. M223 - Open recirculation solenoid valve (overrides M220 or M224)

F. M224 - Close recirculation solenoid valve (overrides M219 or M223)

G. Toolholder flow signals above or below minimum

H. High level signal above or below maximum

J. Low level signal above or below minimum (provide Boolean indication of status)

*Normal or default position if valves are powered one way and spring loaded the other way. However, power both ways is preferred, then valves will retain setting in event of power failure. Recovery from shutdown or E-stop should return valves to previous setting.

TABLE 10
TOOL HANDLING CYCLES

Horizontal Turret lathe (HTL) tool handling cycles may be summarized as follows:

| | |
|---|---|
| I - Select Tool: | Positions magazine, removes tool, reads bar code, end of cycle. |
| II - Exchange Tool: | Removes spent tool from turret, inserts fresh tool, returns to park at bar code reader, end of cycle. |
| III - Return Tool: | Positions magazine, if required, returns tool to original slot in magazine, returns to park, end of cycle. |

Typical Cycle Applications:

| SITUATION | CYCLE SELECTION |
|---|---|
| Preselect a tool in preparation for an anticipated tool exchange. | I |
| Exchange a tool without doing a preselect cycle. | I, II, and III |
| Exchange a tool following a preselect cycle | II and III |

| | |
|---|---|
| Exchange a broken or worn out tool during a cutting sequence following a pre-select cycle for a tool of a different type. | III, I, II, and III |
| Tool identification (bar code reading) fails. | III and I |

NOTE: In the descriptions of Tool Handling Cycles I, II, and III below, words in parentheses indicate how the system detects that the respective conditions described below are true.

TOOL HANDLING CYCLE I

I. SELECT TOOL Initiated by CYCLE II.A.1 or Txxxx

A. If a new magazine position number (from T code or tool management MCL) = Old magazine position number variable, display, "Tool in Turret" for 2 secs & go to K. below.

B. Enable safety device(s) for magazine motion.

C. Test for:

1. Servo axes Y and B (Figure 4a) referenced on tool changer (set flags in RAM);
2. Safety device(s) functioning;
3. Magazine seated (seated sensors closed);
4. Changer parked* (servo position feedback and limit switches closed);
5. Selection complete flag cleared (Boolean zero);
6. Both grippers open (open limit switches are closed and closed limit switches are open).

D. Simultaneously:

1. Position magazine per new magazine position number (servo position feedback);

2. Adjust elevation of arm (servo position feedback);

3. Rotate wrist to #1 gripper in extraction position (close #1 limit switch; #2 limit switch must open).

E. Extend extraction slide to magazine (close inserted limit switch; extracted limit switch must open).

F. Close #1 gripper (closed limit switch must close; opened limit switch must open).

G. Extract tool (close extracted limit switch; inserted limit switch must open).

H. Simultaneously:

1. Adjust elevation of arm (servo position feedback);

2. Rotate wrist to #2 gripper in extraction position (close #2 limit switch; #1 limit switch must open).

J. Read Bar Code (acknowledge receipt by MC2000).

K. Set selection complete flag (Boolean one).

L. If initiated by Cycle II.A.1., return.

M. If initiated by T0000, signal cycle completed.

*Parked means:

1. Arm is rotated to magazine (magazine limit switch is closed; machine limit switch is open);

2. Tool extraction slide is retracted away from magazine (extracted limit switch is closed; inserted limit switch is open);

3. Transfer axis is fully retracted away from machine (retracted limit switch is closed; extended limit switch is open);

4. Wrist position is #1 gripper in extraction position or #2 gripper in extraction position (#1 limit switch is closed, #2 limit switch is open; or #2 limit switch is closed, #1 limit switch is open);

5. #1 gripper is fully open or fully closed (open limit switch is closed and closed limit switch is open or vice versa);

6. #2 gripper is fully open or fully closed (open limit switch is closed and closed limit switch is open or vice versa.)

TOOL HANDLING CYCLE II

II. EXCHANGE TOOL Initiated by M006 following an acceptable T-code.

A. Test for:

1. Selection complete flag set, if not, execute Cycle I;

2. Servo axes Y and B (Figure 4a) referenced on tool changer (flags set in RAM);

3. Servo axes X and Z referenced on tool changer (flags set in RAM);

4. #1 gripper closed (closed limit switch closed; open limit switch open);

5. #2 gripper open (open limit switch closed; closed limit switch open);

6. Changer parked see (Tool Handling Cycle I);

7. Cross slide and tool holder coolant off (flow sensor shows zero) and;

8. Turret seated and locked (appropriate limit switches closed and open).

B. Enable door motion safety device.

C. Simultaneously:

1. Purge tool holder and cross slide coolant lines with air;

2. Save turret location and move turret to tool change location, remove TOV and TDV offsets (servo position feedback); and
3. Test door safety device functioning and if OK, open door (opened limit switch must close; closed limit switch must open).

D. Disable:
   1. Linear servo axes motion and turret indexing on machine;
   2. Work loader cycles (M501, 502, 504, 505, 506. 507. and 509); and
   3. Door operation (stop cycle if opened limit switch opens or closed limit switch closes).

E. Rotate arm through vertical position (vertical limit switch must close; magazine limit switch must open).

F. Simultaneously:
   1. Complete rotation of arm to turret (turret limit switch must close; vertical limit switch must open);
   2. Rotate wrist to #2 gripper in extraction position (#2 limit switch must close; #1 limit switch must open); and
   3. Extend transfer axis slide to machine (extended limit switch must close; retracted limit switch must open).

G. Extend tool extraction slide to turret (inserted limit switch must close; extracted limit switch must open).

H. Simultaneously:
   1. Close #2 gripper (closed limit switch must close; opened limit switch must open); and 2. Engage power wrench (engaged limit switch must close; disengaged limit switch must open).

J. Simultaneously:

1. Turn on cleaning air (open solenoid valve); and

2. Unlock tool (unlocked limit switch must close; locked limit switch must open).

K. Extract tool from turret (extracted limit switch must close; inserted limit switch must open).

L. Test tool absent from turret (tool in turret station sensor must open).

M. Rotate wrist to #1 gripper in extraction position (#1 limit switch must close; #2 limit switch must open).

N. Insert tool in turret (inserted limit switch must close; extracted limit switch must open).

P. Simultaneously:

1. Lock tool (locked limit switch must close; unlocked limit switch must open);

2. Shut off cleaning air (close solenoid valve); and

3. Test tool present in turret (tool in turret station sensor must be closed).

Q. Open #1 gripper (opened limit switch must close; closed limit switch must open).

R. Simultaneously:

1. Retract extraction slide (extracted limit switch must close; inserted limit switch must open); and 2. Disengage power wrench (disengaged limit switch must close; engaged limit switch must open).

S. Enable safety device(s) for magazine motion.

T. Simultaneously:

1. Retract transfer axis slide (retracted limit switch must close; extended limit switch must open);
2. Rotate arm through vertical position (vertical limit switch must close; machine limit switch must open);
3. Rotate wrist to #2 gripper in extraction position (#2 limit switch must close; #1 limit switch must open); and
4. Test if magazine safety devices are functioning and if OK, initiate positioning of magazine per old magazine position number variable.

U. Complete rotation of arm to magazine (magazine limit switch must close; vertical limit switch must open).

V. Enable:

1. Linear servo axes of machine;
2. Work loader disabled cycles;
3. Door operation; and
4. Door motion safety device.

W. Simultaneously:

1. Activate specified TOV offset, enable appropriate TDV offsets, and return machine axes to pre-exchange tool location (servo position feedback); and
2. Test door safety device functioning and if OK, close door (door closed limit switch must close; opened limit switch must open).

X. Simultaneously:

1. Disable door motion safety device; and
2. Initiate Cycle III.

TOOL HANDLING CYCLE III

III. RETURN TOOL Initiated by CYCLE II or TOOL MANAGEMENT TASK

A. Test for:

1. Magazine present (seated sensors must be closed);
2. Selection complete flag set; and
3. One gripper open and one gripper closed (one open and one closed limit switches must close; corresponding closed and open limit switches must open).

B. Simultaneously:

1. Rotate wrist: (if not in position)
   a. #1 gripper to extraction position if #1 gripper is closed (#1 limit switch must close; #2 limit switch must be open; and
   b. #2 gripper to extraction position if #2 gripper is closed (#2 limit switch must close; #1 limit switch must be open).
2. Adjust elevation of arm (servo position feedback); and
3. Position magazine (if not in position) per old magazine position number variable (servo position feedback).

C. Insert tool in magazine (inserted limit switch must close; extracted limit switch must open).

D. If upper gripper is closed, writeover old magazine position number variable with new magazine position from T-code.

E. Open closed gripper (opened limit switch must close; closed limit switch must open).

F. Retract extraction slide (extracted limit switch must close; inserted limit switch must open).

G. Clear selection complete flag.

H. Signal cycle completed.

TABLE 11
ASSUMPTIONS FOR THE PART MANAGEMENT TASK
(See also Table 4)

1. The workstation layout will be essentially as shown in Figure 4.

2. M-codes will initiate this procedure for:
   a) Transfer of a project plate from the Transfer Station or Queue Station to the machine chuck;
   b) Transfer of a project plate from the machine chuck to the Transfer Station; and
   c) Transfer of a project plate from the transfer station to the queue statior 3. Another M-code to abort an incomplete machining process also initiates this procedure for 2.b) above.

4. All communication with the AGV system is via the host computer. AGV deliveries and pickups are allowed only when requested by the workstation.

5. When the host dispatches an AGV with project plate and mounted workpiece to a workstation, it will download the Project Plate Configuration Tables called a transfer file to the workstation. The workstation will accept up to two sets of active transfer files, reporting part status when requested by the host. When a project plate leaves a workstation, its corresponding transfer file will be uploaded by the workstation and then erased when a third project plate arrives. In the event communication with the Host is interrupted, transfer files may be loaded into and out of the MC 2000 by an attendant using portable storage media such as a floppy disk or a cassette. Also the MC 2000 will store up to 100 sets of transfer files for completed parts pending re-establishment of communications with the host. Completed part transfer files , stored in the MC2000, are named HOLDxx where xx is a sequential number assigned by the MC2000 from 00 to 99. When communications with the host are restored, HOLDxx transfer files are uploaded automatically. When an xx counter reaches 99, it starts over again at 00 and erases the previous HOLD 00 file if it has not been uploaded and deleted. However, the MC2000 will stop with a warning message before it erases a HOLDxx file to provide an opportunity to capture the data before it is erased.

6. The part management subroutine is started and exited with the work loader in park position:
   (a) Vertical motion is fully UP;
   (b) Horizontal motion is halfway between queue station and headstock;
   (c) Wrist rotation is HORIZONTAL; and
   (d) Gripping mechanism is OPEN or CLOSED.
7. The part management procedure must handle the following situations for start-up (program selection, Figure 9) or M-code input to load, unload, re-seat, or abort:
   (a) No parts at workstation:
      1) Delivery expected at transfer station;
      2) No transfer station activity expected.
   (b) One part in Transfer Station:
      1) Pick up expected;
      2) No Transfer Station activity expected.
   (c) One part in Queue Station:
      1) Delivery expected at Transfer Station;
      2) No Transfer Station activity expected.
   (d) One part in machine:
      1) Delivery expected at Transfer Station;
      2) No Transfer Station activity expected.
   (e) One part in Transfer Station and one part in Queue Station:

1) Pick up expected at Transfer Station;

2) No Transfer Station activity expected.

(f) One part in Transfer Station and one part in machine:

1) Pick up expected;

2) No Transfer Station activity expected.

(g) One part in Queue Station and one part in machine:

1) Delivery expected at Transfer Station;

2) No Transfer Station activity expected.

<u>PART MANAGEMENT FEATURES</u>

SENSORS: Four; Transfer Station, Project Plate present.
Transfer Station, Project Plate seated.
Queue Station, Project Plate seated.
Chuck Station, Project Plate seated.
Others, In Part Loader.

IDENT: None, dependent on Host and download of project plate configuration tables called transfer files.

FIGURE 23 Section I: PREPARATION AND TRANSFER STATION MONITOR a) Responds to M-codes via part program or MDI:

1) To load a waiting part (mounted on a project plate);

2) To unload a processed part;

3) To abort the process and unload a partly processed part; or

4) To reseat the project plate if programmed probing functions show part runout is excessive.

b) Tests for preparation of machine (by part program or attendant) for part change activity.

c) Tests for task, load, unload, or reseat.

d) Tests if task can be accomplished without a "crash", e.g., is the station to which the part is to be moved open and unencumbered by previously initiated activity which is not yet complete?

e) Calls the correct procedure for the required task, i.e., load, unload, or reseat.

f) Monitors for completion of task.

g) Initiates pre-requisite tasks when needed to accomplish the primary task, e.g. if no part is waiting when a load command is issued, one will be requested.

h) Makes sure parts are dispositioned before they are unloaded.

j) Recovers from control shut down when the desired M-code is re-entered.

FIGURE 24 SECTION II: UNLOAD PART IN MACHINE a) Activated by Section I.

b) Unloads project plate and places it in the Transfer Station or unloads it in preparation for reseating.

c) Activates monitoring for pickup or initiates the reseating procedure.

TABLE 12 SECTION III: LOAD WAITING PART a) Activated by Section I for loading from Queue Station, Section II for reseating, and Section V for loading from Transfer Station when Queue station is empty.

b) Loads part.

FIGURES 25 AND 26 SECTION IV: SERVICE AGV MONITOR a) Activated by the program selection procedure if no parts are at the workstation and by Sections II or III.

b) Requests delivery of a first part or pickup of a processed part as directed.

c) Monitors for completion of delivery or pickup.

d) Requests download of project plate configuration tables and monitors receipt in conjunction with part delivery.

e) Uploads project plate configuration tables and CLM Measurement Report upon pickup of a project plate.

FIGURE 27 SECTION V: RECEIVE FRESH PART a) Activated by Section I.

b) Moves project plate from Transfer Station to Queue Station or, when chuck is empty, gets Section III to load project plate directly into chuck.

TABLE 12
WORKLOADER M501 CYCLE

NOTE: In the descriptions of the M501-M513 work loader cycles below, words in parentheses indicate how the system detects that the respective condition associated with each of the words in parentheses is true.

M501 Load Workpiece, Transfer Station To Machine

A. Enable safety device(s) for door operation.

B. Test for:

1. Servo axes referenced on workloader and machine;
2. Workloader parked* (limit switch closed and servo position feedback);
3. Workpiece present in transfer station (limit switch closed);
4. Workpiece seated in transfer station (limit switch closed);
5. Chuck open (draw rod retract and draw tube extend pressure switches open, and draw rod extend and draw tube retract pressure switches closed);

6. Gripper pins retracted (retract limit switches closed and engage limit switches open);
7. Machine in tool changing position (reference zero) (servo position feedback);
8. Tool changer parked (servo position and limit switches closed); and
9. Safety device(s) functioning.

C. Simultaneously:
1. Open door (opened limit switch must close; closed limit switch must open);
2. Clock spindle to workchange orientation (servo position feedback);
3. Move horizontal axis to transfer station (servo position feedback); and
4. Lower ram to safe clearance point above transfer station. Must clear queue station with workpiece in it. Queue station is elevated above transfer station sufficiently for wrist drive mechanism to clear workpiece in transfer station (servo position feedback).

D. Disable:
1. Spindle rotation;
2. Machine axes motion;
3. Tool changer operation; and
4. Door operation.

E. Lower ram to transfer station (servo position feedback).

F. Engage two opposing gripper pins (engage limit switches must close; retract limit switches must open).

G. Engage middle gripper pin (engage limit switch must close; retract limit switch must open).

H. Raise ram to clearance position of C4 above (servo position feedback).

J. Simultaneously:

1. Move horizontal axis to park (servo position feedback); and
2. Raise ram to park (servo position feedback).

K. Move horizontal axis to loading position (servo position feedback).

L. Simultaneously:

1. Lower ram to spindle centerline (servo position feedback); and
2. Rotate wrist down (down limit switch must close; up limit switch must open)

M. Simultaneously:

1. Engage ram locking wedge (locked limit switch must close; retracted limit switch must open); and
2. Turn on sensing air (open solenoid valve).

N. Move horizontal axis to chucking position (servo position feedback).

P. Simultaneously:

1. Pull project plate against stop blocks by retracting draw rod to grip load assist pin. (draw rod extended pressure switch must open; draw rod retracted pressure switch must close); and
2. Test for project plate seated on chuck (air pressure switch must close).

Q. If P2 is true within xx seconds, go to step X.

R. Release load assist pin by extending draw rod (draw rod retracted pressure switch must open; draw rod extended pressure switch must close).

S. Move horizontal axis to loading position (servo position feedback).

T. Delay 3 seconds.

U. Move horizontal axis to chucking position (servo position feedback).

V. Perform M501 steps P through R.

W. Simultaneously:

1. Perform M502 step S;
2. Shut off sensing air; and
3. Display error.

X. Retract gripper pins (retracted limit switches must close; engaged limit switches must open).

Y. Simultaneously:

1. Grip project plate by extending draw tube to expand diaphragm (draw tube retracted pressure switch must open; draw tube extended pressure switch must close); and
2. Shut off sensing air.

Z. Move horizontal axis to loading position (servo position feedback).

AA. Disengage ram locking wedge (retracted limit switch must close; locked limit switch must open).

AB. Simultaneously:

1. Raise ram to park (servo position feedback); and
2. Rotate wrist up (up limit switch must close; down limit switch must open).

AC. Enable:

1. Spindle rotation;
2. Machine axis motion;
3. Tool changer operation; and
4. Door operation.

AD. Simultaneously:

1. Move horizontal axis to park (servo position feedback); and

2. Close door (closed limit switch must close; opened limit switch must open).

AE. Disable safety device(s).

AF. Signal cycle completed.

* Parked means:

A. Horizontal axis is approximately half way between queue station and headstock casting of machine (servo position feedback);

B. Ram is fully up; i.e. just below upper axis overtravel limit switch (Reference Zero position; servo position feedback);

C. Wrist is rotated up (up limit switch closed; down limit switch open); and

D. Gripper pins are fully engaged or fully retracted (Retract limit switches open and engage limit switches closed or retract limit switches closed and engage limit switches open.

WORKLOADER M502 CYCLE

M502 Load Workpiece, Queue Station to Machine

A. Perform M501 step A

B. Perform M501 step B except:

1. Skip step B3; and
2. Change step B4 to workpiece seated on queue station.

C. Simultaneously:

1. Open door (opened limit switch must close; closed limit switch must open);
2. Rotate spindle to work change orientation (servo position feedback);
3. Move horizontal axis to queue station (servo position feedback); and
4. Lower ram to safe clearance point above a workpiece seated on the queue station.

D. Perform M501 step D.

E. Lower ram to queue station (servo position feedback).

F. Perform M501 step F.

G. Perform M501 step G.

H. Raise ram to clearance position of step C4 above (servo position feedback).

J. Simultaneously:

1. Move horizontal axis to park (servo position feedback); and

2. Raise ram to park (servo position feedback).

K. Perform M501 steps K through AF.

WORKLOADER M503 CYCLE

M503 Move Workpiece, Transfer Station to Queue Station

A. Perform M501 steps B1 through B4 and B6.

B. Test for queue station empty (seated switch open).

C. Perform M501 steps C3, C4, E, F, G, and H.

D. Simultaneously:

1. Raise ram to M502 step C4 end position (servo position feedback); and

2. Move horizontal axis to queue station (servo position feedback).

E. Lower ram to queue station (servo position feedback).

F. Test for project plate seated on queue station (limit switch closed).

G. Retract gripper pins (retracted limit switches must close; engaged limit switches must open).

H. Raise ram to M502 step C4 end position (servo position feedback).

J. Simultaneously:

1. Raise ram to park (servo position feedback); and

2. Move horizontal axis to park (servo position feedback).

K. Signal cycle completed.

WORKLOADER M504 CYCLE

M504 Unseat-Reseat Workpiece

A. Perform M501 step A.

B. Perform M501 steps B1, B2, B6, B7, B8 and B9.

C. Test for chuck closed (draw rod extended pressure switch open, draw rod retracted pressure switch closed; draw tube retracted pressure switch open, draw tube extended pressure switch closed).

D. Simultaneously:

1. Open door (door open limit switch must close; door closed limit switch must open);

2. Rotate spindle to workchange orientation (servo position feedback); and

3. Move horizontal axis to loading position (servo position feedback).

E. Perform M501 step D.

F. Perform M501 steps L and M1.

G. Move horizontal axis to chucking position (servo position feedback).

H. Perform M501 steps F and G.

J. Simultaneously:

1. Turn on sensing air (open solenoid valve);

2. Release load assist pin by extending draw rod (draw rod retracted pressure switch must open; draw rod extended pressure switch must close); and 3. Release project plate by retracting draw tube to shrink diaphragm (draw tube retracted pressure switch must close; draw tube extended pressure switch must open).

K. Perform M501 steps S through AF.

WORKLOADER M505 CYCLE
WORKLOADER M506 CYCLE

M505 Unload Workpiece to Transfer Station

A. Test for:

1. Workpiece not seated on the transfer station (limit switch open); and

2. Workpiece not present on the transfer station (optical switch closed).

B. Perform M504 steps A through J.

C. Move horizontal axis to loading position (servo pos on feedback).

D. Shut off sensing air.

E. Perform M501 steps AA through AE.

F. Perform M501 steps C3, C4, and E.

G. Test for project plate seated on the transfer station (limit switch closed).

H. Retract gripper pins (retracted limit switches must close; engaged limit switches must open).

J. Perform M501 steps H and J.

K. Signal cycle completed.

M506 Unload Workpiece to Inspect/Clean Position

A. Perform M505 steps B through E.

B. Simultaneously:

1. Rotate wrist down (wrist down limit switch must close; wrist up limit switch must open);

2. Lower ram to insp/clean position (centerline of project plate approximately 54" above floor) (servo position feedback); and 3. Move horizontal axis to inspect/clean position (over spindle drive motor) (servo position feedback).

C. Signal cycle completed.

WORKLOADER M507 CYCLE
WORKLOADER M508 CYCLE

M507 Load Workpiece From Inspect/Clean Position

A. Perform M501 steps A and B1, B5, B7, B8 and B9.

B. Test for gripper pins engaged (engaged limit switches closed; retracted limit switches open).

C. Simultaneously:

1. Rotate spindle to workchange orientation (servo position feedback);

2. Rotate wrist up (wrist up limit switch must close; wrist down limit switch must open);

3. Raise ram to park position (servo position feedback);

4. Move horizontal axis to park position (servo position feedback); and

5. Open door (door open limit switch must close; door closed limit switch must open).

D. Perform M501 step D.

E. Perform M501 steps K through AF.

M508 Move Workloader to Park from Any Mechanically Safe Position

A. Display: "Jog workloader clear of obstructions, then push cycle start".

B. Test for servo axes referenced on workloader.

C. Raise ram to park (servo position feedback) [if not there].

D. Rotate wrist up (wrist up limit switch must close; wrist down limit switch must open).

E. Move horizontal axis to park (servo position feedback, if not there).

F. Signal cycle completed.

WORKLOADER M509 CYCLE
WORKLOADER M510 CYCLE

M509 Load Workpiece From Park

A. Perform M501 steps A and B1, B2, B5, B7, B8, and B9.

B. Test for gripper pins engaged (engaged limit switches closed; retracted limit switches open).

C. Simultaneously:

1. Rotate spindle to workchange orientation (servo position feedback);

2. Move horizontal axis to loading position (servo position feedback); and

3. Open door (door open limit switch must close; door closed limit switch must open).

D. Perform M501 step D.

E. Perform M501 steps L through AF.

M510 Deposit Workpiece in Transfer Station From Park

A. Perform M501 steps B1 and B2.

B. Test for:

1. Gripper pins engaged (engaged limit switches closed; retracted limit switches open);

2. Project plate not seated on the transfer station (limit switch open); and

3. Project plate not present on the transfer station (optical switch closed).

-. Perform M505 steps F through K.

WORKLOADER M511 CYCLE
WORKLOADER M512 CYCLE

M511 Deposit Workpiece in Queue Station From Park

A. Perform M501 steps B1 and B2.

B. Test for:

1. Gripper pins engaged (engaged limit switches closed; retracted limit switches open); and 2. Project plate not seated on the queue station (limit switch open).

C. Perform M502 steps C3, C[illegible] and E.

D. Test for project plate seated on the queue station (limit switch closed).

E. Retract gripper pins (retracted limit switches must close; engaged limit switches must open).

F. Perform M502 steps H and J.

G. Signal cycle completed.

M512 Position Tool Sensor/Probe Calibration Device

A. Perform M504 steps A through H.

B. Disengage ram locking wedge (retracted limit switch must close; locked limit switch must open).

C. Enable secondary Z minus end of travel software limit switch set in MSD to prohibit crash between turret and tool sensor/probe calibration support.

D. Enable machine axes motion (X & Z).

E. Signal cycle completed.

WORKLOADER M513 CYCLE

M513 Remove Tool Sensor/Probe Calib. Device

A. Perform M501 steps A and B1, B7, B8 and B9.

B. Test for:

1. Chuck closed (draw rod extended pressure switch open; draw rod retracted pressure switch closed; draw tube retracted pressure switch open; draw tube extended pressure switch closed);

2. Gripper pins engaged (engaged limit switches closed; retracted limit switches open);

3. Ram at spindle centerline position (servo position feedback);

4. Horizontal axis at chucking position (servo position feedback);

5. Wrist rotated down (wrist down limit switch closed; wrist up limit switch open); and 6. Door open (door open limit switch closed; door closed limit switch open).

C. Engage ram locking wedge (locked limit switch must close; retracted limit switch must open).

D. Disable machine axes motion (X and Z).

E. Disable secondary Z minus end of travel software limit switch.

F. Perform M501 step X and M501 steps Z through AF.

TABLE 13
DATA MANAGEMENT MISCELLANEOUS SPECIFICATIONS

1. Dimensional Measurement Report formatting, data computation, and testing for out of tolerance conditions will all be done by the automation MCL software.

2. If an out of tolerance condition occurs, the program is stopped after all dimensions have been measured and an error message "OUT OF TOLERANCE CONDITION AT WS#" and WAITING is sent to the host. The DM report is displayed by the MC 2000. An attendant must investigate and decide whether or not to remeasure, continue, or abort. Manual activation of cycle start will be required to continue.

3. Upon completion of measuring and testing for out of tolerance conditions, the machine control will update the work piece status in the PUTRAN file following removal of the ·t from the machine spindle to the transfer station.

4. When the cell controller (host) is connected for automatic operation, the DM report will not be routinely printed or displayed at the workstation except as described in 2. above.

5. An M-code will be required to perform item 2. above and write the DM report data to the MATRAN file.

6. An MSD-code, accessible by designated local management personnel, will be required to specify how many sets of transfer files with DM Reports are to be saved before they are written over or erased with each new entry. This effects the quantity of memory in the MC 2000. With an active host connection, there is no need for more than two, the part in the machine and the previously machined part which may or may not be in the Transfer Station. The applicable PUTRAN file with DM Report is uploaded when the project plate is picked up from the Transfer Station.

7. The workstation number will be available to the MCL software from an MSD code.

8. Time date data will be 24-hour clock time plus day-month-year numbers obtained by workstation request from the host if not generated by the MC 2000.

9. The DM Report, when printed or displayed, will contain the information listed below:

REF: Reference code (3 numerical digits), assigned by the programmer, to refer each data line to a specific dimension on a sketch.
Default: 000.

IT: Item number (2 numerical digits), assigned by the programmer to indicate the program item number which cuts that particular characteristic to finished size. Default: 2 empty spaces.

CD: Code (2 alpha characters) assigned by the programmer to indicate the nature of the characteristic, eg. DS = distance; OD = outside diameter; and ID = inside diameter. Default: 2 empty spaces.

MIN: Minimum allowable dimension. Default: Not allowed.

MAX: Maximum allowable dimension. Default: Not allowed.

ACT: Actual size measured by the machine.

DEV: Deviation of actual from nominal where nominal = (max + min) / 2, and + is larger than nominal; - is smaller. Nominal is computed by the control and displayed but not printed.

OOT: Out of tolerance, i.e., the amount ACT is over MAX (+) or under MIN (-).

*: Indicates an OOT for an engineering drawing characteristic.

p: Indicates an OOT for a manufacturing process characteristic.

Cause: A four digit numerical code entered by the person investigating an OOT to indicate what caused the problem.

APPENDIX A
MESSAGE AND CAUSE CODES FOR LATHES

| | |
|---|---|
| NNNN> | MSG # is sent to Cell Controller; complete texts are in Appendix C. |
| LxNNNN | LOST TIME; mach is stopped; equip has failed; cost is overhead. |
| VxNNNN | VARIANCE of CIM Time; mach is stopped or running slow; cost is > planned. |

WxNNNN WARNING; mach is running but may stop shortly unless problem is fixed.
IxNNNN INFORMATION; will occur only during startup, debugging, or manual opn.

x Codes d Does not stop  o OPT STOP
c Cycle Stop  e Emergency Stop
h Halts comand execution
s OPT STOP if feeding; Cycle Stop if not Lc1109> OPTIONAL STOP CODE M01
Vc1111> : PROGRAM STOP CODE M00

L?2031> ERROR READING PART PRGM FILE
L?2035 : ERROR OPENING PART PRGM FILE

Le2200> SERVO STOP ACTIVE

Id2893> DNC TRANSMISSION ERROR
Id2896> DNC DATA OVERFLOW

Ws6100> COOLANT PUMP MOTOR OVERLOADED . .
Le6101> MACH HYDR PUMP MTR OVERLOADED . .
Le6102> MACH HYDR PRESSURE TOO LOW . . .
Le6103> SHOP AIR PRESSURE TOO LOW . . .
Wd6104> MACH HYDR SECOND'Y FILT CLOGGED .
Id6105 SELECT CHUCK OR UNCHUCK . . .
Ls6106> MACH HYDR PRIMARY FILTER CLOGGED
Ls6107> PANEL B, D, OR E ELEC CAB TOO HOT
Ls6108> MACH HYD OIL COOL FAN MTR OVRLD'D
Ls6109> MACH HYDRAULIC OIL TOO HOT . . .
Ls6110> MACH HYDR OIL LEVEL TOO LOW . . .
6111
Le6112> X AXIS BRAKE DID NOT RELEASE!
6113
6114
Ls6115> SLIDE (X) SERVO MOTOR TOO HOT . .
Ls6116> CARR (Z) SERVO MOTOR TOO HOT . .
Ls6117> WAYLUBE SYSTEM NOT FUNCT . . .
Wd6118> WAYLUBE OIL LEVEL TOO LOW . . .
Ls6119> PANEL C ELEC CAB TOO HOT . . .
Le6120> SLIDE DOWN (X+) TRAVEL LIMIT . .
Le6121> SLIDE UP (X-) TRAVEL LIMIT . . .
Le6122> CARR LEFT (Z+) TRAVEL LIMIT . . .
Le6123> CARR RIGHT (Z-) TRAVEL LIMIT . .
6124
6125
6126
Le6127> TURRET NOT CLAMPED . . .
Le6128> TURRET NOT UNCLAMPED W/I . . .
Le6129> TURRET NOT IN POSN. CHECK . . .
Le6130> SPNDL DRIVE TRANSFORMER TOO HOT .
Le6131> LOW OR NO SPINDLE LUBE PRESSURE .
Le6132> SPINDLE BRAKE DID NOT RELEASE! .
Ls6133> SPINDLE BLOWER MOTOR OVERLOADED .
Ls6134> SPINDLE DRIVE MTR TOO HOT! . . .
Le6135> SPNDL DRIVE MTR DID NOT START . .
6136
Id6137 OPN OF CNVYR INHIB BY FORK AGV .
Wo6138> ONE OR BOTH CHIP CNVYR MTRS O/L .
Wo6139> CHIP CONVEYOR JAMMED . . .
Ws6140> NOT ENOUGH COOLANT . . .
Ws6141> TOO MUCH COOLANT . . .
Ih6142 SPINDLE UNDER PRGM (AUTO) CNTRL .
Ws6143> NOT ENOUGH COOLANT FLOW TO TOOL .
6144
Le6145> X OR Z DRIVE ELECTRONIC FAULT! .
Wh6146> COOLANT SWITCH IN OFF POS'N . . .
Wh6147> CHIP CNVYR SWITCH NOT SET TO FWD.
6148
Le6149> SPINDLE DRIVE ELECTRONIC FAULT! .
Ld6150> ACTUAL SS NOT @ CMD; BELT SLIP .
6151

```
We6152> SPINDLE CAN'T RUN W/DOOR OPEN . .
  6153
  6154  [* Lh when tool change failure
  6155     stops machine]
  6156
*Wd6157> Y OR B MOVE TO MCL POS'N FAILED .
  6158
  6159
  6160
 Ih6161  MOVE EXCEEDS Y- S/W TRAVEL LIMIT.
 Ih6162  MOVE EXCEEDS Y+ S/W TRAVEL LIMIT.
  6163
  6164
  6165
  6166
  6167
  6168
  6169
  6170
 Ih6171  SPINDLE WILL NOT RUN W/CHUCK REL.
  6172
 Le6173> DRAW ROD NOT FULLY RETRACTED; . .
 Le6174> DRAW TUBE NOT FULLY EXTENDED; . .
 Le6175> GEAR CHG NOT COMPL W/I TIME ALLOW
 Le6176> DRAW ROD NOT FULLY EXTENDED; . .
 Le6177> DRAW TUBE NOT FULLY RETRACTED; .
 Le6178> PROJ PLATE NOT SEATED ON SPINDLE.
 Id6179  CHUCK WILL NOT REL W/SPNDL RUNNG.
 Le6180> AUX HYDR PUMP MTR OVERLOADED . .
 Le6181> AUX HYDR PRESSURE TOO LOW . . .
 Wd6182> AUX HYDR SECOND'Y FILT CLOGGED .
 Ls6183> AUX HYDR OIL COOL FAN MTR OVRLD'D
 Ls6184> AUX HYDR PRIMARY FILTER CLOGGED .
 Ls6185> AUX HYDRAULIC OIL TOO HOT . . .
 Ls6186> AUX HYDR OIL LEVEL TOO LOW . . .
  6187
  6188
  6189
  6190
  6191
 Ls6192> TC VERT (Y) SERVO MOTOR TOO HOT .
 Ls6193> MAG ROT (B) SERVO MOTOR TOO HOT .
 Le6194> TC VERT DOWN (Y-) TRAVEL LIMIT .
 Le6195> TC VERT UP (Y+) TRAVEL LIMIT . .
 Ih6196  MAG ROT (B) AXIS NOT REFERENCED.
 Le6197> Y OR B DRIVE ELECTRONIC FAULT! .
 Le6198> TC VERT (Y) CNTRBAL AIR PRESS LOW
  6199
  6200  [* Lh when next tool change
  6201     is attempted]
  6202
  6203  [* Not Lost Time while M and
  6204     T codes are executing]
  6205
*Lh6206> CHIP DOOR NOT FULLY OPEN/CLOSED.
*Wd6207> TOOL CHGR NOT AT STARTING POS'N .
 Id6208  TOOL CHGR SAFETY GATE IS OPEN!
 Lh6209> TOOL CHGR TEST SWITCH NOT IN AUTO
 Lh6210> TOOL LOCKING WRENCH NOT RETRACTED
 Lh6211> LOOSE/NO TOOL IN ACTIVE TUR STA .
*Wd6212> TOOL PRESELECT TOOK TOO LONG . .
  6213
 Id6214  OPN OF TC INHIB BY FORK AGV ACTIV
 Lh6215> TOOL CHGR FAILED TO MOVE . . .
 Ih6216  TOOL MAGA POS'N # > MAGA CAPY.
  6217
 Lh6218> TOOL CHG CYCLE TOOK TOO LONG . .
 Lh6219> CANNOT EXCHANGE TOOLS . . .
 Lh6220> TOOL LOCKING WRENCH NOT EXTENDED.
 Lh6221> TOOL REMOVAL FAILED.  IF . . .
 Lh6222> HYDR PRESS DRIV PWR WRNCH TOO HI.
  6223
 Lh6224> TOOL NOT CLAMPED W/I TIME LIMIT .

 Lh6250> WORKLOADER FAULT . . .
```

```
Lh6251> WKLDR DID NOT ACKNOWLEDGE COMMAND
  6252
Lh6253> SPINDLE ORIENT HAS FAILED.  . . .
Lh6254> WORKLOADER CYCLE TOOK TOO LONG .
  6255
Lh6256> WKLDR LIFT PINS NOT RETR W/I . .
Ih6257  JOG WKLDR CLEAR, PUSH CYCLE START
Ih6258  WORKLOADER AXES ARE NOT REF'D.
Ih6259  ENTER M508 TO PARK WORKLOADER.

Ih6401  TOOL LIFE DATA IS MISSING . . .
Ih6402  T CODE ERROR . . .
Lh6403> A TYPE 999 PLUG NOT AVAIL . . .
Lh6404> SPACE FOR TYPE 999 NOT PROVIDED .
     )5  TL TYPE IN T CODE DOES NOT MATCH
\    :6> TL TYPE IN T CODE NOT IN TURRET .
Lh6407  NO TOOL MAGA CONFIG TABLES . . .
Lh6408> BARCODE READING FAILED . . .
Id6409  PRESELECT FAILED TO FIND TOOL . .
  6410
  6411
  6412
  6413
  6414
Lh6415> TDV OFFSET ADJ EXCEEDS MSD LIMIT.
Lh6416> CANNOT FIND SEQ'N # IN P185 . . .
  6417
  6418
  6419
  6420
  6421
  6422
Wd6423> NO TOOL LIFE FOR NEXT PART . . .

*Wd6461> TRANS STA SENS INCOR PRIOR TO AGV
*Wd6462> SENS(S) ON TRANS STA INCOR AFTER .
*Wd6463> PLAT AGV TOOK TOO LONG . . .
*Wd6464> UNEXPECTED PLAT AGV SERVICE . . .
  6465
  6466  [* Lh when delaying M501, 503, 505,
  6467      512, and 513]
  6468
Wd6469> CHIP STA OPT SENS INCOR PRIOR TO .
Wh6470> OPT SENS ON CHIP STA INCOR AFTER .
Wd6471> MAG STA SENS INCOR PRIOR TO AGV .
Wh6472> SENS(S) ON MAG STA INCOR AFTER . .
Wh6473> FORKED AGV TOOK TOO LONG . . .
Wd6474> UNEXPECTED FORKED AGV SERVICE . .
  6475
  6476
  6477
  6478
  6479
Lh6480> SELECTING DUMMY PRGM FAILED . . .
Lh6481> CHIP MGT (M102) NOT EXECUTED . . .
  6482
  6483
  6484
  6485
  6486
  6487
  6488
  6489
Lh6490  CHIP VOL FOR THIS OPN MUST BE > .
Lh6491  CHIP CNTR VOL MUST BE > 0.  . . .
Lh6492  CONVEYOR OFF TIME LIMIT AND . . .
Lh6493  PART MTRL TYPE OF '0' NOT ALLOWED
Lh6494  PRGM'D PART MTRL IS OUT OF RANGE.
  6495
  6496
Lh6497> PROJ PLA TRANSFER UNSUCCESSFUL . .
  6498
  6499
        [*  Lh when delaying M505]
Id6800  WKSTA START UP IS COMPLETED . . .
Id6801  CONVEYOR IS PURGING.
```

```
Ih6802  WKSTA NOT ON LINE W/CELL CNTRLR .
Ih6803> CYCLE START IS OFF CAUSING LT . .
Ih6804  AUTO AND SINGLE ARE INHIBITED . .
Ih6805  CC FAILED TO ACK SERV REQ W/I .
Wd6806> CHIP CNTR P/U NEEDED . . .
Wd6807> CHIP CNTR DELIVERY NEEDED . . .
Ih6808  FRGM STATUS IS TRY; Control . . .
Id6809  CAUTION; BE SURE TO EDIT Q1TRAN .
Lh6810> CELL CNTRLR COMMUNIC IN PROGRESS
Ih6811> NO FILE EXISTS FOR CIM TIME . . .
Id6812  BUB/RMM DATA RETRIEVAL IN PROG!
Ih6813  DIMENS'L DATA TABLES ARE FULL
Vh6814> OOT DETECTED W/DIMENS'L MEAS
Ih6815  TO REMEASURE SEARCH FOR DIMENS'L .
Wd6816> PART DELIVERY NEEDED.
*Wd6817> PART PICKUP NEEDED.
Id6818  PT LOC'N CHK & PRGM SEL IN PRGRS
Id6819  QC CHKS IN PROGRESS.
Ih6820  BLOCK DELETES BEING PROCESSED
Ih6821  FILE UPDATE IN PROGRESS . . .
Vh6822> NO MEASUREMENT DATA IN TABLES . .
Ih6823  REF-IT-CD PORTION OF THE . . .
Lh6824> COOLANT PRBLM IS/WAS PRESENT . .
Lh6825> WAITING FOR TOOL MAGAZINE PICKUP.
Lh6826> WAITING FOR TOOL MAGA DELIVERY.
,Lh6827> WAITING FOR CONFIG MCL FILE.
Lh6828> UNLOAD DELAY, CC HAS PART ON WAY.
Lh6829> WKPC STAT INCOR/MISSNG IN MATRAN
  6830
Lh6831> PUTRAN OR MATRAN IS MISSING . . .
Lh6832> CANNOT WRITE DM'S INTO MATRAN . .
Lh6833> WAITING FOR MANUAL INTERVENTION .
Lh6834> PROGRAM NOT SELECTED BY M100 . .
Lh6835> WAITING FOR PART PROGRAM . . .
Lh6836> TRANSFER FILE NOT AVAILABLE . . .
Lh6837> TRANSFER FILE OUT OF SYNC . . .
Lh6838> LASER CALIB IS OVERDUE . . .
Lh6839> GOLD MASTER TEST IS OVERDUE . . .
Lh6840> VERIF RESULTS ARE OVERDUE . . .
Lh6841> VERIF HAS BEEN REJECTED . . .
Lh6842  PRGM REWIND FAILED DURING ABORT .
*Wh6843> DETRAN NOT AVAIL.  LOAD & PUSH .
*Wd6844> WHEN AGV TASK IS COMPL AND . . .
Lh6845> DUPLICATE HOLD FILE/MEM FULL . .
  6846  [* Lc When Cycle Start goes out]
Lh6847> COOLANT MGT TASK NOT EXECUTED . .
Lh6848> COOLANT SOURCE DOES NOT MATCH . .
*Wo6849> RUN TIME W/CNVYR OFF HAS EXPIRED
Lh6850> WAITING FOR RESPONSE FROM CC . .
Lh6851> EXPECTED TRIP DID NOT OCCUR . . .
Lh6852> UNEXPECTED TRIP . . .
Lh6853> OFFSET ADJUSTMENT EXCEEDS LIMIT .
Lh6854> SYSTEM ACCURACY CHECK FAILED . .
Lh6855> PROBING CYCLE FAILED . . .
Vh6856> DIMENSION EXCEEDS TOLERANCE . . .
Vh6857> RUNOUT EXCEEDS TOLERANCE . . .
Lh6858> TRANSFER FILE ALREADY EXISTS . .
Lh6859> MULTIPLE HITS HAS FAILED . . .
Lh6860> PRGM STATUS . . . IS INCORRECT .
Ih6861  BLOCK DELETES NOT DESIGNATED . .
Vd6862> MFO NOT SET W/I REQ'D RNG OF 100%
Vd6863> SSO  "   "   "   "   "   "   "
Vh6864> REMOVE CHIPS FROM PART.
Lh6865> TOOL xxxx NOT AVAIL/NO ITO/NO LFE
Lh6866> CC QUIT; UNLOAD HALTED WAITING .
Vh6867> PART REQUIRES SPEC'L HANDLING . .
  6868  * Lh w/only 1 Proj Plate @ wksta]
  6869  * Lh when delaying M501 or M505]
Id6870  CC WILL OR HAS P/U MAG.  IF A . .
Id6871  CC IS IN ERROR STATE . . .
Id6872  M108 IS EXECUTING.  Exchange . . .
  6873
Ih6874  AUTO MAGA P/U & DELIV IN PROG . .
Ih6875  REFERENCE ZERO NOT PERMITTED . . .
Lh6876> CNTRL PWRD DWN DURING AGV SERV . .
Ih6877  SELECT TYPE OF AGV . . . WHEN 2nd
```

```
Id6890  FROJ PL MOVE BY WKLDR INHIB . . .

Id6900  31612J3 C GENERAL ELECTRIC 1 C

Ih6991  SPINDLE SPEED IS OUT OF RANGE . .
Lh6992> SPINDLE NOT UP TO SPEED IN . . .

Lost & Var Time Identifiers; not displayed:
Le9001  PWR INTERRUPTED; CIM TIME ERROR.
Le9002  PWR INTERRUPTED; CIM TIME O.K.
Lc9003  CONTROL SWITCHED OUT OF AUTO MODE.
Lh9004  FEED HOLD APPLIED.
Lc9005  CANCEL/CLEAR APPLIED.
Le9006  SERVO STOP APPLIED BY CELL CNTRLR.
Vd9007  REWORK/REMEASURE OF OOT.
Ld9008  SETUP, ITO AND ETSO.
```

WORKLOADER MESSAGE CODES

```
1xx  Horizontal Axis
2xx  Vertical Axis
```

```
x02  Loss of feedback
x03  Overtravel limit [illegible] direction
x04     "        "       "   _       "
x05  Local stop
x11  APM PROM memory failure
x12   "  RAM    "        "
x13  Resolver circuit failure
x21  Remote stop
x22  Invalid command
x23  Move memory overflow
x24  Canned cycle memory overflow
x25  Invalid canned cycle number
x26  Illegal command with canned cy
x27  Invalid rate override value
x28  Invalid return data selection
x29  Servo disabled while moving
x30  Move attempted with servo disabled
x31  Cannot find Ref Zero while moving
x32  Cannot JOG while moving
x33  Cannot change feedrates while moving
x34  Cannot start canned cyc while moving
x35  Cannot do Ref Zero cyc while moving
x36  Cannot select resolver w/APM enabled
x37  Ref Zero position is outside limits
x41  Canned cycle cannot call itself
x42  Canned cycle memory failed
x43  Final position is absent
x44  Velocity or acceleration is absent
x45  Outside of programmed limits
x52  Cannot change dir w/i flyby move
x53  Prog feedrate exceeds safe limit
x54  Prgm'd velocity > max allowed veloc
x55  Programmed feedrate is zero
x56  Prog acceleration exceeds maximum
x57  Programmed acceleration is zero
x58  Dwell programmed after flyby move
x59  Wait to move pgmd   "     "    "
x60  Prog move exceeds + end of travel
x61   "    "     "    _  "   "    "
x62  Cannot Set Step after a flyby move
x63  No distance to finish flyby move
x64  "    "    "    "    1st flyby move
x65  "    "    "    "    2nd   "    "
x71  APM software failed
x72   "     "       "
x73  Single move step exceeded 68 minutes
x78  Axis out of synch
x79  Servo fault
x80  Out of synch
```

| | |
|---|---|
| x81 | Absolute position too far away |
| x82 | Flyby move too short |
| x84 | Illegal resolver gear ratio |
| x85 | " " offset |
| x90 | APM software failure |
| x91 | " " " |
| x92 | " " " |
| x93 | I/O chain reset from Series VI |
| x99 | Hardware trap of unknown origin |
| 301 | Lift cylinders not extended |
| 302 | " " " retracted |
| 303 | Yoke not rotated down |
| 304 | " " " up |
| 305 | Shot pin not extended |
| 306 | " " " retracted |
| 307 | Chuck not released |
| 308 | Vertical axis not in position |
| 309 | " " " " " |
| 310 | " " " " " |
| 311 | Auto/Manual switch in Manual |
| 312 | E-STOP active on Series VI |
| 313 | FEEDHOLD active on Series VI |
| 314 | No program number entered |
| [illegible] | Illegal [illegible] number |
| 316 | No part at Queue Station |
| 317 | Transfer Station is occupied |
| 318 | No part in machine chuck |
| 319 | Machine chuck is occupied |
| 320 | Lift pins are not retracted |
| 321 | Step counter not reset from prev prgm |
| 322 | Horizontal drive motor too hot |
| 323 | Vertical drive motor too hot |
| 324 | Horizontal axis brake fault |
| 325 | Vertical axis brake fault |
| 326 | Yoke down rotation pressure too high |
| 327 | " up " " " " |
| 328 | One or both axes not referenced |
| 329 | Queue Station is occupied |
| 330 | Transfer Station is empty |
| 331 | Yoke not rotated up |
| 332 | Shot pin not retracted |
| 333 | Chuck not clamped |
| 334 | Yoke not rotated down |
| 335 | Lift pins not extended |
| 336 | Workloader not at Park |

CAUSE CODES FOR ENTRY IN PUTRAN AND TOOL MAG TABLES

| | | PUTRAN | MAG |
|---|---|---|---|
| 11 | OPERATOR ERROR | 11xx | 2xx |
| | Part mistaged | 11 | |
| | Part dropped | 12 | |
| | Wrong procedure | 13 | |
| | Insert mistaged | 14 | 230 |
| | Wrong insert | 15 | 237 |
| | Loose insert | 16 | 238 |
| | Incorr toolhldr offset | 17 | 239 |
| | Probe mistaged | 18 | 240 |
| | Wrong probe/toolholder | 19 | 247 |
| | Miscell/undetermined | 20 | |
| 12 | MANUFACTURING PLAN | 12xx | N/A |
| | Improper procedures | 11 | |
| | Drawing changed | 12 | |
| | Set up piece(s) | 13 | |
| | Bad probe selection | 14 | |
| | Bad insert clamp sel'n | 15 | |
| | Bad insert selection | 16 | |
| 12 | MANUFACTURING PLAN cont | 12xx | 2xx |
| | Broken insert | 17 | 248 |
| | Phys damage, pt/tlhldr | 18 | 249 |
| | Miscell/undetermined | 19 | |

| | | | |
|---|---|---|---|
| 14 | DRAWING ERROR | 1400 | N/A |
| 15 | NUMERICAL CONTROL/TAPE | 1500 | N/A |
| 17 | MACHINE MALFUNCTION | 17xx | N/A |
| | Machine defective | 11 | |
| | Machine crashed | 12 | |
| | Miscell/undetermined | 13 | |
| 18 | FIXTURE MALFUNCTION | 1800 | N/A |
| 19 | TOOL PROVEOUT | 1900 | N/A |
| 23 | OUTSIDE VENDOR MTR'L | 23xx | 2xx |
| | OOT dimension | 11 | |
| | Defective insert | 12 | 250 |
| | Defective insert clamp | 13 | 257 |
| | Defective material | 14 | |
| | Wrong material | 15 | |
| 26 | UNDETERMINED | 2600 | N/A |
| 30 | HANDLING DAMAGE | 3000 | N/A |
| 32 | MACHINE MAINTENANCE | 3200 | N/A |

NOTES:

1. AREA AT FAULT code is L3 for Plant III machine tools and not shown in PUTRAN.
2. PROBLEM code is AA, dimensional, and not shown in PUTRAN; CLM cannot detect anything else.

TOOL STATUS CODES

| | |
|---|---|
| 00 | Unidentified by the workstation. |
| 1xx | Tool has completed ITO. |
| 10 | Passed ident; correct type. |
| 20 | Failed ident; correct type. |
| 30, 40, 50 | Unassigned. |
| 60 | Worn out per Adaptive Cntrl overload. |
| 70 | Broken per MTM. |
| 80 | Failed ident; wrong type. |
| 90 | Failed ident; unreadable/tool missing. |
| x | Turret Sta # (1 thru 6) if in turret. |

APPENDIX B

A U T O M A T I O N P - C O D E S

APPLICATION SOFTWARE

| | |
|---|---|
| 000 | Reserved by GE-FANUC |
| 001 | " " " |
| 002 | " " " |
| 003 | " " " |
| 004 | " " " |
| 005 | " " " |
| 006 | " " " |
| 007 | " " " |
| 008 | " " " |
| 009 | " " " |

CLOSED LOOP MACHINING

| | |
|---|---|
| 010 | Trip Pos'n Deviation |
| 011 | 1st X direction hit deviation |
| 012 | " Z " " " |
| 013 | 2nd X " " " |
| 014 | " Z " " " |
| 015 | X OSA (P013 +/- P011) |
| 016 | Z OSA (P014 +/- P012) |
| 017 | 3rd X direction hit deviation |
| 018 | " Z " " " |
| 019 | Programmed Pos'n |
| 020 | Infd Dist (SHIMA + OVTRV) |
| 021 | Counter for GSUBs PLOX and PLOZ |
| 022 | Motion Direction |
| 023 | Infeed Feedrate |
| 024 | Overtravel Distance (OVTR) |
| 025 | Standoff Dist (+/- SHIMA) |
| 026 | Active Tool # ( LN) |
| 027 | Deviation (for display) |
| 028 | Probe Pos'n (PRBPSN) |
| 029 | Spindle Orient Angle |
| 030 | Part Sensor Radius |
| 031 | Initial Tool Offset, X |

032 Initial Tool Offset, Z
033 X OS Limit, GSUB OFFCHK (re P47, P95)
034 Catalog Stylus Tip Diam
035 Reference Number
036 Minimum Dimension
037 Maximum Dimension
038 Item # Where Machined
039 Characteristic Type Code
040 TOV Offset # (OSN)
041 Out Of Tolerance Value
042 Nominal Dimension
043 Actual Dimension
044 HTL Datum OD
045 HTL Datum ID
046 Generic Datum Diameter
047 Z OS Limit, GSUB OFFCHK (re P33, P95)
048 X Eff Tip Size Offset
049 Z Eff Tip Size Offset
050 CLM Probing Pattern
051 Generic Eff Tip Size
052 1st Eff Tip Size Value
053 2nd " " " "
054 3rd " " " "
055 4th " " " "
056 5th " " " "
057 6th " " " "
058 7th " " " "
059 8th " " " "
060 Gldmstr ETS, X/Stylus ball tip #
061 " " , Z
062 Counter for Auto Recut
063 " " Block Delete
064 Button height on Project Plate
065 Saved Z Dev'n, 1st PLO hit
066 " " " , 2nd " "
067 3rd Y direction hit deviation
068 PLO #1, X
069 PLO #1, Z
070 PLO #2, X
071 PLO #2, Z
072 Qty of Dims to be Measured
073 Sign of Datum radius correction
074 Probe Status
075 1st Y direction hit deviation
076 2nd Y " " "
077 OOT Flag
078 Quantity of Tool Types
079 ITO, Pocket # of tool in grprs/turret
080 Last tool type used
081 Grinder dresser datum loc'n, Z
082 " " " " , X & OD's
083 " " " slot width
084 Y OSA (P076 +/- P075)
085 1st X direction hit, hole center
086 " Y " " , " "
087 Minimum % SSO for M131
088 Maximum % SSO for M131
089 Dwell in seconds @ max and min % SSO

PART PROGRAMMER 090 pos'n from P115
091 " " P116
092 Z " " P117
093 2nd X direction hit, hole center
094 " Y " " , " "
095 Y OS Limit, GSUB OFFCHK (re P33, P47)
096 Runout, X range
097 " , Z "
098 Item Number last active
099

WORK STATION

100 Chuck Open (0) or Clamped (1)
101 W location @ tool change (VMC)
102 X coordinate of hole location (VMC)
103 Y " " " " ( " )

| | |
|---|---|
| 104 | M81 Time Delay in seconds (VMC) |
| 105 | Workstation Status Code (from M109) |
| 106 | |
| 107 | |
| 108 | |
| 109 | |

WORKPIECE PROGRAM

| | |
|---|---|
| 110 | |
| 111 | Z Master Tool trip position (VMC) |
| 112 | Line pointer for calc of Dev and OOT |
| 113 | |
| 114 | Lapsed Hrs for turn off of Block Del |
| 115 | VMC X pos'n (from M200) (ref P090) |
| 116 | " Y " ( " " ) (ref P091) |
| 117 | " Z " ( " " ) (ref P092) |
| 118 | Block Deletes to be made active |
| 119 | |
| 120 | Program running (CIM) time |
| 121 | Program cutting time |
| 122 | Multi-hits data |
| 123 | " " " |
| 124 | " " " |
| 125 | " " " |
| 126 | " " " |
| 127 | " " " |
| 128 | " " " |
| 129 | " " " |
| 130 | " " " |
| 131 | " " " |
| 132 | " " " |
| 133 | " " " |
| 134 | " " " |
| 135 | " " " |
| 136 | " " " |
| 137 | Verification Interval, hours |
| 138 | Position #, multi-fixture proj plate |
| 139 | Feed time in seconds for M213 |
| 140 | Dwell time in seconds for M213 |
| 141 | Old Verification Interval, hours |
| 142 | Old Year and Month |
| 143 | Old Calendar Day Number |
| 144 | |
| 145 | Hold File counter |
| 146 | |
| 147 | |
| 148 | |
| 149 | Load-unload pos'n, Y Axis |

SWARF AND COOLANT

| | |
|---|---|
| 150 | Workpiece material code |
| 151 | |
| 152 | Chip container volume, cubic feet |
| 153 | Chip volume per operation, cubic feet |
| 154 | Chip conveyor off duty time, minutes |
| 155 | Max running time w/cnvyr off, min's |
| 156 | |
| 157 | |
| 158 | |
| 159 | Coolant source code |

CUTTING TOOLS

| | |
|---|---|
| 160 | # tools in maga of type in T code |
| 161 | Z TVG trip pos'n for master tool |
| 162 | Y " " " " " " |
| 163 | Left X coordinate for TVG beam align |
| 164 | Right X " " " " " |
| 165 | X coordinate of center of TLI platen |
| 166 | Y " " " " " " |
| 167 | X " " " " chuck base |
| 168 | Y " " " " " " |
| 169 | X coord of cnty of probe calib mstr |
| 170 | Y " " " " " " " |
| 171 | X coordinate of PLO datum |
| 172 | Y " " " " |
| 173 | Z distance, TVG to PLO datum |

174 Z " , TLI " " "
175 Z TLI trip position of master tool
176 Z probe trip " on PLO datum
177 TVG trip position reversal error
178 Minimum tool life to start cut seqn
179 Cutting sequence time in minutes
180 Tool life @ cut conditions, minutes
181 % life used by the cutting sequence
182 Minimum useful life of the tool type
183 MTM parameter #
184 " " value
185 GOTO seq'n # @ msg 6865 during ITO
186
187
188 Min radial dress to start a GDR seqn
189 Min face dress to start a GDR seqn

BLOCK DELETES 190
191 Block Delete # to skip ITO and ETSO
192 " " " " " ITO only
193
194
195
196
197
198
199

GRINDER, GENERAL 200
201 X feed stop pos'n for M120 and M121
202 Z " " " " M122 and M123
203 Clearance diam for M120 thru M123
204 Stock allowance " " " "
205 Grind'g feed rate " " " "
206 Dwell/sparkout, secs " " " "
207 0 is OD, 1 is ID " " " "
208 0/FLP220, 1/.001, Safe Zone, M120-23
209

GRINDER RECIPROCATION 210
211 Max Z- pos'n for M121, M122, & M211
212 " Z+ " " " , " , " "
213 " X- pos'n for M120, M123, & M210
214 " X+ " " " , " , " "
215 Recip cycs/sec, M121, 123, M210, 211
216
217
218
219

GRINDER WHEEL DRESSING 220
221 Radial compensation for M124, M126
222 Radial dress lead for M124 and M126
223 Qty of radial passes for M124, M126
224 Face conpensation for M125 and M126
225 Face dress lead for M125 and M126
226 Quantity of face passes for M125, 26
227 Z land depth ?? for GDR
228
229

230
231 MCL calculated X final pos'n for GDR
232 " " Z " " " "
233 " " feedrate for GDR MSUB
234 " calc'd dist opp face dress angle
235
236
237
238

AUTOMATION M-CODES (m suffix, responds to MDI only)

(t prefix, toggles w/oppos M code)
(* Re M501-509: M129/130 are defaults, M127/128 will be used if commanded @ end of PLO)|

CONTROLLING FUNCTIONS

100m Initiates automatic processing
101 Runs QC Management task
102 Runs Chip Management task
103 Runs Coolant Management task
104
105 Runs Data Management task
106 Runs Prelim Wkpc Disposition task
107m Calls AGV interchange problem menus
108m Term CT, copies MA to RW, uplds on CC
109 Runs Wksta Stat Sel'n & clock set task
110
111 Erases Tool List Tbl data incl S/N's
112 Performs tool search
113m Aborts program, unloads part
114 Computes DM rep't, stops @ M105 if OOT
115 " " " , ignores OOT @ M105
116m Sets tool lives to 1 on types < 900
117 Erases probing data in PRBDTA file
118 Sends PRNT data to PRBDTA file
119 Sends PRNT data to printer port
120 Init GDR X Axs Plunge Cyc per P201-208
121 " " Z " Recip " " P201-215
122 " " Z " Plunge " " P202-208
123 " " X " Recip " " P201-215
124 " " Whl Dia Dress " " P221-223
125 " " Whl Fac Dress " " P224-226
126 " " Dia & Fac Drs " " P221-226
t127* Adds PLO #1 (P68 & P69) to TOV's
t128* Subtr's " " ( " " " ) " "
t129* Adds " #2 (P70 & P71) " "
t130* Subtr's " " ( " " " ) " "
131 Enables SSO variation per P87,88,89
132 Cancels M131 (M05 & CLEAR also cancel)
133 Computes Radius of True Position
134 " Diameter " " "
135m Records CIM Time in PUTRAN file
136m Notifies CC to P/U mags and does M310

MACHINE OPERATING FUNCTIONS

200 Writes X,Y,Z,pos'n to P115,116,117
201 Opens door
202 Closes door
203 Enables Chip Conveyor
204 Disables " "
205 Disables door @ open pos'n for ITO
206 Enables normal door operation
207
208 Disables wkldr ram servo motor
209 Enables " " " "

210 Init's X recip on GDR per P213, 14, 15
211 " Z " " " " P211, 12, 15
212 Halts reciprocation on grinder
213 Enables Chip Break Cycle per P139, 140
214 Disables " " "
215 Opens TLI cover on VMC's
216 Closes " " " "
217 Enables spindle operation w/door open
218 Disables " " " "
219m Sets valves for Central Coolant
220m " " " Machine "
221m Opens coolant recirculation valve
222m Closes " " "
223m Opens coolant inlet valve
224m Closes " " "

MCL OPERATING FUNCTIONS

300m Runs Time & Date (clock) setting task
301 Enables MTM for tool break detection
302 " " " measuring (TTA)
303 Disables MTM
304 Enters an MTM parameter
305 Designates start of a finish cut
306 " end " " " "
307 Disables Tool Life Mgt, tool in turret
308 " " " ", " " maga
309 Restores Tool Life Management
t310m Unlds tur & updates CONFIG (re M136)
t311m Writes CONFIG to tbls & refs B axis
312 Alg adds P31, 32 (ITO) to correct TDV
313 Designates grinder X+ probing cycle
314 " " X- " "
315 " " Z+ " "
316 " " Z- " "
317m Subtr's 100 from TOOL STATS >99 & <160
318m Wrts P152, Chp Cntr Vol, to Swarf Tbl
319 Writes default values into MTM params
320m Erases CLM data in DETRAN file
321 Calls Msg 6851 EXP TRIP DID NOT OCCUR
322 " " 6852 UNEXPECTED TRIP
323 Calls Msg 6853 O/S ADJ EXCEEDS LIM
324 " " 6854 SYS ACCUR CHK FAILED
325 " " 6855 PROBING CYCLE FAILED
326 " " 6856 DIM EXCEEDS TOLERANCE
327 " " 6857 RUNOUT EXCEEDS TOL
328 " " 6859 MULTIPLE HITS FAILURE
329 " " 6864 REMOVE CHIPS
330m Purges chip conveyor
331
332 Adds P31/32 to TDVs, 100 to Tl STATS
333m Notifies CC to empty chip bucket
334m Defeats SPD'L ORIENT timer for Maint (Reset by M100 & CANCEL)

COOLANT AND CLEANING FUNCTIONS

07 Enables coolant thru the tool
08 Enables shop air thru the tool
09 Disables M07/M08
401 Enables shop air to crosslide
402 " coolant " "
403 Disables M401/M402
404 Enables shop air/upper headstk port
405 " " " /lower " "
406 Disables M404/M405
407 Enables coolant/upper headstock port
408 " " /lower " "
409 Disables M407/M408
410 Enables chip auger, clockwise
411 " " " , counterclockwise
412 Disables M410/411
413 Enables coolant to crosslide throat
414 Disables " " " "

WORKLOADING FUNCTIONS

501 Loads wkpc, Trans to Mach & M129*
502 " " , Queue " " " "
503 Moves wkpc, Trans Sta to Queue Sta

```
504  Unseats-reseats Prj Pl & M130/M129*
505  Unloads wkpc, Mach to Trans & M130*
506m    "      "  ,  "     " Insp/Cl & M130
507m Loads wkpc, Insp/Cln to Mach & M129*
508m Moves Wkldr to Park from any loc'n
509m Loads wkpc, Park to Mach & M129
510m Moves   "   ,  "   "  Trans Sta
511m   "     "   ,  "   "  Queue Sta
512  Posn's Tool Sens/SAC ga/opens TLI
513  Removes  "     " -    /closes "
```

WKPC STAT CODES (Tells Cell Controller what to do next with the part)

| DE | DESCRIPTION | ASSIGNED BY and CIRCUMSTANCES |
|---|---|---|
| D | Not yet determined | Cell Controller prior to downloading DETRAN |
| C | Accept process OOT(s) w/i prod dwg tol | Person @ Wksta having authorized badge #/password. (Badge # implemented in 2.43) |
| VU | Automatic Verification, Unrestrained | Person @ Wksta, Prj Pla is needed, cannot recut OOT, or TRY Prgm & data is needed. |
| VR | " " , Restrained | Person @ Wksta, Prj Pla not needed, cannot recut OOT, or TRY Prgm & data is needed. |
| VU | Conventional Verification, Unrestrained | Person @ Wksta, Prj Pla is needed and investigation is req'd to make disposition. |
| VR | " " , Restrained | Person @ Wksta, Prj Pla not needed and investigation is req'd to make disposition. |
| RY | Dryrun, no part or no chips cut | MC2000: PRGM STATUS is TRY and the answer to the chips cut question is NO |
| xx | Incomplete, operation stopped at Item xx | MC2000: Following MDI of M113, Abort, by a person at MC2000 |
| VF | No Verification Required | MC2000: PRGM STATUS is UNA/APD/SSD, CLM is accepted, and verification is not due: |
| FN | Verification Required | MC2000: PRGM STATUS is UNA/APD/SSD and verification is due |
| FMWCD | | ARB 03/14/89 |

APPENDIX C COMPLETE TEXTS OF MESSAGES (> = msg # is sent to Cell Controller,
[rv xxxx rv] = reverse video,
[blrv xxxx rv] = adds blinking,
[cc xxxx cc] = a color change)

6100>COOLANT PUMP MOTOR DRAWING EXCESSIVE CURRENT!
1. Overload cutout 60L in Panel A elec cab has opened.
2. When CYCLE START goes out, AUTO and SINGLE modes are inhibited until problem is fixed.
INPUT #26 - BOARD #1: 1 = OK; 0 = OVERLOADED.

6101>MACHINE HYDRAULIC PUMP MOTOR DRAWING EXCESSIVE CURRENT!
1. Overload cutout 50L in Panel A elec cab has opened.
2. Push [rv CANCEL rv] to erase msg after problem is fixed.
INPUT #19 - BOARD #1: 1 = OK; 0 = OVERLOADED.

6102>MACHINE HYDRAULIC UNIT PRESSURE TOO LOW!
1. Pressure sensor 2PS on mach hydraulic unit has opened.
2. Push [rv CANCEL rv] to erase message.
INPUT #32 - BOARD #1: 1 = OK; 0 = LOW PRESSURE.

6103>SHOP AIR PRESSURE TOO LOW!
1. Pressure sensor 1PS at air connection behind machine has opened.
2. Push [rv CANCEL rv] to erase msg after problem is fixed.
INPUT #06 - BOARD #2: 1 = OK; 0 = LOW PRESSURE.

6104>MACHINE HYDRAULIC UNIT SECONDARY FILTER CLOGGED!
1. Limit switch 2LS or 5LS on machine hydraulic unit has opened.
2. Fix problem to erase message.
INPUT #35 - BOARD #1: 1 = OK; 0 = CLOGGED FILTER.

6105>SELECT CHUCK OR UNCHUCK-WHICHEVER IS APPROPRIATE.

6106>MACHINE HYDRAULIC UNIT PRIMARY FILTER CLOGGED!
1. Limit switch 103LS or 104LS on mach hyd unit has opened.
2. CYCLE START is inhibited until problem is fixed.

3. Push [rv CANCEL rv] to erase msg after problem is fixed.
INPUT #34 - BOARD #1: 1 = OK: 0 = CLOGGED FILTER.

6107>PANEL B, D, OR E ELECTRICAL CABINET TOO HOT!
1. Temp sensor 6, 7, or 1TAS in top of elec cab has opened.
2. CYCLE START is inhibited until problem is fixed.
3. Push [rv CANCEL rv] to erase msg after problem is fixed.
INPUTS #14-15-16 RESP - BOARD #1: 1 = OK; 0 = TOO HOT.

6108>MACH HYD UNIT OIL COOLER FAN MTR DRAWING EXCESSIVE CURRENT!
1. Overload cutout 17OL in Panel A elec cab has opened.
2. CYCLE START is inhibited until problem is fixed.
3. Push [rv CANCEL rv] to erase msg after problem is fixed.
INPUT #20 - BOARD #1: 1 = OK; 0 = OVERLOADED.

6109>MACHINE HYDRAULIC OIL TOO HOT!
1. Temp sensor 9TAS on machine hydraulic unit has opened.
2. CYCLE START is inhibited until problem is fixed.
3. Push [rv CANCEL rv] to erase msg after problem is fixed.
INPUT #37 - BOARD #1: 1 = OK; 0 = TOO HOT.

6110>MACHINE HYDRAULIC UNIT OIL LEVEL TOO LOW!
1. Float switch 2FS on mach hyd reservoir has opened.
2. CYCLE START is inhibited until problem is fixed.
3. Push [rv CANCEL rv] to erase msg after problem is fixed.
INPUT #36 - BOARD #1: 1 = OK; 0 = LOW LEVEL.

6111

6112>X AXIS BRAKE DID NOT RELEASE!
Push [rv CANCEL rv] to erase message.

6113

6114

6115>CROSS SLIDE (X) AXIS SERVO MOTOR TOO HOT!
1. Temp sensor 31TAS on motor has opened.
2. CYCLE START is inhibited until problem is fixed.
3. Push [rv CANCEL rv] to erase msg after problem is fixed.
INPUT #36 - BOARD #2: 1 = OK; 0 = TOO HOT.

6116>CARRIAGE (Z) AXIS SERVO MOTOR TOO HOT!
1. Temp sensor 30TAS on motor has opened.
2. CYCLE START is inhibited until problem is fixed.
3. Push [rv CANCEL rv] to erase msg after problem is fixed.
INPUT #37 - BOARD #2: 1 = OK; 0 = TOO HOT.

6117>MACHINE WAYLUBE SYSTEM NOT FUNCTIONING PROPERLY!
1. Switch in Trabon unit on right end of bed has opened.
2. CYCLE START is inhibited until problem is fixed.
3. Push [rv CANCEL rv] to erase msg after problem is fixed.
INPUT #07 - BOARD #2: 1 = OK; 0 = FAULT.

6118>WAYLUBE OIL LEVEL TOO LOW!
1. Floatswitch 1FS in Trabon tank on right end of bed has opened.
2. Fix problem to erase message.
INPUT #08 - BOARD #2: 1 = OK; 0 = LOW LEVEL.

6119>PANEL C ELECTRICAL CABINET TOO HOT!
1. Temp sensor 5TAS in top of elec cab has opened.
2. CYCLE START is inhibited until problem is fixed.
3. Push [rv CANCEL rv] to erase msg after problem is fixed.
INPUT #13 - BOARD #1: 1 = OK; 0 = TOO HOT.

6120>CROSS SLIDE DOWN (X+) TRAVEL LIMIT.
While depressing control [rv ON rv], JOG X- until limit switch is released.
INPUT #32 - BOARD #2: 1 = OK; 0 = BEYOND LIMIT.

6121>CROSS SLIDE UP (X-) TRAVEL LIMIT.
While depressing control [rv ON rv], JOG X+ until limit switch is clear.
INPUT #33 - BOARD #2: 1 = OK; 0 = BEYOND LIMIT.

6122>CARRIAGE LEFT (Z+) TRAVEL LIMIT.
While depressing control [rv ON rv], JOG Z- until limit switch is clear.
INPUT #34 - BOARD #2: 1 = OK; 0 = BEYOND LIMIT.

6123>CARRIAGE RIGHT (Z-) TRAVEL LIMIT.
While depressing control [rv ON rv], JOG Z+ until limit switch is clear.
INPUT #35 - BOARD #2: 1 = OK; 0 = BEYOND LIMIT.

6124

6125

6126

6127>TURRET NOT CLAMPED. CHECK TURRET PAGE.
1. Limit switch 8LS on cross slide is open.
2. Fix problem to erase message.
INPUT #13 - BOARD #2: 1 = OK; 0 = NOT CLAMPED.

6128>TURRET NOT UNCLAMPED WITHIN MSD TIME ALLOWANCE.
1. Limit switch 9LS on cross slide was open when time ran out.
2. Fix problem to erase message.
INPUT #14 - BOARD #2: 1 = OK; 0 = NOT UNCLAMPED.

6129>TURRET NOT IN POSITION. CHECK TURRET PAGE.

6130>SPINDLE DRIVE TRANSFORMER TOO HOT!
1. Temp sensor 3TAS on transformer in Panel D elec cab has opened.
2. Push [rv CANCEL rv] to erase msg after problem is fixed.
INPUT #30 - BOARD #1: 1 = OK; 0 = TOO HOT.

6131>LOW OR NO SPINDLE LUBE PRESSURE!
1. Pressure sensor 11PS on rear of bed behind headstock has opened.
2. Push [rv CANCEL rv] to erase msg after problem is fixed.
INPUT #31 - BOARD #1: 1 = OK; 0 = LOW PRESSURE.

6132>SPINDLE BRAKE DID NOT RELEASE!
Push [rv CANCEL rv] to erase message.

6133>SPINDLE BLOWER MOTOR DRAWING EXCESSIVE CURRENT!
1. Overload cutout 9OL in Panel A elec cab has opened.
2. CYCLE START is inhibited until problem is fixed.
3. Push [rv CANCEL rv] to erase msg after problem is fixed.
INPUT #23 - BOARD #1: 1 = OK; 0 = OVERLOADED.

6134>SPINDLE DRIVE MOTOR TOO HOT!
1. Temp sensor 4TAS on motor has opened.
2. CYCLE START is inhibited until problem is fixed.
3. Push [rv CANCEL rv] to erase msg after problem is fixed.
INPUT #09 - BOARD #1: 1 = OK; 0 = TOO HOT.

6135>SPINDLE DRIVE MOTOR DID NOT START WITHIN TIME ALLOWED.
1. Power relay in Panel D elec cab failed to close within 1 second.
2. Push [rv CANCEL rv] to erase message.

6136

6137 OPERATION OF CHIP CONVEYOR IS INHIBITED BY CHIP CONTAINER FORKED AGV ACTIVITY IN PROGRESS.

6138>ONE OR BOTH CHIP CONVEYOR MOTORS DRAWING EXCESSIVE CURRENT!
1. Overload cutout 6 or 70L in Panel A elec cab has opened.
2. Push [rv CANCEL rv] to erase msg after problem is fixed.
INPUT #24 - BOARD #1: 1 = OK; 0 = LOWER CHAIN MTR OVRLD'D.
INPUT #25 - BOARD #1: 1 = OK; 0 = UPPER CHAIN MTR OVRLD'D.

6139>CHIP CONVEYOR JAMMED!
Prox switch 74PRS on lower chain drive shaft has opened.
Fix problem to erase message.
INPUT #11 - BOARD #3: 1 = OK; 0 = JAMMED.

6140>NOT ENOUGH COOLANT! CHECK FOR PARTLY CLOSED INLET VALVE.
1. Flt sw 21FS in pump compart has been open for 5 seconds.
2. When CYCLE START goes out, AUTO and SINGLE modes are inhibited until problem is fixed.
INPUT #15 - BOARD #2: 1 = OK; 0 = LOW LEVEL.

6141>TOO MUCH COOLANT! CHECK FOR CLOGGED DRAIN.
1. Flt sw 20FS @ main sump drain has been open for 30 secs.
2. When CYCLE START goes out, AUTO and SINGLE modes are inhibited until problem is fixed.
INPUT #16 - BOARD #2: 1 = OK; 0 = HIGH LEVEL 6142 SPINDLE UNDER PROGRAM (AUTO) CONTROL.
[illegible] M05 or push [rv CLEAR rv] to return spindle [illegible] manual control.

6143>NOT ENOUGH COOLANT FLOW TO TOOL FOR > M3D TIME ALLOWANCE!
1. Flow sensor 20FLS was open longer than INT128 LIMIT.
2. When CYCLE START goes out, AUTO and SINGLE modes are inhibited until problem is fixed.
INPUT #18 - BOARD #2: 1 = OK; 0 = LOW FLOW.

6144

6145>X OR Z AXIS DRIVE ELECTRONIC (POWER MONITOR) FAULT!
1. LED's on Drive in Panel B elec cab may indicate cause or fuses on Drive may be blown.
2. When fixed, power down and up to reset Drive relay.
INPUTS #01(X)-02(Z) - BOARD #3: 1 = OK; 0 = FAULT.

6146>COOLANT SWITCHES IN [rv OFF rv] POSITION!
Turn all switches to any ON position to erase message.

6147>CHIP CONVEYOR POWER SWITCH NOT SET TO FORWARD.

6148

6149>SPINDLE DRIVE ELECTRONIC (POWER MONITOR) FAULT!
1. LED's on Drive in Panel D elec cab may indicate cause or fuses on Drive may be blown.
2. When fixed, power down and up to reset Drive relay.
INPUT #27 - BOARD #1: 1 = OK; 0 = E-STOP.

6150 !!!!!! THIS IS A TEST MESSAGE !!!
PLEASE RECORD IN THE LOG BOOK THAT THIS MESSAGE OCCURRED. THE NEXT CANCEL WILL REMOVE THIS MESSAGE.

6151

6152>SPINDLE CAN'T RUN WITH DOOR OPEN!
Close door or push [rv CLEAR rv].

6153

6154

6155

6156

6157>TOOL CHGR VERTICAL (Y) OR TOOL MAG ROT... (B) AXIS
FAILED TO MOVE TO MCL SPECIFIED POSITION.

6158

6159

6160

6161 MOVE EXCEEDS Y- SOFTWARE TRAVEL LIMIT.

6162 MOVE EXCEEDS Y+ SOFTWARE TRAVEL LIMIT.

6163

6164

6165

6166

6167

6168

6169

6170

6171 SPINDLE WILL NOT RUN WITH CHUCK RELEASED.

6172

6173>DRAW ROD NOT FULLY RETRACTED; LOAD ASSIST PIN NOT GRIPPED.
Pressure switch 51PS on panel under spindle gearbox did not close or 42PS did not open within MSD INT138 time limit.
51PS INPUT #22 - BOARD #2: 1 = OK; 0 = NOT RETRACTED.
42PS INPUT #21 - BOARD #2: 0 = OK; 1 = EXTENDED.
6174>DRAW TUBE NOT FULLY EXTENDED; DIAPHRAM NOT TRIPPED.
Pressure switch 40PS on panel under spindle gearbox did not close or 41PS did not open within MSD INT138 time limit.
40PS INPUT #23 - BOARD #2: 1 = OK; 0 = NOT EXTENDED.
41PS INPUT #24 - BOARD #2: 0 = OK; 1 = RETRACTED.
6175>GEAR CHANGE NOT COMPLETED WITHIN MSD TIME ALLOWANCE.

6176>DRAW ROD NOT FULLY EXTENDED; LOAD ASSIST PIN NOT RELEASED.
Pressure switch 42PS on panel under spindle gearbox did not close or 51PS did not open within MSD INT138 time limit.
42PS INPUT #21 - BOARD #2: 1 = OK; 0 = NOT EXTENDED.
51PS INPUT #22 - BOARD #2: 0 = OK; 1 = RETRACTED.
6177>DRAW TUBE NOT FULLY RETRACTED; DIAPHRAM NOT RELEASED.
Pressure switch 41PS on panel under spindle gearbox did not close or 40PS did not open within MSD INT138 time limit.
41PS INPUT #24 - BOARD #2: 1 = OK; 0 = NOT RETRACTED.
40PS INPUT #23 - BOARD #2: 0 = OK; 1 = EXTENDED.
6178>PROJECT PLATE NOT SEATED ON SPINDLE.
Air gage backpressure sensor 43PS on panel under spindle gearbox did not close w/i MSD INT138 time limit [cc or cc]
43PS opened for over 1 second when it should remain closed.
INPUT #25 - BOARD #2: 1 = OK; 0 = NOT SEATED.
6179 CHUCK WILL NOT RELEASE WITH SPINDLE RUNNING.

6180>AUXILIARY HYDRAULIC PUMP MOTOR DRAWING EXCESSIVE CURRENT!
1. Overload cutout 20OL in Panel A elec cab has opened.
2. Push [rv CANCEL rv] to erase msg after problem is fixed.
INPUT #21 - BOARD #1: 1 = OK; 0 = OVERLOADED.

6181>AUXILIARY HYDRAULIC UNIT PRESSURE TOO LOW!
1. Pressure sensor 20PS on auxiliary hydraulic unit has opened.
2. Push [rv CANCEL rv] to erase msg after problem is fixed.
INPUT #39 - BOARD #1: 1 = OK; 0 = LOW PRESSURE.
6182>AUXILIARY HYDRAULIC UNIT SECONDARY FILTER CLOGGED!
1. Limit switch 40LS on auxiliary hydraulic unit has opened.
2. Fix problem to erase message.
INPUT #02 - BOARD #2: 1 = OK; 0 = FILTER CLOGGED.
6183>AUX HYD UNIT OIL COOLER FAN MTR DRAWING EXCESSIVE CURRENT!
1. Overload cutout 21OL in Panel A elec cab has opened.
2. CYCLE START is inhibited until problem is fixed.
3. Push [rv CANCEL rv] to erase msg after problem is fixed.
INPUT #22 - BOARD #1: 1 = OK; 0 = OVERLOADED.
6184>AUXILIARY HYDRAULIC UNIT PRIMARY FILTER CLOGGED!
1. Limit switch 105LS on aux hyd unit has opened.
2. CYCLE START is inhibited until problem is fixed.
3. Push [rv CANCEL rv] to erase msg after problem is fixed.
INPUT #05, BOARD #2: 1 = OK; 0 = FILTER CLOGGED.
6185>AUXILIARY HYDRAULIC OIL TOO HOT!
1. Temp sensor 24TAS on aux hyd unit has opened.
2. CYCLE START is inhibited until problem is fixed.

```
   3. Push [rv CANCEL rv] to erase msg after problem is fixed.
   INPUT #04 - BOARD #2:  1 = OK; 0 = TOO HOT.
6186>AUXILIARY HYDRAULIC UNIT OIL LEVEL TOO LOW!
   1. Float switch 3"S on ux hyd unit reservoir has opened.
   2. CYCLE START is inhibited until problem is fixed.
   3. Push [rv CANCEL rv] to erase msg after problem is fixed.
   INPUT #03 - BOARD #2:  1 = OK; 0 = LOW LEVEL.
6187

6188

6189

6190

6191

6192>TOOL CHANGER VERTICAL (Y) SERVO MOTOR TOO HOT!
   1. Temp sensor 42TAS on motor has opened.
   2. CYCLE START is inhibited until problem is fixed.
   3. Push [rv CANCEL rv] to erase msg after problem is fixed.
   INPUT #33 - BOARD #3:  1 = OK; 0 = TOO HOT.

6193>TOOL MAGAZINE ROTARY (B) SERVO MOTOR TOO HOT!
   1. Temp sensor 43TAS on motor has opened.
   2. CYCLE START is inhibited until problem is fixed.
   3. Push [rv CANCEL rv] to erase msg after problem is fixed.
   INPUT #34 - BOARD #3:  1 = OK; 0 = TOO HOT.
6194>TOOL CHGR VERTICAL DOWN (Y-) TRAVEL LIMIT.
   While depressing control [rv ON rv], JOG Y+ until
   limit switch is clear.
   INPUT #32 - BOARD #3:  1 = OK; 0 = BEYOND LIMIT.

6195>TOOL CHGR VERTICAL UP (Y+) TRAVEL LIMIT.
   While depressing control [rv ON rv], JOG Y- until
   limit switch is clear.
   INPUT #31 - BOARD #3:  1 = OK; 0 = BEYOND LIMIT.

6196 TOOL MAGAZINE ROTARY (B) AXIS NOT REFERENCED.

6197>Y OR B AXIS DRIVE ELECTRONIC (POWER MONITOR) FAULT!
   1. LED'S on Drive in Panel C elec cab may indicate
      cause or fuses on Drive may be blown.
   2. When fixed, power down and up to reset Drive relay.
   INPUTS #37(Y)-38(B) - BOARD #3:  1 = OK; 0 = FAULT.
6198>TOOL CHGR VERTICAL (Y) COUNTERBALANCE AIR PRESSURE TOO LOW!
   1. Pressure switch 55PS, on upper left rear corner of
      tool changer Box #2, is open.
   2. Push [rv CANCEL rv] to erase message.
   INPUT #18 - BOARD #4:  1 = OK; 0 = LOW PRESSURE.
6199

6200
```

6201

6202

6203

6204

6205

6206>CHIP DOOR NOT FULLY OPENED OR CLOSED.
Limit switch 99LS (closes when door closes) or 102LS
(closes when door opens) not in correct state w/i 12 secs.
99LS INPUT #06 - BOARD #3: 1 = DOOR CLOSED; 0 = NOT CLOSED
102LS INPUT #05 - BOARD #3: 0 = DOOR NOT OPEN; 1 = OPEN.

6207>TOOL CHANGER NOT AT STARTING POSITION.
Clear fault using test panel.
Check all slides, grippers, and shot pin.

6208 TOOL CHANGER SAFETY GATE IS OPEN!
Limit switch 109LS on gate frame is open.
INPUT #09 - BOARD #3: 1 = OK; 0 = GATE OPEN.

6209>TOOL CHANGER TEST SWITCH NOT IN AUTO.
(Changing pages erases this message.)

6210>TOOL LOCKING WRENCH NOT FULLY RETRACTED.
Prox switch 64PRS on wrench control panel did not
close or 63PRS did not open within 4 seconds.
64PRS INPUT #20 - BOARD #3: 1 = OK; 0 = NOT RETRACTED.
63PRS INPUT #21 - BOARD #3: 0 = OK; 1 = EXTENDED.

6211>LOOSE OR NO TOOL IN ACTIVE TURRET STATION!
1. Marposs prox sensor inside of turret did not close or
opened when it should have remained closed.
2. Push [rv CANCEL rv] to erase msg and release FEEDHOLD.
INPUT #19 - BOARD #5: 1 = OK; 0 = LOOSE OR MISSING.

6212>TOOL PRESELECTION EXCEEDED MSD TIME ALLOWANCE.
Changing pages will erase this message.

6213

6214 OPERATION OF TOOLCHANGER IS INHIBITED BY TOOL MAG
FORKED AGV ACTIVITY IN PROGRESS.

6215>TOOL CHANGER FAILED TO MOVE TO MCL SPECIFIED POSITION.

6216 TOOL MAGAZINE POSITION # IS LARGER THAN MAGAZINE CAPACITY.

6217

6218>TOOL CHANGE CYCLE EXCEEDED MSD TIME ALLOWANCE.

6219>CANNOT EXCHANGE TOOLS;
MAGAZINE NOT SEATED/CLAMPED OR
EXCHANGER NOT AT STARTING POSITION.
Check all slides, grippers, and shot pin.

6220>TOOL LOCKING WRENCH NOT FULLY EXTENDED.
Prox switch 63PRS in power wrench panel did not
close or 64PRS did not open within 4 seconds.
63PRS INPUT #21 - BOARD #3: 1 = OK; 0 = NOT EXTENDED.
64PRS INPUT #20 - BOARD #3: 0 = OK; 1 = RETRACTED.

6221>TOOL REMOVAL FAILED.
1. If DIO #3-INPUT #23 is 1 and tool is in turret,
clamping sensor may be shorted.
2. If DIO #5-INPUT #19 is 1 and tool is not in turret,
check tool cavity for chips.

6222>HYDRAULIC PRESSURE DRIVING POWER WRENCH TOO HIGH.
Pressure switch 56PS on power wrench panel closed during
tool clamping cycle.
INPUT #19 - BOARD #4: 0 = OK; 1 = PRESSURE TOO HIGH.

6223

6224>TOOL NOT CLAMPED WITHIN ALLOWED TIME SPAN.
Tool seated or clamped Marposs sensors did not close w/i
10 secs or cycle not completed w/i MSD INT125 time limit.
INPUT #23 - BOARD #3: WRNCH EXT'D, 1 = OK; 0 = NOT CLMP'D.
INPUT #19 - BOARD #5: 1 = OK; 0 = NOT SEATED.

6250> WORKLOADER FAULT xxx.
Push [rv CLEAR rv] or [rv CANCEL rv] repeatedly
until message is erased.

6251>WORKLOADER DID NOT ACKNOWLEDGE COMMAND.

6252

6253>SPINDLE ORIENT HAS FAILED.
1. [rv CANCEL rv] and [rv JOG rv] the spindle.
2. If running a program, push [rv AUTO rv]
and [rv CYCLE START rv].
3. If not, retry the Workloader cycle or Q command.

6254>WORKLOADER CYCLE EXCEEDED MSD TIME ALLOWANCE.

6255

6256>WKLDR LIFT PINS NOT FULLY RETRACTED WITHIN MSD TIME ALLOW.
Prox sensor 48, 50, or 52PRS did not close or 47,49, or 51FRS did not open w/i MSD INT138 time limit.
INPUT #08 - BOARD #6: 1 = OK; 0 = NOT OK PER SERIES VI.

6257 [rv JOG rv] WORKLOADER CLEAR OF OBSTRUCTIONS, THEN PUSH [rv CYCLE START rv].

6258 WORKLOADER AXES ARE NOT REFERENCED.

6259 ENTER M508 TO PARK WORKLOADER.

6401 TOOL LIFE DATA IS MISSING.
Push [rv CANCEL rv] and see Recovery Procedure.

6402 T-CODE ERROR.
Push [rv CANCEL rv] and see Recovery Procedure.

6403>TYPE [rv 999 rv] PLUG NOT AVAILABLE IN THE MAGAZINE.
1. Check [rv SETUP rv] page and contents of magazine.
2. Push [rv CANCEL rv] to erase message.

6404>SPACE FOR TYPE 999 PLUG NOT PROVIDED IN MAG TABLES.
1. Check Magazine Tables ([rv SETUP rv] page).
2. Push [rv CANCEL rv] to erase message.

6405 TOOL TYPE xxxx IN T-CODE DOES NOT MATCH TYPE IN TOOL LIST TABLES AT THE ACTIVE ITEM #.
1. Correct the T-code or the TOOL LIST Tables (push [rv MACH rv] and [rv PAGE < rv]).
2. Push [rv CANCEL rv] to erase message.

6406>TOOL TYPE IN T-CODE IS NOT IN TURRET.
1. Add it to the turret or correct the T-code.
2. Push [rv CANCEL rv] to erase message.

6407 NO TOOL MAGA CONFIG TABLES OR MAGA NOT INSTALLED PROPERLY.
1. Push [rv INDEX, PAGE < rv], and select MCL. Download CONFIG if missing or drawing/operation # is incorrect. Then MDI M311 to write file to tables.
2. Push [rv CANCEL rv] to erase message.

6408>MACH CANNOT READ BARCODE LABEL ON TOOL; CHECK IT MANUALLY.
1. Push [rv SETUP rv]; if Type agrees w/Maga Table then push [rv CYCLE START rv] to accept tool and continue.
2. If not, push [rv RETRACE rv] to return tool to maga and continue.

6409 PRESELECT FAILED TO FIND TOOL TYPE xxxx IN THE MAGAZINE.
Changing pages erases this message.

6410

6411

6412

6413

6414

6415>TDV OFFSET ADJUSTMENT EXCEEDS MSD LIMIT.
Check offset value on [rv SETUP rv] page or in P31 and P32.

6416>CANNOT FIND THE SEQUENCE # IN P185.
Push [rv CANCEL rv] and check the program.

6417

6418

6419

6420

6421

6422

6423>NO TOOL LIFE FOR NEXT PART.
Changing pages erases this message.

6461>TRANS STA SENSOR INCORR PRIOR TO AGV SERV/SIM SWITCH IS UP.
Determine & fix problem; then push blink'g [rv PLAT AGV rv]
button and enter # of next AGV move from menu.
Prox Sw's IN #29 - BD #2: 1 = PP SEATED; 0 = EMPTY/SW UP.
Optical Sw IN #30 - BD #2: 0 = PP PRESENT; 1 = STA EMPTY.

6462>SENSOR(S) ON TRANS STA INCORRECT AFTER AGV SERVICE.
Determine & fix problem; then push blink'g [rv PLAT AGV rv]
button and enter # of next AGV move from menu.
Prox Sw's IN #29 - BD #2: 1 = PP SEATED; 0 = EMPTY/SW UP.
Optical Sw IN #30 - BD #2: 0 = PP PRESENT; 1 = STA EMPTY.

6463>PLATFORM AGV TOOK TOO LONG.
1. Determine and fix the problem.
2. Manually return AGV to ready position.
3. Push blinking [rv PLAT AGV rv] btn to view recov'y menu.
4. Determine and enter # of next AGV move from menu.

6464>UNEXPECTED PLATFORM AGV SERVICE!
1. Push blinking [rv PLAT AGV rv] btn to view recov'y menu
2. Enter only #3 or #4 to erase this message.
[MENU: 1 OK TO ENTER, 2 OK TO LEAVE ]
[ 3 ABORT - CANCEL, 4 ABORT - RE-SEND]

6465

```
6466

6467

6468

6469>CHIP STA OPTICAL SENSOR INCORRECT PRIOR TO AGV SERVICE.
     Determine & fix problem; then push blink'g [rv FORK AGV rv]
     button and enter # of next AGV move from menu.
     INPUT #10 - BOARD #3:  1 = CNTR PRESENT; 0 = NO CONTAINER.

6470>OPTICAL SENSOR ON CHIP STA INCORRECT AFTER AGV SERVICE.
     Determine & fix problem, then push blink'g [rv FORK AGV rv]
     button and enter # of next AGV move from menu.
     INPUT #10 - BOARD #3:  1 = CNTR PRESENT; 0 = NO CONTAINER.

6471>MAGA STA SENSOR INCORRECT PRIOR TO AGV SERV.  Fix problem;
     push blink'g [rv FORK AGV rv] btn; enter next AGV move #.
     48PS INPUT #13 - BD #4:  1 = UNCLAMPED; 0 = NOT UNCLAMPED.
     47PS INPUT #14 - BD #4:  0 = NOT CLAMPED; 1 = CLAMPED.
     73/79/80PRS IP's #15-16-17 - BD #4:  1 = SEATED; 0 = NOT.
6472>SENSOR(S) ON MAGA STA INCORRECT AFTER AGV SERV.  Fix prob;
     push blink'g [rv FORK AGV rv] btn; enter next AGV move #.
     48PS INPUT #13 - BD #4:  1 = UNCLAMPED; 0 = NOT UNCLAMPED.
     47PS INPUT #14 - BD #4:  0 = NOT CLAMPED; 1 = CLAMPED.
     73/79/80PRS IP's #15-16-17 - BD #4:  1 = SEATED; 0 = NOT.
6473>FORKED AGV TOOK TOO LONG.
     1. Determine and fix the problem.
     2. Manually return AGV to ready psoition.
     3. Push blinking [rv FORK AGV rv] btn to view recov'y menu.
     4. Determine and enter # of next AGV move from menu.
6474>UNEXPECTED FORKED AGV SERVICE!
     1. Push blinking [rv FORK AGV rv] btn to view recov'y menu.
     2. Enter only #3 or #4 to erase this message.

6475

6476

6477

6478

6479

6480>SELECTING 'DUMMY' (TO DESELECT ACTIVE) PROGRAM HAS FAILED!
     1. Push [rv CANCEL rv] and [rv INDEX rv]; look for DUMMY.
     2. Determine and fix problem.
     3. MDI M100.
```

6481>CHIP MANAGEMENT (M102) NOT EXECUTED!
1. Push [CANCEL].
2. MDI M102
[cc OR cc]
3. Edit M102 into program and restart at a safe location.

6482

6483

6484

6485

6486

6487

6488

6489

6490 CHIP VOLUME FOR THIS OPERATION MUST BE GREATER THAN ZERO AND EQUAL TO OR LESS THAN CONTAINER VOLUME.
Check P152 and P153 and modify or edit program.
Push [rv CANCEL rv] and restart program at a safe location.

6491 CHIP CONTAINER VOLUME MUST BE GREATER THAN ZERO; VOLUME AVAILABLE MUST NOT BE LESS THAN ZERO.
Push [rv CANCEL rv], fix problem, and restart program at a safe location.

6492 CONVEYOR OFF TIME (P155) AND PROGRAM CUTTING TIME (P121) MUST BE GREATER THAN ZERO.
Push [rv CANCEL rv], fix problem, and restart program at a safe location.

6493 PART MATERIAL TYPE (P150) OF '0' ALLOWED ONLY IN MDI MODE!
Push [rv CANCEL rv], fix problem, and restart program at a safe location.

6494 PROGRAMMED PART MATERIAL (P150) OR OLD PART MATERIAL TYPE (Swarf Table) IS OUT OF RANGE (range is 0 to 999) !
Push [rv CANCEL rv], fix problem, and restart program at a safe location.

6495

,6496

6497>PROJECT PLATE TRANSFER DID NOT COMPLETE SUCCESSFULLY!
1. Check machine inputs and/or Workloader.
2. Push [rv CANCEL rv] and retry the transfer [cc OR cc]
3. Edit DETRAN, Q1TRAN, MATRAN, or PUTRAN to re-sync them with physical Project Plate locations.

6498

6499

6800 WORKSTATION STARTUP IS COMPLETED.
When program, DETRAN file, CONFIG file, tools, and part are available, MDI M100 to start automatic processing.

6801 CONVEYOR IS PURGING.

6802 WORKSTATION IS NOT ON LINE WITH CELL CONTROLLER.
Push [rv TERM rv] button and initiate file UPLOAD/DOWNLOAD manually. Check [rv INDEX rv] page when completed.

6803>CYCLE START IS OFF CAUSING LOST TIME TO ACCUMULATE.
Push [rv CYCLE START rv] to halt Lost Time and resume CIM Time accumulation.

6804 [rv AUTO AND SINGLE ARE INHIBITED! rv]
1. Check pointers; re-REF if not on zero.
2. MDI M109 and enter Workstation STATUS selection.
3. If status selection is OFF LINE, set Time and Date.

6805 CELL CONTROLLER FAILED TO ACKNOWLEDGE A SERVICE REQUEST WITHIN 15 SECONDS.

6806>CHIP CONTAINER PICKUP
FOR MATERIAL TYPE xxx
NEEDED WITHIN xx MINUTES.

6807>CHIP CONTAINER DELIVERY
FOR MATERIAL TYPE xxx
NEEDED WITHIN xx MINUTES.

6808 PROGRAM STATUS IS TRY (TRYOUT).
Control must be in Status 3, NOT AVAILABLE, or Status 4, OFF LINE.

6809 CAUTION: BE SURE TO EDIT Q1TRAN OR MATRAN MCL FILE WHEN PART LOCATION IS CHANGED MANUALLY.

6810>CELL CONTROLLER COMMUNICATIONS IN PROGRESS.
[b rv M100 is inhibited. rv]

6811 NO TRANSFER FILE EXISTS WHERE CIM TIME IS BEING ACTIVATED.
1. Push [rv CANCEL rv], [rv INDEX rv] and [rv PAGE < rv].
2. Create/delete Trans files to correspond w/part loc'ns.
3. Push lighted mode button (MANUAL, AUTO, SINGLE, or MDI) to activate CIM Time.

6812 BUBBLE/RMM FILE DATA RETRIEVAL IN PROGRESS!

6813 DIMENSIONAL DATA TABLES ARE FULL.
1. Check by pushing [rv MACH rv], [rv PAGE ADVANCE rv] to DATA, and [rv PAGE SELECT rv] buttons.
2. Add M105's to program or delete some dimensions before continuing.

6814>OUT OF TOLERANCE DETECTED WITH DIMENSIONAL MEASUREMENT.

6815 TO REMEASURE, SEARCH FOR DIMENSIONAL MEASUREMENT ITEM,
THEN PUSH [rv AUTO rv] OR [rv SINGLE rv]
AND [rv CYCLE START rv].

6816>PART DELIVERY NEEDED.

6817>PART PICKUP NEEDED.

6818 PART LOC'N CHECK AND PART PROGRAM SELECTION IN PROGRESS.

6819 QUALITY CONTROL CHECKS IN PROGRESS.

6820 ||||||| BLOCK DELETES BEING PROCESSED |||||||

6821 [rv ||||||||| FILE UPDATE IN PROGRESS ||||||||| rv]
DO NOT PICK UP PROJECT PLATE UNTIL THIS MESSAGE IS ERASED

6822>NO MEASUREMENT DATA IN TABLES.
Run Dimensional Measurement before running M105.
Push [rv CLEAR rv] to erase this message.

6823 REF-IT-CD PORTION OF THE DATA MANAGEMENT REPORT HAS
A NUMERICAL LETTER DESIGNATION LARGER THAN 26.

6824>COOLANT PROBLEM IS OR WAS PRESENT.
1. Check other messages for possible causes.
2. After fixing cause, push [rv AUTO rv] and [rv CYCLE START rv] to continue.

6825>WAITING FOR TOOL MAGAZINE PICKUP.

6826>WAITING FOR TOOL MAGAZINE DELIVERY.

6827>WAITING FOR CONFIG MCL FILE.

6828> ||||||||| DO NOT TOUCH CONTROL |||||||||
Unloading is delayed because the Cell Controller has another part on the way.

6829>THE WK PC STAT IN MATRAN IS INCORRECT OR MISSING.
Push [rv CANCEL rv] and check the MATRAN MCL file.

6830

6831>EITHER PUTRAN OR MATRAN IS MISSING.
1. Push [rv CANCEL rv] and create the missing file.
2. MDI M135 to record CIM Time in PUTRAN;
[cc OR cc]
3. MDI M108 to record CIM Time in MATRAN/RWTRAN.

6832>DIMENSIONAL DATA CANNOT BE WRITTEN INTO MATRAN MCL FILE.
1. Push [rv CANCEL rv], [rv INDEX rv], and [rv PAGE < rv].
2. Create a MATRAN if none exists.
3. Upload and delete HOLD files if memory is full.
4. Push [rv CYCLE START rv] to try again.

6833> *** WAITING FOR MANUAL INTERVENTION ***
Push HELP button and select msg 6833 instructions.

6834>ACTIVE PROGRAM WAS NOT SELECTED BY M100.
Push [rv CLEAR rv] and MDI M100.

6835>WAITING FOR PART PROGRAM:
1. If ON LINE, check Cell terminal;
[cc OR cc]
2. If OFF LINE, check active Transfer file for PROGRAM ID, load program, and MDI M100.

6836>DETRAN, QITRAN, MATRAN, OR PUTRAN FILE NOT AVAILABLE.
1. Push [rv CANCEL rv], [rv INDEX rv], and [rv PAGE < rv].
2. Download or create the missing file.
3. MDI M100 to continue.

6837>DETRAN, QITRAN, MATRAN OR PUTRAN FILE OUT OF SYNC WITH PART LOCATION.
1. Push [rv CANCEL rv] and rename, edit, and delete files or move the parts by MDI to correct the problem.
2. Push [rv AUTO rv] and [rv CYCLE START rv] to continue.

6838>LASER CALIBRATION IS OVERDUE!
1. Push [rv CLEAR rv] and notify Maintenance to perform the calibration; [cc OR cc]
2. With proper authorization, this Cycle Stop may be overridden with a password.

6839>GOLD MASTER TEST IS OVERDUE!
1. Push [rv CLEAR rv] and notify Production to perform the Gold Master test; [cc OR cc]
2. With proper authorization, this Cycle Stop may be overridden with a password.

6840>VERIFICATION RESULTS ON ONE OR MORE PARTS ARE OVERDUE:
1. Verified parts may be deleted from VERIFICATION TABLE (Push [rv STATUS rv] and [rv PAGE > rv]); cc OR cc
2. With proper authorization, this Cycle Stop may be overridden with a password.

6841>ONE OR MORE PARTS SENT FOR VERIFICATION ARE REJECTED.
1. Rejected parts are identified in VERIFICATION TABLE (Push [rv STATUS rv] and [rv PAGE > rv]); [cc OR cc]
2. With proper authorization, this Cycle Stop may be overridden with a password.

6842 PROGRAM REWIND FAILED DURING ABORT!
1. Push [rv INDEX rv] and make sure program is selected.
2. Push [rv CANCEL rv] and MDI M113.

6843>DETRAN MCL FILE IS NOT AVAILABLE.
1. If ON LINE, check Cell Controller terminal.
2. If OFF LINE, load correct DETRAN file and push [rv CYCLE START rv] to continue.

6844 WHEN AGV HAS COMPLETED ITS TASK AND RETURNED TO THE READY POSITION, PUSH LIGHTED AGV BUTTON.

6845 DUPLICATE HOLD FILE, OR HOLD MEMORY FULL.
Upload and delete some or all HOLD MCL files, otherwise oldest file will be erased.

6846

6847>COOLANT MANAGEMENT TASK NOT EXECUTED!
1. Push [rv CANCEL rv].
2. MDI M103;
[rc OR cc]
3. Edit M103 ; to program and restart at a safe location.

6848>COOLANT SOURCE DOES NOT MATCH PART PROGRAM REQUIREMENT!
1. Push [rv SETUP rv], and [rv PAGE > rv]; check P159.
2. If P159=1, push [rv CANCEL rv] & MDI M219 (Central).
3. If P159=2, push [rv CANCEL rv] & MDI M220 (Local).
4. Push [rv CYCLE START rv] to try again.

6849>RUNNING TIME WITH CONVEYOR OFF HAS EXPIRED.
When CYCLE START goes out, AUTO and SINGLE are inhibited until problem is fixed.

6850>WAITING MORE THAN 15 SECONDS FOR CELL CONTROLLER TO ACKNOWLEDGE A SERVICE REQUEST!

6851>EXPECTED TRIP DID NOT OCCUR.
See Recovery Procedure.

6852>UNEXPECTED TRIP.
See Recovery Procedure.

6853>OFFSET ADJUSTMENT FOR TOOL EXCEEDS LIMIT.
See Recovery Procedure.

6854>SYSTEM ACCURACY CHECK FAILED.
1. Check probe assembly and correct any problems.
2. Repeat Effective Tip Size Offsetting.

6855>PROBING CYCLE FAILED.
1. Use TRP and JOG, if needed, to get at probe.
2. Correct any looseness or other obvious problems.
3. If none, replace probe and release TRP, if applied.
4. Push [rv CYCLE START rv] to repeat probing cycle.

6856>DIMENSION EXCEEDS TOLERANCE.
See Recovery Procedure.

6857>RUNOUT EXCEEDS TOLERANCE.
See Recovery Procedure.

6858>TRANSFER FILE ALREADY EXISTS AT PART DESTINATION.
1. Delete file not needed.
2. Push [rv CANCEL rv] to erase message.
3. Release [rv FEEDHOLD rv] and push [rv CYCLE START rv] to continue.

6859>MULTIPLE HITS HAS FAILED.
Push [rv CYCLE START rv] to repeat.

6860>PRGM STATUS IN DETRAN, Q1TRAN OR MATRAN FILE IS WRONG.
1. Status must be APD, UNA, TRY, or SSD.
2. Push [rv CANCEL rv], edit file, and restart program at a safe location.

6861 !!!!! BLOCK DELETES HAVE NOT BEEN DESIGNATED !!!!!
1. Set P118 for desired Block Deletes.
2. Push [rv BLOCK DELETE rv] button twice.

6862>MFO NOT SET WITHIN REQUIRED RANGE OF 100%.

6863>SSO NOT SET WITHIN REQUIRED RANGE OF 100%.

6864>REMOVE CHIPS FROM PART.

6865>TOOL xxxx: NOT AVAIL; NO ITO; OR NO LIFE.
1. Push [rv CANCEL rv].
2. Determine and correct the problem.
3. Restart at a safe location.

6866>CC QUIT: UNLOAD HALTED WAITING FOR A PART DELIVERY!
1. To continue OFF LINE, push [rv CANCEL & CYCLE START rv].
2. To continue w/CC [cc wait cc] for automatic return to READY AUTO; do not push CANCEL, CLEAR or any buttons on right side of control.

6867>PART REQUIRES SPECIAL HANDLING!
1. Delivery Status in DETRAN or Q1TRAN is SPL.
2. Get help to find out why it is coded SPL and what needs to be checked or watched.
3. When ready, push [rv CYCLE START rv] to continue.

6868

6869

6870 CELL CONTROLLER WILL OR HAS PICKED UP MAGAZINE.
1. If a Mag delivery is wanted, wait until after old mag is picked up, then MDI M100: [cc EXCEPT cc],
2. If a part is on the spindle, note Item # before MDI-ing M100; then, after ITO & ETSO, SEARCH for Item #.

6871 CELL CONTROLLER IS IN ERROR STATE.
Check Cell Terminal for Recovery Procedure.

6872 EXCHANGE PTS ON SPNDL WHILE M108 IS EXECUTING (1.25 mins).
1. If OFF LINE, upload and delete RWTRAN after CYCLE START goes out (CC will do this if ON LINE).
2. Edit IDENT in MATRAN, push [rv CLEAR & SEARCH rv] to correct Item # for reworking next part.

6873

6874 AUTOMATIC TOOL MAGAZINE PICKUP AND DELIVERY SERVICE IN PROGRESS WITH CELL CONTROLLER AND AGV.
[rv DO NOT TOUCH ANY BUTTONS ON RIGHT SIDE OF CONTROL. rv]

6875 REFERENCE ZERO IS NOT PERMITTED AT THIS TIME!
1. Note Item Number.
2. Make sure Power Wrench is retracted.
3. Push [rv CLEAR rv] to allow [rv REF ZERO rv]ing.
4. [rv SEARCH rv] to correct Item # before restarting.

6876>CONTROL POWERED DOWN DURING AGV SERVICE!
1. MDI M109 and select OFF LINE. When AGV move is completed, push blinking AGV button. [cc OR cc]
2. MDI M109 and select READY AUTO.
Follow displayed menu.

6877>1. ENTER TYPE OF AGV SERVICE (1, 2, or 3) FROM 1st MENU.
[1 Platform, 2 Magazine, 3 Chips]
2. ENTER NEEDED AGV ACTION (1, 2, 3, or 4) FROM 2nd MENU.
(An entry from 1st menu causes display of 2nd menu.)
[1 OK to enter, 2 OK to leave, 3 Abort-Cancel, 4 Abort-Resend]

6890 PROJECT PLATE MOVEMENT BY WORKLOADER IS INHIBITED BY PLAT AGV ACTIVITY IN PROGRESS.

6900 3161233 C GENERAL ELECTRIC 1 C

6990

6991 SELECTED SPINDLE SPEED IS OUT OR RANGE FOR SELECTED GEAR.
1. Push [rv MACH rv], [rv PAGE ADVANCE rv] to OEMS, and [rv PAGE SELECT rv] buttons to view data.
2. Push [rv CLEAR rv], correct program, and restart at a safe location.

6992>SPINDLE NOT UP TO SPEED WITHIN MSD TIME ALLOWANCE.
1. Push [rv MACH rv], [rv PAGE ADVANCE rv] to OEMS, and [rv PAGE SELECT rv] buttons to view data.
2. Push [rv CLEAR rv], correct the problem, and restart at a safe location.

NOTE: The following 9000 series messages identify reasons for Lost and Variance Time for CIM Time records. They are NOT displayed.

9001 POWER INTERRUPTED; CIM TIME ERROR.

9002 POWER INTERRUPTED; CIM TIME O.K.

9003 CONTROL SWITCHED OUT OF AUTO MODE.

9004 FEED HOLD APPLIED.

9005 CANCEL/CLEAR APPLIED.

9006 SERVO STOP A[illegible]D BY CELL CONTROLLER.

9007 REWORK/REMEASURE OF OOT.

9008 SETUP, ITO AND ETSO.

Appendix D

```
-- *************************************************************
-- *                                                           *
-- * SOFTWARE BY BRIAN IRVING (A&ES) FOR                       *
-- * AIRCRAFT ENGINE BUSINESS GROUP / GENERAL ELECTRIC COMPANY *
-- *                                                           *
-- *                                                           *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM THE RELATED  *
-- * MATERIAL, AND THE INFORMATION CONTAINED HERE , SHALL NOT  *
-- * BE DISCLOSED TO OTHERS WITHOUT WRITTEN PERMISSION OF G.E.,*
-- * AND SHALL NOT BE DUPLICATED OR USED EXCEPT IN ACCORDANCE  *
--.* WITH THE LIMITED CONDITIONS UNDER WHICH IT WAS PROVIDED BY *
-- * G.E.                                                      *
-- *                                                           *
-- * PROPERTY OF THE AIRCRAFT ENGINE BUSINESS GROUP OF THE     *
-- * GENERAL ELECTRIC COMPANY.                                 *
-- *                                                           *
-- *************************************************************

WITH wndone;   USE wndone;
WITH oemdec;   USE oemdec;

PACKAGE agvmon IS

agvmon_master     : auto_masters := auto_init;
agv_fault         : integer := 0;
agv_status        : integer := 0;
agv_time          : integer;
cancel_agv        : integer := 0;
fork_agv_counter  : integer := 0;
mdi_selection     : integer := 0;
pl_agv_counter    : integer := 0;
agv_stdby         : CONSTANT integer := 0;
plate_pu          : CONSTANT integer := 1;
plate_deliv       : CONSTANT integer := 2;
mag_pu            : CONSTANT integer := 3;
mag_deliv         : CONSTANT integer := 4;
chp_pu            : CONSTANT integer := 5;
chp_deliv         : CONSTANT integer := 6;
plt_cmplt         : CONSTANT integer := 7;
mag_cmplt         : CONSTANT integer := 8;
chp_cmplt         : CONSTANT integer := 9;
cmd_host          : CONSTANT integer := 10;
check_config      : boolean := false;
chip_permit_msg   : boolean := false;
delay_plate_tra   : boolean := false;
init_fault        : boolean := false;
mag_del_permit    : boolean := false;
mag_pu_permit     : boolean := false;
menu_start        : boolean := false;
plate_permit      : boolean := false;
tool_permit_msg   : boolean := false;

PROCEDURE agvmon_init;
PROCEDURE agvmon_main;

END agvmon;

PACKAGE atmain IS

PROCEDURE atmain_init;
PROCEDURE atmain_clear;
PROCEDURE atmain_cancel;
PROCEDURE atmain_oem1;
PROCEDURE atmain_main;

END atmain;
```

```
WITH wndone;   USE wndone;
WITH mcldat;   USE mcldat;

PACKAGE atmlib IS

TYPE asks IS (ask_1, ask_2);
ask                 : asks := ask_1;

TYPE passes IS (pass_1, pass_2a, pass_2, pass_3);
pass                : passes := pass_1;

TYPE checks_for_file IS (chk_standby, chk_wait);
check_for_file      : checks_for_file := chk_standby;

TYPE storages IS (store_start, store_name, store_cmplt);
storage             : storages := store_start;

enum_resp           : nc_responses;
response            : table_status;

cyc_strt_on         : boolean := false;
flash_al            : boolean := false;
inhibit_ref         : boolean := false;
inhibit_retrace     : boolean := false;
inh_man             : boolean := false;
ld_unld_home        : boolean;
man_opt_stop        : boolean := false;
msg_opt             : boolean;
oper_cmplt          : boolean := false;
password_cmplt      : boolean := false;
pass_echo           : boolean := false;
plate_mac           : boolean;
plate_que           : boolean;
plate_tra           : boolean;
plate_wkxgr         : boolean := false;
set_cmplt           : boolean := false;
xgr_park            : boolean;
float_001           : float := 0.001;
float_1             : float := 1.0;
float_2             : float := 2.0;
float_60            : float := 60.0;
float_1000          : float := 1000.0;
float_180           : float := 180.0;
float_205           : float := 205.0;
float_300           : float := 300.0;
float_340           : float := 340.0;
float_360           : float := 360.0;
float_400           : float := 400.0;
t_val               : float;
delay_msg_no        : integer := 0;
buffer_trans        : integer := 0;
file_is_there       : integer := 0;
fl_num              : integer := 0;
int_date            : integer := 0;
lost_time_cntr      : integer := 0;
lost_time_msg       : integer := 0;
old_day             : integer;
old_time            : integer;
old_year            : integer;
rework_time_cntr    : integer := 0;
test_integer        : integer := 0;
tran_name           : integer := 0;
tran_num            : integer := 0;
var_time_msg        : integer := 0;
blank_line          : str64;
blank_item1         : string(1..67);
char_date           : string(1..8);
cur_date            : string(1..20);
hold_name           : str10;
inq_msg             : str64;
month_str           : string(1..36);
old_mon             : string(1..3);
```

```
disp_array        : ARRAY (1..5) OF string(1..3);
serial_num_loc    : ARRAY (1..5) OF integer;
wp_status         : ARRAY (1..5) OF integer;
msg_act           : ARRAY (6800..6850) OF boolean;  --ACTIVE MSGS ARRAY

PROCEDURE atmlib_init;
PROCEDURE atmlib_oeml;
PROCEDURE atmlib_cancel;
PROCEDURE atmlib_clear;
PROCEDURE c_to_i(array_in : IN OUT string;  -- CONVERTS CHARACTER TO INTEGEF
                 posn : IN integer;
                 quantity : IN integer;
                 result : OUT integer);
PROCEDURE f_to_c(flt_in : IN float;          -- CONVERTS FLOAT TO CHARACTER
                 width : IN integer;
                 decpt : IN integer;
                 posn : IN integer;
                 array_out : OUT string);
PROCEDURE i_to_c(int_in : IN integer;        -- CONVERTS INTEGER TO CHARACTER
                 width : IN integer;
                 posn : IN integer;
                 array_out : OUT string);
PROCEDURE c_to_f(array_in : IN OUT string;   -- CONVERTS CHARACTER TO FLOAT
                 posn : IN integer;
                 quantity : IN integer;
                 flt_out : OUT float);
PROCEDURE ask_oper(pr_lgt : IN integer;       -- PREFORMS INQUIRE PROMPTS
                   ln_num : IN integer;
                   col_num : IN integer;
                   inq_lgt : OUT integer;
                   resp_rdy : OUT boolean);
PROCEDURE file_present(mcl_file : IN integer);
FUNCTION find_trans RETURN boolean;
FUNCTION truncate(parm_value : IN integer) RETURN integer;
PROCEDURE password;                           -- ALLOWS ACCESS THROUGH PASSWOR
PROCEDURE set_conv_varb;             -- SETS UP A DATE IN FLOAT FOR COMPARISO
PROCEDURE repl_ver_dt;     -- CONVERTS CHAR DATE FROM CLOCK TO DATE IN FLOA
PROCEDURE str_set(name_tag : IN integer;

                  name_val : IN integer);
PROCEDURE tb_fl(t_tbl1 : IN integer;
                t_ind1 : IN integer;
                t_tbl2 : IN integer;
                t_ind2 : IN integer);
PROCEDURE act_off(tool_off : IN integer;
                  tool_dat : IN integer);
PROCEDURE t_a_f(t_tbl : IN integer;
                t_ind : IN integer);
PROCEDURE t_s_i(t_tbl : IN integer;
                t_vle : IN integer;
                t_ind : IN OUT integer);
PROCEDURE p_msg(msg_num : IN integer;
                prior : IN integer);
PROCEDURE k_msg(msg_num : IN integer);
PROCEDURE p_val(p_num : IN integer);
PROCEDURE store_msg(msg_no : IN integer);
PROCEDURE cnt_dwn;
PROCEDURE var_msg(var_no : IN integer);
PROCEDURE var_dwn;
PROCEDURE erase (page_no : IN integer;
                 line_no : IN integer);
PROCEDURE turn_off_blkdlt(pmtr_num : IN integer);
PROCEDURE check_plo;
PROCEDURE set_offsts;
PROCEDURE inter_face;
FUNCTION store_file RETURN boolean;

END atmlib;
```

```
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- * COPYRIGHT BY GENERAL ELECTRIC COMPANY  1985                  *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH oemdec;   USE oemdec;

PACKAGE barcdr IS

TYPE barcdr_states IS (open_port, barcdr_standby, barcdr_wait);

barcdr_master     : auto_masters := auto_init;
barcdr_state      : barcdr_states := open_port;
bar_reading       : ARRAY (1..8) OF character;
maxim_char        : CONSTANT integer := 4;
no_read           : boolean := false;
no_match          : boolean := false;
skip_barcode      : boolean := false;
input_index       : integer := 1;
in_limit          : integer := 8;
ser_no            : integer := 0;
type_read         : integer := 0;

PROCEDURE barcdr_cancel;
PROCEDURE barcdr_main;

END barcdr;

WITH wndone;   USE wndone;

PACKAGE blkdlt IS

TYPE beop_states IS (beop_standby, make_str1, beop_done);
beop_state        : beop_states := beop_standby;

TYPE blkdlt_states IS (blk_standby, blk_start, blk_search,
                       blk_set_1, blk_set, blk_clr, blk_cyc);
blkdlt_state      : blkdlt_states := blk_standby;

TYPE com_sts IS (comp, convert, chk_hr);
com_st            : com_sts := comp;

als_light         : boolean := false;
etso_again        : boolean := false;
m_set             : boolean := false;
part_count        : integer := 0;
hr_ret            : integer := 0;
prog_str          : string(1..67);
act_blkdlt        : string(1..9);
misc_str          : string(1..20);
```

```
'ROCEDURE blkdlt_clear;
 ROCEDURE blkdlt_main;
 ROCEDURE clear_tov;
 UNCTION compare RETURN boolean;  --COMPARES OLD TIME AND DATE WITH THE CURR
 NE
 JNCTION blkdlt_eop RETURN boolean;              -- RUNS END OF PROGRAM TASK


 ID blkdlt;
  --MSD BOOLEAN #141     TOOL MGT OPTION
  --MSD BOOLEAN #142     BAR CODE READER
  --MSD BOOLEAN #144     TOOL LIFE OPTION
  --MSD BOOLEAN #145     AUTOMATION OPTION
  --MSD BOOLEAN #147     CAUSE CODE OPTION

  WITH wndone;   USE wndone;
  WITH mcldat;   USE mcldat;
  WITH rel6;     USE rel6;
  WITH rel7;     USE rel7;

  PACKAGE bubdec IS

                              --THE FOLLOWING ITEMS RELATE TO THE BUBBLE MCL

  TYPE file_commands IS (command_standby, get_data, rename, g_str, g_data,
                         p_str, p_data, trans_to_table, trans_to_file,
                         date_file, record_qc_data, verfy_to_table,
                         verfy_to_file, copy_file, no_file, clear_transfer,
                         delete_a_file);
  file_command       : file_commands := command_standby;
  buffer_string      : string(1..67);            --STRING HOLDING DATA TAKEN FRO
FILE
  dec_pt             : integer := 0;             --NUM OF DIGITS AFTER DEC POINT
  done               : boolean := false;
  dupfle             : boolean := false;         --DUPLICATE FILE EXISTS
  item1_flt          : float := 0.0;             --FLOAT VALUE OF 1ST ITEM
  item1_int          : integer := 0;             --INTEGER VALUE OF 1ST ITEM
  item1_is_int       : boolean := false;         --ITEM IS INTEGER OR FLOAT

  item1_lgt          : integer := 0;             --LENGTH OF ITEM1
  item1_loc          : integer := 0;             --LOCATION OF ITEM1
  item1_rec          : integer := 0;             --RECORD NO OF ITEM
  item1_str          : string(1..67);            --STRING VALUE OF 1ST ITEM
  nm_lgt             : CONSTANT integer := 10;   --NUMBER OF CHAR IN NAME LGT
  number             : integer := 0;             --NUMBER OF FILE THAT IS OPEN
  old_lgt            : CONSTANT integer := 10;   --NUMBER OF CHAR IN OLD NAME

  str_name           : str10;                    --NAME OF FILE
  str_old_name       : str10;                    --OLD NAME OF BUBMCL FILE;
  tbl_ptr            : integer := 0;             --DATA MGT TABLE INDEX
  insert_line        : integer := 37;            --DATA MGT FILE INDEX
  tool_count         : integer := 0;             --NUMBER OF TOOLS FOUND
   --THE FOLLOWING ITEMS RELATE TO THE TOOL CONTROL
   broken_tool        : boolean := false;         --BROKEN TOOL FLAG
   magazine_size      : integer;                  --SIZE OF TOOL MAGAZINE
   next_part          : boolean := false;         --NO TOOLS FOR NEXT PART FLAG
   reqd_life          : float := 0.0;             --LIFE THAT IS REQUIRED OF TOOL
   host_req_mag       : boolean := false;         --CELL CONTROLLER REQUESTS A MA
G CHG
   tool_mag_req       : boolean := false;         --REQUEST FOR A TOOL MAGAZINE
   tool_to_get        : boolean := false;         --TOOL HAS BEEN PRESELECTED
   turret_size        : integer;                  --NUMBER OF TURRET FACES

   t_index            : integer := 0;             --T TABLE INDEX
   t_req              : integer := 0;             --TURRET FACE REQUESTED
   t_off              : integer := 0;             --TOOL OFFSET NUMBER
   t_type             : integer := 0;             --T TOOL TYPE
   v_index            : integer := 0;             --V TABLE INDEX
   v_life             : float := 0.0;             --LIFE IN V CODE
   v_tbl_size         : integer;                  --MAX NO. OF ITEMS IN V-CODE TA
```

```
BLES
    v_type              : integer := 0;                  --V TOOL TYPE

    --THE FOLLOWING ITEMS RELATE TO HOST OPERATION
    command_request     : integer := 0;                  --DNC ACTION REQUEST
    data_request        : integer := 0;                  --DNC DATA REQUEST
    delete_putran       : boolean := false;
    delete_config       : boolean := false;
    host_ack            : boolean := false;              --HOST ACKNOWLEDGEMENT
    host_available      : boolean := false;              --HOST ON LINE FLAG

    --THE FOLLOWING ITEMS RELATE TO MSD OPTIONS
    auto_msd_bool       : ARRAY (141..147) OF boolean;
    tool_mgt_opt        : CONSTANT integer := 141;  --TOOL MANAGEMENT OPTION
    tool_mag_opt        : CONSTANT integer := 142;  --TOOL MAGAZINE OPTION
    tool_life_opt       : CONSTANT integer := 143;  --TOOL LIFE OPTION
    automation_opt      : CONSTANT integer := 145;  --AUTOMATION FEATURES OPTION
    cause_code_opt      : CONSTANT integer := 147;  --TURNS ON CAUSE CODES

    --THE FOLLOWING ITEMS RELATE TO DATA MANAGEMENT
    clm_index           : integer := 2;                  --INDEX FOR CLM DATA FILE
    num_of_pts          : integer := 1;                  --NUMBR OF PTS ON PLATE
    plate_index         : integer := 1;                  --POINTER FOR QC DATA
    data_in_tbl         : boolean := false;              --DATA IN QC TABLES
    tbl_limit           : integer;                       --NO OF ITEMS IN QC TABLES
    tool_thing          : string(1..8);                  --NEW FILE
    zone_tbl_str        : string(1..11);                 --ZONE TABLE STRING
    part_descrip        : string(1..32);                 --PART DESCRIPTION

    proj_plate_no       : string(1..8);                  --PROJECT PLATE NO
    plate_serial_no     : string(1..39);                 --PLATE SERIAL NO
    prgrm_id            : string(1..6);                  --PROGRAM ID NO

    --THE FOLLOWING ARE MISC FLAGS
    bar_code_read_ok : boolean := false;                 --STATUS OF BAR CODE THAT WAS R
 EAD
    code_was_read       : boolean := false;              --BAR CODE WAS READ
    d_type              : table_data_type;
    state               : io_status_enum;
    tble_status         : table_status;                  --TABLE STATUS RETURN
    su_flag             : boolean := true;               --START UP FLAG
    pkup_exp            : boolean := false;
    deliv_exp           : boolean := false;

    bubmcl_cancel       : boolean := false;               --CANCEL FLAG FOR BUBBLE MCL
    cim_fault           : ARRAY (1..20) OF boolean;

    --THE FOLLOWING CONSTANTS LOCATE ITEMS IN THE MCL FILES. THESE

    --CONSTANTS WILL HAVE TO BE CHANGED IF THE FORMAT OF THE MCL FILES
    --IS CHANGED.

                         -- PROJECT PLATE FILE
    ws_id_lgt           : CONSTANT integer := 06;
    ws_id_rnm           : CONSTANT integer := 02;
    nor_rew_lgt         : CONSTANT integer := 03;
    nor_rew_rnm         : CONSTANT integer := 03;
    pr_id_lgt           : CONSTANT integer := 06;
    pr_id_rnm           : CONSTANT integer := 04;
    pr_desc_lgt         : CONSTANT integer := 13;
    pr_desc_rnm         : CONSTANT integer := 05;

    op_numb_lgt         : CONSTANT integer := 03;
    op_numb_rnm         : CONSTANT integer := 06;
    pr_stat_lgt         : CONSTANT integer := 03;
    pr_stat_rnm         : CONSTANT integer := 07;
    apprv_qty_lgt       : CONSTANT integer := 03;
    apprv_qty_rnm       : CONSTANT integer := 08;
    apprv_ct_lgt        : CONSTANT integer := 03;
    apprv_ct_rnm        : CONSTANT integer := 09;
```

```
ct_int_lgt          : CONSTANT integer := 03;
ct_int_rnm          : CONSTANT integer := 10;
verf_in_lgt         : CONSTANT integer := 03;
verf_in_rnm         : CONSTANT integer := 11;
pr_limit_lgt        : CONSTANT integer := 03;
pr_limit_rnm        : CONSTANT integer := 12;
start_date_rnm      : CONSTANT integer := 13;
fin_date_rnm        : CONSTANT integer := 14;

lt_min_rnm          : CONSTANT integer := 15;
lt_mes_rnm          : CONSTANT integer := 16;
cim_tm_pt_rnm       : CONSTANT integer := 17;
rwk_tm_pt_rnm       : CONSTANT integer := 18;
variance_rnm        : CONSTANT integer := 19;
sn_lgt              : CONSTANT integer := 08;
sn_1_rnm            : CONSTANT integer := 21;
sn_2_rnm            : CONSTANT integer := 24;

sn_3_rnm            : CONSTANT integer := 27;
sn_4_rnm            : CONSTANT integer := 30;
sn_5_rnm            : CONSTANT integer := 33;
wp_status_lgt       : CONSTANT integer := 03;
wp_status1_rnm      : CONSTANT integer := 22;
wp_status2_rnm      : CONSTANT integer := 25;
wp_status3_rnm      : CONSTANT integer := 28;
wp_status4_rnm      : CONSTANT integer := 31;
wp_status5_rnm      : CONSTANT integer := 34;

zone_lgt            : CONSTANT integer := 09;
zone_loc            : CONSTANT integer := 01;
prb_id_lgt          : CONSTANT integer := 08;
prb_id_loc          : CONSTANT integer := 12;
mn_lgt              : CONSTANT integer := 08;
mn_loc              : CONSTANT integer := 21;
mx_lgt              : CONSTANT integer := 08;
mx_loc              : CONSTANT integer := 29;

act_lgt             : CONSTANT integer := 08;
act_loc             : CONSTANT integer := 37;
dev_lgt             : CONSTANT integer := 07;
dev_loc             : CONSTANT integer := 46;
oot_lgt             : CONSTANT integer := 07;
oot_loc             : CONSTANT integer := 54;
str_loc             : CONSTANT integer := 61:
cause_lgt           : CONSTANT integer := 04;
cause_loc           : CONSTANT integer := 62;
plate_loc           : CONSTANT integer := 18;
                  --TOOL MAGAZINE FILE
type_lgt            : CONSTANT integer := 04;
type_loc            : CONSTANT integer := 06;
loc_lgt             : CONSTANT integer := 03;
loc_loc             : CONSTANT integer := 16;
xos_lgt             : CONSTANT integer := 09;
xos_loc             : CONSTANT integer := 21;

zos_lgt             : CONSTANT integer := 09;
zos_loc             : CONSTANT integer := 31;
life_lgt            : CONSTANT integer := 08;
life_loc            : CONSTANT integer := 41;
ser_lgt             : CONSTANT integer := 04;
ser_loc             : CONSTANT integer := 51;
                  --MISC
type_size           : CONSTANT integer := 999;
clmrlg              : CONSTANT integer := 20;
rlg                 : CONSTANT integer := 67;

--THE FOLLOWING CONSTANTS DEFINE THE VARIOUS TABLES IN THE
--AUTOMATION MCL.

ttype               : CONSTANT integer := 1;    --TABLE OF TOOL TYPE
life                : CONSTANT integer := 2;    --TABLE OF TOOL LIFE
mag                 : CONSTANT integer := 3;    --POCKET TOOL CAME FROM
turno               : CONSTANT integer := 4;    --TOOL SERIAL NO'S IN TUR TABLE
```

```
-- TABLE 5 IS NAME OF ITEM IN SOFTWARE CONFIGURATION TABLES
-- TABLE 6 IS REVISION NUMBER IN SOFTWARE CONFIGURATION TABLES
vtype            : CONSTANT integer := 7;    --TABLE OF TOOL LIST TYPES
p178             : CONSTANT integer := 8;    --TABLE OF PAR 178 VALUES

p181             : CONSTANT integer := 9;    --TABLE OF PAR 181 VALUES
serial           : CONSTANT integer := 10;   --TOOL SERIAL NO'S IN TOOL LIST
-- TABLE 11 IS DATE OF REVISION IN SOFTWARE CONFIGURATION TABLES
cause_list       : CONSTANT integer := 12;   --CAUSE CODE REF LIST
ptqty            : CONSTANT integer := 13;   --PART QUANTITY
zone             : CONSTANT integer := 14;   --DATA POINTS CLASSIFICATION
mn               : CONSTANT integer := 15;   --MINIMUM DIMENSION OF POINT
mx               : CONSTANT integer := 16;   --MAXIMUM DIMENSION OF POINT

act              : CONSTANT integer := 17;   --ACTUAL DIMENSION OF POINT
dev              : CONSTANT integer := 18;   --DEVIATION OF POINT
oot              : CONSTANT integer := 19;   --OUT OF TOLERENCE
tool_dt          : CONSTANT integer := 20;   --PROBE DATA
cause_code       : CONSTANT integer := 21;   --CAUSE CODE TABLE
star             : CONSTANT integer := 22;   --OUT OF TOLERANCE ASTERICK
mtype            : CONSTANT integer := 23;   --TOOL FILE TYPE TBL
stat             : CONSTANT integer := 24;   --TOOL FILE STATUS TBL

ser              : CONSTANT integer := 25;   --TOOL SERIAL NUMBER
mxos             : CONSTANT integer := 26;   --TOOL FILE X HOLDER OFSET
mzos             : CONSTANT integer := 27;   --TOOL FILE Z HOLDER OFSET
mlfe             : CONSTANT integer := 28;   --TOOL FILE TOOL LIFE TBL
rmlfe            : CONSTANT integer := 29;   --TOOL FILE SCRATCH PAD TABLE
verify_a         : CONSTANT integer := 30;   --VERIFICATION TABLE
verify           : CONSTANT integer := 31;   --VERIFICATION TABLE
cim              : CONSTANT integer := 32;   --CIM TIME TABLE

msg              : CONSTANT integer := 33;   --LOST TIME MESSAGE NO
var              : CONSTANT integer := 34;   --VARIANCE TIME MESSAGES
prog_1           : CONSTANT integer := 35;   --RECENTLY RUN PROGRAMS MISC
prog_2           : CONSTANT integer := 36;   --RECENTLY RUN PROGRAMS TIME
prog_3           : CONSTANT integer := 37;   --RECENTLY RUN PROGRAMS DISC
mat              : CONSTANT integer := 38;   --SWARF MATERIAL
swrf             : CONSTANT integer := 39;   --SWARF CONTAINER DATA
-- TABLE 40 IS IDENTIFICATION NAMES FOR PARAMETER TABLE

hr               : CONSTANT integer := 41;   --MONTHLY HOUR TABLE
prog_4           : CONSTANT integer := 42;   --RECENTLY RUN PROG DISC SER NO
prog_5           : CONSTANT integer := 43;   --RECENTLY RUN PROG DISC 5TH NO
------------------ ----------------------------------------------

END bubdec;

PACKAGE bubmcl IS

PROCEDURE bubmcl_init;
PROCEDURE bubble_io_mcl;
PROCEDURE get_str;                          --OBTAIN STRING DATA FROM FILE

END bubmcl;

WITH wndone;   USE wndone;
WITH oemdec;   USE oemdec;

PACKAGE chpmgt IS

chpmgt_master     : auto_masters := auto_init;

TYPE chpmgt_states IS (chpmgt_stdby, chk_values, wait_for_agv);
chpmgt_state      : chpmgt_states := chpmgt_stdby;

TYPE convey_states IS (convey_standby, convey_monitor, convey_off_state,
                       t_chk, off_clear);
convey_state     : convey_states := convey_standby;

TYPE chp_agv_states IS (stdby, send_cmd, wait_cmplt);
chp_agv_st       : chp_agv_states := stdby;
```

```
agv_cmplt          : boolean := false;
agv_eop_reqd       : boolean := false;
agv_inprgs         : boolean := false;
agv_rdy_cmplt      : boolean := false;        --AGV SERVICE NOT COMPLETE
a_delivr           : boolean := false;
a_pickup           : boolean := false;        --AGV DELIVER FLAG
chip_cmplt         : boolean := false;
chip_flag          : boolean := false;        --END OF CHIP EOP TASK
space_avail        : boolean := false;        --CHIP MNGT COMPLETE
standby_chips      : boolean := false;        --LEFT IN CONTAINER

c_cmd              : integer := 0;            --AGV CMD BUFF
chpmgt_fault       : integer := 0;

add_vol            : float := 0.0;            --VOLUME ADDED THIS OPERATION
container_vol      : float := 0.0;            --CONT VOLUME
new_col            : float := 0.0;
old_col            : float := 0.0;
pp_c_tim           : float := 0.0;            --PART PROG CUT TIME
vol_aval           : float := 0.0;            --CURRENT CONT VOLUME AVAILABLE

opt_stop_act       : boolean := false;        --OPTION STOP WAS ACTIVE
cyc_strt_stor      : boolean := false;        --CYCLE START WAS ON

PROCEDURE chpmgt_init;
PROCEDURE chpmgt_cancel;
PROCEDURE chpmgt_main;
PROCEDURE chip_data_eop;

PROCEDURE go_agv;

END chpmgt;

PACKAGE clock IS

TYPE clock_states IS (clock_standby, clock_inq, chk_data);
clock_state        : clock_states := clock_standby;

TYPE cim_times IS (date_a_file, check_file, correct_file,
                   cim_monitor, lost_time_monit, rework_monitor,
                   proc_time_calc, cim_time_reset, do_blkdlt_eop,
                   make_putran);
cim_time           : cim_times := date_a_file;
time               : string(1..20);
blank_time         : string(1..20);
day                : array(1..2) of integer;
hour               : array(1..2) of float;
minit              : array(1..2) of float;
scd                : array(1..2) of float;
plate_integer      : integer := 0;
cim_time_on        : boolean := false;
cim_time_run       : boolean := false;
clock_is_set       : boolean := false;
record_cim_time    : boolean := false;
reworking          : boolean := false;
stop_cim_time      : boolean := false;
store_e            : boolean := false;
hour_ret           : float := 0.0;
lost_time          : float := 0.0;
sso_temp           : float := 0.0;
proc_time          : float := 0.0;
rework_time        : float := 0.0;

PROCEDURE date;                               -- GET THE TIME AND DATE
PROCEDURE set_time;                           -- CALIBRATE THE CLOCK FROM THE HOST
PROCEDURE clock_init;
PROCEDURE clock_oeml;
PROCEDURE clock_main;

END clock;
```

```
-- *************************************************************
-- *                                                           *
-- * SOFTWARE BY PAUL COLANANNI (A&ES) FOR                     *
-- * AIRCRAFT ENGINE BUSINESS GROUP / GENERAL ELECTRIC COMPANY *
-- *                                                           *
-- *                                                           *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM, THE RELATED *
-- * MATERIAL, AND THE INFORMATION CONTAINED HEREIN, SHALL NOT *
-- * BE DISCLOSED TO OTHERS WITHOUT WRITTEN PERMISSION OF G.E., *
-- * AND SHALL NOT BE DUPLICATED OR USED EXCEPT IN ACCORDANCE  *
-- * WITH THE LIMITED CONDITIONS UNDER WHICH IT WAS PROVIDED BY *
-- * G.E.                                                      *
-- *                                                           *
-- * PROPERTY OF THE AIRCRAFT ENGINE BUSINESS GROUP OF THE     *
-- * GENERAL ELECTRIC COMPANY.                                 *
-- *                                                           *
-- *************************************************************

PACKAGE dncdec IS

-- DNC BOOLEAN ARRAY ASSIGNMENTS
-- RESERVE FIRST SIX BOOLEANS FOR PARAMETERS
bool_param1      : CONSTANT integer := 001;
bool_param2      : CONSTANT integer := 002;
bool_param3      : CONSTANT integer := 003;
bool_param4      : CONSTANT integer := 004;
bool_param5      : CONSTANT integer := 005;
bool_param6      : CONSTANT integer := 006;

dnc_auto_mode    : CONSTANT integer := 007;
-- CONTROLLED BY THE MCL. INDICATES
-- WHEN DNC COMMANDS ARE PERMITTED. HOST SHOULD MONITOR.

dnc_fnction_rdy  : CONSTANT integer := 008;  --FIXED STATUS BIT #15
-- WHEN THE DNC_INT(MCL_COMMAND_NO) IS 4000 TO 4999 (A HOST FUNCTION),
-- THE MCL WILL SET THIS BOOLEAN TO INDICATE THAT THE FUNCTION DATA
-- HAS BEEN LOADED INTO THE DNC_ARRAYS. THE MCL WILL CLEAR THIS ELEMENT
-- THE NEXT TIME DNC_DATA_RDY IS SET BY THE HOST.

mc2000_data_req  : CONSTANT integer := 009;  --FIXED STATUS BIT #14
mc2000_cmd_req   : CONSTANT integer := 010;  --FIXED STATUS BIT #13
get_date         : CONSTANT integer := 011;  --FIXED STATUS BIT #12
strtup_in_proc   : CONSTANT integer := 012;  --FIXED STATUS BIT #11
mc2000_status    : CONSTANT integer := 013;  --FIXED STATUS BIT #10
trans_report     : CONSTANT integer := 014;  --FIXED STATUS BIT #09
prog_check       : CONSTANT integer := 015;  --FIXED STATUS BIT #08
time_report      : CONSTANT INTEGER := 016;  --FIXED STATUS BIT #07
--               : CONSTANT INTEGER := 017;
--               : CONSTANT INTEGER := 018;
--               : CONSTANT INTEGER := 019;
--               : CONSTANT INTEGER := 020;
--               : CONSTANT INTEGER := 021;
--               : CONSTANT INTEGER := 022;
--               : CONSTANT INTEGER := 023;
--               : CONSTANT INTEGER := 024;
--               : CONSTANT INTEGER := 025;
--               : CONSTANT INTEGER := 026;
--               : CONSTANT INTEGER := 027;
--               : CONSTANT INTEGER := 028;
--               : CONSTANT INTEGER := 029;
--               : CONSTANT INTEGER := 030;

rvi_was_sent     : CONSTANT integer := 031;
-- SET TO TRUE BY THE DNC SOFTWARE WHEN NON_POLLED STATUS REPORTING
-- IS SELECTED IN MSD AND RVI IS SENT TO THE HOST. THE MCL SHOULD
-- SET TO FALSE.
```

```
dnc_data_rdy      : CONSTANT integer := 032;
-- INDICATES THAT THE DATA IN THE DNC ARRAYS HAVE BEEN LOADED FOR
-- MCL ACCESS.  THE DNC SOFTWARE SETS THIS ELEMENT TO TRUE.  THE MCL
-- MUST SET TO FALSE WHEN THE DATA IN THE ARRAYS IS NO LONGER REQUIRED.

-- DNC INTEGER ARRAY ASSIGNMENTS-------------------------------------------

no_bool_params    : CONSTANT integer := 001;
no_float_params   : CONSTANT integer := 002;
no_int_params     : CONSTANT integer := 003;
no_str6_params    : CONSTANT integer := 004;
no_str10_params   : CONSTANT integer := 005;
no_str64_params   : CONSTANT integer := 006;

-- RESERVE NINE INTEGER ELEMENTS AS PARAMETERS
int_param1        : CONSTANT integer := 007;
int_param2        : CONSTANT integer := 008;
int_param3        : CONSTANT integer := 009;
int_param4        : CONSTANT integer := 010;
int_param5        : CONSTANT integer := 011;
int_param6        : CONSTANT integer := 012;
int_param7        : CONSTANT integer := 013;
int_param8        : CONSTANT integer := 014;
int_param9        : CONSTANT integer := 015;

mcl_command_no    : CONSTANT integer := 016;

-- DNC FLOAT ARRAY ASSIGNMENTS.  ALL FLOAT ELEMENTS ARE RESERVED AS
-- PARAMETERS.-------------------------------------------------------------
float_param1      : CONSTANT integer := 001;
float_param2      : CONSTANT integer := 002;
float_param3      : CONSTANT integer := 003;
float_param4      : CONSTANT integer := 004;

-- STR6 ASSIGNMENTS.  ALL ARE RESERVED AS PARAMETERS--------------------
str6_param1       : CONSTANT integer := 001;
str6_param2       : CONSTANT integer := 002;

-- STR10 ASSIGNMENTS-------------------------------------------------------
str10_param1      : CONSTANT integer := 001;
str10_param2      : CONSTANT integer := 002;

-- STR64 ASSIGNMENTS-------------------------------------------------------
str64_param1      : CONSTANT integer := 001;
str64_param2      : CONSTANT integer := 002;
--*************** HOST COMMANDS ****************************************
-- HOST ACKNOWLEDGEMENT
host_acknl        : CONSTANT integer := 1999;
-- USED BY THE HOST TO INFORM THE 2000 THAT IT HAS RECEIVED A REQUEST.

-- SERVO STOP REQUEST
servo_stop_req    : CONSTANT integer := 2017;
-- USED BY THE HOST TO CAUSE A SERVO STOP IN A WORKSTATION

-- SPECIAL DNC PROCEDURES. COMMANDS FROM HOST.
-- 3000 TO 3999-----------------------------------------------------------

cell_cntrl_avail : CONSTANT integer := 3000;
-- USED TO INFORM THE 2000 OV THE AVAILABILITY OF THE CELL CONTROL.
-- PARAMETER = 1 WHEN CELL CONTROL IS AVAILABLE AND 0 WHEN IT IS
-- NOT AVAILABLE.

date_data         : CONSTANT integer := 3001;
-- USED BY THE HOST TO PASS DATE AND TIME DATA TO THE 2000
-- HOST WILL SEND 1 STR64 PARAMETER AS FOLLOWS:
--            12 JAN 1986 15:23:12

dev_ready_state  : CONSTANT integer := 3002;
-- USED BY THE HOST TO INFORM THE 2000 IS THAT AN AGV IS IN ITS READY
-- POSITION
-- HOST SENDS ONE INTEGER PARAMETER AS FOLLOWS:
--            1 = PLATE PICKUP AT READY POSITION
```

```
--              2 = PLATE DELIVERY AT READY POSITION
--              3 = MAG PICKUP AT READY POSITION
--              4 = MAG DELIVERY AT READY POSITION
--              5 = CHIP BUCKET PICKUP AT READY POSITION
--              6 = CHIP BUCKET DELIVERY AT READY POSITION
--              7 = PLATE AGV HAS COMPLETED TASK
--              8 = MAG AGV HAS COMPLETED TASK
--              9 = CHIP AGV HAS COMPLETED TASK

mc2000_data       : CONSTANT integer := 3003;
-- USED BY THE HOST TO RETURN THE DATA THAT THE 2000 REQUESTED
-- WITH THE 4002 FUNCTION COMMAND (SEE 4002 BELOW)
-- PARAMETERS VARY DEPENDING ON THE 4002 COMMAND

program_ok        : CONSTANT integer := 3004;
-- USED BY THE HOST TO RELEASE THE 2000 AFTER THE HOST HAS CHECKED
-- THE PART PROGRAM, TOOLING, ETC.

verify_file_retn : CONSTANT integer := 3005;
-- USED BY THE HOST TO INFORM THE 2000 THAT THE VERIFY FILE HAS BEEN
-- RETURNED TO THE 2000.

chg_tool_magz     : CONSTANT integer := 3006;
-- USED BY THE HOST TO INFORM THE 2000 TO CHANGE THE TOOL MAGAZINE

chg_swarf_cont    : CONSTANT integer := 3007;
-- USED BY THE HOST TO INFORM THE 2000 TO CHANGE THE SWARF CONTAINER

mag_config_file   : CONSTANT integer := 3008;
-- USED BY THE HOST TO INFORM THE 2000 A CONFIG FILE WAS DOWNLOADED

plt_config_file   : CONSTANT integer := 3009;
-- USED BY THE HOST TO INFORM THE 2000 A CONFIG FILE WAS DOWNLOADED

agv_avail         : CONSTANT integer := 3010;
-- USED BY THE HOST TO INFORM THE 2000 THAT THE AGV SYSTEM IS AVAILABLE

agv_not_avail     : CONSTANT integer := 3011;
-- USED BY THE HOST TO INFORM THE 2000 THAT THE AGV SYSTEM IS NOT AVAILABLE
trans_file_del    : CONSTANT integer := 3012;
-- USED BY THE HOST TO INFORM THE 2000 THAT THE TRANSFER FILE IS DELETED

cell_down         : CONSTANT integer := 3013;
-- USED BY THE HOST TO INFORM THE 2000 THAT THE CELL CONTROLLER IS DOWN

cell_up           : CONSTANT integer := 3014;
-- USED BY THE HOST TO INFORM THE 2000 THAT THE CELL CONTROLLER IS UP

prog_downld       : CONSTANT integer := 3015;
-- USED BY THE HOST TO INFORM THE 2000 THAT THE PROGRAM HAS BEEN DOWNLOADED
cell_error_state : CONSTANT integer := 3016;
-- USED BY THE HOST TO INFORM THE 2000 THAT THE CELL CONTROLLER IS IN
-- ERROR STATE

cell_error_retrn : CONSTANT integer := 3017;
-- USED BY THE HOST TO INFORM THE 2000 THAT THE CELL CONTROLLER HAS
-- RETURNED FROM ERROR STATE

mag_data           : CONSTANT integer := 3018;
-- USED BY THE HOST TO RETURN THE DATA THAT THE 2000 REQUESTED
-- WITH THE 4002 FUNCTION COMMAND (SEE 4002 BELOW)
-- PARAMETERS VARY DEPENDING ON THE 4002 COMMAND

mach_off_line      : CONSTANT integer := 3019;
--.USED BY THE HOST TO RELEASE THE 2000 FROM ON LINE CONDITION

pass_word          : CONSTANT integer := 3020;
-- USED BY THE HOST TO GIVE A NEW PASSWORD TO THE 2000
-- HOST WILL SEND ONE STR6 PARAMETER WITH THE NEW PASSWORD
```

```
delete_file       : CONSTANT integer := 3021;
-- USED BY THE HOST TO TELL THE 2000 TO DELETE A FILE
-- HOST SENDS ONE INTEGER PARAMETER AS FOLLOWS:
--           1 = DELETE PUTRAN.MCL
--           2 = DELETE CONFIG.MCL

-- SPECIAL DNC PROCEDURES. COMMANDS FROM HOST.
-- 4000 TO 4999.-----------------------------------------------------

wrk_station_stat : CONSTANT integer := 4000;
-- 2000 WILL RETURN 8 INTEGER PARAMETERS IDENTIFYING THE WORKSTATION STATUS
-- RETURNED INTEGER PARAMETERS ARE:
--        1ST PARAMETER = 1215    MONTH AND DAY PERFORMANCE DATE
--        2ND PARAMETER =   85    YEAR
--        3RD PARAMETER =   10    PERFORMANCE INTERVAL IN DAYS
--        4TH PARAMETER =  110    MONTH AND DAY CALIBRATION INTERVAL
--        5TH PARAMETER =   86    YEAR
--        6TH PARAMETER =    5    CALIBRATION INTERVAL IN DAYS
--        7TH PARAMETER =    3    WORK STATION STATUS VALID VALUES ARE:
--                                1 = READY AUTO
--                                2 = READY MANUAL
--                                3 = NOT AVAILABLE-8TH PARAMETER WILL
--                                    GIVE # OF HRS
--                                4 = OFF LINE
--        8TH PARAMETER           NUMERICAL CODE OF MATERIAL
--        9TH PARAMETER =    1    # OF HOURS WORKSTATION NOT AVAILABLE
--                                8TH PARAMETER IS VALID ONLY WHEN
--                                7TH PARAMETER IS A 3.

mc2000_cmd_data  : CONSTANT integer := 4001;
-- 2000 WILL RETURN ONE TO FOUR INTEGER PARAMETERS IDENTIFYING THE COMMAND
-- AS FOLLOWS:
--        1 = PLATE PICKUP REQUEST
--            A 2ND INTEGER WILL BE PASSED TO IDENTIFY THE NUMBER OF
--            MINUTES BEFORE THE 2000 NEEDS THE PART. A VALUE OF ZERO
--            WILL INDICATE AN IMMEDIATE NEED.
--        2 = PLATE DELIVERY REQUEST
--            A 2ND INTEGER WILL BE PASSED TO IDENTIFY THE NUMBER OF
--            MINUTES BEFORE THE 2000 NEEDS THE PART. A VALUE OF ZERO
--            WILL INDICATE AN IMMEDIATE NEED.
--        3 = MAG PICKUP REQUEST
--        4 = MAG DELIVERY REQUEST
--        5 = CHIP BUCKET PICKUP REQUEST
--            A 2ND INTEGER WILL BE PASSED TO IDENTIFY THE MATERIAL
--            THAT IS IN THE CHIP BUCKET.
--        6 = CHIP BUCKET DELIVERY REQUEST
--            A 2ND INTEGER WILL BE PASSED TO IDENTIFY THE MATERIAL
--            THAT WILL BE PUT IN THE CHIP BUCKET.
--            3RD ADDITIONAL PARAMETER WILL BE TIME ALLOWED FOR CHIPS TO
--            ACCUMLATE IN CONVEYOR
--            4TH ADDITIONAL PARAMETER WILL BE TIME ALLOWED FOR CHIPS TO
--            ACCUMULATE IN BUCKET
--        7 = EXECUTE PLATE AGV TASK
--        8 = EXECUTE MAG AGV TASK
--        9 = EXECUTE CHIP AGV TASK
--       10 = EXECUTE PLATE AGV COMPLETE
--       11 = EXECUTE MAG AGV COMPLETE
--       12 = EXECUTE CHIP AGV COMPLETE
--       13 = PART PROG REQUEST
--            A STR6 WILL ALSO BE SENT TO IDENTIFY THE PROGRAM THE
--            2000 IS LOOKING FOR
--       14 = CONFIG FILE REQ
--       15 = PLATE FILE REQUEST
--       16 = UPLOAD CONFIG FILE REQUEST
--       17 = UPLOAD PLATE FILE REQUEST
--            A SECOND INTEGER WILL BE SENT TO IDENTIFY THE FILE
--            IF 2ND INTEGER = 1 UPLOAD PUTRAN.MCL ONLY
--                           = 2 UPLOAD DETRAN.MCL ONLY
--                           = 3 UPLOAD Q1TRAN.MC  ONLY
--                           = 4 UPLOAD MATRAN.MCL
--                           = 5 UPLOAD AND ERASE PUTRAN.MCL
```

```
--        18 = HOLD UP DELIVERY OF PART
--        19 = NO TOOLS FOR NEXT PART
--        20 = EXCHANGE TOOL MAGAZINE
--        21 = EXCHANGE CHIP CONTAINER
--             A 2ND INTEGER WILL BE PASSED TO IDENTIFY THE MATERIAL
--             THAT IS IN THE OLD CHIP BUCKET.
--             A 3RD INTEGER WILL BE PASSED TO IDENTIFY THE MATERIAL
--             THAT WILL BE PUT IN THE NEW CHIP BUCKET.
--             4TH ADDITIONAL PARAMETER WILL BE TIME ALLOWED FOR CHIPS TO
--             ACCUMLATE IN CONVEYOR
--             5TH ADDITIONAL PARAMETER WILL BE TIME ALLOWED FOR CHIPS TO
--             ACCUMULATE IN BUCKET
--
--        22 = ABORT PLATE AGV ROUTINE
--             A 2ND INTEGER WILL BE PASSED TO INDICATE WHETHER THE AGV
--             ROUTINE IS TO BE CANCELLED OR REPEATED
--        23 = ABORT MAG AGV ROUTINE
--             A 2ND INTEGER WILL BE PASSED TO INDICATE WHETHER THE AGV
--             ROUTINE IS TO BE CANCELLED OR REPEATED
--        24 = ABORT CHIPS AGV ROUTINE
--             A 2ND INTEGER WILL BE PASSED TO INDICATE WHETHER THE AGV
--             ROUTINE IS TO BE CANCELLED OR REPEATED
mc2000_req_data  : CONSTANT integer := 4002;
-- 2000 WILL RETURN ONE OR TWO INTEGER PARAMETER IDENTIFYING WHAT DATA
-- THE 2000 IS REQUESTING AS FOLLOWS:
--         1 = VERIFICATION REQUEST
--             HOST WILL UPLOAD VERIFY FILE. WHEN HOST HAS EDITED FILE
--             HOST WILL RETURN FILE AND NOTIFY 2000 WITH A 3005 COMMAND
--         2 = PART SCHEDULE REQUEST. THE 2000 WILL LOAD ONE ADDITIONAL
--             PARAMETER TO IDENTIFY NUM OF MINUTES.
--             3003 RETURNS 1 IF YES
--                          0 IF NO
--         3 = OUT OF TOOLS CONDITION. HOST WILL RETURN WHETHER TO EXCHANGE
--             THE MAGAZINE OR REFURBISH LOCALLY. HOST RETURNS:
--             3006 TO EXCHANGE MAGAZINE
--             3018 TO REFURBISH LOCALLY
transfer_status  : CONSTANT integer := 4003;
-- 2000 WILL RETURN ONE INTEGER TO IDENTIFY WHICH TRANSFER HAS TAKEN
-- PLACE. THE VALUE OF THE INTEGER IS AS FOLLOWS:
--         1 = TRANSFER STATION TO MACHINE
--         2 = TRANSFER STATION TO QUE #1 STATION
--         3 = QUE #1 STATION TO MACHINE
--         4 = MACHINE TO TRANSFER STATION
--         5 = TRANSFER STATION TO QUE #2 STATION
--         6 = QUE #2 STATION TO MACHINE
time_status      : CONSTANT integer := 4004;
-- 2000 WILL RETURN THREE INTEGERS TO INFORM THE HOST OF THE CIM TIME
-- STATUS.
--         1ST INTEGER = CIM TIME ACTIVE IF ONE
--         2ND INTEGER = LOST TIME ACTIVE IF ONE
--         3RD INTEGER = VARIANCE TIME ACTIVE
END dncdec;

WITH wndone;   USE wndone;
WITH oemdec;   USE oemdec;

PACKAGE dncmcl IS

dncmcl_master    : auto_masters := auto_run;
agv_position     : integer := 0;
del_sched_time   : integer := 0;
del_time         : integer := 0;
file_integer     : integer := 0;
hours_int        : integer := 0;
material_type    : integer := 0;
pickup_time      : integer := 0;
sched_ret        : integer := 0;
select_material  : integer := 0;
trans_action     : integer := 0;
convyr_off_lmt   : float := 0.0;
chip_tim_lmt     : float := 0.0;
```

```
agv_available      : boolean := true;
cell_is_up         : boolean := false;
chg_chip_cont      : boolean := false;
config_file_rec    : boolean := false;
del_answer         : boolean := false;
plate_file_rec     : boolean := false;
part_prog_rec      : boolean := false;
prog_chk_cmplt     : boolean := false;
refurbish_mag      : boolean := false;
verify_returned    : boolean := false;
cell_pswrd         : str6;
mcl_pswrd          : str6;

PROCEDURE dncmcl_main;

END dncmcl;

WITH wndone;   USE wndone;
WITH oemdec;   USE oemdec

PACKAGE dtmgmt IS

dtmgmt_master      : auto_masters := auto_run;

TYPE dtmgmt_states IS (dtmgmt_standby, record_st, dt_insert, act_probe,
                       fnl_calc, write_st, report_st, check_oot);
dtmgmt_state       : dtmgmt_states := dtmgmt_standby;

TYPE changes IS (wait, rf, zon, cl);
change             : changes := wait;

TYPE querys IS (prompt_standby, prompt_start);
query              : querys := prompt_standby;
scroll_it          : integer := 0;

sn_str_arr         : array (1..5) of string(1..8);
dm_tbl_ptr         : integer := 1;
cc_int             : integer := 0;
dtmgmt_fault       : integer := 0;
sn_num_num         : integer := 1;
err_flag           : boolean := false;
wp_disp            : array (1..5) of boolean;
disp_code          : string(1..3);

PROCEDURE dtmgmt_clear;
PROCEDURE dtmgmt_cancel;
PROCEDURE dtmgmt_main;

END dtmgmt;

PACKAGE eopgm IS

TYPE eopgm_states IS (eopgm_standby, do_chips, check_abort, prgm_abort_rwd);
eopgm_state        : eopgm_states := eopgm_standby;

TYPE abort_states IS (abort_standby, abort_help, start_abort,
                      save_the_data, ask_reason, record_reason,
                      start_unload, finish_unload, wait_for_m30);
abort_state        : abort_states := abort_standby;

abortt             : boolean := false;

PROCEDURE eopgm_init;
PROCEDURE eopgm_cancel;
PROCEDURE eopgm_main;

END eopgm;
```

```
WITH wndone;   USE wndone;
WITH mcldat;   USE mcldat;
WITH wndfms;   USE wndfms;

PACKAGE fmsgrp IS

PROCEDURE critical_fms_msg(active : IN boolean;
                           msg_num : IN integer);
PROCEDURE mcl_disp_chng;
PROCEDURE mcl_disp_update;

END fmsgrp;

WITH wndone;   USE wndone;
WITH oemdec;   USE oemdec;

PACKAGE lur IS

lur_master        : auto_masters := auto_run;

TYPE check_vers IS (ver_cmplt, ver_1, ver_1a, ver_5, ver_5a, ver_6, ver_7,
                    over_flow);
check_ver         : check_vers := ver_cmplt;

TYPE unld_states IS (unld_standby, unld_start, unld_cmpr, unld_wait,
                     unld_cmplt, unld_all_done);
unld_state        : unld_states := unld_standby;

TYPE ld_states IS (ld_standby, ld_tq, ld_tq_cmplt, ld_chuck, ld_chuck_1a,
                   ld_chuck_1b, ld_wait, ld_chuck_cmplt,  ren);

ld_state          : ld_states := ld_standby;

TYPE mdi_states IS (standby, mdi_wait, tm, qm, mt, nw_file);
mdi_state         : mdi_states := standby;

lur_fault         : integer := 0;
ser_ctr           : integer := 0;
file_proc         : integer := 0;
disposition_flag  : boolean := false;
mcl_ld_tq         : boolean := false;
m_ldtr_init       : boolean := false;
rember_deliv      : boolean := false;
ver_str           : ARRAY (1..6) OF string(1..9);

PROCEDURE lur_cancel;
PROCEDURE lur_main;
FUNCTION inspection_res RETURN boolean;

END lur;

WITH wndone;   USE wndone;
WITH oemdec;   USE oemdec;

PACKAGE menu IS

menu_master       : auto_masters := auto_init;

TYPE menu_states IS (menu_standby, display, input_mode, status, tst_host,
                     reset_ps, ref_wait);
menu_state        : menu_states := menu_standby;

TYPE process_ps IS (upload, pp_dnc, datime, wait_1, wait_2);
prgm_updt         : process_ps := upload;

ready_auto        : CONSTANT integer := 1;                    --WS STATUS
ready_manual      : CONSTANT integer := 2;                    --   "
not_available     : CONSTANT integer := 3;                    --   "
off_line          : CONSTANT integer := 4;                    --   "
cursor_line       : integer := off_line;          --MENU CURSOR POSITION
dcf_index         : integer;                --OEMDSP CURSOR INDEX VARIABLE
menu_fault        : integer := 0;
```

```
sel_curs_index      : integer := 110;                       --OEM PAGE SELECTION
ws_status           : integer := off_line;                  --CURRENT WS STATUS

eopgm_cmplt         : boolean := false;                     --EOP COMPLETION FLAG
erase_inquire       : boolean := false;        --FLAG TO ALLOW ERASE OF INQ PROMPT
hours_set           : boolean := false;               --HOURS HAVE BEEN SET FLAG
mdi_auto_mode       : boolean := false;
prog_was_running    : boolean := false;
restart_prog        : boolean := false;
restrt_menu         : boolean := false;              --FLAG TO START MENU AGAIN
select_flag         : boolean := false;            --WS STATUS HAS BEEN CHANGED
tool_mag_deliver    : boolean := false;
wait_for_status     : boolean := false;


ws_num_asc          : string(1..7);                          --WORKSTATION ID
hours               : string(1..2);                     --HOURS NOT AVAILABLE

PROCEDURE menu_init;
PROCEDURE menu_cancel;
PROCEDURE menu_main;

END menu;
WITH wndone;   USE wndone;
WITH oemdec;   USE oemdec;

PACKAGE ptchk IS

ptchk_master        : auto_masters := auto_run;

TYPE part_checks IS (part_standby, part_start, part_mach, part_queue,
                     part_tran, part_cmplt, part_sn, part_sn_a, part_prog,
                     part_prog_a, part_select, select_host, prog_status,
                     prog_status_a, rework, rework_check,
                     rework_cmplt);
part_check          : part_checks := part_standby;

prog_try_out        : boolean := false;
id_sel_cmplt        : boolean := false;
man_bl_flag         : boolean := false;
ptchk_fault         : integer := 0;
pt_sn_ctr           : integer := 1;
prog_id             : str6;

PROCEDURE ptchk_clear;
PROCEDURE ptchk_cancel;
PROCEDURE ptchk_main;

END ptchk;

WITH wndone;   USE wndone;

PACKAGE qcont IS

TYPE qc_states IS (qc_standby, qc_start, qc_start_a, qc_calibration,
                   qc_performance, qc_verify);
qc_state            : qc_states := qc_standby;

TYPE hold_checks IS (check_msg, check_1, check_1a, check_2, check_4,
                     check_end);
hold_check          : hold_checks := check_1;

TYPE disp_tasks IS (task_standby, task_1, task_2, task_3, task_4);
disp_task           : disp_tasks := task_standby;

TYPE ver_conts IS (cont_1, cont_2, cont_3, cont_4, cont_5, cont_6,
                   cont_7, cont_8, cont_9, cont_10, cont_11, cont_12,
                   cont_13, cont_14, cont_15, cont_16);
ver_cont            : ver_conts := cont_1;
```

```
TYPE inq_disps IS (inq_1, inq_1a, inq_2, inq_3, inq_3a, inq_4);
inq_disp          : inq_disps := inq_1;

qc_msg            : ARRAY (1..4) OF boolean;
ram_it_thru       : boolean := false;
verf_hr           : integer := 0;
qcont_ctr         : integer := 1;
pac               : integer := 0;
paq               : integer := 0;
pr_lmt            : integer := 0;
stat_cnt          : integer := 0;

PROCEDURE qcont_cancel;
PROCEDURE qcont_main;                               --PART DISPOSITION TASK
PROCEDURE part_disp;
FUNCTION put_wp_status(vfyn      : in integer;
                       file_act  : in integer;
                       fill_all  : in boolean) RETURN boolean;


END qcont;

WITH wndone;   USE wndone;
WITH oemdec;   USE oemdec;

PACKAGE tcntrl IS

tcntrl_master     : auto_masters := auto_run;
TYPE unloads IS (unload_0, unload_1, unload_2);
unload            : unloads := unload_0;

TYPE tcntrl_states IS (tcntrl_setup, save_mlife, check_tools, check_life,
                       empty_turret, new_mag, old_mag, ref_magazine,
                       count_tools, no_bar_read, no_tools, skip_program);
tcntrl_state      : tcntrl_states := tcntrl_setup;
TYPE refs_b_axis IS (state_0, state_1, state_2);
ref_b_axis        : refs_b_axis := state_0;

par_val           : ARRAY (0..1) OF float;

block_dec_cancel  : boolean := false;
check_face        : boolean := false;
config_instald    : boolean;
default_plo1      : boolean;
do_the_count      : boolean := false;
file_instald      : boolean;
install_magazine  : boolean := false;
looking           : boolean := false;
look_in_file      : boolean := false;
look_in_turret    : boolean := false;
m112_was_run      : boolean := false;
new_mag_arrived   : boolean := false;
ok_to_send        : boolean := false;
out_of_tools      : boolean := false;
plo_1             : boolean;
plo_2             : boolean;
probe_active      : boolean := false;
request_pickup    : boolean := false;
save_auto_mode    : boolean := false;
save_m06          : boolean := false;
send_for_file     : boolean := false;
sent_for_mag      : boolean := false;
standby_tool      : boolean := false;
stop_looking      : boolean := false;
tool_code_read    : boolean := false;
wait_a_while      : boolean := false;
wait_for_barcdr   : boolean := false;
wait_for_file     : boolean := false;

active_face       : integer := 0;
active_offst      : integer := 0;
ito_id            : integer := 0;
loc_id            : integer := 0;
```

```
loc_no            : integer := 0;
old_t_type        : integer := 0;
prev_t_type       : integer := 0;
r_index           : integer := 0;
save_index        : integer := 0;
standby_req       :   teger := 0;
tcntrl_fault      : integer := 0;
tcntrl_req        : integer := 0;
tov_size          : integer := 0;
type_number       : integer := 0;

life_to_dec       : float := 0.0;
save_x_psn        : float := 0.0;
save_z_psn        : float := 0.0;

n_code            : string(1..12);

PROCEDURE t_setup;
PROCEDURE tcntrl_init;
PROCEDURE tcntrl_cancel;
PROCEDURE tcntrl_main;
PROCEDURE updte_life;

END tcntrl;

-- *************************************************************
-- *                                                           *
-- * SOFTWARE BY DAN GARAFOLA (A&ES) FOR                       *
-- * AIRCRAFT ENGINE BUSINESS GROUP / GENERAL ELECTRIC COMPANY *
-- *                                                           *
-- *                                                           *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM, THE RELATED *
-- * MATERIAL, AND THE INFORMATION CONTAINED HEREIN, SHALL NOT *
-- * BE DISCLOSED TO OTHERS WITHOUT WRITTEN PERMISSION OF G.E., *
-- * AND SHALL NOT BE DUPLICATED OR USED EXCEPT IN ACCORDANCE  *
-- * WITH THE LIMITED CONDITIONS UNDER WHICH IT WAS PROVIDED BY *
-- * G.E.                                                      *
-- *                                                           *
-- * PROPERTY OF THE AIRCRAFT ENGINE BUSINESS GROUP OF THE     *
-- * GENERAL ELECTRIC COMPANY.                                 *
-- *                                                           *
-- *************************************************************

WITH wndone;   USE wndone;
WITH oemdec;   USE oemdec;

PACKAGE xfer IS

xfer_master        : auto_masters := auto_init;
TYPE xfer_states IS (xfer_standby, xfer_start, part_arrived, ask_to_unload,
                     part_is_gone);
xfer_state         : xfer_states := xfer_standby;

TYPE ptmgmt_states IS (mgmt_standby, mgmt_unld, mgmt_ld,  mgmt_cmplt);
ptmgmt_state       : ptmgmt_states := mgmt_standby;

xfer_fault         : integer := 0;
del_wait           : boolean := false;
no_go_off_line     : boolean := false;
standby_part       : boolean := false;
unld_cmd           : boolean := false;
waiting_cell       : boolean := false;

PROCEDURE xfer_clear;
PROCEDURE xfer_cancel;
PROCEDURE xfer_main;
PROCEDURE ptmgmt_main;
FUNCTION call_agv(oper_exp : IN integer) RETURN boolean;

END xfer;
```

```
-- ****************************************************************
-- *                                                              *
-- * SOFTWARE BY BRYAN IRVING (A&ES) FOR                          *
-- * AIRCRAFT ENGINE BUSINESS GROUP / GENERAL ELECTRIC COMPANY    *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- * PROPERTY OF THE AIRCRAFT ENGINE BUSINESS GROUP OF THE        *
-- * GENERAL ELECTRIC COMPANY.                                    *
-- ****************************************************************

-- ****************************************************************
-- *                        A G V MONITOR                         *
-- *                                                              *
-- *   THIS PACKAGE WILL BE USED TO CONTROL THE COMMUNICATIONS    *
-- * WITH THE HOST FOR CONTROL OF THE AGV   IT IS NOT USED TO     *
-- * INITIATE A CALL FOR AGV SERVICE , THAT WILL BE DONE BY       *
-- * EACH AUTO MCL PACKAGE AS NECESSARY. THIS PACKAGE IS USED TO*
-- * ALLOW CONTROL OF THE AGV FROM THE READY STATION TO THE       *
-- * READY COMPLETE STATION. THE AGVMON PACKAGE STATE WILL BE     *
-- * SET BY THE DNCMCL PACKAGE.  IT WILL THEN SEND A COMMAND TO   *
-- * THE HOST AND WAIT FOR ACKNOWLEDGE.  WHEN RECEIVED IT WILL    *
-- * GO TO STANDBY STATE AND WAIT FOR THE NEXT STATE TO BE SET    *
-- * BY THE HOST/DNC PKG.                                         *
-- *    ONCE ANY AGV ARRIVES AT THE READY STATION, A TIMER IS     *
-- * STARTED AND THE HOST/AGV MUST COMPLETE THE SERVICE BEFORE    *
-- * THE TIMER TIMES OUT OR A FAULT IS GENERATED AND PROGRAM      *
-- * SEXECUTION IS HALTED AND A MESSAGE DISPLAYED.                *
-- ****************************************************************

WITH wndone;   USE wndone;
WITH mcldat;   USE mcldat;
WITH mcllib;   USE mcllib;
WITH wndtwo;   USE wndtwo;
WITH atmlib;   USE atmlib;
WITH rel5;     USE rel5;
WITH rel6;     USE rel6;
WITH rel7;     USE rel7;
WITH oemdec;   USE oemdec;
WITH bubdec;   USE bubdec;
WITH dncdec;   USE dncdec;
WITH dncmcl;   USE dncmcl;
WITH menu;     USE menu;
WITH tcntrl;   USE tcntrl;
WITH xfer;     USE xfer;
WITH oemmst;   USE oemmst;
WITH mclax;    USE mclax;
WITH tool;     USE tool;
WITH qcont;    USE qcont;
WITH clock;    USE clock;
WITH chpmgt;   USE chpmgt;
WITH convor;   USE convor;

PACKAGE BODY agvmon IS

TYPE fork_times IS (fork_standby, fork_check_time);
fork_timer        : fork_times := fork_standby;
TYPE plate_times IS (plt_standby, plt_check_time);
plate_timer       : plate_times := plt_standby;
cmd_req           : integer;
ans_ready         : boolean := false;
permit_msg        : boolean := false;
tool_agv          : boolean := false;
chip_agv          : boolean := false;
ans_lgt           : integer := 0;
```

```
fork_time           : integer := 0;
del_rdy             : integer := 0;
plate_time          : integer := 0;
recover             : integer := 0;
---------------------------------------------------------------------------
FUNCTION agvmon_ok RETURN boolean IS

agvmon_status : boolean;

BEGIN

  agvmon_status := true;
  IF agv_fault /= 0 AND menu_start THEN
    agvmon_status := false;
    kill_msg(6876);
    IF init_fault THEN
      cnt_dwn;
    END IF;
  END IF;

RETURN agvmon_status;

END agvmon_ok;
---------------------------------------------------------------------------
PROCEDURE agvmon_init IS

BEGIN

  agv_time := msd_int_table(163);
  IF pl_agv_counter > 0 THEN
    agv_fault := 6463;
    init_fault := true;
  END IF;
  IF fork_agv_counter > 0 AND NOT init_fault THEN
    agv_fault := 6473;
    init_fault := true;
    IF fork_agv_counter > 5 THEN
      agv_inprgs := true;
    END IF;
  END IF;
  IF init_fault THEN
    put_msg(6876, 9, 6);
    store_msg(6876);
  END IF;

END agvmon_init;
---------------------------------------------------------------------------
PROCEDURE agvmon_main IS

BEGIN

  CASE agvmon_master IS
    WHEN auto_init =>
      agvmon_master := auto_run;

    WHEN auto_run =>
      IF NOT plate_permit AND NOT permit_msg THEN
        put_msg(6890, 6, 6);
        permit_msg := true;
      ELSIF plate_permit AND permit_msg THEN

  kill_msg(6890);
  permit_msg := false;
END IF;
IF tool_permit_msg AND NOT tool_agv THEN
  put_msg(6214, 6, 6);
  tool_agv := true;
ELSIF NOT tool_permit_msg AND tool_agv THEN
  kill_msg(6214);
  tool_agv := false;
END IF;
```

```
IF chip_permit_msg AND NOT chip_agv THEN
  put_msg(6137, 6, 6);
  chip_agv := true;
ELSIF NOT chip_permit_msg AND chip_agv THEN
  kill_msg(6137);
  chip_agv := false;
END IF;
IF agvmon_ok THEN
 -------------------------------------------------------------
  CASE fork_timer IS
    WHEN fork_standby =>
      NULL;

    WHEN fork_check_time =>
      IF NOT timer_running(mag_agv_tmr) THEN
        IF fork_time = agv_time THEN
          agv_fault := 6473;
          fork_timer := fork_standby;
        ELSE
          fork_time := fork_time + 1;
          start_timer(mag_agv_tmr, 6000);
        END IF;
      END IF;
  END CASE;
 -------------------------------------------------------------
  CASE plate_timer IS
    WHEN plt_standby =>
      NULL;

    WHEN plt_check_time =>
      IF NOT timer_running(plate_agv_tmr) THEN
        IF plate_time = agv_time THEN
          agv_fault := 6463;
          plate_timer := plt_standby;
        ELSE
          plate_time := plate_time + 1;
          start_timer(plate_agv_tmr, 6000);
        END IF;
      END IF;
  END CASE;
---------------------------------------------------------------------
  CASE agv_status IS
    WHEN agv_stdby =>                                          --STATE 0
      IF init_fault AND agv_fault = 0 THEN
        IF fork_agv_counter > 0 THEN
          agv_fault := 6473;
        ELSE
          init_fault := false;
        END IF;
      ELSIF init_fault AND (rrise(offset_button_1) OR
            rrise(sso_decr)) THEN
        agv_fault := 0;
        init_fault := false;
        kill_msg(6876);
        cnt_dwn;
        fork_agv_counter := 0;
    pl_agv_counter := 0;
    put_save_int(0, 5);
    put_save_int(0, 6);
  END IF;

WHEN plate_pu =>                                           --STATE 1
  pl_agv_counter := 1;
  put_save_int(pl_agv_counter, 5);
  IF pkup_exp OR init_fault THEN             --CONDITIONS FOR PICKUP
    IF plate_tra THEN
      IF xgr_park AND ld_unld_home THEN
        start_timer(plate_agv_tmr, 6000);
        plate_time := 0;
        plate_timer := plt_check_time;
        agv_status := cmd_fost;
```

```
        cmd_req := 7;
        plate_permit := false;
      END IF;
    ELSE
      agv_fault := 6461;       --PLATE CONDITIONS INHIB AGV SERVC
    END IF;
  ELSE
    agv_fault := 6464;                    --UNEXPECTED AGV SERVICE
  END IF;

WHEN plate_deliv =>                                    --STATE 2
  pl_agv_counter := 2;
  put_save_int(pl_agv_counter, 5);
  CASE del_rdy IS                      --CONDITIONS FOR DELIVERY
    WHEN 0 =>
      IF deliv_exp OR init_fault THEN
        IF NOT plate_tra AND ldin(plate_present_t) THEN
          IF xgr_park AND ld_unld_home THEN
            del_rdy := 1;
            plate_permit := false;
            delay_plate_tra := true;
          END IF;
        ELSE
          agv_fault := 6461;   --PLATE CONDITIONS INHIB AGV SERVC
        END IF;
      ELSE
        agv_fault := 6464;                --UNEXPECTED AGV SERVICE
      END IF;

    WHEN 1 =>
      IF NOT plate_file_rec THEN
        IF command_request = 0 THEN
          command_request := 15;
          dnc_bool(mc2000_cmd_req) := true;
          del_rdy := 2;
        END IF;
      ELSE
        del_rdy := 2;
      END IF;

    WHEN 2 =>
      IF plate_file_rec THEN
        start_timer(plate_agv_tmr, 6000);
        plate_time := 0;
        plate_timer := plt_check_time;
        agv_status := cmd_host;         --CONDITIONS FOR DELIVERY
        del_rdy := 0;
        cmd_req := 7;
        plate_file_rec := false;
      END IF;

    WHEN OTHERS =>
      NULL;
  END CASE;

WHEN mag_pu =>                                         --STATE 3
  fork_agv_counter := 3;
  put_save_int(fork_agv_counter, 6);
  IF mag_pu_permit OR init_fault THEN
    IF NOT ldout(tdrum_unclamp) THEN
      ldout(tdrum_unclamp) := true;
      b_offset_done := false;
      start_timer(mag_agv_tmr, 800);
    END IF;
    IF ldin(tdrum_unclamped) AND NOT ldin(tdrum_clamped) AND
       ldin(tdrum_seated1) THEN
      start_timer(mag_agv_tmr, 6000);
      fork_time := 0;
      fork_timer := fork_check_time;
      agv_status := cmd_host;
      cmd_req := 8;
```

```
      tool_permit_msg := true;
    ELSIF NOT timer_running(mag_agv_tmr) THEN
      agv_fault := 6471;      --TOOL DRUM CONDTNS INHIB AGV SERVC
    END IF;
  ELSE
    agv_fault := 6474;                      --UNEXPECTED AGV SERVICE
  END IF;

WHEN mag_deliv =>                                        --STATE 4
  fork_agv_counter := 4;
  put_save_int(fork_agv_counter, 6);
  new_mag_arrived := true;
  IF mag_del_permit OR init_fault THEN
    IF check_config THEN
      IF NOT ldout(tdrum_unclamp) THEN
        ldout(tdrum_unclamp) := true;
        b_offset_done := false;
        start_timer(mag_agv_tmr, 800);
      END IF;
      IF NOT ldin(tdrum_seated1) AND NOT ldin(tdrum_seated2) AND
         NOT ldin(tdrum_seated3) AND ldin(tdrum_unclamped) AND
         NOT ldin(tdrum_clamped) THEN
        start_timer(mag_agv_tmr, 6000);
        fork_time := 0;
        mag_del_permit := false;
        fork_timer := fork_check_time;
        agv_status := cmd_host;
        cmd_req := 8;
        tool_permit_msg := true;
      ELSIF NOT timer_running(mag_agv_tmr) THEN
        agv_fault := 6471;    --TOOL DRUM CONDTNS INHIB AGV SERVC
      END IF;
    END IF;
  ELSE
    agv_fault := 6474;                      --UNEXPECTED AGV SERVICE
  END IF;

WHEN chp_pu =>                                           --STATE 5
  fork_agv_counter := 5;
  put_save_int(fork_agv_counter, 6);
  IF agv_inprgs OR init_fault THEN
    IF ldin(chip_cont_inpos) THEN
      IF NOT cc_fwd_flg THEN
        start_timer(mag_agv_tmr, 6000);
        fork_timer := fork_check_time;
        fork_time := 0;
        agv_status := cmd_host;
        cmd_req := 9;
        chip_permit_msg := true;
      END IF;
    ELSE
      agv_fault := 6469;      --CHIP CNTR CONDTNS INHIB AGV SERVC
    END IF;
  ELSE
    agv_fault := 6474;                      --UNEXPECTED AGV SERVICE
  END IF;

WHEN chp_deliv =>                                        --STATE 6
  fork_agv_counter := 6;
  put_save_int(fork_agv_counter, 6);
  IF agv_inprgs OR init_fault THEN
    IF NOT ldin(chip_cont_inpos) THEN
      start_timer(mag_agv_tmr, 6000);
      fork_time := 0;
      fork_timer := fork_check_time;
      agv_status := cmd_host;
      cmd_req := 9;
      chip_permit_msg := true;
    ELSE
```

```
      agv_fault := 6469;      --CHIP CNTR CONDTNS INHIB AGV SERVC
    END IF;
  ELSE
    agv_fault := 6474;                     --UNEXPECTED AGV SERVICE
  END IF;

WHEN plt_cmplt =>                                      --STATE 7
  plate_timer := plt_standby;
  IF ((pl_agv_counter = 1) AND NOT plate_tra AND
      ldin(plate_present_t)) OR
     ((pl_agv_counter = 2) AND ldin(plate_seated_tra)) THEN   --SU

    IF (pl_agv_counter = 2) AND ldin(plate_seated_tra) THEN
      plate_permit := true;
      delay_plate_tra := false;
    END IF;
    pl_agv_counter := 0;
    agv_status := cmd_host;
    cmd_req := 10;
  ELSE
    agv_fault := 6462;   --PLATE CONDTNS INHIB AGV SERVC COMPLETE
  END IF;

WHEN mag_cmplt =>                                      --STATE 8
  fork_timer := fork_standby;
  IF fork_agv_counter = 3 THEN                  --MAGAZINE PICKUP
    IF NOT ldin(tdrum_seated1) AND NOT ldin(tdrum_seated2) AND
       NOT ldin(tdrum_seated3) THEN
      IF standby_req = 3 THEN
        standby_req := 0;
        put_save_int(standby_req, 4);
      ELSIF standby_req = 20 THEN
        standby_req := 4;
        put_save_int(standby_req, 4);
      END IF;
      mag_pu_permit := false;
      agv_status := cmd_host;
      fork_agv_counter := 0;
      cmd_req := 11;
      k_msg(6825);
      tool_permit_msg := false;
    ELSE
      agv_fault := 6472;      --TOOL DRUM CONDTNS INHIB AGV SF

    END IF;
  ELSE                                        --MAGAZINE DELIVERY
    IF ldin(tdrum_seated1) AND ldin(tdrum_seated2) AND
       ldin(tdrum_seated3) THEN
      ldout(tdrum_unclamp) := false;
      standby_req := 0;
      put_save_int(standby_req, 4);
      new_mag_arrived := false;
      check_config := false;
      install_magazine := true;
      out_of_tools := false;
      agv_status := cmd_host;
      fork_agv_counter := 0;
      cmd_req := 11;
      k_msg(6826);
      tool_permit_msg := false;
    ELSE
      agv_fault := 6472; --TOOL DRUM CONDTNS INHIB AGV SERVC CMPLT
    END IF;
  END IF;

WHEN chp_cmplt =>                                      --STATE 9
  fork_timer := fork_standby;
  IF ((fork_agv_counter = 5) AND NOT ldin(chip_cont_inpos)) OR
     (ldin(chip_cont_inpos) AND (fork_agv_counter = 6)) THEN
    agv_status := cmd_host;
    fork_agv_counter := 0;
    agv_rdy_cmplt := true;
```

```
          cmd_req := 12;
          chip_permit_msg := false;
        ELSE
          agv_fault := 6470;        --PICK UP NOT COMPLETED SUCCESSFULLY
        END IF;

      WHEN cmd_host =>                                           --STATE 10
        IF command_request = 0 THEN
          command_request := cmd_req;
          dnc_bool(mc2000_cmd_req) := true;
          cmd_req := 0;
          put_save_int(pl_agv_counter, 5);
          put_save_int(fork_agv_counter, 6);
          agv_status := 0;
        END IF;

      WHEN OTHERS =>
        agv_status := agv_stdby;
    END CASE;
  ELSE                                                    -- NOT AGVMON_OK
    put_msg(agv_fault, 9, 6);
    IF agv_fault > 6468 AND agv_fault /= 6877 THEN
      flash(sso_decr_light);
    END IF;
    agvmon_master := auto_error;
  END IF;

WHEN auto_error =>
  IF agv_fault = 6877 THEN
    IF active_disp_page = 60 THEN
      disp_sel_lock;
      inq_msg :=
    "1)PROJECT PLATE 2)MAGAZINE 3)CHIPS
      ask_oper(45, 23, 1, ans_lgt, ans_ready);
      IF ans_ready AND ask = ask_1 THEN
        IF ans_lgt = 1 THEN
          ans_ready := false;
          c_to_i(inq_msg, 1, 1, mdi_selection);
          agvmon_master := auto_recovery;
        ELSE
          ans_ready := false;
        END IF;
      END IF;
    END IF;
  ELSIF agv_fault < 6469 THEN
    IF cim_time_on  AND NOT cim_fault(14) AND
       (automcode(ld_flag) OR unld_cmd) THEN
      store_msg(agv_fault);
      cim_fault(14) := true;
    END IF;
    rdout(offset_light_1) := rdout(41);
    IF rdin(offset_button_1) THEN
      disp_page_select(60);
      agvmon_master := auto_recovery;
    END IF;
  ELSE
    IF rdin(sso_decr) THEN
      disp_page_select(60);
      unflash(sso_decr_light);
      rdout(sso_decr_light) := false;
      agvmon_master := auto_recovery;
    END IF;
  END IF;

 WHEN auto_recovery =>
   rdout(offset_light_1) := false;
   CASE recover IS                                     --RECOVER STATE 0
     WHEN 0 =>
       IF active_disp_page = 60 THEN
         disp_sel_lock;
         inq_msg :=
```

```
 "1)OK TO ENTER 2)OK TO LEAVE 3)ABORT-CANCEL 4)ABORT-RESEND
    ask_oper(60, 23, 1, ans_lgt, ans_ready);
    IF ans_ready AND ask = ask_1 THEN
      IF ans_lgt = 1 THEN
        ans_ready := false;
        recover := 1;
      ELSE
        ans_ready := false;
      END IF;
    END IF;
  END IF;

WHEN 1 =>                                              --RECOVER STATE 1
  IF agv_fault = 6877 THEN
    IF inq_msg(1) = '1' THEN
      cmd_req := 6 + mdi_selection;
      IF cmd_req = 8 THEN
        ldout(tdrum_unclamp) := true;
        b_offset_done := false;
      END IF;
    ELSIF inq_msg(1) = '2' THEN
      cmd_req := 9 + mdi_selection;
    ELSIF (inq_msg(1) = '3') OR (inq_msg(1) = '4') THEN     --ABORT
      cmd_req := 21 + mdi_selection;
    ELSE
      recover := 0;
    END IF;
  ELSIF inq_msg(1) = '1' AND agv_fault /= 6464 AND
        agv_fault /= 6474 THEN                           --RE-EXECUTE
    IF agv_fault < 6469 THEN
      agv_status := pl_agv_counter;
    ELSE

    agv_status := fork_agv_counter;
  END IF;
  recover := 2;
ELSIF inq_msg(1) = '2' AND agv_fault /= 6464 AND
      agv_fault /= 6474 THEN          --TASK IS DONE-SEND COMPLETE
  IF agv_fault < 6469 THEN
    agv_status := 7;
  ELSIF fork_agv_counter < 5 THEN
    agv_status := 8;
  ELSE
    agv_s · us := 9;
  END IF;
  recover := 2;
ELSIF (inq_msg(1) = '3') OR (inq_msg(1) = '4') THEN         --ABORT
  fork_agv_counter := 0;
  pl_agv_counter := 0;
  CASE agv_fault IS
    WHEN 6461 | 6462 | 6463 | 6464 =>
      plate_timer := plt_standby;
      delay_plate_tra := false;
      plate_permit := true;
      cmd_req := 22;

    WHEN 6469 | 6470 | 6471 | 6472 | 6473 | 6474 =>
      IF fork_agv_counter < 5 THEN
        fork_timer := fork_standby;
        new_mag_arrived := false;
        check_config := false;
        mag_pu_permit := false;
        cmd_req := 23;
      ELSE
        cmd_req := 24;               --CANCEL EXPECTED REQUEST CMD
      END IF;
    WHEN OTHERS =>
      NULL;
  END CASE;
ELSE
  recover := 0;
```

```
        END IF;
        IF cmd_req /= 0 THEN
          agv_status := cmd_host;
          IF inq_msg(1) = '3' THEN
            cancel_agv := 1;                              --CANCEL SERVICE
          ELSE
            cancel_agv := 0;                    --RESEND AGV WITH NEW PART
          END IF;
          recover := 2;
        END IF;

      WHEN 2 =>                                          --RECOVER STATE 2
        agvmon_master := auto_run;
        disp_sel_unlock;
        kill_msg(agv_fault);
        agv_fault := 0;
        recover := 0;
        IF cim_fault(14) THEN
          cnt_dwn;
          cim_fault(14) := false;
        END IF;

      WHEN OTHERS =>
        NULL;
    END CASE;
  END CASE;

END agvmon_main;

   ----------------------------------------------------------------------
   END agvmon;


   -- ******************************************************************
   -- *                                                                *
   -- * SOFTWARE BY PAUL COLANANNI (A&ES) FOR                          *
   -- * AIRCRAFT ENGINE BUSINESS GROUP / GENERAL ELECTRIC COMPANY      *
   -- *                                                                *
   -- *                                                                *
   -- * THIS PROGRAM AND RELATED MATERIAL ARE THE PROPERTY OF THE      *
   -- * GENERAL ELECTRIC CO. (G.E.) AND CONTAINS CONFIDENTIAL AND      *
   -- * PROPRIETARY INFORMATION OF G.E. THIS PROGRAM, THE RELATED      *
   -- * MATERIAL, AND THE INFORMATION CONTAINED HEREIN, SHALL NOT      *
   -- * BE DISCLOSED TO OTHERS WITHOUT WRITTEN PERMISSION OF G.E.,     *
   -- * AND SHALL NOT BE DUPLICATED OR USED EXCEPT IN ACCORDANCE       *
   -- * WITH THE LIMITED CONDITIONS UNDER WHICH IT WAS PROVIDED BY     *
   -- * G.E.                                                           *
   -- *                                                                *
   -- * PROPERTY OF THE AIRCRAFT ENGINE BUSINESS GROUP OF THE          *
   -- * GENERAL ELECTRIC COMPANY.                                      *
   -- *                                                                *
   -- ******************************************************************

   WITH wndone;   USE wndone;
   WITH mcldat;   USE mcldat;
   WITH clock;    USE clock;
   WITH rel5;     USE rel5;
   WITH rel6;     USE rel6;
   WITH rel7;     USE rel7;
   WITH bubmcl;   USE bubmcl;
   WITH atmlib;   USE atmlib;
   WITH oemdec;   USE oemdec;
   WITH menu;     USE menu;
   WITH ptchk;    USE ptchk;
   WITH xfer;     USE xfer;
   WITH lur;      USE lur;
   WITH dtmgmt;   USE dtmgmt;
   WITH blkdlt;   USE blkdlt;
   WITH qcont;    USE qcont;
```

```
WITH chpmgt;   USE chpmgt;
WITH eopgm;    USE eopgm;
WITH dncmcl;   USE dncmcl;
WITH agvmon;   USE agvmon;
WITH tcntrl;   USE tcntrl;
WITH barcdr;   USE barcdr;

PACKAGE BODY atmain IS
-----------------------------------------------------------------------
-- ****************************************************************
-- * THIS PROCEDURE RUNS ALL THE INITIALIZATION PROCEDURES OF    *
-- * THE AUTOMATION MCL-RUNS AT POWER UP ONLY                    *
-- ****************************************************************
PROCEDURE atmain_init IS

BEGIN

  eopgm_init;
  atmlib_init;
  agvmon_init;
  blkdlt_clear;
  bubmcl_init;
  chpmgt_init;
  clock_init;
  menu_init;
  qcont_cancel;
  tcntrl_init;
  xfer_clear;

END atmain_init;
-----------------------------------------------------------------------
-- ****************************************************************
-- * THIS PROCEDURE RUNS ALL THE CLEAR PROCEDURES OF             *
-- * THE AUTOMATION MCL.                                         *
-- ****************************************************************
PROCEDURE atmain_clear IS

BEGIN

  atmlib_clear;
  blkdlt_clear;
  dtmgmt_clear;
  ptchk_clear;
  qcont_cancel;
  xfer_clear;

END atmain_clear;
-----------------------------------------------------------------------
-- ****************************************************************
-- * THIS PROCEDURE RUNS ALL THE CANCEL PROCEDURES OF            *
-- * THE AUTOMATION MCL.                                         *
-- ****************************************************************
PROCEDURE atmain_cancel IS

BEGIN

  atmlib_cancel;
  barcdr_cancel;
  chpmgt_cancel;
  dtmgmt_cancel;
  eopgm_cancel;
  lur_cancel;
  menu_cancel;
  ptchk_cancel;
  qcont_cancel;
  tcntrl_cancel;
  xfer_cancel;

END atmain_cancel;
-----------------------------------
```

```
-------------------------------------
-- ***************************************************************
-- * THIS PROCEDURE RUNS ALL THE PROCEDURES OF THE               *
-- * THE AUTOMATION MCL THAT NEED TO RUN BEFORE THE GE MCL       *
-- ***************************************************************
PROCEDURE atmain_oem1 IS

BEGIN

  clock_oem1;
  atmlib_oem1;

END atmain_oem1;
---------------------------------------------------------------------
-- ***************************************************************
-- * THIS PROCEDURE RUNS ALL THE MAIN PROCEDURES OF              *
-- * THE AUTOMATION MCL.                                         *
-- ***************************************************************
PROCEDURE atmain_main IS

BEGIN

  inter_face;
  agvmon_main;
  barcdr_main;
  blkdlt_main;
  chpmgt_main;
  clock_main;
  dncmcl_main;
  dtmgmt_main;
  eopgm_main;
  lur_main;
  menu_main;
  part_disp;
  ptchk_main;
  .tmgmt_main;
  .ont_main;
  store_file;
  tcntrl_main;
  xfer_main;

END atmain_main;
---------------------------------------------------------------------
END atmain;

-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

-- ***************************************************************
-- * THIS PACKAGE IS A LIBRARY OF FUNCTIONS AND PROCEDURES THAT  *
-- * ARE COMMON TO ALL THE PACKAGES OF THE AUTOMATION MCL.       *
-- ***************************************************************

WITH wndone;   USE wndone;
WITH mcldat;   USE mcldat;
```

```
WITH mcllib;   USE mcllib;
WITH wndstd;   USE wndstd;
WITH oemdec;   USE oemdec;
WITH wndtwo;   USE wndtwo;
WITH wndmth;   USE wndmth;
WITH clock;    USE clock;
WITH rel5;     USE rel5;
WITH rel6;     USE rel6;
WITH rel7;     USE rel7;
WITH chuck;    USE chuck;
WITH convor;   USE convor;
WITH wkxgr;    USE wkxgr;
WITH coolnt;   USE coolnt;
WITH bubdec;   USE bubdec;
WITH tcntrl;   USE tcntrl;
WITH ptchk;    USE ptchk;
WITH blkdlt;   USE blkdlt;
WITH lur;      USE lur;
WITH dncdec;   USE dncdec;
WITH dncmcl;   USE dncmcl;
WITH oemmst;   USE oemmst;
WITH menu;     USE menu;
WITH xfer;     USE xfer;
WITH chpmgt;   USE chpmgt;
WITH agvmon;   USE agvmon;
WITH dtmgmt;   USE dtmgmt;

PACKAGE BODY atmlib IS


check_bounce       : boolean := false;
no_ref_msg         : boolean := false;
one_time_flag      : boolean := false;
page               : integer;
tov_index_1        : integer := 0;
tov_index_2        : float := 0.0;
---------------------------------------------------------------------
-- ******************************************************************

-- * THIS PROCEDURE RUNS ONLY AT POWER UP TIME                       *
-- ******************************************************************
PROCEDURE atmlib_init IS

BEGIN

  FOR i IN 141..147 LOOP
    auto_msd_bool(i) := msd_bool_table(i);
  END LOOP;

  disp_array(1) := "VFN";
  disp_array(2) := "NVR";
  disp_array(3) := "DRY";
  disp_array(4) := "SCP";
  disp_array(5) := "INS";

  config_instald := get_save_bool(1);
  central_coolant := get_save_bool(2);
  cim_time_on := get_save_bool(4);
  FOR i IN 1..11 LOOP
    IF i < 6 THEN
      wp_disp(i) := get_save_bool(5 + i);
    END IF;
    zone_tbl_str(i) := '-';
  END LOOP;
  block_dec_cancel := get_save_bool(11);
  file_instald := get_save_bool(20);
  deliv_exp := get_save_bool(21);
  pkup_exp := get_save_bool(22);
  a_delivr := get_save_bool(23);
  a_pickup := get_save_bool(24);
  plo_1 := get_save_bool(30);
```

```
plo_2 := get_save_bool(31);
default_plol := get_save_bool(32);

standby_req := get_save_int(4);
pl_agv_counter := get_save_int(5);
fork_agv_counter := get_save_int(6);
plate_integer := get_save_int(7);
time_off := get_save_int(8);
plate_index := get_save_int(9);
part_count := get_save_int(20);

lost_time := get_save_float(1);
rework_time := get_save_float(2);
life_to_dec := get_save_float(5);

plate_permit := true;
password_cmplt := false;
oper_cmplt := false;
msg_opt := false;
pass_echo := true;
FOR index IN 6800..6850 LOOP
  msg_act(index) := false;
END LOOP;
FOR i IN 1..67 LOOP
  blank_item1(i) := ' ';
  If i < 65 THEN
    blank_line(i) := ' ';
  END IF;
  IF i < 40 THEN
    plate_serial_no(i) := ' ';
  END IF;
  IF i < 33 THEN
   part_descrip(i) := ' ';
  END IF;
    IF i < 21 THEN
      blank_time(i) := ' ';
      cim_fault(i) := false;
    END IF;
    IF i < 10 THEN
      act_blkdlt(i) := ' ';
    END IF;
    IF i < 9 THEN
      proj_plate_no(i) := ' ';
    END IF;
   END LOOP;
   plate_tra := ldin(plate_seated_tra);
   hold_name := "HOLD00.MCL";
   wp_status(1) := wp_status1_rnm;
   wp_status(2) := wp_status2_rnm;
   wp_status(3) := wp_status3_rnm;
   wp_status(4) := wp_status4_rnm;
   wp_status(5) := wp_status5_rnm;
   serial_num_loc(1) := sn_1_rnm;
   serial_num_loc(2) := sn_2_rnm;
   serial_num_loc(3) := sn_3_rnm;
   serial_num_loc(4) := sn_4_rnm;
   serial_num_loc(5) := sn_5_rnm;
   flash(41);

 END atmlib_init;
 ------------------------------------------------------------------------
 -- ****************************************************************
 -- * THIS PROCEDURE RUNS BEFORE THE GE MCL                          *
 -- ****************************************************************
 PROCEDURE atmlib_oem1 IS

 BEGIN

   IF cyc_strt_on THEN                                          --START CYCLE
     rrise(cycle_start) := true;
```

```
  rdin(cycle_start) := true;
  cyc_strt_on := false;
END IF;
IF inhibit_retrace AND rrise(retrace) THEN                  --INHIBIT RETRACE
  rrise(retrace) := false;
END IF;
IF inh_man AND NOT host_req_mag THEN                        --INHIBIT MANUAL MODE
  rrise(manual_pb) := false;
  rdin(manual_pb) := false;
END IF;
IF blk_dlt_state /= blk_standby OR                          --INHIBIT CYCLE START
   part_check /= part_standby THEN
  rrise(cycle_start) := false;
  rdin(cycle_start) := false;
END IF;
IF (NOT clock_is_set AND ws_status /= 1) OR                 --INHIBIT AUTO
    cool_set_stop OR opt_stop_act THEN
  rrise(auto_pb) := false;
  rrise(single_pb) := false;
END IF;
IF rdout(ref_zero_light) AND inhibit_ref THEN    --INHIBIT REFERENCE ZERO
  FOR index IN 40..48 LOOP
    rrise(index) := false;
  END LOOP;
  IF NOT no_ref_msg THEN
    put_msg(6875,7,6);
    no_ref_msg := true;
  END IF;
END IF;
IF no_ref_msg AND (NOT rdout(ref_zero_light) OR NOT inhibit_ref) THEN
    kill_msg(6875);
    no_ref_msg := false;
  END IF;

  IF NOT man_opt_stop THEN
    IF rdin(option_stop) AND NOT rdout(op_stop_light) THEN
      man_opt_stop := true;
    END IF;
  ELSE
    IF NOT nc_status(cyc_start_lt_on) OR rdin(option_stop) THEN
      man_opt_stop := false;
    END IF;
  END IF;
                                                      --DISPLAY PAGE SELECT
  IF menu_state = input_mode OR menu_state = status THEN
    select_flag := true;
  ELSE
    select_flag := false;
  END IF;
  page := active_disp_page;
  IF rrise(sso_incr) THEN
    IF NOT select_flag AND page > 89 AND page < 123 AND page /= 120 THEN
      IF sel_curs_index = 90 THEN
        sel_curs_index := 110;
      ELSIF sel_curs_index = 110 THEN
        sel_curs_index := 122;
      ELSIF sel_curs_index = 122 THEN
        sel_curs_index := 90;
      END IF;
    END IF;
    rrise(sso_incr) := false;                         -- AVOID ERROR MESSAGE
  ELSIF rrise(sso_decr) THEN
    rrise(sso_decr) := false;                         --AVOID ERROR MESSAGE
  END IF;
  IF rrise(mfo_incr) THEN
    IF NOT select_flag AND page > 89 AND page < 123 THEN
      IF NOT (page = sel_curs_index) THEN
        disp_page_select(sel_curs_index);
      END IF;
    END IF;
```

```
  rrise(mfo_incr) := false;                          --AVOID ERROR MESSAGE
 END IF;

END atmlib_oeml;
-----------------------------------------------------------------------
-- *****************************************************************
-- * THIS PROCEDURE RUNS ONLY WHEN A CANCEL IS INITIATED. IT WILL *
-- * RESET VARIABLES THAT NEED TO BE RESET AT A CANCEL.            *
-- *****************************************************************
PROCEDURE atmlib_cancel IS

BEGIN

  FOR i IN 0..30 LOOP
   k_msg(6818 + i);
  END LOOP;
  FOR index IN 1..32 LOOP
   automcode(index) := false;
  END LOOP;
  buffer_trans := 0;
  IF mcl_state = mcl_auto AND NOT cim_fault(3) THEN
    store_msg(9005);
    cim_fault(3) := true;
  END IF;
  IF menu_state = input_mode THEN
    inquire_cancel;
    erase(90, 22);
    disp_sel_unlock;
    nc_status(inquire_complete) := false;
  END IF;
  IF menu_state /= status THEN
    menu_state := menu_standby;
  END IF;
  IF NOT no_go_off_line THEN
    IF cell_  up OR ws_status = 2 THEN
      ws_sta    := off_line;
      menu_state := status;
      cell_is_up := false;
    END IF;
    enum_resp := parameter_change(105, int_to_float(ws_status));
    prog_was_running := false;
  END IF;
  no_go_off_line := false;
  IF cim_fault(1) THEN
    FOR i IN 1..5 LOOP
      kill_msg(6850 + i);
    END LOOP;
    kill_msg(6859);
  END IF;
  IF cim_fault(2) THEN
    kill_msg(6856);
    kill_msg(6857);
    kill_msg(6864);
  END IF;
  als_light := false;
  bubmcl_cancel := true;
  wait_for_status := false;
  tran_name := 0;
  reworking := false;
  storage := store_start;

END atmlib_cancel;
-----------------------------------------------------------------------
-- *****************************************************************
-- * THIS PROCEDURE RUNS ONLY WHEN A CLEAR IS INITIATED. IT WILL  *
-- * RESET VARIABLES THAT NEED TO BE RESET AT A CLEAR.             *
-- *****************************************************************
PROCEDURE atmlib_clear IS
```

```
BEGIN

  inhibit_ref := false;
  restart_prog := false;

END atmlib_clear;
-----------------------------------------------------------------------
-- ****************************************************************
-- * THIS PROCEDURE WILL CONVERT A STRING TO AN INTEGER          *
-- ****************************************************************
PROCEDURE c_to_i(array_in : IN OUT string;
                 posn : IN integer;
                 quantity : IN integer;
                 result : OUT integer) IS

BEGIN

  conv_char_to_int(array_in, posn, quantity, result, done);

END c_to_i;
-----------------------------------------------------------------------
-- ****************************************************************
-- * THIS PROCEDURE WILL CONVERT A FLOAT TO A STRING             *
-- ****************************************************************
PROCEDURE f_to_c(flt_in : IN float;
                 width : IN integer;
                 decpt : IN integer;
                 posn : IN integer;
                 array_out : OUT string) IS

BEGIN

  conv_flt_to_char(flt_in, width, decpt, posn, array_out, done);

END f_to_c;
-----------------------------------------------------------------------
-- ****************************************************************
-- * THIS PROCEDURE WILL CONVERT AN INTEGER TO A STRING          *
-- ****************************************************************
PROCEDURE i_to_c(int_in : IN integer;
                 width : IN integer;
                 posn : IN integer;
                 array_out : OUT string) IS

BEGIN

  conv_int_to_char(int_in, width, posn, array_out, done);

END i_to_c;
-----------------------------------------------------------------------
-- ****************************************************************
-- * THIS PROCEDURE WILL CONVERT A STRING TO A FLOAT             *
-- ****************************************************************
PROCEDURE c_to_f(array_in : IN OUT string;
                 posn : IN integer;
                 quantity : IN integer;
                 flt_out : OUT float) IS

BEGIN

  conv_char_to_flt(array_in, posn, quantity, flt_out, done);

END c_to_f;
-----------------------------------------------------------------------
-- ****************************************************************
-- * THIS PROCEDURE WILL DISPLAY A QUESTION TO AN OPERATOR        *
-- ****************************************************************
PROCEDURE ask_oper(pr_lgt : IN integer;
                   ln_num : IN integer;
                   col_num : IN integer;
                   inq_lgt : OUT integer;
                   resp_rdy : OUT boolean) IS
```

```
BEGIN

  CASE ask IS
    WHEN ask_1 =>
      IF inquire_prompt(pr_lgt, inq_msg, ln_num, col_num, pass_echo) =
         success THEN
        ask := ask_2;
      END IF;

    WHEN ask_2 =>
      IF nc_status(inquire_complete) AND nc_status(inquire_success) THEN
        inq_msg := blank_line;
        inquire_response(inq_lgt, inq_msg);
        ask := ask_1;
        pass_echo := true;
        resp_rdy := true;
        nc_status(inquire_complete) := false;
      END IF;
  END CASE;

END ask_oper;
------------------------------------------------------------------------
-- ********************************************************************
-- * THIS FUNCTION WILL DETERMINE WHETHER THERE IS A PLATE FILE       *
-- * PRESENT FOR A PARTICULAR STATION.                                *
-- ********************************************************************
PROCEDURE file_present(mcl_file : IN integer) IS

BEGIN

  CASE check_for_file IS
    WHEN chk_standby =>
      IF file_command = command_standby AND file_is_there = 0 THEN
        str_set(0, mcl_file);
        iteml_rec := pr_id_rnm;
        file_command := g_str;
        check_for_file := chk_wait;
      END IF;

    WHEN chk_wait =>
      IF file_command = get_data THEN
        file_is_there := 1;
        check_for_file := chk_standby;
        file_command := command_standby;
      ELSIF file_command = no_file THEN
        file_is_there := 2;
        check_for_file := chk_standby;
        file_command := command_standby;
      END IF;
  END CASE;

END file_present;
------------------------------------------------------------------
-- ********************************************************************
-- * THIS FUNCTION WILL FIND WHICH PLATE CONFIGURATION FILE IS ACTIVE *
-- * FOR A PART IN THE TRANSFER STATION.                              *
-- ********************************************************************
FUNCTION find_trans RETURN boolean IS

  status : boolean;

  BEGIN

    status := false;
    CASE tran_name IS
      WHEN 0 =>
        IF file_command = command_standby THEN
          str_set(0, 4);
          iteml_rec := pr_desc_rnm;
          file_command := g_str;
          tran_name := 1;
        END IF;
```

```
WHEN 1 =>
  IF file_command = command_standby THEN
    tran_name := 0;
  ELSIF file_command = get_data THEN
    tran_num := 4;
    status := true;
    file_command := command_standby;
    tran_name := 0;
  ELSIF file_command = no_file THEN
          str_set(0, 1);
          item1_rec := pr_desc_rnm;
          file_command := g_str;
          tran_name := 2;
        END IF;

      WHEN 2 =>
        IF file_command = command_standby THEN
          tran_name := 0;
        ELSIF file_command = get_data THEN
          tran_num := 1;
          status := true;
          file_command := command_standby;
          tran_name := 0;
        ELSIF file_command = no_file THEN
          tran_num := 0;
          status := true;
          file_command := command_standby;
          tran_name := 0;
        END IF;

      WHEN others =>
        tran_name := 0;
    END CASE;

  RETURN status;

END find_trans;
------------------------------------------------------------------------
-- ***************************************************************
-- * THIS FUNCTION WILL OBTAIN A PARAMETER VALUE AND TRUNCATE IT*
-- ***************************************************************
FUNCTION truncate(parm_value : IN integer) RETURN integer IS

prod : integer;

BEGIN

  prod := trunc(parameter_value(parm_value));

RETURN (prod);

END truncate;
------------------------------------------------------------------------
-- ***************************************************************
-- * THIS PROCEDURE WILL ASK THE OPERATOR FOR A PASSWORD          *
-- ***************************************************************
PROCEDURE password IS

ptd : integer;
epswd   string(1..14);

BEGIN

  epswd := "ENTER PASSWORD";

  CASE pass IS
    WHEN pass_1 =>
      FOR i IN 1..64 LOOP
        IF i < 15 THEN
          inq_msg(i) := epswd(i);
        ELSE
```

```
    inq_msg(i) := ' ';
  END IF;
END LOOP;
pass := pass_2a;

    WHEN pass_2a =>
      FOR i IN 1..3 LOOP
        char_date(i) := msd_char_table(119 + i);
      END LOOP;
      pass := pass_2;

    WHEN pass_2 =>
      pass_echo := false;
      ask_oper(60, 23, 1, ptd, oper_cmplt);
      IF oper_cmplt THEN
        pass := pass_3;
        oper_cmplt := false;
      END IF;

    WHEN pass_3 =>
      IF (inq_msg(1) = char_date(1)) AND (inq_msg(2) = char_date
         (2)) AND (inq_msg(3) = char_date(3)) THEN
        password_cmplt := true;
        pass := pass_1;
      ELSE
        pass := pass_1;
      END IF;
  END CASE;

END password;
 ---------------------------------------------------------------------
-- *******************************************************************
-- * CONVERT INTEGER DATE TO STRING DATE                             *
-- *******************************************************************

PROCEDURE set_conv_varb IS

 m_index : integer;

 BEGIN

   m_index := int_date / 100;
   old_day :=(int_date) REM 100;
   FOR i IN 0..2 LOOP
     old_mon(3 - i) := month_str((m_index * 3) - i);
   END LOOP;
   set_cmplt := true;

 END set_conv_varb;
 ---------------------------------------------------------------------
-- *******************************************************************
-- * CONVERT STRING DATE TO PARAMETER VALUE                          *
-- *******************************************************************

 PROCEDURE repl_ver_dt IS

 flt_hr : float;
 int_day : integer;
 int_month : integer;
 int_val : ARRAY (1..2) OF integer;

 par_rdy : float;

 the_month : string(1..3);

 BEGIN

   c_to_i(cur_date, 1, 2, int_day);
   c_to_i(cur_date, 8, 4, int_month);
   c_to_f(cur_date, 13,2, flt_hr);
```

```
  enum_resp := parameter_change((141), flt_hr);
  int_val(1) := int_month;
  FOR i IN 1..12 LOOP
    FOR j IN 0..2 LOOP
      the_month(3 - j) := month_str((i * 3) - j);
    END LOOP;
    IF (cur_date(4) = the_month(1)) AND (cur_date(5) = the_month
       (2)) AND (cur_date(6) = the_month(3)) THEN
      int_month := i;
      EXIT;
    END IF;
  END LOOP;
  int_val(2) :=(int_month * 100) + int_day;
  FOR i IN 1..2 LOOP
    par_rdy := int_to_float(int_val(i));
    enum_resp := parameter_change((141 + i), par_rdy);
  END LOOP;

END repl_ver_dt;
---------------------------------------------------------------------
-- ************************************************************
-- * THIS PROCEDURE WILL SELECT THE NAME OF A FILE TO EXAMINE   *
-- ************************************************************
PROCEDURE str_set(name_tag : IN integer;
                  name_val : IN integer) IS

name_array : ARRAY (1..6) OF str10;

BEGIN

  name_array(1) := "DETRAN.MCL";  -- PART DELIVERY CONFIGURATION FILE
  name_array(2) := "Q1TRAN.MCL";  -- PART ON QUEUE CONFIGURATION FILE
  name_array(3) := "MATRAN.MCL";  -- PART IN MACHINE CONFIGURATION FILE
  name_array(4) := "PUTRAN.MCL";  -- PART PICK UP CONFIGURATION FILE
  name_array(5) := "CONFIG.MCL";  -- TOOL MAGAZINE CONFIGURATION FILE
--name_array(6) := "Q2TRAN.MCL";  -- FOR MACHINES WITH TWO QUEUE STATIONS

  IF name_tag = 1 THEN
    str_old_name := name_array(name_val);
  ELSE
    str_name := name_array(name_val);
  END IF;

END str_set;
---------------------------------------------------------------------
-- ************************************************************
-- * THIS PROCEDURE WILL TRANSFER A FLOAT VALUE FROM ONE TABLE  *
-- * TO ANOTHER AND ALSO RETURN A VALUE FROM A TABLE            *
-- ************************************************************
PROCEDURE tb_fl(t_tbl1 : IN integer;
                t_ind1 : IN integer;
                t_tbl2 : IN integer;
                t_ind2 : IN integer) IS

BEGIN

  IF t_tbl1 /= 0 THEN
    t_val := tbl_val_float(cust, t_tbl1, t_ind1);
  END IF;
  response := tbl_chg_float(cust, t_tbl2, t_ind2, t_val);

END tb_fl;
---------------------------------------------------------------------
-- ************************************************************
-- * THIS PROCEDURE WILL ACTIVE A WEAR AND DATA OFFSET          *
-- ************************************************************
```

```
PROCEDURE act_off(tool_off : IN integer;
                  tool_dat : IN integer) IS

BEGIN

  enum_resp := activate_off_td(tool_off, tool_dat, false, float_10);

END act_off;
-------------------------------------------------------------------
-- ***************************************************************
-- * THIS PROCEDURE WILL ADD A FLOAT VALUE TO A FLOAT TABLE      *
-- ***************************************************************
PROCEDURE t_a_f(t_tbl : IN integer;
                t_ind : IN integer) IS

BEGIN

  response := tbl_add_float(cust, t_tbl, t_ind, t_val);

END t_a_f;
-------------------------------------------------------------------
-- ***************************************************************
-- * THIS PROCEDURE WILL SEARCH AN INTEGER TABLE FO . A VALUE    *
-- ***************************************************************
PROCEDURE t_s_i(t_tbl : IN integer;
                t_vle : IN integer;
                t_ind : IN OUT integer) IS

BEGIN

  tbl_search_int(cust, t_tbl, t_vle, t_ind, tble_status);

END t_s_i;
-------------------------------------------------------------------
-- ***************************************************************
-- * THIS PROCEDURE WILL DISPLAY A MESSAGE                        *
-- ***************************************************************
PROCEDURE p_msg(msg_num : IN integer;
                prior : IN integer) IS

BEGIN

  IF NOT msg_act(msg_num) THEN
    IF msg_num /= 6844 AND msg_num /= 6843 THEN
      IF msg_num > 6823 THEN
        store_msg(msg_num);
      END IF;
    ELSIF (NOT plate_que AND NOT plate_mac) OR cim_fault(11) THEN
      IF msg_num = 6844 THEN
        store_msg(6844);
        cim_fault(8) := true;
      ELSIF msg_num = 6843 THEN
        store_msg(6843);
        cim_fault(9) := true;
      END IF;
      cim_fault(11) := false;
    END IF;
    put_msg(msg_num, 8, prior);
    IF prior /= 3 THEN
      msg_act(msg_num) := true;
    END IF;
  END IF;

END p_msg;
-------------------------------------------------------------------
-- ***************************************************************
-- * THIS PROCEDURE WILL REMOVE A MESSAGE FROM THE DISPLAY        *
-- ***************************************************************
PROCEDURE k_msg(msg_num : IN integer) IS
```

```
BEGIN

  IF msg_act(msg_num) THEN
    IF msg_num > 6823 AND msg_num /= 6844 AND msg_num /= 6843 THEN
      cnt_dwn;
    END IF;
    IF cim_fault(10) AND msg_num = 6817 THEN
      cnt_dwn;
      cim_fault(10) := false;
    END IF;
    IF cim_fault(9) AND msg_num = 6843 THEN
      cnt_dwn;
      cim_fault(9) := false;
    END IF;
    IF msg_num = 6822 OR
       msg_num = 6814 THEN
      var_dwn;
    END IF;
    kill_msg(msg_num);
    msg_act(msg_num) := false;
  END IF;

END k_msg;
-----------------------------------------------------------------------
-- ****************************************************************
-- * THIS PROCEDURE WILL OBTAIN A VALUE FROM A PARAMETER           *
-- ****************************************************************
PROCEDURE p_val (p_num : IN integer) IS

BEGIN

t_val := parameter_value(p_num);

END p_val;
-----------------------------------------------------------------------
-- ****************************************************************
-- * THIS PROCEDURE WILL STORE A LOST TIME MESSAGE NUMBER          *
-- ****************************************************************
PROCEDURE store_msg (msg_no : IN integer) IS

BEGIN

IF cim_time_on THEN
  lost_time_cntr := tbl_val_int(cust, msg, 9);
  IF msg_no < 9000 OR msg_no > 9002 THEN
    lost_time_cntr := lost_time_cntr + 1;
  END IF;
  lost_time_msg := lost_time_msg + 1;
  IF lost_time_msg = 9 THEN
    lost_time_msg := 1;
  END IF;
  response := tbl_chg_int(cust, msg, lost_time_msg, msg_no);
  response := tbl_chg_int(cust, msg, 9, lost_time_cntr);
  response := tbl_chg_int(cust, msg, 10, lost_time_msg);
  IF msg_no /= 9008 AND msg_no /= 6810 THEN
    flash_al := true;
    cim_fault(13) := true;
  END IF;
END IF;

END store_msg;
-----------------------------------------------------------------------
-- ****************************************************************
-- * THIS PROCEDURE WILL COUNT DOWN THE LOST TIME COUNTER          *
-- ****************************************************************
PROCEDURE cnt_dwn IS

BEGIN
```

```
IF cim_time_on THEN
  IF lost_time_cntr > 0 THEN
    lost_time_cntr := lost_time_cntr - 1;
  END IF
  response := tbl_chg_int(cust, msg, 9, lost_time_cntr);
END IF;

END cnt_dwn;
--------------------------------------------------------------------------
-- ***************************************************************
-- * THIS PROCEDURE WILL STORE A VARIANCE TIME MESSAGE NUMBER    *
-- ***************************************************************
PROCEDURE var_msg (var_no : IN integer) IS

BEGIN

IF cim_time_on THEN
  rework_time_cntr := tbl_val_int(cust, var, 9);
  rework_time_cntr := rework_time_cntr + 1;
  var_time_msg := var_time_msg + 1;
  IF var_time_msg = 9 THEN
    var_time_msg := 1;
  END IF;
  response := tbl_chg_int(cust, var, var_time_msg, var_no);
  response := tbl_chg_int(cust, var, 9, rework_time_cntr);
  response := tbl_chg_int(cust, var, 10, var_time_msg);
  IF var_no = 6862 OR var_no = 6863 THEN
    cim_fault(16) := true;
  END IF;
  IF var_no /= 9007 THEN
    flash_al := true;
  END IF;
END IF;

END var_msg;
--------------------------------------------------------------------------
-- ***************************************************************
-- * THIS PROCEDURE WILL COUNT DOWN THE VARIANCE TIME COUNTER     *
-- ***************************************************************
PROCEDURE var_dwn IS

BEGIN

IF cim_time_on AND rework_time_cntr > 0 THEN
  rework_time_cntr := rework_time_cntr - 1;
  response := tbl_chg_int(cust, var, 9, rework_time_cntr);
END IF;

END var_dwn;
--------------------------------------------------------------------------
-- ***************************************************************
-- * THIS PROCEDURE WILL ERASE THE DISPLAY LINE SPECIFIED        *
-- ***************************************************************
PROCEDURE erase (page_no : IN integer;
                 line_no : IN integer) IS

BEGIN

  IF disp_page_line(page_no, line_no, blank_line) THEN
    NULL;
  END IF;

END erase;
--------------------------------------------------------------------------
-- ***************************************************************
-- * THIS PROCEDURE TURNS OFF A SELECTED BLOCK DELETE AS         *
-- * SPECIFIED BY THE PARAMETER VALUE.                           *
-- ***************************************************************
PROCEDURE turn_off_blkdlt(pmtr_num :    integer) IS

temp_int : integer;
```

```
BEGIN

  temp_int := truncate(pmtr_num);
  IF temp_int < 10 AND temp_int > 0 THEN
    enum_resp := block_delete_off(temp_int);
    act_blkdlt(10 - temp_int) := '0';
  END IF;
  FOR i IN 1..9 LOOP
    IF (act_blkdlt(i) = '0') OR (act_blkdlt(i) = ' ') THEN
      rdout(blk_del_light)  = false;
    ELSE
      rdout(blk_del_light) := true;
      EXIT;
    END IF;
  END LOOP;

END turn_off_blkdlt;
-----------------------------------------------------------------------
-- ***********************************************************
-- * THIS PROCEDURE IS USED TO INTERFACE THE AUTOMATION MCL      *
-- * TO THE OPERATING MCL AND CONTAINS OTHER MISC FUNCTIONS      *
-- * THAT APPLY TO THE AUTOMATION TASKS IN GENERAL.              *
-- ***********************************************************
PROCEDURE check_plo IS

BEGIN

  IF automcode(a127) AND NOT plo_1 AND NOT plo_2 THEN
    tov_index_1 := 0;
    tov_index_2 := float_1;
    prelude_request(v_prel);
    set_offsts;
    default_plo1 := true;
    put_save_bool(default_plo1, 32);
    plo_1 := true;
    put_save_bool(plo_1, 30);
  ELSIF automcode(a128) AND plo_1 THEN
    tov_index_1 := 0;
    tov_index_2 := - float_1;
    prelude_request(v_prel);
    set_offsts;
    plo_1 := false;
    put_save_bool(plo_1, 30);
  ELSIF automcode(a129) AND NOT plo_1 AND NOT plo_2 THEN
    tov_index_1 := 2;
    tov_index_2 := float_1;
    prelude_request(v_prel);
    set_offsts;
    default_plo1 := false;
    put_save_bool(default_plo1, 32);
    plo_2 := true;
    put_save_bool(plo_2, 31);
  ELSIF automcode(a130) AND plo_2 THEN
```

```
    tov_index_1 := 2;
    tov_index_2 := - float_1;
    prelude_request(v_prel);
    set_offsts;
    plo_2 := false;
    put_save_bool(plo_2, 31);
  END IF;
  FOR index IN a127..a130 LOOP
    automcode(index) := false;
  END LOOP;

END check_plo;
------------------------------------------------------------------
-- **************************************************************
-- * THIS PROCEDURE IS USED TO INTERFACE THE AUTOMATION MCL      *
-- **************************************************************
PROCEDURE set_offsts IS

temp_float_1 : float;
temp_float_2 : float;

BEGIN

  p_val(68 + tov_index_1);
  temp_float_1 := t_val * tov_index_2;
  p_val(69 + tov_index_1);
  temp_float_2 := t_val * tov_index_2;
  FOR index IN 1..tov_size LOOP
    response := tbl_add_float(tov, 1, index, temp_float_1);
    response := tbl_add_float(tov, 2, index, temp_float_2);
  END LOOP;
  prelude_req_off(v_prel);

END set_offsts;
------------------------------------------------------------------
-- **************************************************************
-- * THIS PROCEDURE IS USED TO INTERFACE THE AUTOMATION MCL      *
-- * TO THE OPERATING MCL AND CONTAINS OTHER MISC FUNCTIONS      *
-- * THAT APPLY TO THE AUTOMATION TASKS IN GENERAL.              *
-- **************************************************************
PROCEDURE inter_face IS

BEGIN

  IF lrise(plate_seated_tra) OR                               --PLATE DEBOUNCE
     (NOT ldin(plate_seated_tra) AND plate_tra AND NOT check_bounce) THEN
    start_timer(verify_time_tmr, 200);
    check_bounce := true;
  ELSIF NOT timer_running(verify_time_tmr) THEN
    plate_tra := ldin(plate_seated_tra) AND NOT delay_plate_tra;
    check_bounce := false;
  END IF;
  plate_que := ldin(plate_seated_que);
  IF ldout(chuck_air_on) AND ldin(projplate_seated) THEN
    plate_mac := true;
  ELSIF unchuck_cyc_cmp AND NOT ldin(projplate_seated) THEN
    plate_mac := false;
  END IF;
  xgr_park := NOT ldin(wkxgr_cycle_act);
  ld_unld_home := (ld_state = ld_standby) AND (unld_state = unld_standby)
                  AND (mdi_state = standby);
  IF host_available AND trans_action = 0 AND buffer_trans /= 0 THEN
    trans_action := buffer_trans;
    buffer_trans := 0;
    dnc_bool(trans_report) := true;
  ELSIF NOT host_available AND buffer_trans /= 0 THEN
```

```
    buffer_trans := 0;
  END IF;
  IF m_ldtr_init THEN
    buffer_trans := 1;
    mcode_val(m501) := true;
    ornt_spn;
    m_ldtr_init := false;
  ELSIF automcode(a502) THEN
    buffer_trans := 3;
    mcode_val(m502) := true;
    ornt_spn;
    automcode(a502) := false;
  ELSIF automcode(a503) THEN
    IF wkxgr_cntr = 1 THEN
      buffer_trans := 2;
      mcode_val(m503) := true;
      wkxgr_m_strobed := true;
      automcode(a503) := false;
    END IF;
  ELSIF automcode(a505) THEN
    buffer_trans := 4;
    prog_try_out := false;
    mcode_val(m505) := true;
    ornt_spn;
    automcode(a505) := false;
  ELSIF automcode(m512_ok_to_go) AND ld_unld_home THEN
    automcode(m512_ok_to_go) := false;
    mcode_val(m513) := false;
    mcode_val(m512) := true;
    wkld_at_chuck := true;
    ornt_spn;
    prelude_req_off(ptmgmt_lude);
  END IF;

  IF als_light THEN                                                  --LIGHT
    rdout(cyc_start_light) := true;
  END IF;
  IF flash_al OR (pkup_exp AND NOT host_available) THEN
    ldout(flash_light) := rdout(41);
  ELSE
    ldout(36) := rdout(cyc_start_light);
  END IF;

  IF (nc_status(cyc_start_lt_on) OR NOT ldin(tool_act_reted))        --INHIBIT REF
     AND NOT inhibit_ref THEN
    inhibit_ref := true;
  END IF;

                                                                     --INHIBIT MANUAL
  IF nc_status(cyc_start_lt_on) AND (mcl_state = mcl_auto) THEN
    inh_man := true;
  ELSIF inh_man THEN
    inh_man := false;
  END IF;

  IF rdout(mpg_light) AND NOT one_time_flag THEN                     --TEST LIGHTS
    FOR index IN 1..40 LOOP
      rdout(index) := true;
    END LOOP;
    one_time_flag := true;
  ELSIF one_time_flag AND NOT rdin(mpg_button) THEN
    FOR index IN 1..40 LOOP
      rdout(index) := false;
    END LOOP;
    IF clear_initiate = success THEN
      one_time_flag := false;
      rdout(manual_light) := true;
```

```
    END IF;
  END IF;
                                                          --CLEAR LOST TIME
  IF rrise(cycle_start) AND cim_time > cim_monitor THEN
    FOR index IN 1..6 LOOP
      IF cim_fault(index) THEN
        IF cim_fault(1) THEN
          FOR i IN 1..5 LOOP
            kill_msg(6850 + i);
          END LOOP;
          kill_msg(6859);
        END IF;
        IF cim_fault(2) THEN
          kill_msg(6856);
          kill_msg(6857);
          kill_msg(6864);
        END IF;
        cim_fault(index) := false;
        IF index = 2 OR index = 5 THEN
          var_dwn;
        ELSE
          cnt_dwn;
        END IF;
      END IF;
    END LOOP;
  END IF;

END inter_face;
-----------------------------------------------------------------------
-- *************************************************************
-- *     IF THE HOST IS NOT AVAILABLE AND THE AUTOMATION MCL     *
-- * IS RUNNING THEN THIS PROCEDURE WILL STORE THE PLATE CONFIG *
-- * FILE IN MSU MEMORY WHEN PART IS PICKED UP BY THE AGV,      *
-- * UNTIL HOST CAN UPLOAD AND DELETE FILES. IF FILES STORED    *
-- * EXCEDES 100 THEN PROCEDURE WILL WRITE OVER OLDEST FILE.    *
-- *************************************************************
FUNCTION store_file RETURN boolean IS

status : boolean;
hold_num : str10;

BEGIN

  CASE storage IS
    WHEN store_start =>                                          --STATE 0
      status := false;
--    IF NOT plate_tra AND pkup_exp AND NOT host_available AND
--       ld_unld_home THEN
        IF find_trans THEN
          IF tran_num = 4 THEN
            p_val(145);
            IF t_val > float_100 THEN
              enum_resp := parameter_change(145, float_1);
            ELSE
              f_to_c(t_val, 10, 0, 1, hold_num);
              FOR i IN 0..1 LOOP
                IF hold_num(9 - i) = ' ' THEN
                  hold_num(9 - i) := '0';
                END IF;
                hold_name(6 - i) := hold_num(9 - i);
              END LOOP;
              storage := store_name;
            END IF;
          ELSE
            storage := store_cmplt;
          END IF;
```

```
      END IF;
--    END IF;

    WHEN store_name =>                                          --STATE 1
      IF file_command = command_standby THEN
        str_set(1, 4);
        dupfle := false;
        str_name := hold_name;
        file_command := rename;
        storage := store_cmplt;
      END IF;

    WHEN store_cmplt =>                                         --STATE 2
      IF file_command = no_file THEN
        file_command := command_standby;
      ELSIF dupfle THEN
        p_msg(6845, 6);
        dupfle := false;
      ELSE
        k_msg(6845);
        p_val(145);
        enum_resp := parameter_change(145, (t_val + float_1));
      END IF;
      storage := store_start;
      status := true;
  END CASE;

RETURN status;

END store_file;
--------------------------------------------------------------------------
END atmlib;
-- *****************************************************************
-- *                                                               *
-- * SOFTWARE BY PAUL COLANANNI (A&ES) FOR                         *
-- * AIRCRAFT ENGINE BUSINESS GROUP / GENERAL ELECTRIC COMPANY     *
-- * COPYRIGHT BY GENERAL ELECTRIC COMPANY  1985                   *
-- *                                                               *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *                                                               *
-- *****************************************************************

WITH wndone;   USE wndone;
WITH mcldat;   USE mcldat;
WITH mcllib;   USE mcllib;
WITH wndtwo;   USE wndtwo;
WITH atmlib;   USE atmlib;
WITH rel6;     USE rel6;
WITH rel7;     USE rel7;
WITH oemdec;   USE oemdec;
WITH tcntrl;   USE tcntrl;
WITH bubdec;   USE bubdec;
WITH tool;     USE tool;
WITH oemmst;   USE oemmst;

PACKAGE BODY barcdr IS

out_status        : io_status_enum;
done              : boolean := false;
read_code         : boolean := false;
--------------------------------------------------------------------------
```

```
PROCEDURE barcdr_cancel IS

BEGIN

  input_index := 1;
  read_code := false;
  IF barcdr_state = barcdr_standby THEN
    close_ser_port('B', true, out_status);
    barcdr_state := open_port;
    barcdr_master := auto_init;
  END IF;

END barcdr_cancel;
------------------------------------------------------------------
PROCEDURE barcdr_main IS

file_msg : str64;

BEGIN

  CASE barcdr_master IS
    WHEN auto_init =>
      IF NOT auto_msd_bool(automation_opt) or skip_barcode THEN
        IF NOT code_was_read OR NOT bar_code_read_ok THEN
        code_was_read := true;
        bar_code_read_ok := true;
      END IF;
      skip_barcode := false;
    END IF;

  WHEN auto_run =>
    CASE barcdr_state IS
      WHEN open_port =>
        input_index := 1;
        IF open_ser_port('B', read_write, br4800, no_protocol, no_parity,
           8) = ok THEN
          setup_ser_input('B', bar_reading, in_limit, input_index,
                          out_status);
          barcdr_state := barcdr_standby;
        END IF;

      WHEN barcdr_standby =>
        IF ldout(read_tool_label) AND NOT read_code THEN
          bar_code_read_ok := false;
          code_was_read := false;
          start_timer(read_code_tmr, 500);
          read_code := true;
        ELSIF NOT timer_running(read_code_tmr) AND read_code THEN
          no_read := true;
          barcdr_state := barcdr_wait;
        END IF;
        IF input_index >= 8 THEN
          c_to_i(bar_reading, 1, maxim_char, type_read);
          c_to_i(bar_reading, 5, maxim_char, ser_no);
          input_index := 1;
          FOR index IN 1..8 LOOP
            bar_reading(index) := '0';
          END LOOP;
          barcdr_state := barcdr_wait;
        END IF;

      WHEN barcdr_wait =>
        IF t_type = type_read THEN
          bar_code_read_ok := true;
        ELSIF NOT no_read THEN
          no_match := true;
        END IF;
        type_read := 0;
        close_ser_port('B', true, out_status);
        code_was_read := true;
        read_code := false;
        barcdr_state := open_port;
        barcdr_master := auto_init;
    END CASE;
```

```
    WHEN OTHERS =>
      NULL;  --WAIT UNTIL CLEAR OR CANCEL
  END CASE;

END barcdr_main;
------------------------------------------------------------------------
END barcdr;
-- *****************************************************************
-- *                                                               *
-- * SOFTWARE BY DAN GARAFOLA (A&ES) FOR                           *
-- * AIRCRAFT ENGINE BUSINESS GROUP / GENERAL ELECTRIC COMPANY     *
-- *                                                               *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *                                                               *
-- *****************************************************************

-- *****************************************************************
--    PACKAGE DESCRIPTION :  BLKDLT.PCL                            *
-- *                                                               *
-- *      THIS PACKAGE CONTAINS THREE MAIN PROCEDURES :            *
-- *                                                               *
-- * BLKDLT_MAIN ;                                                 *
-- *     IF THE LAST TIME THE CURRENT PROGRAM WAS RUN IS WITHIN    *
-- * THE TIME INTERVAL IN MSD INTEGER 165 THEN THE BLOCK DELETES*
-- * SPECIFIED IN PARAMETER # 118 WILL BE TURNED ON.  IF NOT       *
-- * THEN ALL BLOCK DELETES ARE CLEARED.                           *
-- *     AFTER THE BLOCK DELETES ARE SET AND THE AUTOMATION MCL    *
-- * IS IN READY AUTO MODE THEN CYCLE START IS AUTOMATICALLY       *
-- * ACTIVATED ELSE A MESSAGE WILL ASK THE OPERATOR TO ACTIVATE    *
-- * CYCLE START.                                                  *
-- *                                                               *
-- * COMPARE ;                                                     *
-- *     THIS PROCEDURE RECEIVES A TIME AND DATE FROM THE MCL      *
-- * AND COMPARES IT TO THE CURRENT TIME AND DATE AND CALCULATES*
-- * THE AMOUNT OF HOURS THAT HAVE PASSED BETWEEN THE TWO TIMES.*
-- *                                                               *
-- * BLKDLT_EOP ;                                                  *
-- *     THIS PROCEDURE UPDATES THE RECENTLY RUN PROGRAM FILE      *
-- * (PROGRM.MCL) WITH THE PROGRAM I.D.,  PARAMETER # 118, PART    *
-- * COUNT,  CURRENT TIME,  AND THE PROGRAM DESCRIPTION OF THE     *
-- * PART JUST COMPLETED.                                          *
-- *                                                               *
-- *****************************************************************

WITH wndone;   USE wndone;
WITH mcldat;   USE mcldat;
WITH mcllib;   USE mcllib;
WITH oemdec;   USE oemdec;
WITH wndtwo;   USE wndtwo;
WITH wndmth;   USE wndmth;
WITH wndstd;   USE wndstd;
WITH atmlib;   USE atmlib;
WITH rel6;     USE rel6;
WITH rel7;     USE rel7;
WITH bubdec;   USE bubdec;
WITH ptchk;    USE ptchk;
WITH menu;     USE menu;
WITH qcont;    USE qcont;
WITH clock;    USE clock;

PACKAGE BODY blkdlt IS
```

```
set_ptr            : integer := 0;
clr_ptr            : integer := 0;
param_int          : integer := 0;
n_mon              : integer := 0;
o_mon              : integer := 0;
cur_time           : integer := 0;
cur_year           : integer := 0;
cur_day            : integer := 0;
dlt  m             : integer := 0;
man_blkdlt         : string(1..14);
new_blkdlt         : string(1..14);
old_prog           : str6;
cnt_chr            : string(1..5);
hold_str           : string(1..3);
cur_mon            : string(1..3);
blk_str            : string(1..9);
fifth_part         : string(33..39);
---------------------------------------------------------------------
PROCEDURE blkdlt_clear IS

BEGIN

  etso_again := false;
  blk_str := "123456789";
  month_str := "JANFEBMARAPRMAYJUNJULAUGSEPOCTNOVDEC";
  blk_dlt_state := blk_standby;
  com_st := comp;
  set_ptr := 0;
  clr_ptr := 0;

END blkdlt_clear;
---------------------------------------------------------------------
PROCEDURE clear_tov IS

BEGIN

  turn_off_blkdlt(191);
  response := tbl_clear(tov, 1);
  response := tbl_clear(tov, 2);
  FOR i IN 52..62 LOOP
    enum_resp := parameter_change(i, float_0);
  END LOOP;

END clear_tov;
---------------------------------------------------------------------
FUNCTION compare RETURN boolean IS                  -- COMPARES TIME AND DATE

status : boolean;

BEGIN

  status := false;
  CASE com_st IS
    WHEN comp =>
      date;
      cur_date := time;
      c_to_i(cur_date, 1, 2, cur_day);
      c_to_i(cur_date, 8, 4, cur_year);
      c_to_i(cur_date, 13, 2, cur_time);
      FOR index IN 1..3 LOOP
        cur_mon(index) := cur_date(index + 3);
      END LOOP;
      com_st := convert;
    WHEN convert =>
      FOR index IN 1..12 LOOP
```

```
        FOR i IN 0..2 LOOP
          hold_str(3 - i) := month_str((index * 3) - i);
        END LOOP;
        IF cur_mon = hold_str THEN
          n_mon := tbl_val_int(cust, hr, index);
        END IF;
        IF old_mon = hold_str THEN
          o_mon := tbl_val_int(cust, hr, index);
        END IF;
      END LOOP;
      com_st := chk_hr;
    WHEN chk_hr =>
      IF (cur_year - old_year /= 0) THEN
        hr_ret := (((((cur_year - old_year) * 8760) - o_mon) -
                  ((old_day - 1) * 24)) - old_time) +
                  (n_mon + ((cur_day - 1) * 24) + cur_time);
        com_st := comp;
      ELSE
        hr_ret :=(n_mon + ((cur_day - 1) * 24) + cur_time) -
          (o_mon + ((old_day - 1) * 24) + old_time);
        com_st := comp;
      END IF;
      status := true;
  END CASE;

RETURN status;

END compare;
 ---------------------------------------------------------------------
FUNCTION blkdlt_eop RETURN boolean IS

status : boolean;

BEGIN

  status := false;
  CASE beop_state IS
    WHEN beop_standby =>                                              --STATE 0
      FOR index IN REVERSE 2..12 LOOP
        tbl_val_char(cust, prog_1, index - 1, misc_str);
        response := tbl_chg_char(cust, prog_1, index, misc_str);
        tbl_val_char(cust, prog_2, index - 1, misc_str);
        response := tbl_chg_char(cust, prog_2, index, misc_str);
        tbl_val_char(cust, prog_3, index - 1, prog_str);
        response := tbl_chg_char(cust, prog_3, index, prog_str);
        tbl_val_char(cust, prog_4, index - 1, prog_str);
        response := tbl_chg_char(cust, prog_4, index, prog_str);
        tbl_val_char(cust, prog_5, index - 1, prog_str);
        response := tbl_chg_char(cust, prog_5, index, prog_str);
      END LOOP;
      clm_index := 2;
      beop_state := make_str1;

    WHEN make_str1 =>                                                 --STATE 1
      FOR i IN 1..6 LOOP
        misc_str(i) := prgrm_id(i);
      END LOOP;
      f_to_c(parameter_value(118), 14, 0, 1, new_blkdlt);
      FOR i IN 1..9 LOOP
        misc_str(i + 7) := new_blkdlt(i + 4);
      END LOOP;
      i_tc_c(part_count, 5, 1, cnt_chr);
      FOR i IN 1..5 LOOP
        IF cnt_chr(i) = ' ' THEN
          cnt_chr(i) := '0';
        END IF;
```

```
      END LOOP;
      FOR i IN 0..2 LOOP
        misc_str(i + 18) := cnt_chr(i + 3);
      END LOOP;
      misc_str(7) := ' ';
      misc_str(17) := ' ';
      date;
      FOR i IN 33..39 LOOP
        fifth_part(i) := plate_serial_no(i);
      END LOOP;
      response := tbl_chg_char(cust, prog_1, 1, misc_str);
      response := tbl_chg_char(cust, prog_2, 1, time);
      response := tbl_chg_char(cust, prog_3, 1, part_descrip);
      response := tbl_chg_char(cust, prog_4, 1, plate_serial_no);
      response := tbl_chg_char(cust, prog_5, 1, fifth_part);
      beop_state := beop_done;

    WHEN beop_done =>                                        --STATE 2
      status := true;
      blk_dlt_state := blk_standby;
      set_ptr := 0;
      clr_ptr := 0;
      beop_state := beop_standby;
  END CASE;

RETURN status;

END blkdlt_eop;
-------------------------------------------------------------------
PROCEDURE blkdlt_main IS

BEGIN

  CASE blk_dlt_state IS
    WHEN blk_standby =>              --STATE 0   MANUAL BLOCK DELETES SET
      IF man_bl_flag AND nc_status(cyc_start_lt_on) THEN
        k_msg(6833);
        man_bl_flag := false;
      END IF;
      IF auto_msd_bool(automation_opt) AND rrise(56) THEN
        IF NOT rdout(blk_del_light) THEN
          p_val(118);
          IF t_val < float_1 THEN
            put_msg(6861, 5, 3);
          END IF;
          f_to_c(t_val, 14, 0, 1, man_blkdlt);
          FOR i IN 1..9 LOOP
            act_blkdlt(i) := man_blkdlt(4 + i);
          END LOOP;
          blk_dlt_state := blk_set_1;
          m_set := true;
          prelude_request(ptmgmt_lude);
        ELSE
          FOR i IN 1..9 LOOP
            enum_resp := block_delete_off(i);
          END LOOP;
          rdout(blk_del_light) := false;
        END IF;
      END IF;

    WHEN blk_start =>                                        --STATE 1
      p_msg(6820, 6);
      IF privilege_select(0) THEN
        blk_dlt_state := blk_search;
      END IF;
```

```
WHEN blk_search =>                                                --STATE 2
  FOR index IN 1..12 LOOP
    tbl_val_char(cust, prog_1, index, misc_str);
    FOR i IN 1..6 LOOP
      old_prog(i) := misc_str(i);
    END LOOP;
    IF prog_id = old_prog THEN
      c_to_i(misc_str, 18, 3, part_count);
      put_save_int(part_count, 20);
      FOR i IN 1..9 LOOP
        act_blkdlt(i) := misc_str(i + 7);
      END LOOP;
      tbl_val_char(cust, prog_2, index, cur_date);
      c_to_i(cur_date, 1, 2, old_day);
      c_to_i(cur_date, 8, 4, old_year);
      c_to_i(cur_date, 13, 2, old_time);
      FOR i IN 1..3 LOOP
        old_mon(i) := cur_date(i + 3);
      END LOOP;
      blk_dlt_state := blk_set_1;
      IF etso_again THEN
        act_blkdlt(8) := '1';
        misc_str(15) := '1';
        misc_str(16) := '0';
        response := tbl_chg_char(cust, prog_1, index, misc_str);
      END IF;
      EXIT;
    ELSIF index = 1 AND NOT etso_again THEN
      etso_again := true;
      enum_resp := parameter_change(118, float_10);
    ELSIF index = 12 THEN
      etso_again := false;
      part_count := 0;
      put_save_int(part_count, 20);
      clr_ptr := 0;
      blk_dlt_state := blk_clr;
    END IF;
  END LOOP;

WHEN blk_set_1 =>                                                 --STATE 3
  IF m_set OR compare THEN
    param_int := msd_int_table(165);
    IF (hr_ret > param_int) AND NOT m_set THEN
      clr_ptr := 0;
      blk_dlt_state := blk_clr;
    ELSE
      set_ptr := 0;
      blk_dlt_state := blk_set;
    END IF;
  END IF;

WHEN blk_set =>                                                   --STATE 4
  set_ptr := set_ptr + 1;
  IF set_ptr > 9 THEN
    IF etso_again THEN
      etso_again := false;
      clear_tov;
    END IF;
    IF m_set THEN
      m_set := false;
      prelude_req_off(ptmgmt_lude);
      blk_dlt_state := blk_standby;
    ELSE
      blk_dlt_state := blk_cyc;
    END IF;
  ELSE
     IF act_blkdlt(10 - set_ptr) = '0' OR act_blkdlt(10 - set_ptr) = ' '
        THEN
       enum_resp := block_delete_off(set_ptr);
     ELSE
```

```
        rdout(blk_del_light) := true;
        enum_resp := block_delete_on(set_ptr);
      END IF;
    END IF;

  WHEN blk_clr =>                                                   --STATE 5
    rdout(blk_del_light) := false;
    clr_ptr := clr_ptr + 1;
    IF clr_ptr > 9 THEN
      blk_dlt_state := blk_cyc;
      clear_tov;
    ELSE
      enum_resp := block_delete_off(clr_ptr);
    END IF;

  WHEN blk_cyc =>                                                   --STATE 6
    als_light := false;
    k_msg(6820);
    IF man_bl_flag THEN
      p_msg(6833, 6);                          -- TO TELL OPERATOR TO CHECK
      blk_dlt_state := blk_standby;
    ELSE
      CASE cyc_start_init IS
        WHEN success =>
          blk_dlt_state := blk_standby;
        WHEN OTHERS =>
          NULL;
      END CASE;
    END IF;
END CASE;

END blkdlt_main;
 -----------------------------------------------------------------------
END blkdlt;
```

```
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- * REVISION #CM001  10/14/85                                    *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH mcldat;   USE mcldat;
WITH rel6;     USE rel6;
WITH rel7;     USE rel7;

PACKAGE BODY bubdec IS

END bubdec;
```

```
-- ******************************************************************
-- *                                                                *
-- * SOFTWARE BY PAUL COLANANNI (A&ES) FOR                          *
-- * AIRCRAFT ENGINE BUSINESS GROUP / GENERAL ELECTRIC COMPANY      *
-- *                                                                *
-- *                                                                *
-- * THIS PROGRAM AND RELATED MATERIAL ARE THE PROPERTY OF THE      *
-- * GENERAL ELECTRIC CO. (G.E.) AND CONTAINS CONFIDENTIAL AND      *
-- * PROPRIETARY INFORMATION OF G.E. THIS PROGRAM, THE RELATED      *
-- * MATERIAL, AND THE INFORMATION CONTAIN   HEREIN, SHALL NOT      *
-- * BE DISCLOSED TO OTHERS WITHOUT WRITTEN PERMISSION OF G.E.,     *
-- * AND SHALL NOT BE DUPLICATED OR USED EXCEPT IN ACCORDANCE       *
-- * WITH THE LIMITED CONDITIONS UNDER WHICH IT WAS PROVIDED BY     *
-- * G.E.                                                           *
-- *                                                                *
-- * PROPERTY OF THE AIRCRAFT ENGINE BUSINESS GROUP OF THE          *
-- * GENERAL ELECTRIC COMPANY.                                      *
-- *                                                                *
-- ******************************************************************

WITH wndone;   USE wndone;
WITH mcldat;   USE mcldat;
WITH mcllib;   USE mcllib;
WITH wndtwo;   USE wndtwo;
WITH oemdec;   USE oemdec;
WITH atmlib;   USE atmlib;
WITH rel6;     USE rel6;
WITH rel7;     USE rel7;
WITH bubdec;   USE bubdec;
WITH wndbub;   USE wndbub;
WITH wndmth;   USE wndmth;
WITH oemmst;   USE oemmst;
WITH clock;    USE clock;
WITH tcntrl;   USE tcntrl;

PACKAGE BODY bubmcl IS

getting_data      : boolean := false;
putting_string    : boolean := false;
putting_data      : boolean := false;
respse            : table_status;
rnme_file         : boolean := false;
line_loc          : integer := 0;
clm_str           : string(1..clmrlg);
------------------------------------------------------------------
-- ***************************************************************
-- * THIS PROCEDURE RUNS AT POWER UP TIME AND INITIALIZES THE    *
-- * VARIABLES.                                                  *
-- ***************************************************************
PROCEDURE bubmcl_init IS

BEGIN

  FOR index IN 1..10 LOOP
    str_name(index) := ' ';
    str_old_name(index) := ' ';
  END LOOP;
  FOR index IN 1..rlg LOOP
    item1_str(index) := ' ';
    buffer_string(index) := ' ';
  END LOOP;
  clm_index := 2;
  item1_loc := plate_loc;

END bubmcl_init;
```

```
-----------------------------------------------------------------
-- ***************************************************************
-- * THIS PROCEDURE CONVERTS A STRING TO AN INTEGER              *
-- ***************************************************************
PROCEDURE c_to_i(array_in : IN OUT string;
                 posn : IN integer;
                 quantity : IN integer;
                 result : OUT integer) IS

BEGIN

  conv_char_to_int(array_in, posn, quantity, result, done);

END. c_to_i;
-----------------------------------------------------------------
-- ***************************************************************
-- * THIS PROCEDURE CONVERTS AN INTEGER TO A STRING              *
-- ***************************************************************
PROCEDURE i_to_c(int_in : IN integer;
                 width : IN integer;
                 posn : IN integer;
                 array_out : OUT string) IS

BEGIN

  conv_int_to_char(int_in, width, posn, array_out, done);

END i_to_c;
-----------------------------------------------------------------
-- ***************************************************************
-- * THIS PROCEDURE CONVERTS AN STRING TO A FLOAT                *
-- ***************************************************************
PROCEDURE c_to_f(array_in : IN OUT string;
                 posn : IN integer;
                 quantity : IN integer;
                 flt_out : OUT float) IS

BEGIN

  conv_char_to_flt(array_in, posn, quantity, flt_out, done);

END c_to_f;
-----------------------------------------------------------------
-- ***************************************************************
-- * THIS PROCEDURE CONVERTS A FLOAT TO A STRING                 *
-- ***************************************************************
PROCEDURE f_to_c(flt_in : IN float;
                 width : IN integer;
                 decpt : IN integer;
                 posn : IN integer;
                 array_out : OUT string) IS

BEGIN

  conv_flt_to_char(flt_in, width, decpt, posn, array_out, done);

END f_to_c;
-----------------------------------------
-- ***************************************************************
-- * THIS PROCEDURE OPENS A FILE AND POSITIONS THE POINTER TO A *
-- * LINE.                                                       *
-- ***************************************************************
PROCEDURE file_opn(nme : IN OUT string;
                   r_num : IN integer;
                   r_lgt : IN integer) IS
```

```
BEGIN

  open_file(10, nme, number, read_write, state);
  move_file_ptr(number, record_number, r_num, r_lgt, state);

END file_opn;
----------------------------------------------------------------
-- *************************************************************
-- * THIS PROCEDURE CLOSES A FILE                              *
-- *************************************************************
PROCEDURE file_close IS

BEGIN

  close_file(number, state);

END file_close;
----------------------------------------------------------------------
-- *************************************************************
-- * THIS PROCEDURE OBTAINS STRING DATA, A FLOAT VALUE OR AN    *
-- * INTEGER VALUE FROM A FILE. IT WILL ALSO PUT DATA IN A FILE *
-- *************************************************************
PROCEDURE get_str IS

BEGIN

  open_file(nm_lgt, str_name, number, read_write, state);
  IF state = ok THEN
    move_file_ptr(number, record_number, item1_rec, rlg, state);
    get_record_repos(number, rlg, buffer_string, state);
    IF rnme_file THEN
      FOR index IN 1..6 LOOP
        buffer_string(8 + index) := str_name(index);
      END LOOP;
      putting_string := true;
    END IF;
  ELSIF state = nonexistent_file THEN
    file_command := no_file;
  END IF;
  IF file_command /= no_file THEN
    IF getting_data THEN
      IF item1_is_int THEN
        c_to_i(buffer_string, item1_loc, item1_lgt, item1_int);
      ELSE
        c_to_f(buffer_string, item1_loc, item1_lgt, item1_flt);
      END IF;
      getting_data := false;
      file_command := get_data;
    ELSIF putting_string THEN
      IF NOT rnme_file THEN
        FOR index IN 1..item1_lgt LOOP
          buffer_string(item1_loc - 1 + index) := item1_str(index);
        END LOOP;
      END IF;
      put_record(number, rlg, buffer_string, state);
      putting_string := false;
      rnme_file := false;
      file_command := command_standby;
    ELSIF putting_data THEN
      IF item1_is_int THEN
        i_to_c(item1_int, item1_lgt, item1_loc, buffer_string);
      ELSE
        f_to_c(item1_flt, item1_lgt, dec_pt, item1_loc, buffer_string);
      END IF;
      put_record(number, rlg, buffer_string, state);
      putting_data := false;
```

```
      file_command := command_standby;
    ELSE
      file_command := get_data;
    END IF;
  END IF;
  item1_loc := plate_loc;
  file_close;

END get_str;
-------------------------------------------------------------
-- ***********************************************************
-- * THIS PROCEDURE COPIES DATA FROM THE TOOL CONFIGURATION   *
-- * FILE TO THE MAGAZINE TABLES.                              *
-- ***********************************************************
PROCEDURE file_to_table IS

loc_arr : ARRAY (0..5) OF integer;
lgt_arr : ARRAY (0..5) OF integer;

BEGIN

  loc_arr(0) := type_loc;
  loc_arr(1) := loc_loc;
  loc_arr(2) := ser_loc;
  loc_arr(3) := xos_loc;
  loc_arr(4) := zos_loc;
  loc_arr(5) := life_loc;
  lgt_arr(0) := type_lgt;
  lgt_arr(1) := loc_lgt;
  lgt_arr(2) := ser_lgt;
  lgt_arr(3) := xos_lgt;
  lgt_arr(4) := zos_lgt;
  lgt_arr(5) := life_lgt;

  str_name := "CONFIG.MCL";
  file_opn(str_name, 7, rlg);
  IF STATE /= OK THEN
    file_command := no_file;
  END IF;
  IF file_command /= no_file THEN
    FOR index IN 1..magazine_size LOOP
      get_record(number, rlg, buffer_string, state);
      FOR index_1 IN 0..2 LOOP
      c_to_i(buffer_string, loc_arr(index_1), lgt_arr(index_1), item1_int);
                                                                    --TYPE
        respse := tbl_chg_int(cust, mtype + index_1, index, item1_int);
      END LOOP;
      FOR index_2 IN 3..5 LOOP
      c_to_f(buffer_string, loc_arr(index_2), lgt_arr(index_2), item1_flt);
                                                                    --X O/S
      respse := tbl_chg_float(cust, mtype + index_2, index, item1_flt);
      END LOOP;
    END LOOP;
    file_close;
    file_command := get_data;
  END IF;

END file_to_table;
--------------------------------------------------------------------
-- ***********************************************************
-- * THIS PROCEDURE COPIES DATA FROM THE TOOL MAGAZINE TABLES  *
-- * TO THE TOOL CONFIGURATION FILE.                           *
-- ***********************************************************
PROCEDURE table_to_file IS

BEGIN
```

```
    str_name := "CONFIG.MCL";
    file_opn(str_name, 7, rlg);
    IF STATE /= OK THEN
      file_command := no_file;
    END IF;
    IF file_command /= no_file THEN
      FOR index IN 1..magazine_size LOOP
        get_record_repos(number, rlg, buffer_string, state);
   i_to_c(tbl_val_int(cust, m   e, index), type_lgt, type_loc, buffer_string);
   i_to_c(tbl_val_int(cust, s..., index), loc_lgt, loc_loc, buffer_string);
   f_to_c(tbl_val_float(cust, mxos, index), xos_lgt, 4, xos_loc, buffer_string
;
   f_to_c(tbl_val_float(cust, mzos, index), zos_lgt, 4, zos_loc, buffer_string
;
   f_to_c(tbl_val_float(cust, mlfe, index), life_lgt, 6, life_loc, buffer_stri
g);
   i_to_c(tbl_val_int(cust, ser, index), ser_lgt, ser_loc, buffer_string);
        FOR i IN 6..9 LOOP
          IF buffer_string(i) = ' ' THEN
            buffer_string(i) := '0';
          END IF;
          IF buffer_string(i + 45) = ' ' THEN
            buffer_string(i + 45) := '0';
          END IF;
        END LOOP;
        put_record(number, rlg, buffer_string, state);
      END LOOP;
      file_instald := false;
      config_instald := false;
      file_close;
      file_command := command_standby;
    END IF;

  END table_to_file;
  ---------------------------------------------------------------------
  -- **************************************************************
  -- * THIS PROCEDURE COPIES DATA FROM THE DATA TABLES AND          *
  -- * AND APPENDS IT TO THE PLATE CONFIGURATION FILE               *
  -- **************************************************************
  PROCEDURE qc_data IS

  str : string(1..1);
  loc_arr : ARRAY (0..4) OF integer;
  lgt_arr : ARRAY (0..4) OF integer;
  temp_int : integer;

  BEGIN

    temp_int := plate_index;
    loc_arr(0) := mn_loc;
    loc_arr(1) := mx_loc;
    loc_arr(2) := act_loc;
    loc_arr(3) := dev_loc;
    loc_arr(4) := oot_loc;
    lgt_arr(0) := mn_lgt;
    lgt_arr(1) := mx_lgt;
    lgt_arr(2) := act_lgt;
    lgt_arr(3) := dev_lgt;
    lgt_arr(4) := oot_lgt;
    str_name := "MATRAN.MCL";
    file_opn(str_name, insert_line + plate_index, rlg);
    data_in_tbl := true;
    FOR index IN 1..(rlg - 1) LOOP
      IF index < 9 THEN
        buffer_string(index) := str_old_name(index);
```

```
    ELSE
      buffer_string(index) := '-';
    END IF;
  END LOOP;
  buffer_string(rlg) := cr;
  put_record(number, rlg, buffer_string, state);
  plate_index := plate_index + 1;
  put_save_int(plate_index, 9);
  FOR index IN 1..tbl'limit LOOP
    IF tbl_val_float(cust, mx, index) /= float_0 THEN
      FOR index_1 IN 1..rlg LOOP
        buffer_string(index_1) := ' ',
      END LOOP;
    . tbl_val_char(cust, zone, index, zone_tbl_str);
      FOR index_1 IN 1..zone_lgt LOOP
        buffer_string(index_1) := zone_tbl_str(index_1);
      END LOOP;
      tbl_val_char(cust, tool_dt, index, tool_thing);
      FOR index_1 IN 1..prb_id_lgt LOOP
        buffer_string(prb_id_loc + index_1 - 1) := tool_thing(index_1);
      END LOOP;
      buffer_string(prb_id_loc) := '0';
      FOR index_1 IN 0..2 LOOP
        IF buffer_string(prb_id_loc + 4 + index_1) = ' ' THEN
          buffer_string(prb_id_loc + 4 + index_1) := '0';
        ELSE
          exit;
        END IF;
      END LOOP;
      FOR index_1 IN 0..4 LOOP
        f_to_c(tbl_val_float(cust, mn + index_1, index), lgt_arr
               (index_1), 4, loc_arr(index_1), buffer_string);
      END LOOP;
      tbl_val_char(cust, star, index, str);
      buffer_string(str_loc) := str(1);
      i_to_c(tbl_val_int(cust, cause_code, index), cause_lgt, cause_loc,
             buffer_string);
      buffer_string(rlg) := cr;
      put_record(number, rlg, buffer_string, state);
      IF state > ok THEN
        plate_index := temp_int;
        exit;
      END IF;
      plate_index := plate_index + 1; --PLATE INDEX RESET TO 1 IN DATE CM
      put_save_int(plate_index, 9);
    END IF;
  END LOOP;
  IF plate_index > temp_int THEN
    FOR index IN 1..(rlg - 1) LOOP
      buffer_string(index) := '*';
    END LOOP;
    put_record(number, rlg, buffer_string, state);
    str_name := "(END,MCL) ";
    str_name(10) := cr;
    put_record(number, 10, str_name, state);
    file_command := command_standby;
  ELSE
    file_command := no_file;
  END IF;
  file_close;

END qc_data;
-----------------------------------------------------------------
-- ***********************************************************
-- * THIS PROCEDURE PUTS THE START OR FINISH DATES IN THE      *
-- * PLATE CONFIGURATION FILE                                  *
```

```
-- ****************************************************************
PROCEDURE add_date IS

temp_int : integer;

BEGIN

  open_file(nm_lgt, str_name, number, read_write, state);
  IF state = ok THEN
    IF item1_rec = fin_date_rnm THEN
      move_file_ptr(number, record_number, start_date_rnm, rlg, state);
      FOR index IN 1..2 LOOP
        get_record_repos(number, rlg, buffer_string, state);
        tbl_val_char(cust, cim, index, time);
        FOR i IN 1..20 LOOP
          buffer_string(plate_loc - 1 + i) := time(i);
        END LOOP;
        put_record(number, rlg, buffer_string, state);
      END LOOP;
      get_record_repos(number, rlg, buffer_string, state);
      f_to_c(lost_time, 6, 3, plate_loc, buffer_string);
      put_record(number, rlg, buffer_string, state);
      get_record_repos(number, rlg, buffer_string, state);
      FOR index IN 0..7 LOOP
        temp_int := tbl_val_int(cust, msg, index + 1);
        IF temp_int /= 0 THEN
          i_to_c(temp_int, 4, plate_loc + (5 * index), buffer_string);
        ELSE
          FOR i IN (plate_loc + (5 * index))..56 LOOP
            buffer_string(i) := ' ';
          END LOOP;
          exit;
        END IF;
      END LOOP;
      i_to_c(tbl_val_int(cust, msg, 10), 1, 63, buffer_string);
      put_record(number, rlg, buffer_string, state);
      get_record_repos(number, rlg, buffer_string, state);
      f_to_c(proc_time, 6, 3, plate_loc, buffer_string);
      IF store_e THEN
        store_e := false;
        buffer_string(24) := 'E';
      END IF;
      put_record(number, rlg, buffer_string, state);
      get_record_repos(number, rlg, buffer_string, state);
      f_to_c(rework_time, 6, 3, plate_loc, buffer_string);
      put_record(number, rlg, buffer_string, state);
      get_record_repos(number, rlg, buffer_string, state);
      FOR index IN 0..7 LOOP
        temp_int := tbl_val_int(cust, var, index + 1);
        IF temp_int /= 0 THEN
          i_to_c(temp_int, 4, plate_loc + (5 * index), buffer_string);
        ELSE
          FOR i IN (plate_loc + (5 * index))..56 LOOP
            buffer_string(i) := ' ';
          END LOOP;
          exit;
        END IF;
      END LOOP;
      i_to_c(tbl_val_int(cust, var, 10), 1, 63, buffer_string);
      put_record(number, rlg, buffer_string, state);
      plate_index := 1;
      put_save_int(plate_index, 9);
    ELSE
      IF NOT cim_time_on THEN
        response := tbl_chg_char(cust, cim, 1, time);
        plate_index := 1;
```

```
      put_save_int(plate_index, 9);
    END IF;
    part_descrip(14) := ' ';
    part_descrip(15) := 'O';
    part_descrip(16) := 'P';
    part_descrip(17) := '.';
    part_descrip(21) := ' ';
    move_file_ptr(number, record_number, pr_id_rnm, rlg, state);
    get_record(number, rlg, buffer_string, state);
    FOR index IN 1..pr_id_lgt LOOP
      prgrm_id(index) := buffer_string(plate_loc + index - 1);
    END LOOP;
    get_record(number, rlg, buffer_string, state);
    FOR index IN 1..pr_desc_lgt LOOP
      part_descrip(index) := buffer_string(plate_loc + index - 1);
    END LOOP;
    get_record(number, rlg, buffer_string, state);
    FOR index IN 1..op_numb_lgt LOOP
      part_descrip(17 + index) := buffer_string(plate_loc + index - 1);
    END LOOP;
    get_record(number, rlg, buffer_string, state);
    FOR index IN 1..pr_stat_lgt LOOP
      part_descrip(21 + index) := buffer_string(plate_loc + index - 1);
    END LOOP;
    move_file_ptr(number, record_number, 1, rlg, state);
    get_record(number, rlg, buffer_string, state);
    FOR index IN 1..5 LOOP
      proj_plate_no(index) := buffer_string(15 + index);
    END LOOP;
    temp_int := 1;
    FOR i IN 7..11 LOOP
      move_file_ptr(number, record_number, 3 * i, rlg, state);
      get_record(number, rlg, buffer_string, state);
      FOR index IN 0..6 LOOP
        plate_serial_no(temp_int) := buffer_string(plate_loc + index);
        temp_int := temp_int + 1;
      END LOOP;
      temp_int := temp_int + 1;
    END LOOP;
   END IF;
   file_command := command_standby;
  ELSIF state = nonexistent_file THEN
   file_command := no_file;
  END IF;
  file_close;

END add_date;
-----------------------------------------------------------------
-- ************************************************************
-- * THIS PROCEDURE COPIES DATA FROM THE VERIFY FILE TO THE     *
-- * VERIFY TABLES.                                            *
-- ************************************************************
PROCEDURE verify_to_table IS

the_strin : array (1..2) of string(1..26);
write_str : string(1..26);

BEGIN

  str_name := "VERIFY.MCL";
  file_opn(str_name, 2, rlg);
  FOR index IN 1..10 LOOP
    get_record(number, rlg, buffer_string, state);
    FOR i IN 1..26 LOOP
      the_strin(1)(i) := buffer_string(i);
      the_strin(2)(i) := buffer_string(i + 26);
```

```
    END LOOP;
    FOR i IN 0..1 LOOP
      write_str := the_strin(i + 1);
      response := tbl_chg_char(cust, (verify_a + i), index, write_str);
    END LOOP;
  END LOOP;
  file_close;
  file_command := command_standby;

END verify_to_table;
----------------------------------------------------------------------
-- ************************************************************
-- * THIS PROCEDURE COPIES DATA FROM THE VERIFY TABLE TO THE     *
-- * VERIFY FILE.                                                *
-- ************************************************************
PROCEDURE verify_to_file IS

the_strin : array (1..2) of string (1..26);
write_str : string (1..26);

BEGIN

  str_name := "VERIFY.MCL";
  file_opn(str_name, 2, rlg);
  FOR index IN 1..10 LOOP
    get_record_repos(number, rlg, buffer_string, state);
    FOR i IN 0..1 LOOP
      tbl_val_char(cust, (verify_a + i), index, write_str);
      the_strin(i + 1) := write_str;
    END LOOP;
    FOR i IN 1..26 LOOP
      buffer_string(i) := the_strin(1)(i);
      buffer_string(i + 26) := the_strin(2)(i);
    END LOOP;
    put_record(number, rlg, buffer_string, state);
  END LOOP;
  file_close;
  file_command := command_standby;

END verify_to_file;
----------------------------------------------------------------------
-- ************************************************************
-- * THIS PROCEDURE ERASES DATA FROM THE PROJECT PLATE           *
-- * CONFIGURATION FILE.                                         *
-- ************************************************************
PROCEDURE transf_reset IS

numb_2 : integer;

BEGIN

  IF reworking THEN
    str_old_name := "MATRAN.MCL";
  ELSE
    str_old_name := "DETRAN.MCL";
  END IF;
  str_name := "TEMPRY.MCL";
  rename_file(old_lgt, str_old_name, nm_lgt, str_name, state);
  IF state = ok THEN
    create_file(10, str_old_name, state);
    file_opn(str_name, 1, rlg);
    open_file(10, str_old_name, numb_2, read_write, state);
    FOR index IN 1..37 LOOP
      get_record(number, rlg, buffer_string, state);
      put_record(numb_2, rlg, buffer_string, state);
    END LOOP;
```

```
    str_name := "(END,MCL) ";
    str_name(10) := cr;
    put_record(numb_2, 10, str_name, state);
    file_close;
    str_name := "TEMPRY.MCL";
    delete_file(10, str_name, state);
  END IF;
  close_file(numb_2, state);
  IF reworking THEN
    file_command := command_standby;
  ELSE
    file_command := get_data;
  END IF;

END transf_reset;
----------------------------------------------------------------------
-- ****************************************************************
-- * THIS PROCEDURE COPIES MATRAN FILE INTO A PUTRAN FILE          *
-- ****************************************************************
PROCEDURE copy_a_file IS

numb_2 : integer;

BEGIN

  str_old_name := "MATRAN.MCL";
  str_name := "RWTRAN.MCL";
  create_file(10, str_name, state);
  file_opn(str_old_name, 1, rlg);
  open_file(10, str_name, numb_2, read_write, state);
  FOR index IN 1..100 LOOP
    get_record(number, rlg, buffer_string, state);
    IF state = ok THEN
      put_record(numb_2, rlg, buffer_string, state);
    ELSE
      exit;
    END IF;
  END LOOP;
  file_close;
  close_file(numb_2, state);
  file_command := clear_transfer;

END copy_a_file;
----------------------------------------------------------------------
-- ****************************************************************
-- * THIS PROCEDURE DELTES A FILE                                  *
-- ****************************************************************
PROCEDURE del_a_file IS

BEGIN

  IF delete_putran THEN
    str_name := "PUTRAN.MCL";
    delete_putran := false;
  ELSE
    str_name := "PUTRAN.MCL";
    delete_config := false;
  END IF;
  delete_file(10, str_name, state);
  file_command := command_standby;

END del_a_file;
----------------------------------------------------------------------
-- ****************************************************************
-- * THIS PROCEDURE IS THE MAIN PROGRAM AND WILL CALL THE          *
-- * CORRECT PROCEDURE TO EXECUTE ITS FUNCTION.                    *
```

```
-- ***************************************************************
PROCEDURE bubble_io_mcl IS

BEGIN

  CASE file_command IS
    WHEN command_standby =>  --WAIT FOR NEW COMMAND FROM NORMAL MCL STATE 0
      IF bubmcl_cancel THEN
        bubmcl_cancel := false;
      END IF;

    WHEN get_data =>  --NORMAL MCL WILL OBTAIN DATA FROM VARIABLES  STATE 1
      IF bubmcl_cancel THEN                --AND THEN RESET CASE TO STANDBY
        file_command := command_standby;
      END IF;

    WHEN rename =>                                 --RENAME A FILE   STATE 2
      rename_file(old_lgt, str_old_name, nm_lgt, str_name, state);
      IF state = ok THEN
        rnme_file := true;
        iteml_rec := 1;
        get_str;
      ELSIF state = nonexistent_file THEN
        file_command := no_file;
      ELSIF state = file_exists THEN
        dupfle := true;                  --NOTIFY HOST FILE ALREADY EXISTS
        file_command := command_standby;
      END IF;

    WHEN g_str =>  --OBTAIN A RECORD AND GET STRING DATA BACK       STATE 3
      get_str;                                          --TO THE NORMAL MCL

    WHEN g_data =>   --OBTAIN A RECORD AND GET INTEGER OR FLOAT     STATE 4
      getting_data := true;                     --DATA BACK TO THE NORMAL MCL
      get_str;

    WHEN p_str =>  --PUT STRING DATA BACK INTO A RECORD             STATE 5
      putting_string := true;
      get_str;

    WHEN p_data =>  --PUT INTEGER OR FLOAT DATA INTO A RECORD       STATE 6
      putting_data := true;
      get_str;

    WHEN trans_to_table =>  --TRANSFER A RECORD INTO TABLES         STATE 7
      file_to_table;

    WHEN trans_to_file =>  --TRANSFER TABLE DATA TO A FILE          STATE 8
      table_to_file;

    WHEN date_file =>  --ADDS DATE TO PLATE CONFIGURATION FILE     STATE  9
      add_date;

    WHEN record_qc_data =>  --RECORD QC DATA FROM TABLES           STATE 10
      qc_data;

    WHEN verfy_to_table =>  --TRANSFERS VERIFY FILE TO TABLES      STATE 11
      verify_to_table;

    WHEN verfy_to_file =>  --TRANSFERS VERIFY TABLES TO FILE       STATE 12
      verify_to_file;

    WHEN copy_file =>                          --COPY A FILE       STATE 13
      copy_a_file;

    WHEN no_file =>                         -- NO FILE EXISTS      STATE 14
```

```
      IF bubmcl_cancel THEN
        file_command := command_standby;
      END IF;

    WHEN clear_transfer =>          --CLEARS DATA FROM TRANSF.MCL    STATE 15
      transf_reset;

    WHEN delete_a_file =>                        --DELETES A FILE  STATE 16
      del_a_file;
  END CASE;

END bubble_io_mcl;
-------------------------------------------------------------------------------
END bubmcl;

-- *****************************************************************
-- *                                                               *
-- * SOFTWARE BY BRYAN IRVING (A&ES) FOR                           *
-- * AIRCRAFT ENGINE BUSINESS GROUP / GENERAL ELECTRIC COMPANY     *
-- *                                                               *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *                                                               *
-- *****************************************************************

-- *****************************************************************
-- *                CHIP MANAGEMENT TASK                           *
-- *   THIS PACKAGE WILL TRACK THE ACCUMULATION OF CHIPS(SWARF)    *
-- * BEING ADDED TO THE CHIP BUCKET BY THE CURRENT PART PRGM.      *
-- * AND MANAGE THE REQUEST FOR AGV SERVICE(PICK UP,DELIVERY       *
-- * EXCHANGE,DUMP). THIS PACKAGE MUST RUN BEFORE THE CONVEYOR     *
-- * IS ALLOWED TO RUN EACH PASS THROUGH THE PART PROGRAM.         *
-- * IT WILL KEEP TRACK OF THE LAST RUN MATERIAL TYPE, CURRENT     *
-- * CONTAINER VOLUME AVAILABLE AND TOTAL CONTAINER VOLUME IN      *
-- * BUB FILE SWARFF.MCL WHICH IS UPDATED EVERY END-OF-PROGRAM     *
-- * OR ABORT TIME. IF ANY OF THE PROGRAMMED OR FILE VARIABLES     *
-- * USED BY THIS TASK ARE FOUND TO  BE  UNEXCEPTABLE  , PART      *
-- * PROGRAM EXECUTION WILL STOP AT THE NEXT BLOCK BOUNDARY AND    *
-- * A CLEAR OR CANCEL WILL BE NECESSARY TO RECOVER.               *
-- *    CONDITIONS FOR AGV SERVICE ARE...NO CHIP CONTAINER AT      *
-- * WORKSTATION,OLD /= NEW MATERIAL TYPE,ADDED CHIP VOLUME        *
-- * MORE THAN CURRENT VOLUME AVAILABLE,NEW MATERIAL TYPE ='000'*
-- * AND MDI MODE SELECTED.   (SEE COMMENTS FOR ADDITIONAL INFO)*
-- *****************************************************************

WITH wndone;   USE wndone;
WITH mcldat;   USE mcldat;
WITH mcllib;   USE mcllib;
WITH wndtwo;   USE wndtwo;
WITH wndstd;   USE wndstd;
WITH wndmth;   USE wndmth;
WITH atmlib;   USE atmlib;
WITH rel5;     USE rel5;
WITH rel6;     USE rel6;
WITH rel7;     USE rel7;
WITH oemdec;   USE oemdec;
WITH oemmst;   USE oemmst;
WITH bubdec;   USE bubdec;
WITH dncdec;   USE dncdec;
WITH dncmcl;   USE dncmcl;
WITH menu;     USE menu;
```

```
WITH agvmon;   USE agvmon;
WITH mclax;    USE mclax;
WITH convor;   USE convor;
WITH tcntrl;   USE tcntrl;
WITH spcont;   USE spcont;
WITH oemspn;   USE oemspn;

PACKAGE BODY chpmgt IS

msgs_os            : boolean := false;
option_stp         : boolean := false;
filter             : boolean;
default_off_time : integer;
-----------------------------------------------------------------------
PROCEDURE chpmgt_init IS

BEGIN

  cnvr_on_time := 4500;
  default_off_time := 10;
  cnvr_off_time := default_off_time;
  select_material := truncate(150);
  material_type := tbl_val_int(cust, mat, 1);
  convyr_off_lmt := parameter_value(155);

END chpmgt_init;
-----------------------------------------------------------------------
PROCEDURE do_msg(msg : IN integer;
                 matl : IN integer;
                 tim_val : IN float) IS

msgstr :- str64;

BEGIN

  i_to_c(matl, 3, 1, msgstr);
  file_msg_insert(1, 3, msgstr);
  f_to_c(tim_val, 6, 2, 1, msgstr);
  file_msg_insert(2, 6, msgstr);
  p_msg(msg, 5);
  start_timer(page_chng_tmr, 100);

END do_msg;
-----------------------------------------------------------------------
PROCEDURE chpmgt_cancel IS

BEGIN

  IF chpmgt_fault /= 0 THEN
    kill_msg(chpmgt_fault);
    chpmgt_state := chpmgt_stdby;
    chpmgt_master := auto_run;
    chpmgt_fault := 0;
    cnt_dwn;
  ELSIF chpmgt_state /= wait_for_agv THEN
    chpmgt_state := chpmgt_stdby;
  END IF;
  IF a_pickup THEN
    do_msg(6806, material_type, float_0);
  END IF;
  IF a_delivr THEN
    do_msg(6807, select_material, convyr_off_lmt);
  END IF;
  msgs_os := false;
  postlude_req_off(chips_inhib);

END chpmgt_cancel;
-----------------------------------------------------------------------
FUNCTION chpmgt_ok RETURN boolean IS

chpmgt_status : boolean;

BEGIN

  chpmgt_status := chpmgt_fault = 0;
```

```
RETURN chpmgt_status;

END chpmgt_ok;
------------------------------------------------------------------------
PROCEDURE go_agv IS

BEGIN

  space_avail := false;
  vol_aval := float_0;
  t_val := vol_aval;
  tb_fl(0, 0, swrf, 2);
  chpmgt_state := wait_for_agv;
  IF NOT agv_inprgs THEN
    IF ldin(chip_cont_inpos) THEN
      a_pickup := true;
      put_save_bool(a_pickup, 24);
      msgs_os := false;
      purge_conveyor := 1;
    END IF;
    a_delivr := true;
    put_save_bool(a_delivr, 23);
  END IF;
  chip_flag := true;

END go_agv;
------------------------------------------------------------------------
PROCEDURE chip_data_eop IS

BEGIN

  IF NOT agv_inprgs THEN
    response := tbl_chg_int(cust, mat, 1, material_type);
    t_val := vol_aval;
    tb_fl(0, 0, swrf, 2);
  ELSE                              --IF AGV NOT READY SAVE THIS AND DO LATER
    agv_eop_reqd := true;
  END IF;
  chip_cmplt := true;
  cnvr_off_time := default_off_time;
  enum_resp := parameter_change(154, int_to_float(default_off_time));

END chip_data_eop;
------------------------------------------------------------------------
--   CONVYR_OFF_LMT IS THE AMOUNT OF TIME THAT THE CONVEYOR IS ALLOWED TO
--          BE OFF AND ACCUMULATING CHIPS WHILE WAITING FOR CONTNER DELIVY
------------------------------------------------------------------------
PROCEDURE chpmgt_main IS

BEGIN

  CASE chpmgt_master IS
    WHEN auto_init =>
      IF auto_msd_bool(automation_opt) THEN
        IF a_delivr OR a_pickup THEN
          chpmgt_state := wait_for_agv;
        END IF;
        chpmgt_master := auto_run;
        filter := false;
      END IF;

    WHEN auto_run =>
      IF option_stp AND NOT opt_stop_act THEN
        IF NOT nc_status(cyc_start_lt_on) THEN
          set_busy(manual_pb);
```

```
    opt_stop_act := true;
  END IF;
END IF;
IF chpmgt_ok THEN
  CASE chpmgt_state IS
    WHEN chpmgt_stdby =>                                          --STATE 0
      IF automcode(a102) THEN
        eopgm_cmplt := false;
        chip_flag := false;
        t_val := parameter_value(152);
        tb_fl(0, 0, swrf, 1);
        container_vol := t_val;
        pp_c_tim := parameter_value(121);
        add_vol := parameter_value(153);
        cnvr_off_time := truncate(154);
        new_col := parameter_value(155);
        IF chg_chip_cont THEN                        --HOST REQ CHIP CONT CHG
          vol_aval := float_0;                                 --GET VOL AVAIL
        ELSE
          tb_fl(swrf, 2, 0, 0);
          vol_aval := t_val;
        END IF;
        p_va '150);
        IF t_val < - float_1 OR t_val > float_1000 THEN
          chpmgt_fault := 6494;                   --SELECT MATL VAL ILLEGAL
        ELSIF pp_c_tim <= float_0 OR new_col <= float_0 THEN
          chpmgt_fault := 6492;                     --PROG CUT TIME ILLEGAL
        ELSIF (add_vol > container_vol) OR (add_vol <= float_0) THEN
          chpmgt_fault := 6490;                         --ADDED VOL ILLEGAL
        ELSIF vol_aval > container_vol THEN
          chpmgt_fault := 6491;                         --VOL AVAIL TOO BIG
        END IF;
     --CHECK FOR NEW CONVEYOR OFF LIMIT TIME AND ADJUST OLD IF NEEDED
        IF chpmgt_fault = 0 THEN
          select_material := truncate(150);
          IF select_material = 0 AND NOT rdout(mdi_light) THEN
            chpmgt_fault := 6493;                          --MUST BE IN MDI
          ELSIF old_col > float_0 AND convyr_off_lmt > float_0 AND
                convyr_off_lmt /= old_col THEN
            convyr_off_lmt := convyr_off_lmt * (new_col / old_col);
          ELSE
            convyr_off_lmt := new_col;
          END IF;
          old_col := new_col;
          material_type := tbl_val_int(cust, mat, 1);  --GET MAT TYPE
          chpmgt_state := chk_values;
          automcode(a102) := false;
        END IF;
      END IF;

    WHEN chk_values =>                                            --STATE 1
      IF select_material = 0 AND rdout(mdi_light) THEN
        a_pickup := true;                             --START AGV PICK UP
        put_save_bool(a_pickup, 24);
        msgs_os := false;
        chpmgt_state := wait_for_agv;                               --GO WAIT
      ELSE
        IF vol_aval > float_0 THEN
          IF select_material = material_type AND
             ldin(chip_cont_inpos) THEN
            IF vol_aval < add_vol THEN
              go_agv;
            ELSE
              vol_aval := vol_aval - add_vol;
              chpmgt_state := chpmgt_stdby;
              k_msg(6806);
```

```
                k_msg(6807);
                chip_flag := true;
                space_avail := true;
              END IF;
            ELSE                       --SELECT MATL /= MATL TYPE OR NO CONTNR
              go_agv;                                    --PROCEDURE,SEE ABOVE
            END IF;
          ELSE
            go_agv;
          END IF;
        END IF;
        postlude_req_off(chips_inhib);

      WHEN wait_for_agv =>                                          --STATE 2
        IF agv_cmplt THEN
          IF ldin(chip_cont_inpos) THEN
            IF vol_aval <= float_0 THEN
              vol_aval := container_vol - add_vol;
            END IF;
            material_type := select_material;
            response := tbl_chg_int(cust, mat, 1, material_type);
            tb_fl(swrf, 1, swrf, 2);
            space_avail := true;
            IF agv_eop_reqd THEN
              chip_data_eop;
              IF chip_cmplt THEN
                agv_eop_reqd := false;
                agv_cmplt := false;
                chpmgt_state := chpmgt_stdby;
              END IF;
              chg_chip_cont := false;
            ELSE
              agv_cmplt := false;
              chpmgt_state := chpmgt_stdby;
            END IF;
          ELSIF select_material = 0 THEN
            material_type := select_material;
            vol_aval := float_0;
            chip_data_eop;
            IF chip_cmplt THEN
              chpmgt_state := chpmgt_stdby;
              agv_cmplt := false;
            END IF;
          ELSE
            chpmgt_state := chpmgt_stdby;
            agv_cmplt := false;
          END IF;
        ELSIF automcode(a102) THEN
          chpmgt_state := chpmgt_stdby;
        END IF;
      END CASE;
--*******************************************************************
--*   THE FOLLOWING STATE (chp_agv_st) IS USED TO INITIATE AGV      *
--* CHIP CONTAINER SERVICE.  THERE ARE 3 TYPES OF SERVICE THAT      *
--* CAN BE REQUESTED, PICK-UP, DELIVERY, or EXCHANGE.  SERVICE      *
--* IS STARTED BY EITHER THE CHIPS MANAGEMENT CODE OR END OF        *
--* PROGRAM (IN THE CASE WHERE THE HOST REQUESTS A DUMP) CODE       *
--* BY SETTING ONE OR BOTH OF THE PICK_UP,DELIVERY FLAGS. THIS      *
--* STATE WILL SENSE WHICH FLAG(S) IS SET, DISPLAY THE CORRECT      *
--* MESSAGES ,CHANGE STATE AND SEND THE CORRESPONDING COMMAND TO    *
--* THE HOST AND WAIT FOR AN ACKNOWLEDGE. ONCE RECEIVED IT WILL     *
--* CHANGE STATE AND WAIT FOR A COMPLETE SIGNAL FROM THE AGV        *
--* MONITOR.  WHEN RECEIVED IT WILL SET A FLAG FOR THE CALLING      *
--* PACKAGE, CLEAR THE MESSAGES AND GO TO STANDBY.                  *
--*    WHEN THE HOST IS NOT AVAILABLE THIS CASE WILL SENSE WHEN     *
--* THE CHIP CONTAINER IS PICKED UP AND DELIVERED BY MONITORING     *
```

```
--* THE INPUT. MESSAGE DISPLAY AND COMPLETE FLAGS ARE SAME AS       *
--* ABOVE.                                                           *
--*******************************************************************
        CASE chp_agv_st IS
          WHEN stdby =>                                          --STATE 0
            IF NOT agv_inprgs OR standby_chips THEN
              IF a_pickup THEN
                IF a_delivr THEN
                  c_cmd := 21;                             --EXCHANGE REQUEST
                  IF NOT msgs_os THEN
                    do_msg(6807, select_material, convyr_off_lmt);
                    msgs_os := true;
                  END IF;
                ELSE
                  c_cmd := 5;                               --PICK UP REQUEST
                END IF;
                IF NOT timer_running(page_chng_tmr) AND msgs_os THEN
                  do_msg(6806, material_type, float_0);        --CONT PU MSG
                  chp_agv_st := send_cmd;
                  msgs_os := false;
                END IF;
              ELSIF a_delivr THEN
                c_cmd := 6;                                --DELIVERY REQUEST
                IF NOT timer_running(page_chng_tmr) THEN
                  do_msg(6807, select_material, convyr_off_lmt);
                  chp_agv_st := send_cmd;
                END IF;
              END IF;
            ELSE
              chp_agv_st := send_cmd;          --IF AGV SERVICE IN PROGRESS
            END IF;
            agv_rdy_cmplt := false;

          WHEN send_cmd =>                                       --STATE 1
            IF host_available AND prog_chk_cmplt THEN
              IF agv_inprgs AND NOT standby_chips THEN
                chp_agv_st := wait_cmplt;
              ELSIF command_request = 0 THEN
                command_request := c_cmd;
                dnc_bool(mc2000_cmd_req) := true;
                agv_inprgs := true;
                chp_agv_st := wait_cmplt;
                standby_chips := false;
              END IF;
            ELSE                                            --MANUAL EXCHANGE
              IF a_pickup THEN
                agv_inprgs := true;
                IF NOT ldin(chip_cont_inpos) THEN
                  IF NOT filter THEN
                    start_timer(no_bounce_tmr, 500);
                    filter := true;
                  ELSIF NOT timer_running(no_bounce_tmr) THEN
                    filter := false;
                    space_avail := false;                 --TURN OFF CONVEYOR
                    a_pickup := false;
                    put_save_bool(a_pickup, 24);
                    k_msg(6806);
                    IF NOT a_delivr THEN
                      agv_cmplt := true;
                      chp_agv_st := stdby;
                    END IF;
                  END IF;
                ELSE
                  filter := false;
                END IF;
              ELSIF a_delivr THEN
```

```
          c_cmd := 6;
          agv_inprgs := true;
          IF Idin(chip_cont_inpos) THEN
            IF NOT filter THEN
              start_timer(no_bounce_tmr, 500);
              filter := true;
            ELSIF NOT timer_running(no_bounce_tmr) THEN
              filter := false;
              agv_inprgs := false;
              a_delivr := false;
              put_save_bool(a_delivr, 23);
              agv_cmplt := true;          --FOR USE IN EOPGM CONT CHNG
              chp_agv_st := stdby;
              k_msg(6807);
            END IF;
          ELSE
            filter := false;
          END IF;
        END IF;
      END IF;

    WHEN wait_cmplt =>                    --STATE 2 AUTO WAIT FOR AGV
      IF a_pickup THEN
        IF agv_rdy_cmplt THEN             --SET IN AGV CMPLT STATE
          IF agv_fault = 0 THEN
            IF NOT a_delivr THEN
              agv_inprgs := false;
              agv_cmplt := true;
            END IF;
            k_msg(6806);
            a_pickup := false;
            put_save_bool(a_pickup, 24);
            chp_agv_st := stdby;
          END IF;
        ELSIF agv_status = chp_pu THEN              --IF AGV INPSN
          space_avail := false;                  --TURN OFF CONVEYOR
        END IF;
      ELSIF a_delivr THEN
        IF agv_rdy_cmplt AND agv_fault = 0 THEN
          k_msg(6807);
          set_busy(auto_pb);
          agv_inprgs := false;
          a_delivr := false;
          put_save_bool(a_delivr, 23);
          chp_agv_st := stdby;
          agv_cmplt := true;
        END IF;
      END IF;
      IF host_available THEN
        IF standby_chips THEN
          chp_agv_st := stdby;
        END IF;
      ELSE
        chp_agv_st := send_cmd;
      END IF;
    END CASE;
-- ***************************************************************
-- *                  CONVEYOR MONITOR                           *
-- *  THIS STATE WILL CONTROL THE CONVEYOR OPERATION.  IT        *
-- * WILL NOT ALLOW THE CONVEYOR TO RUN UNTIL THE CHIP MANAGE-   *
-- * TASK HAS RUN FOR THE CURRENT ACTIVE PART PROGRAM. IT WILL   *
-- * RESPOND TO AN MCODE TO START THE CONVEYOR AND AN MCODE TO   *
-- * DELAY-TO-A-STOP(PURGE) THE CONVEYOR.(*SEE NOTE !).  WHEN    *
-- * THE CHIP MGMNT PKG DETERMINES THAT THE CONTAINER IS FULL    *
-- * A FLAG IS SET TO INDICATE TO THE CONVEYOR PKG TO TURN OFF   *
-- * THE CONVEYOR. THE CONVEYOR PKG WILL THEN ALLOW THE PROGRAM *
```

```
-- * TO RUN UNTIL THE CONVEYOR OFF TIME LIMIT IS REACHED OR      *
-- * EXCEEDED. AT THIS TIME AN OPTION STOP IS ACTIVATED AND THE *
-- * PROGRAM WILL STOP ON THE NEXT M01 ENCOUNTERED. UPON PICKUP *
-- * AND DELIVERY OF THE CONTAINER IF WITHIN TIME LIMITS,THE    *
-- * PROGRAM WILL BE AUTOMATICALLY RESTARTED IF THE WORKSTATION *
-- * OPERATING MODE IS READY_AUTO, OTHERWISE; A MSG WILL BE     *
-- * DISPLAYED TO INDICATE TO THE ATTENDANT WHAT ACTIONS ARE    *
-- * NECESSARY.                                                 *
-- ***************************************************************
      CASE convey_state IS
        WHEN convey_standby =>                                  --STATE 0
          IF automcode(a203) THEN
            IF NOT chip_flag THEN
              chpmgt_fault := 6481;           --CHIP MNGMNT NOT XCUTD MSG
              mcode_val(m203) := falsc;
            ELSE
              IF space_avail AND ldin(chip_cont_inpos) THEN
                mcode_val(m203) := true;                    --START CONVEYO

              END IF;
              convey_state := convey_monitor;
            END IF;
            automcode(a203) := false;
          ELSIF automcode(a204) THEN
            automcode(a204) := false;
            convey_state := off_clear;
          ELSIF agv_inprgs THEN
            convey_state := t_chk;
          END IF;

        WHEN convey_monitor =>                                  --STATE 1
          IF automcode(a204) OR automcode(a203) THEN
            convey_state := convey_standby;
          ELSE
            IF space_avail AND ldin(chip_cont_inpos) AND
               ldin(chip_cvr_slip) THEN
              postlude_req_off(chips_inhib);
            ELSE
              mcode_val(m203) := false;                       --TURN IT OFF
              mcode_val(m204) := true;                      --TURN IF OFF NOW
              convey_state := t_chk;
            END IF;
          END IF;

        WHEN convey_off_state =>                                --STATE 2
          IF NOT ldin(chip_cvr_slip) OR NOT space_avail OR
             NOT ldin(chip_cont_inpos) THEN
            IF NOT timer_running(convyr_off_tmr) AND
               not option_stp AND (oem_spin_dir /= s_stop) THEN
              convyr_off_lmt := convyr_off_lmt - 0.25;
              convey_state := t_chk;
            END IF;
          ELSE              --IF SPACE IS OR BECOMES AVAILABLE GOTO STDBY
            IF rdout(cyc_start_light) THEN          --IF CYCLE START IS ON
              cyc_strt_stor := false;                --DONT TRY TO RESTART
            ELSIF NOT rdout(cyc_start_light) AND cyc_strt_stor AND
                 ((ws_status = ready_auto) OR rrise(cycle_start)) THEN
              cyc_strt_on := true;
              cyc_strt_stor := false;
            END IF;
            IF option_stp THEN
              option_stp := false;
              opt_stop_act := false;
              IF rdout(op_stop_light) AND NOT man_opt_stop THEN
                set_busy(option_stop);
              END IF;
```

```
          END IF;
          k_msg(6849);
          convyr_off_lmt := old_col;
          IF NOT eopgm_cmplt THEN                    --IF PRGM HAS NOT ENDED
            automcode(a203) := true;          --ALLOW MONITOR TO RUN AGAIN
          END IF;
          convey_state := convey_standby;
        END IF;

                                                               --STATE 3
      WHEN t_chk =>
        IF convyr_off_lmt <= float_0 THEN    --IF CNVR OFF TIME LIMIT
          convyr_off_lmt := float_0;                --ACTIVATE OPT STOP
          cyc_strt_stor := rdout(cyc_start_light);
          option_stp := true;
          p_msg(6849, 5);
          IF NOT rdout(op_stop_light) THEN
            set_busy(option_stop);
          END IF;
        END IF;
        start_timer(convyr_off_tmr, 1500);        --START 15 SEC TIMER
        convey_state := convey_off_state;

      WHEN off_clear =>                                        --STATE 4
        IF NOT ldout(chip_fwd1_motor) THEN
          mcode_val(m203) := false;
          mcode_val(m204) := true;                        --TURN OFF CNVYR
          convey_state := convey_standby;
        END IF;
      END CASE;
    ELSE                                                -- NOT CHIPS_OK
      postlude_request(chips_inhib);
      put_msg(chpmgt_fault, 10, 4);
      store_msg(chpmgt_fault);
      chpmgt_master := auto_recovery;
    END IF;

  WHEN OTHERS =>
    NULL;                                --WAIT FOR CLEAR OR CANCEL
  END CASE;

END chpmgt_main;
----------------------------------------------------------------------
END chpmgt;

-- ******************************************************************
-- *                                                                *
-- * SOFTWARE BY PAUL COLANANNI (A&ES) FOR                          *
-- * AIRCRAFT ENGINE BUSINESS GROUP / GENERAL ELECTRIC COMPANY      *
-- *                                                                *
-- * THIS PROGRAM AND RELATED MATERIAL ARE THE PROPERTY OF THE      *
-- * GENERAL ELECTRIC CO. (G.E.) AND CONTAINS CONFIDENTIAL AND      *
-- * PROPRIETARY INFORMATION OF G.E. THIS PROGRAM, THE RELATED      *
-- * MATERIAL, AND THE INFORMATION CONTAINED HEREIN, SHALL NOT      *
-- * BE DISCLOSED TO OTHERS WITHOUT WRITTEN PERMISSION OF G.E.,     *
-- * AND SHALL NOT BE DUPLICATED OR USED EXCEPT IN ACCORDANCE       *
-- * WITH THE LIMITED CONDITIONS UNDER WHICH IT WAS PROVIDED BY     *
-- * G.E.                                                           *
-- *                                                                *
-- * PROPERTY OF THE AIRCRAFT ENGINE BUSINESS GROUP OF THE          *
-- * GENERAL ELECTRIC COMPANY.                                      *
-- ******************************************************************

WITH wndone;   USE wndone;
WITH mcldat;   USE mcldat;
WITH mcllib;   USE mcllib;
WITH wndtwo;   USE wndtwo;
WITH wndmth;   USE wndmth;
WITH atmlib;   USE atmlib;
WITH rel5;     USE rel5;
WITH rel6;     USE rel6;
WITH rel7;     USE rel7;
```

```
WITH bubdec;    USE bubdec;
WITH oemdec;    USE oemdec;
WITH dncdec;    USE dncdec;
WITH oemmst;    USE oemmst;
WITH wkxgr;     USE wkxgr;
WITH blkdlt;    USE blkdlt;
WITH dncmcl;    USE dncmcl;
WITH lur;       USE lur;

PACKAGE BODY clock IS

clck_time          : integer := 0;
dys                : integer := 1;
hrs                : integer := 0;
mnt                : integer := 0;
resp_len           : integer := 0;
sec                : integer := 0;
yrs                : integer := 0;
init_clock         : boolean := false;
inq_done           : boolean := false;
mfo_flag           : boolean := false;
old_plate_destag   : boolean := false;
rework_flag        : boolean := false;
servo_flag         : boolean := false;
sso_flag           : boolean := false;
mfo_temp           : float := 0.0;
start_time         : float;
msg_no             : str10;
------------------------------------------------------------------------------
-- ************************************************************************
-- * THIS PROCEDURE RUNS AT POWER UP TIME ONLY AND INITIALIZES     *
-- * VARIABLES IN THE PACKAGE                                      *
-- ************************************************************************
PROCEDURE clock_init IS

BEGIN

  time := "01 JAN 1987 15:25:00";

  set_time;
  init_clock := true;
  IF auto_msd_bool(automation_opt) THEN
    IF cim_time_on THEN
      cim_time := cim_monitor;
      lost_time_cntr := tbl_val_int(cust, msg, 9);
      rework_time_cntr := 0;
      response := tbl_chg_int(cust, var, 9, 0);
      lost_time_msg := tbl_val_int(cust, msg, 10);
      var_time_i   := tbl_val_int(cust, var, 10);
      IF lost_time_cntr > 0 THEN
        store_msg(9002);
        cim_time := lost_time_monit;
      ELSE
        store_msg(9001);
        store_e := true;
      END IF;
      lost_time_cntr := 0;
      response := tbl_chg_int(cust, msg, 9, 0);
      IF plate_integer = 1 THEN
        str_set(0, 1);
      ELSIF plate_integer = 2 THEN
        str_set(0, 2);
      ELSE
        str_set(0, 3);
      END IF;
      item1_rec := start_date_rnm;
      file_command := date_file;
    ELSE
      cim_time := date_a_file;
    END IF;
  END IF;
```

```
END clock_init;
-----------------------------------------------------------------
-- ************************************************************
-- * THIS PROCEDURE DETERMINES THE ANOUNT OF TIME ELAPSED        *
-- * BETWEEN TWO TIMES IN HOURS.                                 *
-- ************************************************************
PROCEDURE calc_time(start : IN integer) IS

int_day : integer;
temp_int : integer;
temp_flt : float;
temp_time : string(1..20);
month : ARRAY (1..2) OF string(1..3);

BEGIN

  FOR i IN 1..2 LOOP
    tbl_val_char(cust, cim, start + i, temp_time);
    c_to_i(temp_time, 1, 2, temp_int);
    day(i) := temp_int;
    c_to_f(temp_time, 13, 2, temp_flt);
    hour(i) := temp_flt;
    c_to_f(temp_time, 16, 2, temp_flt);
    minit(i) := temp_flt;
    c_to_f(temp_time, 19, 2, temp_flt);
    scd(i) := temp_flt;
    FOR index IN 1..3 LOOP
      month(i)(index) := temp_time(3 + index);
    END LOOP;
  END LOOP;
  hour(2) := hour(2) + (minit(2) / float_60) + (scd(2) / 3600.0);
  hour(1) := hour(1) + (minit(1) / float_60) + (scd(1) / 3600.0);
  IF (day(1) = day(2)) AND (month(1) = month(2)) THEN

    hour_ret := hour(2) - hour(1);
  ELSE
    IF month(1) = month(2) THEN
      int_day :=(day(2) - day(1) - 1) * 24;
    ELSE
      IF month(2) = "MAR" THEN
        temp_int := 28;
      ELSIF month(2)(3) = 'Y' OR month(2)(3) = 'L' OR month
            (2)(3) = 'T' OR month(2)(3) = 'C' THEN
        temp_int := 30;
      ELSE
        temp_int := 31;
      END IF;
      int_day :=((temp_int - day(1)) + (day(2) - 1)) * 24;
    END IF;
    hour_ret := int_to_float(int_day) + (24.0 - hour(1)) + hour
      (2);
  END IF;

END calc_time;
-----------------------------------------------------------------
-- ************************************************************
-- * THIS PROCEDURE CHECKS FOR LOST TIME ACTIVIITIES            *
-- ************************************************************
PROCEDURE check_lost IS

BEGIN

  IF NOT rdout(cyc_start_light) AND NOT cim_fault(7) THEN
    IF mcl_state /= mcl_auto AND NOT host_req_mag AND NOT (sp_code_strobed
       AND NOT oem_man_mode AND NOT ldin(spndl_zero_spd)) THEN
      store_msg(9003);
      cim_fault(7) := true;
    END IF;
  END IF;
  IF rrise(feedhold) THEN
    store_msg(9004);
```

```
  cim_fault(7) := true;
  END IF;
  IF nc_status(servo_stop_actv) AND NOT servo_flag THEN
    store_msg(2200);
    servo_flag := true;
  END IF;

END check_lost;
--------------------------------------------------------------
-- ************************************************************
-- * THIS PROCEDURE RUNS BEFORE THE GE MCL. IT DISPLAYS THE     *
-- * CURRENT TIME ON THE SCREEN.                                *
-- ************************************************************
PROCEDURE clock_oem1 IS

disp_msg : str64;

BEGIN

  IF rdin(mfo_decr) OR (resp_len = 99) THEN
    msg_no := "1111111111";
    date;
    FOR index IN 1..64 LOOP
      IF index < 21 THEN
        disp_msg(index) := time(index);
      ELSE
        disp_msg(index) := ' ';
      END IF;
    END LOOP;
    disp_cust_line(msg_no, disp_msg);
  ELSIF NOT rdin(mfo_decr) AND active_disp_page /= 120 AND msg_no
        (1) = '1' THEN
    delete_cust_msg(msg_no);
    msg_no(1) := '0';
  END IF;
  rrise(mfo_decr) := false;

END clock_oem1;
-----------------------------------------------------------------
-- ************************************************************
-- * THIS FUNCTION CHECKS TO SEE IF THE PROJECT PLATE IS        *
-- * REMOVED FROM ANY STATION OF THE MACHINE.                   *
-- ************************************************************
FUNCTION no_plate RETURN boolean IS

status : boolean;

BEGIN

  status := false;
  IF ldin(wkxgr_cycle_act) THEN
    plate_wkxgr := NOT ldin(lift_pins_reted);
  END IF;
  IF NOT ldin(wkxgr_cycle_act) AND (ld_unld_home OR file_proc =1) AND
     NOT plate_wkxgr THEN
    IF plate_integer = 1 AND NOT plate_tra AND ldin(plate_present_t) THEN
      IF plate_que THEN
        plate_integer := 2;
      ELSIF plate_mac THEN
        plate_integer := 3;
      END IF;
      put_save_int(plate_integer, 7);
    ELSIF plate_integer = 2 AND NOT plate_que THEN
      IF plate_mac THEN
        plate_integer := 3;
        put_save_int(plate_integer, 7);
      END IF;
    ELSIF plate_integer = 3 AND NOT plate_mac THEN
      IF plate_tra OR NOT ldin(plate_present_t) THEN
        plate_integer := 1;
```

```
        put_save_int(plate_integer, 7);
        IF cim_time_run THEN
          cim_time_run := false;
        ELSE
          status := true;
        END IF
      END IF;
    END IF;
    IF (plate_integer = 1 AND NOT plate_tra AND ldin(plate_present_t)) OR
       (plate_integer = 2 AND NOT plate_que) OR (plate_integer = 3 AND NOT
       plate_mac) THEN
      plate_integer := 0;
      status := true;
    END IF;
  END IF;
RETURN status;

END no_plate;
----------------------------------------------------------------------
-- ***************************************************************
-- * THIS PROCEDURE IS THE MAIN PROGRAM. IT SETS THE TIME FROM  *
-- * THE OPERATOR AND CALCULATES THE CIM TIME                   *
-- ***************************************************************
PROCEDURE clock_main IS

BEGIN

  IF NOT timer_running(clock_tmr) THEN
    clck_time := clck_time + 1;
    IF clck_time = 360 THEN
      date;
      clck_time := 0;
    END IF;
    start_timer(clock_tmr, 6000);
  END IF;

  IF servo_flag AND NOT nc_status(servo_stop_actv) THEN
    cnt_dwn;
    servo_flag := false;
  END IF;
  IF rework_flag AND rrise(cycle_start) THEN
    rework_flag := false;
    kill_msg(6872);
  END IF;

  sso_temp := int_to_float(fain(sso_pot)) * sso_multiplier +
    sso_min_fraction;
  IF cim_time_on OR mfo_flag OR sso_flag THEN
    mfo_temp := int_to_float(fain(mfo_pot)) * mfo_multiplier;
    IF (mfo_temp < 0.98 OR mfo_temp > 1.02) AND cim_time_on THEN
      IF NOT mfo_flag THEN
        put_msg(6862, 7, 5);
        var_msg(6862);
        mfo_flag := true;
      END IF;
    ELSIF mfo_flag THEN
      kill_msg(6862);
      var_dwn;
      mfo_flag := false;
    END IF;
    IF ((sso_temp < 0.98) OR (sso_temp > 1.02)) AND cim_time_on THEN
      IF NOT sso_flag THEN
        put_msg(6863, 7, 5);
        var_msg(6863);
        sso_flag := true;
      END IF;
    ELSIF sso_flag THEN
      kill_msg(6863);
      var_dwn;
      sso_flag := false;
    END IF;
  END IF;
```

```
CASE clock_state IS
  WHEN clock_standby =>
    IF automcode(a300) THEN
      resp_len := 99;
      disp_page_select(120);
      clock_state := clock_inq;
      start_timer(63, 200);
    END IF;

  WHEN clock_inq =>
    IF active_disp_page = 120 THEN
      disp_sel_lock;
      inq_msg := blank_line;
      ask_oper(20, 11, 5, resp_len, inq_done);
      IF inq_done THEN
        IF (resp_len = 20) OR (resp_len = 0) THEN
          clock_state := chk_data;
        ELSE
            inq_done := false;
          END IF;
        END IF;
      ELSE
        IF NOT timer_running(63) THEN
          clock_state := chk_data;
        END IF;
      END IF;

   WHEN chk_data =>
      IF resp_len = 20 THEN
        FOR index IN 1..20 LOOP
          time(index) := inq_msg(index);
        END LOOP;
        set_time;
        resp_len := 90;
      ELSE
        resp_len := 0;
        clock_state := clock_standby;
        disp_sel_unlock;
        automcode(a300) := false;
        inq_done := false;
      END IF;
  END CASE;

-- ***********************************************************
-- * THIS SECTION OF CODE DOES THE CIM TIME CALCULATIONS. IT    *
-- * ALSO DATES THE PROJECT PLATE CONFIG FILES WITH THE START   *
-- * AND FINISH DATES AND TIMES.                                *
-- ***********************************************************
  CASE cim_time IS
   WHEN date_a_file =>                                              --STATE 0
      IF auto_msd_bool(automation_opt) AND clock_is_set AND ld_unld_home THE

        IF (plate_tra AND NOT pkup_exp AND old_plate_destag) OR
            plate_que OR plate_mac THEN
          record_cim_time := false;
          IF file_command = command_standby THEN
            IF plate_mac THEN
              plate_integer := 3;
              str_set(0, 3);
            ELSIF plate_que THEN
              plate_integer := 2;
              str_set(0, 2);
            ELSE
              plate_integer := 1;
              str_set(0, 1);
            END IF;
            put_save_int(plate_integer, 7);
            date;
            item1_rec := start_date_rnm;
            file_command := date_file;
            old_plate_destag := false;
            cim_time := check_file;
```

```
      IF reworking THEN
        prelude_req_off(v_prel);
        reworking := false;
        rework_flag := true;
      END IF;
    END IF;
  END IF;
  IF NOT plate_tra THEN
    old_plate_destag := true;
  END IF;
END IF;
WHEN check_file =>                                          --STATE 1
  IF file_command = command_standby THEN
    cim_time_on := true;
    put_save_bool(true, 4);
    FOR i IN 2..6 LOOP
      response := tbl_chg_char(cust, cim, i, blank_time);
    END LOOP;
    FOR i IN 1..20 LOOP
      cim_fault(i) := false;
    END LOOP;
    proc_time := float_0;
    rework_time := float_0;
    lost_time := float_0;
    put_save_float(float_0, 1);
    put_save_float(float_0, 2);
    lost_time_cntr := 0;
    rework_time_cntr := 0;
    lost_time_msg := 0;
    var_time_msg := 0;
    store_e := false;
    response := tbl_clear(cust, msg);
    response := tbl_clear(cust, var);
    cim_time :  cim_monitor;
    dnc_bool(time_report) := true;
  ELSIF file_command = no_file THEN
    p_msg(6811, 6);
    file_command := command_standby;
    cim_time := correct_file;
  END IF;

WHEN correct_file =>                                        --STATE 2
  IF rrise(mdi_pb) OR rrise(single_pb) OR rrise(auto_pb) OR
     rrise(manual_pb) THEN
    k_msg(6811);
    old_plate_destag := true;
    cim_time := date_a_file;
  END IF;

WHEN cim_monitor =>                                         -- STATE 3
  IF clock_is_set THEN
    check_lost;
    IF cim_time_on THEN
      IF msg_act(6810) THEN
        store_msg(6810);
        cim_fault(12) := true;
      END IF;
      IF lost_time_cntr > 0 OR (NOT rdout(cyc_start_light) AND
         (NOT sp_code_strobed OR ldin(spndl_zero_spd))) THEN
        date;
        response := tbl_chg_char(cust, cim, 3, time);
        response := tbl_chg_char(cust, cim, 4, blank_time);
        cim_time := lost_time_monit;
        dnc_bool(time_report) := true;
      ELSIF rework_time_cntr > 0 THEN
        date;
        response := tbl_chg_char(cust, cim, 5, time);
        response := tbl_chg_char(cust, cim, 6, blank_time);
        cim_time := rework_monitor;
        dnc_bool(time_report) := true;
      END IF;
    ELSE
```

```
IF reworking THEN
  file_present(3);
ELSE
  file_present(4);
END IF;
      IF file_is_there = 1 THEN
        cim_time := proc_time_calc;
        file_is_there := 0;
      ELSIF file_is_there = 2 THEN
        file_is_there := 0;
        cim_time_on := true;
        p_msg(6831, 6);
        kill_msg(6872);
      END IF;
    END IF;
    IF no_plate THEN
      cim_time_on := false;
    END IF;
  END IF;

WHEN lost_time_monit =>                                          -- STATE 4
  IF clock_is_set THEN
    IF cim_fault(7) THEN
      IF ((mcl_state = mcl_auto) OR (sp_code_strobed AND NOT oem_man_mod

         AND (NOT ldin(spndl_zero_spd) OR rdout(cyc_start_light)))) AND
         NOT rdout(feedhold_light) THEN
        cnt_dwn;
        cim_fault(7) := false;
      END IF;
    END IF;
    IF cim_fault(12) THEN
      IF NOT msg_act(6810) THEN
        cnt_dwn;
        cim_fault(12) := false;
      END IF;
    END IF;
    IF (tbl_val_int(cust, msg, 9) = 1) AND wkld_at_chuck AND
        flash_al THEN
      flash_al := false;
    END IF;
    IF (lost_time_cntr = 0 OR NOT cim_time_on) AND NOT su_flag THEN
      IF rdout(cyc_start_light) OR NOT cim_time_on OR (sp_code_strobed
         AND NOT ldin(spndl_zero_spd)) THEN
        k_msg(6803);
        lost_time_cntr := 0;
        cnt_dwn;
        date;
        response := tbl_chg_char(cust, cim, 4, time);
        calc_time(2);
        lost_time := lost_time + hour_ret;
        put_save_float(lost_time, 1);
        dnc_bool(time_report) := true;
        cim_time := cim_monitor;
        cim_fault(13) := false;
        IF not cim_fault(16) THEN
          flash_al := false;
        END IF;
      ELSIF mcl_state = mcl_auto THEN
        p_msg(6803, 5);
      ELSE
        k_msg(6803);
        check_lost;
      END IF;
    END IF;
    IF lost_time_cntr > 0 THEN
      k_msg(6803);
    END IF;
    IF no_plate THEN
      cim_time_on := false;
    END IF;
```

```
  END IF;

WHEN rework_monitor =>                                              -- STATE 5
  IF clock_is_set THEN
    check_lost;
    IF rework_time_cntr = 0 OR (lost_time_cntr > 0) OR
       NOT cim_time_on THEN
      date;
      response := tbl_chg_char(cust, cim, 6, time);
      calc_time(4);
      rework_time := rework_time + hour_ret;
      put_save_float(rework_time, 2);
      cim_time := cim_monitor;
      cim_fault(16) := false;
      dnc_bool(time_report) := true;
      IF NOT cim_fault(13) THEN
        flash_al := false;
      END IF;
    END IF;
    IF no_plate THEN
      cim_time_on := false;
    END IF;
  END IF;

WHEN proc_time_calc =>                                              --STATE 6
  date;
  response := tbl_chg_char(cust, cim, 2, time);
  calc_time(0);
  proc_time := hour_ret - lost_time;
  p_val(138);
  proc_time := proc_time / t_val;
  lost_time := lost_time / t_val;
  rework_time := rework_time / t_val;
  cim_time_on := false;
  put_save_bool(false, 4);
  put_save_int(0, 7);
  lost_time_msg := 0;
  var_time_msg := 0;
  sp_code_strobed := false;
  dnc_bool(time_report) := true;
  cim_time := cim_time_reset;

WHEN cim_time_reset =>                                              --STATE 7
  IF file_command = command_standby AND record_cim_time THEN
    IF reworking THEN
      str_set(0, 3);
    ELSE
      str_set(0, 4);
    END IF;
    record_cim_time := false;
    item1_rec := fin_date_rnm;
    file_command := date_file;
    plate_integer := 0;
  ELSIF ((file_command = command_standby) AND plate_integer = 0) THEN
    cim_time := do_blkdlt_eop;
  ELSIF (file_command = no_file) OR no_plate THEN
    cim_time := date_a_file;
    file_command := command_standby;
  END IF;

WHEN do_blkdlt_eop =>                                               --STATE 8
  IF blkdlt_eop THEN
    IF NOT reworking THEN
      cim_fault(15) := true;
      cim_time := date_a_file;
    ELSE

      file_command := copy_file;
      cim_time := make_putran;
    END IF;
  END IF;
```

```
  WHEN make_putran =>                                                  --STATE 9
    IF file_command = command_standby THEN
      IF host_available THEN
        IF command_request = 0 THEN
          file_integer := 5;
          command_request := 17;
          dnc_bool(mc2000_cmd_req) := true;
          cim_time := date_a_file;
        END IF;
      ELSE
        cim_time := date_a_file;
      END IF;
    END IF;
END CASE;

END clock_main;
-------------------------------------------------------------------
-- ***********************************************************
-- * THIS PROCEDURE CALCULATES THE NEW TIME AND PUTS IT IN THE  *
-- * TIME STRING.                                               *
-- ***********************************************************
--EXAMPLE OF TIME STRING
--1 2 3 4 5 6 7 8 9 1011121314151617181920
--2 8   M A R   1 9 8 5   1 5 : 3 2 : 4 9

PROCEDURE date IS

stop_time : float;
lapse_time : integer;

BEGIN

  stop_time := read_time_real;
  lapse_time := trunc(stop_time - start_time);
  clck_time := 0;
  hrs := hrs + (((mnt * 60) + sec + lapse_time) / 3600);
  mnt :=(mnt + (sec + lapse_time) / 60) REM 60;
  sec :=(sec + lapse_time) REM 60;
  IF hrs > 23 THEN
    hrs := hrs - 24;
    dys := dys + 1;
    IF dys > 31 THEN
      IF time(6) = 'N' THEN
        time(4) := 'F';
        time(5) := 'E';
        time(6) := 'B';
      ELSIF time(6) = 'R' THEN
        time(4) := 'A';
        time(5) := 'P';
        time(6) := 'R';
      ELSIF time(6) = 'Y' THEN
        time(4) := 'J';
        time(5) := 'U';
        time(6) := 'N';
      ELSIF time(6) = 'L' THEN
        time(4) := 'A';
        time(6) := 'G';
      ELSIF time(6) = 'G' THEN
        time(4) := 'S';
        time(5) := 'E';
        time(6) := 'P';
      ELSIF time(6) = 'T' THEN
        time(4) := 'N';
        time(5) := 'O';
        time(6) := 'V';
      ELSIF time(6) = 'C' THEN
        time(4) := 'J';
        time(5) := 'A';
        time(6) := 'N';
        c_to_i(time, 8, 4, yrs);
        yrs := yrs +
        i_to_c(yrs, 4, 8, time);
```

```
      END IF;
      dys := 1;
    ELSIF dys > 30 THEN
      IF time(5) = 'P' THEN
        time(4) := 'M';
        time(5) := 'A';
        time(6) := 'Y';
        dys := 1;
      ELSIF time(5) = 'U' AND time(6) = 'N' THEN
        time(6) := 'L';
        dys := 1;
      ELSIF time(6) = 'P' THEN
        time(4) := 'O';
        time(5) := 'C';
        time(6) := 'T';
        dys := 1;
      ELSIF time(6) = 'V' THEN
        time(4) := 'D';
        time(5) := 'E';
        time(6) := 'C';
        dys := 1;
      END IF;
    ELSIF dys > 28 THEN
      IF time(6) = 'B' THEN
        time(4) := 'M';
        time(5) := 'A';
        time(6) := 'R';
        dys := 1;
      END IF;
    END IF;
  END IF;
  i_to_c(dys, 2, 1, time);
  i_to_c(hrs, 2, 13, time);
  i_to_c(mnt, 2, 16, time);
  i_to_c(sec, 2, 19, time);
  IF dys < 10 THEN
    time(1) := '0';
  END IF;
  IF hrs < 10 THEN
    time(13) := '0';
  END IF;
  IF mnt < 10 THEN
    time(16) := '0';
  END IF;
  IF sec < 10 THEN
    time(19) := '0';
  END IF;
  start_time := read_time_real;

END date;
-------------------------------------------------------------------
-- ****************************************************************
-- * THIS PROCEDURE RECEIVES THE NEW TIME FROM THE HOST AND       *
-- * CONVERTS IT TO INTEGER VALUES.                               *
-- ****************************************************************

PROCEDURE set_time IS

BEGIN
                                --CAPTURE DATA FROM HOST IN TIME STRING

  start_time := read_time_real;
  c_to_i(time, 1, 2, dys);
  c_to_i(time, 13, 2, hrs);
  c_to_i(time, 16, 2, mnt);
  c_to_i(time, 19, 2, sec);
  IF init_clock THEN
    init_clock := false;
    clock_is_set := true;
  END IF;

END set_time;
-------------------------------------------------------------------
END clock;
```

```
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH mcldat;   USE mcldat;
WITH mcllib;   USE mcllib;
WITH wndtwo;   USE wndtwo;
WITH atmlib;   USE atmlib;
WITH oemdec;   USE oemdec;
WITH rel5;     USE rel5;
WITH rel6;     USE rel6;
WITH rel7;     USE rel7;
WITH bubdec;   USE bubdec;
WITH wndmth;   USE wndmth;
WITH dncdec;   USE dncdec;
WITH menu;     USE menu;
WITH tcntrl;   USE tcntrl;
WITH agvmon;   USE agvmon;
WITH ptchk;    USE ptchk;
WITH xfer;     USE xfer;
WITH chpmgt;   USE chpmgt;
WITH clock;    USE clock;

PACKAGE BODY dncmcl IS

try_cnt          : integer := 0;
reset_com_req    : boolean := false;
-------------------------------------------------------------------------
-- ****************************************************************
-- * THIS FUNCTION CHECKS MACHINE STATUS TO SEE IF THE LINK       *
-- * TO THE HOST IS NECESSARY.                                    *
-- ****************************************************************
FUNCTION dncmcl_ok RETURN boolean IS

dncmcl_status : boolean;

BEGIN

  dncmcl_status := true;
  IF ws_status = 4 AND NOT wait_for_status THEN
    dncmcl_status := false;
  END IF;

RETURN dncmcl_status;

END dncmcl_ok;
-------------------------------------------------------------------
-- ****************************************************************
-- * THIS PROCEDURE RESETS THE INTEGER ARRAY TO ZERO WHENEVER      *
-- * A COMMAND IS BEING RECEIVED FROM THE HOST.                   *
-- ****************************************************************
PROCEDURE clrint_param_id IS
```

```
BEGIN

  FOR index IN 1..15 LOOP
    dnc_int(index) := 0;
  END LOOP;

END clrint_param_id;
-----------------------------------------------------------------------
-- ***************************************************************
-- * THIS PROCEDURE RESETS ALL THE ARRAYS AT POWER UP TIME ONLY *
-- ***************************************************************
PROCEDURE dnc_arr_init IS

BEGIN

  FOR index IN 1..32 LOOP
    dnc_bool(index) := false;
    IF index < 17 THEN
      dnc_int(index) := 0;
    END IF;
    IF index < 5 THEN
      dnc_flt(index) := float_0;
    END IF;
  END LOOP;

END dnc_arr_init;
-----------------------------------------------------------------------
-- ***************************************************************
-- * THIS PROCEDURE RECEIVES THE CVOMMANDS FROM THE HOST AND     *
-- * SETS WHATEVER FLAGS ARE NECESSARY IN THE MCL                *
-- ***************************************************************
PROCEDURE dncmcl_main IS

BEGIN

  CASE dncmcl_master IS
   WHEN auto_init =>
      IF ws_status /= 4 THEN
        IF mcl_connect_dnc(true) = success OR try_cnt = 5 THEN
          dncmcl_master := auto_run;
        END IF;
        try_cnt := try_cnt + 1;
        dnc_arr_init;
      END IF;

    WHEN auto_run =>
      IF dncmcl_ok THEN
        IF agv_position /= 0 THEN         -- BUFFER FOR AGV IN READY POSITION
          IF agv_status = agv_stdby THEN
            agv_status := agv_position;
            agv_position := 0;
          END IF;
        END IF;

        IF reset_com_req THEN
          IF host_ack THEN
            host_ack := false;
            k_msg(6805);
            command_request := 0;
            reset_com_req := false;
          ELSIF NOT timer_running(host_ak_tmr) THEN

    p_msg(6805, 5);
   END IF;
 END IF;
 IF dnc_bool(dnc_data_rdy) THEN
   dnc_bool(dnc_fnction_rdy) := false;
   IF ws_status = 1 OR wait_for_status THEN
     CASE dnc_int(mcl_command_no) IS
       WHEN host_ackn1 =>                                   --COMMAND 1999
         host_ack := true;      --RESET IMMEDIATELY AFTER USE IN MCL
```

```
WHEN servo_stop_req =>                              -- COMMAND 2017
  store_msg(9006);
  cim_fault(4) := true;
  servo_stop_on(dnc_stop);
  IF nc_status(servo_stop_actv) THEN
    servo_stop_off(dnc_stop);
  END IF;

WHEN cell_cntrl_avail =>                            --COMMAND 3000
  host_available := true;

WHEN date_data =>                                   --COMMAND 3001
  FOR index IN 1..20 LOOP
    time(index) := dnc_str_64(str64_param1)(index);
  END LOOP;
  set_time;
  dnc_bool(get_date) := false;

WHEN dev_ready_state =>                             --COMMAND 3002
  IF dnc_int(no_int_params) = 1 THEN
    agv_position := dnc_int(int_param1);
  END IF;

WHEN mc2000_data =>                                 --COMMAND 3003
  IF dnc_int(no_int_params) = 1 THEN
    del_answer := true;
    sched_ret := dnc_int(int_param1);
  END IF;

WHEN program_ok =>                                  --COMMAND 3004
  prog_chk_cmplt := true;
  dnc_bool(prog_check) := false;

WHEN verify_file_retn =>                            --COMMAND 3005
  verify_returned := true;
  IF file_command = command_standby THEN
    file_command := verfy_to_table;
  END IF;

WHEN chg_tool_magz =>                               --COMMAND 3006
  host_req_mag := true;

WHEN chg_swarf_cont =>                              --COMMAND 3007
  chg_chip_cont := true;

WHEN mag_config_file =>                             --COMMAND 3008
  config_file_rec := true;

WHEN plt_config_file =>                             --COMMAND 3009
  plate_file_rec := true;

WHEN agv_avail =>                                   --COMMAND 3010
  agv_available := true;

WHEN agv_not_avail =>                               --COMMAND 3011
  agv_available := false;
WHEN trans_file_del =>                              --COMMAND 3012
  plate_permit := true;

WHEN cell_down =>                                   --COMMAND 3013
  ws_status := 2;
  enum_resp := parameter_change(105, int_to_float(ws_status));
  cursor_line := 2;
  disp_page_selec''90);
  host_available    :false;
  prog_chk_cmplt := false;
  standby_chips := true;
  standby_tool := true;
  command_request := 0;
  trans_action := 0;
  data_request := 0;
  kill_msg(6871);
```

```
WHEN prog_downld =>                                 --COMMAND 3015
  part_prog_rec := true;

WHEN cell_error_state =>                            --COMMAND 3016
  put_msg(6871, 7, 6);

WHEN cell_error_retrn =>                            --COMMAND 3017
  kill_msg(6871);

WHEN mag_data =>                                    --COMMAND 3018
  refurbish_mag := true;

WHEN mach_off_line =>                               --COMMAND 3019
  wait_for_status := false;

WHEN pass_word =>                                   --COMMAND 3020
  cell_pswrd := dnc_str_6(str6_param1);

WHEN delete_file =>                                 --COMMAND 3021
  IF dnc_int(int_param1) = 1 THEN
    delete_putran := true;
  ELSIF dnc_int(int_param1) = 2 THEN
    delete_config := true;
  END IF;

WHEN wrk_station_stat =>                            --COMMAND 4000
  host_ack := false;
  clrint_param_id;
  FOR index IN 0..5 LOOP                     --PERF AND CALIB DATA
    dnc_int(int_param1 + index) := msd_int_table(156 + index);
  END LOOP;
  IF mdi_auto_mode THEN
    dnc_int(int_param7) := 5;
    mdi_auto_mode := false;
  ELSE
    dnc_int(int_param7) := ws_status;    --WORKSTATION STATUS
  END IF;
  dnc_int(int_param8) := tbl_val_int(cust, mat, 1);
  IF dnc_int(int_param7) = 3 THEN
    dnc_int(no_int_params) := 9;
    dnc_int(int_param9) := hours_int;
  ELSE
    dnc_int(no_int_params) := 8;
  END IF;
  dnc_bool(dnc_fnction_rdy) := true;
  dnc_bool(mc2000_status) := false;

WHEN mc2000_cmd_data =>                             --COMMAND 4001
host_ack := false;
clrint_param_id;
dnc_int(no_int_params) := 1;
CASE command_request IS
  WHEN 1 =>                              --PLATE PICKUP REQUEST
    dnc_int(no_int_params) := 2;
    dnc_int(int_param1) := 1;
    dnc_int(int_param2) := pickup_time;

  WHEN 2 =>                            --PLATE DELIVERY REQUEST
    dnc_int(no_int_params) := 2;
    dnc_int(int_param1) := 2;
    dnc_int(int_param2) := del_time;

  WHEN 3 =>                                --MAG PICKUP REQUEST
    dnc_int(int_param1) := 3;

  WHEN 4 =>                              --MAG DELIVERY REQUEST
    dnc_int(int_param1) := 4;

  WHEN 5 =>                                --CHIP BUCKET PICKUP
    dnc_int(no_int_params) := 2;
    dnc_int(int_param1) := 5;
    dnc_int(int_param2) := material_type;
```

```
WHEN 6 =>                                --CHIP BUCKET DELIVERY
  dnc_int(no_int_params) := 2;
  dnc_int(int_param1) := 6;
  dnc_int(int_param2) := select_material;
  dnc_int(no_float_params) := 1;
  dnc_flt(float_param1) := convyr_off_lmt;

WHEN 7 =>                                   -- EXECUTE PLATE AGV
  dnc_int(int_param1) := 7;

WHEN 8 =>                                     -- EXECUTE MAG AGV
  dnc_int(int_param1) := 8;

WHEN 9 =>                                    -- EXECUTE CHIP AGV
  dnc_int(int_param1) := 9;

WHEN 10 =>                         -- EXECUTE PLATE AGV COMPLETE
  dnc_int(int_param1) := 10;

WHEN 11 =>                           -- EXECUTE MAG AGV COMPLETE
  dnc_int(int_param1) := 11;

WHEN 12 =>                          -- EXECUTE CHIP AGV COMPLETE
  dnc_int(int_param1) := 12;

WHEN 13 =>                                  -- PART PROG REQUEST
  dnc_int(int_param1) := 13;
  dnc_int(no_str6_params) := 1;
  FOR index IN 1..6 LOOP
    dnc_str_6(str6_param1)(index) := prog_id(index);
  END LOOP;

WHEN 14 =>                                    -- CONFIG FILE REQ
  dnc_int(int_param1) := 14;

WHEN 15 =>                                 -- PLATE FILE REQUEST
  dnc_int(int_param1) := 15;

WHEN 16 =>                                 -- UPLOAD CONFIG FILE
  dnc_int(int_param1) := 16;
WHEN 17 =>                                  -- UPLOAD PLATE FILE
  dnc_int(no_int_params) := 2;
  dnc_int(int_param1) := 17;
  dnc_int(int_param2) := file_integer;

WHEN 18 =>                             -- HOLD UP DELIV OF PLATE
  dnc_int(int_param1) := 18;

WHEN 19 =>                             -- NO TOOLS FOR NEXT PART
  dnc_int(int_param1) := 19;

WHEN 20 =>                             -- EXCHANGE TOOL MAGAZINE
  dnc_int(int_param1) := 20;

WHEN 21 =>                           -- EXCHANGE CHIP CONTAINER
  dnc_int(no_int_params) := 3;
  dnc_int(int_param1) := 21;
  dnc_int(int_param2) := material_type;
  dnc_int(int_param3) := select_material;
  dnc_int(no_float_params) := 2;
  dnc_flt(float_param1) := convyr_off_lmt;
  dnc_flt(float_param2) := chip_tim_lmt;

WHEN 22 =>                             --ABORT PLATE AGV ROUTINE
  dnc_int(no_int_params) := 2;
  dnc_int(int_param1) := 22;
  dnc_int(int_param2) := cancel_agv;

WHEN 23 =>                               --ABORT MAG AGV ROUTINE
  dnc_int(no_int_params) := 2;
  dnc_int(int_param1) := 23;
  dnc_int(int_param2) := cancel_agv;
```

```
    WHEN 24 =>                               --ABORT CHIP AGV ROUTINE
      dnc_int(no_int_params) := 2;
      dnc_int(int_param1) := 24;
      dnc_int(int_param2) := cancel_agv;

    WHEN OTHERS =>
      NULL;
  END CASE;
  reset_com_req := true;
  start_timer(host_ak_tmr, 1500);                  --15 SECS TO ACK
  dnc_bool(dnc_fnction_rdy) := true;
  dnc_bool(mc2000_cmd_req) := false;

WHEN mc2000_req_data =>                              --COMMAND 4002
  host_ack := false;
  clrint_param_id;
  dnc_int(no_int_params) := 1;
  CASE data_request IS
    WHEN 1 =>                                     -- VERIFY REQUEST
      verify_returned := false;
      dnc_int(int_param1) := 1;
      dnc_bool(mc2000_data_req) := false;

    WHEN 2 =>                             --PART SCHEDULE REQUEST
      dnc_int(no_int_params) := 2;
      dnc_int(int_param1) := 2;
      dnc_int(int_param2) := del_sched_time;
      dnc_bool(mc2000_data_req) := false;

    WHEN 3 =>                                        --OUT OF TOOLS
      dnc_int(no_int_params) := 1;
      dnc_int(int_param1) := 3;
      dnc_bool(mc2000_data_req) := false;

    WHEN OTHERS =>
      NULL;
  END CASE;
  data_request := 0;
  dnc_bool(dnc_fnction_rdy) := true;

WHEN transfer_status =>                              --COMMAND 4003
  clrint_param_id;
  dnc_int(no_int_params) := 1;
  dnc_int(int_param1) := trans_action;
  trans_action := 0;
  dnc_bool(dnc_fnction_rdy) := true;
  dnc_bool(trans_report) := false;

WHEN time_status =>                                  --COMMAND 4004
  clrint_param_id;
  dnc_int(no_int_params) := 3;
  IF cim_time_on THEN
    dnc_int(int_param1) := 1;
  ELSE
    dnc_int(int_param1) := 0;
  END IF;
  IF cim_time = lost_time_monit THEN
    dnc_int(int_param2) := 1;
  ELSE
    dnc_int(int_param2) := 0;
  END IF;
  IF cim_time = rework_monitor THEN
    dnc_int(int_param3) := 1;
  ELSE
    dnc_int(int_param3) := 0;
  END IF;
  dnc_bool(dnc_fnction_rdy) := true;
  dnc_bool(time_report) := false;

WHEN OTHERS =>
  clrint_param_id;
END CASE;
```

```
            dnc_bool(dnc_data_rdy) := false;
          ELSIF ws_status = 2 THEN
            CASE dnc_int(mcl_command_no) IS
              WHEN cell_up =>                              --COMMAND 3014
                cell_is_up := true;

              WHEN OTHERS =>
                clrint_param_id;
            END CASE;
          END IF;
          dnc_bool(dnc_data_rdy) := false;
        END IF;
      ELSE                                                 -- NOT DNCMCL_OK
        dncmcl_master := auto_error;
        try_cnt := 0;
      END IF;

    WHEN OTHERS =>
      IF mcl_connect_dnc(false) = success OR try_cnt = 5 THEN
        host_available := false;
        dncmcl_master := auto_init;
        try_cnt := 0;
      END IF;
      try_cnt := try_cnt + 1;
  END CASE;

END dncmcl_main;
-------------------------------------------------------------------------
END dncmcl;

-- ****************************************************************
-- * SOFTWARE BY DAN GARAFOLA (A&ES) FOR                           *
-- * AIRCRAFT ENGINE BUSINESS GROUP / GENERAL ELECTRIC COMPANY     *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- ****************************************************************

-- ****************************************************************
-- * PACKAGE DESCRIPTION :   DTMGMT.PCL                            *
-- *                                                               *
-- *    THIS PACKAGE CONTAINS ONE MAIN PROCEDURE :                 *
-- *                                                               *
-- * DTMGMT_MAIN ;                                                 *
-- *    THIS PROCEDURE GETS PROBE DATA FROM THE CLM PORTION OF     *
-- * THE PART PROGRAM, ALONG WITH THE MAXIMUM, AND MINIMUM         *
-- * TOLERANCES. IT CALCULATES THE DEVIATION FROM THE MEAN         *
-- * TOLERANCE AND OUT OF TOLERANCES (IF ANY).                     *
-- *    IF ANY OUT OF TOLERANCES EXIST THEN THIS PROCEDURE WILL    *
-- * NOTIFY THE HOST OR OPERATOR. THE PROCEDURE WILL IN ANY CASE   *
-- * APPEND THE PLATE CONFIGURATION FILE WITH THE DATA MANAGE-     *
-- * MENT TABLE COMPILED DURING THE CLM CYCLE. IT WILL ALSO SET    *
-- * A FLAG FOR LATER USE IF AN OUT OF TOLERANCE EXSISTED.         *
-- ****************************************************************

WITH wndone;   USE wndone;
WITH mcldat;   USE mcldat;
WITH mcllib;   USE mcllib;
WITH wndmth;   USE wndmth;
WITH wndtwo;   USE wndtwo;
WITH wndstd;   USE wndstd;
WITH atmlib;   USE atmlib;
```

```
WITH oemdec;   USE oemdec;
WITH oemmst;   USE oemmst;
WITH rel6;     USE rel6;
WITH rel7;     USE rel7;
WITH bubdec;   USE bubdec;
WITH qcont;    USE qcont;
WITH tcntrl;   USE tcntrl;
WITH eopgm;    USE eopgm;
WITH dncmcl;   USE dncmcl;

PACKAGE BODY dtmgmt IS

cl_fl           : boolean := false;
id_is_bad       : boolean := false;
remeas          : boolean := false;
nc_data         : boolean := false;

calc            : integer;
oot_pres        : integer := 0;

max_tol         : float;
deviation       : float;
oot_val         : float;
actual_val      : float;
min_val         : float;
max_val         : float;

star_st         : string(1..1);
----------------------------------------------------------------------
PROCEDURE oot_round IS

BEGIN

  IF ((oot_val < 0.0001) AND (oot_val >= 0.00005)) OR ((oot_val > - 0.0001)
     AND (oot_val <= - 0.00005)) THEN
    IF oot_val > float_0 THEN
      oot_val := 0.0001;
    ELSE
      oot_val := - 0.0001;
    END IF;
  ELSIF ((oot_val > float_0) AND (oot_val <= 0.00005)) OR ((oot_val < float_

        AND (oot_val >= - 0.00005)) THEN
    oot_val := float_0;
  END IF;
  IF oot_val > float_0 OR oot_val < float_0 THEN
    IF NOT automcode(a115) THEN
      star_st(1) := '*';
      wp_disp(sn_num_num) := true;
      put_save_bool(wp_disp(sn_num_num), 5 + sn_num_num);
    ELSE
      star_st(1) := 'p';
    END IF;
  END IF;

END oot_round;
----------------------------------------------------------------------
FUNCTION dtmgmt_ok RETURN boolean IS

dtmgmt_status : boolean;

BEGIN

  dtmgmt_status := true;

  IF dtmgmt_fault /= 0 THEN
    dtmgmt_status := false;
  END IF;

RETURN dtmgmt_status;
```

```
END dtmgmt_ok;
--------------------------------------------------------------------
PROCEDURE dtmgmt_clear IS

BEGIN

  automcode(a114) := false;
  automcode(a115) := false;
  automcode(a133) := false;
  automcode(a134) := false;
  IF dtmgmt_fault /= 6814 THEN
    dtmgmt_fault := 0;
  END IF;

END dtmgmt_clear;
--------------------------------------------------------------------
PROCEDURE dtmgmt_cancel IS

BEGIN

  dtmgmt_state := dtmgmt_standby;
  query := prompt_standby;
  scroll_it := 0;
  change := wait;
  oot_pres := 0;
  ask := ask_1;

  cc_int := 0;
  err_flag := false;
  cl_fl := false;
  dm_tbl_ptr := 1;
  deviation := float_0;
  oot_val := float_0;
  postlude_req_off(ptmgt_post);
  no_data := false;
  IF dtmgmt_fault /= 0 THEN
    dtmgmt_master := auto_recovery;
  ELSE
    dtmgmt_master := auto_run;
  END IF;

  IF remeas THEN
    var_msg(9007);
    p_msg(6815, 3);
    scroll_it := 11;
    query := prompt_start;
  END IF;

END dtmgmt_cancel;
--------------------------------------------------------------------
PROCEDURE dtmgmt_main IS

pnq : integer;
par_int : string(1..27);
p_in : string(1..4);
loc_number_sn : string(1..14);

BEGIN

  par_int := " ABCDEFGHIJKLMNOPQRSTUVWXYZ";
  loc_number_sn := "(LCN 0 )012345";

  CASE dtmgmt_master IS
    WHEN auto_init =>
      dtmgmt_master := auto_run;

    WHEN auto_run =>
      IF dtmgmt_ok THEN
        CASE dtmgmt_state IS
          WHEN dtmgmt_standby =>                                --STATE 0
            IF automcode(a105) THEN
```

```
 FOR index IN 1..tbl_limit LOOP
   IF tbl_val_float(cust, mx, index) > 0.0001 THEN
     EXIT;
   END IF;
   IF index = tbl_limit THEN
     no_data := true;
   END IF;
 END LOOP;
 IF file_command = no_file THEN
   file_command := command_standby;
 END IF;
 dtmgmt_state := check_oot;
 sn_num_num := truncate(136);
 automcode(a105) := false;
ELSIF automcode(a114) OR automcode(a133) OR automcode
      (a134) OR automcode(a115) THEN
  dm_tbl_ptr := truncate(112);
  sn_num_num := truncate(138);
  IF dm_tbl_ptr = 0 THEN
    dm_tbl_ptr := 1;
  END IF;
  IF dm_tbl_ptr > 40 THEN
    dtmgmt_fault := 6813;
  END IF;
  IF automcode(a114) OR automcode(a115) THEN
    calc := 0;
  ELSE
    IF dm_tbl_ptr < 3 THEN
      dtmgmt_fault := 6830;
    END IF;
    IF automcode(a133) THEN
      calc := 1;
    ELSE
      calc := 2;
    END IF;
  END IF;
  change := rf;
  dtmgmt_state := record_st;
END IF;

WHEN record_st =>                                                   --STATE 1
  CASE change IS
    WHEN wait =>
      NULL;

    WHEN rf =>
      p_val(35);
      f_to_c(t_val, 5, 0, 1, p_in);
      FOR index IN 1..3 LOOP
        zone_tbl_str(index) := p_in(1 + index);
      END LOOP;
      change := zon;                                     --SETS RF FOR TABLE

    WHEN zon =>
      p_val(38);
      IF t_val < 2700.0 THEN
        f_to_c(t_val, 5, 0, 1, p_in);
        FOR I IN 1..4 LOOP
          IF p_in(i) = ' ' THEN
            p_in(i) := '0';
          END IF;
        END LOOP;
        FOR index IN 1..2 LOOP
          zone_tbl_str(index + 4) := p_in(2 + index);
        END LOOP;
        cl_fl := true;
        change := cl;
      ELSE
        dtmgmt_fault := 6823;
      END IF;
```

```
WHEN cl =>
  p_val(39);
  IF (t_val < 2700.0) OR ((truncate(39) REM 100) < 27) THEN
    IF cl_fl THEN
      zone_tbl_str(8) := par_int(((truncate(039)) / 100) + 1);
      cl_fl := false;
    ELSE
      zone_tbl_str(9) := par_int(((truncate(039)) REM 100) + 1

          change := wait;
          dtmgmt_state := dt_insert;
        END IF;
      ELSE
        dtmgmt_fault := 6823;
      END IF;
  END CASE;

WHEN dt_insert =>                                          --STATE 2
  IF tbl_chg_char(cust, zone, dm_tb` _ptr, zone_tbl_str) =
     table_oper_ok THEN
    dtmgmt_state := act_prob_;
  END IF;

WHEN act_probe =>                                          --STATE 3
  i_to_c(tbl_val_int(cust, ttype, active_face), 4, 1, tool_thing);
  i_to_c(tbl_val_int(cust, turno, active_face), 4, 5, tool_thing);
  IF tbl_chg_char(cust, tool_dt, dm_tbl_ptr, tool_thing) =
     table_oper_ok THEN
    dtmgmt_state := fnl_calc;
  END IF;

WHEN fnl_calc =>                                           --STATE 4
  CASE calc IS
    WHEN 0 =>
      deviation := tbl_val_float(cust, act, dm_tbl_ptr) -
        ((tbl_val_float(cust, mx, dm_tbl_ptr) + tbl_val_float
        (cust, mn, dm_tbl_ptr)) / float_2);
      calc := 4;

    WHEN 1 =>
      IF tbl_val_float(cust, oot,(dm_tbl_ptr - 3)) < float_0 THEN
        dtmgmt_state := write_st;
      ELSE
        max_tol :=((tbl_val_float(cust, act,(dm_tbl_ptr - 3)) -
          tbl_val_float(cust, mn,(dm_tbl_ptr - 3))) / 2.0) +
          ((tbl_val_float(cust, mx,(dm_tbl_ptr - 2)) -
          tbl_val_float(cust, mn,(dm_tbl_ptr - 2))) / 2.0);
        calc := 3;
      END IF;

    WHEN 2 =>
      IF tbl_val_float(cust, oot,(dm_tbl_ptr - 3)) < float_0 THEN
        dtmgmt_state := write_st;
      ELSE
        max_tol := tbl_val_float(cust, act,(dm_tbl_ptr - 3)) -
          tbl_val_float(cust, mn,(dm_tbl_ptr - 3)) + tbl_val_float
          (cust, mx,(dm_tbl_ptr - 2)) - tbl_val_float
          (cust, mn,(dm_tbl_ptr - 2));
        calc := 3;
      END IF;

    WHEN 3 =>
      deviation := sqrt(sqr(tbl_val_float(cust, dev,
        (dm_tbl_ptr - 2))) + sqr(tbl_val_float(cust, dev,
        (dm_tbl_ptr - 1))));
      response := tbl_chg_float(cust, mx, dm_tbl_ptr, max_tol);
      response := tbl_chg_float(cust, mn, dm_tbl_ptr, float_0);
      response := tbl_chg_float(cust, act, dm_tbl_ptr, deviation);
      response := tbl_chg_float(cust, dev, dm_tbl_ptr, deviation);
      calc := 4;
```

```
WHEN 4 =>
  actual_val := tbl_val_float(cust, act, dm_tbl_ptr);
  min_val := tbl_val_float(cust, mn, dm_tbl_ptr);
  max_val := tbl_val_float(cust, mx, dm_tbl_ptr);

      IF actual_val > max_val THEN
        oot_val := actual_val - max_val;
        oot_round;
      ELSIF actual_val < min_val THEN
        oot_val := actual_val - min_val;
        oot_round;
      ELSE
        oot_val := float_0;
        star_st(1) := ' ';
      END IF;
      dtmgmt_state := write_st;
      response := tbl_chg_char(cust, star, dm_tbl_ptr, star_st);
      response := tbl_chg_float(cust, dev, dm_tbl_ptr, deviation);
      response := tbl_chg_float(cust, oot, dm_tbl_ptr, oot_val);
      calc := 0;

    WHEN OTHERS =>
      NULL;
  END CASE;

WHEN write_st =>                                         --STATE 5
  automcode(a114) := false;
  automcode(a115) := false;
  automcode(a133) := false;
  automcode(a134) := false;
  dtmgmt_state := dtmgmt_standby;
  postlude_req_off(ptmgt_post);

WHEN report_st =>                                        --STATE 6
  IF file_command = command_standby THEN
    FOR i IN 1..8 LOOP
      str_old_name(i) := loc_number_sn(i);
    END LOOP;
    IF sn_num_num < 1 OR sn_num_num > 5 THEN
      sn_num_num := 1;
      str_old_name(7) := '?';
    ELSE
      str_old_name(7) := loc_number_sn(9 + sn_num_num);
    END IF;
    file_command := record_qc_data;
    dtmgmt_state := check_oot;
    oot_pres := 3;
  END IF;

WHEN check_oot =>                                        --STATE 7
  CASE oot_pres IS
    WHEN 0 =>
      file_present(3);
      IF file_is_there = 1 THEN
        oot_pres := 1;
      ELSIF file_is_there = 2 THEN
        p_msg(6832, 5);
        dtmgmt_state := dtmgmt_standby;
      END IF;

    WHEN 1 =>
      file_is_there := 0;
      IF no_data THEN
        IF NOT abortt THEN
          p_msg(6822, 5);
          var_msg(6822);
        END IF;
        oot_pres := 0;
        dtmgmt_state := dtmgmt_standby;
      ELSIF abortt THEN
        dtmgmt_state := report_st;
```

```
            oot_pres := 0;
          ELSE
            FOR i IN 1..40 LOOP
              tbl_val_char(cust, star, i, star_st);
              IF star_st(1) = '*' THEN
                oot_pres := 2;
                prelude_req_off(ptmgmt_lude);
                EXIT;
              END IF;
            END LOOP;
          END IF;
          IF oot_pres = 1 THEN
            IF file_command = command_standby THEN
              wp_disp(sn_num_num) := false;
              put_save_bool(wp_disp(sn_num_num), 5 + sn_num_num);
              str_set(0, 3);
              item1_rec := wp_status(sn_num_num);
              item1_lgt := wp_status_lgt;
              item1_str(1) := 'N';
              item1_str(2) := 'V';
              item1_str(3) := 'R';
              dtmgmt_state := report_st;
              file_command := p_str;
              oot_pres := 0;
            END IF;
            prelude_req_off(ptmgmt_lude);
          END IF;

        WHEN 2 =>
          dtmgmt_fault := 6814;
          disp_page_select(122);
          var_msg(6814);
          oot_pres := 0;

        WHEN 3 =>
          IF file_command = command_standby THEN
            FOR i IN zone..star LOOP
              response := tbl_clear(cust, i);
            END LOOP;
            remeas := false;
            postlude_req_off(ptmgt_post);
            change := wait;
            dtmgmt_state := dtmgmt_standby;
            oot_pres := 0;
          ELSIF file_command = no_file THEN
            p_msg(6832, 5);
            oot_pres := 0;
            dtmgmt_state := dtmgmt_standby;
          END IF;

        WHEN OTHERS =>
          oot_pres := 0;
      END CASE;
    END CASE;
  ELSE
    dtmgmt_master := auto_error;
  END IF;

WHEN auto_error =>
  IF dtmgmt_fault = 6814 THEN
    IF active_disp_page = 122 THEN
      disp_sel_lock;
      p_msg(dtmgmt_fault, 5);
      query := prompt_start;
      dtmgmt_master := auto_recovery;
    END IF;
  ELSE
    set_busy(mcs_cancel);
  END IF;

WHEN auto_recovery =>
  CASE query IS
```

```
WHEN prompt_standby =>
  IF rrise(cycle_start) THEN
    k_msg(dtmgmt_fault);
    postlude_req_off(ptmgt_post);
    dtmgmt_fault := 0;
    dtmgmt_master := auto_run;
  ELSE
    p_msg(dtmgmt_fault, 5);
  END IF;

WHEN prompt_start =>
  CASE scroll_it IS
    WHEN 0 =>
      inq_msg :=
 "CANCEL TO REMEASURE/REWORK  [5;7mOR [0m CYCLE START TO CONTINUE ";
      inq_msg(28) := esc;
      inq_msg(36) := esc;
      IF disp_page_line(122, 24, inq_msg) THEN
        scroll_it := 1;
        remeas := true;
      END IF;

    WHEN 1 =>
      IF rrise(cycle_start) THEN
        remeas := false;
        erase(122, 24);
        IF auto_msd_bool(cause_code_opt) THEN
          scroll_it := 2;
        ELSE
          scroll_it := 7;
        END IF;
      END IF;

    WHEN 2 =>
      inq_msg :=
 "ENTER CAUSE CODE NEXT TO EACH '*' THEN PRESS CYCLE START
      IF disp_page_line(122, 24, inq_msg) THEN
        scroll_it := 4;
      END IF;

    WHEN 4 =>
      IF rrise(cycle_start) THEN
        erase(122, 24);
        scroll_it := 5;
        err_flag := false;
      ELSIF rdin(mfo_incr) THEN
        disp_sel_unlock;
        disp_page_select(121);
        scroll_it := 12;
      END IF;

    WHEN 5 =>
      FOR i IN 1..40 LOOP
        tbl_val_char(cust, star, i, inq_msg);
        IF inq_msg(1) = '*' THEN
          cc_int := 0;
          t_s_i(cause_list, tbl_val_int(cust, cause_code, i),cc_int

          IF cc_int = 0 THEN
            err_flag := true;
          END IF;
        END IF;
      END LOOP;
      IF err_flag THEN
        err_flag := false;
        scroll_it := 6;
      ELSE
        scroll_it := 7;
      END IF;

    WHEN 6 =>
```

```
      inq_msg :=
" [7m ILLEGAL CAUSE CODE FOUND, CORRECT AND PRESS CYC ST [0m
      inq_msg(1) := esc;
      inq_msg(56) := esc;
      IF disp_page_line(122, 24, inq_msg) THEN
        scroll_it := 4;
      END IF;

    WHEN 7 =>
      inq_msg :=
"ENTER WK PIECE STATUS & BADGE ID:
      scroll_it := 8;

    WHEN 8 =>
      ask_oper(33, 24, 1, pnq, oper_cmplt);
      IF oper_cmplt THEN
        FOR i IN 1..37 LOOP
          item1_str(i) := inq_msg(i);
          IF i < 4 THEN
            disp_code(i) := inq_msg(i);
          END IF;
          IF i > 4 AND i < 11 THEN
            IF inq_msg(i) = ' ' THEN
              id_is_bad := true;
            END IF;
          END IF;
        END LOOP;
        oper_cmplt := false;
        scroll_it := 9;
      END IF;

    WHEN 9 =>
      IF (disp_code = "AVU" OR disp_code = "AVR" OR
          disp_code = "CVU" OR disp_code = "CVR" OR
          disp_code = "ACC") AND NOT id_is_bad THEN
        IF file_command = command_standby THEN
          str_set(0, 3);
          item1_rec := wp_status(sn_num_num);
          item1_lgt := 37;
          file_command := p_str;
          scroll_it := 11;
        END IF;
      ELSE
        scroll_it := 10;
      END IF;

    WHEN 10 =>
      erase(122, 24);
      id_is_bad := false;
      inq_msg :=
"BAD DISPOSITION - RE-ENTER AGAIN:
      scroll_it := 8;

    WHEN 11 =>
      k_msg(dtmgmt_fault);

      dtmgmt_fault := 0;
      disp_sel_unlock;
      disp_page_select(60);
      dtmgmt_master := auto_run;
      dtmgmt_state := report_st;
      scroll_it := 0;
      query := prompt_standby;

    WHEN 12 =>
      IF NOT rdin(mfo_incr) THEN
        disp_page_select(122);
        scroll_it := 13;
      END IF;

    WHEN 13 =>
```

```
            IF active_disp_page = 122 THEN
              disp_sel_lock;
              scroll_it := 2;
            END IF;

          WHEN OTHERS =>
            scroll_it := 0;
        END CASE;
      END CASE;
    END CASE;

END dtmgmt_main;
------------------------------------------------------------------------
END dtmgmt;
-- ****************************************************************
-- *                                                              *
-- * SOFTWARE BY BRYAN IRVING (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

-- ****************************************************************
-- *                                                              *
-- *                       AUTOMATION MCL                         *
-- *                                                              *
-- *                     END-OF-PROGRAM TASK                      *
-- *  THIS CASE IS USED TO MANAGE THE ACTIONS REQUIRED AT THE     *
-- * END OF A PART PROGRAM.  THOSE ACTIONS ARE 1)STORE THE CHIP   *
-- * MANAGEMENT VALUES AND CLEAR THE CHIP MANAGEMENT FLAG         *
-- * (IF THE HOST HAS REQUESTED A CHIP BUCKET EXCHANGE THIS IS    *
-- * RECOGNIZED AND INITIATED BEFORE VALUES ARE STORED). ABORT    *
-- * IS CHECKED AND IF ACTIVE THE PROGRAM IS REWOUND. WHEN        *
-- * COMPLETE THE AUTOMATION MCL IS STARTED OVER.                 *
-- *                                                              *
-- *                     PROGRAM ABORT TASK                       *
-- *      THIS PACKAGE IS USED TO CONTROL THE ACTIONS NEEDED FOR  *
-- * ABORTING A CURRENTLY ACTIVE PART PROGRAM.  IT WILL RESPOND   *
-- * TO AN MCODE THAT WILL CAUSE A MESSAGE TO BE DISPLAYED        *
-- * INSTRUCTING THE ATTENDANT TO REFERENCE THE HELP PAGE FOR     *
-- * ADDITIONAL INFORMATION.  A SECOND INPUT OF THE SAME MCODE    *
-- * IS NECESSARY TO CONTINUE WITH THE ABORT.  WHEN THIS SECOND   *
-- * INPUT IS RECEIVED THE PART STATUS IS CHANGED TO 'I' (FOR     *
-- * INCOMPLETE).  WHEN COMPLETE THE CONVEYOR IS SHUT OFF AND     *
-- * PART MANAGEMENT IS CALLED.  WHEN PART MANAGEMENT IS COM-     *
-- * PLETE THEN END-OF-PROGRAM TASK IS STARTED TO REWIND THE      *
-- * PROGRAM.  ONCE EOPGM  IS FINISHED THE ABORT TASK IS COM-     *
-- * PLETE AND GOES TO STANDBY.                                   *
-- *                                                              *
-- ****************************************************************

WITH wndone;   USE wndone;
WITH mcldat;   USE mcldat;
WITH mcllib;   USE mcllib;
WITH wndtwo;   USE wndtwo;
WITH atmlib;   USE atmlib;
WITH rel5;     USE rel5;
WITH rel6;     USE rel6;
WITH rel7;     USE rel7;
```

```
WITH oemdec;   USE oemdec;
WITH bubdec;   USE bubdec;
WITH dncdec;   USE dncdec;
WITH dncmcl;   USE dncmcl;
WITH oemmst;   USE oemmst;
WITH menu;     USE menu;
WITH chpmgt;   USE chpmgt;
WITH agvmon;   USE agvmon;
WITH tcntrl;   USE tcntrl;
WITH coolnt;   USE coolnt;
WITH ptchk;    USE ptchk;
WITH xfer;     USE xfer;
WITH qcont;    USE qcont;
WITH dtmgmt;   USE dtmgmt;
WITH clock;    USE clock;

PACKAGE BODY eopgm IS

delay_flag        : boolean;
mendex            : integer;
str_return        : str10;
---------------------------------------------------------------------
PROCEDURE eopgm_init IS

BEGIN

  FOR mendex IN 1..10 LOOP
    str_return(mendex) := 'Q';
  END LOOP;

END eopgm_init;
---------------------------------------------------------------------
PROCEDURE eopgm_cancel IS

BEGIN

  eopgm_state := eopgm_standby;
  abort_state := abort_standby;
  abortt := false;

END eopgm_cancel;
---------------------------------------------------------------------
PROCEDURE eopgm_main IS

pnq : integer;

BEGIN

  CASE abort_state IS
    WHEN abort_standby =>                                   --STATE 0
      IF automcode(a113) THEN
        abortt := true;
        automcode(a113) := false;
        abort_state := abort_help;
        delay_flag := false;
      END IF;

    WHEN abort_help =>                                      --STATE 1
      inq_msg :=
        " [7;5mABORT INITIATED! [0m SELECT HELP PAGE FOR INSTRUCTIONS!   ";
      inq_msg(1) := esc;
      inq_msg(23) := esc;
      disp_cust_line(str_return, inq_msg);
      IF rrise(cycle_start) AND NOT delay_flag THEN
        start_timer(page_chng_tmr, 50);          --DELAY FOR FLAG RECOGNITION
        delay_flag := true;
      END IF;
      IF NOT timer_running(page_chng_tmr) AND delay_flag THEN
        IF automcode(a113) THEN
          ram_it_thru := true;
          abort_state := start_abort;
```

```
      automcode(a113) := false;
      delete_cust_msg(str_return);
      eopgm_cmplt := false;
      delay_flag := false;
    ELSE
      abortt := false;
      abort_state := abort_standby;
      delete_cust_msg(str_return);
    END IF;
  END IF;

WHEN st   _abort =>                                          --STATE 2
  IF put_ p_status(5, 3, false) THEN
    abort_state := save_the_data;
    automcode(a105) := true;
    automcode(a204) := true;
  END IF;

WHEN save_the_data =>                                        -- STATE 3
  IF dtmgmt_state = dtmgmt_standby THEN
    inq_msg :=
    "ENTER BADGE AND REASON:                                             ";
    abort_state := ask_reason;
  END IF;

  :EN ask_reason =>                                          -- STATE 4
  ask_oper(23, 20, 1, pnq, oper_cmplt);
  IF oper_cmplt THEN
    oper_cmplt := false;
    abort_state := record_reason;
  END IF;

WHEN record_reason =>                                        -- STATE 5
  IF file_command = command_standby THEN
    str_set(0, 3);
    item1_loc := plate_loc + 4;
    item1_rec := wp_status(sn_num_num);
    item1_lgt := 37;
    FOR i IN 1..37 LOOP
      item1_str(i) := inq_msg(i);
    END LOOP;
    file_command := p_str;
    abort_state := start_unload;
  END IF;

WHEN start_unload =>                                         --STATE 6
  IF ptmgmt_state = mgmt_standby THEN
    ptmgmt_state := mgmt_unld;
    abort_state := finish_unload;
  END IF;

WHEN finish_unload =>                                        --STATE 7
  IF ptmgmt_state = mgmt_standby THEN
    prelude_req_off(ptmgmt_lude);
    eopgm_state := eopgm_standby;
    automcode(a30) := true;
    abort_state := wait_for_m30;
  END IF;

WHEN wait_for_m30 =>                                         --STATE 8
  IF eopgm_cmplt THEN
    abortt := false;
    abort_state := abort_standby;
  END IF;
END CASE;

CASE eopgm_state IS
  WHEN eopgm_standby =>                                      --STATE 0
    IF automcode(a30) THEN
```

```
      automcode(a30) := false;
      IF prgm_updt = datime THEN
        IF cim_time = cim_time_reset THEN
          record_cim_time := true;
        END IF;
        cool_flag := false;
        eopgm_cmplt := false;
        chip_cmplt := false;
        tool_count := 0;
        m112_was_run := false;
        default_plo1 := false;
        put_save_bool(default_plo1, 32
        enum_resp := parameter_change(98, float_0);
        save_index := 0;
        prev_t_type := 0;
        IF NOT automcode(a308) THEN
          updte_life;
        ELSE
          automcode(a308) := false;
        END IF;
        automcode(a205) := false;
        eopgm_state := do_chips;
      END IF;
    END IF;

  WHEN do_chips =>                                            --STATE 1
    IF chip_flag THEN
      material_type := select_material;
      chip_data_eop;
      IF chip_cmplt THEN                                      --CHIP EOP CMPLT
        chip_cmplt := false;
        eopgm_state := check_abort;
        chip_flag := false;                   --CLEAR CHP MNGMNT RUN FLAG
      END IF;
    ELSE
      eopgm_state := check_abort;
    END IF;

  WHEN check_abort =>                                         --STATE 2
    IF abortt THEN
      eopgm_state := prgm_abort_rwd;
    ELSE
      IF nc_status(rewind_complete) THEN
        mcode_val(m30) := true;
        restrt_menu := true;                        --START AUTOMATION MCL
        eopgm_cmplt := true;
        eopgm_state := eopgm_standby;
      END IF;
    END IF;

  WHEN prgm_abort_rwd =>                                      --STATE 3
    IF program_rewind = success THEN
      IF nc_status(rewind_complete) THEN
        eopgm_cmplt := true;
        eopgm_state := eopgm_standby;
        k_msg(6842);
      ELSE
        p_msg(6842, 5);                             --PGM RWD TIME OUT MSG
      END IF;
    ELSE
      p_msg(6842, 5);
    END IF;
END CASE;

END eopgm_main;
--------------------------------------------------------------------
WITH wndone;    USE wndone;
WITH mcldat;    USE mcldat;
WITH wndfms;    USE wndfms;
WITH graph;     USE graph;

PACKAGE BODY fmsgrp IS
```

```
--------------------------------------------------------------------
PROCEDURE critical_fms_msg(active : boolean;
                           msg_num : integer) IS

BEGIN

  NULL;

END critical_fms_msg;
--------------------------------------------------------------------
PROCEDURE mcl_disp_chng IS

BEGIN

  NULL;

END mcl_disp_chng;
--------------------------------------------------------------------
PROCEDURE mcl_disp_update IS

BEGIN

  NULL;

END mcl_disp_update;
--------------------------------------------------------------------
END fmsgrp;
-- *****************************************************************
-- *                                                               *
-- * SOFTWARE BY DAN GARAFOLA (A&ES) FOR                           *
-- * AIRCRAFT ENGINE BUSINESS GROUP / GENERAL ELECTRIC COMPANY     *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *****************************************************************

-- *****************************************************************
-- * PACKAGE DESCRIPTION :  LUR.PCL                                *
-- *                                                               *
-- *    THIS PACKAGE CONTAINS ONE MAIN PROCEDURE;                  *
-- *                                                               *
-- * LUR_MAIN ;                                                    *
-- *     THIS PROCEDURE CONTROLS ALL PART MOVMENT AT THE           *
-- * WORK STATION.  ONLY ACTIVE DURING AUTOMATED RUNNING THIS      *
-- * PROCEDURE CHANGES PLATE CONFIGURATION FILE NAME AND PART      *
-- * STATUS AS PART PASSES THROUGH THE WORKSTATION IN A LOAD       *
-- * UNLOAD, OR MDI PART MOVE.                                     *
-- *     DURING A PART UNLOAD THIS PROCEDURE WILL POLL THE HOST    *
-- * TO FIND OUT IF A PART DELIVERY IS SCHEDULED IF NOT THEN       *
-- * THE DELIVERY EXPECTED FLAG WILL BE HELD UP UNTIL PART CAN     *
-- * BE UNLOADED AND PICKED UP.                                    *
-- *                                                               *
-- *****************************************************************

WITH clock;    USE clock;
WITH wndone;   USE wndone;
WITH mcldat;   USE mcldat;
WITH mcllib;   USE mcllib;
WITH oemdec;   USE oemdec;
WITH wndtwo;   USE wndtwo;
WITH wndtre;   USE wndtre;
WITH atmlib;   USE atmlib;
```

```
WITH rel6;     USE rel6;
WITH rel7;     USE rel7;
WITH bubdec;   USE bubdec;
WITH xfer;     USE xfer;
WITH ptchk;    USE ptchk;
WITH blkdlt;   USE blkdlt;
WITH oemmst;   USE oemmst;
WITH tcntrl;   USE tcntrl;
WITH agvmon;   USE agvmon;
WITH wkxgr;    USE wkxgr;
WITH dtmgmt;   USE dtmgmt;

PACKAGE BODY lur IS

TYPE recov_flow IS (flow_start, flow_tab, flow_tab_a, flow_1, flow_2);
recov_ovr_flow    : recov_flow := flow_start;

fl_chk            : boolean := false;
md_fl_chk         : boolean := false;
renm              : integer := 0;
q_chk             : integer := 0;
count_sn          : integer := 1;
new_nm            : integer;
program_id        : str6;
disp_code         : string(1..3);
-----------------------------------------------------------------------
FUNCTION lur_ok RETURN boolean IS

lur_status :'boolean;

BEGIN

  lur_status := true;
  IF lur_fault /= 0 THEN
    lur_status := false;
  END IF;
RETURN lur_status;

END lur_ok;
-----------------------------------------------------------------------
PROCEDURE lur_cancel IS

BEGIN

  IF lur_fault = 6858 THEN
    kill_msg(6858);
    cnt_dwn;
  END IF;
  IF lur_fault = 6497 THEN
    cnt_dwn;
    kill_msg(6497);
  END IF;
  lur_fault := 0.
  lur_master := auto_run;
  IF unld_state /= unld_all_done THEN
    unld_state := unld_standby;
    unld_cmd := false;
  END IF;
  ld_state := ld_standby;
  check_for_file := chk_standby;
  mdi_state := standby;
  disposition_flag := false;
  m_ldtr_init := false;
  file_is_there := 0;
  renm := 0;
  q_chk := 0;
  recov_ovr_flow := flow_start;
  count_sn := 1;
  ser_ctr := 1;
  check_ver := ver_1;
  delete_cust_msg("verify chk");
```

```
END lur_cancel;
-----------------------------------------------------------------------
-- ****************************************************************
-- *    IF PART IS COMPLETE AND THE PART DISPOSITION IN THE        *
-- * PLATE CONFIGURATION FILE IS VERIFY THEN THIS PROCEDURE WILL*
-- * WILL RECORD THE PROGRAM I.D. AND PART SERIAL NUMBER FOR      *
-- * CURRENT PART IN THE VERIFY.MCL FILE.                         *
-- ****************************************************************
FUNCTION inspection_res RETURN boolean IS

status : boolean;
temp_chk_str : string(1..27);

BEGIN

  status := false;
CASE check_ver IS
  WHEN ver_1 =>
    IF count_sn < 6 THEN
      IF file_command = command_standby THEN
        str_set(0, 4);
        item1_rec := wp_status(count_sn);
        file_command := g_str;
        check_ver := ver_1a;
      END IF;
    ELSE
      cc    _sn := 1;
      file_command := command_standby;
      check_ver := ver_cmplt;
    END IF;

  WHEN ver_1a =>
    IF file_command = get_data THEN
      IF buffer_string(plate_loc) = 'V' OR
         buffer_string(plate_loc) = 'A' OR
         buffer_string(plate_loc) = 'C' THEN
        str_set(0, 4);
        count_sn := 1;
        item1_rec := pr_id_rnm;
        file_command := g_str;
        check_ver := ver_5;
      ELSE
        count_sn := count_sn + 1;
        check_ver := ver_1;
        file_command := command_standby;
      END IF;
    ELSIF file_command = no_file THEN
      file_command := command_standby;
      check_ver := ver_cmplt;
    END IF;

  WHEN ver_5 =>
    IF file_command = get_data THEN
      FOR i IN 0..5 LOOP
        ver_str(6)(1 + i) := buffer_string(plate_loc + i);
      END LOOP;
      ser_ctr := 1;
      check_ver := ver_5a;
    END IF;

  WHEN ver_5a =>
    str_set(0, 4);
    item1_rec := serial_num_loc(ser_ctr);
    check_ver := ver_6;
    file_command := g_str;

  WHEN ver_6 =>
    IF file_command = get_data THEN
      FOR i IN 0..7 LOOP
        ver_str(ser_ctr)(1 + i) := buffer_string(plate_loc + i);
      END LOOP;
```

```
  IF ser_ctr > 4 THEN
    file_command := command_standby;
    check_ver := ver_7;
  ELSE
    ser_ctr := ser_ctr + 1;
    check_ver := ver_5a;
  END IF;
END IF;

WHEN ver_7 =>
  ver_str(6)(7) := ' ';
  ver_str(6)(8) := '-';
  ver_str(6)(9) := ' ';
  ver_str(5)(9) := ' ';
  FOR i IN 1..4 LOOP
    ver_str(i)(8) := ',';
    ver_str(i)(9) := ' ';
  END LOOP;
  FOR i IN 1..11 LOOP
    IF i /= 11 THEN
      tbl_val_char(cust, verify_a, i, temp_chk_str);
      IF temp_chk_str(1) = ' ' THEN
        FOR a IN 1..9 LOOP
          temp_chk_str(a) := ver_str(6)(a);
          temp_chk_str(a + 9) := ver_str(1)(a);
          temp_chk_str(a + 18) := ver_str(2)(a);
        END LOOP;
        response := tbl_chg_char(cust, verify_a, i, temp_chk_str);
        FOR a IN 1..9 LOOP
          temp_chk_str(a) := ver_str(3)(a);
          temp_chk_str(a + 9) := ver_str(4)(a);
          temp_chk_str(a + 18) := ver_str(5)(a);
        END LOOP;
        response := tbl_chg_char(cust, verify, i, temp_chk_str);
        check_ver := ver_cmplt;
        EXIT;
      END IF;
    ELSE
      check_ver := over_flow;
    END IF;
  END LOOP;
  IF file_command = command_standby THEN
    file_command := verfy_to_file;
  END IF;

WHEN over_flow =>
  CASE recov_ovr_flow IS
    WHEN flow_start =>
      disp_page_select(2);                    -- TOO MANY PARTS NEED VER
      recov_ovr_flow := flow_tab;

    WHEN flow_tab =>
      IF active_disp_page = 2 THEN
        disp_sel_lock;
        inq_msg :=
     " [1;7m VERIFICATION TABLE FULL, EDIT TABLE THEN PRESS CYC ST [0m";
        inq_msg(1) := esc;
        inq_msg(61) := esc;
        recov_ovr_flow := flow_tab_a;
      END IF;

    WHEN flow_tab_a =>
      IF privilege_select(4) THEN
        disp_cust_line("verify chk", inq_msg);
        recov_ovr_flow := flow_1;
      END IF;

    WHEN flow_1 =>
      IF rrise(cycle_start) THEN
        delete_cust_msg("verify chk");
        recov_ovr_flow := flow_2;
      END IF;
```

```
WHEN flow_2 =>
  IF privilege_select(0) THEN
    recov_ovr_flow := flow_start;
    disp_sel_unlock;
            disp_page_select(60);
            check_ver := ver_1;
          END IF;
      END CASE;

    WHEN ver_cmplt =>
      status := true;
      check_ver := ver_1;
  END CASE;

RETURN status;

END inspection_res;
 ----------------------------------------------------------------------
PROCEDURE lur_main IS

BEGIN

  CASE lur_master IS
    WHEN auto_init =>
      lur_master := auto_run;

    WHEN auto_run =>
      IF lur_ok THEN
        CASE ld_state IS
          WHEN ld_standby =>                                    --STATE 0
            IF fl_chk AND file_command = no_file THEN
              lur_fault := 6837;
              file_command := command_standby;
            ELSIF fl_chk OR file_command = command_standby THEN
              fl_chk := false;
            END IF;
            IF nc_status(cyc_start_lt_on) AND lur_fault > 1 THEN
              k_msg(lur_fault);
              lur_fault := 0;
            END IF;

          WHEN ld_tq =>                                         --STATE 1
            IF NOT plate_que AND plate_tra AND
               NOT automcode(m512_ok_to_go) THEN
              IF xgr_park AND NOT wkld_at_chuck AND
                  (NOT probe_active OR mcl_state = mcl_mdi OR
                   automcode(ld_flag) OR unld_cmd) THEN
                file_present(1);
                IF file_is_there = 1 THEN
                  mcl_ld_tq := true;
                  automcode(a503) := true;
                  renm := 1;
                  q_chk := 0;
                  file_is_there := 0;
                  ld_state := ld_wait;
                ELSIF file_is_there = 2 THEN
                  file_is_there := 0;
                  lur_fault := 6843;
                END IF;
              END IF;
            ELSE
              ld_state := ld_standby;
              automcode(ld_flag) := false;
            END IF;

          WHEN ld_tq_cmplt =>                                   --STATE 2
            CASE q_chk IS
              WHEN 0 =>
                IF NOT xgr_park THEN
                  q_chk := 1;
```

```
      END IF;

    WHEN 1 =>
      IF xgr_park THEN
        IF plate_que THEN
          IF plate_integer = 1 THEN
            plate_integer := 2;
            put_save_int(2,7);
          END IF;
          mcl_ld_tq := false;
          ld_state := ren;
        ELSE
          automcode(ld_flag) := false;
          lur_fault := 6497;
          xfer_state := xfer_standby;
          ld_state := ld_standby;
        END IF;
      END IF;

    WHEN OTHERS =>
      q_chk := 0;
  END CASE;

WHEN ld_chuck =>                                              --STATE 3
  IF plate_que THEN
    IF file_command = command_standby THEN
      str_set(0, 2);
      iteml_rec := pr_id_rnm;
      file_command := g_str;
      ld_state := ld_chuck_1a;
    END IF;
  ELSIF plate_tra THEN
    IF file_command = command_standby THEN
      str_set(0, 1);
      iteml_rec := pr_id_rnm;
      file_command := g_str;
      ld_state := ld_chuck_1b;
    END IF;
  END IF;

WHEN ld_chuck_1a =>                                           --STATE 4
  IF file_command = get_data THEN
    FOR index IN 0..5 LOOP
      program_id(index + 1) := buffer_string(plate_loc + index);
    END LOOP;
    IF (prog_id = program_id) AND xgr_park THEN
      renm := 2;
      automcode(a502) := true;
      ld_state := ld_wait;
    ELSIF prog_id /= program_id THEN
      lur_fault := 6834;  --PROG ID DOES NOT MATCH ACTIVE PROGRAM
    END IF;
    file_command := command_standby;
  ELSIF file_command = no_file THEN
    lur_fault := 6837;                                 --FILES OUT OF SYNC
    file_command := command_standby;
  END IF;

WHEN ld_chuck_1b =>                                           --STATE 5
  IF file_command = get_data THEN
    FOR index IN 0..5 LOOP
      program_id(index + 1) := buffer_string(plate_loc + index);
    END LOOP;
    IF (prog_id = program_id) AND xgr_park THEN
      renm := 3;
      m_ldtr_init := true;

    ld_state := ld_wait;
  ELSIF prog_id /= program_id THEN
    lur_fault := 6834;  --PROG ID DOES NOT MATCH ACTIVE PROGRAM
  END IF;
  file_command := command_standby;
ELSIF file_command = no_file THEN
  lur_fault := 6837;                                 --FILES OUT OF SYNC
```

```
    file_command := command_standby;
  END IF;

WHEN l. ait =>                                                   --STATE 6
  IF renm = 2 OR renm = 3 THEN
    file_present(3);
  ELSE
    file_present(2);
  END IF;
  IF file_is_there = 1 THEN
    lur_fault := 6858;
  ELSIF file_is_there = 2 THEN
    IF renm = 1 THEN
      ld_state := ld_tq_cmplt;
    ELSIF NOT xgr_park THEN
      ld_state := ld_chuck_cmplt;
    END IF;
    file_is_there := 0;
  END IF;

WHEN ld_chuck_cmplt =>                                           --STATE 7
  IF xgr_park THEN
    IF plate_mac THEN
      plate_integer := 3;
      put_save_int(3,7);
      ld_state := ren;
    ELSE
      automcode(ld_flag) := false;
      lur_fault := 6497;
      xfer_state := xfer_standby;
      ld_state := ld_standby;
    END IF;
  END IF;

WHEN ren =>                                                      --STATE 8
  IF renm /= 0 THEN
    IF file_command = command_standby THEN
      IF renm = 1 THEN
        str_set(1, 1);
        str_set(0, 2);
      ELSE
        str_set(0, 3);
        IF renm = 2 THEN
          str_set(1, 2);
        ELSE
          str_set(1, 1);
        END IF;
      END IF;
      file_command := rename;
      IF xgr_park THEN
        IF NOT unld_cmd AND plate_que THEN
          xfer_state := xfer_standby;
        ELSIF (plate_mac AND NOT plate_tra AND NOT plate_que) OR
              unld_cmd THEN
          xfer_state := xfer_start;
        END IF;
        automcode(ld_flag) := false;
        ld_state := ld_standby;
        fl_chk := true;
        END IF;
      ELSIF file_command = no_file THEN
        file_command := command_standby;
        lur_fault := 6837;
      END IF;
    ELSE
      IF xgr_park THEN
        IF NOT unld_cmd AND plate_que THEN
          xfer_state := xfer_standby;
        END IF;
        automcode(ld_flag) := false;
        ld_state := ld_standby;
      END IF;
```

```
    END IF;
END CASE;
----------------------------------------------------------------
CASE unld_state IS
  WHEN unld_standby =>                                        --STATE 0
    NULL;

  WHEN unld_start =>                                          --STATE 1
    disposition_flag := true;
    r_msg(6812, 7);
    unld_state := unld_cmpr;

  WHEN unld_cmpr =>                                           --STATE 2
    IF NOT disposition_flag AND NOT pkup_exp AND
       NOT rdout(offset_light_1) AND plate_permit THEN
      IF plate_tra THEN
        IF ld_state = ld_standby THEN
          ld_state := ld_tq;
          unld_state := unld_standby;
        END IF;
      ELSE
        IF find_trans THEN
          IF tran_num = 1 OR tran_num = 4 THEN
            lur_fault := 6858;
          ELSE
            IF xgr_park THEN
              automcode(a505) := true;
              unld_state := unld_wait;
            END IF;
          END IF;
        END IF;
      END IF;
    END IF;

  WHEN unld_wait =>                                           --STATE 3
    IF NOT xgr_park THEN
      unld_state := unld_cmplt;
    END IF;

  WHEN unld_cmplt =>                                          --STATE 4
    IF xgr_park AND NOT wkxgr_fault THEN
      IF (plate_tra OR NOT ldin(plate_present_t)) THEN
        FOR i IN 1..5 LOOP
          wp_disp(i) := false;
          put_save_bocl(false, 5 + i);
        END LOOP;
        IF file_command = command_standby THEN
          str_set(1, 3);
          str_set(0, 4);
          cim_fault(15) := false;
          file_command := rename;
          record_cim_time := true;
          unld_state := unld_all_done;
        END IF;
      ELSIF NOT plate_tra THEN
        k_msg(6821);
        unld_state := unld_standby;
        lur_fault := 6497;
      END IF;
    END IF;

  WHEN unld_all_done =>                                       --STATE 5
    CASE file_proc IS
      WHEN 0 =>
        p_msg(6821, 6);
        file_proc := 1;

      WHEN 1 =>
        IF cim_fault(15) THEN
          file_proc := 2;
        END IF;
```

```
      WHEN 2 =>
        IF inspection_res THEN
          file_proc := 3;
          cim_fault(15) := false;
        END IF;

      WHEN 3 =>
       IF xgr_park THEN
         IF host_available THEN
           xfer_state := xfer_start;
         END IF;
         k_msg(6821);
         unld_cmd := false;
         unld_state := unld_standby;
         file_proc := 0;
       END IF;

      WHEN OTHERS =>
        NULL;
    END CASE;
END CASE;
-----------------------------------------------------------------
CASE mdi_state IS
  WHEN standby =>                                          --STATE 0

    IF md_fl_chk AND file_command = no_file THEN
      lur_fault := 6837;
      md_fl_chk := false;
      file_command := command_standby;
    ELSE
      md_fl_chk := false;
    END IF;

  WHEN mdi_wait =>                                         --STATE 1
    IF NOT xgr_park THEN
      mdi_state := nw_file;
    END IF;

  WHEN tm =>                                               --STATE 2
    IF xgr_park THEN
      file_present(3);
      IF file_is_there = 1 THEN
        file_is_there := 0;
        lur_fault := 6858;
      ELSIF file_is_there = 2 THEN
        file_is_there := 0;
        m_ldtr_init := true;
      new_nm := 1;
      mdi_state := mdi_wait;
    END IF;
  END IF;

WHEN qm =>                                                 --STATE 3
  IF xgr_park THEN
    file_present(3);
    IF file_is_there = 1 THEN
      file_is_there := 0;
      lur_fault := 6858;
    ELSIF file_is_there = 2 THEN
      file_is_there := 0;
      automcode(a502) := true;
      new_nm := 2;
      mdi_state := mdi_wait;
    END IF;
  END IF;

WHEN mt =>                                                 --STATE 4
  IF xgr_park THEN
    file_present(1);
    IF file_is_there = 1 THEN
      file_is_there := 0;
```

```
      lur_fault := 6858;
    ELSIF file_is_there = 2 THEN
      new_nm := 0;
      IF deliv_exp THEN
        rember_deliv := true;
        kill_msg(6816);
        deliv_exp := false;
        put_save_bool(deliv_exp, 21);
        xfer_state := xfer_standby;
      END IF;
      automcode(a505) := true;
      mdi_state := mdi_wait;
    END IF;
  END IF;

WHEN nw_file =>                                                  --STATE 5
  IF xgr_park THEN
    IF ((new_nm = 0) AND
       (plate_tra OR NOT ldin(plate_present_t))) OR
      ((new_nm = 1 OR new_nm = 2) AND plate_mac) THEN
      IF file_command = command_standby THEN
        IF (new_nm = 0) THEN
          str_set(1, 3);
          str_set(0, 1);
          cim_time_run := true;
          IF rember_deliv THEN
            rember_deliv := false;
            xfer_state := part_is_gone;
          END IF;
        ELSE
          str_set(0, 3);
          plate_integer := 3;
          put_save_int(3, 7);
          IF new_nm = 1 THEN
            str_set(1, 1);
          ELSE
            str_set(1, 2);
          END IF;
        END IF;
        file_command := rename;
        mdi_state := standby;
        prelude_req_off(ptmgmt_lude);
              md_fl_chk := true;
            ELSIF file_command = no_file THEN
              lur_fault := 6837;
              file_command := command_standby;
            END IF;
          ELSE
            mdi_state := standby;
            prelude_req_off(ptmgmt_lude);
            md_fl_chk := true;
          END IF;
        END IF;
    END CASE;
  ELSE
    IF lur_fault = 6858 OR lur_fault = 6497 THEN
      put_msg(lur_fault, 6, 6);
      store_msg(lur_fault);
    ELSE
      p_msg(lur_fault, 6);
    END IF;
    lur_master := auto_error;
  END IF;

 WHEN auto_error =>
  IF lur_fault = 6858 OR lur_fault = 6497 THEN
    file_is_there := 0;
    set_busy(feedhold);
    lur_master := auto_recovery;
  ELSIF lur_fault = 6843 THEN
    lur_master := auto_recovery;
  END IF;
```

```
    WHEN auto_recovery =>
      IF lur_fault = 6858 OR lur_fault = 6497 THEN
        null;
      ELSIF lur_fault = 6843 THEN
        IF rrise(cycle_start) THEN
          kill_msg(6843);
          lur_fault := 0;
          lur_master := auto_run;
        END IF;
      END IF;
  END CASE;

END lur_main;
 ----------------------------------------------------------------------
END lur;
-- ***********************************************************************
-- *                                                                    *
-- * SOFTWARE BY BRYAN IRVING (A&ES) FOR                                *
-- * AIRCRAFT ENGINE BUSINESS GROUP / GENERAL ELECTRIC COMPANY          *
-- *                                                                    *
-- *                                                                    *
-- * THIS PROGRAM AND RELATED MATERIAL ARE THE PROPERTY OF THE          *
-- * GENERAL ELECTRIC CO. (G.E.) AND CONTAINS CONFIDENTIAL AND          *
-- * PROPRIETARY INFORMATION OF G.E. THIS PROGRAM, THE RELATED          *
-- * MATERIAL, AND THE INFORMATION CONTAINED HEREIN, SHALL NOT          *
-- * BE DISCLOSED TO OTHERS WITHOUT WRITTEN PERMISSION OF G.E.,         *
-- * AND SHALL NOT BE DUPLICATED OR USED EXCEPT IN ACCORDANCE           *
-- * WITH THE LIMITED CONDITIONS UNDER WHICH IT WAS PROVIDED BY         *
-- * G.E.                                                               *
-- *                                                                    *
-- * PROPERTY OF THE AIRCRAFT ENGINE BUSINESS GROUP OF THE              *
-- * GENERAL ELECTRIC COMPANY.                                          *
-- *                                                                    *
-- ***********************************************************************

WITH wndone;   USE wndone;
WITH oemdec;   USE oemdec;

PACKAGE menu IS

menu_master       : auto_masters := auto_init;

TYPE menu_states IS (menu_standby, display, input_mode, status, tst_host,
                     reset_ps, ref_wait);
menu_state        : menu_states := menu_standby;

TYPE process_ps IS (upload, pp_dnc, datime, wait_1, wait_2);
prgm_updt         : process_ps := upload;

ready_auto        : CONSTANT integer := 1;                    --WS STAT
ready_manual      : CONSTANT integer := 2;                    --   "
not_available     : CONSTANT integer := 3;                    --   "
off_line          : CONSTANT integer := 4;                    --   "
cursor_line       : integer := off_line;             --MENU CURSOR POSITI
dcf_index         : integer;                   --OEMDSP CURSOR INDEX VARIAB
menu_fault        : integer := 0;

sel_curs_index    : integer := 110;                     --OEM PAGE SELECTI
ws_status         : integer := off_line;                 --CURRENT WS STAT

eopgm_cmplt       : boolean := false;                  --EOP COMPLETION FL
erase_inquire     : boolean := false;     --FLAG TO ALLOW ERASE OF INQ PROM
hours_set         : boolean := false;            --HOURS HAVE BEEN SET FL
mdi_auto_mode     : boolean := false;
proc_was_running  : boolean := false;
restart_proc      : boolean := false;
restrt_menu       : boolean := false;             --FLAG TO START MENU AGA
select_flag       : boolean := false;          --WS STATUS HAS BEEN CHANG
tool_mag_deliver  : boolean := false;
wait_for_status   : boolean := false;
```

```
ws_num_asd        : string(1..3);              --WORKSTATION
hours             : string(1..2);              --HOURS NOT AVAILAB

PROCEDURE menu_init;
PROCEDURE menu_cancel;
PROCEDURE menu_main;

END menu;

-- *****************************************************************
-- *                                                               *
-- * SOFTWARE BY BRYAN IRVING (A&ES) FOR                           *
-- * AIRCRAFT ENGINE BUSINESS GROUP / GENERAL ELECTRIC COMPANY     *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL !       *
-- * BE DISCLOSED TO OTHERS WITHOUT WRITTEN PERMISSION OF G._ ,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *                                                               *
-- *****************************************************************

-- *****************************************************************
-- *                                                               *
-- *                      AUTOMATION MCL                           *
-- *              WORKSTATION OPERATING MODE MENU                  *
-- *                                                               *
-- *   THIS PACKAGE WILL BE USED TO CONTROL THE START OF THE       *
-- * AUTOMATION MCL(AMCL) AT START UP AND AFTER EACH PASS          *
-- * THROUGH A PART PROGRAM.  AN MCODE WILL BE USED TO START       *
-- * THE AMCL AS WELL AS CHANGE THE OPERATING MODE. A FLAG WILL    *
-- * BE USED BY THE END-OF-PROGRAM TASK TO START THE AMCL AFTER    *
-- * EACH PASS THROUGH THE PART PROGRAM. THE MCODE WILL ALLOW      *
-- * THE ATTENDANT TO SELECT ONE OF FOUR OPERATING MODES FOR THE*
-- * AMCL; READY_AUTO, READY_MANUAL, NOT_AVAILABLE, & OFF_LINE.    *
-- * THESE MODES ARE DEFINED BY AEBG. ONCE THIS PACKAGE IS         *
-- * STARTED VIA MCODE IT WILL PROMPT THE OPERATOR FOR MODE        *
-- * SELECTION USING CURSORING AND ENTER FUNCTIONS. IF ATTENDANT*
-- * SELECTS A MODE OTHER THAN OFF-LINE AND THE HOST IS AVAIL-     *
-- * ABLE THEN UPLOAD OF STATUS/DOWNLOAD OF TIME&DATE IS CALLED    *
-- * FOR BY THIS PACKAGE. IF READY-AUTO IS SELECTED THEN HOST IS*
-- * CALLED TO UPDATE PART PROGRAMS. ONCE COMPLETE CONTROL IS      *
-- * PASSED TO THE PART MANAGEMENT TASK AUTOMATICALLY. IF MODE     *
-- * IS OTHER THAN READY-AUTO A MESSAGE IS DISPLAYED AND CON-      *
-- * TROL WILL NOT PASS TO PART MANAGEMENT UNTIL AN MCODE IS IN-*
-- * PUT.                                                          *
-- *   IF ATTENDANT DOES NOT ENTER A MODE WHEN PROMPTED THEN A     *
-- * TIME OUT OCCURS AND IF THE HOST IS AVAILABLE THEN A MESSAGE*
-- * IS DISPLAYED; IF NOT, THEN OFF-LINE MODE IS SELECTED AND      *
-- * MANUAL INPUT OF THE DATE IS REQUIRED.                         *
-- *   IN READY-MANUAL & NOT-AVAILABLE ATTENDANT MUST CHECK FOR    *
-- * PART PROGRAM AND PART AVAILABLILITY. HOURS ENTERED IN NOT-    *
-- * AVAILABLE INDICATE TO THE HOST NOT TO SCHEDULE WORK FOR       *
-- * THIS WORKSTATION FOR THAT AMOUNT OF TIME.                     *
-- *   IN READY-AUTO PART PROGRAM DESELECTION OCCURS AUTOMATIC-    *
-- * ALLY BY SELECTING A 'DUMMY' PROGRAM.                          *
-- *   AMCL WILL NOT BE ALLOWED TO RUN AT START UP UNTIL ALL       *
-- * AXIS HAVE BEEN REFERENCED.                                    *
-- *                                                               *
-- *****************************************************************

WITH wndone;   USE wndone;
WITH mcldat;   USE mcldat;
WITH mcllib;   USE mcllib;
WITH wndtwo;   USE wndtwo;
WITH wndstd;   USE wndstd;
```

```
WITH wndmth;    USE wndmth;
WITH atmlib;    USE atmlib;
WITH rel5;      USE rel5;
WITH rel6;      USE rel6;
WITH rel7;      USE rel7;
WITH oemdec;    USE oemdec;
WITH oemmst;    USE oemmst;
WITH bubdec;    USE bubdec;
WITH clock;     USE clock;
WITH dncdec;    USE dncdec;
WITH dncmcl;    USE dncmcl;
WITH ptchk;     USE ptchk;
WITH blkdlt;    USE blkdlt;
WITH agvmon;    USE agvmon;
WITH tcntrl;    USE tcntrl;
WITH chpmgt;    USE chpmgt;
WITH xfer;      USE xfer;

PACKAGE BODY menu IS

TYPE prog_sels IS (sel_prog, chk_sel);
prog_sel            : prog_sels := sel_prog;

timee               : integer;
ws_num_flt          : float;
once_only           : boolean := false;
rdy_resp            : boolean;
-----------------------------------------------------------------------
PROCEDURE menu_init IS

BEGIN

  timee := msd_int_table(0200) * 100;                  --HOST RESPONSE TIME
  ws_num_flt := msd_float_table(0300);
  f_tc_c(ws_num_flt, 7, 0, 1, ws_num_asc);
  hours(1) := '0';
  hours(2) := '0';
  p_msg(6804, 5);

END menu_init;
-----------------------------------------------------------------------
PROCEDURE menu_cancel IS

BEGIN

  IF menu_fault /= 0 THEN
    cnt_dwn;
    kill_msg(menu_fault);
    menu_fault := 0;
  END IF;
  menu_master := auto_init;
  rdy_resp := false;
  prog_sel := sel_prog;
  cursor_line := ws_status;
  restrt_menu := false;
  once_only := false;
  IF clock_is_set THEN
    prgm_updt := datime;
  END IF;
  mdi_auto_mode := false;

END menu_cancel;
-----------------------------------------------------------------------
FUNCTION menu_ok RETURN boolean IS

menu_status : boolean;

BEGIN
```

```
  IF nc_status(servo_stop_actv) AND ws_status = 2 THEN
    ws_status := 4;
    enum_resp := parameter_change(105, int_to_float(ws_status));
  END IF;
  menu_status := NOT (menu_fault /= 0);

RETURN menu_status;

END menu_ok;
-----   ---------------------------------------------------------------
FUNCTION program_deselect RETURN boolean IS

select_status : boolean;

BEGIN

  select_status := false;

  CASE prog_sel IS
    WHEN sel_prog =>
      CASE prog_num_select("DUMMY ") IS
        WHEN busy =>
          NULL;
-----------------------------------------------------------------
--          CASES FOR FAILURE ARE:
-- 1.SERVO STOP IS ACTIVE 2.AXES REQUIRE REFERENCING(MSD)
-- 3.CYCLE START IS ON     4.CLEAR OR CANCEL IS IN PROGRESS
-- 5. PROGRAM IS NOT AVAILABLE
-----------------------------------------------------------------------
        WHEN failure =>                         --NO ATTEMPT TO SELECT MADE
          menu_fault := 6480;                       --MSG NO SELECTION DONE

        WHEN success =>                            --ATTEMPT TO SELECT MADE
          prog_sel := chk_sel;
      END CASE;

    WHEN chk_sel =>
      IF nc_status(prog_select_done) THEN
        IF nc_status(prog_select_succ) THEN
          prog_sel := sel_prog;
          select_status := true;
        ELSE
          menu_fault := 6480;                             --DUMMY NOT FOUND
        END IF;
      END IF;
  END CASE;

RETURN select_status;

END program_deselect;
-----------------------------------------------------------------
PROCEDURE menu_main IS

resp_len : integer;
resp_text : str64;

BEGIN

  CASE menu_master IS
    WHEN auto_init =>
      IF auto_msd_bool(automation_opt) THEN
        menu_master := auto_run;
      END IF;

    WHEN auto_run =>
IF menu_ok THEN
  CASE menu_state IS
    WHEN menu_standby =>                             --MENU STATE 0
      cursor_line := ws_status;
      IF automcode(a109) THEN
        k msg(6800);                   --CLEAR MENU MESSAGES PROCEDURE
```

```
  IF su_flag THEN
    k_msg(6804);
  END IF;
  disp_page_select(90);
  menu_state := display;
  automcode(a109) := false;
ELSIF automcode(a100) THEN
  IF prgm_updt = datime THEN
    IF NOT restart_prog THEN
      set_busy(auto_pb);
    END IF;
    restart_prog := false;
    IF part_check = part_standby THEN
      automcode(a100) := false;
      k_msg(6800);
      k_msg(6802);
      part_check := part_start;
    END IF;
  ELSE
    automcode(a100) := false;
    prgm_updt := upload;
    als_light := false;
  END IF;
ELSIF restrt_menu THEN                        --EOPGM AUTOMATION RESTRT
  IF prgm_updt = datime THEN
    menu_state := status;
    prgm_updt := upload;
  ELSE
    restrt_menu := false;
  END IF;
ELSIF su_flag AND NOT nc_status(reqd_ref_done) THEN
  menu_state := ref_wait;
ELSIF rrise(cycle_start) AND (NOT su_flag) THEN
  k_msg(6800);
  k_msg(6802);
ELSIF cell_is_up AND (rdout(auto_light) OR host_req_mag) THEN
  IF NOT rdout(cyc_start_light) THEN
    ws_status := 1;
    cursor_line := 1;
    menu_state := status;
    als_light := true;
  ELSIF NOT nc_status(cyc_start_lt_on) AND
        NOT no_go_off_line THEN
    no_go_off_line := true;
    set_busy(mcs_cancel);
  ELSIF NOT rdout(op_stop_light) AND NOT no_go_off_line THEN
    prog_was_running := true;
    set_busy(option_stop);
  END IF;
ELSIF ws_status = 2 THEN
  IF rdin(manual_pb) OR rdin(single_pb) OR rdin(mdi_pb) THEN
    ws_status := 4;
    menu_state := status;
    cell_is_up := false;
  END IF;
END IF;

WHEN display =>                                       --MENU STATE 1
  IF (active_disp_page = 90) THEN
    disp_sel_lock;
    menu_state := input_mode;
    rdy_resp := false;
  END IF;

WHEN input_mode =>                                    --MENU STATE 2
  inq_msg :=
" [7m SELECT STATION STATUS 1 TO 4 -HIT <ENTER>  [0m              ";
  inq_msg(1) := esc;
  inq_msg(48) := esc;
  ask_oper(47, 22, 1, resp_len, rdy_resp);
  IF rdy_resp AND ask = ask_1 THEN
    IF resp_len = 1 THEN
```

```
      IF inq_msg(1) = '1' THEN
        mdi_auto_mode := true;
        cursor_line := 1;
      ELSIF inq_msg(1) = '3' THEN
        cursor_line := 3;
      ELSE
        cursor_line := 4;
        IF ws_status /= 4 THEN
          dnc_bool(mc2000_status) := true;                  --TO HOST
          wait_for_status := true;
        END IF;
      END IF;
      ws_status := cursor_line;
      menu_state := status;
      rdy_resp := false;
      menu_start := false;
      erase(90, 22);                      --ERASE INQUIRE NEXT SWEEP
    ELSE
      rdy_resp := false;
    END IF;
  END IF;

WHEN status =>                                            --MENU STATE 3
  CASE ws_status IS
    WHEN ready_auto =>
      IF dncmcl_master = auto_run THEN
        IF NOT restrt_menu THEN
          IF a_delivr OR a_pickup THEN
            standby_chips := true;
          END IF;
          IF standby_req > 2 THEN
            standby_tool := true;
          END IF;
          standby_part := true;                        --PICKUP CHANGE
        END IF;
        hours_set := false;
        set_busy(auto_pb);
        command_request := 0;
        trans_action := 0;
        data_request := 0;
        prog_chk_cmplt := false;
        IF cell_is_up THEN
          dnc_bool(mc2000_status) := true;
        ELSE
          dnc_bool(mc2000_status) := NOT restrt_menu;
        END IF;
        start_timer(host_tmr, timee);
        menu_state := tst_host;
      END IF;

    WHEN ready_manual =>
      k_msg(6810);
      menu_state := tst_host;
      WHEN not_available =>
        prog_chk_cmplt := false;
        standby_chips := false;
        standby_req := 0;
        put_save_int(standby_req, 4);
        standby_tool := false;
        k_msg(6850);
        inq_msg :=
 " [7m KEY IN # OF HOURS(1..99) AND <ENTE...    [0m                  ";
                                                                --PROMPT MSG
        inq_msg(1) := esc;
        inq_msg(44) := esc;
        ask_oper(42, 22, 1, resp_len, rdy_resp);
        IF rdy_resp AND ask = ask_1 THEN
          IF (resp_len = 0) THEN
            hours_set := true;
            hours_int := 0;
          ELSIF (resp_len = 1) THEN
            hours_set := true;
```

```
      hours(1) := '0';
      c_to_i(inq_msg, 1, 1, hours_int);
      i_to_c(hours_int, 1, 2, hours);
    ELSIF (resp_len >= 2) THEN
      hours_set := true;
      c_to_i(inq_msg, 1, 2, hours_int);
      i_to_c(hours_int, 2, 1, hours);
    END IF;
    menu_state := tst_host;
    dnc_bool(mc2000_status) := NOT restrt_menu;
    erase(90, 22);                    --ERASE INQUIRE NEXT SWEEP
    start_timer(host_tmr, timee);
    rdy_resp := false;
  END IF;

WHEN off_line =>
  IF NOT wait_for_status THEN
    IF waiting_cell THEN
      waiting_cell := false;
      kill_msg(6866);
      cnt_dwn;
    END IF;
    host_available := false;
    command_request := 0;
    trans_action := 0;
    data_request := 0;
    del_wait := false;
    standby_part := true;
    standby_chips := false;
    standby_tool := false;
    standby_req := 0;
    put_save_int(standby_req, 4);
    prog_chk_cmplt := false;
    plate_permit := true;
    chip_permit_msg := false;
    tool_permit_msg := false;
    menu_state := tst_host;
    clear_timer(host_tmr);
    host_req_mag := false;
    k_msg(6810);
    k_msg(6805);
    k_msg(6850);
    kill_msg(6871);
  END IF;

WHEN OTHERS =>
  NULL;
  END CASE;

WHEN tst_host =>                                        --MENU STATE 4
  disp_sel_unlock;
  IF cell_is_up THEN
    IF NOT dnc_bool(mc2000_status) THEN
      prgm_updt := upload;
      menu_state := reset_ps;
    END IF;
  ELSIF host_available THEN
    agv_inprgs := false;
    chp_agv_st := stdby;
    IF NOT dnc_bool(mc2000_status) THEN
      IF program_deselect THEN
        prgm_updt := upload;
        menu_state := reset_ps;
        als_light := true;
      END IF;
    END IF;
  ELSIF NOT timer_running(host_tmr) THEN       --HOST NOT RESPONDED
    IF program_deselect THEN
      IF NOT restrt_menu THEN
        ws_status := 4;
```

```
      cursor_line := ws_status;
      p_msg(6800, 5);                     --START UP COMPLETE MSG
      p_msg(6802, 5);                      --HOST IS OFF LINE MSG
      prgm_updt := datime;
    END IF;
    menu_state := reset_ps;
    dnc_bool(mc2000_status) := false;          --STATUS TO HOST
  END IF;
END IF;

WHEN reset_ps =>                               --MENU STATE 5
  enum_resp := parameter_change(105, int_to_float
    (ws_status));
  CASE prgm_updt IS
    WHEN upload =>                                  --STATE 0
      IF host_available OR cell_is_up THEN
        dnc_bool(get_date) := true;       --HOST TO SEND DATE/TIME
        IF (ws_status = ready_auto) THEN
          prgm_updt := pp_dnc;
        ELSE
          prgm_updt := datime;
        END IF;
        restart_prog := false;
      ELSIF plate_que AND restrt_menu THEN
        restart_prog := true;
        restrt_menu := false;
        als_light := true;
        automcode(a100) := true;
        prgm_updt := datime;
        menu_state := menu_standby;
      ELSE
        restrt_menu := false;
        restart_prog := false;
        menu_state := menu_standby;
        prgm_updt := datime;
      END IF;

    WHEN pp_dnc =>                                    --STATE 1
      IF NOT dnc_bool(get_date) THEN
        dnc_bool(prog_check) := true;
        prog_chk_cmplt := false;
        p_msg(6810, 5);
        IF msg_act(6825) THEN
        host_req_mag := true;
        standby_req := 20;
        standby_tool := true;
      ELSIF NOT ldin(tdrum_seated1) THEN
        host_req_mag := true;
        tool_mag_deliver := true;
      ELSE
        host_req_mag := false;
      END IF;
      dnc_bool(time_report) := true;
      prgm_updt := wait_1;
    END IF;

  WHEN datime =>                                     --STATE 2
    p_msg(6800, 5);
    IF NOT host_available THEN
      automcode(a300) := true;          --MANUAL CLOCK INPUT
      su_flag := false;
    ELSE
      IF NOT dnc_bool(get_date) THEN
        su_flag := false;
      END IF;
    END IF;
    menu_state := menu_standby;
    restrt_menu := false;

  WHEN wait_1 =>                   --STATE 3 IF HOST IS COMPLETE
    IF prog_chk_cmplt THEN           --AND NOT HOST_REQ_MAG THEN
      menu.start := true;
```

```
          prgm_updt := wait_2;
        ELSIF host_req_mag AND NOT once_only THEN
          once_only := true;
          tool_mag_req := true;
        END IF;

      WHEN wait_2 =>                                       --STATE 4
        IF NOT host_req_mag THEN
          IF NOT init_fault THEN
            IF cell_is_up AND prog_was_running THEN
              cyc_strt_on := true;
              menu_state := menu_standby;
              prgm_updt := datime;
            ELSE
              IF part_check = part_standby THEN
                menu_state := menu_standby;
                part_check := part_start;         --START PART MNGMNT
                prgm_updt := datime;
              END IF;
            END IF;
            k_msg(6810);
            su_flag := false;
            restrt_menu := false;
            once_only := false;
            cell_is_up := false;
            prog_was_running := false;
          END IF;
        END IF;
    END CASE;

  WHEN ref_wait =>                                     --MENU STATE 6
    IF nc_status(reqd_ref_done) THEN
      menu_state := menu_standby;
    END IF;
  END CASE;
ELSE                                                   -- NOT MENU_OK
  put_msg(menu_fault, 10, 6);
      store_msg(menu_fault);
      menu_master := auto_error;
      disp_sel_unlock;
    END IF;

  WHEN OTHERS =>
    NULL;
  END CASE;

END menu_main;
------------------------------------------------------------------------
END menu;
-- ***************************************************************
-- *                                                             *
-- * SOFTWARE BY DAN GARAFOLA (A&ES) FOR                         *
-- * AIRCRAFT ENGINE BUSINESS GROUP / GENERAL ELECTRIC COMPANY   *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCO   NCE    *
-- * WITH THE LIMITED CONDITIONS UNDER WHICH IT WAS PROVIDED BY  *
-- * G.E.                                                        *
-- * PROPERTY OF THE AIRCRAFT ENGINE BUSINESS GROUP OF THE       *
-- * GENERAL ELECTRIC COMPANY.                                   *
-- ***************************************************************

WITH wndone;   USE wndone;
WITH oemdec;   USE oemdec;

PACKAGE ptchk IS
```

```
ptchk_master      : auto_masters := auto_run;

TYPE part_checks IS (part_standby, part_start, part_mach, part_queue,
                     part_tran, part_cmplt, part_sn, part_sn_a, part_prog,
                     part_prog_a, part_select, select_host, prog_status,
                     prog_status_a, rework, rework_check,
                     rework_cmplt);
part_check        : part_checks := part_standby;

proc_try_out      : boolean := false;
id_sel_cmplt      : boolean := false;
man_bl_flag       : boolean := false;
ptchk_fault       : integer := 0;
pt_sn_ctr         : integer := 1;
prog_id           : str6;

PROCEDURE ptchk_clear;
PROCEDURE ptchk_cancel;
PROCEDURE ptchk_main;

END ptchk;
-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

-- ****************************************************************
-- * PACKAGE DESCRIPTION:  PTCHK.PCL                              *
-- *                                                              *
-- * PTCHK_MAIN;                                                  *
-- *     THIS PROCEDURE IS CALLED BY EITHER AN M-CODE (MANUAL     *
-- * OPERATION), OR BY THE START UP PROCEDURE IN THE AUTOMATION   *
-- * MCL.                                                         *
-- *     THIS PROCEDURE CHECKS THE POSITION OF ALL AVAILABLE      *
-- * PARTS AT THE WORK STATION, WETHER OR NOT IT HAS A CORRIS -   *
-- * PONDING PLATE CONFIGURATION FILE, WICH PART IS NEXT TO RUN,  *
-- * IF A PART PROGRAM IS AVAILABLE TO RUN PART,  AND IF A PICK   *
-- * UP OR DELIVERY IS EXPECTED.  DEPENDING ON WHAT MODE IS       *
-- * SELECTED FROM THE START UP MENU THIS PACKAGE WILL START THE  *
-- * BLOCK DELETE PACKAGE.                                        *
-- ****************************************************************

WITH wndone;   USE wndone;
WITH mcldat;   USE mcldat;
WITH mcllib;   USE mcllib;
WITH oemdec;   USE oemdec;
WITH wndstd;   USE wndstd;
WITH spcont;   USE spcont;
WITH atmlib;   USE atmlib;
WITH blkdlt;   USE blkdlt;
WITH clock;    USE clock;
WITH xfer;     USE xfer;
WITH rel5;     USE rel5;
WITH rel6;     USE rel6;
WITH rel7;     USE rel7;
WITH bubdec;   USE bubdec;
```

```
WITH wndtwo;    USE wndtwo;
WITH dncdec;    USE dncdec;
WITH dncmcl;    USE dncmcl;
WITH dtmgmt;    USE dtmgmt;
WITH menu;      USE menu;

PACKAGE BODY ptchk IS

trans_stat          : character;
power_up_chk        : boolean := true;
check_tra           : boolean := false;
ncprog              : boolean := false;
req_done            : boolean := false;
-------------------------------------------------------------------
FUNCTION ptchk_ok RETURN boolean IS

ptchk_status : boolean;

BEGIN

  ptchk_status := true;
  IF ptchk_fault /= 0 THEN
    ptchk_status := false;
  END IF;

RETURN ptchk_status;

END ptchk_ok;
-------------------------------------------------------------------
PROCEDURE ptchk_clear IS

BEGIN

  ptchk_fault := 0;
  ptchk_master := auto_run;
  man_bl_flag := false;

END ptchk_clear;
-------------------------------------------------------------------
PROCEDURE ptchk_cancel IS

BEGIN

  IF ptchk_fault = 6836 THEN
    k_msg(ptchk_fault);
    ptchk_fault := 0;
    ptchk_master := auto_run;
  END IF;
  part_check := part_standby;
  k_msg(6835);
  req_done := false;
  check_tra := false;
  pt_sn_ctr := 1;
  id_sel_cmplt := false;

END ptchk_cancel;
-------------------------------------------------------------------
PROCEDURE ptchk_main IS

flt_arr : ARRAY (2..5) OF float;

BEGIN

  flt_arr(2) := float_2;
  flt_arr(3) := 3.0;
  flt_arr(4) := 4.0;
  flt_arr(5) := 5.0;

  CASE ptchk_master IS
    WHEN auto_init =>
      ptchk_master := auto_run;
```

```
WHEN auto_run =>
  IF ptchk_ok THEN
    CASE part_check IS
      WHEN part_standby =>                                        --STATE 0
        NULL;                               --WAITS FOR A PART CHECK COMMAND

      WHEN part_start =>                                          --STATE 1
        IF NOT plate_mac AND NOT plate_tra AND NOT plate_que THEN
          IF xfer_state = xfer_standby THEN

      xfer_state := xfer_start;
    END IF;
  ELSE
    p_msg(6818, 6);
    inh_orient_tmr := false;
    part_check := part_mach;
  END IF;

WHEN part_mach =>                                              --STATE 2
  IF plate_mac THEN
    IF power_up_chk AND NOT plate_que THEN
      check_tra := true;
    END IF;
    power_up_chk := false;
    man_bl_flag := true;
    part_check := part_cmplt;
  ELSE
    part_check := part_queue;
  END IF;

WHEN part_queue =>                                             --STATE 3
  IF plate_que THEN
    part_check := part_cmplt;
  ELSE
    part_check := part_tran;
  END IF;

WHEN part_tran =>                                              --STATE 4
  power_up_chk := false;
  IF NOT pkup_exp AND NOT deliv_exp AND
     (xfer_state = xfer_standby) THEN
    IF plate_tra THEN
      IF find_trans THEN
        IF tran_num = 1 THEN
          part_check := part_cmplt;
        ELSIF tran_num = 4 THEN
          xfer_state := xfer_start;
        ELSE
          ptchk_fault := 6836;
        END IF;
        IF check_tra THEN
          part_check := rework_cmplt;
        END IF;
      END IF;
    ELSE
      xfer_state := xfer_start;
    END IF;
  ELSIF check_tra THEN
    part_check := rework_cmplt;
  END IF;

WHEN part_cmplt =>                                             --STATE 5
  IF plate_mac THEN
    fl_num := 3;
  ELSIF plate_que THEN
    fl_num := 2;
  ELSIF plate_tra THEN
    fl_num := 1;
  END IF;
  pt_sn_ctr := 1;
  part_check := part_sn;
```

```
WHEN part_sn =>                                              -- STATE 6
  IF file_command = command_standby THEN
    str_set(0, fl_num);
    item1_rec := serial_num_loc(pt_sn_ctr);
    file_command := g_str;
    part_check := part_sn_a;
  END IF;

WHEN part_sn_a =>                                            -- STATE 7
  IF file_command = get_data THEN
    IF buffer_string(plate_loc) = '~'or
       buffer_string(plate_loc) = ' ' THEN
      sn_str_arr(pt_sn_ctr) := "********";
      response := tbl_chg_int(cust, ptqty, pt_sn_ctr, 0);
    ELSE
      FOR j IN 0..7 LOOP
        sn_str_arr(pt_sn_ctr)(j + 1) := buffer_string
          (plate_loc + j);
      END LOOP;
      response := tbl_chg_int(cust, ptqty, pt_sn_ctr, pt_sn_ctr);
    END IF;
    file_command := command_standby;
    IF pt_sn_ctr > 0 THEN        --************CHG TO 4 ON MONARCH
      part_check := part_prog;
      pt_sn_ctr := 1;
    ELSE
      part_check := part_sn;
      pt_sn_ctr := pt_sn_ctr + 1;
    END IF;
  ELSIF file_command = no_file THEN
    ptchk_fault := 6836;
    file_command := command_standby;
  END IF;

WHEN part_prog =>                                            --STATE 8
  IF file_command = command_standby THEN
    str_set(0, fl_num);
    item1_rec := pr_id_rnm;
    file_command := g_str;
    part_check := part_prog_a;
  END IF;

WHEN part_prog_a =>                                          --STATE 9
  IF file_command = get_data THEN
    FOR index IN 0..5 LOOP
      prog_id(index + 1) := buffer_string(plate_loc + index);
    END LOOP;
    file_command := command_standby;
    part_check := part_select;
  ELSIF file_command = no_file THEN
    ptchk_fault := 6836;
    file_command := command_standby;
  END IF;

WHEN part_select =>                                          --STATE 10
  IF prog_id = "      " THEN
    p_msg(6835, 6);                       -- RETRIEVE NEW PROGRAM
    part_check := select_host;
  ELSIF NOT id_sel_cmplt THEN
    IF prog_num_select(prog_id) = success THEN
      id_sel_cmplt := true;
    END IF;
  ELSE
    IF nc_status(prog_select_done) THEN
      IF nc_status(prog_select_succ) THEN
        part_prog_rec := false;
        part_check := prog_status;
        req_done := false;
      ELSE
        p_msg(6835, 6);                   -- RETRIEVE NEW PROGRAM
```

```
        IF host_available AND NOT req_done THEN
          IF command_request = 0 THEN
            command_request := 13;
            dnc_bool(mc2000_cmd_req) := true;
            req_done := true;
          END IF;
        END IF;
        part_check := select_host;
      END IF;
      id_sel_cmplt := false;
    END IF;
  END IF;

WHEN select_host =>                                          --STATE 11
  IF host_available THEN
    IF part_prog_rec THEN
      part_prog_rec := false;
      part_check := part_select;
    END IF;
  ELSE                                         --WAIT FOR MANUAL CANCEL
    req_done := false;
  END IF;

WHEN prog_status =>                                          --STATE 12
  IF file_command = command_standby THEN
    str_set(0, fl_num);
    item1_rec := pr_stat_rnm;
    file_command := g_str;
    part_check := prog_status_a;
  END IF;

WHEN prog_status_a =>                                        --STATE 13
  IF file_command = get_data THEN
    IF buffer_string(plate_loc) = 'T' THEN
      prog_try_out := true;
      IF host_available THEN
        p_msg(6808,3);
        man_bl_flag := true;
      END IF;
    END IF;
    IF check_tra THEN
      part_check := part_tran;
    ELSE
      part_check := rework;
    END IF;
    file_command := command_standby;
  END IF;

WHEN rework =>                                               --STATE 14
  IF file_command = command_standby THEN
    str_set(0, fl_num);
    item1_rec := nor_rew_rnm;
    file_command := g_str;
    part_check := rework_check;
  END IF;

WHEN rework_check =>                                         --STATE 15
  IF file_command = get_data THEN
    IF buffer_string(plate_loc) /= 'N' THEN
      put_msg(6867, 7, 3);
      man_bl_flag := true;
    END IF;
    part_check := rework_cmplt;
    file_command := command_standby;
  END IF;

WHEN rework_cmplt =>                                         --STATE 16
  IF man_bl_flag THEN
    blk_dlt_state := blk_cyc;
  ELSE
    blk_dlt_state := blk_start;
```

```
          END IF;
          k_msg(6818);
          check_tra := false;
          part_check := part_standby;
          k_ms '6835);
          IF h    _available AND data_request = 0 THEN
            data_request := 1;
            dnc_bool(mc2000_data_req) := true;
          END IF;
      END CASE;
    ELSE
      p_msg(ptchk_fault, 6);
      ptchk_master := auto_error;
    END IF;

  WHEN others =>
    NULL;
  END CASE;

END ptchk_main;
----------------------------------------------------------------------
END ptchk;

-- ***************************************************************
-- *                                                             *
-- * SOFTWARE BY DAN GARAFOLA (A&ES) FOR                         *
-- * AIRCRAFT ENGINE BUSINESS GROUP / GENERAL ELECTRIC COMPANY   *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- ***************************************************************

-- ***************************************************************
-- * PACKAGE DESCRIPTION :  QCONT.PCL                            *
-- *                                                             *
-- *    THIS PACKAGE CONTAINS TWO MAIN PROCEDURES :              *
-- *                                                             *
-- * QCONT_MAIN ;                                                *
-- *    THIS PROCEDURE IS CALLED BY AN M-CODE.  IT CHECKS TO SEE*
-- * IF A SYSTEM PERFORMANCE , OR A SYSTEM CALIBRATION WITHIN    *
-- * THE TIME INTERVALS SPECIFIED BY THE MSD. IF NOT THEN A      *
-- * MESSAGE IS DISPLAYED AND AN OPERATOR MUST CLEAR THE PROGRAM*
-- * DO THE PERFORMANCE OR CALIBRATION, OR ENTER THE PASSWORD    *
-- * CONTINUE THE OPERATION.                                     *
-- *    AFTER CHECKING THE PERFORMANCE AND CALIBRATION THIS      *
-- * PROCEDURE THEN CHECKS THE VERIFY.MCL FILE TO SEE IF ANY     *
-- * PARTS LIKE THIS ONE HAVE BEEN RUN AND STILL REQUIRE VERIF-  *
-- * ICATION. IF THEY DO REQUIRE VERIFICATION THIS PROCEDURE     *
-- * WILL REQUEST VERIFICATION FROM HOST OR ASK OPERATOR TO      *
-- * CLEAR THE PROGRAM AND EDIT THE VERIFY FILE, OR ENTER        *
-- * OVERRIDE PASSWORD TO CONTINUE.  IF HOST RETURNS A VERIFIC-  *
-- * ATION OF REJECT FOR ANY PART THEN THIS PROCEDURE WILL       *
-- * ASK AN ATTENDANT TO CLEAR THE PROGRAM AND FIND THE CAUSE    *
-- * OF THE REJECTION OR ENTER OVERRIDE PASSWORD TO CONTINUE     *
-- * OPERATION.                                                  *
-- *                                                             *
-- * PART_DISP ;                                                 *
-- *   THIS PROCEDURE IS CALLED BY AN M-CODE (FOR PRELIMINARY    *
-- * DISPOSITION), AN ABORT FLAG, OR A DISPOSITION FLAG (SET     *
-- * DURING A PART UNLOAD CYCLE).                                *
-- *   WHEN THIS PROCEDURE IS CALLED IT EDITS THE PART DISPOS-   *
-- * ITION IN THE PLATE CONFIGURATION FILE AND NOTIFIES THE      *
```

```
-- * HOST OF THE CHANGE.                                              *
-- *   VERIFICATION IS DETERMINED BY CHECKING FOR AN OUT OF           *
-- * TOLERANCE IN THE CLM DATA, CHECKING IF VERIFICATION              *
-- * INTERVALS HAVE BEEN EXCEDED, OR IF PROCESS LIMITS HAVE           *
-- * BEEN EXCEDED.                                                    *
-- *******************************************************************

WITH wndone;   USE wndone;
WITH mcldat;   USE mcldat;
WITH mcllib;   USE mcllib;
WITH wndstd;   USE wndstd;
WITH atmlib;   USE atmlib;
WITH oemdec;   USE oemdec;
WITH rel5;     USE rel5;
WITH rel6;     USE rel6;
WITH rel7;     USE rel7;
WITH wndtwo;   USE wndtwo;
WITH wndmth;   USE wndmth;
WITH bubdec;   USE bubdec;
WITH lur;      USE lur;
WITH xfer;     USE xfer;
WITH ptchk;    USE ptchk;
WITH blkdlt;   USE blkdlt;
WITH dncmcl;   USE dncmcl;
WITH dncdec;   USE dncdec;
WITH dtmgmt;   USE dtmgmt;
WITH oemmst;   USE oemmst;
WITH eopgm;    USE eopgm;
WITH clock;    USE clock;

PACKAGE BODY qcont IS

count_pt          : integer := 0;
first_time        : boolean := false;
pr_stat           : boolean := false;
sub_qc_task       : integer := 0;
png               : integer;
temp_strin        : string(1..27);
str_str           : string(1..6);
star_car          : character;
 ------------------------------------------------------------------
FUNCTION put_wp_status(vfyn : IN integer;
                       file_act : IN integer;
                       fill_all : IN boolean) RETURN boolean IS

status : boolean;

BEGIN

  status := false;
  CASE stat_cnt IS
    WHEN 0 =>                                                --STATE 0
      qcont_ctr := 1;
      stat_cnt := 1;

    WHEN 1 =>                                                --STATE 1
      IF tbl_val_int(cust, ptqty, qcont_ctr) > 0 THEN
        IF file_command = command_standby THEN
          str_set(0, file_act);
          item1_lgt := wp_status_lgt;
          item1_rec := wp_status(qcont_ctr);
          file_command := g_str;
          stat_cnt := 2;
        END IF;
      ELSE
        stat_cnt := 4;
      END IF;

    WHEN 2 =>                                                --STATE 2
      IF file_command = get_data THEN
```

```
      IF buffer_string(plate_loc) = '0' OR
         buffer_string(plate_loc) = 'O' OR
         buffer_string(plate_loc) = 'V' OR
         (fill_all AND buffer_string(plate_loc) = 'N') OR
         ram_it_thru THEN
        stat_cnt := 3;
      ELSE
        stat_cnt := 4;
      END IF;
      file_command := command_standby;
    END IF;

  WHEN 3 =>                                                    --STATE
    IF file_command = command_standby THEN
      item1_lgt := 12;
      item1_str := blank_item1;
      item1_str(67) := '*';
      item1_rec := wp_status(qcont_ctr);
      IF vfyn < 5 THEN
        FOR i IN 1..3 LOOP
          item1_str(i) := disp_array(vfyn)(i);
        END LOOP;
      ELSIF vfyn = 7 THEN
        FOR i IN 1..12 LOOP
          item1_str(i) := inq_msg(i);
        END LOOP;
      ELSE
        item1_str(1) := 'I';
        i_to_c(truncate(98), 2, 2, item1_str);
        IF item1-str(2) = ' ' THEN
          item1_str(2) := '0';
        END IF;
      END IF;
      file_command := p_str;
      stat_cnt := 4;
    END IF;

  WHEN 4 =>                                                    --STATE 4
    IF qcont_ctr > 0 THEN                   --**********CHG TO 4 FOR MONARCH
      qcont_ctr := 1;
      stat_cnt := 0;
      ram_it_thru := false;
      status := true;
    ELSE
      qcont_ctr := qcont_ctr + 1;
      stat_cnt := 1;
    END IF;

  WHEN OTHERS =>
    stat_cnt := 0;
END CASE;

RETURN status;

END put_wp_status;
--------------------------------------------------------------------
PROCEDURE qcont_cancel IS

BEGIN

  sub_qc_task := 0;
  stat_cnt := 0;
  qcont_ctr := 1;
  count_pt := 0;
  first_time := false;
  ram_it_thru := false;
  verf_hr := 0;
  disp_sel_unlock;
  prelude_req_off(qc_lude);
  qc_state := qc_standby;
  hold_check := check_1;
```

```
    pr_stat := false;
    disp_task := task_standby;
    fl_num := 0;
    ver_cont := cont_1;
    str_str := " ---; ";
    inq_disp := inq_1;
    FOR i IN 1..4 LOOP
      qc_msg(i) := false;


  END LOOP;

END qcont_cancel;
 -----------------------------------------------------------------------
PROCEDURE flt_msg (flt_num : IN integer) IS

BEGIN

  p_msg(flt_num, 6);
  disposition_flag := false;
  disp_task := task_standby;
  unld_state := unld_standby;

END flt_msg;
 -----------------------------------------------------------------------
PROCEDURE blank_verify(item_n : IN integer) IS

BEGIN

  FOR i IN 1..27 LOOP
    temp_strin(i) := ' ';
  END LOOP;
  FOR i IN 0..1 LOOP
    response := tbl_chg_char(cust, (verify_a + i), item_n, temp_strin);
  END LOOP;

END blank_verify;
 -----------------------------------------------------------------------
PROCEDURE qcont_main IS

vfy_id : str6;

BEGIN

  CASE qc_state IS
    WHEN qc_standby =>                                            --STATE 0
      IF automcode(a101) THEN
        p_msg(6819, 6);
        IF plate_que THEN
          fl_num := 2;
          qc_state := qc_start;
          prelude_request(qc_lude);
        ELSIF plate_tra AND NOT pkup_exp THEN
          fl_num := 1;
          qc_state := qc_start;
          prelude_request(qc_lude);
        ELSE
          automcode(a101) := false;
        END IF;
      ELSE
        k_msg(6819);
      END IF;

    WHEN qc_start =>                                       --STATE 1
      IF file_command = command_standby THEN
        str_set(0, fl_num);
        item1_rec := pr_stat_rnm;
        file_command := g_str;
        qc_state := qc_start_a;
      END IF;
```

```
WHEN qc_start_a =>                                --STATE 2
  IF file_command = get_data THEN
    IF buffer_string(plate_loc) = 'T' THEN
      qc_state := qc_standby;
      prelude_req_off(qc_lude);
      automcode(a101) := false;
    ELSE
      qc_state := qc_calibration;
    END IF;
    file_command := command_standby;
  ELSIF file_command = no_file THEN
    qc_state := qc_standby;
    prelude_req_off(qc_lude);
    automcode(a101) := false;
  END IF;

WHEN qc_calibration =>                                --STATE 3
  int_date := msd_int_table(156);
  old_year := msd_int_table(157);
  old_time := 0;
  set_conv_varb;
  IF compare THEN
    IF (hr_ret / 24) > msd_int_table(160) THEN
      qc_msg(1) := true;
    END IF;
    qc_state := qc_performance;
  END IF;

WHEN qc_performance =>                                --STATE 4
  int_date := msd_int_table(158);
  old_year := msd_int_table(159);
  old_time := 0;
  set_conv_varb;
  IF compare THEN
    IF (hr_ret / 24) > msd_int_table(161) THEN
      qc_msg(2) := true;
    END IF;
    qc_state := qc_verify;
  END IF;

WHEN qc_verify =>                                --STATE 5
  CASE hold_check IS
    WHEN check_1 =>
      IF file_command = command_standby THEN
        str_set(0, fl_num);
        item1_lgt := pr_limit_lgt;
        item1_rec := pr_limit_rnm;
        item1_is_int := true;
        file_command := g_data;
        hold_check := check_1a;
      END IF;

    WHEN check_1a =>
      IF file_command = get_data THEN
        pr_lmt := item1_int;
        hold_check := check_2;
        file_command := command_standby;
      ELSIF file_command = no_file THEN
        file_command := command_standby;
        hold_check := check_1;
        qc_state := qc_standby;
        prelude_req_off(qc_lude);
        automcode(a101) := false;
      END IF;

    WHEN check_2 =>
      IF NOT host_available OR verify_returned THEN
        FOR i IN 1..10 LOOP
          FOR j IN 0..1 LOOP
            tbl_val_char(cust,(verify_a + j), i, temp_strin);
            IF j = 1 THEN
```

```
          FOR a IN 1..6 LOOP
            vfy_id(a) := temp_strin(a);
          END LOOP;
        ELSE
          star_car := temp_strin(27);
        END IF;
      END LOOP;
      IF vfy_id = prog_id THEN
        IF star_car = '*' THEN
          qc_msg(4) := true;
          blank_verify(i);
        ELSIF part_count > pr_lmt THEN
          qc_msg(3) := true;
        END IF;
      END IF;
    END LOOP;
    hold_check := check_end;
  END IF;

WHEN check_end =>
  FOR i IN 1..4 LOOP
    IF qc_msg(i) THEN
      p_msg(6837 + i  5);
      disp_page_select(60);
      hold_check := check_msg;
    END IF;
  END LOOP;
  IF hold_check /= check_msg THEN
    hold_check := check_1;
    qc_state := qc_standby;
    prelude_req_off(qc_lude);
    automcode(a101) := false;
  END IF;

WHEN check_msg =>
  IF host_available AND qc_msg(3) THEN
    IF data_request = 0 THEN
      data_request := 1;
      dnc_bool(mc2000_data_req) := true;
      hold_check := check_4;
    END IF;
  ELSE
    hold_check := check_4;
  END IF;
  verify_returned := false;

WHEN check_4 =>
  IF host_available AND qc_msg(3) AND verify_returned THEN
    k_msg(6840);
    hold_check := check_1;
    qc_msg(3) := false;
    disp_sel_unlock;
    disp_page_return;
  END IF;
  IF active_disp_page = 60 THEN
    IF NOT password_cmplt THEN
      password;
      disp_sel_lock;
    ELSE
      password_cmplt := false;
      disp_sel_unlock;
      disp_page_return;
      FOR index IN 1..4 LOOP
        qc_msg(index) := false;
        k_msg(6837 + index);
      END LOOP;

      hold_check := check_1;
      qc_state := qc_standby;
      prelude_req_off(qc_lude);
      automcode(a101) := false;
```

```
          END IF;
        END IF;
      END CASE;
  END CASE;

END qcont_main;
-----------------------------------------------------------------------
PROCEDURE part_disp IS

aft : string(1..5);
verf : str12;
mbc : string(1..27);
to : string(1..18);
wpn : string(1..14);

BEGIN

   aft := "AFTER";
   mbc := "DID OR WIL  METAL BE CUT IN";
   to := "THIS OPERATION Y/N";
   wpn := "WILL PART NEED";
   verf := "VERIFICATION";

   CASE disp_task IS                                              --STATE 0
     WHEN task_standby =>
       IF automcode(a106) THEN
         disp_task := task_3;
         prelude_request(qc_lude);
       ELSIF disposition_flag THEN
         IF abortt THEN
           k_msg(6812);
           disposition_flag := false;
         ELSE
           fl_num := 3;
           disp_task := task_1;
           qcont_ctr := 1;
         END IF;
       END IF;

     WHEN task_1 =>                                               --STATE 1
       IF file_command = command_standby THEN
         str_set(0, fl_num);
         item1_rec := wp_status(qcont_ctr);
         file_command := g_str;
         disp_task := task_2;
       END IF;

     WHEN task_2 =>                                               --STATE 2
       IF file_command = get_data THEN
         FOR i in 1..3 LOOP
           disp_code(i) := buffer_string(plate_loc + i - 1);
         END LOOP;
         IF qcont_ctr > 0 THEN            --************CHG TO 4 FOR MONARCH
           disp_task := task_3;
         ELSE
           disp_task := task_1;
         END IF;
         qcont_ctr := qcont_ctr + 1;
         IF not automcode(a106) AND
            tbl_val_int(cust, ptqty, qcont_ctr - 1) > 0 THEN
           IF wp_disp(qcont_ctr - 1) THEN
             IF disp_code = "AVU" OR disp_code = "AVR" OR
           disp_code = "CVU" OR disp_code = "CVR" OR
           disp_code = "ACC" THEN
          null;
        ELSE
          flt_msg(6829);
        END IF;
      ELSIF buffer_string(plate_loc) = ' ' OR
            buffer_string(plate_loc) = '0' THEN
        flt_msg(6829);
        disp_task := task_standby;
```

```
        END IF;
      END IF;
      file_command := command_standby;
    ELSIF file_command = no_file THEN
      file_command := command_standby;
      flt_msg(6837);
      automcode(a106) := false;
    END IF;

  WHEN task_3 =>
    CASE ver_cont IS
      WHEN cont_1 =>
        IF plate_mac THEN
          fl_num := 3;
          ver_cont := cont_2;
        ELSIF plate_que AND NOT plate_mac THEN
          fl_num := 2;
          ver_cont := cont_2;
        ELSIF plate_tra AND NOT plate_que AND NOT plate_mac THEN
          IF find_trans THEN
            IF tran_num = 1 THEN
              fl_num := 1;
              ver_cont := cont_2;
            ELSE
              ver_cont := cont_11;
            END IF;
          END IF;
        ELSE
          disp_task := task_4;
        END IF;

      WHEN cont_2 =>
        IF file_command = command_standby THEN
          str_set(0, fl_num);
          item1_rec := pr_stat_rnm;
          file_command := g_str;
          ver_cont := cont_3;
        END IF;

      WHEN cont_3 =>
        IF file_command = get_data THEN
          IF buffer_string(plate_loc) = 'T' THEN
            ram_it_thru := true;
            ver_cont := cont_16;
          ELSIF buffer_string(plate_loc) = 'U' THEN
            pr_stat := true;
            ver_cont := cont_4;
          ELSIF buffer_string(plate_loc) = 'A' OR
                buffer_string(plate_loc) = 'S' THEN
            pr_stat := false;
            ver_cont := cont_4;
          ELSE
            put_msg(6860, 7, 3);
            disp_page_select(60);
            set_busy(mcs_cancel);
          END IF;
          file_command := command_standby;
        END IF;

      WHEN cont_4 =>
        CASE sub_qc_task IS
          When 0 =>
            IF file_command = command_standby THEN
              str_set(0, fl_num);
              item1_rec := nor_rew_rnm;
              file_command := g_str;
              sub_qc_task := 1;
            END IF;

          WHEN 1 =>
            IF file_command = get_data THEN
              IF buffer_string(plate_loc) = 'D' THEN
```

```
        ver_cont := cont_16;
        ram_it_thru := true;
        sub_qc_task := 0;
      ELSIF buffer_string(plate_loc) = 'R' OR
            buffer_string(plate_loc) = 'S' THEN
        sub_qc_task := 2;
      ELSE
        sub_qc_task := 6;
      END IF;
      file_command := command_standby;
    END IF;

  WHEN 2 =>
    disp_page_select(100);
    disp_sel_lock;
    inq_msg :=
"ENTER WORK PIECE STATUS AND NAME
    sub_qc_task := 3;
    oper_cmplt := false;

  WHEN 3 =>
    IF active_disp_page = 100 THEN
      flash_al := true;
      ask_oper(34, 11, 1, pnq, oper_cmplt);
      IF oper_cmplt THEN
        oper_cmplt := false;
        sub_qc_task := 4;
      END IF;
    END IF;

  WHEN 4 =>
    IF ((inq_msg(1) = 'A' OR inq_msg(1) = 'a') OR
       (inq_msg(1) = 'C' OR inq_msg(1) = 'c')) AND
       (inq_msg(2) = 'V' OR inq_msg(2) = 'v') AND
       ((inq_msg(3) = 'U' OR inq_msg(3) = 'u') OR
       (inq_msg(3) = 'R' OR inq_msg(3) = 'r')) AND
        inq_msg(6) /= ' ' THEN
      sub_qc_task := 5;
      ram_it_thru := true;
    ELSE
      sub_qc_task := 2;
    END IF;

  WHEN 5 =>
    IF put_wp_status(7, fl_num, true) THEN
      flash_al := false;
      disp_sel_unlock;
      disp_page_return;
      sub_qc_task := 0;
      ver_cont := cont_1;
      disp_task := task_4;
    END IF;

  WHEN 6 =>
    IF pr_stat THEN
      IF file_command = command_standby THEN
        str_set(0, fl_num);
        item1_rec := apprv_ct_rnm;
        item1_lgt := apprv_ct_lgt;
        item1_is_int := true;
        file_command := g_data;
        ver_cont := cont_5;
        sub_qc_task := 0;
      END IF;
    ELSE
      sub_qc_task := 0;
      ver_cont := cont_9;
    END IF;

  WHEN others =>
    null;
END CASE;
```

```
WHEN cont_5 =>
  IF file_command = get_data THEN
    pac := item1_int + 1;
    item1_rec := apprv_qty_rnm;
    item1_lgt := apprv_qty_lgt;
    item1_is_int := true;
    file_command := g_data;
    ver_cont := cont_6;
    pr_stat := false;
    qcont_ctr := 1;
  END IF;

WHEN cont_6 =>
  IF file_command = get_data THEN
    IF pac > item1_int THEN
      ver_cont := cont_9;
      file_command := command_standby;
    ELSE
      ver_cont := cont_7;
      file_command := command_standby;
    END IF;
  END IF;

WHEN cont_7 =>
  IF put_wp_status(1, fl_num, true) THEN
    ver_cont := cont_8;
  END IF;

WHEN cont_8 =>
  IF automcode(a106) THEN
    disp_task := task_4;
    ver_cont := cont_1;
  ELSE
    IF file_command = command_standby THEN
      str_set(0, fl_num);
      item1_lgt := apprv_ct_lgt;
      item1_rec := apprv_ct_rnm;
      item1_is_int := true;
      item1_int := pac;
      file_command := p_data;
      ver_cont := cont_15;
    END IF;
  END IF;

WHEN cont_9 =>
  IF file_command = command_standby THEN
    str_set(0, fl_num);
    item1_rec := ct_int_rnm;
    item1_lgt := ct_int_lgt;
    item1_is_int := true;
    file_command := g_data;
    ver_cont := cont_10;
  END IF;

WHEN cont_10 =>
  IF file_command = get_data THEN
    IF part_count + 1 < item1_int AND part_count > 0 THEN
      ver_cont := cont_11;
    ELSE
      IF part_count = 0 THEN
        first_time := true;
      END IF;
      ver_cont := cont_14;
    END IF;
    file_command := command_standby;
  END IF;

WHEN cont_11 =>
  IF file_command = command_standby THEN
    str_set(0, fl_num);
    item1_lgt := verf_in_lgt;
    item1_rec := verf_in_rnm;
```

```
    item1_is_int := true;
    file_command := g_data;
    ver_cont := cont_12;
  END IF;

WHEN cont_12 =>
  IF file_command = get_data THEN
    verf_hr := item1_int;
    ver_cont := cont_13;
    file_command := command_standby;
  END IF;

WHEN cont_13 =>
  int_date := truncate(143);
  old_year := truncate(142);
  old_time := truncate(141);
  set_conv_varb;
  IF compare THEN
    IF hr_ret < verf_hr THEN
      IF automcode(a106) THEN
        IF put_wp_status(2, fl_num, true) THEN
          ver_cont := cont_1;
          disp_task := task_4;
        END IF;
      ELSE
        ver_cont := cont_1;
        disp_task := task_4;
      END IF;
    ELSE
      ver_cont := cont_14;
    END IF;
  END IF;

WHEN cont_14 =>
  IF put_wp_status(1, fl_num, true) THEN
    IF automcode(a106) THEN
      ver_cont := cont_1;
      disp_task := task_4;
    ELSE
      ver_cont := cont_15;
    END IF;
  END IF;

WHEN cont_15 =>
  date;
  cur_date := time;
  repl_ver_dt;
  disp_task := task_4;
  ver_cont := cont_1;

WHEN cont_16 =>
  CASE inq_disp IS
    WHEN inq_1 =>
      FOR i IN 1..64 LOOP
        IF i < 28 THEN
          inq_msg(i) := mbc(i);
        ELSIF i > 28 AND i < 47 THEN
          inq_msg(i) := to(i - 28);
        ELSE
          inq_msg(i) := ' ';
        END IF;
      END LOOP;
      disp_page_select(100);
      disp_sel_lock;
      inq_disp := inq_1a;

    WHEN inq_1a =>
      IF active_disp_page = 100 THEN
        flash_a1 := true;
        ask_oper(60, 11, 1, pnq, oper_cmplt);
        IF oper_cmplt THEN
          oper_cmplt := false;
```

```
            inq_disp := inq_2;
          END IF;
        END IF;

      WHEN inq_2 =>
        IF inq_msg(1) = 'Y' OR inq_msg(1) = 'y' THEN
          inq_disp := inq_3;
        ELSIF inq_msg(1) = 'N' OR inq_msg(1) = 'n' THEN
          flash_al := false;
          IF put_wp_status(3, fl_num, true) THEN
            disp_sel_unlock;
            disp_page_select(60);
            disp_task := task_4;
            inq_disp := inq_1;
            ver_cont := cont_1;
          END IF;
        ELSE
          inq_disp := inq_1;
        END IF;

      WHEN inq_3 =>
        FOR i IN 1..64 LOOP
          IF i < 15 THEN
            inq_msg(i) := wpn(i);
          ELSIF i > 15 AND i < 28 THEN
            inq_msg(i) := verf(i - 15);
          ELSIF i > 28 AND i < 34 THEN
            inq_msg(i) := aft(i - 28);
          ELSIF i > 34 AND i < 53 THEN
            inq_msg(i) := to(i - 34);
          ELSE
            inq_msg(i) := ' ';
          END IF;
        END LOOP;
        inq_disp := inq_3a;

      WHEN inq_3a =>
        ask_oper(60, 12, 1, pnq, oper_cmplt);
        IF oper_cmplt THEN
          oper_cmplt := false;
          inq_disp := inq_4;
        END IF;

      WHEN inq_4 =>
        IF inq_msg(1) = 'Y' OR inq_msg(1) = 'y' THEN
          flash_al := false;
          disp_sel_unlock;
          disp_page_return;
          inq_disp := inq_1;
          sub_qc_task := 6;
          ver_cont := cont_4;
        ELSIF inq_msg(1) = 'N' OR inq_msg(1) = 'n' THEN
          flash_al := false;
          IF put_wp_status(4, fl_num, true) THEN
            disp_sel_unlock;
            disp_page_return;
            disp_task := task_4;
            inq_disp := inq_1;
            ver_cont := cont_1;
          END IF;
        ELSE
          inq_disp := inq_3;
        END IF;
    END CASE;
  END CASE;

WHEN task_4 =>
  IF file_command = no_file THEN
    file_command := command_standby;
  END IF;
  IF disposition_flag THEN
    CASE count_pt IS
```

```
WHEN 0 =>
  qcont_ctr := 1;
  count_pt := 1;

WHEN 1 =>
  IF tbl_val_int(cust, ptqty, qcont_ctr) > 0 THEN
    IF file_command = command_standby THEN
      str_set(0, fl_num);
      item1_lgt := wp_status_lgt;
      item1_rec := wp_status(qcont_ctr);
      file_command := g_data;
      count_pt := 2;
    END IF;
  ELSE
    count_pt := 3;
  END IF;

WHEN 2 =>
  IF file_command = get_data THEN
    IF buffer_string(plate_loc) = 'V' AND NOT first_time THEN
      disposition_flag := false;
      count_pt := 0;
      part_count := 1;
      put_save_int(part_count, 20);
    ELSIF buffer_string(plate_loc) = 'A' OR buffer_string
          (plate_loc) = 'C' THEN
      disposition_flag := false;
      count_pt := 0;
    ELSE
      count_pt := 3;
    END IF;
    file_command := command_standby;
  END IF;

WHEN 3 =>
  IF qcont_ctr > 4 THEN
    qcont_ctr := 1;
    first_time := false;
    part_count := part_count + 1;
    put_save_int(part_count, 20);
    disposition_flag := false;
    count_pt := 0;
  ELSE
    qcont_ctr := qcont_ctr + 1;
    count_pt := 1;
  END IF;

WHEN OTHERS =>
  count_pt := 0;
END CASE;
ELSIF automcode(a106) THEN
  IF host_available THEN
    file_integer := 4 - fl_num;
    IF command_request = 0 THEN
      command_request := 17;
      dnc_bool(mc2000_cmd_req) := true;
      automcode(a106) := false;
    END IF;
  ELSE
    automcode(a106) := false;
  END IF;
ELSE
  prelude_req_off(qc_lude);
  disp_task := task_standby;
END IF;
k_msg(6812);
END CASE;

END part_disp;
-----------------------------------------------------------------------
END qcont;
```

```
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MA' .TIAL, AND THE INFORMATION CONTAINED HEREIN, SHALL NOT   *
-- * BE ..SCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH mcldat;   USE mcldat;
WITH mcllib;   USE mcllib;
WITH wndtwo;   USE wndtwo;
WITH wndtre;   USE wndtre;
WITH wndstd;   USE wndstd;
WITH wndmth;   USE wndmth;
WITH atmlib;   USE atmlib;
WITH bubmcl;   USE bubmcl;
WITH rel5;     USE rel5;
WITH rel6;     USE rel6;
WITH rel7;     USE rel7;
WITH bubdec;   USE bubdec;
WITH oemdec;   USE oemdec;
WITH tool;     USE tool;
WITH oemmst;   USE oemmst;
WITH turret;   USE turret;
WITH barcdr;   USE barcdr;
WITH spcont;   USE spcont;
WITH oemspn;   USE oemspn;
WITH mclax;    USE mclax;
WITH dncdec;   USE dncdec;
WITH dncmcl;   USE dncmcl;
WITH agvmon;   USE agvmon;
WITH menu;     USE menu;
WITH dtmgmt;   USE dtmgmt;
WITH blkdlt;   USE blkdlt;
WITH hydrls;   USE hydrls;

PACKAGE BODY tcntrl IS

save_t_off        : integer := 0;
save_t_dat        : integer := 0;
block_no          : integer := 0;
step              : integer := 1;
t_init            : integer := 1;
t_off             : integer := 0;
temp_tool_no      : integer := 1;
check_host        : integer := 0;
table_life        : float;
go_index          : boolean := false;
no_auto           : boolean := false;
take_one          : boolean := false;
msg_is_set        : boolean := false;
max_off_no        : array(1..2) of float;
-------------------------------------------------------------------
-- ****************************************************************
-- * THIS FUNCTION MONITORS TOOL MANAGEMENT FOR A FAULT CONDITION *
-- * IT WILL RETURN FALSE FOR A FAULT AND TOOL CONTROL WILL STOP  *
-- * EXECUTING.                                                   *
-- ****************************************************************
FUNCTION tcntrl_ok RETURN boolean IS
```

```
tcntrl_status : boolean;

BEGIN

  tcntrl_status := not (tcntrl_fault /= 0);

RETURN tcntrl_status;

END tcntrl_ok;
-----------------------------------------------------------------
-- ***************************************************************
-- * THIS PROCEDURE RUNS ONLY AT POWER UP TIME AND WILL          *
-- * INITIALIZE PACKAGE VARIABLES.                               *
-- ***************************************************************
PROCEDURE tcntrl_init IS

BEGIN

  turret_size := tbl_size(cust, ttype);
  v_tbl_size := tbl_size(cust, vtype);
  tbl_limit := tbl_size(cust, mn);
  tov_size := tbl_size(tov, 1);
  magazine_size := tbl_size(cust, mtype);
  max_off_no(1) := msd_axis_float(1, axis_59);
  max_off_no(2) := msd_axis_float(2, axis_59);
  FOR index IN 0..1 LOOP
    par_val(index) := float_0;
  END LOOP;
  FOR i IN 2..5 LOOP
  n_code(i) := ' ';
  END LOOP;
  n_code(1) := 'N';

END tcntrl_init;
-----------------------------------------------------------------
-- ***************************************************************
-- * THIS PROCEDURE RUNS ONLY WHEN A CANCEL IS INITIATED. IT WILL *
-- * RESET VARIABLES THAT NEED TO BE RESET AT A CANCEL.           *
-- ***************************************************************
PROCEDURE tcntrl_cancel IS

BEGIN

  IF tcntrl_fault /= 0 AND (tcntrl_master = auto_recovery) THEN
    IF tcntrl_fault /= 6401 AND tcntrl_fault /= 6402 AND
       tcntrl_fault /= 6405 AND tcntrl_fault /= 6406 THEN
      cnt_dwn;
    END IF;
    IF tcntrl_fault = 6406 THEN
      var_dwn;
    END IF;
    kill_msg(tcntrl_fault);
    tcntrl_fault := 0;
  END IF;
  IF inhibit_retrace THEN
    kill_msg(6408);
    cnt_dwn;
    inhibit_retrace := false;
  END IF;
  IF out_of_tools THEN
    kill_msg(6865);
    cnt_dwn;
  END IF;
  tcntrl_state := tcntrl_setup;
  tcntrl_master := auto_run;
  ref_b_axis := state_0;
  unload := unload_0;
  look_in_file := false;
  no_auto := false;
  out_of_tools := false;
  request_pickup := false;
  save_auto_mode := false;
```

```
  tool_code_read := false;
  wait_a_while := false;
  wait_for_file := false;
  old_t_type := 0;
  tool_count := 0;
  postlude_req_off(v_post);
  go_index := false;
  take_one := false;
  check_host := 0;
  refurbish_mag := false;
  step := 1;

END tcntrl_cancel;
---------------------------------------------------------------------
-- *****************************************************************
-- * THIS PROCEDURE RUNS EVERY TIME A T WORD IS PROGRAMED. IT      *
-- * WILL CHECK TO SEE THE T WORD HAS BEEN PROGRAMED CORRECTLY.    *
-- *****************************************************************
FUNCTION t_code_ok RETURN boolean IS

status : boolean;

BEGIN

  status := false;
  t_type := active_tool(most_sig_digs);
  t_req := (active_tool(least_sig_digs) / 100) REM 10;
  t_off := active_tool(least_sig_digs) REM 100;
  IF (t_type <= type_size) AND (t_req <= turret_size) THEN

    IF (t_type = 0 AND NOT automcode(a06) AND
        (t_req = 0 OR (t_req /= 0 AND mcl_state = mcl_mdi))) OR
        (t_type /= 0 AND active_tool(least_sig_digs) = 0
        AND NOT automcode(a06)) OR
        (t_type /= 0 AND t_req /= 0 AND automcode(a06)) THEN
      status := true;
    END IF;
  END IF;
RETURN status;

END t_code_ok;
---------------------------------------------------------------------
-- *****************************************************************
-- * THIS PROCEDURE CONTAINS ANY CALLS OR VARIABLES SET THAT ARE   *
-- * NECESSARY TO CAUSE THE OEM'S MCL TO PRESELECT A TOOL          *
-- *****************************************************************
PROCEDURE fetch_tool(pocket_to_get : IN integer) IS

BEGIN

    pre_sel_tool(most_sig_digs) := pocket_to_get;
    tool_in_spindle(most_sig_digs) := pocket_to_get;
    tool_man_active := true;
    IF auto_msd_bool(tool_mag_opt) AND NOT skip_barcode THEN
      barcdr_master := auto_run;
    END IF;

END fetch_tool;
---------------------------------------------------------------------
-- *****************************************************************
-- * THIS PROCEDURE CONTAINS ANY CALLS TO THE OEM'S MCL THAT ARE   *
-- * NECESSARY TO DO A TOOL CHANGE                                 *
-- *****************************************************************
PROCEDURE chg_tool(pocket_to_put : IN integer) IS

BEGIN

  act_turret_tool := pocket_to_put;
  mcode_val(m06) := true;
  wait_for_barcdr := false;
```

```
END chg_tool;
------------------------------------------------------------------
-- ***************************************************************
-- * THIS PROCEDURE CONTAINS ANY CALLS THAT ARE NECESSARY FOR THE *
-- * OEM'S MCL TO DO A TURR.. INDEX                               *
-- ***************************************************************
PROCEDURE index_turret(new_pos : IN integer) IS

BEGIN

  pre_sel_tool(least_sig_digs) := new_pos * 100;
  turret_man_act := true;
  active_face := new_pos;
  act_off(- 1, new_pos);

END index_turret;
------------------------------------------------------------------
-- ***************************************************************
-- * THIS PROCEDURE WILL UNLOAD ALL TOOLS FROM THE TURRET AND     *
-- * REPLACE THEM WITH DUMMY TOOLS.                               *
-- ***************************************************************
PROCEDURE unload_turret IS

BEGIN

  CASE unload IS
    WHEN unload_0 =>
      t_init := active_face;
      r_index := t_init;
      unload := unload_1;

    WHEN unload_1 =>
      IF NOT mcode_val(m06) THEN                    --TOOL CHANGER IS HOME
        t_type := tbl_val_int(cust, ttype, r_index);
        IF (t_type = 999) OR (t_type = 0) THEN
          r_index := r_index + 1;
          IF r_index = (turret_size + 1) THEN
            r_index := 1;
          END IF;
          IF r_index = t_init THEN
            response := tbl_clear(cust, mag);
            unload := unload_2;
          END IF;
        ELSE
          t_index := 0;
          t_type := 999;
          index_turret(r_index);                      --INDEX THE TURRET
          tcntrl_state := check_life;
          look_in_file := true;                       --GO TO TOOL CHANGE
        END IF;
      END IF;

    WHEN unload_2 =>
      b_dist := float_340 + b_offset - mach_psn_mcl(4);
      IF ax_psn_module(2) THEN
        automcode(a310) := false;
        tcntrl_ :te := old_mag;     --TERMINATE PROCEDURE, TURRET IS EMPTY
        config_i..tald := false;
        put_save_bool(config_instald, 1);
        unload := unload_0;
      END IF;
  END CASE;

END unload_turret;
------------------------------------------------------------------
-- ***************************************************************
-- * THIS PROCEDURE WILL DETERMINE THE VALUE TO USE FOR TOOL LIFE *
-- * WHETHER A PROBE IS IN USE, AND PUT THE SERIAL NO OF THE TOOL *
-- * IN A TABLE.                                                  *
-- ***************************************************************
PROCEDURE new_life_v lue IS
```

```
BEGIN

  IF automcode(a308) THEN
    life_to_dec := float_0;
  ELSE
    life_to_dec := - par_val(1);
  END IF;
  put_save_float(life_to_dec, 5);
  FOR index IN 0..1 LOOP
    par_val(index) := float_0;
  END LOOP;
  IF t_type > 899 AND t_type /= 999 THEN
    probe_active := true;
  ELSE
    probe_active := false;
  END IF;
  IF m112_was_run THEN
    response := tbl_chg_int(cust, serial, v_index,
                tbl_val_int(cust, turno, active_face));
  END IF;

END new_life_value;
--------------------------------------------------------------------
-- ***************************************************************
-- * THIS PROCEDURE WILL CHECK THE VALUE OF THE INCOMMING DATA    *
-- * OFFSET AND PUT UP A MESSAGE IF IT EXCEEDS THE ALLOWABLE VAL  *
-- ***************************************************************
PROCEDURE chk_offset (no_in : IN integer) IS

BEGIN

  IF t_val > max_off_no(no_in) THEN
    IF tcntrl_fault /= 6415 THEN
      store_msg(6415);
    END IF;
    tcntrl_fault := 6415;
  END IF;

END chk_offset;
--------------------------------------------------------------------
-- ***************************************************************
-- * THIS PROCEDURE WILL TRANSFER DATA FROM THE MAGAZINE TABLES    *
-- * TO TURRET TABLES AND VICA VERSA. ALL DATA TRANSFER TAKES      *
-- * PLACE HERE.                                                   *
-- ***************************************************************
PROCEDURE transfer_data IS

tool_no : integer;
tool_id : integer;

BEGIN

  act_off(- 1, 0);                                 --DEACTIVATE ACTIVE OFFSET
  tool_no := tbl_val_int(cust, mag, active_face);      --GET TOOL LOC IN MAG
  IF auto_msd_bool(tool_life_opt) THEN
    tb_fl(life, active_face, mlife, tool_no);  --MOVE LIFE FROM TUR TO MAG
  ELSIF NOT auto_msd_bool(tool_life_opt) THEN
    t_val := float_0;
    tb_fl(0, 0, mlife, tool_no);                          --ZERO MAG TOOL LIFE
  END IF;
                                           --SERIAL NUMBER TO TURRET TABLE
  response := tbl_chg_int(cust, turno, active_face, ser_no);
  IF t_type < 999 AND auto_msd_bool(tool_life_opt) THEN
    new_life_value;
  END IF;
                                                  --RESETS OLD CONFIG LOC
  tool_id := tbl_val_int(cust, stat, tool_no) /10;
  response := tbl_chg_int(cust, stat, tool_no, (tool_id * 10));
  tool_no := tool_in_spindle(most_sig_digs);  --GET TOOL# OF INCOMMING TOOL
  response := tbl_chg_int(cust, ttype, active_face,
                     tbl_val_int(cust, mtype, tool_no)); --TYPE TO TUR
```

```
  tb_fl(mxos, tool_no, 0, 0);                   --GET X HOLDER OFFSET(TOOL DATA)
  chk_offset(1);
  response := tbl_chg_float(tdv, 1, active_face, -t_val); --NEW OFFSET TO X
  tb_fl(mzos, tool_no, 0, 0);                   --GET Z HOLDER OFFSET(TOOL DATA)
  chk_offset(2);
  response := tbl_chg_float(tdv, 2, active_face, -t_val); --NEW OFFSET TO Z
  tb_fl(mlfe, tool_no, life, active_face);       --NEW TOOL LIFE TO TURRET
  response := tbl_chg_int(cust, mag, active_face, tool_no); --POS TO TURRET
                                                              --CONFIG LOC
  response := tbl_chg_int(cust, stat, tool_no,
                    (ito_id * 100) + (loc_id * 10) + active_face);
  act_off(- 1, active_face);      --REACTIVATE OFFSETS IF THEY WERE ACTIVE

END transfer_data;
-------------------------------------------------------------------
-- ****************************************************************
-- * THIS PROCEDURE WILL UPDATE THE MAGAZINE TABLES OF TOOLS LEFT *
-- * IN THE TURRET WHEN A NEW MAGAZINE IS INSTALLED. IT WILL ALSO *
-- * UPDATE THE TURRET TABLES AS TO THE POSITION THE DUMMY TOOLS  *
-- * BELONG IN THE NEW MAGAZINE.                                  *
-- ****************************************************************
PROCEDURE get_mag_pos IS          --UPDATE MAG POS OF TOOLS LEFT IN TURRET

found : boolean;

BEGIN

  t_index := 0;
  FOR index IN 1..turret_size LOOP
    t_type := tbl_val_int(cust, ttype, index);
    IF t_type /= 0 THEN
      found := false;
      WHILE NOT found LOOP
        IF t_index < magazine_size THEN
          t_s_i(mtype, t_type, t_index);
        ELSE
          t_index := 0;
      END IF;
      IF (t_index /= 0) AND (tbl_val_int(cust, stat, t_index) /= 0) THEN
        response := tbl_chg_int(cust, mag, index, t_index);
        response := tbl_chg_int(cust, stat, t_index, 10 + index);
        found := true;
      ELSIF t_index = 0 THEN
        found := true;
        i_to_c(t_type, 4, 1, inq_msg);
        file_msg_insert(1, 4, inq_msg);
        tcntrl_fault := 6404;
        store_msg(6404);
      END IF;
    END LOOP;
  END IF;
 END LOOP;

END get_mag_pos;
---------------------------------------------------------------
-- ****************************************************************
-- * THIS PROCEDURE WILL SEARCH THE MAGAZINE TABLES FOR A TOOL    *
-- * WITH ADEQUATE LIFE IN IT TO MEET THE NEED OF AN ITEM NO.     *
-- ****************************************************************
PROCEDURE look_for_tool IS

BEGIN

  FOR index IN v_index..v_tbl_size LOOP            --LOOK FOR THE FIRST TOOL
    v_type := tbl_val_int(cust, vtype, index);
    IF v_type /= 0 THEN
      t_index := 0;
      looking := true;
      WHILE looking LOOP
        IF t_index < magazine_size THEN
          t_s_i(mtype, v_type, t_index);
```

```
        ELSE
          t_index := 0;
        END IF;
        IF t_index > 0 THEN
          tb_fl(rmlfe, t_index, 0, 0);
          table_life := t_val;
          loc_id := (tbl_val_int(cust, stat, t_index)/10) REM 10;
          itc_id := tbl_val_int(cust, stat, t_index)/100;
          tb_fl(p178, index, 0, 0);
          IF t_val <= (table_life + float_001) AND
             (loc_id < 3) THEN
            tb_fl(p181, index, 0, 0);
            t_val := - t_val;
            t_a_f(rmlfe, t_index);
            IF rdout(blk_del_light) THEN
              IF ito_id < 1 AND v_type < 900 THEN
                turn_off_blkdlt(192);
                clear_tov;
              END IF;
            END IF;
            looking := false;
          END IF;
        ELSE
          stop_looking := true;
          looking := false;
        END IF;
      END LOOP;
      IF stop_looking THEN
        exit;
      END IF;
    END IF;
    IF index = v_tbl_size THEN
      tool_count := tool_count + 1;
    END IF;
  END LOOP;

END look_for_tool;
-------------------------------------------------------------------
-- ****************************************************************
-- * THIS PROCEDURE WILL CONDUCT A SEARCH OF THE MAGAZINE TABLES  *
-- * TO SEE IF THERE IS ENOUGH TOOLS TO DO A PART PLUS ONE MORE.  *
-- ****************************************************************
PROCEDURE tool_search IS

BEGIN

  FOR index IN 1..magazine_size LOOP     --COPY LIFE AVAIL INTO SCRATCH TBL
    tb_fl(mlfe, index, rmlfe, index);
  END LOOP;

  IF (tool_count = 0) AND NOT tool_mag_req THEN
    look_for_tool;
    IF stop_looking THEN
      t_type := v_type;
      IF ws_status = 1 THEN
        IF (plate_tra OR plate_que) AND NOT plate_mac THEN
          check_host := 1;
        END IF;
      END IF;
      out_of_tools := true;
      tcntrl_state := no_tools;
      automcode(al12) := false;
      stop_looking := false;
    ELSE
      m112_was_run := true;
      v_index := 1;
    END IF;
  END IF;

  IF (tool_count = 1) AND NOT tool_mag_req THEN
    look_for_tool;
```

```
    IF stop_looking THEN
      next_part := true;
      put_msg(6423,8,3);
      stop_looking := false;
    END IF;
    automcode(a112) := false;
    prelude_req_off(v_prel);
  END IF;

END tool_search;
---------------------------------------------------------------------
-- ******************************************************************
-- * THIS PROCEDURE WILL OBTAIN THE LIFE TO BE DEDUCTED FROM       *
-- * A TOOL IN A PARTICULAR CUT.                                   *
-- ******************************************************************
PROCEDURE tool_life_req IS

BEGIN

  IF auto_msd_bool(tool_life_opt) AND (t_type < 900) AND
     NOT automcode(a308) AND NOT automcode(a307) THEN
    FOR index IN 0..1 LOOP
      IF m112_was_run AND (mcl_state /= mcl_mdi) THEN
        tb_fl(p178 + index, v_index, 0, 0);
      ELSE
        p_val(178 + 3 * index);
        enum_resp := parameter_change(178 + 3 * index, float 0);
      END IF;
      par_val(index) := t_val;
      IF par_val(index) = float_0 THEN
        tcntrl_fault := 6401;
        EXIT;
      END IF;
    END LOOP;
    IF tcntrl_fault = 0 THEN
      IF par_val(0) > par_val(1) THEN
        reqd_life := par_val(0);
      ELSE
        reqd_life := par_val(1);
      END IF;
    END IF;
  ELSIF automcode(a307) THEN
    reqd_life := float_0;
  ELSE
    reqd_life := 0.1;
  END IF;

END tool_life_req;
---------------------------------------------------------------------
-- ******************************************************************
-- * THIS PROCEDURE WILL CHECK TO SEE IF A TOOL HAS ENOUGH LIFE    *
-- * TO SATISFY THE REQUIRED LIFE.                                 *
-- ******************************************************************
FUNCTION chk_life RETURN boolean IS

status : boolean;

BEGIN

  status := false;
  IF (table_life + float_001) >= reqd_life THEN
    status := true;
  END IF;
RETURN status;

END chk_life;
---------------------------------------------------------------------
-- ******************************************************************
-- * THIS PROCEDURE WILL SEARCH THE ACTIVE FACE, TURRET, AND       *
-- * MAGAZINE FOR A TOOL (IN THAT ORDER) TO SELECT AND USE. IT    *
-- * WILL THEN INITIATE A TURRET INDEX OR TOOL CHANGE.             *
-- ******************************************************************
```

```
PROCEDURE tool_life_check IS

BEGIN

  look_in_turret := false;
  IF not automcode(a308) THEN
    v_type := tbl_val_int(cust, vtype, v_index);
    IF m112_was_run AND (t_type /= v_type) AND (t_type < 900)
      AND (mcl_state /= mcl_mdi) THEN
      tcntrl_fault := 6405;
      look_in_file := false;
      check_face := false;
    ELSIF check_face THEN
      check_face := false;
      tb_fl(life, t_index, 0, 0);
      table_life := t_val;
      IF (chk_life OR t_type > 899 OR automcode(a307)) AND
          (t_type = tbl_val_int(cust, ttype, t_index)) THEN
        IF t_req /= active_face THEN
          index_turret(t_req);
        END IF;
          new_life_value;
          prelude_req_off(tool_prelude);
          prelude_req_off(v_prel);
          automcode(a06) := false;
          tcntrl_state := tcntrl_setup;
        ELSE
          look_in_turret := true;
          t_index := 0;
        END IF;
      END IF;
    END   ;

    WHILE look_in_turret LOOP
      IF t_index /= turret_size THEN
        t_s_i(ttype, t_type, t_index);
      ELSE
        t_index := 0;
      END IF;
      IF t_index > 0 THEN
        tb_fl(life, t_index, 0, 0);
        table_life := t_val;
        IF chk_life OR automcode(a307) OR t_type > 899 THEN
          index_turret(t_index);
          new_life_value;
          prelude_req_off(tool_prelude);
          prelude_req_off(v_prel);
          look_in_turret := false;
          automcode(a06) := false;
          tcntrl_state := tcntrl_setup;
        END IF;
      ELSIF auto_msd_bool(tool_mag_opt) AND NOT automcode(a307) THEN
        look_in_turret := false;
        look_in_file := true;
        t_index := 0;
      ELSE
        i_to_c(t_type, 4, 1, inq_msg);
        file_msg_insert(1, 4, inq_msg);
        tcntrl_fault := 6406;
        var_msg(6406);
        look_in_turret := false;
      END IF;
    END LOOP;

    WHILE look_in_file LOOP
      IF t_index < magazine_size THEN
        t_s_i(mtype, t_type, t_index);
      ELSE
        t_index := 0;
      END IF;
      IF t_index > 0 THEN
        tb_fl(mlfe, t_index, 0, 0);
```

```
        table_life := t_val;
        loc_no := tbl_val_int(cust, stat, t_index) REM 10;
        loc_id := (tbl_val_int(cust, stat, t_index)/10) REM 10;
        ito_id := tbl_val_int(cust, stat, t_index)/100;
        IF ((not automcode(a308) AND chk_life AND (ito_id = 1)) OR
           (automcode(a308) AND chk_life AND (ito_id = 0)) OR
            take_one OR
            t_type >= 900) AND
            loc_no = 0 AND loc_id < 3 THEN
          go_index := true;
          IF loc_id = 1 OR loc_id = 2 THEN
            skip_barcode := true;
            ser_no := tbl_val_int(cust, ser, t_index);
          END IF;
          fetch_tool(t_index);
        IF automcode(a06) OR automcode(a310) THEN
          tool_door_opreq := true;
          start_psn_cycle := true;
        ELSIF NOT save_auto_mode THEN
          prelude_req_off(v_prel);
        END IF;
        wait_a_while := true;
        wait_for_barcdr := true;
        look_in_file := false;
        IF automcode(a308) THEN
          enum_resp := parameter_change(79, int_to_float(t_index));
          prev_t_type := t_type;
          take_one := false;
        END IF;
      END IF;
    ELSIF automcode(a310) THEN
      look_in_file := false;
      tcntrl_fault := 6403;
      store_msg(6403);
    ELSE
      look_in_file := false;
      IF automcode(a06) THEN
        no_auto := true;
        out_of_tools := true;
        automcode(a06) := false;
        tcntrl_state := no_tools;
      ELSE
        put_msg(6409,8,3);
        tcntrl_state := tcntrl_setup;
      END IF;
      IF automcode(a308) THEN
        block_no := truncate(185);
        IF block_no /= 0 THEN
          no_auto := false;
          out_of_tools := false;
          tcntrl_state := skip_program;
        END IF;
      END IF;
      skip_barcode := true;
      fetch_tool(t_index);
    END IF;
  END LOOP;

END tool_life_check;
-----------------------------------------------------------------
-- ****************************************************************
-- * THIS PROCEDURE WILL VERIFY THAT THE TOOL SELECTED IS THE     *
-- * CORRECT TOOL (BY BAR CODE READ) AND INITIATE A SECOND SEARCH *
-- * IF THE TOOL IS NOT CORRECT.                                  *
-- ****************************************************************
PROCEDURE verify_tool IS

BEGIN

  IF (bar_code_read_ok AND (barcdr_master = auto_init)) THEN
    IF (automcode(a06) AND (t_req = active_face)) OR
```

```
      automcode(a310) THEN
      IF automcode(a308) THEN
        IF (temp_tool_no /= 0) THEN
          p_val(160);
  enum_resp := parameter_change(160, (t_val - int_to_float(temp_tool_no)));
        END IF;
      END IF;
      chg_tool(tbl_val_int(cust, mag, active_face));
      automcode(a06) := false;
    ELSIF not automcode(a06) THEN                                 --PRESELECT
      wait_a_while := false;
      old_t_type := t_type;
      tcntrl_state := tcntrl_setup;
    END IF;
    IF loc_id = 0 THEN
      loc_id := 1;
      response := tbl_chg_int(cust, ser, t_index, ser_no);
    END IF;
  ELSIF no_read THEN                                   -- NO BAR CODE READING
    put_msg(6408, 10, 6);
    store_msg(6408);
    tcntrl_state := no_bar_read;
    inhibit_retrace := true;
  ELSIF no_match THEN                                           -- WRONG TYPE
    response := tbl_chg_int(cust, stat, t_index, 80);
    look_in_file := true;
    wait_a_while := false;
    IF automcode(a308) THEN
      temp_tool_no := temp_tool_no + 1;
    END IF;
    no_match := false;
    bar_code_read_ok := true;
  END IF;

END verify_tool;
-----------------------------------------------------------------
-- ***************************************************************
-- * THIS PROCEDURE WILL DEDUCT THE LIFE CONSUMED FROM THE LIFE   *
-- * OF THE TOOL WHEN THE TOOL IS DONE.                           *
-- ***************************************************************
PROCEDURE updte_life IS

tool_no : integer;

BEGIN

  v_type := tbl_val_int(cust, ttype, active_face);       --GET TYPE OF TOOL
  IF v_type < 900 THEN
    IF NOT block_dec_cancel THEN
      life_to_dec := float_0;
    END IF;
    IF auto_msd_bool(tool_life_opt) THEN
      t_val := life_to_dec;                  --GET VALUE OF LIFE TO BE DECREM
    ELSE
      t_val := - float_1;
    END IF;
    t_a_f(life, active_face);              --DECREM LIFE FROM LIFE-TUR TABLES
    tool_no := tbl_val_int(cust, mag, active_face);   --GET TOOL LOC IN MAG
    tb_fl(life, active_face, mlfe, tool_no);    --MOVE LIFE FROM TUR TO MAG
    life_to_dec := float_0;
    tcntrl_state := tcntrl_setup;
  END IF;
  block_dec_cancel := false;
  put_save_bool(block_dec_cancel, 11);

END updte_life;
--------------------------------------------------------------------
-- ***************************************************************
-- * THIS PROCEDURE WILL REFERENCE THE MAGAZINE AXIS AUTOMATICALLY*
-- * WHEN A NEW MAGAZINE IS DELIVERED TO THE MACHINE.             *
-- ***************************************************************
```

```
FUNCTION ref_mag RETURN boolean IS

status : boolean;

BEGIN

  status := false;
  CASE ref_b_axis IS
    WHEN state_0 =>
      IF mcl_state = mcl_manual THEN
        IF ref_axis_init(4, false) = success THEN
          ref_b_axis := state_1;
        END IF;
      ELSE
        set_busy(manual_pb);
      END IF;

    WHEN state_1 =>
      IF axis_status(4) = action_complete THEN
        b_offset_done := false;
        b_offset_state := wait_till_refd;
        ref_b_axis := state_2;
      END IF;

    WHEN state_2 =>
      IF b_offset_state = wait_ref_pb THEN
        IF save_auto_mode THEN
          set_busy(auto_pb);
        END IF;
        config_instald := true;
        put_save_bool(config_instald, 1);
        host_req_mag := false;
        status := true;
        ref_b_axis := state_0;
      END IF;
  END CASE;

RETURN status;

END ref_mag;
------------------------------------------------------------------
-- *****************************************************************
-- * THIS PROCEDURE IS THE STANDBY STATE OF THE TOOL MANAGEMENT    *
-- * CONTROL. IT WILL DIRECT THE SYSTEM AS TO WHERE TO GO          *
-- * DEPENDING ON WHAT M CODE OR T CODE IS PROGRAMED.              *
-- *****************************************************************
PROCEDURE t_setup IS

temp_int : integer;

BEGIN

  IF automcode(a111) THEN                  --M111 MCODE MUST TURN ON PRELUDE
    tcntrl_state := save_mlife;
  ELSIF automcode(a312) THEN            -- M312 WRITE OFFSET TO HOLDER OFFSET
    automcode(a312) := false;
    IF ito_id = 0 THEN
      act_off(- 1, 0);                               --DEACTIVATE ACTIVE OFFS:

      t_index := tbl_val_int(cust, mag, active_face);
      p_val(31);
      t_a_f(mxos, t_index);
      response := tbl_add_float(tdv, 1, active_face, - t_val);
      tb_fl(mxos, t_index, 0, 0);
      chk_offset(1);
      p_val(32);
      t_a_f(mzos, t_index);
      response := tbl_add_float(tdv, 2, active_face, - t_val);
      tb_fl(mzos, t_index, 0, 0);
      chk_offset(2);
      act_off(- 1, active_face);      --REACTIVATE OFFSETS IF THEY WERE ACTI
```

```
  END IF;
  IF tcntrl_fault = 0 THEN
    temp_int := (tbl_val_int(cust, stat, t_index) rem 100) + 100;
    response := tbl_chg_int(cust, stat, t_index, temp_int);
    prelude_req_off(v_prel);
  END IF;
ELSIF automcode(a332) THEN              -- M332 WRITE ALL OFFSET TO TABLES
  act_off(- 1, 0);                              --DEACTIVATE ACTIVE OFFSET
  automcode(a332) := false;
  FOR i IN 1..magazine_size LOOP
    temp_int := tbl_val_int(cust, mtype, i);
    IF temp_int > 0 AND temp_int /= 999 THEN
      p_val(31);
      t_a_f(mxos, i);
      tb_fl(mxos, i, 0, 0);
      chk_offset(1);
      p_val(32);
      t_a_f(mzos, i);
      tb_fl(mzos, i, 0, 0);
      chk_offset(2);
      temp_int := (tbl_val_int(cust, stat, i) rem 100) + 100;
      response := tbl_chg_int(cust, stat, i, temp_int);
    END IF;
  END LOOP;
  FOR i IN 1..turret_size LOOP
    temp_int := tbl_val_int(cust, ttype, i);
    IF temp_int > 0 AND temp_int /= 999 THEN
      p_val(31);
      response := tbl_add_float(tdv, 1, i, - t_val);
      p_val(32);
      response := tbl_add_float(tdv, 2, i, - t_val);
    END IF;
  END LOOP;
  act_off(- 1, active_face);     --REACTIVATE OFFSETS IF THEY WERE ACTIVE
  IF tcntrl_fault = 0 THEN
    prelude_req_off(v_prel);
  END IF;
ELSIF automcode(a320) THEN           --M320  CLEAR TRANSF.MCL FOR NEW PART
  IF file_command = command_standby THEN
    file_command := clear_transfer;
  ELSIF file_command = get_data THEN
    automcode(a320) := false;
    prelude_req_off(v_prel);
    file_command := command_standby;
  END IF;
ELSIF next_part THEN                      --NOT ENOUGH TOOLS FOR NEXT PART
  IF host_available THEN
    IF NOT ok_to_send THEN
      ok_to_send := true;
      tcntrl_req := 19;                                      --NEXT PART
      next_part := false;
    END IF;
  ELSE
    next_part := false;
  END IF;
ELSIF tool_mag_req AND NOT automcode(a310) AND NOT request_pickup THEN
  IF host_req_mag THEN                                          --M310
    IF config_instald OR ldin(tdrum_seated1) THEN
      automcode(a310) := true;
      request_pickup := true;
    ELSE
      install_magazine := true;
      tool_mag_req := false;
    END IF;
    save_auto_mode := (mcl_state = mcl_auto) AND NOT no_auto;
    no_auto := false;
    set_busy(manual_pb);
  END IF;
ELSIF automcode(a310) THEN              --M310 REMOVE MAGAZINE FROM MACHINE
  IF config_instald THEN
    tcntrl_state := save_mlife;
```

```
    postlude_request(v_post);
  ELSIF file_instald THEN
    tcntrl_state := old_mag;
    automcode(a310) := false;
  ELSE
    automcode(a310) := false;
  END IF;
ELSIF send_for_file THEN                                --REQUEST CONFIG.MCL
  IF host_available THEN
    IF NOT ok_to_send THEN
      tcntrl_req := 14;                                 --CONFIG FILE REQ
      send_for_file := false;
      wait_for_file := true;
      p_msg(6827, 5);
      ok_to_send := true;
    END IF;
  ELSE
    put_msg(6827, 7, 3);
    send_for_file := false;
  END IF;
ELSIF config_file_rec THEN                    --CONFIG.MCL HAS BEEN RECEIVED
  k_msg(6827);
  config_file_rec := false;
  wait_for_file := false;
  tcntrl_state := new_mag;
ELSIF (new_mag_arrived AND NOT check_config AND NOT wait_for_file)
      OR automcode(a311) THEN        --M311   NEW MAG ARRIVED CHECK CONFIG
  automcode(a311) := false;
  tcntrl_state := new_mag;
ELSIF install_magazine AND NOT new_mag_arrived THEN
  IF NOT ldout(tdrum_unclamp) AND NOT tool_mag_deliver THEN
    IF ldin(tdrum_clamped) AND NOT ldin(tdrum_unclamped) THEN
      IF not b_offset_done THEN
        tcntrl_state := ref_magazine;    --REFERENCE B AXIS AT THIS POINT
      END IF;
      IF rdout(blk_del_light) THEN
        set_busy(block_delete);
      END IF;
      install_magazine := false;
      sent_for_mag := false;
      k_msg(6826);
      kill_msg(6874);
      msg_is_set := false;
      standby_req := 0;
      put_save_int(standby_req, 4);
    END IF;
  ELSE
    IF host_available THEN
      IF NOT ok_to_send THEN
        tcntrl_req := 4;                               --MAG DELIVERY REQ
        standby_req := 4;
        put_save_int(standby_req, 4);
        mag_del_permit := true;
        p_msg(6826, 5);
        IF not msg_is_set THEN
          put_msg(6874, 7, 4);
          msg_is_set := true;
        END IF;
        ok_to_send := true;
        tool_mag_deliver := false;
        install_magazine := false;
      END IF;
    ELSE
      put_msg(6826, 7, 3);
      install_magazine := false;
    END IF;
  END IF;
ELSIF automcode(a112) AND NOT sent_for_mag THEN          --M112 TOOL CHECK
  IF config_instald THEN
    next_part := false;
    tool_count := 0;
```

```
    v_index := truncate(98);
    IF v_index < 1 OR v_index > v_tbl_size THEN
      v_index := 1;
    END IF;
    tcntrl_state := check_tools;
  ELSIF not ldin(tdrum_seated1) THEN
    tool_mag_req := true;                                --CALL FOR MAGAZINE
    host_req_mag := true;
    sent_for_mag := true;                                        --FLAG ONLY
  ELSE
    tcntrl_fault := 6407;
    store_msg(6407);
  END IF;
ELSIF save_auto_mode AND NOT mcode_val(m06) AND
      (mcl_state = mcl_auto) THEN
  save_auto_mode := false;
  cyc_strt_on := true;
ELSIF standby_tool AND host_available THEN    --REDUNDANT REQUEST-STANDBY
  IF standby_req = 0 THEN
    standby_tool := false;
  ELSE
    IF NOT ok_to_send THEN
      tcntrl_req := standby_req;
      standby_tool := false;
      ok_to_send := true;
    END IF;
  END IF;
ELSIF request_pickup AND NOT config_instald AND NOT file_instald THEN
  IF host_available AND request_pickup THEN
    IF NOT ok_to_send THEN
      IF tool_mag_req THEN
        tcntrl_req := 20;                                     --EXCHANGE MAG
        standby_req := 20;
        put_save_int(standby_req, 4);
        mag_del_permit := true;
        p_msg(6826, 5);
        IF not msg_is_set THEN
          put_msg(6874, 7, 4);
          msg_is_set := true;
        END IF;
        tool_mag_req := false;
      ELSE
        standby_req := 3;
        put_save_int(standby_req, 4);
        tcntrl_req := 3;                                        --MAG PICKUP
      END IF;
      request_pickup := false;
      p_msg(6825, 5);
      ok_to_send := true;
    END IF;
  ELSE
    request_pickup := false;
  END IF;
ELSIF probe_active THEN
  IF ldin(wkxgr_cycle_act) THEN
  mch_motion_inh(8) := true;
ELSIF mch_motion_inh(8) THEN
  mch_motion_inh(8) := false;
END IF;
IF probe_active AND NOT nc_status(axis_gpl_in_psn) THEN
  IF probe_psn(1) /= save_x_psn OR probe_psn(2) /= save_z_psn THEN
    save_x_psn := probe_psn(1);
    save_z_psn := probe_psn(2);
    t_val := - 0.000001;
    t_a_f(life, active_face);
  END IF;
END IF;
END IF;
IF config_instald AND NOT ldin(tdrum_seated1) AND
   NOT ldin(tdrum_seated2) AND NOT ldin(tdrum_seated3) THEN
  config_instald := false;
  put_save_bool(config_instald, 1);
```

```
END IF;
IF not block_dec_cancel THEN
  IF oem_spin_dir /= s_stop THEN
    block_dec_cancel := true;
    put_save_bool(block_dec_cancel, 11);
  END IF;
END IF;
------------------------------------------------------------
               --TOOL CODE AND UPDATE LIFE
IF tool_code_read THEN
  IF config_instald AND ldin(tdrum_seated1) THEN
    prelude_request(v_prel);
    IF t_code_ok THEN                                   --NEW T CODE READ
      IF NOT automcode(a308) AND (t_req /= 0) AND (t_type /= 0) THEN
        updte_life;
      END IF;
      tool_code_read := false;
      IF not automcode(a308) THEN
        v_index := truncate(98);
      ELSE
        v_index := 0;
      END IF;
      IF t_type = 0 THEN
        IF t_req /= 0 THEN
          IF t_req /= active_face AND mcl_state = mcl_mdi THEN
            index_turret(t_req);
          END IF;
        ELSIF t_off /= 0 THEN
          act_off(- 1, active_face);
        END IF;
        IF gripper2_tool /= 0 THEN
          IF automcode(a308) THEN
            p_val(79);
            enum_resp := parameter_change(79, t_val - float_1);
          END IF;
          old_t_type := 0;
          skip_barcode := true;
          fetch_tool(t_type);
        END IF;
        prelude_req_off(v_prel);
      ELSIF t_type /= old_t_type THEN             --TOOL NOT PRE-SELECTED
        IF tool_ex_state = tool_stby THEN
          IF t_req /= 0 AND (t_type /= 999) AND NOT automcode(a308) THEN
            check_face := true;
            t_index := t_req;
          ELSE
            act_off(save_t_off, save_t_dat);
            t_index := 0;
            prelude_req_off(v_prel);
            look_in_file := true;
          END IF;
          tool_life_req;
          IF tcntrl_fault = 0 THEN
            tcntrl_state := check_life;
            IF automcode(a308) THEN
              temp_tool_no := 0;
              IF t_type = prev_t_type THEN                   --MAG TOOL
                t_index := truncate(79);
              ELSE
                tcntrl_state := count_tools;
              END IF;
            END IF;
          END IF;
        ELSE
          tcntrl_fault := 6219;
          store_msg(6219);
        END IF;
      ELSIF automcode(a06) THEN                        --TOOL PRESELECTED
        automcode(a06) := false;
        IF t_req /= active_face THEN
          index_turret(t_req);
        END IF;
```

```
          chg_tool(tbl_val_int(cust, mag, active_face));
          old_t_type := 0;
          wait_a_while := true;
          tcntrl_state := check_life;
        ELSE
          act_off(save_t_off, save_t_dat);
          prelude_req_off(v_prel);
        END IF;
        save_t_off := act_offset_num;
        save_t_dat := act_t_data_num;
      ELSE
        act_off(save_t_off, save_t_dat);
        tcntrl_fault := 6402;
      END IF;
    ELSE
      tcntrl_fault := 6407;
      store_msg(6407);
    END IF;
  ELSIF automcode(a06) THEN
    tcntrl_fault := 6402;
    automcode(a06) := false;
  END IF;

END t_setup;
-------------------------------------------------------------------
-- ***************************************************************
-- * THIS PROCEDURE IS THE MAIN PROCEDURE OF THE TOOL MANAGEMENT  *
-- * SYSTEM. IT WILL CALL OTHER PROCEDURES IN ORDER TO EXECUTE    *
-- * THE CORRECT FUNCTION.                                         *
-- ***************************************************************
PROCEDURE tcntrl_main IS

BEGIN

  CASE tcntrl_master IS
    WHEN auto_init =>
      tcntrl_master := auto_run;

    WHEN auto_run =>
      IF tcntrl_ok THEN
        ----------------------------------------------------
        IF ok_tc_send THEN
          IF command_request = 0 THEN
    command_request := tcntrl_req;
    dnc_bool(mc2000_cmd_req) := true;
    ok_to_send := false;
    tcntrl_req := 0;
  END IF;
END IF;
  ------------------------------------------------------
IF delete_putran or delete_config THEN
  IF file_command = command_standby THEN
    file_command := delete_a_file;
  END IF;
END IF;
  ------------------------------------------------------
CASE tcntrl_state IS
  WHEN tcntrl_setup =>                                     --STATE 0
    t_setup;

  WHEN save_mlife =>                                       --STATE 1
    IF m112_was_run THEN
      tool_count := 0;
      m112_was_run := false;
    END IF;
    IF automcode(a310) THEN
      tcntrl_state := empty_turret;
    ELSE
      FOR index IN vtype..serial LOOP
        response := tbl_clear(cust, index);
      END LOOP;
```

```
    automcode(a111) := false;
    prelude_req_off(v_prel);
    tcntrl_state := tcntrl_setup;
  END IF;

WHEN check_tools =>                                          --STATE 2
  tool_search;
  IF not out_of_tools THEN
    tcntrl_state := tcntrl_setup;
  END IF;

WHEN check_life =>                                           --STATE 3
  IF go_index AND NOT start_psn_cycle THEN
    IF t_req /= active_face AND t_req /= 0 AND
       NOT automcode(a310) THEN
      index_turret(t_req);
      go_index := false;
    END IF;
  END IF;
  IF NOT wait_a_while AND (tool_ex_state = tool_stby) THEN
    tool_life_check;
  ELSIF wait_for_barcdr THEN
    verify_tool;
  ELSIF tool_clamp_cntr = 4 THEN
    go_index := false;
    wait_a_while := false;
    transfer_data;
    IF automcode(a310) THEN
      r_index := r_index + 1;
      tcntrl_state := empty_turret;
    ELSE
      prelude_req_off(v_prel);
      tcntrl_state := tcntrl_setup;
    END IF;
  END IF;

WHEN empty_turret =>                                         --STATE 4
  unload_turret;
WHEN new_mag =>                                              --STATE 5
  IF NOT file_instald THEN
    IF file_command = command_standby THEN
      file_command := trans_to_table;
    ELSIF file_command = get_data THEN
      file_command := command_standby;
      file_instald := true;
      put_save_bool(file_instald, 20);
      get_mag_pos;
      IF (mcl_state = mcl_mdi) OR NOT mag_del_permit THEN
        install_magazine := true;
      END IF;
    ELSIF file_command = no_file THEN
      file_command := command_standby;
      send_for_file := true;
      tcntrl_state := tcntrl_setup;
    END IF;
  ELSE
    IF new_mag_arrived THEN
      check_config := true;
    ELSIF mcl_state = mcl_mdi THEN
      config_instald := true;
      put_save_bool(config_instald, 1);
      prelude_req_off(v_prel);
    END IF;
    kill_msg(6870);
    tcntrl_state := tcntrl_setup;
  END IF;

WHEN old_mag =>                                              --STATE 6
  IF file_instald THEN
    IF file_command = command_standby THEN
      file_command := trans_to_file;
```

```
      ELSIF file_command = no_file THEN
        file_command := command_standby;
        send_for_file := true;
        tcntrl_state := tcntrl_setup;
      END IF;
    ELSIF  file_command = command_standby THEN
      FOR index IN mtype..rmlfe LOOP
        response := tbl_clear(cust, index);
      END LOOP;
      put_save_bocl(file_instaid, 20);
      IF host_available THEN
        IF NOT ok_to_send THEN
          ok_to_send := true;
          tcntrl_req := 16;                          --UPLOAD CONFIG FILE
          postlude_req_off(v_post);
          mag_pu_permit := true;
          tcntrl_state := tcntrl_setup;
        END IF;
      ELSE
        prelude_req_off(v_prel);
        postlude_req_off(v_post);
        tcntrl_state := tcntrl_setup;
      END IF;
    END IF;

  WHEN ref_magazine =>                                     --STATE 7
    prelude_req_off(v_prel);
    prelude_req_off(tool_prelude);
    IF ref_mag THEN
      tcntrl_state := tcntrl_setup;
    END IF;

  WHEN count_tools =>                                      --STATE 8
    do_the_count := true;
    type_number := 0;
    WHILE do_the_count LOOP
      IF t_index < magazine_size THEN
        t_s_i(mtype, t_type, t_index);
      ELSE
        t_index := 0;
      END IF;
      IF t_index > 0 THEN
        ito_id := tbl_val_int(cust, stat, t_index)/100;
        tb_fl(mlfe, t_index, 0.0);
        table_life := t_val;
        IF ito_id = 0 AND (t_val + float_001) > 0.1 THEN
          type_number := type_number + 1;
        END IF;
      ELSE
        do_the_count := false;
      END IF;
    END LOOP;
    IF type_number = 0 THEN
      block_no := truncate(185);
      IF block_no /= 0 THEN
        tcntrl_state := skip_program;
      ELSE
        take_one := true;
        type_number := 1;
      END IF;
    END IF;
    IF type_number /= 0 THEN
      enum_resp := parameter_change(160, int_to_float(type_number));
      tcntrl_state := check_life;
    END IF;

  WHEN no_bar_read =>                                      --STATE 9
    IF rdin(retrace) OR rdin(cycle_start) THEN
      IF rdin(retrace) THEN
        loc_id := 9;
        look_in_file := true;
        wait_a_while := false;
```

```
      IF automcode(a308) THEN
        temp_tool_no := temp_tool_no + 1;
      END IF;
    ELSIF rdin(cycle_start) THEN
      loc_id := 2;
      ser_no := tbl_val_int(cust, ser, t_index);
    END IF;
    no_read := false;
    bar_code_read_ok := true;
    response := tbl_chg_int(cust, stat, t_index,
                       (ito_id * 100) + (loc_id * 10));
    kill_msg(6408);
    cnt_dwn;
    inhibit_retrace := false;
    tcntrl_state := check_life;
  END IF;

WHEN no_tools =>                                          --STATE 10
  IF check_host = 1 THEN
    IF data_request = 0 THEN
      dnc_bool(mc2000_data_req) := true;
      data_request := 3;
      start_timer(host_ak_tmr, 1500);              --15 SECS TO ACK
      check_host := 2;
    END IF;
  ELSIF check_host = 2 THEN
    IF refurbish_mag THEN
      refurbish_mag := false;
      k_msg(6850);
      check_host := 0;
    ELSIF host_req_mag THEN
      tool_mag_req := true;
      tcntrl_state := tcntrl_setup;
      k_msg(6850);
      check_host := 0;
    ELSIF not timer_runnin  :ost_ak_tmr) THEN
      p_msg(6850, 5);
    END IF;
  ELSE
    i_to_c(t_type, 4, 1, inq_msg);
    file_msg_insert(1, 4, inq_msg);
    put_msg(6865, 10, 6);
    store_msg(6865);
    tcntrl_master := auto_recovery;
  END IF;

WHEN skip_program =>                                      --STATE 11
  IF step = 1 THEN
    automcode(a06) := false;
    mch_cycle_stop := true;
    prelude_req_off(v_prel);
    prelude_req_off(tool_prelude);
    i_to_c(block_no, 4, 2, n_code);
    FOR i IN 2..5 LOOP
      IF n_code(i) = ' ' THEN
        n_code(i) := '0';
      END IF;
    END LOOP;
    step := 2;
  ELSIF step = 2 THEN
    IF not nc_status(cyc_start_lt_on) THEN
      IF prog_search_skip(5, n_code) = success THEN
        step := 3;
      END IF;
    END IF;
  ELSIF step = 3 THEN
    IF nc_status(search_complete) AND
       (tool_ex_state = tool_stby) THEN
      enum_resp := parameter_change(185, float_0);
      step := 1;
      IF nc_status(search_success) THEN
        step := 4;
```

```
              cyc_strt_on := true;
            ELSE
              tcntrl_fault := 6416;
              store_msg(6416);
            END IF;
          END IF;
        ELSIF step = 4 THEN
          IF nc_status(cyc_start_lt_on) THEN
            step := 1;
            rdin(cycle_start) := false;
            tcntrl_state := tcntrl_setup;
          END IF;
        END IF;
    END CASE;
  ELSE                                                    -- NOT TCNTRL_OK
    put_msg(tcntrl_fault, 9, 6);
    tcntrl_master := auto_error;
  END IF;

WHEN auto_error =>

    tcntrl_master := auto_recovery;

  WHEN auto_recovery =>
    NULL;                                        --WAIT UNTIL CLEAR OR CANCEL
END CASE;

END tcntrl_main;
-----------------------------------------------------------------------
END tcntrl;
-- ***************************************************************
-- *                                                             *
-- * SOFTWARE FOR                                                *
-- * AIRCRAFT ENGINE BUSINESS GROUP / GENERAL ELECTRIC COMPANY   *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- ***************************************************************

-- ***************************************************************
-- * PACKAGE DESCRIPTION:  XFER.PCL                              *
-- *                                                             *
-- *    THIS PACKAGE CONTAINS TWO MAIN PRODEDURES AND ONE        *
-- * FUNCTION :                                                  *
-- *                                                             *
-- * XFER_MAIN ;                                                 *
-- *      THIS PROCEDURE MONITORS THE CONDITIONS OF THE TRANSFER *
-- * AND QUEUE STATIONS AT THE WORK STATION.  XFER_MAIN WILL     *
-- * STAGE PARTS AUTOMATICALLY AFTER ANY LOAD OR UNLOAD FUNCTION*
-- * ( EX.  PART LOADED IN CHUCK THROUGH PROGRAM CALL XFER WILL  *
-- * AUTOMATICALLY CYCLE PART IN TRANSFER STATION TO QUEUE STA.)*
-- *      THIS PROCEDURE ALSO MONITORS ALL PICK UP AND DELIVERIES*
-- * OCCURING DURING CYCLE, AND SETS FLAGS TO START THOSE        *
-- * FUNCTIONS.                                                  *
-- *                                                             *
-- * PTMGMT_MAIN ;                                               *
-- *    THIS PROCEDURE IS A WATCH DOG FOR ALL EXTERNAL COMMANDS  *
-- * FOR PART MOVMENT.  THIS PROCEDURE SETS THE PROPER FLAGS     *
-- * AND STATES FOR THE PART MOVMENT CALLED FOR.                 *
-- *                                                             *
-- * CALL_AGV ;                                                  *
-- *    THIS FUNCTION IS USED ONLY WHEN THE HOST IS AVAILABLE    *
-- * IT CALLS THE HOST TO DO A PICK UP OR DELIVERY.  WHEN A      *
```

```
-- * PICK UP IS CALLED IT WILL REQUEST A PLATE FILE UPLOAD TO   *
-- * THE HOST.                                                   *
-- ***************************************************************

WITH wndone;   USE wndone;
WITH mcldat;   USE mcldat;
WITH mcllib;   USE mcllib;
WITH oemdec;   USE oemdec;
WITH wndtwo;   USE wndtwo;
WITH wndtre;   USE wndtre;
WITH atmlib;   USE atmlib;
WITH rel5;     USE rel5;
WITH rel6;     USE rel6;
WITH rel7;     USE rel7;
WITH bubdec;   USE bubdec;
WITH dncmcl;   USE dncmcl;
WITH dncdec;   USE dncdec;
WITH blkdlt;   USE blkdlt;
WITH lur;      USE lur;
WITH ptchk;    USE ptchk;
WITH oemmst;   USE oemmst;
WITH agvmon;   USE agvmon;
WITH dtmgmt;   USE dtmgmt;
WITH menu;     USE menu;

PACKAGE BODY xfer IS

pickup_needed     : boolean := false;
hld_del           : integer := 0;
wait_for_agv      : integer := 0;
-----------------------------------------------------------------------
FUNCTION xfer_ok RETURN boolean IS

xfer_status : boolean;

BEGIN

  xfer_status := true;
  IF xfer_fault /= 0 THEN
    xfer_status := false;
  END IF;

RETURN xfer_status;

END xfer_ok;
-----------------------------------------------------------------------
PROCEDURE xfer_clear IS

BEGIN

  xfer_fault := 0;

END xfer_clear;
-----------------------------------------------------------------------
PROCEDURE xfer_cancel IS

BEGIN

  xfer_master := auto_init;
  del_answer := false;
  hld_del := 0;
  prelude_req_off(ptmgmt_lude);
  ptmgmt_state := mgmt_standby;

END xfer_cancel;
-----------------------------------------------------------------------
PROCEDURE xfer_main IS

BEGIN

  CASE xfer_master IS
    WHEN auto_init =>
      xfer_master := auto_run;
```

```
WHEN auto_run =>
  IF xfer_ok THEN  --WARNS HOST THAT PKUP OR DEL IS AVAIL WHEN HOST COME

    IF standby_part AND
       ((prog_chk_cmplt AND host_available) OR NOT host_available) THEN
      IF pkup_exp THEN
        IF call_agv(1) THEN                              --CALL FOR PICKUP
          standby_part := false;
        END IF;
      ELSIF deliv_exp THEN
        IF call_agv(2) THEN                            --CALL FOR DELIVERY
          standby_part := false;
        END IF;
      ELSE
        standby_part := false;
  END IF;
END IF;
---------------------------------------------------------------------------
CASE xfer_state IS
  WHEN xfer_standby =>                                         --STATE 0
    IF pkup_exp OR deliv_exp THEN
      xfer_state := xfer_start;
    END IF;

  WHEN xfer_start =>                                           --STATE 1
    IF cell_is_up AND prog_was_running AND unl_cmd AND NOT
        no_go_off_line THEN
      no_go_off_line := true;
      set_busy(mcs_cancel);

    ELSIF ld_unld_home THEN
      IF automcode(ld_flag) THEN                            --LOAD CHUCK
        IF plate_permit AND NOT automcode(m512_ok_to_go) AND
            (host_available OR NOT rdout(offset_light_1)) THEN
          ld_state := ld_chuck;
        END IF;
                                                        --PLATE ARRIVES
      ELSIF plate_tra AND NOT pkup_exp THEN
        IF find_trans THEN
          IF tran_num = 0 THEN
            xfer_fault := 6843;                     --NO TRANSF.MCL FILE
            file_command := command_standby;
          ELSE
            pickup_needed := tran_num = 4;
            xfer_state := part_arrived;
          END IF;
        END IF;

      ELSIF NOT plate_tra AND pkup_exp THEN        --PLATE DISAPPEARS
        IF NOT host_available THEN
          IF store_file THEN
            xfer_state := part_is_gone;
          END IF;
        ELSE
          xfer_state := part_is_gone;
        END IF;

      ELSIF deliv_exp THEN                          --DELIVERY EXPECTED
        IF unld_cmd AND NOT del_wait THEN            --UNLOAD COMMANDED
          xfer_state := ask_to_unload;
        END IF;
                                                --NO PLATE ON TRANS STA
      ELSIF NOT plate_tra THEN
        del_wait := false;
        xfer_state := part_is_gone;
      END IF;
    END IF;

  WHEN part_arrived =>                                         --STATE 2
    k_msg(6816);
    k_msg(6828);
```

```
      deliv_exp := false;
      put_save_bool(deliv_exp, 21);
      IF pickup_needed THEN
        IF call_agv(1) THEN                                  --CALL FOR PICKUP
          pickup_needed := false;
          xfer_state := xfer_start;
        END IF;
      ELSE
        IF nc_status(cyc_start_lt_on) AND NOT plate_que THEN
          IF NOT automcode(m512_ok_to_go) AND plate_permit AND

         (host_available OR NOT rdout(offset_light_1)) THEN
        ld_state := ld_tq;
        flash_al := false;
        xfer_state := xfer_start;
      END IF;
    ELSE
      xfer_state := xfer_standby;
    END IF;
  END IF;

WHEN ask_to_unload =>                                        --STATE 3

  IF host_available THEN
    IF waiting_cell THEN
      kill_msg(6866);
      cnt_dwn;
      waiting_cell := false;
    END IF;
    CASE hld_del IS
      WHEN 0 =>
        IF prog_chk_cmplt THEN
          IF data_request = 0 THEN
            del_sched_time := 0;
            dnc_bool(mc2000_data_req) := true;
            data_request := 2;
            hld_del := 1;
            start_timer(host_ak_tmr, 1500);       --15 SECS TO ACK
          END IF;
        END IF;

      WHEN 1 =>
        IF del_answer THEN
          IF sched_ret /= 0 THEN
            p_msg(6828, 6);
            hld_del := 0;
            del_wait := true;
            xfer_state := xfer_start;
          ELSE
            hld_del := 2;
          END IF;
          del_answer := false;
          k_msg(6850);
        ELSIF NOT timer_running(host_ak_tmr) THEN
          p_msg(6850, 5);
        END IF;

      WHEN 2 =>
        IF command_request = 0 THEN
          command_request := 18;                  --HOLD UP DELIVERY
          hld_del := 0;
          dnc_bool(mc2000_cmd_req) := true;
          xfer_state := part_is_gone;
        END IF;

      WHEN OTHERS =>
        NULL;
    END CASE;
  ELSIF ws_status = ready_manual AND NOT waiting_cell THEN
    put_msg(6866, 8, 6);
    store_msg(6866);
    waiting_cell := true;
```

```
    ELSIF ws_status /= ready_manual THEN
      xfer_state := part_is_gone;
    END IF;

  WHEN part_is_gone =>                                     --STATE 4
          k_msg(6817);
          pkup_exp := false;
          put_save_bool(pkup_exp, 22);
          k_msg(6816);
          deliv_exp := false;
          put_save_bool(deliv_exp, 21);
          IF unld_cmd THEN
            unld_state := unld_start;
            xfer_state := xfer_start;
          ELSIF plate_que AND plate_mac THEN
            xfer_state := xfer_standby;
          ELSIF call_agv(2) THEN                         --CALL FOR DELIVERY
            xfer_state := xfer_start;
          END IF;
      END CASE;
    ELSE
      p_msg(xfer_fault, 6);
      xfer_master := auto_error;
    END IF;

  WHEN others =>
    IF rrise(cycle_start) THEN
      k_msg(6843);
      xfer_fault := 0;
      xfer_state := xfer_start;
      xfer_master := auto_run;
    END IF;
END CASE;
-----------------------------------------------------------------
CASE wait_for_agv IS
  WHEN 0 =>
    IF (ws_status = off_line) AND NOT del_wait THEN
      IF deliv_exp OR rdout(offset_light_1) THEN
        wait_for_agv := 1;
      END IF;
    END IF;

  WHEN 1 =>
    IF NOT host_available THEN
      IF plate_tra OR (unld_cmd AND plate_mac) THEN
        rdout(offset_light_1) := true;
        p_msg(6844, 6);
        wait_for_agv := 2;
      END IF;
    ELSE
      wait_for_agv := 0;
    END IF;

  WHEN 2 =>
    IF rdin(offset_button_1) THEN
      flash_al := false;
      rdout(offset_light_1) := false;
      k_msg(6844);
      IF cim_fault(8) THEN
        cnt_dwn;
        cim_fault(8) := false;
      END IF;
      cim_fault(11) := false;
      wait_for_agv := 3;
    ELSE
      rdout(offset_light_1) := true;
    END IF;

  WHEN 3 =>
    IF NOT deliv_exp THEN
      wait_for_agv := 0;
```

```
      END IF;

    WHEN OTHERS =>
      NULL;
  END CASE;

END xfer_main;
------------------------------------------------------------------------
PROCEDURE ptmgmt_main IS

BEGIN

  CASE ptmgmt_state IS
    WHEN mgmt_standby =>                                            --STATE 0
      NULL;

    WHEN mgmt_unld =>                                               --STATE 1
      IF plate_mac THEN
        unld_cmd := true;                          --PREPARES FOR PART UNLOAD
        IF xfer_state = xfer_standby THEN
          xfer_state := xfer_start;
        END IF;
      END IF;
      ptmgmt_state .  mgmt_cmplt;

    WHEN mgmt_ld =>                                                 --STATE 2
      IF NOT plate_mac THEN
        automcode(ld_flag) := true;
        IF xfer_state = xfer_standby THEN
          xfer_state := xfer_start;
        END IF;
      END IF;
      ptmgmt_state := mgmt_cmplt;

    WHEN mgmt_cmplt =>                                              --STATE 3
      IF NOT unld_cmd AND NOT automcode(ld_flag) AND
          ld_unld_home THEN
        prelude_req_off(ptmgmt_lude);
        ptmgmt_state := mgmt_standby;
      END IF;
  END CASE;

END ptmgmt_main;
------------------------------------------------------------------------
FUNCTION call_agv(oper_exp : IN integer) RETURN boolean IS

status : boolean;

BEGIN

  status := false;
  IF host_available AND NOT init_fault THEN
    IF NOT standby_part AND (pkup_exp OR deliv_exp) THEN
      status := true;
    ELSIF command_request = 0 THEN
      pickup_time := 0;
      del_time := 0;
      command_request := oper_exp;
      dnc_bool(mc2000_cmd_req) := true;
      IF oper_exp = 1 THEN
        p_msg(6817, 5);
        pkup_exp := true;
        put_save_bool(pkup_exp, 22);
      ELSIF oper_exp = 2 THEN
        p_msg(6816, 5);
        deliv_exp := true;

          put_save_bool(deliv_exp, 21);
        END IF;
        status := true;
      END IF;
    ELSE
      IF NOT init_fault THEN
```

```
      IF oper_exp = 1 THEN
        p_msg(6817, 5);
        pkup_exp := true;
        put_save_bool(pkup_exp, 22);
        IF plate_que OR plate_mac THEN
          flash_al := true;
        END IF;
      ELSE
        p_msg(6816, 5);
        deliv_exp := true;
        put_save_bool(deliv_exp, 21);
      END IF;
    END IF;
    status := true;
  END IF;

RETURN stat· ·;

END call_agv;
-----------------------------------------------------------------------
END xfer;
```

Appendix E

```
-- ***************************************************************
-- *                                                             *
-- * SOFTWARE BY BRIAN IRVING (A&ES) FOR                         *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

WITH wndone;   USE wndone;
WITH oemdec;   USE oemdec;

PACKAGE agvmon IS

agvmon_master    : auto_masters := autc_init;
agv_fault        : integer := 0;
agv_status       : integer := 0;
agv_time         : integer;
cancel_agv       : integer := 0;
fork_agv_counter : integer := 0;
mdi_selection    : integer := 0;
pl_agv_counter   : integer := 0;
agv_stdby        : CONSTANT integer := 0;
plate_pu         : CONSTANT integer := 1;
plate_deliv      : CONSTANT integer := 2;
mag_pu           : CONSTANT integer := 3;
mag_deliv        : CONSTANT integer := 4;
chp_pu           : CONSTANT integer := 5;
chp_deliv        : CONSTANT integer := 6;
plt_cmplt        : CONSTANT integer := 7;
mag_cmplt        : CONSTANT integer := 8;
chp_cmplt        : CONSTANT integer := 9;
cmd_host         : CONSTANT integer := 10;
check_config     : boolean := false;
chip_permit_msg  : boolean := false;
delay_plate_tra  : boolean := false;
```

```
init_fault         : boolean := false;
mag_del_permit     : boolean := false;
mag_pu_permit      : boolean := false;
menu_start         : boolean := false;
plate_permit       : boolean := false;
tool_permit_msg    : boolean := false;

PROCEDURE agvmon_init;
PROCEDURE agvmon_main;

END agvmon;

-- ***************************************************************
-- *                                                             *
-- * SOFTWARE BY BRYAN IRVING AND PAUL COLANANNI(A&ES) FOR       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

-- ***************************************************************
-- *                        AUTOMATION MCL                       *
-- *                                                             *
-- *                       A G V MONITOR                         *
-- *                                                             *
-- *                                                             *
-- *   THIS PACKAGE WILL BE USED TO CONTROL THE COMMUNICATIONS   *
-- * WITH THE HOST FOR CONTROL OF THE AGV.  IT IS NOT USED TO    *
-- * INITIATE A CALL FOR AGV SERVICE , THAT WILL BE DONE BY      *
-- * EACH AUTO MCL PACKAGE AS NECESSARY. THIS PACKAGE IS USED TO*
-- * ALLOW CONTROL OF THE AGV FROM THE READY STATION TO THE      *
-- * READY COMPLETE STATION. THE AGVMON PACKAGE STATE WILL BE    *
-- * SET BY THE DNCMCL PACKAGE.  IT WILL THEN SEND A COMMAND TO *
-- * THE HOST AND WAIT FOR ACKNOWLEDGE. WHEN RECEIVED IT WILL    *
-- * GO TO STANDBY STATE AND WAIT FOR THE NEXT STATE TO BE SET   *
-- * BY THE HOST/DNC PKG.                                        *
-- *    ONCE ANY AGV ARRIVES AT THE READY STATION, A TIMER IS    *
-- * STARTED AND THE HOST/AGV MUST COMPLETE THE SERVICE BEFORE   *
-- * THE TIMER TIMES OUT OR A FAULT IS GENERATED AND PROGRAM     *
-- * SEXECUTION IS HALTED AND A MESSAGE DISPLAYED.               *
-- ***************************************************************


WITH wndone;   USE wndone;
WITH mcldat;   USE mcldat;
WITH mcllib;   USE mcllib;
WITH wndtwo;   USE wndtwo;
WITH rel5;     USE rel5;
WITH rel6;     USE rel6;
WITH rel7;     USE rel7;
WITH oemdec;   USE oemdec;
WITH bubdec;   USE bubdec;
WITH dncdec;   USE dncdec;
WITH clock;    USE clock;
WITH dncmcl;   USE dncmcl;
WITH menu;     USE menu;
WITH tcntrl;   USE tcntrl;
WITH atmlib;   USE atmlib;
WITH xfer;     USE xfer;
WITH oemmst;   USE oemmst;
```

```
WITH ptldr;     USE ptldr;
WITH chpmgt;    USE chpmgt;
WITH convor;    USE convor;
WITH qcont;     USE qcont;

PACKAGE BODY agvmon IS

TYPE fork_times IS (fork_standby, fork_check_time);
fork_timer         : fork_times := fork_standby;
TYPE plate_times IS (plt_standby, plt_check_time);
plate_timer        : plate_times := plt_standby;
cmd_req            : integer;
ans_ready          : boolean := false;
permit_msg         : boolean := false;
tool_agv           : boolean := false;
chip_agv           : boolean := false;
ans_lgt            : integer := 0;
fork_time          : integer := 0;
del_rdy            : integer := 0;
plate_time         : integer := 0;
recover            : integer := 0;
-----------------------------------------------------------------------
FUNCTION agvmon_ok RETURN boolean IS

agvmon_status : boolean;

BEGIN

  agvmon_status := true;
  IF agv_fault /= 0 AND menu_start THEN
    agvmon_status := false;
    kill_msg(6876);
    IF init_fault THEN
      cnt_dwn;
    END IF;
  END IF;

RETURN agvmon_status;

END agvmon_ok;
-----------------------------------------------------------------------
PROCEDURE agvmon_init IS

BEGIN

  agv_time := msd_int_table(163);
  IF pl_agv_counter > 0 THEN
    agv_fault := 6463;
    init_fault := true;
  END IF;
  IF fork_agv_counter > 0 AND NOT init_fault THEN
    agv_fault := 6473;
    init_fault := true;
    IF fork_agv_counter > 5 THEN
      agv_inprgs := true;
    END IF;
  END IF;
  IF init_fault THEN
    put_msg(6876, 9, 6);
    store_msg(6876);
  END IF;

END agvmon_init;
-----------------------------------------------------------------------
PROCEDURE agvmon_main IS

BEGIN

  CASE agvmon_master IS
    WHEN auto_init =>
      agvmon_master := auto_run;
```

```
WHEN auto_run =>
  IF NOT plate_permit AND NOT permit_msg THEN
    put_msg(6890, 6, 6);
    permit_msg := true;
  ELSIF plate_permit AND permit_msg THEN
    kill_msg(6890);
    permit_msg := false;
  END IF;
  IF tool_permit_msg AND NOT tool_agv THEN
    put_msg(6188, 6, 6);
    tool_agv := true;
  ELSIF NOT tool_permit_msg AND tool_agv THEN
    kill_msg(6188);
    tool_agv := false;
  END IF;
  IF chip_permit_msg AND NOT chip_agv THEN
    put_msg(6187, 6, 6);
    chip_agv := true;
  ELSIF NOT chip_permit_msg AND chip_agv THEN
    kill_msg(6187);
    chip_agv := false;
  END IF;
  IF agvmon_ok THEN
  ----------------------------------------------------------------
    CASE fork_timer IS
      WHEN fork_standby =>
        NULL;

      WHEN fork_check_time =>
        IF NOT timer_running(mag_agv_tmr) THEN
          IF fork_time = agv_time THEN
            agv_fault := 6473;
            fork_timer := fork_standby;
          ELSE
            fork_time := fork_time + 1;
            start_timer(mag_agv_tmr, 6000);
          END IF;
        END IF;
    END CASE;
  ----------------------------------------------------------------
    CASE plate_timer IS
      WHEN plt_standby =>
        NULL;

      WHEN plt_check_time =>
        IF NOT timer_running(plate_agv_tmr) THEN
          IF plate_time = agv_time THEN
            agv_fault := 6463;
            plate_timer := plt_standby;
          ELSE
            plate_time := plate_time + 1;
            start_timer(plate_agv_tmr, 6000);
          END IF;
        END IF;
    END CASE;
  ----------------------------------------------------------------
    CASE agv_status IS                                       --STATE 0
      WHEN agv_stdby =>
        IF init_fault AND agv_fault = 0 THEN
          IF fork_agv_counter > 0 THEN
            agv_fault := 6473;
          ELSE
            init_fault := false;
          END IF;
        ELSIF init_fault AND (rrise(plate_agv_pb) OR rrise
              (sso_decr)) THEN
          agv_fault := 0;
          init_fault := false;
          kill_msg(6876);
          cnt_dwn;
          fork_agv_counter := 0;
          pl_agv_counter := 0;
```

```
    put_save_int(0, 5);
    put_save_int(0, 6);
  END IF;

WHEN plate_pu =>                                              --STATE 1
  pl_agv_counter := 1;
  put_save_int(pl_agv_counter, 5);
  IF pkup_exp OR init_fault THEN
    IF plate_tra THEN
      IF gantry_at_park AND ram_at_park THEN   --EXCHANGER PARKED
        start_timer(plate_agv_tmr, 6000);
        plate_time := 0;
        plate_timer := plt_check_time;
        agv_status := cmd_host;
        cmd_req := 7;
        plate_permit := false;
      END IF;
    ELSE
      agv_fault := 6461;       --PLATE CONDITIONS INHIB AGV SERVC
    END IF;
  ELSE
    agv_fault := 6464;                   --UNEXPECTED AGV SERVICE
  END IF;

WHEN plate_deliv =>                                           --STATE 2
  pl_agv_counter := 2;
  put_save_int(pl_agv_counter, 5);
  CASE del_rdy IS
    WHEN 0 =>
      IF deliv_exp OR init_fault THEN
        IF NOT plate_tra AND ldin(mag_present) THEN
          IF gantry_at_park AND ram_at_park AND plate_ok THEN
            del_rdy := 1;
            plate_permit := false;
            delay_plate_tra := true;
          END IF;
        ELSE
          agv_fault := 6461;   --PLATE CONDITIONS INHIB AGV SERVC
        END IF;
      ELSE
        agv_fault := 6464;               --UNEXPECTED AGV SERVICE
      END IF;

    WHEN 1 =>
      IF NOT plate_file_rec THEN
        IF command_request = 0 THEN
          command_request := 15;
          dnc_bool(mc2000_cmd_req) := true;
          del_rdy := 2;
        END IF;
      ELSE
        del_rdy := 2;
      END IF;

    WHEN 2 =>
      IF plate_file_rec THEN
        start_timer(plate_agv_tmr, 6000);
        plate_time := 0;
        plate_timer := plt_check_time;
        agv_status := cmd_host;          --CONDITIONS FOR DELIVERY
        del_rdy := 0;
        cmd_req := 7;
        plate_file_rec := false;
      END IF;

    WHEN OTHERS =>
      NULL;
  END CASE;

WHEN mag_pu =>                                                --STATE 3
  fork_agv_counter := 3;
  put_save_int(fork_agv_counter, 6);
```

```
  IF mag_pu_permit OR init_fault THEN
    IF ldin(mag_seatd_1) AND ldin(mag_seatd_2) AND
       ldin(mag_present) THEN
      start_timer(mag_agv_tmr, 6000);
      fork_time := 0;
      fork_timer := fork_check_time;
      agv_status := cmd_host;
      cmd_req := 8;
      tool_permit_msg := true;
    ELSIF NOT timer_running(mag_agv_tmr) THEN
      agv_fault := 6471;       --TOOL DRUM CONDTNS INHIB AGV SERVC
    END IF;
  ELSE
    agv_fault := 6474;                    --UNEXPECTED AGV SERVICE
  END IF;

WHEN mag_deliv =>                                      --STATE 4
  fork_agv_counter := 4;
  put_save_int(fork_agv_counter, 6);
  new_mag_arrived := true;
  IF mag_del_permit OR init_fault THEN
    IF check_config THEN
      IF NOT ldin(mag_seatd_1) AND NOT ldin(mag_seatd_2) AND NOT
         ldin(mag_present) THEN
        start_timer(mag_agv_tmr, 6000);
        fork_time := 0;
        mag_del_permit := false;
        fork_timer := fork_check_time;
        agv_status := cmd_host;
        cmd_req := 8;
        tool_permit_msg := true;
      ELSIF NOT timer_running(mag_agv_tmr) THEN
        agv_fault := 6471;    --TOOL DRUM CONDTNS INHIB AGV SERVC
      END IF;
    END IF;
  ELSE
    agv_fault := 6474;                    --UNEXPECTED AGV SERVICE
  END IF;

WHEN chp_pu =>                                         --STATE 5
  fork_agv_counter := 5;
  put_save_int(fork_agv_counter, 6);
  IF agv_inprgs OR init_fault THEN
    IF ldin(chip_cntr_avail) THEN
      IF NOT ldout(chip_cnvyr) AND purge_conveyor = 0 THEN
        start_timer(mag_agv_tmr, 6000);
        fork_timer := fork_check_time;
        fork_time := 0;
        agv_status := cmd_host;
        cmd_req := 9;
        chip_permit_msg := true;
      END IF;
    ELSE
      agv_fault := 6469;      --CHIP CNTR CONDTNS INHIB AGV SERVC
    END IF;
  ELSE
    agv_fault := 6474;                    --UNEXPECTED AGV SERVICE
  END IF;

WHEN chp_deliv =>                                      --STATE 6
  fork_agv_counter := 6;
  put_save_int(fork_agv_counter, 6);
  IF agv_inprgs OR init_fault THEN
    IF NOT ldin(chip_cntr_avail) THEN
      start_timer(mag_agv_tmr, 6000);
      fork_time := 0;
      fork_timer := fork_check_time;
      agv_status := cmd_host;
      cmd_req := 9;
      chip_permit_msg := true;
    ELSE
      agv_fault := 6469;      --CHIP CNTR CONDTNS INHIB AGV SERVC
```

```
    END IF;
  ELSE
    agv_fault := 6474;                        --UNEXPECTED AGV SERVICE
  END IF;

WHEN plt_cmplt =>                                             --STATE 7
  plate_timer := plt_standby;
  IF ((pl_agv_counter = 1) AND NOT plate_tra AND ldin
     (pres_at_trns)) OR
     ((pl_agv_counter = 2) AND plate_tra) THEN  --SUCC COMPLETION
    IF (pl_agv_counter = 2) AND plate_tra THEN
      plate_permit := true;
      delay_plate_tra := false;
    END IF;
    pl_agv_counter := 0;
    agv_status := cmd_host;
    cmd_req := 10;
  ELSE
    agv_fault := 6462;   --PLATE CONDTNS INHIB AGV SERVC COMPLETE
  END IF;

WHEN mag_cmplt =>                                             --STATE 8
  fork_timer := fork_standby;
  IF fork_agv_counter = 3 THEN
    IF NOT ldin(mag_seatd_1) AND NOT ldin(mag_seatd_2) AND NOT
       ldin(mag_present) THEN
      IF standby_req = 3 THEN
        standby_req := 0;
        put_save_int(standby_req, 4);
      ELSIF standby_req = 20 THEN
        standby_req := 4;
        put_save_int(standby_req, 4);
      END IF;
      mag_pu_permit := false;
      agv_status := cmd_host;
      fork_agv_counter := 0;
      cmd_req := 11;
      k_msg(6825);
      tool_permit_msg := false;
    ELSE                 --TOOL DRUM CONDTNS INHIB AGV SERVC CMPLT
      agv_fault := 6472;
    END IF;
  ELSE
    IF ldin(mag_seatd_1) AND ldin(mag_seatd_2) AND
       ldin(mag_present) THEN
      standby_req := 0;
      put_save_int(standby_req, 4);
      new_mag_arrived := false;
      check_config := false;
      install_magazine := true;
      out_of_tools := false;
      agv_status := cmd_host;
      fork_agv_counter := 0;
      cmd_req := 11;
      k_msg(6826);
      tool_permit_msg := false;
    ELSE                 --TOOL DRUM CONDTNS INHIB AGV SERVC CMPLT
      agv_fault := 6472;
    END IF;
  END IF;

WHEN chp_cmplt =>                                             --STATE 9
  fork_timer := fork_standby;
  IF ((fork_agv_counter = 5) AND NOT ldin(chip_cntr_avail)) OR
     (ldin(chip_cntr_avail) AND (fork_agv_counter = 6)) THEN
    agv_status := cmd_host;
    fork_agv_counter := 0;
    agv_rdy_cmplt := true;
    cmd_req := 12;
    chip_permit_msg := false;
  ELSE
    agv_fault := 6470;     --PICK UP NOT COMPLETED SUCCESSFULLY
```

```
          END IF;

        WHEN cmd_host =>                                        --STATE 10
          IF command_request = 0 THEN
            command_request := cmd_req;
            dnc_bool(mc2000_cmd_req) := true;
            cmd_req := 0;
            put_save_int(pl_agv_counter, 5);
            put_save_int(fork_agv_counter, 6);
            agv_status := 0;
          END IF;

        WHEN OTHERS =>
          agv_status := agv_stdby;
      END CASE;
    ELSE                                                     -- NOT AGVMON_OK
      put_msg(agv_fault, 9, 6);
      IF agv_fault > 6468 AND agv_fault /= 6877 THEN
        flash(sso_decr_light);
      END IF;
      agvmon_master := auto_error;
    END IF;

  WHEN auto_error =>
    IF agv_fault = 6877 THEN
      IF active_disp_page = 60 THEN
        disp_sel_lock;
        inq_msg :=
       "1)PROJECT PLATE 2)MAGAZINE 3)CHIPS                          "
        ask_oper(45, 23, 1, ans_lgt, ans_ready);
        IF ans_ready AND ask = ask_1 THEN
          IF ans_lgt = 1 THEN
            ans_ready := false;
            c_to_i(inq_msg, 1, 1, mdi_selection);
            agvmon_master := auto_recovery;
          ELSE
            ans_ready := false;
          END IF;
        END IF;
      END IF;
    ELSIF agv_fault < 6469 THEN
      IF cim_time_on AND NOT cim_fault(14) AND
         (automcode(ld_flag) OR unld_cmd) THEN
        store_msg(agv_fault);
        cim_fault(14) := true;
      END IF;
      rdout(plate_agv_lt) := rdout(41);
      IF rdin(plate_agv_pb) THEN
        disp_page_select(60);
        agvmon_master := auto_recovery;
      END IF;
    ELSE
      IF rdin(sso_decr) THEN
        disp_page_select(60);
        unflash(sso_decr_light);
        rdout(sso_decr_light) := false;
        agvmon_master := auto_recovery;
      END IF;
    END IF;

  WHEN auto_recovery =>
    rdout(offset_light_1) := false;
    CASE recover IS
      WHEN 0 =>                                           --RECOVER STATE 0
        IF active_disp_page = 60 THEN
          disp_sel_lock;
          inq_msg :=
       "1)OK TO ENTER 2)OK TO LEAVE 3)ABORT-CANCEL 4)ABORT-RESEND
          ask_oper(60, 23, 1, ans_lgt, ans_ready);
          IF ans_ready AND ask = ask_1 THEN
            IF ans_lgt = 1 THEN
```

```
          ans_ready := false;
          recover := 1;
        ELSE
          ans_ready := false;
        END IF;
      END IF;
    END IF;

  WHEN 1 =>
    IF agv_fault = 6877 THEN                            --RECOVER STATE 1
      IF inq_msg(1) = '1' THEN
        cmd_req := 6 + mdi_selection;
      ELSIF inq_msg(1) = '2' THEN
        cmd_req := 9 + mdi_selection;
      ELSIF (inq_msg(1) = '3') OR (inq_msg(1) = '4') THEN      --ABORT
        cmd_req := 21 + mdi_selection;
      ELSE
        recover := 0;
      END IF;
    ELSIF inq_msg(1) = '1' AND agv_fault /= 6464 AND
          agv_fault /= 6474 THEN                        --RE-EXECUTE
      IF agv_fault < 6469 THEN
        agv_status := pl_agv_counter;
      ELSE
        agv_status := fork_agv_counter;
      END IF;
      recover := 2;
    ELSIF inq_msg(1) = '2' AND agv_fault /= 6464 AND
          agv_fault /= 6474 THEN                        --TASK IS DONE-SEND
PLETE
      IF agv_fault < 6469 THEN
        agv_status := 7;
      ELSIF fork_agv_counter < 5 THEN
        agv_status := 8;
      ELSE
        agv_status := 9;
      END IF;
      recover := 2;
    ELSIF (inq_msg(1) = '3') OR (inq_msg(1) = '4') THEN        --ABORT
      fork_agv_counter := 0;
      pl_agv_counter := 0;
      CASE agv_fault IS
        WHEN 6461 | 6462 | 6463 | 6464 =>
          plate_timer := plt_standby;
          delay_plate_tra := false;
          plate_permit := true;
          cmd_req := 22;

        WHEN 6469 | 6470 | 6471 | 6472 | 6473 | 6474 =>
          IF fork_agv_counter < 5 THEN
            fork_timer := fork_standby;
            new_mag_arrived := false;
            check_config := false;
            mag_pu_permit := false;
            cmd_req := 23;
          ELSE
            cmd_req := 24;            --CANCEL-EXPECTED REQUEST CMD
          END IF;
        WHEN OTHERS =>
          NULL;
      END CASE;
    ELSE
      recover := 0;
    END IF;
    IF cmd_req /= 0 THEN
      agv_status := cmd_host;
      IF inq_msg(1) = '3' THEN
        cancel_agv := 1;                                --CANCEL SERVICE
      ELSE
        cancel_agv := 0;                      --RESEND AGV WITH NEW PART
```

```
          END IF;
          recover := 2;
        END IF;

      WHEN 2 =>                                              --RECOVER STATE 2
        agvmon_master := auto_run;
        disp_sel_unlock;
        kill_msg(agv_fault);
        agv_fault := 0;
        recover := 0;
        IF cim_fault(14) THEN
          cnt_dwn;
          cim_fault(14) := false;
        END IF;

      WHEN OTHERS =>
        NULL;
    END CASE;
  END CASE;

END agvmon_main;
-----------------------------------------------------------------------
END agvmon;

-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

PACKAGE atmain IS

PROCEDURE atmain_init;
PROCEDURE atmain_clear;
PROCEDURE atmain_cancel;
PROCEDURE atmain_oem1;
PROCEDURE atmain_main;

END atmain;
-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************
```

```
WITH wndone;   USE wndone;
WITH mcldat;   USE mcldat;
WITH clock;    USE clock;
WITH rel5;     USE rel5;
WITH rel6;     USE rel6;
WITH rel7;     USE rel7;
WITH bubmcl;   USE bubmcl;
WITH atmlib;   USE atmlib;
WITH oemdec;   USE oemdec;
WITH menu;     USE menu;
WITH ptchk;    USE ptchk;
WITH xfer;     USE xfer;
WITH lur;      USE lur;
WITH dtmgmt;   USE dtmgmt;
WITH blkdlt;   USE blkdlt;
WITH qcont;    USE qcont;
WITH chpmgt;   USE chpmgt;
WITH eopgm;    USE eopgm;
WITH dncmcl;   USE dncmcl;
WITH agvmon;   USE agvmon;
WITH tcntrl;   USE tcntrl;

PACKAGE BODY atmain IS
----------------------------------------------------------------------
-- ****************************************************************
-- * THIS PROCEDURE RUNS ALL THE INITIALIZATION PROCEDURES OF    *
-- * THE AUTOMATION MCL-RUNS AT POWER UP ONLY                    *
-- ****************************************************************
PROCEDURE atmain_init IS

BEGIN

  eopgm_init;
  atmlib_init;
  agvmon_init;
  blkdlt_clear;
  bubmcl_init;
  chpmgt_init;
  clock_init;
  menu_init;
  qcont_cancel;
  tcntrl_init;
  xfer_clear;

END atmain_init;
----------------------------------------------------------------------
-- ****************************************************************
-- * THIS PROCEDURE RUNS ALL THE CLEAR PROCEDURES OF             *
-- * THE AUTOMATION MCL.                                         *
-- ****************************************************************
PROCEDURE atmain_clear IS

BEGIN

  atmlib_clear;
  blkdlt_clear;
  dtmgmt_clear;
  ptchk_clear;
  qcont_cancel;
  xfer_clear;

END atmain_clear;
----------------------------------------------------------------------
-- ****************************************************************
-- * THIS PROCEDURE RUNS ALL THE CANCEL PROCEDURES OF            *
-- * THE AUTOMATION MCL.                                         *
-- ****************************************************************
PROCEDURE atmain_cancel IS
```

```
BEGIN

  atmlib_cancel;
  chpmgt_cancel;
  dtmgmt_cancel;
  eopgm_cancel;
  lur_cancel;
  menu_cancel;
  ptchk_cancel;
  qcont_cancel;
  tcntrl_cancel;
  xfer_cancel;

END atmain_cancel;
------------------------------------------------------------------------
-- ***************************************************************
-- * THIS PROCEDURE RUNS ALL THE PROCEDURES OF THE                *
-- * THE AUTOMATION MCL THAT NEED TO RUN BEFORE THE GE MCL       *
-- ***************************************************************
PROCEDURE atmain_oeml IS

BEGIN

  clock_oeml;
  atmlib_oeml;

END atmain_oeml;
------------------------------------------------------------------------
-- ***************************************************************
-- * THIS PROCEDURE RUNS ALL THE MAIN PROCEDURES OF              *
-- * THE AUTOMATION MCL.                                         *
-- ***************************************************************
PROCEDURE atmain_main IS

BEGIN

  inter_face;
  agvmon_main;
  blkdlt_main;
  chpmgt_main;
  clock_main;
  dncmcl_main;
  dtmgmt_main;
  eopgm_main;
  lur_main;
  menu_main;
  part_disp;
  ptchk_main;
  ptmgmt_main;
  qcont_main;
  store_file;
  tcntrl_main;
  xfer_main;

END atmain_main;
------------------------------------------------------------------------
END atmain;
-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
   * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY   *
-- * G.E.                                                        *
```

```
-- *                                                                  *
-- * PROPERTY OF THE AIRCRAFT ENGINE BUSINESS GROUP OF THE            *
-- * GENERAL ELECTRIC COMPANY.                                        *
-- *                                                                  *
-- ******************************************************************

WITH wndone;   USE wndone;
WITH mcldat;   USE mcldat;

PACKAGE atmlib IS

TYPE asks IS (ask_1, ask_2);
ask                : asks := ask_1;

TYPE passes IS (pass_1, pass_2a, pass_2, pass_3);
pass               : passes := pass_1;

TYPE checks_for_file IS (chk_standby, chk_wait);
check_for_file     : checks_for_file := chk_standby;

TYPE move_states is (move_1, move_2);
move_state         : move_states := move_1;

enum_resp          : nc_responses;
response           : table_status;
cyc_strt_on        : boolean := false;
flash_al           : boolean := false;
inhibit_ref        : boolean := false;
inhibit_retrace    : boolean := false;
inh_man            : boolean := false;
man_opt_stop       : boolean := false;
msg_opt            : boolean;
oper_cmplt         : boolean := false;
password_cmplt     : boolean := false;
pass_echo          : boolean := false;
plate_mac          : boolean;
plate_ok           : boolean;
plate_que          : boolean;
plate_tra          : boolean;
plate_wkxgr        : boolean := false;
set_cmplt          : boolean := false;
xgr_park           : boolean;
float_001          : float := 0.001;
float_1            : float := 1.0;
float_2            : float := 2.0;
float_7            : float := 7.0;
float_60           : float := 60.0;
float_80           : float := 80.0;
float_180          : float := 180.0;
float_200          : float := 200.0;
float_360          : float := 360.0;
float_375          : float := 375.0;
float_500          : float := 500.0;
float_1000         : float := 1000.0;
float_2700         : float := 2700.0;
float_3600         : float := 3600.0;
t_val              : float;
delay_msg_no       : integer := 0;
psn_par            : float := 0.0;
rate_par           : float := 0.0;
buffer_trans       : integer := 0;
file_is_there      : integer := 0;
fl_num             : integer := 0;
int_date           : integer := 0;
lost_time_cntr     : integer := 0;
lost_time_msg      : integer := 0;
old_day            : integer;
old_time           : integer;
old_year           : integer;
rework_time_cntr   : integer := 0;
test_integer       : integer := 0;
tran_name          : integer := 0;
```

```
tran_num          : integer := 0;
var_time_msg      : integer := 0;
blank_line        : str64;
char_date         : string(1..8);
cur_date          : string(1..20);
hold_name         : str10;
inq_msg           : str64;
month_str         : string(1..36);
old_mon           : string(1..3);

serial_num_loc    : ARRAY (1..5) OF integer;
wp_status         : array (1..5) of integer;
msg_act           : ARRAY (6800..6850) OF boolean;      --ACTIVE MSGS ARRAY

PROCEDURE atmlib_init;
PROCEDURE atmlib_oem1;
PROCEDURE atmlib_cancel;
PROCEDURE atmlib_clear;
PROCEDURE c_to_i(array_in : IN OUT string; -- CONVERTS CHARACTER TO INTEGER
              posn : IN integer;
              quantity : IN integer;
              result : OUT integer);
PROCEDURE f_to_c(flt_in : IN float;          -- CONVERTS FLOAT TO CHARACTER
              width : IN integer;
              decpt : IN integer;
              posn : IN integer;
              array_out : OUT string);
PROCEDURE i_to_c(int_in : IN integer;       -- CONVERTS INTEGER TO CHARACTER
              width : IN integer;
              posn : IN integer;
              array_out : OUT string);
PROCEDURE c_to_f(array_in : IN OUT string;   -- CONVERTS CHARACTER TO FLOAT
              posn : IN integer;
              quantity : IN integer;
              flt_out : OUT float);
PROCEDURE ask_oper(pr_lgt : IN integer;         -- PREFORMS INQUIRE PROMPTS
                ln_num : IN integer;
                col_num : IN integer;
                inq_lgt : OUT integer;
                resp_rdy : OUT boolean);
PROCEDURE file_present(mcl_file : IN integer);
FUNCTION find_trans RETURN boolean;
FUNCTION truncate(parm_value : IN integer) RETURN integer;
PROCEDURE password;                          -- ALLOWS ACCESS THROUGH PASSWORD
PROCEDURE set_conv_varb;             -- SETS UP A DATE IN FLOAT FOR COMPARISON
PROCEDURE repl_ver_dt;    -- CONVERTS CHAR DATE FROM CLOCK TO DATE IN FLOAT
PROCEDURE str_set(name_tag : IN integer;
               name_val : IN integer);
PROCEDURE tb_fl(t_tbl1 : IN integer;
             t_ind1 : IN integer;
             t_tbl2 : IN integer;
             t_ind2 : IN integer);
PROCEDURE act_off(tool_off : IN integer;
               tool_dat : IN integer);
PROCEDURE t_a_f(t_tbl : IN integer;
             t_ind : IN integer);
PROCEDURE t_s_i(t_tbl : IN integer;
             t_vle : IN integer;
             t_ind : IN OUT integer);
PROCEDURE p_msg(msg_num : IN integer;
             prior : IN integer);
PROCEDURE k_msg(msg_num : IN integer);
PROCEDURE p_val(p_num : IN integer);
PROCEDURE store_msg(msg_no : IN integer);
PROCEDURE cnt_dwn;
PROCEDURE var_msg(var_no : IN integer);
PROCEDURE var_dwn;
PROCEDURE erase (page_no : IN integer;
              line_no : IN integer);
PROCEDURE turn_off_blkdlt(pmtr_num : IN integer);
PROCEDURE check_plo;
```

```
PROCEDURE set_offsts;
PROCEDURE inter_face;
PROCEDURE store_file;
FUNCTION ax_move (abs_move : boolean;
                  ax_par : integer) RETURN boolean;
FUNCTION ax_status_ok(ax_nbr : integer) RETURN boolean;

END atmlib;
-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

WITH wndone;   USE wndone;
WITH mcldat;   USE mcldat;
WITH mcllib;   USE mcllib;
WITH wndstd;   USE wndstd;
WITH oemdec;   USE oemdec;
WITH wndtwo;   USE wndtwo;
WITH wndtre;   USE wndtre;
WITH wndmth;   USE wndmth;
WITH clock;    USE clock;
WITH rel5;     USE rel5;
WITH rel6;     USE rel6;
WITH rel7;     USE rel7;
WITH bubdec;   USE bubdec;
WITH ptldr;    USE ptldr;
WITH convor;   USE convor;
WITH coolnt;   USE coolnt;
WITH tlexch;   USE tlexch;
WITH oemmst;   USE oemmst;
WITH blkdlt;   USE blkdlt;
WITH dtmgmt;   USE dtmgmt;
WITH agvmon;   USE agvmon;
WITH tcntrl;   USE tcntrl;
WITH ptchk;    USE ptchk;
WITH lur;      USE lur;
WITH dncdec;   USE dncdec;
WITH dncmcl;   USE dncmcl;
WITH xfer;     USE xfer;
WITH chpmgt;   USE chpmgt;
WITH menu;     USE menu;

PACKAGE BODY atmlib IS

TYPE storages IS (store_wait, store_start, store_name, store_cmplt);
storage           : storages := store_wait;

check_bounce      : boolean := false;
no_ref_msg        : boolean := false;
one_time_flag     : boolean := false;
page              : integer;
tov_index_1       : integer := 0;
tov_index_2       : float := 0.0;
 ------------------------------------------------------------------------
-- ***************************************************************
-- * THIS PROCEDURE RUNS ONLY AT POWER UP TIME                   *
-- ***************************************************************
```

```
PROCEDURE atmlib_init IS

BEGIN

  automation_opt := msd_bool_table(150);
  cause_code_opt := msd_bool_table(148);

  config_instald := get_save_bool(1);
  central_coolant := get_save_bool(2);
  cim_time_on := get_save_bool(4);
  FOR i IN 1..11 LOOP
    IF i < 6 THEN
      wp_disp(i) := get_save_bool(5 + i);
    END IF;
    zone_tbl_str(i) := '-';
  END LOOP;
  block_dec_cancel := get_save_bool(11);
  file_instald := get_save_bool(20);
  deliv_exp := get_save_bool(21);
  pkup_exp := get_save_bool(22);
  a_delivr := get_save_bool(23);
  a_pickup := get_save_bool(24);
  plo_1 := get_save_bool(30);
  plo_2 := get_save_bool(31);
  default_plo1 := get_save_bool(32);
  ldout(rel_chuck) := get_save_bool(51);
  ldout(ret_grprs) := get_save_bool(52);
  prt_on_mach := get_save_bool(53);
  prt_in_grprs := get_save_bool(54);
  ldout(ret_shtl) := get_save_bool(55);
  ldout(close_grprs) := get_save_bool(56);
  tools_in_grprs := get_save_bool(57);
  mag_pres := get_save_bool(58);
  mag_seatd := get_save_bool(59);

  standby_req := get_save_int(4);
  pl_agv_counter := get_save_int(5);
  fork_agv_counter := get_save_int(6);
  plate_integer := get_save_int(7);
  time_off := get_save_int(8);
  plate_index := get_save_int(9);
  part_count := get_save_int(20);

  lost_time := get_save_float(1);
  rework_time := get_save_float(2);
  life_to_dec := get_save_float(5);

  plate_permit := true;
  password_cmplt := false;
  oper_cmplt := false;
  msg_opt := false;
  pass_echo := true;
  FOR index IN 6800..6850 LOOP
    msg_act(index) := false;
  END LOOP;
  FOR i IN 1..64 LOOP
    blank_line(i) := ' ';
    IF i < 40 THEN
      plate_serial_no(i) := ' ';
    END IF;
    IF i < 33 THEN
      part_descrip(i) := ' ';
    END IF;
    IF i < 21 THEN
      blank_time(i) := ' ';
      cim_fault(i) := false;
    END IF;
    IF i < 10 THEN
      act_blkdlt(i) := ' ';
    END IF;
    IF i < 9 THEN
      proj_plate_no(i) := ' ';
    END IF;
```

```
  END LOOP;
  plate_tra := ldin(seatd_on_trns);
  hold_name := "HOLD00.MCL";
  wp_status(1) := wp_status1_rnm;
  wp_status(2) := wp_status2_rnm;
  wp_status(3) := wp_status3_rnm;
  wp_status(4) := wp_status4_rnm;
  wp_status(5) := wp_status5_rnm;
  serial_num_loc(1) := sn_1_rnm;
  serial_num_loc(2) := sn_2_rnm;
  serial_num_loc(3) := sn_3_rnm;
  serial_num_loc(4) := sn_4_rnm;
  serial_num_loc(5) := sn_5_rnm;
  flash(41);

END atmlib_init;
---------------------------------------------------------------------
-- ***************************************************************
-- * THIS PROCEDURE RUNS BEFORE THE GE MCL                        *
-- ***************************************************************
PROCEDURE atmlib_oem1 IS

BEGIN

  IF cyc_strt_on THEN                                        --START CYCLE
    rrise(cycle_start) := true;
    rdin(cycle_start) := true;
    cyc_strt_on := false;
  END IF;
  IF inhibit_retrace AND rrise(retrace) THEN             --INHIBIT RETRACE
    rrise(retrace) := false;
  END IF;
  IF inh_man AND NOT host_req_mag THEN               --INHIBIT MANUAL MODE
    rrise(manual_pb) := false;
    rdin(manual_pb) := false;
  END IF;
  IF blk_dlt_state /= blk_standby OR                 --INHIBIT CYCLE START
     part_check /= part_standby THEN
    rrise(cycle_start) := false;
    rdin(cycle_start) := false;
  END IF;
  IF (NOT clock_is_set AND ws_status /= 1) OR               --INHIBIT AUTO
     cool_set_stop OR fdhd_act OR opt_stop_act THEN
    rrise(auto_pb) := false;
    rrise(single_pb) := false;
  END IF;
  IF rdout(ref_zero_light) AND inhibit_ref THEN   --INHIBIT REFERENCE ZERO
    FOR index IN 40..48 LOOP
      rrise(index) := false;
    END LOOP;
    IF NOT no_ref_msg THEN
      put_msg(6875, 7, 6);
      no_ref_msg := true;
    END IF;
  END IF;
  IF no_ref_msg AND (NOT rdout(ref_zero_light) OR NOT inhibit_ref) THEN
    kill_msg(6875);
    no_ref_msg := false;
  END IF;
  IF NOT man_opt_stop THEN
    IF rdin(option_stop) AND NOT rdout(op_stop_light) THEN
      man_opt_stop := true;
    END IF;
  ELSE
    IF NOT nc_status(cyc_start_lt_on) OR rdin(option_stop) THEN
      man_opt_stop := false;
    END IF;
  END IF;
                                                     --DISPLAY PAGE SELECT
  IF menu_state = input_mode OR menu_state = status THEN
    select_flag := true;
```

```
  ELSE
    select_flag := false;
  END IF;
  page := active_disp_page;
  IF rrise(sso_incr) THEN
    IF NOT select_flag AND page > 89 AND page < 123 AND page /= 120 THEN
      IF sel_curs_index = 90 THEN
        sel_curs_index := 110;
      ELSIF sel_curs_index = 110 THEN
        sel_curs_index := 122;
      ELSIF sel_curs_index = 122 THEN
        sel_curs_index := 90;
      END IF;
    END IF;
    rrise(sso_incr) := false;                         -- AVOID ERROR MESSAGE
  ELSIF rrise(sso_decr) THEN
    rrise(sso_decr) := false;                         --AVOID ERROR MESSAGE
  END IF;
  IF rrise(mfo_incr) THEN
    IF NOT select_flag AND page > 89 AND page < 123 THEN
      IF NOT (page = sel_curs_index) THEN
        disp_page_select(sel_curs_index);
      END IF;
    END IF;
    rrise(mfo_incr) := false;                         --AVOID ERROR MESSAGE
  END IF;

END atmlib_oeml;
-------------------------------------------------------------------
-- **************************************************************
-- * THIS PROCEDURE RUNS ONLY WHEN A CANCEL IS INITIATED. IT WILL *
-- * RESET VARIABLES THAT NEED TO BE RESET AT A CANCEL.           *
-- **************************************************************
PROCEDURE atmlib_cancel IS

BEGIN

  FOR i IN 0..30 LOOP
    k_msg(6818 + i);
  END LOOP;
  FOR index IN 1..31 LOOP
    automcode(index) := false;
  END LOOP;
  buffer_trans := 0;
  IF mcl_state = mcl_auto AND NOT cim_fault(3) THEN
    store_msg(9005);
    cim_fault(3) := true;
  END IF;
  IF menu_state = input_mode THEN
    inquire_cancel;
    erase(90, 22);
    disp_sel_unlock;
    nc_status(inquire_complete) := false;
  END IF;
  IF menu_state /= status then
    menu_state := menu_standby;
  END IF;
  IF NOT no_go_off_line THEN
    IF cell_is_up OR ws_status = 2 THEN
      ws_status := off_line;
      menu_state := status;
      cell_is_up := false;
    END IF;
    enum_resp := parameter_change(105, int_to_float(ws_status));
    prog_was_running := false;
  END IF;
  no_go_off_line := false;
  IF cim_fault(1) THEN
    FOR i IN 1..5 LOOP
      kill_msg(6850 + i);
    END LOOP;
    kill_msg(6859);
```

```
  END IF;
  IF cim_fault(2) THEN
    kill_msg(6856);
    kill_msg(6857);
    kill_msg(6864);
  END IF;
  als_light := false;
  bubmcl_cancel := true;
  wait_for_status := false;
  tran_name := 0;
  reworking := false;
  storage := store_wait;
  move_state := move_1;

END atmlib_cancel;
------------------------------------------------------------------------
-- ****************************************************************
-- * THIS PROCEDURE RUNS ONLY WHEN A CLEAR IS INITIATED. IT WILL   *
-- * RESET VARIABLES THAT NEED TO BE RESET AT A CLEAR.             *
-- ****************************************************************
PROCEDURE atmlib_clear IS

BEGIN

  inhibit_ref := false;
  restart_prog := false;

END atmlib_clear;
------------------------------------------------------------------------
-- ***************************************************************
-- * THIS PROCEDURE WILL CONVERT A STRING TO AN INTEGER          *
-- ***************************************************************
PROCEDURE c_to_i(array_in : IN OUT string;
                 posn : IN integer;
                 quantity : IN integer;
                 result : OUT integer) IS

BEGIN

  conv_char_to_int(array_in, posn, quantity, result, done);

END c_to_i;
-------------------------------------------------------------------------
-- ***************************************************************
-- * THIS PROCEDURE WILL CONVERT A FLOAT TO A STRING             *
-- ***************************************************************
PROCEDURE f_to_c(flt_in : IN float;

                 width : IN integer;
                 decpt : IN integer;
                 posn : IN integer;
                 array_out : OUT string) IS

BEGIN

  conv_flt_to_char(flt_in, width, decpt, posn, array_out, done);

END f_to_c;
-------------------------------------------------------------------------
-- ***************************************************************
-- * THIS PROCEDURE WILL CONVERT AN INTEGER TO A STRING          *
-- ***************************************************************
PROCEDURE i_to_c(int_in : IN integer;
                 width : IN integer;
                 posn : IN integer;
                 array_out : OUT string) IS

BEGIN

  conv_int_to_char(int_in, width, posn, array_out, done);
```

```
END i_to_c;
-------------------------------------------------------------------------
-- ****************************************************************
-- * THIS PROCEDURE WILL CONVERT A STRING TO A FLOAT              *
-- ****************************************************************
PROCEDURE c_to_f(array_in : IN OUT string;
                 posn : IN integer;
                 quantity : IN integer;
                 flt_out : OUT float) IS

BEGIN

  conv_char_to_flt(array_in, posn, quantity, flt_out, done);

END c_to_f;
-------------------------------------------------------------------------
-- ****************************************************************
-- * THIS PROCEDURE WILL DISPLAY A QUESTION TO AN OPERATOR        *
-- ****************************************************************
PROCEDURE ask_oper(pr_lgt : IN integer;
                   ln_num : IN integer;
                   col_num : IN integer;
                   inq_lgt : OUT integer;
                   resp_rdy : OUT boolean) IS

BEGIN

  CASE ask IS
    WHEN ask_1 =>
      IF inquire_prompt(pr_lgt, inq_msg, ln_num, col_num, pass_echo) =
         success THEN
        ask := ask_2;
      END IF;

    WHEN ask_2 =>
      IF nc_status(inquire_complete) AND nc_status(inquire_success) THEN
        inq_msg := blank_line;
        inquire_response(inq_lgt, inq_msg);
        ask := ask_1;
        pass_echo := true;
        resp_rdy := true;
        nc_status(inquire_complete) := false;
      END IF;
  END CASE;

END ask_oper;
-------------------------------------------------------------------------
-- *******************************************************************
-- * THIS FUNCTION WILL DETERMINE WHETHER THERE IS A PLATE FILE      *
-- * PRESENT FOR A PARTICULAR STATION.                               *
-- *******************************************************************
PROCEDURE file_present(mcl_file : IN integer) IS

BEGIN

  CASE check_for_file IS
    WHEN chk_standby =>
      IF file_command = command_standby AND file_is_there = 0 THEN
        str_set(0, mcl_file);
        item1_rec := pr_id_rnm;
        file_command := g_str;
        check_for_file := chk_wait;
      END IF;

    WHEN chk_wait =>
      IF file_command = get_data THEN
        file_is_there := 1;
        check_for_file := chk_standby;
        file_command := command_standby;
```

```
      ELSIF file_command = no_file THEN
        file_is_there := 2;
        check_for_file := chk_standby;
        file_command := command_standby;
      END IF;
  END CASE;

END file_present;
------------------------------------------------------------------
-- ********************************************************************
-- * THIS FUNCTION WILL FIND WHICH PLATE CONFIGURATION FILE IS ACTIVE   *
-- * FOR A PART IN THE TRANSFER STATION.                                *
-- ********************************************************************
FUNCTION find_trans RETURN boolean IS

status : boolean;

BEGIN

  status := false;
  CASE tran_name IS
    WHEN 0 =>
      IF file_command = command_standby THEN
        str_set(0, 4);
        iteml_rec := pr_desc_rnm;
        file_command := g_str;
        tran_name := 1;
      END IF;

    WHEN 1 =>
      IF file_command = command_standby THEN
        tran_name := 0;
      ELSIF file_command = get_data THEN
        tran_num := 4;
        status := true;
        file_command := command_standby;
        tran_name := 0;
      ELSIF file_command = no_file THEN
        str_set(0, 1);
        iteml_rec := pr_desc_rnm;
        file_command := g_str;
        tran_name := 2;
      END IF;

    WHEN 2 =>
      IF file_command = command_standby THEN
        tran_name := 0;
      ELSIF file_command = get_data THEN
        tran_num := 1;
        status := true;
        file_command := command_standby;
        tran_name := 0;
      ELSIF file_command = no_file THEN
        tran_num := 0;
        status := true;
        file_command := command_standby;
        tran_name := 0;
      END IF;

    WHEN others =>
      tran_name := 0;
  END CASE;

RETURN status;

END find_trans;
------------------------------------------------------------------------
-- **************************************************************
-- * THIS FUNCTION WILL OBTAIN A PARAMETER VALUE AND TRUNCATE IT*
-- **************************************************************
FUNCTION truncate(parm_value : IN integer) RETURN integer IS
```

```
prod : integer;

BEGIN

  prod := trunc(parameter_value(parm_value));

RETURN prod;

END truncate;
----------------------------------------------------------------------
-- **************************************************************
-- * THIS PROCEDURE WILL ASK THE OPERATOR FOR A PASSWORD          *
-- **************************************************************
PROCEDURE password IS

ptd : integer;
epswd : string(1..14);

BEGIN

  epswd := "ENTER PASSWORD";

  CASE pass IS
    WHEN pass_1 =>
      FOR i IN 1..64 LOOP
        IF i < 15 THEN
          inq_msg(i) := epswd(i);
        ELSE
          inq_msg(i) := ' ';
        END IF;
      END LOOP;
      pass := pass_2a;

    WHEN pass_2a =>

    FOR i IN 1..3 LOOP
      char_date(i) := msd_char_table(119 + i);
    END LOOP;
    pass := pass_2;

  WHEN pass_2 =>
    pass_echo := false;
    ask_oper(60, 17, 1, ptd, oper_cmplt);
    IF oper_cmplt THEN
      pass := pass_3;
      oper_cmplt := false;
    END IF;

  WHEN pass_3 =>
    IF (inq_msg(1) = char_date(1)) AND (inq_msg(2) = char_date
       (2)) AND (inq_msg(3) = char_date(3)) THEN
      password_cmplt := true;
      pass := pass_1;
    ELSE
      pass := pass_1;
    END IF;
 END CASE;

END password;
----------------------------------------------------------------------
-- ******************************************************************
-- * CONVERT INTEGER DATE TO STRING DATE                            *
-- ******************************************************************

PROCEDURE set_conv_varb IS

m_index : integer;

BEGIN

  m_index := int_date / 100;
  old_day :=(int_date) REM 100;
```

```
  FOR i IN 0..2 LOOP
    old_mon(3 - i) := month_str((m_index * 3) - i);
  END LOOP;
  set_cmplt := true;

END set_conv_varb;
 ------------------------------------------------------------------
-- ****************************************************************
-- * CONVERT STRING DATE TO PARAMETER VALUE                       *
-- ****************************************************************

PROCEDURE repl_ver_dt IS

flt_hr : float;
int_day : integer;
int_month : integer;
int_val : ARRAY (1..2) OF integer;

par_rdy : float;

the_month : string(1..3);

BEGIN

  c_to_i(cur_date, 1, 2, int_day);
  c_to_i(cur_date, 8, 4, int_month);
  c_to_f(cur_date, 13, 2, flt_hr);
  enum_resp := parameter_change((134), flt_hr);
  int_val(1) := int_month;
  FOR i IN 1..12 LOOP
    FOR j IN 0..2 LOOP
      the_month(3 - j) := month_str((i * 3) - j);
    END LOOP;
    IF (cur_date(4) = the_month(1)) AND (cur_date(5) = the_month
       (2)) AND  cur_date(6) = the_month(3)) THEN
      int_month := i;
      EXIT;
    END IF;
  END LOOP;
  int_val(2) :=(int_month * 100) + int_da
  FOR i IN 1..2 LOOP
    par_rdy := int_to_float(int_val(i));
    enum_resp := parameter_change((134 + i), par_rdy);
  END LOOP;

END repl_ver_dt;
 ------------------------------------------------------------------
-- ***********************************************************
-- * THIS PROCEDURE WILL SELECT THE NAME OF A FILE TO EXAMINE   *
-- ***********************************************************
PROCEDURE str_set(name_tag : IN integer;
                  name_val : IN integer) IS

name_array : ARRAY (1..6) OF str10;

BEGIN

  name_array(1) := "DETRAN.MCL";  -- PART DELIVERY CONFIGURATION FILE
  name_array(2) := "Q1TRAN.MCL";  -- PART ON QUEUE CONFIGURATION FILE
  name_array(3) := "MATRAN.MCL";  -- PART IN MACHINE CONFIGURATION FILE
  name_array(4) := "PUTRAN.MCL";  -- PART PICK UP CONFIGURATION FILE
  name_array(5) := "CONFIG.MCL";  -- TOOL MAGAZINE CONFIGURATION FILE
--NAME_ARRAY(6) := "Q2TRAN.MCL";  -- FOR MACHINES WITH TWO QUEUE STATIONS

  IF name_tag = 1 THEN
    str_old_name := name_array(name_val);
  ELSE
    str_name := name_array(name_val);
  END IF;
```

```
END str_set;
-----------------------------------------------------------------------
-- ****************************************************************
-- * THIS PROCEDURE WILL TRANSFER A FLOAT VALUE FROM ONE TABLE  *
-- * TO ANOTHER AND ALSO RETURN A VALUE FROM A TABLE            *
-- ****************************************************************
PROCEDURE tb_fl(t_tbl1 : IN integer;
                t_ind1 : IN integer;
                t_tbl2 : IN integer;
                t_ind2 : IN integer) IS

BEGIN

  IF t_tbl1 /= 0 THEN
    t_val := tbl_val_float(cust, t_tbl1, t_ind1);
  END IF;
  response := tbl_chg_float(cust, t_tbl2, t_ind2, t_val);

END tb_fl;
-----------------------------------------------------------------
-- ****************************************************************
-- * THIS PROCEDURE WILL ACTIVE A WEAR AND DATA OFFSET            *
-- ****************************************************************
PROCEDURE act_off(tool_off : IN integer;
                  tool_dat : IN integer) IS

BEGIN

  enum_resp := activate_off_td(tool_off, tool_dat, false, float_10);

END act_off;
-----------------------------------------------------------------
-- ****************************************************************
-- * THIS PROCEDURE WILL ADD A FLOAT VALUE TO A FLOAT TABLE     *
-- ****************************************************************
PROCEDURE t_a_f(t_tbl : IN integer;
                t_ind : IN integer) IS

BEGIN

  response := tbl_add_float(cust, t_tbl, t_ind, t_val);

END t_a_f;
-----------------------------------------------------------------
-- ****************************************************************
-- * THIS PROCEDURE WILL SEARCH AN INTEGER TABLE FOR A VALUE    *
-- ****************************************************************
PROCEDURE t_s_i(t_tbl : IN integer;
                t_vle : IN integer;
                t_ind : IN OUT integer) IS

BEGIN

  tbl_search_int(cust, t_tbl, t_vle, t_ind, tble_status);

END t_s_i;
-----------------------------------------------------------------------
-- ****************************************************************
-- * THIS PROCEDURE WILL DISPLAY A MESSAGE                       *
-- ****************************************************************
PROCEDURE p_msg(msg_num : IN integer;
                prior : IN integer) IS

BEGIN

  IF NOT msg_act(msg_num) THEN
    IF msg_num /= 6844 AND msg_num /= 6843 THEN
      IF msg_num > 6823 THEN
        store_msg(msg_num);
      END IF;
```

```
    ELSIF (NOT plate_que AND NOT plate_mac) OR cim_fault(11) THEN
      IF msg_num = 6844 THEN
        store_msg(6844);
        cim_fault(8) := true;
      ELSIF msg_num = 6843 THEN
        store_msg(6843);
        cim_fault(9) := true;
      END IF;
      cim_fault(11) := false;
    END IF;
    put_msg(msg_num, 8, prior);
    IF prior /= 3 THEN
      msg_act(msg_num) := true;
    END IF;
  END IF;

END p_msg;
-----------------------------------------------------------------------
-- ***********************************************************
-- * THIS PROCEDURE WILL REMOVE A MESSAGE FROM THE DISPLAY      *
-- ***********************************************************
PROCEDURE k_msg(msg_num : IN integer) IS

BEGIN

  IF msg_act(msg_num) THEN
    IF msg_num > 6823 AND msg_num /= 6844 AND msg_num /= 6843 THEN
      cnt_dwn;
    END IF;
    IF cim_fault(10) AND msg_num = 6817 THEN
      cnt_dwn;
      cim_fault(10) := false;
    END IF;
    IF cim_fault(9) AND msg_num = 6843 THEN
      cnt_dwn;
      cim_fault(9) := false;
    END IF;
    IF msg_num = 6822 OR
       msg_num = 6814 THEN
      var_dwn;
    END IF;
    kill_msg(msg_num);
    msg_act(msg_num) := false;
  END IF;

END k_msg;
-----------------------------------------------------------------------
-- ***********************************************************
-- * THIS PROCEDURE WILL OBTAIN A VALUE FROM A PARAMETER       *
-- ***********************************************************
PROCEDURE p_val(p_num : IN integer) IS

BEGIN

  t_val := parameter_value(p_num);

END p_val;
-----------------------------------------------------------------------
-- ***********************************************************
-- * THIS PROCEDURE WILL STORE A LOST TIME MESSAGE NUMBER      *
-- ***********************************************************
PROCEDURE store_msg(msg_no : IN integer) IS

BEGIN

  IF cim_time_on THEN
    lost_time_cntr := tbl_val_int(cust, msg, 9);
    IF msg_no < 9000 OR msg_no > 9002 THEN
      lost_time_cntr := lost_time_cntr + 1;
```

```
    END IF;
    lost_time_msg := lost_time_msg + 1;
    IF lost_time_msg = 9 THEN
      lost_time_msg := 1;
    END IF;
    response := tbl_chg_int(cust, msg, lost_time_msg, msg_no);
    response := tbl_chg_int(cust, msg, 9, lost_time_cntr);
    response := tbl_chg_int(cust, msg, 10, lost_time_msg);
    IF msg_no /= 9008 AND msg_no /= 6810 THEN
      flash_al := true;
      cim_fault(13) := true;
    END IF;
  END IF;

END store_msg;
--------------------------------------------------------------------------
-- ****************************************************************
-- * THIS PROCEDURE WILL COUNT DOWN THE LOST TIME COUNTER          *

-- ****************************************************************
PROCEDURE cnt_dwn IS

BEGIN

  IF cim_time_on THEN
    IF lost_time_cntr > 0 THEN
      lost_time_cntr := lost_time_cntr - 1;
    END IF;
    response := tbl_chg_int(cust, msg, 9, lost_time_cntr);
  END IF;

END cnt_dwn;
--------------------------------------------------------------------------
-- ****************************************************************
-- * THIS PROCEDURE WILL STORE A VARIANCE TIME MESSAGE NUMBER      *
-- ****************************************************************
PROCEDURE var_msg(var_no: IN integer) IS

BEGIN

  IF cim_time_on THEN
    rework_time_cntr := tbl_val_int(cust, var, 9);
    rework_time_cntr := rework_time_cntr + 1;
    var_time_msg := var_time_msg + 1;
    IF var_time_msg = 9 THEN
      var_time_msg := 1;
    END IF;
    response := tbl_chg_int(cust, var, var_time_msg, var_no);
    response := tbl_chg_int(cust, var, 9, rework_time_cntr);
    response := tbl_chg_int(cust, var, 10, var_time_msg);
    IF var_no = 6862 OR var_no = 6863 THEN
      cim_fault(16) := true;
    END IF;
    IF var_no /= 9007 THEN
      flash_al := true;
    END IF;
  END IF;

END var_msg;
--------------------------------------------------------------------------
-- ****************************************************************
-- * THIS PROCEDURE WILL COUNT DOWN THE VARIANCE TIME COUNTER      *
-- ****************************************************************
PROCEDURE var_dwn IS

BEGIN

  IF cim_time_on AND rework_time_cntr > 0 THEN
    rework_time_cntr := rework_time_cntr - 1;
    response := tbl_chg_int(cust, var, 9, rework_time_cntr);
  END IF;
```

```
END var_dwn;
------------------------------------------------------------------------
-- ************************************************************
-- * THIS PROCEDURE WILL ERASE THE DISPLAY LINE SPECIFIED        *
-- ************************************************************
PROCEDURE erase(page_no: IN integer;
                line_no: IN integer) IS

BEGIN

  IF disp_page_line(page_no, line_no, blank_line) THEN
    NULL;
  END IF;

END erase;
------------------------------------------------------------------------
--*********************************************************************
-- THIS PROCEDURE TURNS OFF A SELECTED BLOCK DELETE AS SPECIFIED BY THE
-- PARAMETER VALUE.
--*********************************************************************
PROCEDURE turn_off_blkdlt(pmtr_num: IN integer) IS

temp_int          : integer;

BEGIN

  temp_int := truncate(pmtr_num);
  IF temp_int < 10 AND temp_int > 0 THEN
    enum_resp := block_delete_off(temp_int);
    act_blkdlt(10 - temp_int) := '0';
  END IF;
  FOR i IN 1..9 LOOP
    IF (act_blkdlt(i) = '0') OR (act_blkdlt(i) = ' ') THEN
      rdout(blk_del_light) := false;
    ELSE
      rdout(blk_del_light) := true;
      EXIT;
    END IF;
  END LOOP;

END turn_off_blkdlt;
------------------------------------------------------------------------
-- ************************************************************
-- * THIS PROCEDURE IS USED TO INTERFACE THE AUTOMATION MCL     *
-- * TO THE OPERATING MCL AND CONTAINS OTHER MISC FUNCTIONS     *
-- * THAT APPLY TO THE AUTOMATION TASKS IN GENERAL.             *
-- ************************************************************
PROCEDURE check_plo IS

BEGIN

  IF automcode(a127) AND NOT plo_1 AND NOT plo_2 THEN
    tov_index_1 := 0;
    tov_index_2 := float_1;
    prelude_request(v_prel);
    set_offsts;
    default_plo1 := true;
    put_save_bool(default_plo1, 32);
    plo_1 := true;
    put_save_bool(plo_1, 30);
  ELSIF automcode(a128) AND plo_1 THEN
    tov_index_1 := 0;
    tov_index_2 := - float_1;
    prelude_request(v_prel);
    set_offsts;
    plo_1 := false;
    put_save_bool(plo_1, 30);
  ELSIF automcode(a129) AND NOT plo_1 AND NOT plo_2 THEN
    tov_index_1 := 2;
    tov_index_2 := float_1;
    prelude_request(v_prel);
    set offsts;
```

```
    default_plo1 := false;
    put_save_bool(default_plo1, 32);
    plo_2 := true;
    put_save_bool(plo_2, 31);
  ELSIF automcode(a130) AND plo_2 THEN
    tov_index_1 := 2;
    tov_index_2 := - float_1;
    prelude_request(v_prel);
    set_offsts;
    plo_2 := false;
    put_save_bool(plo_2, 31);
  END IF;
  FOR index IN a127..a130 LOOP
    automcode(index) := false;
  END LOOP;

END check_plo;
-------------------------------------------------------------------
-- ****************************************************************
-- * THIS PROCEDURE IS USED TO INTERFACE THE AUTOMATION MCL       *
-- ****************************************************************
PROCEDURE set_offsts IS

temp_float_1      : float;
temp_float_2      : float;

BEGIN

  p_val(68 + tov_index_1);
  temp_float_1 := t_val * tov_index_2;
  p_val(69 + tov_index_1);
  temp_float_2 := t_val * tov_index_2;
  FOR index IN 1..tov_size LOOP
    response := tbl_add_float(tro, 1, index, temp_float_1);
    response := tbl_add_float(tlo, 1, index, temp_float_2);
  END LOOP;
  prelude_req_off(v_prel);

END set_offsts;
-------------------------------------------------------------------
-- ****************************************************************
-- * THIS PROCEDURE IS USED TO INTERFACE THE AUTOMATION MCL       *
-- * TO THE OPERATING MCL AND CONTAINS OTHER MISC FUNCTIONS       *
-- * THAT APPLY TO THE AUTOMATION TASKS IN GENERAL.               *
-- ****************************************************************
PROCEDURE inter_face IS

BEGIN

  IF lrise(seatd_on_trns) OR                                  --PLATE DEBOUNCE
     (NOT ldin(seatd_on_trns) AND plate_tra AND NOT check_bounce) THEN
    start_timer(verify_time_tmr, 200);
    check_bounce := true;
  ELSIF NOT timer_running(verify_time_tmr) THEN
    plate_tra := ldin(seatd_on_trns) AND NOT delay_plate_tra;
    check_bounce := false;
  END IF;
  plate_que := ldin(seatd_on_que);
  load_button_on := rdin(plate_agv_pb);
  plate_mac := prt_on_mach;
  rdout(56) := load_light;
  xgr_park := (pc_state = 0);
  plate_ok := (ld_state = ld_standby) AND
              ((unld_state = unld_standby) OR (file_proc = 1)) AND
              (mdi_state = standby);
  IF host_available AND trans_action = 0 AND buffer_trans /= 0 THEN
    trans_action := buffer_trans;
    buffer_trans := 0;
    dnc_bool(trans_report) := true;
  ELSIF NOT host_available AND buffer_trans /= 0 THEN
    buffer_trans := 0;
  END IF;
  IF m_ldtr_init THEN
```

```
  buffer_trans := 1;
  pc_state := 5;
  cyc_actv := 501;
  m_ldtr_init := false;
ELSIF automcode(a502) THEN
  buffer_trans := 3;
  pc_state := 5;
  cyc_actv := 502;
  automcode(a502) := false;
ELSIF automcode(a503) THEN
  buffer_trans := 2;
  pc_state := 5;
  cyc_actv := 503;
  automcode(a503) := false;
ELSIF automcode(a505) THEN
  buffer_trans := 4;
  prog_try_out := false;
  pc_state := 5;
  cyc_actv := 505;
  automcode(a505) := false;
END IF;

IF als_light THEN
  rdout(cyc_start_light) := true;
END IF;
IF flash_al OR (pkup_exp AND NOT host_available) THEN
  ldout(36) := rdout(41);
ELSE
  ldout(36) := rdout(cyc_start_light);
END IF;

IF nc_status(cyc_start_lt_on) AND NOT inhibit_ref THEN      --INHIBIT REF
  inhibit_ref := true;
END IF;

                                                             --INHIBIT MANUAL
IF nc_status(cyc_start_lt_on) AND (mcl_state = mcl_auto) THEN
  inh_man := true;
ELSIF inh_man THEN
  inh_man := false;
END IF;

IF rdout(mpg_light) AND NOT one_time_flag THEN               --TEST LIGHTS
  FOR index IN 1..40 LOOP
    rdout(index) := true;
  END LOOP;
  one_time_flag := true;
ELSIF one_time_flag AND NOT rdin(mpg_button) THEN
  FOR index IN 1..40 LOOP
    rdout(index) := false;
  END LOOP;
  IF clear_initiate = success THEN
    one_time_flag := false;
    rdout(manual_light) := true;
  END IF;
END IF;
                                                             --CLEAR LOST TIME
IF rrise(cycle_start) AND cim_time > cim_monitor THEN
  FOR index IN 1..6 LOOP
    IF cim_fault(index) THEN
      IF cim_fault(1) THEN
        FOR i IN 1..5 LOOP
          kill_msg(6850 + i);
        END LOOP;
        kill_msg(6859);
      END IF;
      IF cim_fault(2) THEN
        kill_msg(6856);
        kill_msg(6857);
        kill_msg(6864);
```

```
      END IF;
      cim_fault(index) := false;
      IF index = 2 OR index = 5 THEN
        var_dwn;
      ELSE
        cnt_dwn;
      END IF;
    END IF;
  END LOOP;
END IF;

END inter_face;
------------------------------------------------------------------------
-- ***************************************************************
-- *    IF THE HOST IS NOT AVAILABLE AND THE AUTOMATION MCL      *
-- * IS RUNNING THEN THIS PROCEDURE WILL STORE THE PLATE CONFIG *
-- * FILE IN MSU MEMORY WHEN PART IS PICKED UP BY THE AGV,       *
-- * UNTIL HOST CAN UPLOAD AND DELETE FILES. IF FILES STORED     *
-- * EXCEDES 100 THEN PROCEDURE WILL WRITE OVER OLDEST FILE.     *
-- ***************************************************************
PROCEDURE store_file IS

hold_num         : str10;

BEGIN

  CASE storage IS
    WHEN store_wait =>
      IF pkup_exp THEN
        storage := store_start;
      END IF;

    WHEN store_start =>
      IF NOT plate_tra THEN
        IF find_trans THEN
          IF tran_num = 4 THEN
            p_val(145);
            IF t_val > float_100 THEN
              enum_resp := parameter_change(145, float_1);
            ELSE
              f_to_c(t_val, 10, 0, 1, hold_num);
              IF host_available THEN
                storage := store_wait;
              ELSE
                FOR i IN 0..1 LOOP
                  IF hold_num(9 - i) = ' ' THEN
                    hold_num(9 - i) := '0';
                  END IF;
                  hold_name(6 - i) := hold_num(9 - i);
                END LOOP;
                  storage := store_name;
              END IF;
            END IF;
          ELSE
            storage := store_cmplt;
          END IF;
        END IF;
      END IF;

    WHEN store_name =>
      IF file_command = command_standby THEN
        str_set(1, 7);

        dupfle := false;
        str_name := hold_name;
        file_command := rename;
        storage := store_cmplt;
      END IF;

    WHEN store_cmplt =>
      IF file_command = no_file THEN
        file_command := command_standby;
```

```
      ELSIF dupfle THEN
        p_msg(6845, 6);
        dupfle := false;
        storage := store_wait;
      ELSE
        k_msg(6845);
        p_val(145);
        enum_resp := parameter_change(145,(t_val + float_1));
        storage := store_wait;
      END IF;
  END CASE;

END store_file;
---------------------------------------------------------------------------
-- **************************************************************
-- * THIS FUNCTION WILL MOVE A PROGRAMABLE AXIS FROM THE MCL    *
-- **************************************************************
FUNCTION ax_move(abs_move: boolean;
                 ax_par: integer) RETURN boolean IS

status            : boolean;

BEGIN

  status := false;
  CASE move_state IS
    WHEN move_1 =>
      IF abs_move THEN  --MOVE PROG AXIS
        IF axis_move_abs(ax_par, psn_par, rate_par) = success THEN
          move_state := move_2;
        END IF;
      ELSE  --MOVE MCL AXIS
        IF axis_move_forced(ax_par, dir_neg, rate_par, shortest_dist) =
           success THEN
          move_state := move_2;
        END IF;
      END IF;

    WHEN move_2 =>
      IF ax_status_ok(ax_par) THEN
        status := true;
        move_state := move_1;
      END IF;
  END CASE;

  RETURN status;

END ax_move;
---------------------------------------------------------------------------
-- **************************************************************
-- * THIS FUNCTION WILL RETURN THE STATUS OF A PROGRAMABLE AXIS *
-- **************************************************************
FUNCTION ax_status_ok(ax_nbr: integer) RETURN boolean IS

status            : boolean;

BEGIN
  status := false;
  CASE axis_status(ax_nbr) IS

    WHEN request_pending | request_accepted =>
      test_integer := 1;

    WHEN request_rejected | action_cancelled =>
      test_integer := 2;

    WHEN action_complete =>
      status := true;
  END CASE;

  RETURN status;

END ax_status_ok;
---------------------------------------------------------------------------
END atmlib;
```

```
-- ***************************************************************
-- *                                                             *
-- * SOFTWARE BY DAN GARAFOLA (A&ES) FOR                         *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

WITH wndone;   USE wndone;

PACKAGE blkdlt IS

TYPE beop_states IS (beop_standby, make_strl, beop_done);
beop_state        : beop_states := beop_standby;

TYPE blkdlt_states IS (blk_standby, blk_start, blk_search,
                       blk_set_1, blk_set, blk_clr, blk_cyc);
blk_dlt_state     : blkdlt_states := blk_standby;

TYPE com_sts IS (comp, convert, chk_hr);
com_st            : com_sts := comp;

als_light         : boolean := false;
etso_again        : boolean := false;
m_set             : boolean := false;
part_count        : integer := 0;
hr_ret            : integer := 0;
prog_str          : string(1..67);
act_blkdlt        : string(1..9);
misc_str          : string(1..20);

PROCEDURE blkdlt_clear;
PROCEDURE blkdlt_main;
PROCEDURE clear_tov;
FUNCTION compare RETURN boolean;  --COMPARES OLD TIME AND DATE WITH THE CURR
ENT ONE
FUNCTION blkdlt_eop RETURN boolean;  -- RUNS END OF PROGRAM TASK

END blkdlt;

-- ***************************************************************
-- *                                                             *
-- * SOFTWARE BY DAN GARAFOLA (A&ES) FOR                         *
-- * AIRCRAFT ENGINE BUSINESS GROUP / GENERAL ELECTRIC COMPANY   *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- * PROPERTY OF THE AIRCRAFT ENGINE BUSINESS GROUP OF THE       *
-- * GENERAL ELECTRIC COMPANY.                                   *
-- *                                                             *
-- ***************************************************************
```

```
-- ***************************************************************
-- * PACKAGE DESCRIPTION :  BLKDLT.PCL                            *
-- *                                                             *
-- *     THIS PACKAGE CONTAINS THREE MAIN PROCEDURES :           *
-- *                                                             *
-- * BLKDLT_MAIN ;                                               *
-- *    IF THE LAST TIME THE CURRENT PROGRAM WAS RUN IS WITHIN   *
-- * THE TIME INTERVAL IN MSD INTEGER 165 THEN THE BLOCK DELETES*
-- * SPECIFIED IN PARAMETER # 118 WILL BE TURNED ON.  IF NOT     *
-- * THEN ALL BLOCK DELETES ARE CLEARED.                         *
-- *    AFTER THE BLOCK DELETES ARE SET AND THE AUTOMATION MCL   *
-- * IS IN READY AUTO MODE THEN CYCLE START IS AUTOMATICALLY     *
-- * ACTIVATED ELSE A MESSAGE WILL ASK THE OPERATOR TO ACTIVATE *
-- * CYCLE START.                                                *
-- *                                                             *
-- * COMPARE ;                                                   *
-- *    THIS PROCEDURE RECEIVES A TIME AND DATE FROM THE MCL     *
-- * AND COMPARES IT TO THE CURRENT TIME AND DATE AND CALCULATES*
-- * THE AMOUNT OF HOURS THAT HAVE PASSED BETWEEN THE TWO TIMES.*
-- *                                                             *
-- * BLKDLT_EOP ;                                                *
-- *    THIS PROCEDURE UPDATES THE RECENTLY RUN PROGRAM FILE     *
-- * (PROGRM.MCL) WITH THE PROGRAM I.D.,  PARAMETER # 118, PART *
-- * COUNT,  CURRENT TIME,  AND THE PROGRAM DESCRIPTION OF THE  *
-- * PART JUST COMPLETED.                                        *
-- *                                                             *
-- ***************************************************************

WITH clock;    USE clock;
WITH wndone;   USE wndone;
WITH mcldat;   USE mcldat;
WITH mcllib;   USE mcllib;
WITH oemdec;   USE oemdec;
WITH wndtwo;   USE wndtwo;
WITH wndmth;   USE wndmth;
WITH wndstd;   USE wndstd;
WITH rel6;     USE rel6;
WITH rel7;     USE rel7;
WITH bubdec;   USE bubdec;
WITH ptchk;    USE ptchk;
WITH atmlib;   USE atmlib;
WITH menu;     USE menu;
WITH qcont;    USE qcont;


PACKAGE BODY blkdlt IS


set_ptr           : integer := 0;
clr_ptr           : integer := 0;
param_int         : integer := 0;
n_mon             : integer := 0;
o_mon             : integer := 0;
cur_time          : integer := 0;
cur_year          : integer := 0;
cur_day           : integer := 0;
dlt_num           : integer := 0;
man_blkdlt        : string(1..14);
new_blkdlt        : string(1..14);
old_prog          : str6;
cnt_chr           : string(1..5);
hold_str          : string(1..3);
cur_mon           : string(1..3);
blk_str           : string(1..9);
fifth_part        : string(33..39);
-----------------------------------------------------------------------
PROCEDURE blkdlt_clear IS
```

```
BEGIN

  etso_again := false;
  blk_str := "123456789";
  month_str := "JANFEBMARAPRMAYJUNJULAUGSEPOCTNOVDEC";
  blk_dlt_state := blk_standby;
  com_st := comp;
  set_ptr := 0;
  clr_ptr := 0;

END blkdlt_clear;
--------------------------------------------------------------------
PROCEDURE clear_tov IS

BEGIN

    turn_off_blkdlt(191);
    response := tbl_clear(tlo, 1);
    response := tbl_clear(tro, 1);
    FOR i IN 52..62 LOOP
      enum_resp := parameter_change(i, float_0);
    END LOOP;

END clear_tov;
--------------------------------------------------------------------
FUNCTION compare RETURN boolean is                   -- COMPARES TIME AND DATE

status : boolean;

BEGIN

  status := false;
  CASE com_st IS
    WHEN comp =>
      date;
      cur_date := time;
      c_to_i(cur_date, 1, 2, cur_day);
      c_to_i(cur_date, 8, 4, cur_year);
      c_to_i(cur_date, 13, 2, cur_time);
      FOR index IN 1..3 LOOP
        cur_mon(index) := cur_date(index + 3);
      END LOOP;
      com_st := convert;
    WHEN convert =>
      FOR index IN 1..12 LOOP
        FOR i IN 0..2 LOOP
          hold_str(3 - i) := month_str((index * 3) - i);
        END LOOP;
        IF cur_mon = hold_str THEN
          n_mon := tbl_val_int(cust, hr, index);
        END IF;
        IF old_mon = hold_str THEN
          o_mon := tbl_val_int(cust, hr, index);
        END IF;
      END LOOP;
      com_st := chk_hr;
    WHEN chk_hr =>
      IF (cur_year - old_year /= 0) THEN
        hr_ret := (((((cur_year - old_year) * 8760) - o_mon) -
                    ((old_day - 1) * 24)) - old_time) +
                    (n_mon + ((cur_day - 1) * 24) + cur_time);
        com_st := comp;
      ELSE
        hr_ret :=(n_mon + ((cur_day - 1) * 24) + cur_time) -
          (o_mon + ((old_day - 1) * 24) + old_time);
        com_st := comp;
      END IF;
      status := true;
  END CASE;

  RETURN status;

END compare;
--------------------------------------------------------------------
```

```
FUNCTION blkdlt_eop RETURN boolean IS

status : boolean;

BEGIN

  status := false;
  CASE beop_state IS
    WHEN beop_standby =>                                              --STATE 0
      FOR index IN REVERSE 2..12 LOOP
        tbl_val_char(cust, prog_1, index - 1, misc_str);
        response := tbl_chg_char(cust, prog_1, index, misc_str);
        tbl_val_char(cust, prog_2, index - 1, misc_str);
        response := tbl_chg_char(cust, prog_2, index, misc_str);
        tbl_val_char(cust, prog_3, index - 1, prog_str);
        response := tbl_chg_char(cust, prog_3, index, prog_str);
        tbl_val_char(cust, prog_4, index - 1, prog_str);
        response := tbl_chg_char(cust, prog_4, index, prog_str);
        tbl_val_char(cust, prog_5, index - 1, prog_str);
        response := tbl_chg_char(cust, prog_5, index, prog_str);
      END LOOP;
      clm_index := 2;
      beop_state := make_str1;

    WHEN make_str1 =>                                                 --STATE 1
      FOR i IN 1..6 LOOP
        misc_str(i) := prgrm_id(i);
      END LOOP;
      f_to_c(parameter_value(118), 14, 0, 1, new_blkdlt);
      FOR i IN 1..9 LOOP
        misc_str(i + 7) := new_blkdlt(i + 4);
      END LOOP;
      i_to_c(part_count, 5, 1, cnt_chr);
      FOR i IN 1..5 LOOP
        IF cnt_chr(i) = ' ' THEN
          cnt_chr(i) := '0';
        END IF;
      END LOOP;

      FOR i IN 0..2 LOOP
        misc_str(i + 18) := cnt_chr(i + 3);
      END LOOP;
      misc_str(7) := ' ';
      misc_str(17) := ' ';
      date;
      FOR i IN 33..39 LOOP
        fifth_part(i) := plate_serial_no(i);
      END LOOP;
      response := tbl_chg_char(cust, prog_1, 1, misc_str);
      response := tbl_chg_char(cust, prog_2, 1, time);
      response := tbl_chg_char(cust, prog_3, 1, part_descrip);
      response := tbl_chg_char(cust, prog_4, 1, plate_serial_no);
      response := tbl_chg_char(cust, prog_5, 1, fifth_part);
      beop_state := beop_done;

    WHEN beop_done =>                                                 --STATE 2
      status := true;
      blk_dlt_state := blk_standby;
      set_ptr := 0;
      clr_ptr := 0;
      beop_state := beop_standby;
  END CASE;

RETURN status;

END blkdlt_eop;
------------------------------------------------------------------------------
PROCEDURE blkdlt_main IS
```

```
BEGIN

  CASE blk_dlt_state IS
    WHEN blk_standby =>                            --MANUAL BLOCK DELETES SET
      IF man_bl_flag AND nc_status(cyc_start_lt_on) THEN
        k_msg(6833);
        man_bl_flag := false;
      END IF;
      IF automation_opt AND rrise(56) THEN
        IF NOT rdout(blk_del_light) THEN
          p_val(118);
          IF t_val < 1.0 THEN
            put_msg(6861, 5, 3);
          END IF;
          f_to_c(t_val, 14, 0, 1, man_blkdlt);
          FOR i IN 1..9 LOOP
            act_blkdlt(i) := man_blkdlt(4 + i);
          END LOOP;
          blk_dlt_state := blk_set_1;
          m_set := true;
          prelude_request(ptmgmt_lude);
        ELSE
          FOR i IN 1..9 LOOP
            enum_resp := block_delete_off(i);
          END LOOP;
          rdout(blk_del_light) := false;
        END IF;
      END IF;

    WHEN blk_start =>
      p_msg(6820, 6);
      IF privilege_select(0) THEN
        blk_dlt_state := blk_search;
      END IF;

    WHEN blk_search =>
       FOR index IN 1..12 LOOP
         tbl_val_char(cust, prog_1, index, misc_str);
         FOR i IN 1..6 LOOP
           old_prog(i) := misc_str(i);
         END LOOP;
         IF prog_id = old_prog THEN
           c_to_i(misc_str, 18, 3, part_count);
           put_save_int(part_count, 20);
           FOR i IN 1..9 LOOP
             act_blkdlt(i) := misc_str(i + 7);
           END LOOP;
           tbl_val_char(cust, prog_2, index, cur_date);
           c_to_i(cur_date, 1, 2, old_day);
           c_to_i(cur_date, 8, 4, old_year);
           c_to_i(cur_date, 13, 2, old_time);
           FOR i IN 1..3 LOOP
             old_mon(i) := cur_date(i + 3);
           END LOOP;
           blk_dlt_state := blk_set_1;
           IF etso_again THEN
             act_blkdlt(8) := '1';
             misc_str(15) := '1';
             misc_str(16) := '0';
             response := tbl_chg_char(cust, prog_1, index, misc_str);
           END IF;
           exit;
         ELSIF index = 1 AND NOT etso_again THEN
           etso_again := true;
           enum_resp := parameter_change(118, float_10);
         ELSIF index = 12 THEN
           etso_again := false;
           part_count := 0;
           put_save_int(part_count, 20);
           clr_ptr := 0;
           blk_dlt_state := blk_clr;
         END IF;
       END LOOP;
```

```
  WHEN blk_set_1 =>
    IF m_set OR compare THEN
      param_int := msd_int_table(165);
      IF (hr_ret > param_int) AND NOT m_set THEN
        clr_ptr := 0;
        blk_dlt_state := blk_clr;
      ELSE
        set_ptr := 0;
        blk_dlt_state := blk_set;
      END IF;
    END IF;

  WHEN blk_set =>                                              --STATE 4
    set_ptr := set_ptr + 1;
    IF set_ptr > 9 THEN
      IF etso_again THEN
        etso_again := false;
        clear_tov;
      END IF;
      IF m_set THEN
        m_set := false;
        prelude_req_off(ptmgmt_lude);
        blk_dlt_state := blk_standby;
      ELSE
        blk_dlt_state := blk_cyc;
      END IF;
    ELSE
      IF act_blkdlt(10 - set_ptr) = '0' OR
         act_blkdlt(10 - set_ptr) = ' ' THEN
        enum_resp := block_delete_off(set_ptr);
      ELSE
        rdout(blk_del_light) := true;
        enum_resp := block_delete_on(set_ptr);
      END IF;
    END IF;

  WHEN blk_clr =>                                              --STATE 5
    rdout(blk_del_light) := false;
    clr_ptr := clr_ptr + 1;
    IF clr_ptr > 9 THEN
      blk_dlt_state := blk_cyc;
      clear_tov;
    ELSE
      enum_resp := block_delete_off(clr_ptr);
    END IF;

  WHEN blk_cyc =>                                              --STATE 6
    als_light := false;
    k_msg(6820);
    IF man_bl_flag THEN
      p_msg(6833, 6);                   -- TO TELL OPERATOR TO CHECK
      blk_dlt_state := blk_standby;
    ELSE
      CASE cyc_start_init IS
        WHEN success =>
          blk_dlt_state := blk_standby;
        WHEN others =>
          NULL;
      END CASE;
    END IF;
  END CASE;

END blkdlt_main;
----------------------------------------------------------------------
END blkdlt;
```

```
-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

--MSD BOOLEAN #141     TOOL MGT OPTION
--MSD BOOLEAN #142     BAR CODE READER
--MSD BOOLEAN #143     MACHINE TOOL MONITOR OPTION
--MSD BOOLEAN #144     TOOL LIFE OPTION
--MSD BOOLEAN #145     TOOL MAGAZINE OPTION

WITH wndone;   USE wndone;
WITH mcldat;   USE mcldat;
WITH rel6;     USE rel6;
WITH rel7;     USE rel7;

PACKAGE bubdec IS

                         --THE FOLLOWING ITEMS RELATE TO THE BUBBLE MCL

TYPE file_commands IS (command_standby, get_data, rename, g_str,
                       g_data, p_str, p_data, trans_to_table,
                       trans_to_file, date_file, record_qc_data,
                       verfy_to_table, verfy_to_file, copy_file,
                       no_file, clear_transfer, delete_a_file);
file_command      : file_commands := command_standby;
buffer_string     : string(1..67);     --STRING HOLDING DATA TAKEN FROM FILE
dec_pt            : integer := 0;      --NUM OF DIGITS AFTER DEC POINT
done              : boolean := false;
dupfle            : boolean := false; --DUPLICATE FILE EXISTS
item1_flt         : float := 0.0;      --FLOAT VALUE OF 1ST ITEM
item1_int         : integer := 0;      --INTEGER VALUE OF 1ST ITEM
item1_is_int      : boolean := false; --WHETHER 1ST ITEM IS INTEGER OR FLOAT

item1_lgt         : integer := 0;      --LENGTH OF ITEM1
item1_loc         : integer := 0;      --LOCATION OF ITEM1
item1_rec         : integer := 0;      --RECORD NO OF ITEM
item1_str         : string (1..67);    --STRING VALUE OF 1ST ITEM
nm_lgt            : CONSTANT integer := 10;--NUMBER OF CHAR IN NAME LGT
number            : integer := 0;      --NUMBER OF FILE THAT IS OPEN
old_lgt           : constant integer := 10;--NUMBER OF CHAR IN OLD NAME

str_name          : str10;             --NAME OF FILE
str_old_name      : str10;             --OLD NAME OF BUBMCL FILE;
tbl_ptr           : integer := 0;      --DATA MGT TABLE INDEX
insert_line       : integer := 37;     --DATA MGT FILE INDEX
tool_count        : integer := 0;      --NUMBER OF TOOLS FOUND

--THE FOLLOWING ITEMS RELATE TO THE TOOL CONTROL
broken_tool       : boolean := false; --BROKEN TOOL FLAG
magazine_size     : integer;           --SIZE OF TOOL MAGAZINE
next_part         : boolean := false; --NO TOOLS FOR NEXT PART FLAG
reqd_life         : float := 0.0;      --LIFE THAT IS REQUIRED OF TOOL
host_req_mag      : boolean := false; --HOST REQUESTS MAG EXCHANGE
tool_mag_req      : boolean := false; --REQUEST FOR A TOOL MAGAZINE
tool_to_get       : boolean := false; --TOOL HAS BEEN PRESELECTED
turret_size       : integer;           --NUMBER OF TURRET FACES
```

```
t_index              : integer := 0;       --T TABLE INDEX
t_req                : integer := 0;       --TURRET FACE REQUESTED
t_off                : integer := 0;       --TOOL OFFSET NUMBER
t_type               : integer := 0;       --T TOOL TYPE
v_index              : integer := 0;       --V TABLE INDEX
v_life               : float := 0.0;       --LIFE IN V CODE
v_tbl_size           : integer;            --MAX NO. OF ITEMS IN V-CODE TABLES
v_type               : integer := 0;       --V TOOL TYPE

--THE FOLLOWING ITEMS RELATE TO HOST OPERATION
command_request      : integer := 0;       --DNC ACTION REQUEST
data_request         : integer := 0;       --DNC DATA REQUEST
delete_putran        : boolean := false;
delete_config        : boolean := false;
host_ack             : boolean := false;   --HOST ACKNOWLEDGEMENT
host_available       : boolean := false;   --HOST ON LINE FLAG

--THE FOLLOWING ITEMS RELATE TO MSD OPTIONS*************************
tool_life_opt        : boolean;            --TOOL LIFE OPTION
tool_mag_opt         : boolean;            --TOOL MAGAZINE OPTION
tool_mgt_opt         : boolean;            --TOOL MANAGEMENT OPTION
automation_opt       : boolean;            --AUTOMATION FEATURES OPTION
cause_code_opt       : boolean;            --TURNS ON CAUSE CODES

--THE FOLLOWING ITEMS RELATE TO DATA MANAGEMENT*********************
clm_index            : integer := 2;       --INDEX FOR CLM DATA FILE
num_of_pts           : integer := 1;       --NUMBR OF PTS ON PLATE
plate_index          : integer := 1;       --POINTER FOR QC DATA
data_in_tbl          : boolean := false;   --DATA IN QC TABLES
tbl_limit            : integer;            --NO OF ITEMS IN QC TABLES
tool_thing           : string(1..8);       --NEW FILE
zone_tbl_str         : string(1..11);      --ZONE TABLE STRING
part_descrip         : string(1..32);      --PART DESCRIPTION

proj_plate_no        : string(1..8);       --PROJECT PLATE NO
plate_serial_no      : string(1..39);      --PLATE SERIAL NO
prgrm_id             : string(1..6);       --PROGRAM ID NO

--THE FOLLOWING ARE MISC FLAGS
bar_code_read_ok     : boolean := false;   --STATUS OF BAR CODE THAT WAS READ
code_was_read        : boolean := false;   --BAR CODE WAS READ
d_type               : table_data_type;
state                : io_status_enum;
tble_status          : table_status;       --TABLE STATUS RETURN
su_flag              : boolean := true;    --START UP FLAG
pkup_exp             : boolean := false;
deliv_exp            : boolean := false;

bubmcl_cancel        : boolean := false;   --CANCEL FLAG FOR BUBBLE MCL
cim_fault            : array (1..20) of boolean;

--THE FOLLOWING CONSTANTS LOCATE ITEMS IN THE MCL FILES. THESE
--CONSTANTS WILL HAVE TO BE CHANGED IF THE FORMAT OF THE MCL FILES
--IS CHANGED.

                       -- PROJECT PLATE FILE
ws_id_lgt            : CONSTANT integer := 06;
ws_id_rnm            : CONSTANT integer := 02;
nor_rew_lgt          : CONSTANT integer := 03;
nor_rew_rnm          : CONSTANT integer := 03;
pr_id_lgt            : CONSTANT integer := 06;
pr_id_rnm            : CONSTANT integer := 04;
pr_desc_lgt          : CONSTANT integer := 09;
pr_desc_rnm          : CONSTANT integer := 05;

op_numb_lgt          : CONSTANT integer := 03;
op_numb_rnm          : CONSTANT integer := 06;
pr_stat_lgt          : CONSTANT integer := 03;
pr_stat_rnm          : CONSTANT integer := 07;
apprv_qty_lgt        : CONSTANT integer :  03:
apprv_qty_rnm        : CONSTANT integer := 08;
apprv_ct_lgt         : CONSTANT integer := 03;
apprv_ct_rnm         : CONSTANT integer := 09;
```

```
ct_int_lgt          : CONSTANT integer := 03;
ct_int_rnm          : CONSTANT integer := 10;
verf_in_lgt         : CONSTANT integer := 03;
verf_in_rnm         : CONSTANT integer := 11;
pr_limit_lgt        : CONSTANT integer := 03;
pr_limit_rnm        : CONSTANT integer := 12;
start_date_rnm      : CONSTANT integer := 13;
fin_date_rnm        : CONSTANT integer := 14;

lt_min_rnm          : CONSTANT integer := 15;
lt_mes_rnm          : CONSTANT integer := 16;
cim_tm_pt_rnm       : CONSTANT integer := 17;
rwk_tm_pt_rnm       : CONSTANT integer := 18;
variance_rnm        : CONSTANT integer := 19;
sn_lgt              : CONSTANT integer := 08;
sn_1_rnm            : CONSTANT integer := 21;
sn_2_rnm            : CONSTANT integer := 24;

sn_3_rnm            : CONSTANT integer := 27;
sn_4_rnm            : CONSTANT integer := 30;
sn_5_rnm            : CONSTANT integer := 33;
wp_status_lgt       : CONSTANT integer := 03;
wp_status1_rnm      : CONSTANT integer := 22;
wp_status2_rnm      : CONSTANT integer := 25;
wp_status3_rnm      : CONSTANT integer := 28;
wp_status4_rnm      : CONSTANT integer := 31;
wp_status5_rnm      : CONSTANT integer := 34;

zone_lgt            : CONSTANT integer := 09;
zone_loc            : CONSTANT integer := 01;
prb_id_lgt          : CONSTANT integer := 08;
prb_id_loc          : CONSTANT integer := 12;
mn_lgt              : CONSTANT integer := 08;
mn_loc              : CONSTANT integer := 21;
mx_lgt              : CONSTANT integer := 08;
mx_loc              : CONSTANT integer := 29;

act_lgt             : CONSTANT integer := 08;
act_loc             : CONSTANT integer := 37;
dev_lgt             : CONSTANT integer := 07;
dev_loc             : CONSTANT integer := 46;
oot_lgt             : CONSTANT integer := 07;
oot_loc             : CONSTANT integer := 54;
str_loc             : CONSTANT integer := 61;

cause_lgt           : CONSTANT integer := 04;
cause_loc           : CONSTANT integer := 62;
plate_loc           : CONSTANT integer := 18;
                  --TOOL MAGAZINE FILE
type_lgt            : CONSTANT integer := 04;
type_loc            : CONSTANT integer := 06;
loc_lgt             : CONSTANT integer := 03;
loc_loc             : CONSTANT integer := 16;
xos_lgt             : CONSTANT integer := 09;
xos_loc             : CONSTANT integer := 21;

zos_lgt             : CONSTANT integer := 09;
zos_loc             : CONSTANT integer := 31;
life_lgt            : CONSTANT integer := 08;
life_loc            : CONSTANT integer := 41;
ser_lgt             : CONSTANT integer := 04;
ser_loc             : CONSTANT integer :- 51;
                       --MISC
type_size           : CONSTANT integer := 999;
clmrlg              : CONSTANT integer := 20;
rlg                 : CONSTANT integer := 67;

--THE FOLLOWING CONSTANTS DEFINE THE VARIOUS TABLES IN THE
--AUTOMATION MCL.
```

```
cim                : CONSTANT integer := 1; --CIM TIME TABLE
msg                : CONSTANT integer := 2; --LOST TIME MESSAGE NO
var                : CONSTANT integer := 3; --VARIANCE TIME MESSAGES
-- TABLE 4 IS NAME OF ITEM IN SOFTWARE CONFIGURATION TABLES
-- TABLE 5 IS REVISION NUMBER IN SOFTWARE CONFIGURATION TABLES
-- TABLE 6 IS DATE OF REVISION IN SOFTWARE CONFIGURATION TABLES
vtype              : CONSTANT integer := 7;  --TABLE OF TOOL LIST TYPES
p178               : CONSTANT integer := 8;  --TABLE OF PAR 178 VALUES

p181               : CONSTANT integer := 9;  --TABLE OF PAR 181 VALUES
serial             : CONSTANT integer := 10; --TABLE OF TOOL SERIAL NUMBERS
ptqty              : CONSTANT integer := 11; --PART QUANTITY
verify_a           : CONSTANT integer := 12; --VERIFICATION TABLE
verify             : CONSTANT integer := 13; --VERIFICATION TABLE
zone               : CONSTANT integer := 14; --DATA POINTS CLASSIFICATION
mn                 : CONSTANT integer := 15; --MINIMUM DIMENSION OF POINT
mx                 : CONSTANT integer := 16; --MAXIMUM DIMENSION OF POINT

act                : CONSTANT integer := 17; --ACTUAL DIMENSION OF POINT
dev                : CONSTANT integer := 18; --DEVIATION OF POINT
oot                : CONSTANT integer := 19; --OUT OF TOLERENCE
tool_dt            : CONSTANT integer := 20; --PROBE DATA
cause_code         : CONSTANT integer := 21; --CAUSE CODE TABLE
star               : CONSTANT integer := 22; --OUT OF TOLERANCE
mtype              : CONSTANT integer := 23; --TOOL FILE TYPE TBL
stat               : CONSTANT integer := 24; --TOOL FILE READ TABLE

ser                : CONSTANT integer := 25; --TOOL SERIAL NUM IN TOOL FILE
mrad               : CONSTANT integer := 26; --TOOL FILE LENGTH OFF
mlgt               : CONSTANT integer := 27; --TOOL FILE RADIUS OFF
mlfe               : CONSTANT integer := 28; --TOOL FILE TOOL LIFE TBL
rmlfe              : CONSTANT integer := 29; --TOOL FILE SCRATCH PAD TABLE
hr                 : CONSTANT integer := 30; --MONTHLY HOUR TABLE
prog_1             : CONSTANT integer := 31; --RECENTLY RUN PROGRAMS MISC
prog_2             : CONSTANT integer := 32; --RECENTLY RUN PROGRAMS TIME

prog_3             : CONSTANT integer := 33; --RECENTLY RUN PROGRAMS DISC
mat                : CONSTANT integer := 34; --SWARF MATERIAL
swrf               : CONSTANT integer := 35; --SWARF CONTAINER DATA
cause_list         : CONSTANT integer := 36; --CAUSE CODE REF LIST
-- TABLE 37 IS IDENTIFICATION NAMES FOR PARAMETER TABLE
prog_4             : CONSTANT integer := 38; --WKPC IDENT(1ST 4 PARTS)
prog_5             : CONSTANT integer := 39; --WKPC IDENT(5TH PART)

END bubdec;

-- **************************************************************
-- *                                                            *
-- * SOFTWARE BY PAUL COLANANNI (A&ES) FOR                      *
-- * AIRCRAFT ENGINE BUSINESS GROUP / GENERAL ELECTRIC COMPANY  *
-- *                                                            *
-- * THIS PROGRAM AND RELATED MATERIAL ARE THE PROPERTY OF THE  *
-- * GENERAL ELECTRIC CO. (G.E.) AND CONTAINS CONFIDENTIAL AND  *
-- * PROPRIETARY INFORMATION OF G.E. THIS PROGRAM, THE RELATED  *
-- * MATERIAL, AND THE INFORMATION CONTAINED HEREIN, SHALL NOT  *
-- * BE DISCLOSED TO OTHERS WITHOUT WRITTEN PERMISSION OF G.E., *
-- * AND SHALL NOT BE DUPLICATED OR USED EXCEPT IN ACCORDANCE   *
-- * WITH THE LIMITED CONDITIONS UNDER WHICH IT WAS PROVIDED BY *
-- * G.E.                                                       *
-- *                                                            *
-- * PROPERTY OF THE AIRCRAFT ENGINE BUSINESS GROUP OF THE      *
-- * GENERAL ELECTRIC COMPANY.                                  *
-- *                                                            *
-- **************************************************************

WITH wndone;   USE wndone;
WITH mcldat;   USE mcldat;
WITH rel6;     USE rel6;
WITH rel7;     USE rel7;

PACKAGE BODY bubdec IS

END bubdec;
```

```
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
--   PROPRIETARY INFORMATION OF G.E. THIS PROGRAM, THE RELATED    *
--   MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

PACKAGE bubmcl IS


PROCEDURE bubmcl_init;
PROCEDURE bubble_io_mcl;
PROCEDURE get_str;  --OBTAIN STRING DATA FROM FILE

END bubmcl;
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH mcldat;   USE mcldat;
WITH mcllib;   USE mcllib;
WITH wndtwo;   USE wndtwo;
WITH rel6;     USE rel6;
WITH rel7;     USE rel7;
WITH bubdec;   USE bubdec;
WITH wndbub;   USE wndbub;
WITH wndmth;   USE wndmth;
WITH oemmst;   USE oemmst;
WITH clock;    USE clock;
WITH atmlib;   USE atmlib;
WITH oemdec;   USE oemdec;
WITH tcntrl;   USE tcntrl;

PACKAGE BODY bubmcl IS

getting_data      : boolean := false;
putting_string    : boolean := false;
putting_data      : boolean := false;
respse            : table_status;
rnme_file         : boolean := false;
line_loc          : integer := 0;
clm_str           : string(1..clmrlg);
-------------------------------------------------------------------
```

```
-- ****************************************************************
-- * THIS PROCEDURE RUNS AT POWER UP TIME AND INITIALIZES THE    *
-- * VARIABLES.                                                  *
-- ****************************************************************
PROCEDURE bubmcl_init IS

BEGIN

  FOR index IN 1..10 LOOP
    str_name(index) := ' ';
    str_old_name(index) := ' ';
  END LOOP;
  FOR index IN 1..rlg LOOP
    iteml_str(index) := ' ';
    buffer_string(index) := ' ';
  END LOOP;
  clm_index := 2;
  iteml_loc := plate_loc;

END bubmcl_init;

--------------------------------------------------------------------
-- ****************************************************************
-- * THIS PROCEDURE CONVERTS A STRING TO AN INTEGER              *
-- ****************************************************************
PROCEDURE c_to_i(array_in : IN OUT string;
                 posn : IN integer;
                 quantity : IN integer;
                 result : OUT integer) IS

BEGIN

  conv_char_to_int(array_in, posn, quantity, result, done);

END c_to_i;
--------------------------------------------------------------------
-- ****************************************************************
-- * THIS PROCEDURE CONVERTS AN INTEGER TO A STRING              *
-- ****************************************************************
PROCEDURE i_to_c(int_in : IN integer;
                 width : IN integer;
                 posn : IN integer;
                 array_out : OUT string) IS

BEGIN

  conv_int_to_char(int_in, width, posn, array_out, done);

END i_to_c;
--------------------------------------------------------------------
-- ****************************************************************
-- * THIS PROCEDURE CONVERTS AN STRING TO A FLOAT                *
-- ****************************************************************
PROCEDURE c_to_f(array_in : IN OUT string;
                 posn : IN integer;
                 quantity : IN integer;
                 flt_out : OUT float) IS

BEGIN

  conv_char_to_flt(array_in, posn, quantity, flt_out, done);

END c_to_f;
--------------------------------------------------------------------
-- ****************************************************************
-- * THIS PROCEDURE CONVERTS A FLOAT TO A STRING                 *
-- ****************************************************************
PROCEDURE f_to_c(flt_in : IN float;
                 width : IN integer;
                 decpt : IN integer;
                 posn : IN integer;
                 array_out : OUT string) IS
```

```
BEGIN

  conv_flt_to_char(flt_in, width, decpt, posn, array_out, done);

END f_to_c;
--------------------------------------------------------------
-- ***************************************************************
-- * THIS PROCEDURE OPENS A FILE AND POSITIONS THE POINTER TO A *
-- * LINE.                                                       *
-- ***************************************************************
PROCEDURE file_opn(nme : IN OUT string;
                   r_num : IN integer;
                   r_lgt : IN integer) IS

BEGIN

  open_file(10, nme, number, read_write, state);
  move_file_ptr(number, record_number, r_num, r_lgt, state);

END file_opn;
--------------------------------------------------------------
-- ***************************************************************
-- * THIS PROCEDURE CLOSES A FILE                                *
-- ***************************************************************
PROCEDURE file_close IS

BEGIN

  close_file(number, state);

END file_close;
--------------------------------------------------------------
-- ***************************************************************
-- * THIS PROCEDURE OBTAINS STRING DATA, A FLOAT VALUE OR AN     *
-- * INTEGER VALUE FROM A FILE. IT WILL ALSO PUT DATA IN A FILE *
-- ***************************************************************
PROCEDURE get_str IS

BEGIN

  open_file(nm_lgt, str_name, number, read_write, state);
  IF state = ok THEN
    move_file_ptr(number, record_number, item1_rec, rlg, state);
    get_record_repos(number, rlg, buffer_string, state);
    IF rnme_file THEN
      FOR index IN 1..6 LOOP
        buffer_string(8 + index) := str_name(index);
      END LOOP;
      putting_string := true;
    END IF;
  ELSIF state = nonexistent_file THEN
    file_command := no_file;
  END IF;
  IF file_command /= no_file THEN
    IF getting_data THEN
      IF item1_is_int THEN
        c_to_i(buffer_string, item1_loc, item1_lgt, item1_int);
      ELSE
        c_to_f(buffer_string, item1_loc, item1_lgt, item1_flt);
      END IF;
      getting_data := false;
      file_command := get_data;
    ELSIF putting_string THEN
      IF NOT rnme_file THEN
        FOR index IN 1..item1_lgt LOOP
          buffer_string(item1_loc - 1 + index) := item1_str(index);
        END LOOP;
      END IF;
      put_record(number, rlg, buffer_string, state);
      putting_string := false;
      rnme_file := false;
      file_command := command_standby;
```

```
ELSIF putting_data THEN
  IF item1_is_int THEN
    i_to_c(item1_int, item1_lgt, item1_loc, buffer_string);
  ELSE
    f_to_c(item1_flt, item1_lgt, dec_pt, item1_loc, buffer_string);
  END IF;
  put_record(number, rlg, buffer_string, state);
  putting_data := false;
      file_command := command_standby;
    ELSE
      file_command := get_data;
    END IF;
  END IF;
  item1_loc := plate_loc;
  file_close;

END get_str;
--------- ------------------------------------------------------
-- ******   *****************************************************
-- * THIS PROCEDURE COPIES DATA FROM THE TOOL CONFIGURATION     *
-- * FILE TO THE MAGAZINE TABLES.                               *
-- **************************************************************
PROCEDURE file_to_table IS

loc_arr : ARRAY (0..5) OF integer;
lgt_arr : ARRAY (0..5) OF integer;

BEGIN

  loc_arr(0) := type_loc;
  loc_arr(1) := loc_loc;
  loc_arr(2) := ser_loc;
  loc_arr(3) := xos_loc;
  loc_arr(4) := zos_loc;
  loc_arr(5) := life_loc;
  lgt_arr(0) := type_lgt;
  lgt_arr(1) := loc_lgt;
  lgt_arr(2) := ser_lgt;
  lgt_arr(3) := xos_lgt;
  lgt_arr(4) := zos_lgt;
  lgt_arr(5) := life_lgt;

  str_name := "CONFIG.MCL";
  file_opn(str_name, 7, rlg);
  IF state /= ok THEN
    file_command := no_file;
  END IF;
  IF file_command /= no_file THEN
    FOR index IN 1..(magazine_size - 4) LOOP
      get_record(number, rlg, buffer_string, state);
      FOR index_1 IN 0..2 LOOP
      c_to_i(buffer_string, loc_arr(index_1), lgt_arr(index_1), item1_int);
                                                                      --TYPE
        respse := tbl_chg_int(cust, mtype + index_1, index, item1_int);
      END LOOP;
      FOR index_2 IN 3..5 LOOP
      c_to_f(buffer_string, loc_arr(index_2), lgt_arr(index_2), item1_flt);
                                                                     --X O/S
        respse := tbl_chg_float(cust, mtype + index_2, index, item1_flt);
      END LOOP;
    END LOOP;
    respse := tbl_chg_int(cust, mtype, 45, 999);
    respse := tbl_chg_int(cust, stat, 45, 10);
    file_close;
    file_command := get_data;
  END IF;

END file_to_table;
-----------------------------------------------------------------
-- **************************************************************
-- * THIS PROCEDURE COPIES DATA FROM THE TOOL MAGAZINE TABLES   *
-- * TO THE TOOL CONFIGURATION FILE.                            *
-- **************************************************************
PROCEDURE table_to_file IS
```

```
BEGIN

  str_name := "CONFIG.MCL";
  file_opn(str_name, 7, rlg);
  IF state /= OK THEN
    file_command := no_file;
  END IF;
  IF file_command /= no_file THEN
    FOR index IN 1..magazine_size LOOP
      get_record_repos(number, rlg, buffer_string, state);
 i_to_c(tbl_val_int(cust, mtype, index), type_lgt, type_loc, buffer_string);
 i_to_c(tbl_val_int(cust, stat, index), loc_lgt, loc_loc, buffer_string);
 f_to_c(tbl_val_float(cust, mrad, index), xos_lgt, 4, xos_loc, buffer_string
;
 f_to_c(tbl_val_float(cust, mlgt, index), zos_lgt, 4, zos_loc, buffer_string
;
 f_to_c(tbl_val_float(cust, mlfe, index), life_lgt, 6, life_loc, buffer_stri
g);
 i_to_c(tbl_val_int(cust, ser, index), ser_lgt, ser_loc, buffer_string);
      FOR i IN 6..9 LOOP
        IF buffer_string(i) = ' ' THEN
          buffer_string(i) := '0';
        END IF;
        IF buffer_string(i + 45) = ' ' THEN
          buffer_string(i + 45) := '0';
        END IF;
      END LOOP;
      put_record(number, rlg, buffer_string, state);
    END LOOP;
    file_instald := false;
    file_close;
    file_command := command_standby;
  END IF;

END table_to_file;
---------------------------------------------------------------------
-- *****************************************************************
-- * THIS PROCEDURE COPIES DATA FROM THE DATA TABLES AND           *
-- * AND APPENDS IT TO THE PLATE CONFIGURATION FILE                *
-- *****************************************************************
PROCEDURE qc_data IS

str : string(1..1);
loc_arr : ARRAY (0..4) OF integer;
lgt_arr : ARRAY (0..4) OF integer;
temp_int : integer;

BEGIN

  temp_int := plate_index;
  loc_arr(0) := mn_loc;
  loc_arr(1) := mx_loc;
  loc_arr(2) := act_loc;
  loc_arr(3) := dev_loc;
  loc_arr(4) := oot_loc;
  lgt_arr(0) := mn_lgt;
  lgt_arr(1) := mx_lgt;
  lgt_arr(2) := act_lgt;
  lgt_arr(3) := dev_lgt;
  lgt_arr(4) := oot_lgt;
  str_name := "MATRAN.MCL";
  file_opn(str_name, insert_line + plate_index, rlg);
  data_in_tbl := true;
  FOR index IN 1..(rlg - 1) LOOP
    IF index < 9 THEN
    buffer_string(index) := str_old_name(index);
  ELSE
    buffer_string(index) := '-';
  END IF;
 END LOOP;
 buffer_string(rlg) := cr;
```

```
put_record(number, rlg, buffer_string, state);
plate_index := plate_index + 1;
put_save_int(plate_index, 9);
FOR index IN 1..tbl_limit LOOP
  IF tbl_val_float(cust, mx, index) /= float_0 THEN
    FOR index_1 IN 1..rlg LOOP
      buffer_string(index_1) := ' ';
    END LOOP;
    tbl_val_char(cust, zone, index, zone_tbl_str);
    FOR index_1 IN 1..zone_lgt LOOP
      buffer_string(index_1) := zone_tbl_str(index_1);
    END LOOP;
    tbl_val_char(cust, tool_dt, index, tool_thing);
    FOR index_1 IN 1..prb_id_lgt LOOP
      buffer_string(prb_id_loc + index_1 - 1) := tool_thing(index_1);
    END LOOP;
    buffer_string(prb_id_loc) := '0';
    FOR index_1 IN 0..2 LOOP
      IF buffer_string(prb_id_loc + 4 + index_1) = ' ' THEN
        buffer_string(prb_id_loc + 4 + index_1) := '0';
      ELSE
        exit;
      END IF;
    END LOOP;
    FOR index_1 IN 0..4 LOOP
      f_to_c(tbl_val_float(cust, mn + index_1, index), lgt_arr
             (index_1), 4, loc_arr(index_1), buffer_string);
    END LOOP;
    tbl_val_char(cust, star, index, str);
    buffer_string(str_loc) := str(1);
    i_to_c(tbl_val_int(cust, cause_code, index), cause_lgt, cause_loc,
           buffer_string);
    buffer_string(rlg) := cr;
    put_record(number, rlg, buffer_string, state);
    IF state > ok THEN
      plate_index := temp_int;
      exit;
    END IF;
    plate_index := plate_index + 1; --PLATE INDEX RESET TO 1 IN DATE CM
    put_save_int(plate_index, 9);
  END IF;
END LOOP;
IF plate_index > temp_int THEN
  FOR index IN 1..(rlg - 1) LOOP
    buffer_string(index) := '*';
  END LOOP;
  put_record(number, rlg, buffer_string, state);
  str_name := "(END,MCL) ";
  str_name(10) := cr;
  put_record(number, 10, str_name, state);
  file_command := command_standby;
ELSE
  file_command := no_file;
END IF;
file_close;

END qc_data;
-------------------------------------------------------------------
-- ****************************************************************
-- * THIS PROCEDURE PUTS THE START OR FINISH DATES IN THE         *
-- * PLATE CONFIGURATION FILE                                     *
-- ****************************************************************
PROCEDURE add_date IS

temp_int : integer;

BEGIN

  open_file(nm_lgt, str_name, number, read_write, state);
  IF state = ok THEN
```

```
IF item1_rec = fin_date_rnm THEN
  move_file_ptr(number, record_number, start_date_rnm, rlg, state);
  FOR index IN 1..2 LOOP
    get_record_repos(number, rlg, buffer_string, state);
    tbl_val_char(cust, cim, index, time);
    FOR i IN 1..20 LOOP
      buffer_string(plate_loc - 1 + i) := time(i);
    END LOOP;
    put_record(number, rlg, buffer_string, state);
  END LOOP;
  get_record_repos(number, rlg, buffer_string, state);
  f_to_c(lost_time, 6, 3, plate_loc, buffer_string);
  put_record(number, rlg, buffer_string, state);
  get_record_repos(number, rlg, buffer_string, state);
  FOR index IN 0..7 LOOP
    temp_int := tbl_val_int(cust, msg, index + 1);
    IF temp_int /= 0 THEN
      i_to_c(temp_int, 4, plate_loc + (5 * index), buffer_string);
    ELSE
      FOR i IN (plate_loc + (5 * index))..56 LOOP
        buffer_string(i) := ' ';
      END LOOP;
      exit;
    END IF;
  END LOOP;
  i_to_c(tbl_val_int(cust, msg, 10), 1, 63, buffer_string);
  put_record(number, rlg, buffer_string, state);
  get_record_repos(number, rlg, buffer_string, state);
  f_to_c(proc_time, 6, 3, plate_loc, buffer_string);
  IF store_e THEN
    store_e := false;
    buffer_string(24) := 'E';
  END IF;
  put_record(number, rlg, buffer_string, state);
  get_record_repos(number, rlg, buffer_string, state);
  f_to_c(rework_time, 6, 3, plate_loc, buffer_string);
  put_record(number, rlg, buffer_string, state);
  get_record_repos(number, rlg, buffer_string, state);
  FOR index IN 0..7 LOOP
    temp_int := tbl_val_int(cust, var, index + 1);
    IF temp_int /= 0 THEN
      i_to_c(temp_int, 4, plate_loc + (5 * index), buffer_string);
    ELSE
      FOR i IN (plate_loc + (5 * index))..56 LOOP
        buffer_string(i) := ' ';
      END LOOP;
      exit;
    END IF;
  END LOOP;
  i_to_c(tbl_val_int(cust, var, 10), 1, 63, buffer_string);
  put_record(number, rlg, buffer_string, state);
  plate_index := 1;
  put_save_int(plate_index, 9);
ELSE
  IF NOT cim_time_on THEN
    response := tbl_chg_char(cust, cim, 1, time);
  plate_index := 1;
  put_save_int(plate_index, 9);
END IF;
part_descrip(15) := ' ';
part_descrip(16) := 'O';
part_descrip(17) := 'P';
part_descrip(18) := '.';
part_descrip(22) := ' ';
part_descrip(23) := ' ';
part_descrip(31) := ' ';
move_file_ptr(number, record_number, pr_id_rnm, rlg, state);
get_record(number, rlg, buffer_string, state);
FOR index IN 1..pr_id_lgt LOOP
  prgrm_id(index) := buffer_string(plate_loc + index - 1);
END LOOP;
```

```
      get_record(number, rlg, buffer_string, state);
      FOR index IN 1..14 LOOP
        part_descrip(index) := buffer_string(plate_loc + index - 1);
      END LOOP;
      get_record(number, rlg, buffer_string, state);
      FOR index IN 0..2 LOOP
        part_descrip(19 + index) := buffer_string(plate_loc + index);
      END LOOP;
      get_record(number, rlg, buffer_string, state);
      FOR index IN 0..7 LOOP
        part_descrip(24 + index) := buffer_string(plate_loc + index);
      END LOOP;
      move_file_ptr(number, record_number, 1, rlg, state);
      get_record(number, rlg, buffer_string, state);
      FOR index IN 1..5 LOOP
        proj_plate_no(index) := buffer_string(15 + index);
      END LOOP;
      temp_int := 1;
      FOR i IN 7..11 LOOP
        move_file_ptr(number, record_number, 3 * i, rlg, state);
        get_record(number, rlg, buffer_string, state);
        FOR index IN 0..6 LOOP
          plate_serial_no(temp_int) := buffer_string(plate_loc + index);
          temp_int := temp_int + 1;
        END LOOP;
        temp_int := temp_int + 1;
      END LOOP;
    END IF;
    file_command := command_standby;
  ELSIF state = nonexistent_file THEN
    file_command := no_file;
  END IF;
  file_close;

END add_date;
-----------------------------------------------------------------
-- **************************************************************
-- * THIS PROCEDURE COPIES DATA FROM THE VERIFY FILE TO THE     *
-- * VERIFY TABLES.                                             *
-- **************************************************************
PROCEDURE verify_to_table IS

the_strin : array (1..2) of string(1..26);
write_str : string(1..26);

BEGIN

  str_name := "VERIFY.MCL";
  file_opn(str_name, 2, rlg);
  FOR index IN 1..10 LOOP
    get_record(number, rlg, buffer_string, state);
    FOR i IN 1..26 LOOP
      the_strin(1)(i) := buffer_string(i);
      the_strin(2)(i) := buffer_string(i + 27);
    END LOOP;
    FOR i IN 0..1 LOOP
      write_str := the_strin(i + 1);
      response := tbl_chg_char(cust,(verify_a + i), index, write_str);
    END LOOP;
  END LOOP;
  file_close;
  file_command := command_standby;

END verify_to_table;
-----------------------------------------------------------------
-- **************************************************************
-- * THIS PROCEDURE COPIES DATA FROM THE VERIFY TABLE TO THE    *
-- * VERIFY FILE.                                               *
-- **************************************************************
PROCEDURE verify_to_file IS

the_strin : array (1..2) of string(1..26);
write_str : string(1..26);
```

```
BEGIN

  str_name := "VERIFY.MCL";
  file_opn(str_name, 2, rlg);
  FOR index IN 1..10 LOOP
    get_record_repos(number, rlg, buffer_string, state);
    FOR i IN 0..1 LOOP
      tbl_val_char(cust, (verify_a + i), index, write_str);
      the_strin(i + 1) := write_str;
    END LOOP;
    FOR i IN 1..26 LOOP
      buffer_string(i) := the_strin(1)(i);
      buffer_string(i + 27) := the_strin(2)(i);
    END LOOP;
    put_record(number, rlg, buffer_string, state);
  END LOOP;
  file_close;
  file_command := command_standby;

END verify_to_file;
----------------------------------------------------------------------
-- ****************************************************************
-- * THIS PROCEDURE ERASES DATA FROM THE PROJECT PLATE              *
-- * CONFIGURATION FILE.                                            *
-- ****************************************************************
PROCEDURE transf_reset IS

numb_2 : integer;

BEGIN

  IF reworking THEN
    str_old_name := "MATRAN.MCL";
  ELSE
    str_old_name := "DETRAN.MCL";
  END IF;
  str_name := "TEMPRY.MCL";
  rename_file(old_lgt, str_old_name, nm_lgt, str_name, state);
  IF state = ok THEN
    create_file(10, str_old_name, state);
    file_opn(str_name, 1, rlg);
    open_file(10, str_old_name, numb_2, read_write, state);
    FOR index IN 1..37 LOOP
      get_record(number, rlg, buffer_string, state);
      put_record(numb_2, rlg, buffer_string, state);
    END LOOP;
    str_name := "(END,MCL) ";
    str_name(10) := cr;
    put_record(numb_2, 10, str_name, state);
    file_close;
    str_name := "TEMPRY.MCL";
    delete_file(10, str_name, state);
  END IF;
  close_file(numb_2, state);
  IF reworking THEN
    file_command := command_standby;
  ELSE
    file_command := get_data;
  END IF;

END transf_reset;
----------------------------------------------------------------------
-- ****************************************************************
-- * THIS PROCEDURE COPIES MATRAN FILE INTO A PUTRAN FILE           *
-- ****************************************************************
PROCEDURE copy_a_file IS

numb_2 : integer;
```

```
BEGIN

  str_old_name := "MATRAN.MCL";
  str_name := "RWTRAN.MCL";
  create_file(10, str_name, state);
  file_opn(str_old_name, 1, rlg);
  open_file(10, str_name, numb_2, read_write, state);
  FOR index IN 1..100 LOOP
    get_record(number, rlg, buffer_string, state);
    IF state = ok THEN
      put_record(numb_2, rlg, buffer_string, state);
    ELSE
      exit;
    END IF;
  END LOOP;
  file_close;
  close_file(numb_2, state);
  file_command := clear_transfer;

END copy_a_file;
-----------------------------------------------------------------------
-- ***********************************************************
-- * THIS PROCEDURE DELTES A FILE                              *
-- ***********************************************************
PROCEDURE del_a_file IS

BEGIN

  IF delete_putran THEN
    str_name := "PUTRAN.MCL";
    delete_putran := false;
  ELSE
    str_name := "PUTRAN.MCL";
    delete_config := false;
  END IF;
  delete_file(10, str_name, state);
  file_command := command_standby;

END del_a_file;
-----------------------------------------------------------------------

-- ***********************************************************
-- * THIS PROCEDURE IS THE MAIN PROGRAM AND WILL CALL THE      *
-- * CORRECT PROCEDURE TO EXECUTE ITS FUNCTION.                *
-- ***********************************************************
PROCEDURE bubble_io_mcl IS

BEGIN

  CASE file_command IS
    WHEN command_standby =>  --WAIT FOR NEW COMMAND FROM NORMAL MCL STA.   0
      IF bubmcl_cancel THEN
        bubmcl_cancel := false;
      END IF;

    WHEN get_data =>  --NORMAL MCL WILL OBTAIN DATA FROM VARIABLES  STATE 1
      IF bubmcl_cancel then               --AND THEN RESET CASE TO STANDBY
        file_command := command_standby;
      END IF;

    WHEN rename =>                                 --RENAME A FILE   STATE 2
      rename_file(old_lgt, str_old_name, nm_lgt, str_name, state);
      IF state = ok THEN
        rnme_file := true;
        item1_rec := 1;
        get_str;
      ELSIF state = nonexistent_file THEN
        file_command := no_file;
      ELSIF state = file_exists THEN
        dupfle := true;                   --NOTIFY HOST FILE ALREADY EXISTS
        file_command := command_standby;
      END IF;
```

```
WHEN g_str =>  --OBTAIN A RECORD AND GET STRING DATA BACK        STATE 3
  get_str;                                  --TO THE NORMAL MCL

WHEN g_data =>   --OBTAIN A RECORD AND GET INTEGER OR FLOAT      STATE 4
  getting_data := true;              --DATA BACK TO THE NORMAL MCL
  get_str;

WHEN p_str =>  --PUT STRING DATA BACK INTO A RECORD              STATE 5
  putting_string := true;
  get_str;

WHEN p_data =>  --PUT INTEGER OR FLOAT DATA INTO A RECORD        STATE 6
  putting_data := true;
  get_str;

WHEN trans_to_table =>  --TRANSFER A RECORD INTO TABLES          STATE 7
  file_to_table;

WHEN trans_to_file =>  --TRANSFER TABLE DATA TO A FILE           STATE 8
  table_to_file;

WHEN date_file =>  --ADDS DATE TO PLATE CONFIGURATION FILE      STATE 9
  add_date;

WHEN record_qc_data =>  --RECORD QC DATA FROM TABLES            STATE 10
  qc_data;

WHEN verfy_to_table =>  --TRANSFERS VERIFY FILE TO TABLES       STATE 11
  verify_to_table;

WHEN verfy_to_file =>  --TRANSFERS VERIFY TABLES TO FILE        STATE 12
  verify_to_file;

WHEN copy_file =>                          --COPY A FILE        STATE 13

      copy_a_file;

    WHEN no_file =>                        -- NO FILE EXISTS       STATE 14
      IF bubmcl_cancel THEN                --AND THEN RESET CASE TO STANDBY
        file_command := command_standby;
      END IF;

    WHEN clear_transfer =>        --CLEARS DATA FROM TRANSF.MCL    STATE 15
      transf_reset;

    WHEN delete_a_file =>                     --DELETES A FILE  STATE 16
      del_a_file;
  END CASE;

END bubble_io_mcl;
-------------------------------------------------------------------
END bubmcl;

-- ****************************************************************
-- *                                                              *
-- * SOFTWARE BY BRYAN IRVING (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, A  THE INFORMATION CONTAINED HEREIN, SHALL NOT     *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************
```

```
WITH wndone;   USE wndone;
WITH oemdec;   USE oemdec;

PACKAGE chpmgt IS

chpmgt_master      : auto_masters := auto_init;

TYPE chpmgt_states IS (chpmgt_stdby, chk_values, wait_for_agv);
chpmgt_state       : chpmgt_states := chpmgt_stdby;

TYPE convey_states IS (convey_standby, convey_monitor, convey_off_state,
                       t_chk, off_clear);
convey_state       : convey_states := convey_standby;

TYPE chp_agv_states IS (stdby, send_cmd, wait_cmplt);
chp_agv_st         : chp_agv_states := stdby;

agv_cmplt          : boolean := false;
agv_eop_reqd       : boolean := false;
agv_inprgs         : boolean := false;          --AGV SERVICE NOT COMPLETE
agv_rdy_cmplt      : boolean := false;
a_delivr           : boolean := false;                  --AGV DELIVER FLAG
a_pickup           : boolean := false;
chip_cmplt         : boolean := false;              --END OF CHIP EOP TASK
chip_flag          : boolean := false;                --CHIP MNGT COMPLETE
space_avail        : boolean := false;                 --LEFT IN CONTAINER
standby_chips      : boolean := false;

c_cmd              : integer := 0;                          --AGV CMD BUFF
chpmgt_fault       : integer := 0;

add_vol            : float := 0.0;          --VOLUME ADDED THIS OPERATION
container_vol      : float := 0.0;                         --CONT VOLUME
new_col            : float := 0.0;
old_col            : float := 0.0;
pp_c_tim           : float := 0.0;                   --PART PROG CUT TIME
vol_aval           : float := 0.0;        --CURRENT CONT VOLUME AVAILABLE

opt_stop_act       : boolean := false;          --OPTION STOP WAS ACTIVE
cyc_strt_stor      : boolean := false;            --CYCLE START WAS ON

PROCEDURE chpmgt_init;
PROCEDURE chpmgt_cancel;
PROCEDURE chpmgt_main;
PROCEDURE chip_data_eop;
PROCEDURE go_agv;

END chpmgt;
```

```
-- ***************************************************************
-- *                                                             *
-- * SOFTWARE BY BRYAN IRVING (A&ES) FOR                         *
-- * AIRCRAFT ENGINE BUSINESS GROUP / GENERAL ELECTRIC COMPANY   *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- * PROPERTY OF THE AIRCRAFT ENGINE BUSINESS GROUP OF THE       *
-- * GENERAL ELECTRIC COMPANY.                                   *
-- ***************************************************************
```

```
-- ***************************************************************
-- *              CHIP MANAGEMENT TASK                           *
-- *   THIS PACKAGE WILL TRACK THE ACCUMULATION OF CHIPS(SWARF) *
-- * BEING ADDED TO THE CHIP BUCKET BY THE CURRENT PART PRGM.    *
-- * AND MANAGE THE REQUEST FOR AGV SERVICE(PICK UP,DELIVERY     *
-- * EXCHANGE,DUMP). THIS PACKAGE MUST RUN BEFORE THE CONVEYOR   *
-- * IS ALLOWED TO RUN EACH PASS THROUGH THE PART PROGRAM.       *
-- * IT WILL KEEP TRACK OF THE LAST RUN MATERIAL TYPE, CURRENT   *
-- * CONTAINER VOLUME AVAILABLE AND TOTAL CONTAINER VOLUME IN    *
-- * BUB FILE SWARFF.MCL WHICH IS UPDATED EVERY END-OF-PROGRAM   *
-- * OR ABORT TIME. IF ANY OF THE PROGRAMMED OR FILE VARIABLES   *
-- * USED BY THIS TASK ARE FOUND TO  BE  UNEXCEPTABLE  , PART    *
-- * PROGRAM EXECUTION WILL STOP AT THE NEXT BLOCK BOUNDARY AND *
-- * A CLEAR OR CANCEL WILL BE NECESSARY TO RECOVER.             *
-- *    CONDITIONS FOR AGV SERVICE ARE...NO CHIP CONTAINER AT    *
-- * WORKSTATION,OLD /= NEW MATERIAL TYPE,ADDED CHIP VOLUME      *
-- * MORE THAN CURRENT VOLUME AVAILABLE,NEW MATERIAL TYPE ='000'*
-- * AND MDI MODE SELECTED.   (SEE COMMENTS FOR ADDITIONAL INFO)*
-- ***************************************************************

WITH wndone;   USE wndone;
WITH mcldat;   USE mcldat;
WITH mcllib;   USE mcllib;
WITH wndtwo;   USE wndtwo;
WITH wndmth;   USE wndmth;
WITH wndstd;   USE wndstd;
WITH rel5;     USE rel5;
WITH rel6;     USE rel6;
WITH rel7;     USE rel7;
WITH oemdec;   USE oemdec;
WITH oemmst;   USE oemmst;
WITH bubdec;   USE bubdec;
WITH dncdec;   USE dncdec;
WITH clock;    USE clock;
WITH dncmcl;   USE dncmcl;
WITH atmlib;   USE atmlib;
WITH menu;     USE menu;
WITH agvmon;   USE agvmon;
WITH convor;   USE convor;
WITH tcntrl;   USE tcntrl;
WITH spndrv;   USE spndrv;

PACKAGE BODY chpmgt IS

msgs_os          : boolean := false;
option_stp       : boolean := false;
filter           : boolean;
default_off_time : integer;



--------------------------------------------------------------------
PROCEDURE chpmgt_init IS

BEGIN

  cnvr_on_time := 4500;
  default_off_time := 10;
  cnvr_off_time := default_off_time;
  select_material := truncate(150);
  material_type := tbl_val_int(cust, mat, 1);
  convyr_off_lmt := parameter_value(155);

END chpmgt_init;
--------------------------------------------------------------------
PROCEDURE do_msg(msg : IN integer;
                 matl : IN integer;
                 tim_val : IN float) IS

msgstr : str64;
```

```
BEGIN

  i_to_c(matl, 3, 1, msgstr);
  file_msg_insert(1, 3, msgstr);
  f_to_c(tim_val, 6, 2, 1, msgstr);
  file_msg_insert(2, 6, msgstr);
  p_msg(msg, 5);
  start_timer(page_chng_tmr, 100);

END do_msg;
------------------------------------------------------------------------
PROCEDURE chpmgt_cancel IS

BEGIN

  IF chpmgt_fault /= 0 THEN
    kill_msg(chpmgt_fault);
    chpmgt_state := chpmgt_stdby;
    chpmgt_master := auto_run;
    chpmgt_fault := 0;
    cnt_dwn;
  ELSIF chpmgt_state /= wait_for_agv THEN
    chpmgt_state := chpmgt_stdby;
  END IF;
  IF a_pickup THEN
    do_msg(6806, material_type, float_0);
  END IF;
  IF a_delivr THEN
    do_msg(6807, select_material, convyr_off_lmt);
  END IF;
  msgs_os := false;
  postlude_req_off(chips_inhib);
  postlude_req_off(convey_inhib);

END chpmgt_cancel;
------------------------------------------------------------------------
FUNCTION chpmgt_ok RETURN boolean IS

chpmgt_status : boolean;

BEGIN

  chpmgt_status := chpmgt_fault = 0;

RETURN chpmgt_status;

END chpmgt_ok;
------------------------------------------------------------------------
PROCEDURE go_agv IS

BEGIN

  space_avail := false;
  vol_aval := float_0;
  t_val := vol_aval;
  tb_fl(0, 0, swrf, 2);
  chpmgt_state := wait_for_agv;
  IF NOT agv_inprgs THEN
    IF ldin(chip_cntr_avail) THEN
      a_pickup := true;
      put_save_bool(a_pickup, 24);
      msgs_os := false;
      purge_conveyor := 1;
    END IF;
    a_delivr := true;
    put_save_bool(a_delivr, 23);
  END IF;
  chip_flag := true;

END go_agv;
------------------------------------------------------------------------
PROCEDURE chip_data_eop IS
```

```
BEGIN

  IF NOT agv_inprgs THEN
    response := tbl_chg_int(cust, mat, 1, material_type);
    t_val := vol_aval;
    tb_fl(0, 0, swrf, 2);
  ELSE                             --IF AGV NOT READY SAVE THIS AND DO LATER
    agv_eop_reqd := true;
  END IF;
  chip_cmplt := true;
  cnvr_off_time := default_off_time;
  enum_resp := parameter_change(154, int_to_float(default_off_time));

END chip_data_eop;
--------------------------------------------------------------------------
--CONVYR_OFF_LMT IS THE AMOUNT OF TIME THAT THE CONVEYOR IS ALLOWED TO
--BE OFF AND ACCUMULATING CHIPS WHILE WAITING FOR CONTNER DELIVY
-----------------------------------------------------------------------
PROCEDURE chpmgt_main IS

BEGIN

  CASE chpmgt_master IS
    WHEN auto_init =>
      IF automation_opt THEN
        IF a_delivr OR a_pickup THEN
          chpmgt_state := wait_for_agv;
        END IF;
        chpmgt_master := auto_run;
        filter := false;
      END IF;

    WHEN auto_run =>
      IF option_stp AND NOT opt_stop_act THEN
        IF NOT nc_status(cyc_start_lt_on) THEN
          set_busy(manual_pb);
          opt_stop_act := true;
        END IF;
      END IF;

      IF chpmgt_ok THEN
        CASE chpmgt_state IS
          WHEN chpmgt_stdby =>                                      --STATE 0
            IF automcode(a102) THEN
              eopgm_cmplt := false;
              chip_flag := false;
              t_val := parameter_value(152);
              tb_fl(0, 0, swrf, 1);
              container_vol := t_val;
              pp_c_tim := parameter_value(121);
              add_vol := parameter_value(153);
              cnvr_off_time := truncate(154);
              new_col := parameter_value(155);
              IF chg_chip_cont THEN
                vol_aval := float_0;                      --GET VOL AVAILABLE
              ELSE
                tb_fl(swrf, 2, 0, 0);
                vol_aval := t_val;
              END IF;
              p_val(150);
              IF t_val < - float_1 OR t_val > float_1000 THEN
                chpmgt_fault := 6494;             --SELECT MATL VAL ILLEGAL
              ELSIF pp_c_tim <= float_0 or new_col <= float_0 THEN
                chpmgt_fault := 6492;                --PROG CUT TIME ILLEGAL
              ELSIF (add_vol > container_vol) OR (add_vol <= float_0) THEN
                chpmgt_fault := 6490;                   --ADDED VOL ILLEGAL
              ELSIF vol_aval > container_vol THEN
                chpmgt_fault := 6491;                   --VOL AVAIL TOO BIG
              END IF;
           --CHECK FOR NEW CONVEYOR OFF LIMIT TIME AND ADJUST OLD IF NEEDED
              IF chpmgt_fault = 0 THEN
                select_material := truncate(150);
```

```
      IF select_material = 0 and not rdout(mdi_light) THEN
        chpmgt_fault := 6493;                              --MUST BE IN MDI
      ELSIF old_col > float_0 and convyr_off_lmt > float_0 AND
            convyr_off_lmt /= old_col THEN
        convyr_off_lmt := convyr_off_lmt * (new_col / old_col);
      ELSE
        convyr_off_lmt := new_col;
      END IF;
      old_col := new_col;
      material_type := tbl_val_int(cust, mat, 1);  --GET MAT TYPE
      chpmgt_state := chk_values;
      automcode(a102) := false;
    END IF;
  END IF;

WHEN chk_values =>                                          --STATE 1
  IF select_material = 0 and rdout(mdi_light) THEN
    a_pickup := true;                              --START AGV PICK UP
    put_save_bool(a_pickup, 24);
    msgs_os := false;
    chpmgt_state := wait_for_agv;                           --GO WAIT
  ELSE
    IF vol_aval > float_0 THEN
      IF select_material = material_type AND
         ldin(chip_cntr_avail) THEN
        IF vol_aval < add_vol THEN
          go_agv;
        ELSE
          vol_aval := vol_aval - add_vol;
          chpmgt_state := chpmgt_stdby;
          k_msg(6806);
          k_msg(6807);
          chip_flag := true;
          space_avail := true;

        END IF;
      ELSE               --SELECT MAT'L /= MAT'L TYPE OR NO CONTNR
        go_agv;                              --PROCEDURE,SEE ABOVE
      END IF;
    ELSE
      go_agv;
    END IF;
  END IF;
  postlude_req_off(chips_inhib);

WHEN wait_for_agv =>                                        --STATE 2
  IF agv_cmplt THEN
    IF ldin(chip_cntr_avail) THEN
      IF vol_aval <= float_0 THEN
        vol_aval := container_vol;
      END IF;
      material_type := select_material;
      response := tbl_chg_int(cust, mat, 1, material_type);
      tb_fl(swrf, 1, swrf, 2);
      space_avail := true;
      IF agv_eop_reqd THEN
        chip_data_eop;
        IF chip_cmplt THEN
          agv_eop_reqd := false;
          agv_cmplt := false;
          chpmgt_state := chpmgt_stdby;
        END IF;
        chg_chip_cont := false;
      ELSE
        agv_cmplt := false;
        chpmgt_state := chpmgt_stdby;
      END IF;
    ELSIF select_material = 0 THEN
      material_type := select_material;
      vol_aval := float_0;
      chip_data_eop;
```

```
            IF chip_cmplt THEN
              chpmgt_state := chpmgt_stdby;
              agv_cmplt := false;
            END IF;
          ELSE
            chpmgt_state := chpmgt_stdby;
            agv_cmplt := false;
          END IF;
        ELSIF automcode(a102) THEN
          chpmgt_state := chpmgt_stdby;
        END IF;
      END CASE;
--****************************************************************
--*   THE FOLLOWING STATE (chp_agv_st) IS USED TO INITIATE AGV   *
--* CHIP CONTAINER SERVICE.  THERE ARE 3 TYPES OF SERVICE THAT   *
--* CAN BE REQUESTED, PICK-UP, DELIVERY, or EXCHANGE.  SERVICE   *
--* IS STARTED BY EITHER THE CHIPS MANAGEMENT CODE OR END OF     *
--* PROGRAM (IN THE CASE WHERE THE HOST REQUESTS A DUMP) CODE    *
--* BY SETTING ONE OR BOTH OF THE PICK_UP,DELIVERY FLAGS. THIS   *
--* STATE WILL SENSE WHICH FLAG(S) IS SET, DISPLAY THE CORRECT   *
--* MESSAGES ,CHANGE STATE AND SEND THE CORRESPONDING COMMAND TO *
--* THE HOST AND WAIT FOR AN ACKNOWLEDGE. ONCE RECEIVED IT WILL  *
--* CHANGE STATE AND WAIT FOR A COMPLETE SIGNAL FROM THE AGV     *
--* MONITOR.  WHEN RECEIVED IT WILL SET A FLAG FOR THE CALLING   *
--* PACKAGE, CLEAR THE MESSAGES AND GO TO STANDBY.               *
--*    WHEN THE HOST IS NOT AVAILABLE THIS CASE WILL SENSE WHEN  *
--* THE CHIP CONTAINER IS PICKED UP AND DELIVERED BY MONITORING  *
--* THE INPUT. MESSAGE DISPLAY AND COMPLETE FLAGS ARE SAME AS    *
--* ABOVE.                                                       *
--****************************************************************
      CASE chp_agv_st IS
        WHEN stdby =>                                          --STATE 0
          IF NOT agv_inprgs OR standby_chips THEN
            IF a_pickup THEN
              IF a_delivr THEN
                c_cmd := 21;                           --EXCHANGE REQUEST
                IF NOT msgs_os THEN
                  do_msg(6807, select_material, convyr_off_lmt);
                  msgs_os := true;
                END IF;
              ELSE
                c_cmd := 5;                             --PICK UP REQUEST
              END IF;
              IF NOT timer_running(page_chng_tmr) AND msgs_os THEN
                do_msg(6806, material_type, float_0);       --CONT PU MSG
                chp_agv_st := send_cmd;
                msgs_os := false;
              END IF;
            ELSIF a_delivr THEN
              c_cmd := 6;                              --DELIVERY REQUEST
              IF NOT timer_running(page_chng_tmr) THEN
                do_msg(6807, select_material, convyr_off_lmt);
                chp_agv_st := send_cmd;
              END IF;
            END IF;
          ELSE
            chp_agv_st := send_cmd;         --IF AGV SERVICE IN PROGRESS
          END IF;
          agv_rdy_cmplt := false;

        WHEN send_cmd =>                                       --STATE 1
          IF host_available AND prog_chk_cmplt THEN
            IF agv_inprgs AND NOT standby_chips THEN
              chp_agv_st := wait_cmplt;
            ELSIF command_request = 0 THEN
              command_request := c_cmd;
              dnc_bool(mc2000_cmd_req) := true;
              agv_inprgs := true;
              chp_agv_st := wait_cmplt;
              standby_chips := false;
            END IF;
```

```
ELSE
  IF a_pickup THEN
    agv_inprgs := true;
    IF NOT ldin(chip_cntr_avail) THEN
      IF NOT filter THEN
        start_timer(no_bounce_tmr, 500);
        filter := true;
      ELSIF NOT timer_running(no_bounce_tmr) THEN
        filter := false;
        space_avail := false;                  --TURN OFF CONVEYOR
        a_pickup := false;
        put_save_bool(a_pickup, 24);
        k_msg(6806);
        IF NOT a_delivr THEN
          agv_cmplt := true;
          chp_agv_st := stdby;
        END IF;
      END IF;
    ELSE
      filter := false;
    END IF;
  ELSIF a_delivr THEN
    c_cmd := 6;
    agv_inprgs := true;
    IF ldin(chip_cntr_avail) THEN
      IF NOT filter THEN
        start_timer(no_bounce_tmr, 500);
        filter := true;
      ELSIF NOT timer_running(no_bounce_tmr) THEN
        filter := false;
        agv_inprgs := false;
        a_delivr := false;
        put_save_bool(a_delivr, 23);
        agv_cmplt := true;          --FOR USE IN EOPGM CONT CHNG
        chp_agv_st := stdby;
        k_msg(6807);
      END IF;
    ELSE
      filter := false;
    END IF;
  END IF;
END IF;

WHEN wait_cmplt =>                                        --STATE 2
  IF a_pickup THEN
    IF agv_rdy_cmplt THEN                   --SET IN AGV CMPLT STATE
      IF agv_fault = 0 THEN
        IF NOT a_delivr THEN
          agv_inprgs := false;
          agv_cmplt := true;
        END IF;
        k_msg(6806);
        a_pickup := false;
        put_save_bool(a_pickup, 24);
        chp_agv_st := stdby;
      END IF;
    ELSIF agv_status = chp_pu THEN                     --IF AGV INPSN
      space_avail := false;                        --TURN OFF CONVEYOR
    END IF;
  ELSIF a_delivr THEN
    IF agv_rdy_cmplt and agv_fault = 0 THEN
      k_msg(6807);
      set_busy(auto_pb);
      agv_inprgs := false;
      a_delivr := false;
      put_save_bool(a_delivr, 23);
      chp_agv_st := stdby;
      agv_cmplt := true;
    END IF;
  END IF;
  IF host_available THEN
```

```
            IF standby_chips THEN
              chp_agv_st := stdby;
            END IF;
          ELSE
            chp_agv_st := send_cmd;
          END IF;
      END CASE;
-- ***************************************************************
-- *                 CONVEYOR MONITOR                            *
-- * THIS STATE WILL CONTROL THE CONVEYOR OPERATION.  IT         *
-- * WILL NOT ALLOW THE CONVEYOR TO RUN UNTIL THE CHIP MANAGE-   *
-- * TASK HAS RUN FOR THE CURRENT ACTIVE PART PROGRAM. IT WILL   *
-- * RESPOND TO AN MCODE TO START THE CONVEYOR AND AN MCODE TO   *
-- * DELAY-TO-A-STOP(PURGE) THE CONVEYOR.(*SEE NOTE !).  WHEN    *
-- * THE CHIP MGMNT PKG DETERMINES THAT THE CONTAINER IS FULL    *
-- * A FLAG IS SET TO INDICATE TO THE CONVEYOR PKG TO TURN OFF   *
-- * THE CONVEYOR. THE CONVEYOR PKG WILL THEN ALLOW THE PROGRAM  *
-- * TO RUN UNTIL THE CONVEYOR OFF TIME LIMIT IS REACHED OR      *
-- * EXCEEDED. AT THIS TIME AN OPTION STOP IS ACTIVATED AND THE  *
-- * PROGRAM WILL STOP ON THE NEXT M01 ENCOUNTERED. UPON PICKUP  *
-- * AND DELIVERY OF THE CONTAINER IF WITHIN TIME LIMITS,THE     *
-- * PROGRAM WILL BE AUTOMATICALLY RESTARTED IF THE WORKSTATION  *
-- * OPERATING MODE IS READY_AUTO, OTHERWISE; A MSG WILL BE      *
-- * DISPLAYED TO INDICATE TO THE ATTENDANT WHAT ACTIONS ARE     *
-- * NECESSARY.                                                  *
-- ***************************************************************
      CASE convey_state IS
        WHEN convey_standby =>                                      --STATE 0
          IF automcode(a203) THEN
            IF NOT   ip_flag THEN
              chpmg._fault := 6481;            --CHIP MNGMNT NOT XCUTD MSG
              postlude_request(convey_inhib);
            ELSE
              IF space_avail AND ldin(chip_cntr_avail) THEN
                mcode_val(cnvr_aug_on) := true;           --START CONVEYOR
              END IF;
              convey_state := convey_monitor;
            END IF;
            automcode(a203) := false;
          ELSIF automcode(a204) THEN
            automcode(a204) := false;
            convey_state := off_clear;
          ELSIF agv_inprgs THEN
            convey_state := t_chk;
          END IF;

        WHEN convey_monitor =>                                      --STATE 1
          IF automcode(a204) OR automcode(a203) THEN
            convey_state := convey_standby;
          ELSE
            IF space_avail AND ldin(chip_cntr_avail) THEN
              postlude_req_off(convey_inhib);
            ELSE
              mcode_val(cnvr_aug_on) := false;
              mcode_val(cnvr_aug_off) := true;
              convey_state := t_chk;
            END IF;
          END IF;

        WHEN convey_off_state =>                                    --STATE 2
          IF NOT space_avail OR NOT ldin(chip_cntr_avail) THEN
            IF NOT timer_running(convyr_off_tmr) and
               not option_stp and (fwdfg or revfg) THEN
              convyr_off_lmt := convyr_off_lmt - 0.25;
              convey_state := t_chk;
            END IF;
          ELSE            --IF SPACE IS OR BECOMES AVAILABLE GOTO STDBY
            IF rdout(cyc_start_light) THEN       --IF CYCLE START IS ON
              cyc_strt_stor := false;             --DONT TRY TO RESTART
            ELSIF NOT rdout(cyc_start_light) and cyc_strt_stor AND
                 ((ws_status = ready_auto) or rrise(cycle_start)) THEN
```

```
          cyc_strt_on := true;
          cyc_strt_stor := false;
        END IF;
        IF option_stp THEN
          option_stp := false;
          opt_stop_act := false;
          IF rdout(op_stop_light) and not man_opt_stop THEN
            set_busy(option_stop);
          END IF;
        END IF;
        k_msg(6849);
        convyr_off_lmt := old_col;
        IF NOT eopgm_cmplt THEN               --IF PRGM HAS NOT ENDED
          automcode(a203) := true;      --ALLOW MONITOR TO RUN AGAIN
        END IF;
       convey_state := convey_standby;
      END IF;

    WHEN t_chk =>                                         --STATE 3
      IF convyr_off_lmt <= float_0 THEN
        convyr_off_lmt := float_0;
        cyc_strt_stor := rdout(cyc_start_light);
        option_stp := true;
        p_msg(6849, 5);
        IF NOT rdout(op_stop_light) THEN
          set_busy(option_stop);
        END IF;
      END IF;
      start_timer(convyr_off_tmr, 1500);        --START 15 SEC TIMER
      convey_state := convey_off_state;

    WHEN off_clear =>                                     --STATE 4
      IF NOT ldout(chip_cnvyr) THEN
        mcode_val(cnvr_aug_on) := false;
        mcode_val(cnvr_aug_off) := true;             --TURN OFF CNVYR
        convey_state := convey_standby;
      END IF;
    END CASE;
  ELSE                                                -- NOT CHIPS_OK
    postlude_request(chips_inhib);
    put_msg(chpmgt_fault, 10, 4);
    store_msg(chpmgt_fault);
    chpmgt_master := auto_recovery;
  END IF;

 WHEN OTHERS =>
   NULL;                                --WAIT FOR CLEAR OR CANCEL
END CASE;

END chpmgt_main;
----------------------------------------------------------------------
END chpmgt;

-- *****************************************************************
-- *                                                               *
-- * SOFTWARE BY PAUL COLANANNI (A&ES) FOR                         *
-- * AIRCRAFT ENGINE BUSINESS GROUP / GENERAL ELECTRIC COMPANY     *
-- *                                                               *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *                                                               *
-- *****************************************************************
```

```
PACKAGE clock IS

TYPE clock_states IS (clock_standby, clock_inq, chk_data);
clock_state       : clock_states := clock_standby;

TYPE cim_times IS (date_a_file, check_file, correct_file,
                   cim_monitor, lost_time_monit, rework_monitor,
                   proc_time_calc, cim_time_reset, do_blkdlt_eop,
                   make_putran);
cim_time          : cim_times := date_a_file;
time              : string(1..20);
blank_time        : string(1..20);
day               : array(1..2) of integer;
hour              : array(1..2) of float;
minit             : array(1..2) of float;
scd               : array(1..2) of float;
plate_integer     : integer := 0;
cim_time_on       : boolean := false;
cim_time_run      : boolean := false;
clock_is_set      : boolean := false;
record_cim_time   : boolean := false;
reworking         : boolean := false;
stop_cim_time     : boolean := false;
store_e           : boolean := false;
hour_ret          : float := 0.0;
lost_time         : float := 0.0;
sso_temp          : float := 0.0;
proc_time         : float := 0.0;
rework_time       : float := 0.0;

PROCEDURE date;                          -- GET THE TIME AND DATE
PROCEDURE set_time;                      -- CALIBRATE THE CLOCK FROM THE HOST
PROCEDURE clock_init;
PROCEDURE clock_oem1;
PROCEDURE clock_main;

END clock;
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY     *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH mcldat;   USE mcldat;
WITH mcllib;   USE mcllib;
WITH wndtwo;   USE wndtwo;
WITH wndmth;   USE wndmth;
WITH rel5;     USE rel5;
WITH rel6;     USE rel6;
WITH rel7;     USE rel7;
WITH bubdec;   USE bubdec;
WITH oemdec;   USE oemdec;
WITH atmlib;   USE atmlib;
WITH dncdec;   USE dncdec;
WITH oemmst;   USE oemmst;
```

```
WITH blkdlt;   USE blkdlt;
WITH dncmcl;   USE dncmcl;

PACKAGE BODY clock IS

clck_time          : integer := 0;
dys                : integer := 1;
hrs                : integer := 0;
mnt                : integer := 0;
resp_len           : integer := 0;
sec                : integer := 0;
yrs                : integer := 0;
init_clock         : boolean := false;
inq_done           : boolean := false;
mfo_flag           : boolean := false;
old_plate_destag   : boolean := false;
rework_flag        : boolean := false;
servo_flag         : boolean := false;
sso_flag           : boolean := false;
mfo_temp           : float := 0.0;
start_time         : float;
msg_no             : str10;
-------------------------------------------------------------------
-- ***************************************************************
-- * THIS PROCEDURE RUNS AT POWER UP TIME ONLY AND INITIALIZES   *
-- * VARIABLES IN THE PACKAGE                                    *
-- ***************************************************************
PROCEDURE clock_init IS

BEGIN

  time := "01 JAN 1987 15:25:00";
  set_time;
  init_clock := true;
  IF automation_opt THEN
    IF cim_time_on THEN
      cim_time := cim_monitor;
      lost_time_cntr := tbl_val_int(cust, msg, 9);
      rework_time_cntr := 0;
      response := tbl_chg_int(cust, var, 9, 0);
      lost_time_msg := tbl_val_int(cust, msg, 10);
      var_time_msg := tbl_val_int(cust   ar, 10);
      IF lost_time_cntr > 0 THEN
        store_msg(9002);
        cim_time := lost_time_monit;
      ELSE
        store_msg(9001);
        store_e := true;
      END IF;
      lost_time_cntr := 0;
      response := tbl_chg_int(cust, msg, 9, 0);
      IF plate_integer = 1 THEN
        str_set(0, 1);
      ELSIF plate_integer = 2 THEN
        str_set(0, 2);
      ELSE
        str_set(0, 3);
      END IF;
      iteml_rec := start_date_rnm;
      file_command := date_file;
    ELSE
      cim_time := date_a_file;
    END IF;
  END IF;

END clock_init;
-------------------------------------------------------------------
-- ***************************************************************
-- * THIS PROCEDURE DETERMINES THE ANOUNT OF TIME ELAPSED        *
-- * BETWEEN TWO TIMES IN HOURS.                                 *
-- ***************************************************************
PROCEDURE calc_time(start : IN integer) IS
```

```
int_day : integer;
temp_int : integer;
temp_flt : float;
temp_time : string(1..20);
month : ARRAY (1..2) OF string(1..3);

BEGIN

  FOR i IN 1..2 LOOP
    tbl_val_char(cust, cim, start + i, temp_time);
    c_to_i(temp_time, 1, 2, temp_int);
    day(i) := temp_int;
    c_to_f(temp_time, 13, 2, temp_flt);
    hour(i) := temp_flt;
    c_to_f(temp_time, 16, 2, temp_flt);
    minit(i) := temp_flt;
    c_to_f(temp_time, 19, 2, temp_flt);
    scd(i) := temp_flt;
    FOR index IN 1..3 LOOP
      month(i)(index) := temp_time(3 + index);
    END LOOP;
  END LOOP;
  hour(2) := hour(2) + (minit(2) / float_60) + (scd(2) / float_3600);
  hour(1) := hour(1) + (minit(1) / float_60) + (scd(1) / float_3600);
  IF (day(1) = day(2)) AND (month(1) = month(2)) THEN
    hour_ret := hour(2) - hour(1);
  ELSE
    IF month(1) = month(2) THEN
      int_day :=(day(2) - day(1) - 1) * 24;
    ELSE
      IF month(2) = "MAR" THEN
        temp_int := 28;
      ELSIF month(2)(3) = 'Y' OR month(2)(3) = 'L' OR month
            (2)(3) = 'T' OR month(2)(3) = 'C' THEN
        temp_int := 30;
      ELS
        t   _int := 31;
      END IF;
      int_day :=((temp_int - day(1)) + (day(2) - 1)) * 24;
    END IF;
    hour_ret := int_to_float(int_day) + (24.0 - hour(1)) + hour
      (2);
  END IF;

END calc_time;
--------------------------------------------------------------
-- ****************************************************************
-- * THIS PROCEDURE CHECKS FOR LOST TIME ACT''IITIES             *
-- ****************************************************************
PROCEDURE check_lost IS

BEGIN

  IF NOT rdout(cyc_start_light) AND NOT cim_fault(7) THEN
    IF mcl_state /= mcl_auto AND NOT host_req_mag THEN
      store_msg(9003);
      cim_fault(7) := true;
    END IF;
  END IF;
  IF rrise(feedhold) THEN
    store_msg(9004);
    cim_fault(7) := true;
  END IF;
  IF nc_status(servo_stop_actv) AND NOT servo_flag THEN
    store_msg(2200);
    servo_flag := true;
  END IF;

END check_lost;
--------------------------------------------------------------
```

```
-- ************************************************************
-- * THIS PROCEDURE RUNS BEFORE THE GE MCL. IT DISPLAYS THE     *
-- * CURRENT TIME ON THE SCREEN.                                *
-- ************************************************************
PROCEDURE clock_oer  IS

disp_msg : str64;

BEGIN

  IF rdin(mfo_decr) OR (resp_len = 99) THEN
    msg_no := "1111111111";
    date;
    FOR index IN 1..64 LOOP
      IF index < 21 THEN
        disp_msg(index) := time(index);
      ELSE
        disp_msg(index) := ' ';
      END IF;
    END LOOP;
    disp_cust_line(msg_no, disp_msg);
  ELSIF NOT rdin(mfo_decr) AND active_disp_page /= 120 AND msg_no
        (1) = '1' THEN
    delete_cust_msg(msg_no);
    msg_no(1) := '0';
  END IF;
  rrise(mfo_decr) := false;

END clock_oem1;
-----------------------------------------------------------------
-- ************************************************************
-- * THIS FUNCTION CHECKS TO SEE IF THE PROJECT PLATE IS        *
-- * REMOVED FROM ANY STATION OF THE MACHINE.                   *
-- ************************************************************
FUNCTION no_plate RETURN boolean IS

status : boolean;

BEGIN

  status := false;
  IF NOT xgr_park THEN
    plate_wkxgr := NOT ldin(grprs_retd);
  END IF;
  IF xgr_park AND plate_ok AND NOT plate_wkxgr THEN
    IF plate_integer = 1 AND NOT plate_tra AND ldin(pres_at_trns) THEN
      IF plate_que THEN
        plate_integer := 2;
      ELSIF plate_mac THEN
        plate_integer := 3;
      END IF;
      put_save_int(plate_integer, 7);
    ELSIF plate_integer = 2 AND NOT plate_que THEN
      IF plate_mac THEN
        plate_integer := 3;
        put_save_int(plate_integer, 7);
      END IF;
    ELSIF plate_integer = 3 AND NOT plate_mac THEN
      IF plate_tra OR NOT ldin(pres_at_trns) THEN
        plate_integer := 1;
        put_save_int(plate_integer, 7);
        IF cim_time_run THEN
          cim_time_run := false;
        ELSE
          status := true;
        END IF;
      END IF;
    END IF;
    IF (plate_integer = 1 AND NOT plate_tra AND ldin(pres_at_trns)) OR
       (plate_integer = 2 AND NOT plate_que) OR (plate_integer = 3 AND NOT
```

```
      plate_mac) THEN
      plate_integer := 0;
      status := true;
    END IF;
  END IF;
RETURN status;

END nc_plate;
----------------------------------------------------------------------
-- *****************************************************************
-- * THIS PROCEDURE IS THE MAIN PROGRAM. IT SETS THE TIME FROM     *
-- * THE OPERATOR AND CALCULATES THE CIM TIME                      *
-- *****************************************************************
PROCEDURE clock_main IS

BEGIN

  IF NOT timer_running(clock_tmr) THEN
    clck_time := clck_time + 1;
    IF clck_time = 360 THEN
      date;
      clck_time := 0;
    END IF;
    start_timer(clock_tmr, 6000);
  END IF;

  IF servo_flag AND NOT nc_status(servo_stop_actv) THEN
    cnt_dwn;
    servo_flag := false;
  END IF;
  IF rework_flag AND rrise(cycle_start) THEN
    rework_flag := false;
    kill_msg(6872);
  END IF;

  sso_temp := int_to_float(fain(sso_pot)) * sso_multiplier +
    sso_min_fraction;
  IF cim_time_on OR mfo_flag OR sso_flag THEN
    mfo_temp := int_to_float(fain(mfo_pot)) * mfo_multiplier;
    IF (mfo_temp < 0.98 OR mfo_temp > 1.02) AND cim_time_on THEN
      IF NOT mfo_flag THEN
        put_msg(6862, 7, 5);
        var_msg(6862);
        mfo_flag := true;
      END IF;
    ELSIF mfo_flag THEN
      kill_msg(6862);
      var_dwn;
      mfo_flag := false;
    END IF;
    IF ((sso_temp < 0.98) OR (sso_temp > 1.02)) AND cim_time_on THEN
      IF NOT sso_flag THEN
        put_msg(6863, 7, 5);
        var_msg(6863);
        sso_flag := true;
      END IF;
    ELSIF sso_flag THEN
      kill_msg(6863);
      var_dwn;
      sso_flag := false;
    END IF;
  END IF;

  CASE clock_state IS
    WHEN clock_standby =>
      IF automcode(a300) THEN
        resp_len := 99;
        disp_page_select(120);
        clock_state := clock_inq;
        start_timer(63, 200);
      END IF;
```

```
    WHEN clock_inq =>
      IF active_disp_page = 120 THEN
        disp_sel_lock;
        inq_msg := blank_line;
        ask_oper(20, 11, 5, resp_len, inq_done);
        IF inq_done THEN
          IF (resp_len = 20) OR (resp_len = 0) THEN
            clock_state := chk_data;
          ELSE
            inq_done := false;
          END IF;
        END IF;
      ELSE
        IF NOT timer_running(63) THEN
          clock_state := chk_data;
        END IF;
      END IF;

    WHEN chk_data =>
      IF resp_len = 20 THEN
        FOR index IN 1..20 LOOP
          time(index) := inq_msg(index);
        END LOOP;
        set_time;
        resp_len := 90;
      ELSE
        resp_len := 0;
        clock_state := clock_standby;
        disp_sel_unlock;
        automcode(a300) := false;
        inq_done := false;
      END IF;
  END CASE;

-- ****************************************************************
-- * THIS SECTION OF CODE DOES THE CIM TIME CALCULATIONS. IT      *
-- * ALSO DATES T'E PROJECT PLATE CONFIG FILES WITH THE START     *
-- * AND FINISH DATES AND TIMES.                                   *
-- ****************************************************************
  CASE cim_time IS
    WHEN date_a_file =>                                          --STATE 0
      IF automation_opt AND clock_is_set AND plate_ok THEN
        IF (plate_tra AND NOT pkup_exp AND old_plate_destag) OR
            plate_que OR plate_mac THEN
          record_cim_time := false;
          IF file_command = command_standby THEN
            IF plate_mac THEN
              plate_integer := 3;
              str_set(0, 3);
            ELSIF plate_que THEN
              plate_integer := 2;
              str_set(0, 2);
            ELSE
              plate_integer := 1;
              str_set(0, 1);
            END IF;
            put_save_int(plate_integer, 7);
            date;
            iteml_rec := start_date_rnm;
            file_command := date_file;
            old_plate_destag := false;
            cim_time := check_file;
            IF reworking THEN
              prelude_req_off(v_prel);
              reworking := false;
              rework_flag := true;
            END IF;
          END IF;
        END IF;
        IF NOT plate_tra THEN
          old_plate_destag := true;
        END IF;
      END IF;
```

```
WHEN check_file =>                                                    --STATE
  IF file_command = command_standby THEN
    cim_time_on := true;
  put_save_bool(true, 4);
  FOR i IN 2..6 LOOP
    response := tbl_chg_char(cust, cim, i, blank_time);
  END LOOP;
  FOR i IN 1..20 LOOP
    cim_fault(i) := false;
  END LOOP;
  proc_time := float_0;
  rework_time := float_0;
  lost_time := float_0;
  put_save_float(float_0, 1);
  put_save_float(float_0, 2);
  lost_time_cntr := 0;
  rework_time_cntr := 0;
  lost_time_msg := 0;
  var_time_msg := 0;
  store_e := false;
  response := tbl_clear(cust, msg);
  response := tbl_clear(cust, var);
  cim_time := cim_monitor;
  dnc_bool(time_report) := true;
ELSIF file_command = no_file THEN
  p_msg(6811, 6);
  file_command := command_standby;
  cim_time := correct_file;
END IF;

WHEN correct_file =>                                                  --STATE 2
  IF rrise(mdi_pb) OR rrise(single_pb) OR rrise(auto_pb) OR
     rrise(manual_pb) THEN
    k_msg(6811);
    old_plate_destag := true;
    cim_time := date_a_file;
  END IF;

WHEN cim_monitor =>                                                   -- STATE 3
  IF clock_is_set THEN
    check_lost;
    IF cim_time_on THEN
      IF msg_act(6810) THEN
        store_msg(6810);
        cim_fault(12) := true;
      END IF;
      IF lost_time_cntr > 0 OR NOT rdout(cyc_start_light) THEN
        date;
        response := tbl_chg_char(cust, cim, 3, time);
        response := tbl_chg_char(cust, cim, 4, blank_time);
        cim_time := lost_time_monit;
        dnc_bool(time_report) := true;
      ELSIF rework_time_cntr > 0 THEN
        date;
        response := tbl_chg_char(cust, cim, 5, time);
        response := tbl_chg_char(cust, cim, 6, blank_time);
        cim_time := rework_monitor;
        dnc_bool(time_report) := true;
      END IF;
    ELSE
      IF reworking THEN
        file_present(3);
      ELSE
        file_present(4);
      END IF;
      IF file_is_there = 1 THEN
        cim_time := proc_time_calc;
        file_is_there := 0;
      ELSIF file_is_there = 2 THEN
```

```
        file_is_there := 0;
        cim_time_on := true;
        p_msg(6831, 6);
        kill_msg(6872);
      END IF;
    END IF;
    IF no_plate THEN
      cim_time_on := false;
    END IF;
  END IF;

WHEN lost_time_monit =>                                          -- STATE 4
  IF clock_is_set THEN
    IF cim_fault(7) THEN
      IF (mcl_state = mcl_auto) AND NOT rdout(feedhold_light) THEN
        cnt_dwn;
        cim_fault(7) := false;
      END IF;
    END IF;
    IF cim_fault(12) THEN
      IF NOT msg_act(6810) THEN
        cnt_dwn;
        cim_fault(12) := false;
      END IF;
    END IF;
    IF tbl_val_int(cust, msg, 9) = 1 AND flash_al THEN
      flash_al := false;
    END IF;
    IF (lost_time_cntr = 0 OR NOT cim_time_on) AND NOT su_flag THEN
      IF rdout(cyc_start_light) OR NOT cim_time_on THEN
        k_msg(6803);
        lost_time_cntr := 0;
        cnt_dwn;
        date;
        response := tbl_chg_char(cust, cim, 4, time);
        calc_time(2);
        lost_time := lost_time + hour_ret;
        put_save_float(lost_time, 1);
        dnc_bool(time_report) := true;
        cim_time := cim_monitor;
        cim_fault(13) := false;
        IF not cim_fault(16) THEN
          flash_al := false;
        END IF;
      ELSIF mcl_state = mcl_auto THEN
        p_msg(6803, 5);
      ELSE
        k_msg(6803);
        check_lost;
      END IF;
    END IF;
    IF lost_time_cntr > 0 THEN
      k_msg(6803);
    END IF;
    IF no_plate THEN
      cim_time_on := false;
    END IF;
  END IF;

WHEN rework_monitor =>                                           -- STATE 5
  IF clock_is_set THEN
    check_lost;
    IF rework_time_cntr = 0 OR (lost_time_cntr > 0) OR
       NOT cim_time_on THEN
      date;
      response := tbl_chg_char(cust, cim, 6, time);
      calc_time(4);
      rework_time := rework_time + hour_ret;
      put_save_float(rework_time, 2);
      cim_time := cim_monitor;
      cim_fault(16) := false;
```

```
      dnc_bool(time_report) := true;
      IF NOT cim_fault(13) THEN
        flash_al := false;
      END IF;
    END IF;
    IF no_plate THEN
      cim_time_on := false;
    END IF;
  END IF;

WHEN proc_time_calc =>                                              --STATE 6
  date;
  response := tbl_chg_char(cust, cim, 2, time);
  calc_time(0);
  proc_time := hour_ret - lost_time;
  p_val(138);
  proc_time := proc_time / t_val;
  lost_time := lost_time / t_val;
  rework_time := rework_time / t_val;
  cim_time_on := false;
  put_save_bool(false, 4);
  put_save_int(0, 7);
  lost_time_msg := 0;
  var_time_msg := 0;
  dnc_bool(time_report) := true;
  cim_time := cim_time_reset;

WHEN cim_time_reset =>                                              --STATE 7
  IF file_command = command_standby AND record_cim_time THEN
    IF reworking THEN
      str_set(0, 3);
    ELSE
      str_set(0, 4);
    END IF;
    record_cim_time := false;
    iteml_rec := fin_date_rnm;
    file_command := date_file;
    plate_integer := 0;
  ELSIF ((file_command = command_standby) AND plate_integer = 0) THEN
    cim_time := do_blkdlt_eop;
  ELSIF (file_command = no_file) OR no_plate THEN
    cim_time := date_a_file;
    file_command := command_standby;
  END IF;

WHEN do_blkdlt_eop =>                                               --STATE 8
  IF blkdlt_eop THEN
    IF NOT reworking THEN
      cim_fault(15) := true;
      cim_time := date_a_file;
    ELSE
      file_command := copy_file;
      cim_time := make_putran;
    END IF;
  END IF;

WHEN make_putran =>                                                 --STATE 9
  IF file_command = command_standby THEN
    IF host_available THEN
      IF command_request = 0 THEN
        file_integer := 5;
        command_request := 17;
        dnc_bool(mc2000_cmd_req) := true;
        cim_time := date_a_file;
      END IF;
    ELSE
      cim_time := date_a_file;
    END IF;
  END IF;
END CASE;

END clock_main;
-----------------------------------------------------------------------
```

```
-- ***************************************************************
-- * THIS PROCEDURE CALCULATES THE NEW TIME AND PUTS IT IN THE  *
-- * TIME STRING.                                               *
-- ***************************************************************
--EXAMPLE OF TIME STRING
--1 2 3 4 5 6 7 8 9 1011121314151617181920
--2 8   M A R   1 9 8 5   1 5 : 3 2 : 4 9

PROCEDURE date IS

stop_time : float;
lapse_time : integer;

BEGIN

  stop_time := read_time_real;
  lapse_time := trunc(stop_time - start_time);
  clck_time := 0;
  hrs := hrs + (((mnt * 60) + sec + lapse_time) / 3600);
  mnt :=(mnt + (sec + lapse_time) / 60) REM 60;
  sec :=(sec + lapse_time) REM 60;
  IF hrs > 23 THEN
    hrs := hrs - 24;
    dys := dys + 1;
    IF dys > 31 THEN
      IF time(6) = 'N' THEN
        time(4) := 'F';
        time(5) := 'E';
        time(6) := 'B';
      ELSIF time(6) = 'R' THEN
        time(4) := 'A';
        time(5) := 'P';
        time(6) := 'R';
      ELSIF time(6) = 'Y' THEN
        time(4) := 'J';
        time(5) := 'U';
        time(6) := 'N';
      ELSIF time(6) = 'L' THEN
        time(4) := 'A';
        time(6) := 'G';
      ELSIF time(6) = 'G' THEN
        time(4) := 'S';
        time(5) := 'E';
        time(6) := 'P';
      ELSIF time(6) = 'T' THEN
        time(4) := 'N';
        time(5) := 'O';
        time(6) := 'V';
      ELSIF time(6) = 'C' THEN
        time(4) := 'J';
        time(5) := 'A';
        time(6) := 'N';
        c_tc_i(time, 8, 4, yrs);
        yrs := yrs + 1;
        i_to_c(yrs, 4, 8, time);
      END IF;
      dys := 1;
    ELSIF dys > 30 THEN
      IF time(5) = 'P' THEN
        time(4) := 'M';
        time(5) := 'A';
        time(6) := 'Y';
        dys := 1;
      ELSIF time(5) = 'U' AND time(6) = 'N' THEN
        time(6) := 'L';
        dys := 1;
      ELSIF time(6) = 'P' THEN
        time(4) := 'O';
        time(5) := 'C';
        time(6) := 'T';
        dys := 1;
```

```
    ELSIF time(6) = 'V' THEN
      time(4) := 'D';
      time(5) := 'E';
      time(6) := 'C';
      dys := 1; -
    END IF;
  ELSIF dys > 28 THEN
    IF time(6) = 'B' THEN
      time(4) := 'M';
      time(5) := 'A';
      time(6) := 'R';
      dys := 1;
    END IF;
  END IF;
END IF;
i_to_c(dys, 2, 1, time);
i_to_c(hrs, 2, 13, time);
i_to_c(mnt, 2, 16, time);
i_to_c(sec, 2, 19, time);
IF dys < 10 THEN
  time(1) := '0';
END IF;
IF hrs < 10 THEN
  time(13) := '0';
END IF;
IF mnt < 10 THEN
  time(16) := '0';
END IF;
IF sec < 10 THEN
  time(19) := '0';
END IF;
start_time := read_time_real;


END date;
-------------------------------------------------------------------


-- *****************************************************************
-- * THIS PROCEDURE RECEIVES THE NEW TIME FROM THE HOST AND        *
-- * CONVERTS IT TO INTEGER VALUES.                                *
-- *****************************************************************
PROCEDURE set_time IS


BEGIN
                                   --CAPTURE DATA FROM HOST IN TIME STRING
  start_time := read_time_real;
  c_to_i(time, 1, 2, dys);
  c_to_i(time, 13, 2, hrs);
  c_to_i(time, 16, 2, mnt);
  c_to_i(time, 19, 2, sec);
  IF init_clock THEN
    init_clock := false;
    clock_is_set := true;
  END IF;


END set_time;
---------------------------------------------------------------
END clock;
```

```
-- ***************************************************************
-- *                                                             *
-- * SOFTWARE BY PAUL COLANANNI (A&ES) FOR                       *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

PACKAGE dncdec IS

-- DNC BOOLEAN ARRAY ASSIGNMENTS
-- RESERVE FIRST SIX BOOLEANS FOR PARAMETERS
bool_param1       : CONSTANT integer := 001;
bool_param2       : CONSTANT integer := 002;
bool_param3       : CONSTANT integer := 003;
bool_param4       : CONSTANT integer := 004;
bool_param5       : CONSTANT integer := 005;
bool_param6       : CONSTANT integer := 006;

dnc_auto_mode     : CONSTANT integer := 007;
-- CONTROLLED BY THE MCL. INDICATES
-- WHEN DNC COMMANDS ARE PERMITTED. HOST SHOULD MONITOR.

dnc_fnction_rdy   : CONSTANT integer := 008;  --FIXED STATUS BIT #15
-- WHEN THE DNC_INT(MCL_COMMAND_NO) IS 4000 TO 4999 (A HOST FUNCTION),
-- THE MCL WILL SET THIS BOOLEAN TO INDICATE THAT THE FUNCTION DATA
-- HAS BEEN LOADED INTO THE DNC_ARRAYS. THE MCL WILL CLEAR THIS ELEMENT
-- THE NEXT TIME DNC_DATA_RDY IS SET BY THE HOST.

mc2000_data_req   : CONSTANT integer := 009;  --FIXED STATUS BIT #14
mc2000_cmd_req    : CONSTANT integer := 010;  --FIXED STATUS BIT #13
get_date          : CONSTANT integer := 011;  --FIXED STATUS BIT #12
strtup_in_proc    : CONSTANT integer := 012;  --FIXED STATUS BIT #11
mc2000_status     : CONSTANT integer := 013;  --FIXED STATUS BIT #10
trans_report      : CONSTANT integer := 014;  --FIXED STATUS BIT #09
prog_check        : CONSTANT integer := 015;  --FIXED STATUS BIT #08
time_report       : CONSTANT INTEGER := 016;  --FIXED STATUS BIT #07
--                : CONSTANT INTEGER := 017;
--                : CONSTANT INTEGER := 018;
--                : CONSTANT INTEGER := 019;
--                : CONSTANT INTEGER := 020;
--                : CONSTANT INTEGER := 021;
--                : CONSTANT INTEGER := 022;
--                : CONSTANT INTEGER := 023;
--                : CONSTANT INTEGER := 024;
--                : CONSTANT INTEGER := 025;
--                : CONSTANT INTEGER := 026;
--                : CONSTANT INTEGER := 027;
--                : CONSTANT INTEGER := 028;
--                : CONSTANT INTEGER := 029;
--                : CONSTANT INTEGER := 030;

rvi_was_sent      : CONSTANT integer := 031;

-- SET TO TRUE BY THE DNC SOFTWARE WHEN NON_POLLED STATUS REPORTING
-- IS SELECTED IN MSD AND RVI IS SENT TO THE HOST. THE MCL SHOULD
-- SET TO FALSE.
```

```
dnc_data_rdy        : CONSTANT integer := 032;
-- INDICATES THAT THE DATA IN THE DNC ARRAYS HAVE BEEN LOADED FOR
-- MCL ACCESS.  THE DNC SOFTWARE SETS THIS ELEMENT TO TRUE.  THE MCL
-- MUST SET TO FALSE WHEN THE DATA IN THE ARRAYS IS NO LONGER REQUIRED.

-- DNC INTEGER ARRAY ASSIGNMENTS------------------------------------------

no_bool_params      : CONSTANT integer := 001;
no_float_params     : CONSTANT integer := 002;
no_int_params       : CONSTANT integer := 003;
no_str6_params      : CONSTANT integer := 004;
no_str10_params     : CONSTANT integer := 005;
no_str64_params     : CONSTANT integer := 006;

-- RESERVE NINE INTEGER ELEMENTS AS PARAMETERS
int_param1          : CONSTANT integer := 007;
int_param2          : CONSTANT integer := 008;
int_param3          : CONSTANT integer := 009;
int_param4          : CONSTANT integer := 010;
int_param5          : CONSTANT integer := 011;
int_param6          : CONSTANT integer := 012;
int_param7          : CONSTANT integer := 013;
int_param8          : CONSTANT integer := 014;
int_param9          : CONSTANT integer := 015;

mcl_command_no      : CONSTANT integer := 016;

-- DNC FLOAT ARRAY ASSIGNMENTS.  ALL FLOAT ELEMENTS ARE RESERVED AS
-- PARAMETERS.------------------------------------------------------------
float_param1        : CONSTANT integer := 001;
float_param2        : CONSTANT integer := 002;
float_param3        : CONSTANT integer := 003;
float_param4        : CONSTANT integer := 004;

-- STR6 ASSIGNMENTS.  ALL ARE RESERVED AS PARAMETERS--------------------
str6_param1         : CONSTANT integer := 001;
str6_param2         : CONSTANT integer := 002;

-- STR10 ASSIGNMENTS------------------------------------------------------
str10_param1        : CONSTANT integer := 001;
str10_param2        : CONSTANT integer := 002;

-- STR64 ASSIGNMENTS------------------------------------------------------
str64_param1        : CONSTANT integer := 001;
str64_param2        : CONSTANT integer := 002;

--*************** HOST COMMANDS ****************************************
-- HOST ACKNOWLEDGEMENT
host_acknl          : CONSTANT integer := 1999;
-- USED BY THE HOST TO INFORM THE 2000 THAT IT HAS RECEIVED A REQUEST.

-- SERVO STOP REQUEST
servo_stop_req      : CONSTANT integer := 2017;
-- USED BY THE HOST TO CAUSE A SERVO STOP IN A WORKSTATION

-- SPECIAL DNC PROCEDURES. COMMANDS FROM HOST.
-- 3000 TO 3999-------------------  -------------------------------------

cell_cntrl_avail : CONSTANT integer := 3000;
-- USED TO INFORM THE 2000 OV THE AVAILABILITY OF THE CELL CONTROL.
-- PARAMETER = 1 WHEN CELL CONTROL IS AVAILABLE AND 0 WHEN IT IS
-- NOT AVAILABLE.

date_data           : CONSTANT integer := 3001;
-- USED BY THE HOST TO PASS DATE AND TIME DATA TO THE 2000
-- HOST WILL SEND 1 STR64 PARAMETER AS FOLLOWS:
--              12 JAN 1986 15:23:12

dev_ready_state     : CONSTANT integer := 3002;
-- USED BY THE HOST TO INFORM THE 2000 IS THAT AN AGV IS IN ITS READY
-- POSITION
```

```
-- HOST SENDS ONE INTEGER PARAMETER AS FOLLOWS:
--            1 = PLATE PICKUP AT READY POSITION
--            2 = PLATE DELIVERY AT READY POSITION
--            3 = MAG PICKUP AT READY POSITION
--            4 = MAG DELIVERY AT READY POSITION
--            5 = CHIP BUCKET PICKUP AT READY POSITION
--            6 = CHIP BUCKET DELIVERY AT READY POSITION
--            7 = PLATE AGV HAS COMPLETED TASK
--            8 = MAG AGV HAS COMPLETED TASK
--            9 = CHIP AGV HAS COMPLETED TASK

mc2000_data       : CONSTANT integer := 3003;
-- USED BY THE HOST TO RETURN THE DATA THAT THE 2000 REQUESTED
-- WITH THE 4002 FUNCTION COMMAND (SEE 4002 BELOW)
-- PARAMETERS VARY DEPENDING ON THE 4002 COMMAND

program_ok        : CONSTANT integer := 3004;
-- USED BY THE HOST TO RELEASE THE 2000 AFTER THE HOST HAS CHECKED
-- THE PART PROGRAM, TOOLING, ETC.

verify_file_retn : CONSTANT integer := 3005;
-- USED BY THE HOST TO INFORM THE 2000 THAT THE VERIFY FILE HAS BEEN
-- RETURNED TO THE 2000.

chg_tool_magz     : CONSTANT integer := 3006;
-- USED BY THE HOST TO INFORM THE 2000 TO CHANGE THE TOOL MAGAZINE

chg_swarf_cont    : CONSTANT integer := 3007;
-- USED BY THE HOST TO INFORM THE 2000 TO CHANGE THE SWARF CONTAINER

mag_config_file   : CONSTANT integer := 3008;
-- USED BY THE HOST TO INFORM THE 2000 A CONFIG FILE WAS DOWNLOADED

plt_config_file   : CONSTANT integer := 3009;
-- USED BY THE HOST TO INFORM THE 2000 A CONFIG FILE WAS DOWNLOADED

agv_avail         : CONSTANT integer := 3010;
-- USED BY THE HOST TO INFORM THE 2000 THAT THE AGV SYSTEM IS AVAILABLE

agv_not_avail     : CONSTANT integer := 3011;
-- USED BY THE HOST TO INFORM THE 2000 THAT THE AGV SYSTEM IS NOT AVAILABLE

trans_file_del    : CONSTANT integer := 3012;
-- USED BY THE HOST TO INFORM THE 2000 THAT THE TRANSFER FILE IS DELETED

cell_down         : CONSTANT integer := 3013;
-- USED BY THE HOST TO INFORM THE 2000 THAT THE CELL CONTROLLER IS DOWN

cell_up           : CONSTANT integer := 3014;
-- USED BY THE HOST TO INFORM THE 2000 THAT THE CELL CONTROLLER IS UP

prog_downld       : CONSTANT integer := 3015;
-- USED BY THE HOST TO INFORM THE 2000 THAT THE PROGRAM HAS BEEN DOWNLOADED

cell_error_state : CONSTANT integer := 3016;
-- USED BY THE HOST TO INFORM THE 2000 THAT THE CELL CONTROLLER IS IN
-- ERROR STATE

cell_error_retrn : CONSTANT integer := 3017;
-- USED BY THE HOST TO INFORM THE 2000 THAT THE CELL CONTROLLER HAS
-- RETURNED FROM ERROR STATE

mag_data          : CONSTANT integer := 3018;
-- USED BY THE HOST TO RETURN THE DATA THAT THE 2000 REQUESTED
-- WITH THE 4002 FUNCTION COMMAND (SEE 4002 BELOW)
-- PARAMETERS VARY DEPENDING ON THE 4002 COMMAND

mach_off_line     : CONSTANT integer := 3019;
-- USED BY THE HOST TO RELEASE THE 2000 FROM ON LINE CONDITION
```

```
pass_word         : CONSTANT integer := 3020;
-- USED BY THE HOST TO GIVE A NEW PASSWORD TO THE 2000
-- HOST WILL SEND ONE STR6 PARAMETER WITH THE NEW PASSWORD

delete_file       : CONSTANT integer := 3021;
-- USED BY THE HOST TO TELL THE 2000 TO DELETE A FILE
-- HOST SENDS ONE INTEGER PARAMETER AS FOLLOWS:
--           1 = DELETE PUTRAN.MCL
--           2 = DELETE CONFIG.MCL

-- SPECIAL DNC PROCEDURES. COMMANDS FROM HOST.
-- 4000 TO 4999.---------------------------------------------------------

wrk_station_stat : CONSTANT integer := 4000;
-- 2000 WILL RETURN 8 INTEGER PARAMETERS IDENTIFYING THE WORKSTATION STATUS
-- RETURNED INTEGER PARAMETERS ARE:
--         1ST PARAMETER = 1215    MONTH AND DAY PERFORMANCE DATE
--         2ND PARAMETER =   85    YEAR
--         3RD PARAMETER =   10    PERFORMANCE INTERVAL IN DAYS
--         4TH PARAMETER =  110    MONTH AND DAY CALIBRATION INTERVAL
--         5TH PARAMETER =   86    YEAR
--         6TH PARAMETER =    5    CALIBRATION INTERVAL IN DAYS
--         7TH PARAMETER =    3    WORK STATION STATUS VALID VALUES ARE:
--                                 1 = READY AUTO
--                                 2 = READY MANUAL
--                                 3 = NOT AVAILABLE-8TH PARAMETER WILL
--                                     GIVE # OF HRS
--                                 4 = OFF LINE
--         8TH PARAMETER           NUMERICAL CODE OF MATERIAL
--         9TH PARAMETER =    1    # OF HOURS WORKSTATION NOT AVAILABLE
--                                 8TH PARAMETER IS VALID ONLY WHEN
--                                 7TH PARAMETER IS A 3.

mc2000_cmd_data  : CONSTANT integer := 4001;
-- 2000 WILL RETURN ONE TO FOUR INTEGER PARAMETERS IDENTIFYING THE COMMAND
-- AS FOLLOWS:
--          1 = PLATE PICKUP REQUEST
--              A 2ND INTEGER WILL BE PASSED TO IDENTIFY THE NUMBER OF
--              MINUTES BEFORE THE 2000 NEEDS THE PART. A VALUE OF ZERO
--              WILL INDICATE AN IMMEDIATE NEED.
--          2 = PLATE DELIVERY REQUEST
--              A 2ND INTEGER WILL BE PASSED TO IDENTIFY THE NUMBER OF
--              MINUTES BEFORE THE 2000 NEEDS THE PART. A VALUE OF ZERO
--              WILL INDICATE AN IMMEDIATE NEED.
--          3 = MAG PICKUP REQUEST
--          4 = MAG DELIVERY REQUEST
--          5 = CHIP BUCKET PICKUP REQUEST
--              A 2ND INTEGER WILL BE PASSED TO IDENTIFY THE MATERIAL
--              THAT IS IN THE CHIP BUCKET.
--          6 = CHIP BUCKET DELIVERY REQUEST
--              A 2ND INTEGER WILL BE PASSED TO IDENTIFY THE MATERIAL
--              THAT WILL BE PUT IN THE CHIP BUCKET.
--              3RD ADDITIONAL PARAMETER WILL BE TIME ALLOWED FOR CHIPS TO
--              ACCUMLATE IN CONVEYOR
--              4TH ADDITIONAL PARAMETER WILL BE TIME ALLOWED FOR CHIPS TO
--              ACCUMULATE IN BUCKET
--          7 = EXECUTE PLATE AGV TASK
--          8 = EXECUTE MAG AGV TASK
--          9 = EXECUTE CHIP AGV TASK
--         10 = EXECUTE PLATE AGV COMPLETE
--         11 = EXECUTE MAG AGV COMPLETE
--         12 = EXECUTE CHIP AGV COMPLETE
--         13 = PART PROG REQUEST
--              A STR6 WILL ALSO BE SENT TO IDENTIFY THE PROGRAM THE
--              2000 IS LOOKING FOR
--         14 = CONFIG FILE REQ
--         15 = PLATE FILE REQUEST
--         16 = UPLOAD CONFIG FILE REQUEST
--         17 = UPLOAD PLATE FILE REQUEST
--              A SECOND INTEGER WILL BE SENT TO IDENTIFY THE FILE
```

```
--              IF 2ND INTEGER = 1 UPLOAD AND ERASE PUTRAN.MCL
--                             = 2 UPLOAD DETRAN.MCL ONLY
--                             = 3 UPLOAD Q1TRAN.MCL ONLY
--                             = 4 UPLOAD MATRAN.MCL
--                             = 5 UPLOAD AND ERASE PUTRAN.MCL
--         18 = HOLD UP DELIVERY OF PART
--         19 = NO TOOLS FOR NEXT PART
--         20 = EXCHANGE TOOL MAGAZINE
--         21 = EXCHANGE CHIP CONTAINER
--              A 2ND INTEGER WILL BE PASSED TO IDENTIFY THE MATERIAL
--              THAT IS IN THE OLD CHIP BUCKET.
--              A 3RD INTEGER WILL BE PASSED TO IDENTIFY THE MATERIAL
--              THAT WILL BE PUT IN THE NEW CHIP BUCKET.
--              4TH ADDITIONAL PARAMETER WILL BE TIME ALLOWED FOR CHIPS TO
--              ACCUMLATE IN CONVEYOR
--              5TH ADDITIONAL PARAMETER WILL BE TIME ALLOWED FOR CHIPS TO
--              ACCUMULATE IN BUCKET
--
--         22 = ABORT PLATE AGV ROUTINE
--              A 2ND INTEGER WILL BE PASSED TO INDICATE WHETHER THE AGV
--              ROUTINE IS TO BE CANCELLED OR REPEATED
--         23 = ABORT MAG AGV ROUTINE
--              A 2ND INTEGER WILL BE PASSED TO INDICATE WHETHER THE AGV
--              ROUTINE IS TO BE CANCELLED OR REPEATED
--         24 = ABORT CHIPS AGV ROUTINE
--              A 2ND INTEGER WILL BE PASSED TO INDICATE WHETHER THE AGV
--              ROUTINE IS TO BE CANCELLED OR REPEATED
mc2000_req_data   : CONSTANT integer := 4002;
-- 2000 WILL RETURN ONE OR TWO INTEGER PARAMETER IDENTIFYING WHAT DATA
-- THE 2000 IS REQUESTING AS FOLLOWS:
--          1 = VERIFICATION REQUEST
--              HOST WILL UPLOAD VERIFY FILE. WHEN HOST HAS EDITED FILE
--              HOST WILL RETURN FILE AND NOTIFY 2000 WITH A 3005 COMMAND
--          2 = PART SCHEDULE REQUEST. THE 2000 WILL LOAD ONE ADDITIONAL
--              PARAMETER TO IDENTIFY NUM OF MINUTES.
--              3003 RETURNS 1 IF YES
--                           0 IF NO
--          3 = OUT OF TOOLS CONDITION. HOST WILL RETURN WHETHER TO EXCHANGE
--              THE MAGAZINE OR REFURBISH LOCALLY. HOST RETURNS:
--              3006 TO EXCHANGE MAGAZINE
--              3018 TO REFURBISH LOCALLY
transfer_status   : CONSTANT integer := 4003;
-- 2000 WILL RETURN ONE INTEGER TO IDENTIFY WHICH TRANSFER HAS TAKEN
-- PLACE. THE VALUE OF THE INTEGER IS AS FOLLOWS:
--          1 = TRANSFER STATION TO MACHINE
--          2 = TRANSFER STATION TO QUE #1 STATION
--          3 = QUE #1 STATION TO MACHINE
--          4 = MACHINE TO TRANSFER STATION
--          5 = TRANSFER STATION TO QUE #2 STATION
--          6 = QUE #2 STATION TO MACHINE
time_status       : CONSTANT integer := 4004;
-- 2000 WILL RETURN THREE INTEGERS TO INFORM THE HOST OF THE CIM TIME
-- STATUS.
--          1ST INTEGER = CIM TIME ACTIVE IF ONE
--          2ND INTEGER = LOST TIME ACTIVE IF ONE
--          3RD INTEGER = VARIANCE TIME ACTIVE
END dncdec;
```

```
-- *************************************************************
-- *                                                           *
-- * SOFTWARE BY PAUL COLANANNI (A&ES) FOR                     *
-- * AIRCRAFT ENGINE BUSINESS GROUP / GENERAL ELECTRIC COMPANY *
-- *                                                           *
-- *                                                           *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM, THE RELATED *
-- * MATERIAL, AND THE INFORMATION CONTAINED HEREIN, SHALL NOT *
-- * BE DISCLOSED TO OTHERS WITHOUT WRITTEN PERMISSION OF G.E., *
-- * AND SHALL NOT BE DUPLICATED OR USED EXCEPT IN ACCORDANCE  *
-- * WITH THE LIMITED CONDITIONS UNDER WHICH IT WAS PROVIDED BY *
-- * G.E.                                                      *
-- *                                                           *
-- * PROPERTY OF THE AIRCRAFT ENGINE BUSINESS GROUP OF THE     *
-- * GENERAL ELECTRIC COMPANY.                                 *
-- *                                                           *
-- *************************************************************

WITH wndone;   USE wndone;
WITH oemdec;   USE oemdec;

PACKAGE dncmcl IS

dncmcl_master     : auto_masters := auto_run;
agv_position      : integer := 0;
del_sched_time    : integer := 0;
del_time          : integer := 0;
file_integer      : integer := 0;
hours_int         : integer := 0;
material_type     : integer := 0;
pickup_time       : integer := 0;
sched_ret         : integer := 0;
select_material   : integer := 0;
trans_action      : integer := 0;
convyr_off_lmt    : float := 0.0;
chip_tim_lmt      : float := 0.0;
del_answer        : boolean := false;
agv_available     : boolean := true;
cell_is_up        : boolean := false;
chg_chip_cont     : boolean := false;
config_file_rec   : boolean := false;
plate_file_rec    : boolean := false;
part_prog_rec     : boolean := false;
prog_chk_cmplt    : boolean := false;
refurbish_mag     : boolean := false;
verify_returned   : boolean := false;
cell_pswrd        : str6;
mcl_pswrd         : str6;

PROCEDURE dncmcl_main;

END dncmcl;
-- *************************************************************
-- *                                                           *
-- * SOFTWARE BY PAUL COLANANNI (A&ES) FOR                     *
-- * AIRCRAFT ENGINE BUSINESS GROUP / GENERAL ELECTRIC COMPANY *
-- *                                                           *
-- *                                                           *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM, THE RELATED *
-- * MATERIAL, AND THE INFORMATION CONTAINED HEREIN, SHALL NOT *
-- * BE DISCLOSED TO OTHERS WITHOUT WRITTEN PERMISSION OF G.E., *
-- * AND SHALL NOT BE DUPLICATED OR USED EXCEPT IN ACCORDANCE  *
-- * WITH THE LIMITED CONDITIONS UNDER WHICH IT WAS PROVIDED BY *
-- * G.E.                                                      *
-- *                                                           *
-- * PROPERTY OF THE AIRCRAFT ENGINE BUSINESS GROUP OF THE     *
-- * GENERAL ELECTRIC COMPANY.                                 *
-- *                                                           *
-- *************************************************************
```

```
WITH wndone;    USE wndone;
WITH mcldat;    USE mcldat;
WITH mcllib;    USE mcllib;
WITH wndtwo;    USE wndtwo;
WITH oemdec;    USE oemdec;
WITH rel5;      USE rel5;
WITH rel6;      USE rel6;
WITH rel7;      USE rel7;
WITH bubdec;    USE bubdec;
WITH wndmth;    USE wndmth;
WITH clock;     USE clock;
WITH dncdec;    USE dncdec;
WITH menu;      USE menu;
WITH tcntrl;    USE tcntrl;
WITH agvmon;    USE agvmon;
WITH atmlib;    USE atmlib;
WITH ptchk;     USE ptchk;
With xfer;      USE xfer;
With chpmgt;    USE chpmgt;

PACKAGE BODY dncmcl IS

try_cnt          : integer := 0;
reset_com_req    : boolean := false;
------------------------------------------------------------------------
-- ***************************************************************
-- * THIS FUNCTION CHECKS MACHINE STATUS TO SEE IF THE LINK     *
-- * TO THE HOST IS NECESSARY.                                  *
-- ***************************************************************
FUNCTION dncmcl_ok RETURN boolean IS

dncmcl_status : boolean;

BEGIN

  dncmcl_status := true;
  IF ws_status = 4 AND NOT wait_for_status THEN
    dncmcl_status := false;
  END IF;

RETURN dncmcl_status;

END dncmcl_ok;
--------------------------------------------------------------------
-- ***************************************************************
-- * THIS PROCEDURE RESETS THE INTEGER ARRAY TO ZERO WHENEVER   *
-- * A COMMAND IS BEING RECEIVED FROM THE HOST.                 *
-- ***************************************************************
PROCEDURE clrint_param_id IS

BEGIN

  FOR index IN 1..15 LOOP
    dnc_int(index) := 0;
  END LOOP;

END clrint_param_id;
----------------------------------------------------------------------
-- ***************************************************************
-- * THIS PROCEDURE RESETS ALL THE ARRAYS AT POWER UP TIME ONLY *
-- ***************************************************************
PROCEDURE dnc_arr_init IS

BEGIN

  FOR index IN 1..32 LOOP
    dnc_bool(index) := false;
    IF index < 17 THEN
      dnc_int(index) := 0;
    END IF;
    IF index < 5 THEN
```

```
      dnc_flt(index) := float_0;
    END IF;
  END LOOP;

END dnc_arr_init;
-----------------------------------------------------------------------
-- ****************************************************************
-- * THIS PROCEDURE RECEIVES THE CVOMMANDS FROM THE HOST AND      *
-- * SETS WHATEVER FLAGS ARE NECESSARY IN THE MCL                 *
-- ****************************************************************
PROCEDURE dncmcl_main IS

BEGIN

  CASE dncmcl_master IS
    WHEN auto_init =>
      IF ws_status /= 4 THEN
        IF mcl_connect_dnc(true) = success OR try_cnt = 5 THEN
          dncmcl_master := auto_run;
        END IF;
        try_cnt := try_cnt + 1;
        dnc_arr_init;
      END IF;

    WHEN auto_run =>
      IF dncmcl_ok THEN
        IF agv_position /= 0 THEN        -- BUFFER FOR AGV IN READY POSITION
          IF agv_status = agv_stdby THEN
            agv_status := agv_position;
            agv_position := 0;
          END IF;
        END IF;

        IF reset_com_req THEN
          IF host_ack THEN
            host_ack := false;
            k_msg(6805);
            command_request := 0;
            reset_com_req := false;
          ELSIF NOT timer_running(host_ak_tmr) THEN
            p_msg(6805, 5);
          END IF;
        END IF;
        IF dnc_bool(dnc_data_rdy) THEN
          dnc_bool(dnc_fnction_rdy) := false;
          IF ws_status = 1 OR wait_for_status THEN
            CASE dnc_int(mcl_command_no) IS
              WHEN host_ackn1 =>                              --COMMAND 1999
                host_ack := true;      --RESET IMMEDIATELY AFTER USE IN MCL

              WHEN servo_stop_req =>                         -- COMMAND 2017
                store_msg(9006);
                cim_fault(4) := true;
                servo_stop_on(dnc_stop);
                IF nc_status(servo_stop_actv) THEN
                  servo_stop_off(dnc_stop);
                END IF;

              WHEN cell_cntrl_avail =>                        --COMMAND 3000
                host_available := true;

              WHEN date_data =>                               --COMMAND 3001
                FOR index IN 1..20 LOOP
                  time(index) := dnc_str_64(str64_param1)(index);
                END LOOP;
                set_time;
                dnc_bool(get_date) := false;

              WHEN dev_ready_state =>                         --COMMAND 3002
                IF dnc_int(no_int_params) = 1 THEN
                  agv_position := dnc_int(int_param1);
                END IF;
```

```
WHEN mc2000_data =>                                   --COMMAND 3003
  IF dnc_int(no_int_params) = 1 THEN
    del_answer := true;
    sched_ret := dnc_int(int_param1);
  END IF;

WHEN program_ok =>                                    --COMMAND 3004
  prog_chk_cmplt := true;
  dnc_bool(prog_check) := false;

WHEN verify_file_retn =>                              --COMMAND 3005
  verify_returned := true;
  IF file_command = command_standby THEN
    file_command := verfy_to_table;
  END IF;

WHEN chg_tool_magz =>                                 --COMMAND 3006
  host_req_mag := true;

WHEN chg_swarf_cont =>                                --COMMAND 3007
  chg_chip_cont := true;

WHEN mag_config_file =>                               --COMMAND 3008
  config_file_rec := true;

WHEN plt_config_file =>                               --COMMAND 3009
  plate_file_rec := true;

WHEN agv_avail =>                                     --COMMAND 3010
  agv_available := true;

WHEN agv_not_avail =>                                 --COMMAND 3011
  agv_available := false;
WHEN trans_file_del =>                                --COMMAND 3012
  plate_permit := true;

WHEN cell_down =>                                     --COMMAND 3013
  ws_status := 2;
  enum_resp := parameter_change(105, int_to_float(ws_status));
  cursor_line := 2;
  disp_page_select(90);
  ho t available := false;
  pr   chk_cmplt := false;
  standby_chips := true;
  standby_tool := true;
  command_request := 0;
  trans_action := 0;
  data_request := 0;
  kill_msg(6871);

WHEN prog_downld =>                                   --COMMAND 3015
  part_prog_rec := true;

WHEN cell_error_state =>                              --COMMAND 3016
  put_msg(6871, 7, 6);

WHEN cell_error_retrn =>                              --COMMAND 3017
  kill_msg(6871);

WHEN mag_data =>                                      --COMMAND 3018
  refurbish_mag := true;

WHEN mach_off_line =>                                 --COMMAND 3019
  wait_for_status := false;

WHEN pass_word =>                                     --COMMAND 3020
  cell_pswrd := dnc_str_6(str6_param1);

WHEN delete_file =>                                   --COMMAND 3021
  IF dnc_int(int_param1) = 1 THEN
    delete_putran := true;
```

```
  ELSIF dnc_int(int_param1) = 2 THEN
    delete_config := true;
  END IF;

WHEN wrk_station_stat =>                               --COMMAND 4000
  host_ack := false;
  clrint_param_id;
  FOR index IN 0..5 LOOP                        --PERF AND CALIB DATA
    dnc_int(int_param1 + index) := msd_int_table(156 + index);
  END LOOP;
  IF mdi_auto_mode THEN
    dnc_int(int_param7) := 5;
    mdi_auto_mode := false;
  ELSE
    dnc_int(int_param7) := ws_status;      --WORKSTATION STATUS
  END IF;
  dnc_int(int_param8) := tbl_val_int(cust, mat, 1);
  IF dnc_int(int_param7) = 3 THEN
    dnc_int(no_int_params) := 9;
    dnc_int(int_param9) := hours_int;
  ELSE
    dnc_int(no_int_params) := 8;
  END IF;
  dnc_bool(dnc_fnction_rdy) := true;
  dnc_bool(mc2000_status) := false;

WHEN mc2000_cmd_data =>                                --COMMAND 4001
  host_ack := false;
  clrint_param_id;
  dnc_int(no_int_params) := 1;
  CASE command_request IS
    WHEN 1 =>                                  --PLATE PICKUP REQUEST
      dnc_int(no_int_params) := 2;
      dnc_int(int_param1) := 1;
      dnc_int(int_param2) := pickup_time;

    WHEN 2 =>                                --PLATE DELIVERY REQUEST
      dnc_int(no_int_params) := 2;
      dnc_int(int_param1) := 2;
      dnc_int(int_param2) := del_time;

    WHEN 3 =>                                    --MAG PICKUP REQUEST
      dnc_int(int_param1) := 3;

    WHEN 4 =>                                  --MAG DELIVERY REQUEST
      dnc_int(int_param1) := 4;

    WHEN 5 =>                                    --CHIP BUCKET PICKUP
      dnc_int(no_int_params) := 2;
      dnc_int(int_param1) := 5;
      dnc_int(int_param2) := material_type;

    WHEN 6 =>                                  --CHIP BUCKET DELIVERY
      dnc_int(no_int_params) := 2;
      dnc_int(int_param1) := 6;
      dnc_int(int_param2) := select_material;
      dnc_int(no_float_params) := 1;
      dnc_flt(float_param1) := convyr_off_lmt;

    WHEN 7 =>                                   -- EXECUTE PLATE AGV
      dnc_int(int_param1) := 7;

    WHEN 8 =>                                     -- EXECUTE MAG AGV
      dnc_int(int_param1) := 8;

    WHEN 9 =>                                    -- EXECUTE CHIP AGV
      dnc_int(int_param1) := 9;

    WHEN 10 =>                      -- EXECUTE PLATE AGV COMPLETE
      dnc_int(int_param1) := 10;
```

```
    WHEN 11 =>                          -- EXECUTE MAG AGV COMPLETE
      dnc_int(int_param1) := 11;

    WHEN 12 =>                         -- EXECUTE CHIP AGV COMPLETE
      dnc_int(int_param1) := 12;

    WHEN 13 =>                                 -- PART PROG REQUEST
      dnc_int(int_param1) := 13;
      dnc_int(no_str6_params) := 1;
      FOR index IN 1..6 LOOP
        dnc_str_6(str6_param1)(index) := prog_id(index);
      END LOOP;

    WHEN 14 =>                                   -- CONFIG FILE REQ
      dnc_int(int_param1) := 14;

    WHEN 15 =>                                -- PLATE FILE REQUEST
      dnc_int(int_param1) := 15;

    WHEN 16 =>                                -- UPLOAD CONFIG FILE
      dnc_int(int_param1) := 16;

    WHEN 17 =>                                 -- UPLOAD PLATE FILE
      dnc_int(no_int_params) := 2;
      dnc_int(int_param1) := 17;
      dnc_int(int_param2) := file_integer;

    WHEN 18 =>                           -- HOLD UP DELIV OF PLATE
      dnc_int(int_param1) := 18;

    WHEN 19 =>                           -- NO TOOLS FOR NEXT PART
      dnc_int(int_param1) := 19;

    WHEN 20 =>                           -- EXCHANGE TOOL MAGAZINE
      dnc_int(int_param1) := 20;

    WHEN 21 =>                          -- EXCHANGE CHIP CONTAINER
      dnc_int(no_int_params) := 3;
      dnc_int(int_param1) := 21;
      dnc_int(int_param2) := material_type;
      dnc_int(int_param3) := select_material;
      dnc_int(no_float_params) := 2;
      dnc_flt(float_param1) := convyr_off_lmt;
      dnc_flt(float_param2) := chip_tim_lmt;

    WHEN 22 =>                           --ABORT PLATE AGV ROUTINE
      dnc_int(no_int_params) := 2;
      dnc_int(int_param1) := 22;
      dnc_int(int_param2) := cancel_agv;

    WHEN 23 =>                             --ABORT MAG AGV ROUTINE
      dnc_int(no_int_params) := 2;
      dnc_int(int_param1) := 23;
      dnc_int(int_param2) := cancel_agv;

    WHEN 24 =>                            --ABORT CHIP AGV ROUTINE
      dnc_int(no_int_params) := 2;
      dnc_int(int_param1) := 24;
      dnc_int(int_param2) := cancel_agv;

    WHEN OTHERS =>
      NULL;
  END CASE;
  reset_com_req := true;
  start_timer(host_ak_tmr, 1500);               --15 SECS TO ACK
  dnc_bool(dnc_fnction_rdy) := true;
  dnc_bool(mc2000_cmd_req) := false;

WHEN mc2000_req_data =>                            --COMMAND 4002
  host_ack := false;
```

```
        clrint_param_id;
        dnc_int(no_int_params) := 1;
        CASE data_request IS
          WHEN 1 =>                                    -- VERIFY REQUEST
            verify_returned := false;
            dnc_int(int_param1) := 1;
            dnc_bool(mc2000_data_req) := false;

          WHEN 2 =>                                    --PART SCHEDULE REQUEST
            dnc_int(no_int_params) := 2;
            dnc_int(int_param1) := 2;
            dnc_int(int_param2) := del_sched_time;
            dnc_bool(mc2000_data_req) := false;

          WHEN 3 =>                                    --OUT OF TOOLS
            dnc_int(no_int_params) := 1;
            dnc_int(int_param1) := 3;
            dnc_bool(mc2000_data_req) := false;


          WHEN OTHERS =>
            NULL;
        END CASE;
        data_request := 0;
        dnc_bool(dnc_fnction_rdy) := true;

      WHEN transfer_status =>                          --COMMAND 4003
        clrint_param_id;
        dnc_int(no_int_params) := 1;
        dnc_int(int_param1) := trans_action;
        trans_action := 0;
        dnc_bool(dnc_fnction_rdy) := true;
        dnc_bool(trans_report) := false;

      WHEN time_status =>                              --COMMAND 4004
        clrint_param_id;
        dnc_int(no_int_params) := 3;
        IF cim_time_on THEN
          dnc_int(int_param1) := 1;
        ELSE
          dnc_int(int_param1) := 0;
        END IF;
        IF cim_time = lost_time_monit THEN
          dnc_int(int_param2) := 1;
        ELSE
          dnc_int(int_param2) := 0;
        END IF;
        IF cim_time = rework_monitor THEN
          dnc_int(int_param3) := 1;
        ELSE
          dnc_int(int_param3) := 0;
        END IF;
        dnc_bool(dnc_fnction_rdy) := true;
        dnc_bool(time_report) := false;

      WHEN OTHERS =>
        clrint_param_id;
    END CASE;
    dnc_bool(dnc_data_rdy) := false;
  ELSIF ws_status = 2 THEN
    CASE dnc_int(mcl_command_no) IS
      WHEN cell_up =>                                  --COMMAND 3014
        cell_is_up := true;

      WHEN OTHERS =>
        clrint_param_id;
    END CASE;
  END IF;
  dnc_bool(dnc_data_rdy) := false;
END IF;
```

```
        ELSE                                                        -- NOT DNCMCL_OK
          dncmcl_master := auto_error;
          try_cnt := 0;
        END IF;

      WHEN OTHERS =>
        IF mcl_connect_dnc(false) = success OR try_cnt = 5 THEN
          host_available := false;
          dncmcl_master := auto_init;
          try_cnt := 0;
        END IF;
        try_cnt := try_cnt + 1;
    END CASE;

  END dncmcl_main;
  --------------------------------------------------------------------------
  END dncmcl;

-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- *    ERIAL, AND THE INFORMATION CONTAINED HEREIN, SHALL NOT    *
-- * L. DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;    USE wndone;
WITH oemdec;    USE oemdec;

PACKAGE dtmgmt IS

dtmgmt_master     : auto_masters := auto_run;

TYPE dtmgmt_states IS (dtmgmt_standby, record_st, dt_insert, act_probe,
                       fnl_calc, write_st, report_st, check_oot);
dtmgmt_state      : dtmgmt_states := dtmgmt_standby;

TYPE changes IS (wait, rf, zon, cl);
change            : changes := wait;

TYPE querys IS (prompt_standby, prompt_start);
query             : querys := prompt_standby;
scroll_it         : integer := 0;

sn_str_arr        : array (1..5) of string(1..8);
dm_tbl_ptr        : integer := 1;
cc_int            : integer := 0;
dtmgmt_fault      : integer := 0;
sn_num_num        : integer := 1;
err_flag          : boolean := false;
wp_disp           : array (1..5) of boolean;
disp_code         : string(1..3);

PROCEDURE dtmgmt_clear;
PROCEDURE dtmgmt_cancel;
PROCEDURE dtmgmt_main;

END dtmgmt;
```

```
-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

-- ****************************************************************
-- * PACKAGE DESCRIPTION :   DTMGMT.PCL                           *
-- *                                                              *
-- *    THIS PACKAGE CONTAINS ONE MAIN PROCEDURE :                *
-- *                                                              *
-- * DTMGMT_MAIN ;                                                *
-- *    THIS PROCEDURE GETS PROBE DATA FROM THE CLM PORTION OF    *
-- * THE PART PROGRAM, ALONG WITH THE MAXIMUM, AND MINIMUM        *
-- * TOLERANCES. IT CALCULATES THE DEVIATION FROM THE MEAN        *
-- * TOLERANCE AND OUT OF TOLERANCES (IF ANY).                    *
-- *    IF ANY OUT OF TOLERANCES EXIST THEN THIS PROCEDURE WILL   *
-- * NOTIFY THE HOST OR OPERATOR. THE PROCEDURE WILL IN ANY CASE*
-- * APPEND THE PLATE CONFIGURATION FILE WITH THE DATA MANAGE-    *
-- * MENT TABLE COMPILED DURING THE CLM CYCLE. IT WILL ALSO SET   *
-- * A FLAG FOR LATER USE IF AN OUT OF TOLERANCE EXSISTED.        *
-- *                                                              *
-- ****************************************************************

WITH wndone;   USE wndone;
WITH mcldat;   USE mcldat;
WITH mcllib;   USE mcllib;
WITH wndmth;   USE wndmth;
WITH wndtwo;   USE wndtwo;
WITH wndstd;   USE wndstd;
WITH oemdec;   USE oemdec;
WITH oemmst;   USE oemmst;
WITH clock;    USE clock;
WITH rel6;     USE rel6;
WITH rel7;     USE rel7;
WITH bubdec;   USE bubdec;
WITH qcont;    USE qcont;
WITH atmlib;   USE atmlib;
WITH tcntrl;   USE tcntrl;
WITH eopgm;    USE eopgm;

PACKAGE BODY dtmgmt IS

cl_fl             : boolean := false;
id_is_bad         : boolean := false;
remeas            : boolean := false;
no_remeas         : boolean := false;
no_data           : boolean := false;

calc              : integer;
oot_pres          : integer := 0;

max_tol           : float;
deviation         : float;
oot_val           : float;
actual_val        : float;
min_val           : float;
```

```
max_val          : float;

star_st : string(1..1);
----------------------------------------------------------------------
PROCEDURE oot_round IS

BEGIN

  IF ((oot_val < 0.0001) AND (oot_val >= 0.00005)) OR
     ((oot_val > - 0.0001) AND (oot_val <= - 0.00005)) THEN
    IF oot_val > float_0 THEN
      oot_val := 0.0001;
    ELSE
      oot_val := - 0.0001;
    END IF;
  ELSIF ((oot_val > float_0) AND (oot_val <= 0.00005)) OR
        ((oot_val < float_0) AND (oot_val >= - 0.00005)) THEN
    oot_val := float_0;
  END IF;
  IF oot_val > float_0 OR oot_val < float_0 THEN
    IF NOT automcode(al15) THEN
      star_st(1) := '*';
      wp_disp(sn_num_num) := true;
      put_save_bool(wp_disp(sn_num_num), 5 + sn_num_num);
    ELSE
      star_st(1) := 'p';
    END IF;
  END IF;

END oot_round;
----------------------------------------------------------------------
FUNCTION dtmgmt_ok RETURN boolean IS

dtmgmt_status : boolean;

BEGIN

  dtmgmt_status := true;

  IF dtmgmt_fault /= 0 THEN
    dtmgmt_status := false;
  END IF;

RETURN dtmgmt_status;

END dtmgmt_ok;
----------------------------------------------------------------------
PROCEDURE dtmgmt_clear IS

BEGIN

  automcode(al14) := false;
  automcode(al15) := false;
  automcode(al33) := false;
  automcode(al34) := false;
  IF dtmgmt_fault /= 6814 THEN
    dtmgmt_fault := 0;
  END IF;

END dtmgmt_clear;
----------------------------------------------------------------------
PROCEDURE dtmgmt_cancel IS

BEGIN

  dtmgmt_state := dtmgmt_standby;
  query := prompt_standby;
  scroll_it := 0;
  change := wait;
  oot_pres := 0;
  ask := ask_1;
```

```
  cc_int := 0;
  err_flag := false;
  cl_fl := false;
  dm_tbl_ptr := 1;
  deviation := float_0;
  oot_val := float_0;
  postlude_req_off(ptmgt_post);
  no_data := false;
  IF dtmgmt_fault /= 0 THEN
    dtmgmt_master := auto_recovery;
  ELSE
    dtmgmt_master := auto_run
  END IF;

  IF remeas THEN
    var_msg(9007);
    p_msg(6815, 3);
    scroll_it := 11;
    query := prompt_start;
  END IF;

END dtmgmt_cancel;
-------------------------------------------------------------------
PROCEDURE dtmgmt_main IS

pnq : integer;
par_int : string(1..27);
p_in : string(1..4);
loc_number_sn : string(1..14);

BEGIN

  par_int := " ABCDEFGHIJKLMNOPQRSTUVWXYZ";
  loc_number_sn := "(LCN 0 )012345";

  CASE dtmgmt_master IS
    WHEN auto_init =>
      dtmgmt_master := auto_run;

    WHEN auto_run =>
      IF dtmgmt_ck THEN
        CASE dtmgmt_state IS
          WHEN dtmgmt_standby =>                                   --STATE 0
            IF automcode(a105) THEN
              FOR index in 1..tbl_limit LOOP
                IF tbl_val_float(cust, mx, index) > 0.0001 THEN
                  exit;
                END IF;
                IF index = tbl_limit THEN
                  no_data := true;
                END IF;
              END LOOP;
              IF file_command = no_file THEN
                file_command := command_standby;
              END IF;
              dtmgmt_state := check_oot;
              sn_num_num := truncate(138);
              automcode(a105) := false;
            ELSIF automcode(a114) OR automcode(a133) OR
                  automcode(a134) OR automcode(a115) THEN
              dm_tbl_ptr := truncate(112);
              sn_num_num := truncate(138);
              IF dm_tbl_ptr = 0 THEN
                dm_tbl_ptr := 1;
              END IF;
              IF dm_tbl_ptr > 40 THEN
                dtmgmt_fault := 6813;
              END IF;
              IF automcode(a114) OR automcode(a115) THEN
                calc := 0;
```

```
      ELSE
        IF dm_tbl_ptr < 3 THEN
          dtmgmt_fault := 6830;
        END IF;
        IF automcode(a133) THEN
          calc := 1;
        ELSE
          cal  := 2;
        END IF;
      END IF;
      change := rf;
      dtmgmt_state := record_st;
    END IF;

  WHEN record_st =>                                          --STATE 1
    CASE change IS
      WHEN wait =>
        NULL;

      WHEN rf =>
        p_val(35);
        f_to_c(t_val, 5, 0, 1, p_in);
        FOR index IN 1..3 LOOP
          zone_tbl_str(index) := p_in(1 + index);
        END LOOP;
        change := zon;                                --SETS RF FOR TABLE

      WHEN zon =>
        p_val(38);
        IF t_val < float_2700 THEN
          f_to_c(t_val, 5, 0, 1, p_in);
          FOR i IN 1..4 LOOP
            IF p_in(i) = ' ' THEN
              p_in(i) := '0';
            END IF;
          END LOOP;
            FOR index IN 1..2 LOOP
              zone_tbl_str(index + 4) := p_in(2 + index);
            END LOOP;
          cl_fl := true;
          change := cl;
        ELSE
          dtmgmt_fault := 6823;
        END IF;

      WHEN cl =>
        p_val(39);
        IF (t_val < float_2700) OR ((truncate(39) REM 100) < 27) THE

          IF cl_fl THEN
            zone_tbl_str(8) := par_int(((truncate(039)) / 100) + 1);
            cl_fl := false;
          ELSE
          zone_tbl_str(9) := par_int(((truncate(039)) REM 100) + 1);
            change := wait;
            dtmgmt_state := dt_insert;
          END IF;
        ELSE
          dtmgmt_fault := 6823;
        END IF;
    END CASE;

  WHEN dt_insert =>                                          --STATE 2
    IF tbl_chg_char(cust, zone, dm_tbl_ptr, zone_tbl_str) =
       table_oper_ok THEN
     dtmgmt_state := act_probe;
    END IF;

  WHEN act_probe =>                                          --STATE 3
    i_to_c(tbl_val_int(cust,mtype,active_face),4,1,tool_thing);
    i_to_c(tbl_val_int(cust,ser,active_face),4,5,tool_thing);
```

```
IF tbl_chg_char(cust,tool_dt,dm_tbl_ptr,tool_thing) =
  table_oper_ok THEN
  dtmgmt_state := fnl_calc;
END IF;
                                                          --STATE 4
WHEN fnl_calc =>
  CASE calc IS
    WHEN 0 =>
      deviation := tbl_val_float(cust, act, dm_tbl_ptr) -
        ((tbl_val_float(cust, mx, dm_tbl_ptr) + tbl_val_float
        (cust, mn, dm_tbl_ptr)) / float_2);
      calc := 4;

    WHEN 1 =>
      IF tbl_val_float(cust, oot,(dm_tbl_ptr - 3)) < float_0 THEN
        dtmgmt_state := write_st;
      ELSE
        max_tol := ((tbl_val_float(cust, act,(dm_tbl_ptr - 3)) -
          tbl_val_float(cust, mn,(dm_tbl_ptr - 3))) / float_2) +
          ((tbl_val_float(cust, mx,(dm_tbl_ptr - 2)) -
          tbl_val_float(cust, mn,(dm_tbl_ptr - 2))) / float_2);
        calc := 3;
      END IF;

    WHEN 2 =>
      IF tbl_val_float(cust, oot,(dm_tbl_ptr - 3)) < float_0 THEN
        dtmgmt_state := write_st;
      ELSE
        max_tol := tbl_val_float(cust, act,(dm_tbl_ptr - 3)) -
                   tbl_val_float(cust, mn,(dm_tbl_ptr - 3)) +
                   tbl_val_float(cust, mx,(dm_tbl_ptr - 2)) -
                   tbl_val_float(cust, mn,(dm_tbl_ptr - 2));
        calc := 3;
      END IF;

    WHEN 3 =>
      deviation := sqrt(sqr(tbl_val_float(cust, dev,
        (dm_tbl_ptr - 2))) + sqr(tbl_val_float(cust, dev,
        (dm_tbl_ptr - 1))));
      response := tbl_chg_float(cust, mx, dm_tbl_ptr, max_tol);
      response := tbl_chg_float(cust, mn, dm_tbl_ptr, float_0);
      response := tbl_chg_float(cust, act, dm_tbl_ptr, deviation);
      response := tbl_chg_float(cust, dev, dm_tbl_ptr, deviation);
      calc := 4;

    WHEN 4 =>
      actual_val := tbl_val_float(cust, act, dm_tbl_ptr);
      min_val := tbl_val_float(cust, mn, dm_tbl_ptr);
      max_val := tbl_val_float(cust, mx, dm_tbl_ptr);
      IF actual_val > max_val THEN
        oot_val := actual_val - max_val;
        oot_round;
      ELSIF actual_val < min_val THEN
        oot_val := actual_val - min_val;
        oot_round;
      ELSE
        oot_val := float_0;
        star_st(1) := ' ';
      END IF;
      dtmgmt_state := write_st;
      response := tbl_chg_char(cust, star, dm_tbl_ptr, star_st);
      response := tbl_chg_float(cust, dev, dm_tbl_ptr, deviation);
      response := tbl_chg_float(cust, oot, dm_tbl_ptr, oot_val);
      calc := 0;

    WHEN OTHERS =>
      NULL;
  END CASE;
                                                          --STATE 5
WHEN write_st =>
  automcode(a105) := false;
```

```
  automcode(a115) := false;
  automcode(a133) := false;
  automcode(a134) := false;
  dtmgmt_state := dtmgmt_standby;
  postlude_req_off(ptmgt_post);

WHEN report_st =>                                          --STATE 6
  IF file_command = command_standby THEN
    FOR i IN 1..8 LOOP
      str_old_name(i) := loc_number_sn(i);
    END LOOP;
    IF sn_num_num < 1 OR sn_num_num > 5 THEN
      sn_num_num := 1;
      str_old_name(7) := '?';
    ELSE
      str_old_name(7) := loc_number_sn(9 + sn_num_num);
    END IF;
    file_command := record_qc_data;
    dtmgmt_state := check_oot;
    oot_pres := 3;
  END IF;

WHEN check_oot =>                                          --STATE 7
  CASE oot_pres IS
    WHEN 0 =>
      file_present(3);
      IF file_is_there = 1 THEN
        oot_pres := 1;
      ELSIF file_is_there = 2 THEN
        p_msg(6832, 5);
        dtmgmt_state := dtmgmt_standby;
      END IF;

    WHEN 1 =>
      file_is_there := 0;
      IF no_data THEN
        IF not abortt THEN
          p_msg(6822, 5);
          var_msg(6822);
        END IF;
        oot_pres := 0;
        dtmgmt_state := dtmgmt_standby;
      ELSIF abortt THEN
        dtmgmt_state := report_st;
        oot_pres := 0;
      else
        FOR i IN 1..40 LOOP
          tbl_val_char(cust, star, i, star_st);
          IF star_st(1) = '*' THEN
            oot_pres := 2;
            prelude_req_off(ptmgmt_lude)
            exit;
          END IF;
        END LOOP;
      END IF;
      IF oot_pres = 1 THEN
        IF file_command = command_standby THEN
          wp_disp(sn_num_num) := false;
          put_save_bool(wp_disp(sn_num_num), 5 + sn_num_num);
          str_set(0, 3);
          item1_rec := wp_status(sn_num_num);
          item1_lgt := wp_status_lgt;
          item1_str(1) := 'N';
          item1_str(2) := 'V';
          item1_str(3) := 'R';
          dtmgmt_state := report_st;
          file_command := p_str;
          oot_pres := 0;
        END IF;
        prelude_req_off(ptmgmt_lude);
      END IF;
```

```
        WHEN 2 =>
          dtmgmt_fault := 6814;
          var_msg(6814);
          oot_pres := 0;

        WHEN 3 =>
          IF file_command = command_standby THEN
            FOR i IN zone..star LOOP
              response := tbl_clear(cust, i);
            END LOOP;
            remeas := false;
            no_remeas := false;
            postlude_req_off(ptmgt_post);
            change := wait;
            dtmgmt_state := dtmgmt_standby;
            oot_pres := 0;
          ELSIF file_command = no_file THEN
            p_msg(6832, 5);
            oot_pres := 0;
            dtmgmt_state := dtmgmt_standby;
          END IF;

        WHEN others =>
          oot_pres := 0;
      END CASE;
    END CASE;
  ELSE
    dtmgmt_master := auto_error;
  END IF;

WHEN auto_error =>
  IF dtmgmt_fault = 6814 THEN
    p_msg(dtmgmt_fault, 5);
    disp_page_select(122);
    query := prompt_start;
    dtmgmt_master := auto_recovery;
  ELSE
    set_busy(mcs_cancel);
  END IF;

WHEN auto_recovery =>
  CASE query IS
    WHEN prompt_standby =>
      IF rrise(cycle_start) THEN
          sg(dtmgmt_fault);
        r  tlude_req_off(ptmgt_post);
        dtmgmt_fault := 0;
        dtmgmt_master := auto_run;
      ELSE
        p_msg(dtmgmt_fault, 5);
      END IF;

    WHEN prompt_start =>
      IF active_disp_page = 122 THEN
        disp_sel_lock;
        CASE scroll_it IS
          WHEN 0 =>
            inq_msg :=
    "CANCEL TO REMEASURE/REWORK  [5;7mOR [0m CYCLE START TO CONTINUE ";
            inq_msg(28) := esc;
            inq_msg(36) := esc;
            IF disp_page_line(122,24,inq_msg) THEN
              scroll_it := 2;
              remeas := true;
            END IF;

          WHEN 2 =>
            IF rrise(cycle_start) THEN
              remeas := false;
              erase(122, 24);
              no_remeas := true;
            END IF;
```

```
IF cause_code_opt THEN
  IF no_remeas THEN
    scroll_it := 3;
  END IF;
ELSIF no_remeas THEN
  scroll_it := 7;
END IF;

WHEN 3 =>
  inq_msg :=
"ENTER CAUSE CODE NEXT TO EACH '*' THEN PRESS CYCLE START
  IF disp_page_line(122, 24, inq_msg) THEN
    scroll_it := 4;
  END IF;

WHEN 4 =>
  IF rrise(cycle_start) THEN
    erase(122, 24);
    scroll_it := 5;
    err_flag := false;
  END IF;

WHEN 5 =>
  FOR i IN 1..40 LOOP
    tbl_val_char(cust, star, i, inq_msg);
    IF inq_msg(1) = '*' THEN
      cc_int := 0;
      t_s_i(cause_list, tbl_val_int(cust, cause_code, i),
              cc_int);
    IF cc_int = 0 THEN
      err_flag := true;
    END IF;
  END IF;
END LOOP;
IF err_flag THEN
  err_flag := false;
  scroll_it := 6;
ELSE
  scroll_it := 7;
END IF;

WHEN 6 =>
  inq_msg :=
" [1;7m ILLEAGLE CAUSE CODE FOUND, CORRECT AND PRESS CYC ST [0m  ";
  inq_msg(1) := esc;
  inq_msg(59) := esc;
  IF disp_page_line(122,24,inq_msg) THEN
    scroll_it := 4;
  END IF;

WHEN 7 =>
  inq_msg :=
"ENTER WK PIECE STATUS & BADGE ID:
  scroll_it := 8;

WHEN 8 =>
  ask_oper(33, 24, 1, pnq, oper_cmplt);
  IF oper_cmplt THEN
    FOR i IN 1..37 LOOP
      iteml_str(i) := inq_msg(i);
      IF i < 4 THEN
        disp_code(i) := inq_msg(i);
      END IF;
      IF i > 4 AND i < 10 THEN
        IF inq_msg(i) = ' ' THEN
          id_is_bad := true;
        END IF;
      END IF;
    END LOOP;
    oper_cmplt := false;
    scroll_it := 9;
  END IF;
```

```
          WHEN 9 =>
            IF (disp_code = "AVU" OR disp_code = "AVR" OR
                disp_code = "CVU" OR disp_code = "CVR" OR
                disp_code = "ACC") AND NOT id_is_bad THEN
              IF file_command = command_standby THEN
                str_set(0, 3);
                item1_rec := wp_status(sn_num_num);
                item1_lgt := 37;
                file_command := p_str;
                scroll_it := 11;
              END IF;
            ELSE
              scroll_it := 10;
            END IF;

          WHEN 10 =>
            erase(122, 24);
            id_is_bad := false;
            inq_msg :=
      "BAD DISPOSITION - RE-ENTER AGAIN:
            scroll_it := 8;

          WHEN 11 =>
            k_msg(dtmgmt_fault);
            dtmgmt_fault := 0;
            disp_sel_unlock;
            disp_page_select(60);
            dtmgmt_master := auto_run;
            dtmgmt_state := report_st;
            scroll_it := 0;
            query := prompt_standby;

          WHEN OTHERS =>
            scroll_it := 0;
        END CASE;
      END IF;
    END CASE;
  END CASE;

END dtmgmt_main;
------------------------------------------------------------------------
END dtmgmt;
-- *****************************************************************
-- *                                                               *
-- * SOFTWARE BY BRYAN IRVING (A&ES) FOR                           *
-- * AIRCRAFT ENGINE BUSINESS GROUP / GENERAL ELECTRIC COMPANY      *
-- *                                                               *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RE  TED     *
-- * MATERIAL, AND THE INFORMATION CONTAINED HEREIN, SHAL   OT     *
-- * BE DISCLOSED TO OTHERS WITHOUT WRITTEN PERMISSION OF G.E.,    *
-- * AND SHALL NOT BE DUPLICATED OR USED EXCEPT IN ACCORDANCE      *
-- * WITH THE LIMITED CONDITIONS UNDER WHICH IT WAS PROVIDED BY    *
-- * G.E.                                                          *
-- *                                                               *
-- * PROPERTY OF THE AIRCRAFT ENGINE BUSINESS GROUP OF THE         *
-- * GENERAL ELECTRIC COMPANY.                                     *
-- *                                                               *
-- *****************************************************************

PACKAGE eopgm IS

TYPE eopgm_states IS (eopgm_standby, do_chips, check_abort, prgm_abort_rwd);
eopgm_state      : eopgm_states := eopgm_standby;

TYPE abort_states IS (abort_standby, abort_help, start_abort,
                      save_the_data, ask_reason, record_reason,
                      start_unload, finish_unload, wait_for_m30);
abort_state      : abort_states := abort_standby;
```

```
abortt           : boolean := false;

PROCEDURE eopgm_init;
PROCEDURE eopgm_cancel;
PROCEDURE eopgm_main;

END eopgm;

-- ****************************************************************
-- *                                                              *
-- * SOFTWARE BY BRYAN IRVING (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION    G.E. THIS PROGRAM, THE RELATED    *
-- * MATERIAL, AND THE INFORMA..ON CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

-- ****************************************************************
-- *                                                              *
-- *                      AUTOMATION MCL                          *
-- *                                                              *
-- *                    END-OF-PROGRAM TASK                       *
-- *  THIS PACKAGE IS USED TO MANAGE THE ACTIONS REQUIRED AT      *
-- * THE END OF A PART PROGRAM.  THOSE ACTIONS ARE 1)STORE THE    *
-- * CHIP MANAGEMENT VALUES AND CLEAR THE CHIP MANAGEMENT FLAG    *
-- * (IF THE HOST HAS REQUESTED A CHIP BUCKET EXCHANGE THIS IS    *
-- * RECOGNIZED AND INITIATED BEFORE VALUES ARE STORED). ABORT    *
-- * IS CHECKED AND IF ACTIVE THE PROGRAM IS REWOUND. WHEN        *
-- * COMPLETE THE AUTOMATION MCL IS STARTED OVER.                 *
-- *                                                              *
-- *                    PROGRAM ABORT TASK                        *
-- *      THIS PACKAGE IS USED TO CONTROL THE ACTIONS NEEDED FOR  *
-- * ABORTING A CURRENTLY ACTIVE PART PROGRAM.  IT WILL RESPOND   *
-- * TO AN MCODE THAT WILL CAUSE A MESSAGE TO BE DISPLAYED        *
-- * INSTRUCTING THE ATTENDANT TO REFERENCE THE HELP PAGE FOR     *
-- * ADDITIONAL INFORMATION.  A SECOND INPUT OF THE SAME MCODE    *
-- * IS NECESSARY TO CONTINUE WITH THE ABORT.  WHEN THIS SECOND   *
-- * INPUT IS RECEIVED THE PART STATUS IS CHANGED TO 'I' (FOR     *
-- * INCOMPLETE).  WHEN COMPLETE THE CONVEYOR IS SHUT OFF AND     *
-- * PART MANAGEMENT IS CALLED.  WHEN PART MANAGEMENT IS COM-     *
-- * PLETE THEN END-OF-PROGRAM TASK IS STARTED TO REWIND THE      *
-- * PROGRAM.  ONCE EOPGM  IS FINISHED THE ABORT TASK IS COM-     *
-- * PLETE AND GOES TO STANDBY.                                   *
-- *                                                              *
-- ****************************************************************

WITH wndone;    USE wndone;
WITH mcldat;    USE mcldat;
WITH mcllib;    USE mcllib;
WITH wndtwo;    USE wndtwo;
WITH rel5;      USE rel5;
WITH rel6;      USE rel6;
WITH rel7;      USE rel7;
WITH oemdec;    USE oemdec;
WITH bubdec;    USE bubdec;
WITH dncdec;    USE dncdec;
WITH clock;     USE clock;
WITH dncmcl;    USE dncmcl;
WITH oemmst;    USE oemmst;
WITH menu;      USE menu;
WITH agvmon;    USE agvmon;
WITH atmlib;    USE atmlib;
```

```
WITH tcntrl;   USE tcntrl;
WITH chpmgt;   USE chpmgt;
WITH ptchk;    USE ptchk;
WITH xfer;     USE xfer;
WITH qcont;    USE qcont;
WITH dtmgmt;   USE dtmgmt;

PACKAGE BODY eopgm IS

 -'ay_flag        : boolean;
.  iex            : integer;
str_return        : str10;
----------------------------------------------------------------------
PROCEDURE eopgm_init IS

BEGIN

  FOR mendex IN 1..10 LOOP
    str_return(mendex) := 'Q';
  END LOOP;

END eopgm_init;
----------------------------------------------  ----------------------
PROCEDURE eopgm_cancel IS

BEGIN

  eopgm_state := eopgm_standby;
  abort_state := abort_standby;
  abortt := false;

END eopgm_cancel;
----------------------------------------------------------------------
PROCEDURE eopgm_main IS

pnq : integer;

BEGIN

  CASE abort_state IS
    WHEN abort_standby =>                                    -- STATE 0
      IF automcode(a113) THEN
        abortt := true;
        automcode(a113) := false;
        abort_state := abort_help;
        delay_flag := false;
      END IF;

    WHEN abort_help =>                                       -- STATE 1
      inq_msg :=
        " [7;5mABORT INITIATED! [0m SELECT HELP PAGE FOR INSTRUCTIONS!   ";
      inq_msg(1) := esc;
      inq_msg(23) := esc;
      disp_cust_line(str_return, inq_msg);
      IF rrise(cycle_start) AND NOT delay_flag THEN
        start_timer(page_chng_tmr, 50);          --DELAY FOR FLAG RECOGNITION
        delay_flag := true;
      END IF;
      IF NOT timer_running(page_chng_tmr) AND delay_flag THEN
        IF automcode(a113) THEN
          ram_it_thru := true;
          abort_state := start_abort;
          automcode(a113) := false;
          delete_cust_msg(str_return);
          eopgm_cmplt := false;
          delay_flag := false;
        ELSE
          abortt := false;
          abort_state := abort_standby;
          delete_cust_msg(str_return);
        END IF;
      END IF;
```

```
    WHEN start_abort =>                                         -- STATE 2
      IF put_wp_status(5, 0, false) THEN
        abort_state := save_the_data;
        automcode(a105) := true;
        automcode(a204) := true;
      END IF;

    WHEN save_the_data =>                                       -- STATE 3
      IF dtmgmt_state = dtmgmt_standby THEN
        inq_msg :=
        "ENTER BADGE AND REASON:                                      ";
        abort_state := ask_reason;
      END IF;

    WHEN ask_reason =>                                          -- STATE 4
      ask_oper(23, 20, 1, pnq, oper_cmplt);
      IF oper_cmplt THEN
        oper_cmplt := false;
        abort_state := record_reason;
      END IF;

    WHEN record_reason =>                                       -- STATE 5
      IF file_command = command_standby THEN
        str_set(0, 3);
        item1_loc := plate_loc + 4;
        item1_rec := wp_status(sn_num_num);
        item1_lgt := 37;
        FOR i IN 1..37 LOOP
          item1_str(i) := inq_msg(i);
        END LOOP;
        file_command := p_str;
        abort_state := start_unload;
      END IF;

    WHEN start_unload =>                                        --STATE 6
      IF ptmgmt_state = mgmt_standby THEN
        ptmgmt_state := mgmt_unld;
        abort_state := finish_unload;
      END IF;

    WHEN finish_unload =>                                       --STATE 7
      IF ptmgmt_state = mgmt_standby THEN
        msub_post_off;
        eopgm_state := eopgm_standby;
        automcode(a30) := true;
        abort_state := wait_for_m30;
      END IF;

    WHEN wait_for_m30 =>                                        --STATE 8
      IF eopgm_cmplt THEN
        abortt := false;
        abort_state := abort_standby;
      END IF;
  END CASE;

  CASE eopgm_state IS
    WHEN eopgm_standby =>
      IF automcode(a30) THEN
        automcode(a30) := false;
        IF prgm_updt = datime THEN
          IF cim_time = cim_time_reset THEN
            record_cim_time := true;
          END IF;
          eopgm_cmplt := false;
          chip_cmplt := false;
          tool_count := 0;
          m112_was_run := false;
          default_plo1 := false;
          put_save_bool(default_plo1, 32);
          enum_resp := parameter_change(98, float_0);
          save_index := 0;
```

```
        prev_t_type := 0;
        IF NOT automcode(a308) THEN
          updte_life;
        ELSE
          automcode(a308) := false;
        END IF;
        eopgm_state := do_chips;
      END IF;
    END IF;

  WHEN do_chips =>
    IF chip_flag THEN
      material_type := select_material;
      chip_data_eop;
      IF chip_cmplt THEN                               --CHIP EOP CMPLT

        chip_cmplt := false;
        eopgm_state := check_abort;
        chip_flag := false;                  --CLEAR CHP MNGMNT RUN FLAG
      END IF;
    ELSE
      eopgm_state := check_abort;
    END IF;

  WHEN check_abort =>
    IF abortt THEN
      eopgm_state := prgm_abort_rwd;
    ELSE
      IF nc_status(rewind_complete) THEN
        mcode_val(rewind) := true;
        restrt_menu := true;                     --START AUTOMATION MCL
        eopgm_cmplt := true;
        eopgm_state := eopgm_standby;
      END IF;
    END IF;

  WHEN prgm_abort_rwd =>
    IF program_rewind = success THEN
      IF nc_status(rewind_complete) THEN
        eopgm_cmplt := true;
        eopgm_state := eopgm_standby;
        k_msg(6842);
      ELSE
        p_msg(6842, 5);                          --PGM RWD TIME OUT MSG
      END IF;
    ELSE
      p_msg(6842, 5);
    END IF;
 END CASE;

END eopgm_main;
-----------------------------------------------------------------------
END eopgm;
-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************
```

```
WITH wndone;   USE wndone;
WITH oemdec;   USE oemdec;
PACKAGE lur IS
lur_master         : auto_masters := auto_run;

TYPE check_vers IS (ver_cmplt, ver_1, ver_1a, ver_5, ver_5a, ver_6, ver_7,
                    over_flow);
check_ver          : check_vers := ver_cmplt;

TYPE unld_states IS (unld_standby, unld_start, unld_cmpr, unld_wait,
                     unld_cmplt, unld_all_done);
unld_state         : unld_states := unld_standby;

TYPE ld_states IS (ld_standby, ld_tq, ld_tq_cmplt, ld_chuck, ld_chuck_1a,
                   ld_chuck_1b, ld_wait, ld_chuck_cmplt, ren);

ld_state           : ld_states := ld_standby;

TYPE mdi_states IS (standby, mdi_wait, tm, qm, mt, nw_file);
mdi_state          : mdi_states := standby;

lur_fault          : integer := 0;
ser_ctr            : integer := 0;
file_proc          : integer := 0;
disposition_flag   : boolean := false;
mcl_ld_tq          : boolean := false;
m_ldtr_init        : boolean := false;
rember_deliv       : boolean := false;
ver_str            : ARRAY (1..6) OF string(1..9);

PROCEDURE lur_cancel;
PROCEDURE lur_main;
FUNCTION inspection_res RETURN boolean;

END lur;
-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

-- ****************************************************************
-- * PACKAGE DESCRIPTION :  LUR.PCL                               *
-- *                                                              *
-- *     THIS PACKAGE CONTAINS ONE MAIN PROCEDURE;                *
-- *                                                              *
-- * LUR_MAIN ;                                                   *
-- *      THIS PROCEDURE CONTROLS ALL PART MOVMENT AT THE         *
-- * WORK STATION.  ONLY ACTIVE DURING AUTOMATED RUNNING THIS     *
-- * PROCEDURE CHANGES PLATE CONFIGURATION FILE NAME AND PART     *
-- * STATUS AS PART PASSES THROUGH THE WORKSTATION IN A LOAD      *
-- * UNLOAD, OR MDI PART MOVE.                                    *
-- *      DURING A PART UNLOAD THIS PROCEDURE WILL POLL THE HOST  *
-- * TO FIND OUT IF A PART DELIVERY IS SCHEDULED IF NOT THEN      *
-- * THE DELIVERY EXPECTED FLAG WILL BE HELD UP UNTIL PART CAN    *
-- * BE UNLOADED AND PICKED UP.                                   *
-- *                                                              *
-- ****************************************************************
```

```
WITH clock;     USE clock;
WITH wndone;    USE wndone;
WITH mcldat;    USE mcldat;
WITH mcllib;    USE mcllib;
WITH oemdec;    USE oemdec;
WITH wndtwo;    USE wndtwo;
WITH wndtre;    USE wndtre;
WITH rel6;      USE rel6;
WITH rel7;      USE rel7;
WITH bubdec;    USE bubdec;
WITH xfer;      USE xfer;
WITH atmlib;    USE atmlib;
WITH ptchk;     USE ptchk;
WITH blkdlt;    USE blkdlt;
WITH oemmst;    USE oemmst;
WITH tcntrl;    USE tcntrl;
WITH agvmon;    USE agvmon;
WITH dtmgmt;    USE dtmgmt;
WITH ptldr;     USE ptldr;

PACKAGE BODY lur IS

TYPE recov_flow IS (flow_start, flow_tab, flow_tab_a, flow_1, flow_2);
recov_ovr_flow    : recov_flow := flow_start;

fl_chk            : boolean := false;
md_fl_chk         : boolean := false;
renm              : integer := 0;
q_chk             : integer := 0;
count_sn          : integer := 1;
new_nm            : integer;
program_id        : str6;
disp_code         : string(1..3);
-----------------------------------------------------------------------
FUNCTION lur_ok RETURN boolean IS

lur_status : boolean;

BEGIN

  lur_status := true;
  IF lur_fault /= 0 THEN
    lur_status := false;
  END IF;
RETURN lur_status;

END lur_ok;
-----------------------------------------------------------------------
PROCEDURE lur_cancel IS

BEGIN

  IF lur_fault = 6858 THEN
    kill_msg(6858);
    cnt_dwn;
  END IF;
  IF lur_fault = 6497 THEN
    cnt_dwn;
    kill_msg(6497);
  END IF;
  lur_fault := 0;
  lur_master := auto_run;
  IF unld_state /= unld_all_done THEN
    unld_state := unld_standby;
    unld_cmd := false;
  END IF;
  ld_state := ld_standby;
  check_for_file := chk_standby;
  mdi_state := standby;
  disposition_flag := false;
  m_ldtr_init := false;
```

```
  file_is_there := 0;
  renm := 0;
  q_chk := 0;
  recov_ovr_flow := flow_start;
  count_sn := 1;
  ser_ctr := 1;
  check_ver := ver_1;
  delete_cust_msg("verify chk");

END lur_cancel;
 ---------------------------------------------------------------------
-- *****************************************************************------
-- *     IF PART IS COMPLETE AND THE PART DISPOSITION IN THE      *
-- * PLATE CONFIGURATION FILE IS VERIFY THEN THIS PROCEDURE WILL*
-- * WILL RECORD THE PROGRAM I.D. AND PART SERIAL NUMBER FOR     *
-- * CURRENT PART IN THE VERIFY.MCL FILE.                         *
-- *****************************************************************
FUNCTION inspection_res RETURN boolean IS

status : boolean;
temp_chk_str : string(1..27);

BEGIN

  status := false;
  CASE check_ver IS
    WHEN ver_1 =>
      IF count_sn < 6 THEN
        IF file_command = command_standby THEN
          str_set(0, 4);
          item1_rec := wp_status(count_sn);
          file_command := g_str;
          check_ver := ver_1a;
        END IF;
      ELSE
        count_sn := 1;
        file_command := command_standby;
        check_ver := ver_cmplt;
      END IF;

    WHEN ver_1a =>
        IF file_command = get_data THEN
          IF buffer_string(plate_loc) = 'V' OR
             buffer_string(plate_loc) = 'A' OR
             buffer_string(plate_loc) = 'C'  THEN
            str_set(0, 4);
            count_sn := 1;
            item1_rec := pr_id_rnm;
            file_command := g_str;
            check_ver := ver_5;
          ELSE
            count_sn := count_sn + 1;
            check_ver := ver_1;
            file_command := command_standby;
          END IF;
        ELSIF file_command = no_file THEN
          file_command := command_standby;
          check_ver := ver_cmplt;
        END IF;

    WHEN ver_5 =>
      IF file_command = get_data THEN
        FOR i IN 0..5 LOOP
          ver_str(6)(1 + i) := buffer_string(plate_loc + i);
        END LOOP;
        ser_ctr := 1;
        check_ver := ver_5a;
      END IF;

    WHEN ver_5a =>
      str_set(0, 4);
      item1_rec := serial_num_loc(ser_ctr);
```

```
      check_ver := ver_6;
      file_command := g_str;

    WHEN ver_6 =>
      IF file_command = get_data THEN
        FOR i IN 0..7 LOOP
          ver_str(ser_ctr)(1 + i) := buffer_string(plate_loc + i);
        END LOOP;
        IF ser_ctr > 4 THEN
          file_command := command_standby;
          check_ver := ver_7;
        ELSE
          ser_ctr := ser_ctr + 1;
          check_ver := ver_5a;
        END IF;
      END IF;

    WHEN ver_7 =>
      ver_str(6)(7) := ' ';
      ver_str(6)(8) := '-';
      ver_str(6)(9) := ' ';
      ver_str(5)(9) := ' ';
      FOR i IN 1..4 LOOP
        ver_str(i)(8) := ',';
        ver_str(i)(9) := ',';
      END LOOP;
      FOR i IN 1..11 LOOP
        IF i /= 11 THEN
          tbl_val_char(cust, verify_a, i, temp_chk_str);
          IF temp_chk_str(1) = ' ' THEN
            FOR a IN 1..9 LOOP
              temp_chk_str(a) := ver_str(6)(a);
              temp_chk_str(a + 9) := ver_str(1)(a);
              temp_chk_str(a + 18) := ver_str(2)(a);
            END LOOP;
            response := tbl_chg_char(cust, verify_a, i, temp_chk_str);
            FOR a IN 1..9 LOOP
              temp_chk_str(a) := ver_str(3)(a);
              temp_chk_str(a + 9) := ver_str(4)(a);
              temp_chk_str(a + 18) := ver_str(5)(a);
            END LOOP;
            response := tbl_chg_char(cust, verify, i, temp_chk_str);
            check_ver := ver_cmplt;
            EXIT;
          END IF;
        ELSE
          check_ver := over_flow;
        END IF;
      END LOOP;
      IF file_command = command_standby THEN
        file_command := verfy_to_file;
      END IF;

    WHEN over_flow =>
      CASE recov_ovr_flow IS
        WHEN flow_start =>
          disp_page_select(2);                -- TOO MANY PARTS NEED VER
          recov_ovr_flow := flow_tab;

        WHEN flow_tab =>
          IF active_disp_page = 2 THEN
            disp_sel_lock;
            inq_msg :=
      " [1;7m VERIFICATION TABLE FULL, EDIT TABLE THEN PRESS CYC ST [0m";
              inq_msg(1) := esc;
              inq_msg(61) := esc;
              recov_ovr_flow := flow_tab_a;
           END IF;

        WHEN flow_tab_a =>
          IF privilege_select(4) THEN
```

```
          disp_cust_line("verify chk", inq_msg);
          recov_ovr_flow := flow_1;
       END IF;

    WHEN flow_1 =>
      IF rrise(cycle_start) THEN
        delete_cust_msg("verify chk");
        recov_ovr_flow := flow_2;
      END IF;

    WHEN flow_2 =>
      IF privilege_select(0) THEN
            recov_ovr_flow := flow_start;
            disp_sel_unlock;
            disp_page_select(60);
            check_ver := ver_1;
          END IF;
      END CASE;

      WHEN ver_cmplt =>
        status := true;
        check_ver := ver_1;
  END CASE;

RETURN status;

END inspection_res;
 ----------------------------------------------------------------------
PROCEDURE lur_main IS

BEGIN

  CASE lur_master IS
    WHEN auto_init =>
      lur_master := auto_run;

    WHEN auto_run =>
      IF lur_ok THEN
        CASE ld_state IS
          WHEN ld_standby =>                                  --STATE 0
            IF fl_chk AND file_command = no_file THEN
              lur_fault := 6837;
              file_command := command_standby;
            ELSIF fl_chk OR file_command = command_standby THEN
              fl_chk := false;
            END IF;
            IF nc_status(cyc_start_lt_on) AND lur_fault > 1 THEN
              k_msg(lur_fault);
              lur_fault := 0;
            END IF;

          WHEN ld_tq =>                                       --STATE 1
            IF NOT plate_que AND plate_tra THEN
              IF xgr_park AND
                  (NOT probe_active OR mcl_state = mcl_mdi OR
                   automcode(ld_flag) OR unld_cmd) THEN
                file_present(1);
                IF file_is_there = 1 THEN
                  mcl_ld_tq := true;
                  automcode(a503) := true;
                  renm := 1;
                  q_chk := 0;
                  file_is_there := 0;
                  ld_state := ld_wait;
                ELSIF file_is_there = 2 THEN
                  file_is_there := 0;
                  lur_fault := 6843;
                END IF;
              END IF;
            ELSE
              ld_state := ld_standby;
              automcode(ld_flag) := false;
            END IF;
```

```
 WHEN ld_tq_cmplt =>                                              --STATE 2
   CASE q_chk IS
     WHEN 0 =>
       IF NOT xgr_park THEN
     q_chk := 1;
    END IF;

  WHEN 1 =>
    IF xgr_park THEN
      IF plate_que THEN
        IF plate_integer = 1 THEN
          plate_integer := 2;
          put_save_int(2,7);
        END IF;
        mcl_ld_tq := false;
        ld_state := ren;
      ELSE
        automcode(ld_flag) := false;
        lur_fault := 6497;
        xfer_state := xfer_standby;
        ld_state := ld_standby;
      END IF;
    END IF;

   WHEN OTHERS =>
     q_chk := 0;
 END CASE;

WHEN ld_chuck =>                                                 --STATE 3
  IF plate_que THEN                                -- AND NOT M_LDTR_INIT
    IF file_command = command_standby THEN
      str_set(0, 2);
      item1_rec := pr_id_rnm;
      file_command := g_str;
      ld_state := ld_chuck_1a;
    END IF;
  ELSIF plate_tra THEN
    IF file_command = command_standby THEN
      str_set(0, 1);
      item1_rec := pr_id_rnm;
      file_command := g_str;
      ld_state := ld_chuck_1b;
    END IF;
  END IF;

WHEN ld_chuck_1a =>                                              --STATE 4
  IF file_command = get_data THEN
    FOR index IN 0..5 LOOP
      program_id(index + 1) := buffer_string(plate_loc + index);
    END LOOP;
    IF (prog_id = program_id) AND xgr_park THEN
      renm := 2;
      ld_state := ld_wait;
      automcode(a502) := true;
    ELSIF prog_id /= program_id THEN
      lur_fault := 6834;  --PROG ID DOES NOT MATCH ACTIVE PROGRAM
    END IF;
    file_command := command_standby;
  ELSIF file_command = no_file THEN
    lur_fault := 6837;                              --FILES OUT OF SYNC
    file_command := command_standby;
  END IF;

WHEN ld_chuck_1b =>                                              --STATE 5
  IF file_command = get_data THEN
    FOR index IN 0..5 LOOP
      program_id(index + 1) := buffer_string(plate_loc + index);
    END LOOP;
    IF (prog_id = program_id) AND xgr_park THEN
      renm := 3;
```

```
      ld_state := ld_wait;
      m_ldtr_init := true;
    ELSIF prog_id /= program_id THEN
      lur_fault := 6834;  --PROG ID DOES NOT MATCH ACTIVE PROGRAM
    END IF;
    file_command := command_standby;
  ELSIF file_command = no_file THEN
    lur_fault := 6837;                             --FILES OUT OF SYNC
    file_command := command_standby;
  END IF;

WHEN ld_wait =>                                            --STATE 6
  IF renm = 2 OR renm = 3 THEN
    file_present(3);
  ELSE
    file_present(2);
  END IF;
  IF file_is_there = 1 THEN
    lur_fault := 6858;
  ELSIF file_is_there = 2 THEN
    IF renm = 1 THEN
      ld_state := ld_tq_cmplt;
    ELSIF NOT xgr_park THEN
      ld_state := ld_chuck_cmplt;
    END IF;
    file_is_there := 0;
  END IF;

WHEN ld_chuck_cmplt =>                                     --STATE 7
  IF xgr_park THEN
    IF plate_mac THEN
      plate_integer := 3;
      put_save_int(3,7);
      ld_state := ren;
    ELSE
      automcode(ld_flag) := false;
      lur_fault := 6497;
      xfer_state := xfer_standby;
      ld_state := ld_standby;
    END IF;
  END IF;

WHEN ren =>                                                --STATE 8
  IF renm /= 0 THEN
    IF file_command = command_standby THEN
      IF renm = 1 THEN
        str_set(1, 1);
        str_set(0, 2);
      ELSE
        str_set(0, 3);
        IF renm = 2 THEN
          str_set(1, 2);
        ELSE
          str_set(1, 1);
        END IF;
      END IF;
      file_command := rename;
      IF xgr_park THEN
        IF NOT unld_cmd AND plate_que THEN
          xfer_state := xfer_standby;
        ELSIF (plate_mac AND NOT plate_tra AND NOT plate_que) OR
              unld_cmd THEN
          xfer_state := xfer_start;
        END IF;
        automcode(ld_flag) := false;
        ld_state := ld_standby;
          fl_chk := true;
        END IF;
      ELSIF file_command = no_file THEN
        file_command := command_standby;
        lur_fault := 6837;
```

```
      END IF;
    ELSE
      IF xgr_park THEN
        IF NOT unld_cmd AND plate_que THEN
          xfer_state := xfer_standby;
        END IF;
        automcode(ld_flag) := false;
        ld_state := ld_standby;
      END IF;
    END IF;
  END CASE;
-----------------------------------------------------------------------
  CASE unld_state IS
    WHEN unld_standby =>                                    --STATE 0
      NULL;

    WHEN unld_start =>                                      --STATE 1
      disposition_flag := true;
      p_msg(6812, 7);
      unld_state := unld_cmpr;

    WHEN unld_cmpr =>                                       --STATE 2
      IF NOT disposition_flag and NOT pkup_exp AND
         NOT load_light and plate_permit THEN
        IF plate_tra THEN
          IF ld_state = ld_standby THEN
            ld_state := ld_tq;
            unld_state := unld_standby;
          END IF;
        ELSE
          IF find_trans THEN
            IF tran_num = 1 OR tran_num = 4 THEN
              lur_fault := 6858;
            ELSE
              IF xgr_park THEN
                automcode(a505) := true;
                unld_state := unld_wait;
              END IF;
            END IF;
          END IF;
        END IF;
      END IF;

    WHEN unld_wait =>                                       --STATE 3
      IF NOT xgr_park THEN
        unld_state := unld_cmplt;
      END IF;

    WHEN unld_cmplt =>                                      --STATE 4
      IF xgr_park THEN
        IF plate_tra OR NOT ldin(pres_at_trns) THEN
          FOR i IN 1..5 LOOP
            wp_disp(i) := false;
            put_save_bool(false, 5 + i);
          END LOOP;
          IF file_command = command_standby THEN
            str_set(1, 3);
            str_set(0, 4);
            unld_state := unld_all_done;
            cim_fault(15) := false;
            file_command := rename;

            record_cim_time := true;
          END IF;
        ELSIF NOT plate_tra THEN
          k_msg(6821);
          unld_state := unld_standby;
          lur_fault := 6497;
        END IF;
      END IF;
```

```
  WHEN unld_all_done =>                                          --STATE 5
    CASE file_proc IS
      WHEN 0 =>
        p_msg(6821, 6);
        file_proc := 1;

      WHEN 1 =>
        IF cim_fault(15) THEN
          file_proc := 2;
        END IF;

      WHEN 2 =>
        IF inspection_res THEN
          file_proc := 3;
          cim_fault(15) := false;
        END IF;

      WHEN 3 =>
        IF xgr_park THEN
          IF host_available THEN
            xfer_state := xfer_start;
          END IF;
          k_msg(6821);
          unld_cmd := false;
          unld_state := unld_standby;
          file_proc := 0;
        END IF;

      WHEN OTHERS =>
        NULL;
    END CASE;
END CASE;
---------------------------------------------------------------------
CASE mdi_state IS
  WHEN standby =>                                                --STATE 0
    IF md_fl_chk AND file_command = no_file THEN
      lur_fault := 6837;
      md_fl_chk := false;
      file_command := command_standby;
    ELSE
      md_fl_chk := false;
    END IF;

  WHEN mdi_wait =>                                               --STATE 1
    IF NOT xgr_park THEN
      mdi_state := nw_file;
    END IF;

  WHEN tm =>                                                     --STATE 2
    IF xgr_park THEN
      file_present(3);
      IF file_is_there = 1 THEN
        file_is_there := 0;
        lur_fault := 6858;
      ELSIF file_is_there = 2 THEN
        file_is_there := 0;
        m_ldtr_init := true;
        new_nm := 1;
        mdi_state := mdi_wait;
      END IF;
    END IF;

  WHEN qm =>                                                     --STATE 3
    IF xgr_park THEN
      file_present(3);
      IF file_is there = 1 THEN
        file_is   ere := 0;
        lur_fault := 6858;
      ELSIF file_is_there = 2 THEN
        file_is_there := 0;
        automcode(a502) := true;
```

```
        new_nm := 2;
        mdi_state := mdi_wait;
      END IF;
    END IF;

  WHEN mt =>                                                    --STATE 4
    IF xgr_park THEN
      file_present(1);
      IF file_is_there = 1 THEN
        file_is_there := 0;
        lur_fault := 6858;
      ELSIF file_is_there = 2 THEN
        new_nm := 0;
        IF deliv_exp THEN
          rember_deliv := true;
          kill_msg(6816);
          deliv_exp := false;
          put_save_bool(deliv_exp, 21);
          xfer_state := xfer_standby;
        END IF;
        automcode(a505) := true;
        mdi_state := mdi_wait;
      END IF;
    END IF;

  WHEN nw_file =>                                               --STATE 5
    IF xgr_park THEN
      IF ((new_nm = 0) AND
          (plate_tra OR NOT ldin(pres_at_trns))) OR
          ((new_nm = 1 OR new_nm = 2) AND plate_mac) THEN
        IF file_command = command_standby THEN
          IF (new_nm = 0) THEN
            str_set(1, 3);
            str_set(0, 1);
            cim_time_run := true;
            IF rember_deliv THEN
              rember_deliv := false;
              xfer_state := part_is_gone;
            END IF;
          ELSE
            str_set(0, 3);
            plate_integer := 3;
            put_save_int(3, 7);
            IF new_nm = 1 THEN
              str_set(1, 1);
            ELSE
              str_set(1, 2);
            END IF;
          END IF;
          file_command := rename;
          mdi_state := standby;
          prelude_req_off(ptmgmt_lude);
          msub_post_off;
          md_fl_chk := true;
        ELSIF file_command = no_file THEN
          lur_fault := 6837;
          file_command := command_standby;
        END IF;
      ELSE
        mdi_state := standby;
        prelude_req_off(ptmgmt_lude);
        msub_post_off;
        md_fl_chk := true;
      END IF;
    END IF;
  END CASE;
ELSE
  IF lur_fault = 6858 OR lur_fault = 6497 THEN
    put_msg(lur_fault, 6, 6);
    store_msg(lur_fault);
  ELSE
```

```
          p_msg(lur_fault, 6);
        END IF;
        lur_master := auto_error;
      END IF;

    WHEN auto_error =>
      IF lur_fault = 6858 OR lur_fault = 6497 THEN
        file_is_there := 0;
        set_busy(feedhold);
        lur_master := auto_recovery;
      ELSIF lur_fault = 6843 THEN
        lur_master := auto_recovery;
      END IF;

    WHEN auto_recovery =>
      IF lur_fault = 6858 OR lur_fault = 6497 THEN
        NULL;
      ELSIF lur_fault = 6843 THEN
        IF rrise(cycle_start) THEN
          kill_msg(6843);
          lur_fault := 0;
          lur_master := auto_run;
        END IF;
      END IF;
  END CASE;

END lur_main;
-----------------------------------------------------------------------
END lur;
-- ****************************************************************
-- *                                                              *
-- * SOFTWARE BY BRYAN IRVING (A&ES) FOR                          *
-- * AIRCRAFT ENGINE BUSINESS GROUP / GENERAL ELECTRIC COMPANY   *
-- *                                                              *
-- *                                                              *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY *
-- * G.E.                                                         *
-- *                                                              *
-- * PROPERTY OF THE AIRCRAFT ENGINE BUSINESS GROUP OF THE       *
-- * GENERAL ELECTRIC COMPANY.                                    *
-- *                                                              *
-- ****************************************************************

WITH wndone;   USE wndone;
WITH oemdec;   USE oemdec;

PACKAGE menu IS

menu_master        : auto_masters := auto_init;

TYPE menu_states IS (menu_standby, display, input_mode, status, tst_host,
                     reset_ps, ref_wait);
menu_state         : menu_states := menu_standby;

TYPE process_ps IS (upload, pp_dnc, datime, wait_1, wait_2);
prgm_updt          : process_ps := upload;

ready_auto         : CONSTANT integer := 1;                    --WS STATUS
ready_manual       : CONSTANT integer := 2;                    --   "
not_available      : CONSTANT integer := 3;                    --   "
off_line           : CONSTANT integer := 4;                    --   "
cursor_line        : integer := off_line;          --MENU CURSOR POSITION
dcf_index          : integer;               --OEMDSP CURSOR INDEX VARIABLE
menu_fault         : integer := 0;
sel_curs_index     : integer := 110;                --OEM PAGE SELECTION
ws_status          : integer := off_line;           --CURRENT WS STATUS
```

```
eopgm_cmplt         : boolean := false;              --EOP COMPLETION FLAG
erase_inquire       : boolean := false;    --FLAG TO ALLOW ERASE OF INQ PROMPT
hours_set           : boolean := false;            --HOURS HAVE BEEN SET FLAG
mdi_auto_mode       : boolean := false;
prog_was_running    : boolean := false;
restart_prog      : boolean := false;
restrt_menu         : boolean := false;       --FLAG TO START MENU AGAIN
select_flag         : boolean := false;       --WS STATUS HAS BEEN CHANGED
tool_mag_deliver    : boolean := false;
wait_for_status     : boolean := false;

ws_num_asc          : string(1..7);           --WORKSTATION ID
hours               : string(1..2);           --HOURS NOT AVAILABLE

PROCEDURE menu_init;
PROCEDURE menu_cancel;
PROCEDURE menu_main;

END menu;

-- ****************************************************************
-- *                                                              *
-- * SOFTWARE BY BRYAN IRVING (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

-- ****************************************************************
-- *                                                              *
-- *                    AUTOMATION MCL                            *
-- *                                                              *
-- *            WORKSTATION OPERATING MODE MENU                   *
-- *                                                              *
-- *   THIS PACKAGE WILL BE USED TO CONTROL THE START OF THE      *
-- * AUTOMATION MCL(AMCL) AT START UP AND AFTER EACH PASS         *
-- * THROUGH A PART PROGRAM.  AN MCODE WILL BE USED TO START      *
-- * THE AMCL AS WELL AS CHANGE THE OPERATING MODE. A FLAG WILL   *
-- * BE USED BY THE END-OF-PROGRAM TASK TO START THE AMCL AFTER   *
-- * EACH PASS THROUGH THE PART PROGRAM. THE MCODE WILL ALLOW     *
-- * THE ATTENDANT TO SELECT ONE OF FOUR OPERATING MODES FOR THE*
-- * AMCL; READY_AUTO, READY_MANUAL, NOT_AVAILABLE, & OFF_LINE.   *
-- * THESE MODES ARE DEFINED BY AEBG. ONCE THIS PACKAGE IS        *
-- * STARTED VIA MCODE IT WILL PROMPT THE OPERATOR FOR MODE       *
-- * SELECTION USING CURSORING AND ENTER FUNCTIONS. IF ATTENDANT*
-- * SELECTS A MODE OTHER THAN OFF-LINE AND THE HOST IS AVAIL-    *
-- * ABLE THEN UPLOAD OF STATUS/DOWNLOAD OF TIME&DATE IS CALLED   *
-- * FOR BY THIS PACKAGE. IF READY-AUTO IS SELECTED THEN HOST IS*
-- * CALLED TO UPDATE PART PROGRAMS. ONCE COMPLETE CONTROL IS     *
-- * PASSED TO THE PART MANAGEMENT TASK AUTOMATICALLY. IF MODE    *
-- * IS OTHER THAN READY-AUTO A MESSAGE IS DISPLAYED AND CON-     *
-- * TROL WILL NOT PASS TO PART MANAGEMENT UNTIL AN MCODE IS IN-*
-- * PUT.                                                         *
-- *   IF ATTENDANT DOES NOT ENTER A MODE WHEN PROMPTED THEN A    *
-- * TIME OUT OCCURS AND IF THE HOST IS AVAILABLE THEN A MESSAGE*
-- * IS DISPLAYED; IF NOT, THEN OFF-LINE MODE IS SELECTED AND     *
-- * MANUAL INPUT OF THE DATE IS REQUIRED.                        *
-- *   IN READY-MANUAL & NOT-AVAILABLE ATTENDANT MUST CHECK FOR   *
-- * PART PROGRAM AND PART AVAILABLILITY. HOURS ENTERED IN NOT-   *
```

```
-- * AVAILABLE INDICATE TO THE HOST NOT TO SCHEDULE WORK FOR     *
-- * THIS WORKSTATION FOR THAT AMOUNT OF TIME.                   *
-- *    IN READY-AUTO PART PROGRAM DESELECTION OCCURS AUTOMATIC- *
-- * ALLY BY SELECTING A 'DUMMY' PROGRAM.                        *
-- *    AMCL WILL NOT BE ALLOWED TO RUN AT START UP UNTIL ALL    *
-- * AXIS HAVE BEEN REFERENCED.                                  *
-- *                                                             *
--                                                               *
-- ***************************************************************

WITH wndone;   USE wndone;
WITH mcldat;   USE mcldat;
WITH mcllib;   USE mcllib;
WITH wndtwo;   USE wndtwo;
WITH wndstd;   USE wndstd;
WITH wndmth;   USE wndmth;
WITH rel5;     USE rel5;
WITH rel6;     USE rel6;
WITH rel7;     USE rel7;
WITH oemdec;   USE oemdec;
WITH oemmst;   USE oemmst;
WITH bubdec;   USE bubdec;
WITH clock;    USE clock;
WITH atmlib;   USE atmlib;
WITH dncdec;   USE dncdec;
WITH dncmcl;   USE dncmcl;
WITH ptchk;    USE ptchk;
WITH blkdlt;   USE blkdlt;
WITH eopgm;    USE eopgm;
WITH tcntrl;   USE tcntrl;
WITH agvmon;   USE agvmon;
WITH xfer;     USE xfer;
WITH chpmgt;   USE chpmgt;
WITH coolnt;   USE coolnt;

PACKAGE BODY menu IS

TYPE prog_sels IS (sel_prog, chk_sel);
prog_sel          : prog_sels := sel_prog;

timee             : integer;
ws_num_flt        : float;
rdy_resp          : boolean;
once_only         : boolean := false;
--------------------------------------------------------------------
PROCEDURE menu_init IS

BEGIN

  timee := msd_int_table(0200) * 100;                  --HOST RESPONSE TIME
  ws_num_flt := msd_float_table(0300);
  f_to_c(ws_num_flt, 7, 0, 1, ws_num_asc);
  hours(1) := '0';
  hours(2) := '0';
  p_msg(6804, 5);

END menu_init;
-----------------------------------------------------------------------
PROCEDURE menu_cancel IS

BEGIN

  IF menu_fault /= 0 THEN
    cnt_dwn;
    kill_msg(menu_fault);
    menu_fault := 0;
  END IF;
  menu_master := auto_init;
  rdy_resp := false;
  prog_sel := sel_prog;
  cursor_line := ws_status;
  restrt_menu := false;
  once_only := false;
```

```
  IF clock_is_set THEN
    prgm_updt := datime;
  END IF;
  mdi_auto_mode := false;

END menu_cancel;
--------------------------------------------------------------------------
FUNCTION menu_ok RETURN boolean IS

menu_status : boolean;

BEGIN

  IF nc_status(servo_stop_actv) AND ws_status = 2 THEN
    ws_status := 4;
    enum_resp := parameter_change(105, int_to_float(ws_status));
  END IF;
  menu_sta..  := NOT (menu_fault /= 0);

RETURN menu_status;

END menu_ok;
--------------------------------------------------------------------------
FUNCTION program_deselect RETURN boolean IS

select_status : boolean;

BEGIN

  select_status := false;

  CASE prog_sel IS
    WHEN sel_prog =>
      CASE prog_num_select("DUMMY ") IS
        WHEN busy =>
          NULL;
-----------------------------------------------------------------
--            CASES FOR FAILURE ARE:
-- 1.SERVO STOP IS ACTIVE 2.AXES REQUIRE REFERENCING(MSD)
-- 3.CYCLE START IS ON    4.CLEAR OR CANCEL IS IN PROGRESS
-- 5. PROGRAM IS NOT AVAILABLE
----------------------------------------------------------------------------
        WHEN failure =>                          --NO ATTEMPT TO SELECT MADE
          menu_fault := 6480;                       --MSG NO SELECTION DONE

        WHEN success =>                            --ATTEMPT TO SELECT MADE
          prog_sel := chk_sel;
      END CASE;                                               --PROG_NUM_SEL

    WHEN chk_sel =>
      IF nc_status(prog_select_done) THEN
        IF nc_status(prog_select_succ) THEN
          prog_sel := sel_prog;
          select_status := true;
        ELSE
          menu_fault := 6480;                              --DUMMY NOT FOUND
        END IF;
      END IF;
  END CASE;

RETURN select_status;

END program_deselect;
-----------------------------------------------------------------------
PROCEDURE menu_main IS

resp_len : integer;                                --INQUIRE PROMPT RESPONSE
resp_text : str64;

BEGIN
```

```
  CASE menu_master IS
    WHEN auto_init =>
      IF automation_opt THEN
    menu_master := auto_run;
  END IF;

WHEN auto_run =>
  IF menu_ok THEN
    CASE menu_state IS
      WHEN menu_standby =>                                          --STATE 0
        cursor_line := ws_status;
        IF automcode(a109) THEN
          k_msg(6800);                         --CLEAR MENU MESSAGES PROCEDURE
          IF su_flag THEN
            k_msg(6804);
          END IF;
          disp_page_select(90);
          menu_state := display;
          automcode(a109) := false;
        ELSIF automcode(a100) THEN
          IF prgm_updt = datime THEN
            IF NOT nc_status(cyc_start_lt_on) THEN                    --MONARCH
              IF NOT restart_prog THEN
                set_busy(auto_pb);
              END IF;
              restart_prog := false;
              IF part_check = part_standby THEN
                automcode(a100) := false;
                k_msq(6800);
                k_msg(6802);
                part_check := part_start;
              END IF;
            END IF;                                                   --MONARCH
          ELSE
            automcode(a100) := false;
            prgm_updt := upload;
            als_light := false;
          END IF;
        ELSIF restrt_menu THEN                 --EOPGM AUTOMATION RESTRT
          IF prgm_updt = datime THEN
            menu_state := status;
            prgm_updt := upload;
          ELSE
            restrt_menu := false;
          END IF;
        ELSIF su_flag AND NOT nc_status(reqd_ref_done) THEN
          menu_state := ref_wait;
        ELSIF rrise(cycle_start) AND (NOT su_flag) THEN
          k_msg(6800);
          k_msg(6802);
        ELSIF cell_is_up AND (rdout(auto_light) OR host_req_mag) THEN
          IF NOT nc_status(cyc_start_lt_on) THEN
            ws_status := 1;
            cursor_line := 1;
            menu_state := status;
            als_light := true;
          ELSIF NOT nc_status(cyc_start_lt_on) AND
                NOT no_go_off_line THEN
            no_go_off_line := true;
            set_busy(mcs_cancel);
          ELSIF NOT rdout(op_stop_light) AND NOT no_go_off_line THEN
            prog_was_running := true;
            set_busy(option_stop);
          END IF;
        ELSIF ws_status = 2 THEN
          IF rdin(manual_pb) OR rdin(single_pb) OR rdin(mdi_pb) THEN
            ws_status := 4;
            menu_state := status;
            cell_is_up := false;
```

```
    END IF;
  END IF;

WHEN display =>                                              --STATE 1
  IF (active_disp_page = 90) THEN
    disp_sel_lock;
    menu_state := input_mode;
    rdy_resp := false;
  END IF;

WHEN input_mode =>                                           --STATE 2
  inq_msg :=
" [7m SELECT STATION STATUS 1 TO 4 -HIT <ENTER>  [0m              ";
  inq_msg(1) := esc;
  inq_msg(48) := esc;
  ask_oper(47, 22, 1, resp_len, rdy_resp);
  IF rdy_resp AND ask = ask_1 THEN
    IF resp_len = 1 THEN
      IF inq_msg(1) = '1' THEN
        mdi_auto_mode := true;
        cursor_line := 1;
      ELSIF inq_msg(1) = '3' THEN
        cursor_line := 3;
      ELSE
        cursor_line := 4;
        IF host_available THEN
          dnc_bool(mc2000_status) := true;                   --TO HOST
          wait_for_status := true;
        END IF;
      END IF;
      ws_status := cursor_line;
      menu_state := status;
      rdy_resp := false;
      menu_start := false;
      erase(90, 22);                    --ERASE INQUIRE NEXT SWEEP
    ELSE
      rdy_resp := false;
    END IF;
  END IF;

WHEN status =>                                               --STATE 3
  CASE ws_status IS
    WHEN ready_auto =>
      IF dncmcl_master = auto_run THEN
        IF NOT restrt_menu THEN
          IF a_delivr OR a_pickup THEN
            standby_chips := true;
          END IF;
          IF standby_req > 2 THEN
            standby_tool := true;
          END IF;
          standby_part := true;                      --PICKUP CHANGE
        END IF;
        hours_set := false;
        set_busy(auto_pb);
        command_request := 0;
        trans_action := 0;
        data_request := 0;
        prog_chk_cmplt := false;
        IF cell_is_up THEN
          dnc_bool(mc2000_status) := true;
        ELSE
          dnc_bool(mc2000_status) := NOT restrt_menu;
        END IF;
        start_timer(host_tmr, timee);
        menu_state := tst_host;
        END IF;

      WHEN ready_manual =>
        k_msg(6810);
        menu_state := tst_host;
```

```
    WHEN nct_available =>
      prog_chk_cmplt := false;
      standby_part := false;
      standby_chips := false;
      standby_tool := false;
      inq_msg :=
" [7m KEY IN # OF HOURS(1..99) AND <ENTER>    [0m
      inq_msg(1) := esc;
      inq_msg(44) := esc;
      ask_oper(42, 22, 1, resp_len, rdy_resp);
      IF rdy_resp AND ask = ask_1 THEN
        IF (resp_len = 0) THEN
          hours_set := true;
          hours_int := 0;
        ELSIF (resp_len = 1) THEN
          hours_set := true;
          hours(1) := '0';
          c_to_i(inq_msg, 1, 1, hours_int);
          i_to_c(hours_int, 1, 2, hours);
        ELSIF (resp_len >= 2) THEN
          hours_set := true;
          c_to_i(inq_msg, 1, 2, hours_int);
          i_to_c(hours_int, 2, 1, hours);
        END IF;
        menu_state := tst_host;
        dnc_bool(mc2000_status) := true;
        erase(90, 22);                    --ERASE INQUIRE NEXT SWEEP
        start_timer(host_tmr, timee);
        rdy_resp := false;
      END IF;

    WHEN off_line =>
      IF NOT wait_for_status THEN
        IF waiting_cell THEN
          waiting_cell := false;
          kill_msg(6866);
          cnt_dwn;
        END IF;
        host_available := false;
        command_request := 0;
        trans_action := 0;
        data_request := 0;
        del_wait := false;
        standby_part := false;
        standby_chips := false;
        standby_tool := false;
        plate_permit := true;
        tool_permit_msg := false;
        chip_permit_msg := false;
        prog_chk_cmplt := false;
        menu_state := tst_host;
        clear_timer(host_tmr);
        host_req_mag := false;
        k_msg(6810);
        k_msg(6805);
        kill_msg(6871);
      END IF;

    WHEN OTHERS =>
      NULL;
      END CASE;

    WHEN tst_host =>                                             --STATE 4
      disp_sel_unlock;
      IF cell_is_up THEN
        IF NOT dnc_bool(mc2000_status) THEN
          prgm_updt := upload;
          menu_state := reset_ps;
        END IF;
      ELSIF host_a\   able THEN
        agv_inprgs .  false;
        chp_agv_st := stdby;
```

```
    IF NOT dnc_bool(mc2000_status) THEN
      IF program_deselect THEN
        prgm_updt := upload;
        menu_state := reset_ps;
        als_light := true;
      END IF;
    END IF;
  ELSIF NOT timer_running(host_tmr) THEN        --HOST NOT RESPONDED
    IF program_deselect THEN
      IF NOT restrt_menu THEN
        ws_status := 4;
        cursor_line := ws_status;
        p_msg(6800, 5);                          --START UP COMPLETE MSG
        p_msg(6802, 5);                          --HOST IS OFF LINE MSG
        prgm_updt := datime;
      END IF;
      menu_state := reset_ps;
      dnc_bool(mc2000_status) := false;          --STATUS TO HOST
    END IF;
  END IF;

WHEN reset_ps =>                                 --STATE 5
  enum_resp := parameter_change(105, int_to_float
    (ws_status));
  CASE prgm_updt IS
    WHEN upload =>
      IF host_available OR cell_is_up THEN
        dnc_bool(get_date) := true;      --HOST TO SEND DATE/TIME
        IF (ws_status = ready_auto) THEN
          prgm_updt := pp_dnc;
        ELSE
          prgm_updt := datime;
        END IF;
        restart_prog := false;
      ELSIF plate_que AND restrt_menu THEN
        restart_prog := true;
        restrt_menu := false;
        als_light := true;
        automcode(a100) := true;
        prgm_updt := datime;
        menu_state := menu_standby;
      ELSE
        restrt_menu := false;
        restart_prog := false;
        menu_state := menu_standby;
        prgm_updt := datime;
      END IF;

    WHEN pp_dnc =>
      IF NOT dnc_bool(get_date) THEN
        dnc_bool(prog_check) := true;   --TELL HOST CMD IS COMING
        proc_chk_cmplt := false;
        p_msg(6810, 5);
        IF msg_act(6825) THEN
          host_req_mag := true;
          standby_req := 20;
          standby_tool := true;
        ELSIF NOT ldin(mag_seatd_1) THEN
          host_req_mag := true;
          tool_mag_deliver := true;
        ELSE
          host_req_mag := false;
        END IF;
        dnc_bool(time_report) := true;
        prgm_updt := wait_1;
      END IF;

    WHEN datime =>
      p_msg(6800, 5);
      IF (NOT host_available) THEN
        automcode(a300) := true;                 --MANUAL CLOCK INPUT
        su_flag := false;
```

```
          ELSE
            IF NOT dnc_bool(get_date) THEN
              su_flag := false;
            END IF;
          END IF;
          menu_state := menu_standby;
          restrt_menu := false;

        WHEN wait_1 =>                      --STATE 3 IF HOST IS COMPLETE
          IF prog_chk_cmplt THEN
            menu_start := true;
            prgm_updt := wait_2;
          ELSIF host_req_mag AND NOT once_only THEN
            once_only := true;
            tool_mag_req := true;
          END IF;

        WHEN wait_2 =>                                          --STATE 4
          IF NOT host_req_mag THEN
            IF NOT init_fault THEN
              IF cell_is_up AND prog_was_running THEN
                cyc_strt_on := true;
                menu_state := menu_standby;
                prgm_updt := datime;
              ELSE
                IF part_check = part_standby THEN
                  menu_state := menu_standby;
                  part_check := part_start;        --START PART MNGMNT
                  prgm_updt := datime;
                END IF;
              END IF;
              k_msg(6810);
              su_flag := false;
              restrt_menu := false;
              once_only := false;
              cell_is_up := false;
              prog_was_running := false;
            END IF;
          END IF;
      END CASE;

    WHEN ref_wait =>                                            --STATE 6
      IF nc_status(reqd_ref_done) THEN
        menu_state := menu_standby;
      END IF;
  END CASE;
ELSE
  put_msg(menu_fault, 10, 6);
       store_msg(menu_fault);
       menu_master := auto_error;
       disp_sel_unlock;
     END IF;

    WHEN OTHERS =>
      NULL;
  END CASE;

END menu_main;
---------------------------------------------------------------------------
END menu;
-- ****************************************************************
-- *                                                               *
-- * SOFTWARE BY DAN GARAFOLA (A&ES) FOR                           *
-- * AIRCRAFT ENGINE BUSINESS GROUP / GENERAL ELECTRIC COMPANY     *
-- *                                                               *
-- *                                                               *
-- * THIS PROGRAM AND RELATED MATERIAL ARE THE PROPERTY OF THE     *
-- * GENERAL ELECTRIC CO. (G.E.) AND CONTAINS CONFIDENTIAL AND     *
-- * PROPRIETARY INFORMATION OF G.E. THIS PROGRAM, THE RELATED     *
-- * MATERIAL, AND THE INFORMATION CONTAINED HEREIN, SHALL NOT     *
-- * BE DISCLOSED TO OTHERS WITHOUT WRITTEN PERMISSION OF G.E.,    *
```

```
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

WITH wndone;   USE wndone;
WITH oemdec;   USE oemdec;

PACKAGE ptchk IS

ptchk_master     : auto_masters := auto_run;

TYPE part_checks IS (part_standby, part_start, part_mach, part_queue,
                     part_tran,part_cmplt, part_sn, part_sn_a, part_prog,
                     part_prog_a, part_select, select_host, prog_status,
                     prog_status_a, rework, rework_check,
                     rework_cmplt);
part_check       : part_checks := part_standby;

prog_try_out     : boolean := false;
id_sel_cmplt     : boolean := false;
man_bl_flag      : boolean := false;
ptchk_fault      : integer := 0;
pt_sn_ctr        : integer := 1;
prog_id          : str6;

PROCEDURE ptchk_clear;
PROCEDURE ptchk_cancel;
PROCEDURE ptchk_main;

END ptchk;
-- ***************************************************************
-- *                                                             *
-- * SOFTWARE BY DAN GARAFOLA (A&ES) FOR                         *
-- * AIRCRAFT ENGINE BUSINESS GROUP / GENERAL ELECTRIC COMPANY   *
-- *                                                             *
-- *                                                             *
-- * THIS PROGRAM AND RELATED MATERIAL ARE THE PROPERTY OF THE   *
-- * GENERAL ELECTRIC CO. (G.E.) AND CONTAINS CONFIDENTIAL AND   *
-- * PROPRIETARY INFORMATION OF G.E. THIS PROGRAM, THE RELATED   *
-- * MATERIAL, AND THE INFORMATION CONTAINED HEREIN, SHALL NOT   *
-- * BE DISCLOSED TO OTHERS WITHOUT WRITTEN PERMISSION OF G.E.,  *
-- * AND SHALL NOT BE DUPLICATED OR USED EXCEPT IN ACCORDANCE    *
-- * WITH THE LIMITED CONDITIONS UNDER WHICH IT WAS PROVIDED BY  *
-- * G.E.                                                        *
-- *                                                             *
-- * PROPERTY OF THE AIRCRAFT ENGINE BUSINESS GROUP OF THE       *
-- * GENERAL ELECTRIC COMPANY.                                   *
-- *                                                             *
-- ***************************************************************

-- ***************************************************************
-- * PACKAGE DESCRIPTION:  PTCHK.PCL                             *
-- *                                                             *
-- *    THE PART CHECK PACKAGE IS COMPRISED OF ONE MAIN          *
-- * PROCEDURE:                                                  *
-- *                                                             *
-- * PTCHK_MAIN;                                                 *
-- *     THIS PROCEDURE IS CALLED BY EITHER AN M-CODE (MANUAL    *
-- * OPERATION), OR BY THE START UP PROCEDURE IN THE AUTOMATION  *
-- * MCL.                                                        *
-- *     THIS PROCEDURE CHECKS THE POSITION OF ALL AVAILABLE     *
-- * PARTS AT THE WORK STATION, WETHER OR NOT IT HAS A CORRIS -  *
-- * PONDING PLATE CONFIGURATION FILE, WICH PART IS NEXT TO RUN, *
-- * IF A PART PROGRAM IS AVAILABLE TO RUN PART,  AND IF A PICK  *
-- * UP OR DELIVERY IS EXPECTED.  DEPENDING ON WHAT MODE IS      *
-- * SELECTED FROM THE START UP MENU THIS PACKAGE WILL START THE *
-- * BLOCK DELETE PACKAGE.                                       *
-- ***************************************************************
```

```
WITH wndone;   USE wndone;
WITH mcldat;   USE mcldat;
WITH mcllib;   USE mcllib;
WITH oemdec;   USE oemdec;
WITH wndstd;   USE wndstd;
WITH blkdlt;   USE blkdlt;
WITH clock;    USE clock;
WITH xfer;     USE xfer;
WITH rel5;     USE rel5;
WITH rel6;     USE rel6;
WITH rel7;     USE rel7;
WITH bubdec;   USE bubdec;
WITH wndtwo;   USE wndtwo;
WITH atmlib;   USE atmlib;
WITH dncdec;   USE dncdec;
WITH dncmcl;   USE dncmcl;
WITH dtmgmt;   USE dtmgmt;
WITH menu;     USE menu;

PACKAGE BODY ptchk IS

trans_stat         : character;
power_up_chk       : boolean := true;
check_tra          : boolean := false;
noprog             : boolean := false;
req_done           : boolean := false;
------------------------------------------------------------------
FUNCTION ptchk_ok RETURN boolean IS

ptchk_status : boolean;

BEGIN

  ptchk_status := true;
  IF ptchk_fault /= 0 THEN
    ptchk_sta     := false;
  END IF;

RETURN ptchk_status;

END ptchk_ok;
--------------------------------------------------------------------
PROCEDURE ptchk_clear IS

BEGIN

  ptchk_fault := 0;
  ptchk_master := auto_run;
  man_bl_flag := fals ;

END ptchk_clear;
--------------------------------------------------------------------
PROCEDURE ptchk_cancel IS

BEGIN

  IF ptchk_fault = 6836 THEN
    k_msg(ptchk_fault);
    ptchk_fault := 0;
    ptchk_master := auto_run;
  END IF;
  part_check := part_standby;
  k_msg(6835);
  req_done := false;
  check_tra := false;
  pt_sn_ctr := 1;
  id_sel_cmplt := false;

END ptchk_cancel;
--------------------------------------------------------------------
PROCEDURE ptchk_main IS
```

```
flt_arr : ARRAY (2..5) OF float;

BEGIN

  flt_arr(2) := float_2;
  flt_arr(3) := 3.0;
  flt_arr(4) := 4.0;
  flt_arr(5) := 5.0;

  CASE ptchk_master IS
    WHEN auto_init =>
      ptchk_master := auto_run;

    WHEN auto_run =>
      IF ptchk_ok THEN
        CASE part_check IS
          WHEN part_standby =>                                      --STATE 0
            NULL;                          --WAITS FOR A PART CHECK COMMAND

          WHEN part_start =>                                        --STATE 1
            IF NOT plate_mac AND NOT plate_tra AND NOT plate_que THEN
              IF xfer_state = xfer_standby THEN
                xfer_state := xfer_start;
              END IF;
            ELSE
              p_msg(6818, 6);
              part_check := part_mach;
            END IF;

          WHEN part_mach =>                                         --STATE 2
            IF plate_mac THEN
              IF power_up_chk AND NOT plate_que THEN
                check_tra := true;
              END IF;
              power_up_chk := false;
              man_bl_flag := true;
              part_check := part_cmplt;
            ELSE
              part_check := part_queue;
            END IF;

          WHEN part_queue =>                                        --STATE 3
            IF plate_que THEN
              part_check := part_cmplt;
            ELSE
              part_check := part_tran;
            END IF;

          WHEN part_tran =>                                         --STATE 4
            power_up_chk := false;
            IF NOT pkup_exp AND NOT deliv_exp AND
               (xfer_state = xfer_standby) THEN
              IF plate_tra THEN
                IF find_trans THEN
                  IF tran_num = 1 THEN
                    part_check := part_cmplt;
                  ELSIF tran_num = 4 THEN
                    xfer_state := xfer_start;
                  ELSE
                    ptchk_fault := 6836;
                  END IF;
                  IF check_tra THEN
                    part_check := rework_cmplt;
                  END IF;
                END IF;
              ELSE
                xfer_state := xfer_start;
              END IF;
            ELSIF check_tra THEN
              part_check := rework_cmplt;
            END IF;
```

```
WHEN part_cmplt =>                                          --STATE 5
  IF plate_mac THEN
    fl_num := 0;
  ELSIF plate_que THEN
    fl_num := 1;
  ELSIF plate_tra THEN
    fl_num := 2;
  END IF;
  part_check := part_sn;
  pt_sn_ctr := 1;

WHEN part_sn =>                                             --STATE 6
  IF file_command = command_standby THEN
    str_set(0, fl_num);
    item1_rec := serial_num_loc(pt_sn_ctr);
    file_command := g_str;
    part_check := part_sn_a;
  END IF;

WHEN part_sn_a =>                                           --STATE 7
  IF file_command = get_data THEN
    IF buffer_string(plate_loc) = '~'or
       buffer_string(plate_loc) = ' ' THEN
      sn_str_arr(pt_sn_ctr) := "********";
      response := tbl_chg_int(cust, ptqty, pt_sn_ctr, 0);
    ELSE
      FOR j IN 0..7 LOOP
        sn_str_arr(pt_sn_ctr)(j + 1) := buffer_string
          (plate_loc + j);
      END LOOP;
      response := tbl_chg_int(cust, ptqty, pt_sn_ctr, pt_sn_ctr);
    END IF;
    file_command := command_standby;
    IF pt_sn_ctr > 4 THEN               --******CHG TO 4 FOR MONARCH
      part_check := part_prog;
      pt_sn_ctr := 1;
    ELSE
      part_check := part_sn;
      pt_sn_ctr := pt_sn_ctr + 1;
    END IF;
  ELSIF file_command = no_file THEN
    ptchk_fault := 6836;
    file_command := command_standby;
  END IF;

WHEN part_prog =>                                           --STATE 8
  IF file_command = command_standby THEN
    str_set(0, fl_num);
    item1_rec := pr_id_rnm;
    file_command := g_str;
    part_check := part_prog_a;
  END IF;

WHEN part_prog_a =>                                         --STATE 9
  IF file_command = get_data THEN
    FOR index IN 0..5 LOOP
      prog_id(index + 1) := buffer_string(plate_loc + index);
    END LOOP;
    file_command := command_standby;
    part_check := part_select;
  ELSIF file_command = no_file THEN
    ptchk_fault := 6836;
    file_command := command_standby;
  END IF;

WHEN part_select =>                                         --STATE 10
  IF prog_id = "      " THEN
    p_msg(6835, 6);                        -- RETRIEVE NEW PROGRAM
    part_check := select_host;
  ELSIF NOT id_sel_cmplt THEN
    IF prog_num_select(prog_id) = success THEN
```

```
          id_sel_cmplt := true;
        END IF;
      ELSE
        IF nc_status(proc_select_done) THEN
          IF nc_status(prog_select_succ) THEN
            part_prog_rec := false;
            part_check := proc_status;
            req_done := false;
          ELSE
          p_msg(6835, 6);                    -- RETRIEVE NEW PROGRAM
          IF host_available AND NOT req_done THEN
            IF command_request = 0 THEN
              command_request := 13;
              dnc_bool(mc2000_cmd_req) := true;
              req_done := true;
            END IF;
          END IF;
          part_check := select_host;
        END IF;
        id_sel_cmplt := false;
      END IF;
    END IF;

  When select_host =>                                          --STATE 11
    IF host_available THEN
      IF part_prog_rec THEN
        part_prog_rec := false;
        part_check := part_select;
      END IF;
    ELSE
      req_done := false;
    END IF;

  WHEN prog_status =>                                          --STATE 12
    IF file_command = command_standby THEN
      str_set(0, fl_num);
      item1_rec := pr_stat_rnm;
      file_command := g_str;
      part_check := prog_status_a;
    END IF;

 WHEN prog_status_a =>                                         --STATE 13
   IF file_command = get_data THEN
     IF buffer_string(plate_loc) = 'T' THEN
       prog_try_out := true;
       IF host_available THEN
         p_msg(6808,3);
         man_bl_flag := true;
       END IF;
     END IF;
     IF check_tra THEN
       part_check := part_tran;
     ELSE
       part_check := rework;
     END IF;
     file_command := command_standby;
   END IF;

  WHEN rework =>                                               --STATE 14
    IF file_command = command_standby THEN
      str_set(0, fl_num);
      item1_rec := nor_rew_rnm;
      file_command := g_str;
      part_check := rework_check;
    END IF;

  WHEN rework_check =>                                         --STATE 15
    IF file_command = get_data THEN
      IF buffer_string(plate_loc) /= 'N' THEN
        put_msg(6867, 7, 3);
        man_bl_flag := true:
```

```
        END IF;
        part_check := rework_cmplt;
        file_command := command_standby;
      END IF;

        WHEN rework_cmplt =>                                        --STATE 16
          IF man_bl_flag THEN
            blk_dlt_state := blk_cyc;
          ELSE
            blk_dlt_state := blk_start;
          END IF;
          k_msg(6818);
          check_tra := false
          part_check := part_standby;
          k_msg(6835);
          IF host_available AND data_request = 0 THEN
            data_request := 1;
            dnc_bool(mc2000_data_req) := true;
          END IF;
      END CASE;
    ELSE
      p_msg(ptchk_fault, 6);
      ptchk_master := auto_error;
    END IF;

   WHEN others =>
     NULL;
  END CASE;

END ptchk_main;
--------------------------------------------------------------------
END ptchk;

-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
--   PROPRIETARY INFORMATION OF G.E. THIS PROGRAM, THE RELATED    *
--   MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;

PACKAGE qcont IS

TYPE qc_states IS (qc_standby, qc_start, qc_start_a, qc_calibration,
                   qc_performance, qc_verify);
qc_state         : qc_states := qc_standby;

TYPE hold_checks IS (check_msg, check_1, check_1a, check_2, check_4,
                     check_end);
hold_check       : hold_checks := check_1;

TYPE disp_tasks IS (task_standby, task_1, task_1a, task_6, task_7);
disp_task        : disp_tasks := task_standby;

TYPE ver_conts IS (cont_1, cont_2, cont_2a, cont_3, cont_3a, cont_4,
                   cont_5, cont_5a, cont_6, cont_6a, cont_7, cont_7a,
                   cont_7b, cont_8, cont_9, cont_10);
ver_cont         : ver_conts := cont_1;
```

```
TYPE inq_disps IS (inq_1, inq_1a, inq_2, inq_3, inq_3a, inq_4);
inq_disp         : inq_disps := inq_1;

qc_msg           : ARRAY (1..4) OF boolean;
ram_it_thru      : boolean := false;
verf_hr          : integer := 0;
qcont_ctr        : integer := 1;
pac              : integer := 0;
paq              : integer := 0;
pr_lmt           : integer := 0;
stat_cnt         : integer := 0;

PROCEDURE qcont_cancel;
PROCEDURE qcont_main;
PROCEDURE part_disp;  --PART DISPOSITION TASK
FUNCTION put_wp_status(vfyn     : in integer;
                       file_act : in integer;
                       fill_all : in boolean) RETURN boolean;

END qcont;

-- ************************************************************
-- *                                                          *
-- * SOFTWARE BY DAN GARAFOLA (A&ES) FOR                      *
-- * AIRCRAFT ENGINE BUSINESS GROUP / GENERAL ELECTRIC COMPANY *
-- *                                                          *
-- *                                                          *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM, THE RELATED *
-- * MATERIAL, AND THE INFORMATION CONTAINED HEREIN, SHALL NOT *
-- * BE DISCLOSED TO OTHERS WITHOUT WRITTEN PERMISSION OF G.E., *
-- * AND SHALL NOT BE DUPLICATED OR USED EXCEPT IN ACCORDANCE  *
-- * WITH THE LIMITED CONDITIONS UNDER WHICH IT WAS PROVIDED BY *
-- * G.E.                                                     *
-- *                                                          *
-- * PROPERTY OF THE AIRCRAFT ENGINE BUSINESS GROUP OF THE    *
-- * GENERAL ELECTRIC COMPANY.                                *
-- *                                                          *
-- ************************************************************

-- ************************************************************
-- * PACKAGE DESCRIPTION :  QCONT.PCL                         *
-- *                                                          *
-- *    THIS PACKAGE CONTAINS TWO MAIN PROCEDURES :           *
-- *                                                          *
-- * QCONT_MAIN ;                                             *
-- *    THIS PROCEDURE IS CALLED BY AN M-CODE.  IT CHECKS TO SEE*
-- * IF A SYSTEM PERFORMANCE , OR A SYSTEM CALIBRATION WITHIN  *
-- * THE TIME INTERVALS SPECIFIED BY THE MSD. IF NOT THEN A    *
-- * MESSAGE IS DISPLAYED AND AN OPERATOR MUST CLEAR THE PROGRAM*
-- * DO THE PERFORMANCE OR CALIBRATION, OR ENTER THE PASSWORD  *
-- * CONTINUE THE OPERATION.                                  *
-- *    AFTER CHECKING THE PERFORMANCE AND CALIBRATION THIS   *
-- * PROCEDURE THEN CHECKS THE VERIFY.MCL FILE TO SEE IF ANY  *
-- * PARTS LIKE THIS ONE HAVE BEEN RUN AND STILL REQUIRE VERIF- *
-- * ICATION. IF THEY DO REQUIRE VERIFICATION THIS PROCEDURE  *
-- * WILL REQUEST VERIFICATION FROM HOST OR ASK OPERATOR TO   *
-- * CLEAR THE PROGRAM AND EDIT THE VERIFY FILE, OR ENTER     *
-- * OVERRIDE PASSWORD TO CONTINUE.  IF HOST RETURNS A VERIFIC- *
-- * ATION OF REJECT FOR ANY PART THEN THIS PROCEDURE WILL    *
-- * ASK AN ATTENDANT TO CLEAR THE PROGRAM AND FIND THE CAUSE  *
-- * OF THE REJECTION OR ENTER OVERRIDE PASSWORD TO CONTINUE   *
-- * OPERATION.                                               *
-- *                                                          *
-- * PART_DISP ;                                              *
-- *   THIS PROCEDURE IS CALLED BY AN M-CODE (FOR PRELIMINARY  *
-- * DISPOSITION), AN ABORT FLAG, OR A DISPOSITION FLAG (SET  *
-- * DURING A PART UNLOAD CYCLE).                             *
-- *   WHEN THIS PROCEDURE IS CALLED IT EDITS THE PART DISPOS- *
-- * ITION IN THE PLATE CONFIGURATION FILE AND NOTIFIES THE   *
-- * HOST OF THE CHANGE.                                      *
```

```
-- *   VERIFICATION IS DETERMINED BY CHECKING FOR AN OUT OF      *
-- * TOLERANCE IN THE CLM DATA, CHECKING IF VERIFICATION         *
-- * INTERVALS HAVE BEEN EXCEDED, OR IF PROCESS LIMITS HAVE      *
-- * BEEN EXCEDED.                                               *
-- *                                                             *
-- ***************************************************************

WITH wndone;   USE wndone;
WITH mcldat;   USE mcldat;
WITH mcllib;   USE mcllib;
WITH wndstd;   USE wndstd;
WITH rel5;     USE rel5;
WITH rel6;     USE rel6;
WITH rel7;     USE rel7;
WITH wndtwo;   USE wndtwo;
WITH wndmth;   USE wndmth;
WITH bubdec;   USE bubdec;
WITH clock;    USE clock;
WITH oemdec;   USE oemdec;
WITH lur;      USE lur;
WITH xfer;     USE xfer;
WITH atmlib;   USE atmlib;
WITH ptchk;    USE ptchk;
WITH blkdlt;   USE blkdlt;
WITH dncmcl;   USE dncmcl;
WITH dncdec;   USE dncdec;
WITH dtmgmt;   USE dtmgmt;
WITH oemmst;   USE oemmst;
WITH eopgm;    USE eopgm;

PACKAGE BODY qcont IS

count_pt          : integer := 0;
first_time        : boolean := false;
pr_stat           : boolean := false;
sub_qc_task       : integer := 0;
pnq               : integer;
temp_strin        : string(1..27);
str_str           : string(1..6);
star_car          : character;
 -------------------------------------------------------------------
FUNCTION put_wp_status(vfyn     : in integer;
                       file_act : in integer;
                       fill_all : in boolean)  RETURN boolean IS

status : boolean;

BEGIN

  status := false;
  Case stat_cnt IS
    When 0 =>                                               --STATE 0
      qcont_ctr := 1;
      stat_cnt := 1;

    WHEN 1 =>                                               --STATE 1
      IF tbl_val_int(cust, ptqty, qcont_ctr) > 0 THEN
        IF file_command = command_standby THEN
          str_set(0, file_act);
          item1_lgt := wp_status_lgt;
          item1_rec := wp_status(qcont_ctr);
          file_command := g_str;
          stat_cnt := 2;
        END IF;
      ELSE
        stat_cnt := 4;
      END IF;

    WHEN 2 =>                                               --STATE 2
      IF file_command = get_data THEN
        IF buffer_string(plate_loc) = '0' OR
           buffer_string(plate_loc) = 'O' OR
```

```
          buffer_string(plate_loc) = 'V' OR
          (fill_all AND buffer_string(plate_loc) = 'N')
          OR ram_it_thru THEN
         stat_cnt := 3;
       ELSE
         stat_cnt := 4;
       END IF;
       file_command := command_standby;
     END IF;

   WHEN 3 =>                                                    --STATE 3
     IF file_command = command_standby THEN
       item1_lgt := 12;
       item1_rec := wp_status(qcont_ctr);
       IF vfyn = 1 THEN
         item1_str :=
     "VFN                                                            * ";
       ELSIF vfyn = 2 THEN
         item1_str :=
     "NVR                                                            * ";
       ELSIF vfyn = 3 THEN
         item1_str :=
     "DRY                                                            * ";
       ELSIF vfyn = 4 THEN
         item1_str :=
     "SCP                                                            * ";
       ELSIF vfyn = 7 THEN
         item1_str :=
     "                                                               * ";
         FOR i IN 1..12 LOOP
           item1_str(i) := inq_msg(i);
         END LOOP;
       ELSE
         item1_str :=
     "I                                                              * ";
         i_to_c(truncate(98), 2, 2, item1_str);
         IF item1_str(2) = ' ' THEN
           item1_str(2) := '0';
         END IF;
       END IF;
       file_command := p_str;
       stat_cnt := 4;
     END IF;

   WHEN 4 =>                                                    --STATE 4
     IF qcont_ctr > 4 THEN                 --*************CHG TO 4 FOR MONARCH
       qcont_ctr := 1;
       stat_cnt := 0;
       ram_it_thru := false;
       status := true;
     ELSE
       qcont_ctr := qcont_ctr + 1;
       stat_cnt := 1;
     END IF;

   WHEN OTHERS =>
     stat_cnt := 0;
 END CASE;

RETURN status;

END put_wp_status;
---------------------------------------------------------------------
PROCEDURE qcont_cancel IS

BEGIN

  sub_qc_task := 0;
  stat_cnt := 0;
  qcont_ctr := 1;
  count_pt := 0;
```

```
  first_time := false;
  ram_it_thru := false;
  verf_hr := 0;
  disp_sel_unlock;
  prelude_req_off(qc_lude);
  qc_state := qc_standby;
  hold_check := check_1;
  pr_stat := false;
  disp_task := task_standby;
  fl_num := 0;
  ver_cont := cont_1;
  str_str := " ---, ";
  inq_disp := inq_1;
  FOR i IN 1..4 LOOP
    qc_msg(i) := false;
  END LOOP;

END qcont_cancel;
-----------------------------------------------------------------
PROCEDURE flt_msg (flt_num : IN integer) IS

BEGIN

  p_msg(flt_num, 6);
  disposition_flag := false;
  disp_task := task_standby;
  unld_state := unld_standby;

END flt_msg;
-----------------------------------------------------------------
PROCEDURE blank_verify(item_n : IN integer) IS

BEGIN

  FOR i IN 1..27 LOOP
    temp_strin(i) := ' ';
  END LOOP;
  FOR i IN 0..1 LOOP
    response := tbl_chg_char(cust, (verify_a + i), item_n, temp_strin);
  END LOOP;

END blank_verify;
-----------------------------------------------------------------
PROCEDURE qcont_main IS

vfy_id : str6;

BEGIN

  CASE qc_state IS
    WHEN qc_standby =>
      IF automcode(a101) THEN
        p_msg(6819, 6);
        IF plate_que THEN
          fl_num := 2;
          qc_state := qc_start;
          prelude_request(qc_lude);
        ELSIF plate_tra AND NOT pkup_exp THEN
          fl_num := 1;
          qc_state := qc_start;
          prelude_request(qc_lude);
        ELSE
          automcode(a101) := false;
        END IF;
      ELSE
        k_msg(6819);
      END IF;

    WHEN qc_start =>
  IF file_command = command_standby THEN
    str_set(0, fl_num);
```

```
    item1_rec := pr_stat_rnm;
    file_command := g_str;
    qc_state := qc_start_a;
  END IF;

WHEN qc_start_a =>
  IF file_command = get_data THEN
    IF buffer_string(plate_loc) = 'T' THEN
      qc_state := qc_standby;
      prelude_req_off(qc_lude);
      automcode(a101) := false;
    ELSE
      qc_state := qc_calibration;
    END IF;
    file_command := command_standby;
  ELSIF file_command = no_file THEN
    qc_state := qc_standby;
    prelude_req_off(qc_lude);
    automcode(a101) := false;
  END IF;

WHEN qc_calibration =>
  int_date := msd_int_table(156);
  old_year := msd_int_table(157);
  old_time := 0;
  set_conv_varb;
  IF compare THEN
    IF (hr_ret / 24) > msd_int_table(160) THEN
      qc_msg(1) := true;
    END IF;
    qc_state := qc_performance;
  END IF;

WHEN qc_performance =>
  int_date := msd_int_table(158);
  old_year := msd_int_table(159);
  old_time := 0;
  set_conv_varb;
  IF compare THEN
    IF (hr_ret / 24) > msd_int_table(161) THEN
      qc_msg(2) := true;
    END IF;
    qc_state := qc_verify;
  END IF;

WHEN qc_verify =>
  CASE hold_check IS
    WHEN check_1 =>
      IF file_command = command_standby THEN
        str_set(0, fl_num);
        item1_lgt := pr_limit_lgt;
        item1_rec := pr_limit_rnm;
        item1_is_int := true;
        file_command := g_data;
        hold_check := check_1a;
      END IF;

    WHEN check_1a =>
      IF file_command = get_data THEN
        pr_lmt := item1_int;
        hold_check := check_2;
        file_command := command_standby;
      ELSIF file_command = no_file THEN
        file_command := command_standby;

        hold_check := check_1;
        qc_state := qc_standby;
        prelude_req_off(qc_lude);
        automcode(a101) := false;
      END IF;
```

```
WHEN check_2 =>
  IF NOT host_available OR verify_returned THEN
    FOR i IN 1..10 LOOP
      FOR j IN 0..1 LOOP
        tbl_val_char(cust,(verify_a + j), i, temp_strin);
        IF j = 1 THEN
          FOR a IN 1..6 LOOP
            vfy_id(a) := temp_strin(a);
          END LOOP;
        ELSE
          star_car := temp_strin(27);
        END IF;
      END LOOP;
      IF vfy_id = prog_id THEN
        IF star_car = '*' THEN
          qc_msg(4) := true;
          blank_verif (i);
        ELSIF part_count > pr_lmt THEN
          qc_msg(3) := true;
        END IF;
      END IF;
    END LOOP;
    hold_check := check_end;
  END IF;

WHEN check_end =>
  FOR i IN 1..4 LOOP
    IF qc_msg(i) THEN
      p_msg(6837 + i, 5);
      disp_page_select(60);
      hold_check := check_msg;
    END IF;
  END LOOP;
  IF hold_check /= check_msg THEN
    hold_check := check_1;
    qc_state := qc_standby;
    prelude_req_off(qc_lude);
    automcode(a101) := false;
  END IF;

WHEN check_msg =>
  IF host_available AND qc_msg(3) THEN
    IF data_request = 0 THEN
      data_request := 1;
      dnc_bool(mc2000_data_req) := true;
      hold_check := check_4;
    END IF;
  ELSE
    hold_check := check_4;
  END IF;
  verify_returned := false;

WHEN check_4 =>
  IF host_available AND qc_msg(3) AND verify_returned THEN
    k_msg(6840);
    hold_check := check_1;
    qc_msg(3) := false;
    disp_sel_unlock;
    disp_page_return;
  END IF;
          IF active_disp_page = 60 THEN
            IF NOT password_cmplt THEN
              password;
              disp_sel_lock;
            ELSE
              password_cmplt := false;
              disp_sel_unlock;
              disp_page_return;
              FOR index IN 1..4 LOOP
                qc_msg(index) := false;
                k_msg(6837 + index);
              END LOOP;
```

```
            hold_check := check_1;
            qc_state := qc_standby;
            prelude_req_off(qc_lude);
            automcode(a101) := false;
          END IF;
        END IF;
    END CASE;
  END CASE;

END qcont_main;
------------------------------------------------------------------
PROCEDURE part_disp IS

aft : string(1..5);
verf : str12;
mbc : string(1..27);
to : string(1..18);
wpn : string(1..14);

BEGIN

  aft := "AFTER";
  mbc := "DID OR WILL METAL BE CUT IN";
  to := "THIS OPERATION Y/N";
  wpn := "WILL PART NEED";
  verf := "VERIFICATION";

  CASE disp_task IS
    WHEN task_standby =>                                          --STATE 0
      IF automcode(a106) THEN
        disp_task := task_6;
        prelude_request(qc_lude);
      ELSIF disposition_flag THEN
        IF abortt THEN
          k_msg(6812);
          disposition_flag := false;
        ELSE
          fl_num := 3;
          disp_task := task_1;
          qcont_ctr := 1;
        END IF;
      END IF;

    WHEN task_1 =>                                                --STATE 1
      IF file_command = command_standby THEN
        str_set(0, fl_num);
        iteml_rec := wp_status(qcont_ctr);
        file_command := g_str;
        disp_task := task_1a;
      END IF;

    WHEN task_1a =>                                               --STATE 2
      IF file_command = get_data THEN
        FOR i in 1..3 LOOP
        disp_code(i) := buffer_string(plate_loc + i - 1);
      END LOOP;
      IF qcont_ctr > 4 THEN              --************CHG TO 4 FOR MONARCH
        disp_task := task_6;
      ELSE
        disp_task := task_1;
      END IF;
      qcont_ctr := qcont_ctr + 1;
      IF NOT automcode(a106) AND
         tbl_val_int(cust, ptqty, qcont_ctr - 1) > 0 THEN
        IF wp_disp(qcont_ctr - 1)     N
          IF disp_code = "AVU" OR disp_code = "AVR" OR
             disp_code = "CVU" OR disp_code = "CVR" OR
             disp_code = "ACC" THEN
            null;
          ELSE
            flt_msg(6829);
```

```
          END IF;
        ELSIF buffer_string(plate_loc) = ' ' OR
              buffer_string(plate_loc) = '0' THEN
          flt_msg(6829);
          unld_state := unld_standby;
        END IF;
      END IF;
      file_command := command_standby;
    ELSIF file_command = no_file THEN
      file_command := command_standby;
      flt_msg(6837);
      automcode(a106) := false;
    END IF;

  WHEN task_6 =>
    CASE ver_cont IS
      WHEN cont_1 =>
        IF plate_mac THEN
          fl_num := 3;
          ver_cont := cont_2;
        ELSIF plate_que AND NOT plate_mac THEN
          fl_num := 2;
          ver_cont := cont_2;
        ELSIF plate_tra AND NOT plate_que AND NOT plate_mac THEN
          IF find_trans THEN
            IF tran_num = 1 THEN
              fl_num := 1;
              ver_cont := cont_2;
            ELSE
              ver_cont := cont_7;
            END IF;
          END IF;
        ELSE
          disp_task := task_7;
        END IF;

      WHEN cont_2 =>
        IF file_command = command_standby THEN
          str_set(0, fl_num);
          iteml_rec := pr_stat_rnm;
          file_command := g_str;
          ver_cont := cont_2a;
        END IF;

      WHEN cont_2a =>
        IF file_command = get_data THEN
          IF buffer_string(plate_loc) = 'T' THEN
            ver_cont := cont_10;
            ram_it_thru := true;
        ELSIF buffer_string(plate_loc) = 'U' THEN
          ver_cont := cont_3;
          pr_stat := true;
        ELSIF buffer_string(plate_loc) = 'A' OR buffer_string
              (plate_loc) = 'S' THEN
          ver_cont := cont_3;
          pr_stat := false;
        ELSE
          put_msg(6860, 7, 3);
          disp_page_select(60);
          set_busy(mcs_cancel);
        END IF;
        file_command := command_standby;
      END IF;

    WHEN cont_3 =>
      CASE sub_qc_task IS
        When 0 =>
          IF file_command = command_standby THEN
            str_set(0, fl_num);
            iteml_rec := nor_rew_rnm;
            file_command := g_str;
            sub_qc_task := 1;
          END IF;
```

```
WHEN 1 =>
  IF file_command = get_data THEN
    IF buffer_string(plate_loc) = 'D' THEN
      ver_cont := cont_10;
      ram_it_thru := true;
      sub_qc_task := 0;
    ELSIF buffer_string(plate_loc) = 'R' OR
          buffer_string(plate_loc) = 'S' THEN
      sub_qc_task := 2;
    ELSE
      sub_qc_task := 6;
    END IF;
    file_command := command_standby;
  END IF;

WHEN 2 =>
  disp_page_select(100);
  disp_sel_lock;
  inq_msg :=
"ENTER WORK PIECE STATUS AND NAME                                   ";
  sub_qc_task := 3;
  oper_cmplt := false;

WHEN 3 =>
  IF active_disp_page = 100 THEN
    flash_al := true;
    ask_oper(34, 11, 1, pnq, oper_cmplt);
    IF oper_cmplt THEN
      oper_cmplt := false;
      sub_qc_task := 4;
    END IF;
  END IF;

WHEN 4 =>
  IF ((inq_msg(1) = 'A' OR inq_msg(1) = 'a') OR
     (inq_msg(1) = 'C' OR inq_msg(1) = 'c')) AND
     (inq_msg(2) = 'V' OR inq_msg(2) = 'v') AND
     ((inq_msg(3) = 'U' OR inq_msg(3) = 'u') OR
     (inq_msg(3) = 'R' OR inq_msg(3) = 'r')) AND
      inq_msg(6) /= ' ' THEN
    sub_qc_task := 5;
    ram_it_thru := true;
  ELSE
    sub_qc_task := 2;
  END IF;

WHEN 5 =>
  IF put_wp_status(7, fl_num, true) THEN
    flash_al := false;
    disp_sel_unlock;
    disp_page_return;
    sub_qc_task := 0;
    ver_cont := cont_1;
    disp_task := task_7;
  END IF;

WHEN 6 =>
  IF pr_stat THEN
    IF file_command = command_standby THEN
      str_set(0, fl_num);
      iteml_rec := apprv_ct_rnm;
      iteml_lgt := apprv_ct_lgt;
      iteml_is_int := true;
      file_command := g_data;
      ver_cont := cont_3a;
      sub_qc_task := 0;
    END IF;
  ELSE
    sub_qc_task := 0;
    ver_cont := cont_6;
  END IF;
```

```
    WHEN others =>
      null;
  END CASE;

WHEN cont_3a =>
  IF file_command = get_data THEN
    pac := item1_int + 1;
    item1_rec := apprv_qty_rnm;
    item1_lgt := apprv_qty_lgt;
    item1_is_int := true;
    file_command := g_data;
    ver_cont := cont_4;
    pr_stat := false;
    qcont_ctr := 1;
  END IF;

WHEN cont_4 =>
  IF file_command = get_data THEN
    IF pac > item1_int THEN
      ver_cont := cont_6;
      file_command := command_standby;
    ELSE
      ver_cont := cont_5;
      file_command := command_standby;
    END IF;
  END IF;

WHEN cont_5 =>
  IF put_wp_status(1, fl_num, true) THEN
    ver_cont := cont_5a;
  END IF;

WHEN cont_5a =>
  IF automcode(a106) THEN
    disp_task := task_7;
    ver_cont := cont_1;
  ELSE
    IF file_command = command_standby THEN
      str_set(0, fl_num);
      item1_lgt := apprv_ct_lgt;
      item1_rec := apprv_ct_rnm;
      item1_is_int := true;
      item1_int := pac;
      file_command := p_data;
      ver_cont := cont_9;
    END IF;
  END IF;

WHEN cont_6 =>
  IF file_command = command_standby THEN
    str_set(0, fl_num);
    item1_rec := ct_int_rnm;
    item1_lgt := ct_int_lgt;
    item1_is_int := true;
    file_command := g_data;
    ver_cont := cont_6a;
  END IF;

WHEN cont_6a =>
  IF file_command = get_data THEN
    IF part_count + 1 < item1_int AND part_count > 0 THEN
      ver_cont := cont_7;
    ELSE
      IF part_count = 0 THEN
        first_time := true;
      END IF;
      ver_cont := cont_8;
    END IF;
    file_command := command_standby;
  END IF;
```

```
WHEN cont_7 =>
  IF file_command = command_standby THEN
    str_set(0, fl_num);
    item1_lgt := verf_in_lgt;
    item1_rec := verf_in_rnm;
    item1_is_int := true;
    file_command := g_data;
    ver_cont := cont_7a;
  END IF;

WHEN cont_7a =>
  IF file_command = get_data THEN
    verf_hr := item1_int;
    ver_cont := cont_7b;
    file_command := command_standby;
  END IF;

WHEN cont_7b =>
  int_date := truncate(143);
  old_year := truncate(142);
  old_time := truncate(141);
  set_conv_varb;
  IF compare THEN
    IF hr_ret < verf_hr THEN
      IF automcode(a106) THEN
        IF put_wp_status(2, fl_num, true) THEN
          ver_cont := cont_1;
          disp_task := task_7;
        END IF;
      ELSE
        ver_cont := cont_1;
        disp_task := task_7;
      END IF;
    ELSE
      ver_cont := cont_8;
    END IF;
  END IF;

WHEN cont_8 =>
  IF put_wp_status(1, fl_num, true) THEN
    IF automcode(a106) THEN
      ver_cont := cont_1;
      disp_task := task_7;
    ELSE
      ver_cont := cont_9;
    END IF;
  END IF;

WHEN cont_9 =>
  date;
  cur_date := time;
  repl_ver_dt;
  disp_task := task_7;
  ver_cont := cont_1;

WHEN cont_10 =>
  CASE inq_disp IS
    WHEN inq_1 =>
      FOR i IN 1..64 LOOP
        IF i < 28 THEN
          inq_msg(i) := mbc(i);
        ELSIF i > 28 AND i < 47 THEN
          inq_msg(i) := to(i - 28);
        ELSE
          inq_msg(i) := ' ';
        END IF;
      END LOOP;
      disp_page_select(100);
      disp_sel_lock;
      inq_disp := inq_1a;
```

```
    WHEN inq_1a =>
      IF active_disp_page = 100 THEN
        flash_al := true;
        ask_oper(60, 11, 1, pnq, oper_cmplt);
        IF oper_cmplt THEN
          oper_cmplt := false;
          inq_disp := inq_2;
        END IF;
      END IF;

    WHEN inq_2 =>
      IF inq_msg(1) = 'Y' OR inq_msg(1) = 'y' THEN
        inq_disp := inq_3;
      ELSIF inq_msg(1) = 'N' OR inq_msg(1) = 'n' THEN
        flash_al := false;
        IF put_wp_status(3, fl_num, true) THEN
          disp_sel_unlock;
          disp_page_select(60);
          disp_task := task_7;
          inq_disp := inq_1;
          ver_cont := cont_1;
        END IF;
      ELSE
        inq_disp := inq_1;
      END IF;
    WHEN inq_3 =>
      FOR i IN 1..64 LOOP
        IF i < 15 THEN
          inq_msg(i) := wpn(i);
        ELSIF i > 15 AND i < 28 THEN
          inq_msg(i) := verf(i - 15);
        ELSIF i > 28 AND i < 34 THEN
          inq_msg(i) := aft(i - 28);
        ELSIF i > 34 AND i < 53 THEN
          inq_ms    ) := to(i - 34);
        ELSE
          inq_msg(i) := ' ';
        END IF;
      END LOOP;
      inq_disp := inq_3a;

    WHEN inq_3a =>
      ask_oper(60, 12, 1, pnq, oper_cmplt);
      IF oper_cmplt THEN
        oper_cmplt := false;
        inq_disp := inq_4;
      END IF;

    WHEN inq_4 =>
      IF inq_msg(1) = 'Y' OR inq_msg(1) = 'y' THEN
        flash_al := false;
        disp_sel_unlock;
        disp_page_return;
        inq_disp := inq_1;
        sub_qc_task := 6;
        ver_cont := cont_3;
      ELSIF inq_msg(1) = 'N' OR inq_msg(1) = 'n' THEN
        flash_al := false;
        IF put_wp_status(4, fl_num, true) THEN
          disp_sel_unlock;
          disp_page_return;
          disp_task := task_7;
          inq_disp := inq_1;
          ver_cont := cont_1;
        END IF;
      ELSE
        inq_disp := inq_3;
      END IF;
  END CASE;
END CASE;
```

```
WHEN task_7 =>
  IF file_command = no_file THEN
    file_command := command_standby;
  END IF;
  IF disposition_flag THEN
    CASE count_pt IS
      When 0 =>
          qcont_ctr := 1;
          count_pt := 1;

       WHEN 1 =>
         IF tbl_val_int(cust,ptqty,qcont_ctr) > 0 THEN
           IF file_command = command_standby THEN
             str_set(0, fl_num);
             item1_lgt := wp_status_lgt;
             item1_rec := wp_status(qcont_ctr);
             file_command := g_data;
             count_pt := 2;
           END IF;
         ELSE
           count_pt := 3;
         END IF;

       WHEN 2 =>
         IF file_command = get_data THEN
           IF buffer_string(plate_loc) = 'V' AND NOT first_time THEN
             disposition_flag := false;
             count_pt := 0;
             part_count := 1;
             put_save_int(part_count, 20);
           ELSIF buffer_string(plate_loc) = 'A' OR
             buffer_string(plate_loc) = 'C' THEN
             disposition_flag := false;
             count_pt := 0;
           ELSE
             count_pt := 3;
           END IF;
           file_command := command_standby;
         END IF;

       WHEN 3 =>
         IF qcont_ctr > 4 THEN
           qcont_ctr := 1;
           first_time := false;
           part_count := part_count + 1;
           put_save_int(part_count, 20);
           disposition_flag := false;
           count_pt := 0;
         ELSE
           qcont_ctr := qcont_ctr + 1;
           count_pt := 1;
         END IF;

       WHEN OTHERS =>
         count_pt := 0;
    END CASE;
  ELSIF automcode(a106) THEN
    IF host_available THEN
      file_integer := 4 - fl_num;
      IF command_request = 0 THEN
        command_request := 17;
        dnc_bool(mc2000_cmd_req) := true;
        automcode(a106) := false;
      END IF;
    ELSE
      automcode(a106) := false;
    END IF;
  ELSE
    prelude_req_off(qc_lude);
    disp_task := task_standby;
```

```
      END IF;
      k_msg(6812);
   END CASE;

END part_disp;
 ---------------------------------------------------------------------------
END qcont;

-- ************************************************************
-- *                                                          *
-- * SOFTWARE BY PAUL COLANANNI (A&ES) FOR                    *
-- * AIRCRAFT ENGINE BUSINESS GROUP / GENERAL ELECTRIC COMPANY *
-- *                                                          *
-- * THIS PROGRAM AND RELATED MATERIAL ARE THE PROPERTY OF THE *
-- * GENERAL ELECTRIC CO. (G.E.) AND CONTAINS CONFIDENTIAL AND *
-- * PROPRIETARY INFORMATION OF G.E. THIS PROGRAM, THE RELATED *
-- * MATERIAL, AND THE INFORMATION CONTAINED HEREIN, SHALL NOT *
-- * BE DISCLOSED TO OTHERS WITHOUT WRITTEN PERMISSION OF G.E., *
-- * AND SHALL NOT BE DUPLICATED OR USED EXCEPT IN ACCORDANCE  *
-- * WITH THE LIMITED CONDITIONS UNDER WHICH IT WAS PROVIDED BY *
-- * G.E.                                                     *
-- *                                                          *
-- * PROPERTY OF THE AIRCRAFT ENGINE BUSINESS GROUP OF THE    *
-- * GENERAL ELECTRIC COMPANY.                                *
-- *                                                          *
-- ************************************************************

WITH wndone;   USE wndone;
WITH oemdec;   USE oemdec;

PACKAGE tcntrl IS

tcntrl_master    : auto_masters := auto_run;
TYPE tcntrl_states IS (tcntrl_setup, save_mlife, check_tools, check_life,
                       empty_turret, new_mag, old_mag, ref_magazine,
                       count_tools, no_bar_read, no_tools, skip_program);
tcntrl_state     : tcntrl_states := tcntrl_setup;
type tool_into_chain is (start_taking, finished_taking);
tools_into_chain : tool_into_chain := start_taking;
type tool_from_chain is (empty_spin, wait_for_spin, wait_for_unload);
tools_from_chain : tool_from_chain := empty_spin;

par_val           : ARRAY (0..1) OF float;

block_dec_cancel : boolean := false;
check_face        : boolean := false;
config_instald    : boolean;
default_plo1      : boolean;
do_the_count      : boolean := false;
file_instald      : boolean;
install_magazine : boolean := false;
looking           : boolean := false;
look_in_file      : boolean := false;
m112_was_run      : boolean := false;
new_mag_arrived   : boolean := false;
no_match          : boolean := false;
no_read           : boolean := false;
ok_to_send        : boolean := false;
out_of_tools      : boolean := false;
plo_1             : boolean;
plo_2             : boolean;
probe_active      : boolean := false;
request_pickup    : boolean := false;
save_auto_mode    : boolean := false;
save_m06          : boolean := false;
send_for_file     : boolean := false;
sent_for_mag      : boolean := false;
standby_tool      : boolean := false;
stop_looking      : boolean := false;
tool_code_read    : boolean := false;
wait_a_while      : boolean := false;
```

```
wait_for_barcdr   : boolean := false;
wait_for_file     : boolean := false;
active_face       : integer := 0;
active_offst      : integer := 0;
ito_id            : integer := 0;
loc_id            : integer := 0;
loc_no            : integer := 0;
prev_t_type       : integer := 0;
save_index        : integer := 0;
standby_req       : integer := 0;
tcntrl_fault      : integer := 0;
tcntrl_req        : integer := 0;
tov_size          : integer;
type_number       : integer := 0;

life_to_dec       : float := 0.0;
save_x_psn        : float := 0.0;
save_z_psn        : float := 0.0;

n_code            : string(1..12);

PROCEDURE t_setup;
PROCEDURE tcntrl_init;
PROCEDURE tcntrl_cancel;
PROCEDURE tcntrl_main;
PROCEDURE updte_life;

END tcntrl;
-- ****************************************************************
-- *                                                              *
-- * SOFTWARE BY PAUL COLANANNI (A&ES) FOR                        *
-- * AIRCRAFT ENGINE BUSINESS GROUP / GENERAL ELECTRIC COMPANY    *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAI   HEREIN, SHALL NOT     *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- ****************************************************************

WITH wndone;   USE wndone;
WITH mcldat;   USE mcldat;
WITH mcllib;   USE mcllib;
WITH wndtwo;   USE wndtwo;
WITH wndtre;   USE wndtre;
WITH wndstd;   USE wndstd;
WITH wndmth;   USE wndmth;
WITH bubmcl;   USE bubmcl;
WITH rel5;     USE rel5;
WITH rel6;     USE rel6;
WITH rel7;     USE rel7;
WITH bubdec;   USE bubdec;
WITH clock;    USE clock;
WITH oemdec;   USE oemdec;
WITH atmlib;   USE atmlib;
WITH oemmst;   USE oemmst;
WITH spndrv;   USE spndrv;
WITH dncdec;   USE dncdec;
WITH dncmcl;   USE dncmcl;
WITH agvmon;   USE agvmon;
WITH univsl;   USE univsl;
WITH zxcyc;    USE zxcyc;
WITH tlexch;   USE tlexch;
WITH tlchg;    USE tlchg;
WITH serio;    USE serio;
WITH menu;     USE menu;
```

```
PACKAGE BODY tcntrl IS

save_t_off          : integer := 0;
save_t_dat          : integer := 0;
block_no            : integer := 0;
step                : integer := 1;
temp_tool_no        : integer := 1;
check_host          : integer := 0;
table_life          : float;
no_auto             : boolean := false;
take_one            : boolean := false;
msg_is_set          : boolean := false;
max_off_no          : array(1..2) of float;
-------------------------------------------------------------------
-- ***************************************************************
-- * THIS FUNCTION MONITORS TOOL MANAGEMENT FOR A FAULT CONDITION *
-- * IT WILL RETURN FALSE FOR A FAULT AND TOOL CONTROL WILL STOP  *
-- * EXECUTING.                                                   *
-- ***************************************************************
FUNCTION tcntrl_ok RETURN boolean IS


tcntrl_status : boolean;

BEGIN

  tcntrl_status := NOT (tcntrl_fault /= 0);

RETURN tcntrl_status;

END tcntrl_ok;
---------------   -------------------------------------------------
-- ***************************************************************
-- * THIS PROCEDURE RUNS ONLY AT POWER UP TIME AND WILL           *
-- * INITIALIZE PACKAGE VARIABLES.                                *
-- ***************************************************************
PROCEDURE tcntrl_init IS

BEGIN

  v_tbl_size := tbl_size(cust, vtype);
  tbl_limit := tbl_size(cust, mn);
  magazine_size := tbl_size(cust, mtype);
  tool_mgt_opt := msd_bool_table(146);
  tool_life_opt := msd_bool_table(149);
  tool_mag_opt := msd_bool_table(147);
  max_off_no(1) := msd_float_table(59);
  max_off_no(2) := msd_float_table(58);
  FOR index IN 0..1 LOOP
    par_val(index) := float_0;
  END LOOP;
  tov_size := tbl_size(tlo, 1);

END tcntrl_init;
-------------------------------------------------------------------
-- ***************************************************************
-- * THIS PROCEDURE RUNS ONLY WHEN A CANCEL IS INITIATED. IT WILL *
-- * RESET VARIABLES THAT NEED TO BE RESET AT A CANCEL.           *
-- ***************************************************************
PROCEDURE tcntrl_cancel IS

BEGIN

  IF tcntrl_fault /= 0 AND (tcntrl_master = auto_recovery) THEN
    IF tcntrl_fault /= 6401 AND tcntrl_fault /= 6402 AND
       tcntrl_fault /= 6405 THEN
      cnt_dwn;
    END IF;
    kill_msg(tcntrl_fault);
    tcntrl_fault := 0;
  END IF;
  IF inhibit_retrace THEN
```

```
    kill_msg(6408);
    cnt_dwn;
    inhibit_retrace := false;
  END IF;
  IF out_of_tools THEN
    kill_msg(6865);
    cnt_dwn;
  END IF;
  tcntrl_state := tcntrl_setup;
  tcntrl_master := auto_run;
  tools_into_chain := start_taking;
  tools_from_chain := empty_spin;
  look_in_file := false;
  no_auto := false;
  out_of_tools := false;
  request_pickup := false;
  tool_code_read := false;
  wait_a_while := false;
  wait_for_file := false;
  tool_count := 0;
  postlude_req_off(v_post);
  take_one := false;
  check_host := 0;
  refurbish_mag := false;
  step := 1;

END tcntrl_cancel;
---------------------------------------------------------------------
-- ******************************************************************
-- * THIS PROCEDURE RUNS EVERY TIME A T WORD IS PROGRAMED. IT      *
-- * WILL CHECK TO SEE THE T WORD HAS BEEN PROGRAMED CORRECTLY.    *
-- ******************************************************************
FUNCTION t_code_ok RETURN boolean IS

status : boolean;

BEGIN

  status := false;
  t_type := active_tool(most_sig_digs);
  t_off := active_tool(least_sig_digs) rem 100;
  IF automcode(tool_pock) THEN
    IF t_type < 46 THEN
      status := true;
    END IF;
  ELSE
    IF (t_type <= type_size) THEN
      IF (t_type = 0 AND NOT automcode(a06)) OR
          (t_type /= 0 AND automcode(a06)) THEN
        status := true;
      END IF;
    END IF;
  END IF;
RETURN status;

END t_code_ok;
---------------------------------------------------------------------
-- ******************************************************************
-- * THIS PROCEDURE CONTAINS ANY CALLS TO THE OEM'S MCL THAT ARE   *
-- * NECESSARY TO DO A TOOL CHANGE                                 *
-- ******************************************************************

PROCEDURE chg_tool(pocket_to_get : IN integer) IS

BEGIN

  active_t_code(lsb) := pocket_to_get;
  mcode_val(retract_z) := true;
  IF m_zx_act THEN
    m36dis := false;                          -- RESET DISABLE Z COMMAND
    no_retract := false;
    m_zx_act := false;
```

```
  END IF;
  request_postlude(6) := true;

END chg_tool;
----------------------------------------------------------------------
-- ****************************************************************
-- * THIS PROCEDURE WILL DETERMINE THE VALUE TO USE FOR TOOL LIFE *
-- * WHETHER A PROBE IS IN USE, AND PUT THE SERIAL NO OF THE TOOL *
-- * IN A TABLE.                                                   *
-- ****************************************************************
PROCEDURE new_life_value IS

BEGIN

  IF automcode(a308) THEN
    life_to_dec := float_0;
  ELSE
    life_to_dec := - par_val(1);
  END IF;
  put_save_float(life_to_dec, 5);
  FOR index IN 0..1 LOOP
    par_val(index) := float_0;
  END LOOP;
  IF t_type > 899 AND t_type /= 999 THEN
    probe_active := true;
  ELSE
    probe_active := false;
  END IF;

END new_life_value;
----------------------------------------------------------------------
-- ****************************************************************
-- * THIS PROCEDURE WILL CHECK THE VALUE OF THE INCOMMING DATA    *
-- * OFFSET AND PUT UP A MESSAGE IF IT EXCEEDS THE ALLOWABLE VAL  *
-- ****************************************************************
PROCEDURE chk_offset (no_in : IN integer) IS

BEGIN

  IF t_val > max_off_no(no_in) THEN
    IF tcntrl_fault /= 6415 THEN
      store_msg(6415);
    END IF;
    tcntrl_fault := 6415;
  END IF;

END chk_offset;
----------------------------------------------------------------------
-- ****************************************************************
-- * THIS PROCEDURE WILL TRANSFER DATA FROM THE MAGAZINE TABLES   *
-- * TO OFFSET TABLES AND VICA VERSA. ALL DATA TRANSFER TAKES     *
-- * PLACE HERE.                                                  *
-- ****************************************************************
PROCEDURE transfer_data IS

tool_id : integer;

BEGIN

  act_off(0, 0);                                --DEACTIVATE ACTIVE OFFSET
  IF t_type < 999 AND tool_life_opt THEN
    new_life_value;
  END IF;
  tool_id := tbl_val_int(cust, stat, active_face) /10;
  response := tbl_chg_int(cust, stat, active_face, (tool_id * 10));
  tb_fl(mlgt, t_index, 0, 0);           --GET TOOL LENGTH OFFSET(TOOL DATA)
  chk_offset(2);
  response := tbl_chg_float(tdl, 1, 1, -t_val);      --NEW OFFSET TO LENGTH
  tb_fl(mrad, t_index, 0, 0);           --GET TOOL RADIUS OFFSET(TOOL DATA)
  chk_offset(1);
  response := tbl_chg_float(tdr, 1, 1, -t_val);      --NEW OFFSET TO RADIUS
  response := tbl_chg_int(cust, stat, t_index,
                     (ito_id * 100) + (loc_id * 10) + 1); --CONFIG LOC
```

```
  IF t_index /= 45 THEN
    act_off(t_off,1);

  END IF;

END transfer_data;
--------------------------------------------------------------------------
-- *****************************************************************
-- * THIS PROCEDURE WILL SEARCH THE MAGAZINE TABLES FOR A TOOL      *
-- * WITH ADEQUATE LIFE IN IT TO MEET THE NEED OF AN ITEM NO.       *
-- *****************************************************************
PROCEDURE look_for_tool IS

BEGIN

  FOR index IN v_index..v_tbl_size LOOP          --LOOK FOR THE FIRST TOOL
    v_type := tbl_val_int(cust, vtype, index);
    IF v_type /= 0 THEN
      t_index := 0;
      looking := true;
      WHILE looking LOOP
        IF t_index < magazine_size THEN
          t_s_i(mtype, v_type, t_index);
        ELSE
          t_index := 0;
        END IF;
        IF t_index > 0 THEN
          tb_fl(rmlfe, t_index, 0, 0);
          table_life := t_val;
          loc_id := (tbl_val_int(cust, stat, t_index)/10) REM 10;
          ito_id := tbl_val_int(cust, stat, t_index)/100;
          tb_fl(p178, index, 0, 0);
          IF t_val <= (table_life + float_001) AND
            (loc_id < 3) THEN
            tb_fl(p181, index, 0, 0);
            t_val := - t_val;
            t_a_f(rmlfe, t_index);
            IF rdout(blk_del_light) THEN
              IF ito_id < 1 AND v_type < 900 THEN
                turn_off_blkdlt(191);
                turn_off_blkdlt(192);
              END IF;
            END IF;
            looking := false;
          END IF;
        ELSE
          stop_looking := true;
          looking := false;
        END IF;
      END LOOP;
      IF stop_looking THEN
        exit;
      END IF;
    END IF;
    IF index = v_tbl_size THEN
      tool_count := tool_count + 1;
    END IF;
  END LOOP;

END look_for_tool;
-------------------------------------------------------------------
-- *****************************************************************
-- * THIS PROCEDURE WILL CONDUCT A SEARCH OF THE MAGAZINE TABLES   *
-- * TO SEE IF THERE IS ENOUGH TOOLS TO DO A PART PLUS ONE MORE.   *
-- *****************************************************************
PROCEDURE tool_search IS

BEGIN

FOR index IN 1..magazine_size LOOP     --COPY LIFE AVAIL INTO SCRATCH TBL
  tb_fl(mlfe, index, rmlfe, index);
END LOOP;
```

```
  IF (tool_count = 0) AND NOT tool_mag_req THEN
    look_for_tool;
    IF stop_looking THEN
      t_type := v_type;
      IF ws_status = 1 THEN
        IF (plate_tra OR plate_one) AND NOT plate_mac THEN
          check_host := 1;
        END IF;
      END IF;
      out_of_tools := true;
      tcntrl_state := no_tools;
      automcode(a112) := false;
      stop_looking := false;
    ELSE
      m112_was_run := true;
      v_index := 1;
    END IF;
  END IF;

  IF (tool_count = 1) AND NOT tool_mag_req THEN
    look_for_tool;
    IF stop_looking THEN
      next_part := true;
      put_msg(6423,8,3);
      stop_looking := false;
    END IF;
    automcode(a112) := false;
    prelude_req_off(v_prel);
  END IF;

END tool_search;
-----------------------------------------------------------------
-- *****************************************************************
-- * THIS PROCEDURE WILL OBTAIN THE LIFE TO BE DEDUCTED FROM      *
-- * A TOOL IN A PARTICULAR CUT.                                  *
-- *****************************************************************
PROCEDURE tool_life_req IS

BEGIN

  IF tool_life_opt AND (t_type < 900) AND NOT automcode(a308) THEN
    FOR index IN 0..1 LOOP
      IF m112_was_run AND (mcl_state /= mcl_mdi) THEN
        tb_fl(p178 + index, v_index, 0, 0);
      ELSE
        p_val(178 + 3 * index);
        enum_resp := parameter_change(178 + 3 * index, float_0);
      END IF;
      par_val(index) := t_val;
      IF par_val(index) = float_0 THEN
        tcntrl_fault := 6401;
        EXIT;
      END IF;
    END LOOP;
    IF tcntrl_fault = 0 THEN
      IF par_val(0) > par_val(1) THEN
        reqd_life := par_val(0);
      ELSE
        reqd_life := par_val(1);
      END IF;
    END IF;
  ELSIF automcode(a308) THEN
        reqd_life := 0.1;
      ELSE
        reqd_life := float_1;
      END IF;

    END tool_life_req;
    -----------------------------------------------------------------
    -- *****************************************************************
    -- * THIS PROCEDURE WILL CHECK TO SEE IF A TOOL HAS ENOUGH LIFE   *
    -- * TO SATISFY THE REQUIRED LIFE.                                *
    --   *****************************************************************
```

```
FUNCTION chk_life RETURN boolean IS

status : boolean;

BEGIN

  status := false;
  IF (table_life + float_001) >= reqd_life THEN
    status := true;
  END IF;
RETURN status;

END chk_life;
------------------------------------------------------------------
-- ***************************************************************
-- * THIS PROCEDURE WILL SEARCH THE SPINDLE AND                  *
-- * MAGAZINE FOR A TOOL (IN THAT ORDER) TO SELECT AND USE. IT   *
-- * WILL THEN INITIATE A TURRET INDEX OR TOOL CHANGE.           *
-- ***************************************************************
PROCEDURE tool_life_check IS

BEGIN

   IF NOT automcode(a308) THEN
     v_type := tbl_val_int(cust, vtype, v_index);
     IF m112_was_run AND (t_type /= v_type) AND (t_type < 900)
       AND (mcl_state /= mcl_mdi) THEN
       tcntrl_fault := 6405;
       look_in_file := false;
       check_face := false;
     ELSIF check_face THEN
       check_face := false;
       tb_fl(mlfe, t_index, 0, 0);
       table_life := t_val;
       IF (chk_life OR t_type > 899) AND
           (t_type = tbl_val_int(cust, mtype, t_index)) THEN
         new_life_value;
         prelude_req_off(v_prel);
         automcode(a06) := false;
         act_off(t_off, 1);
         tcntrl_state := tcntrl_setup;
       ELSE
         look_in_file := true;
         t_index := 0;
       END IF;
     END IF;
   END IF;

   WHILE look_in_file AND (tlchg_state = 0) LOOP
     IF t_index < magazine_size THEN
       t_s_i(mtype, t_type, t_index);
     ELSE
       t_index := 0;
     END IF;
     IF t_index > 0 THEN
     tb_fl(mlfe, t_index, 0, 0);
     table_life := t_val;
     loc_no := tbl_val_int(cust, stat, t_index) REM 10;
     loc_id := (tbl_val_int(cust, stat, t_index)/10) rem 10;
     ito_id := tbl_val_int(cust, stat, t_index)/100;
     IF ((NOT automcode(a308) AND chk_life AND (ito_id = 1)) OR
        (automcode(a308) AND chk_life AND (ito_id = 0)) OR
        take_one OR
        t_type >= 900) AND
        loc_no = 0 AND loc_id < 3 THEN
       chg_tool(t_index);
       bar_code_read_ok := false;
       wait_a_while := true;
       wait_for_barcdr := true;
       look_in_file := false;
       IF loc_id = 1 OR loc_id = 2 THEN
         ser_no := tbl_val_int(cust, ser, t_index);
```

```
        END IF;
        IF automcode(a308) THEN
          enum_resp := parameter_change(79, int_to_float(t_index));
          prev_t_type := t_type;
          take_one := false;
        END IF;
      END IF;
    ELSE
      look_in_file := false;
      no_auto := true;
      out_of_tools := true;
      automcode(a06) := false;
      tcntrl_state := no_tools;
      IF automcode(a308) THEN
        block_no := truncate(185);
        IF block_no /= 0 THEN
          no_auto := false;
          out_of_tools := false;
          tcntrl_state := skip_program;
        END IF;
      END IF;
    END IF;
  END LOOP;

END tool_life_check;
-------------------------------------------------------------------
-- ***************************************************************
-- * THIS PROCEDURE WILL VERIFY THAT THE TOOL SELECTED IS THE     *
-- * CORRECT TOOL (BY BAR CODE READ) AND INITIATE A SECOND SEARCH *
-- * IF THE TOOL IS NOT CORRECT.                                  *
-- ***************************************************************
PROCEDURE verify_tool IS

BEGIN

  IF automcode(tool_pock) THEN
    IF bar_code_read_ok THEN
      automcode(tool_pock) := false;
      transfer_data;
      active_face := t_index;
      wait_for_barcdr := false;
      wait_a_while := false;
      prelude_req_off(v_prel);
      tcntrl_state := tcntrl_setup;
    END IF;
  ELSIF bar_code_read_ok THEN
    IF automcode(a308) THEN
      IF (temp_tool_no /= 0) THEN
        p_val(160);
    enum_resp := parameter_change(160, (t_val - int_to_float(temp_tool_no)));
      END IF;
      ito_id := 1;
    END IF;
    IF loc_id = 0 THEN
      loc_id := 1;
      response := tbl_chg_int(cust, ser, t_index, ser_no);
    END IF;
    automcode(a06) := false;
    transfer_data;
    active_face := t_index;
    wait_for_barcdr := false;
    wait_a_while := false;
    prelude_req_off(v_prel);
    IF m112_was_run THEN
      response := tbl_chg_int(cust, serial, v_index,
                  tbl_val_int(cust, ser, active_face));
    END IF;
    tcntrl_state := tcntrl_setup;
  ELSIF no_read THEN
    put_msg(6408, 10, 6);
    tcntrl_state := no_bar_read;
    inhibit_retrace := true;
```

```
                                                        -- WRONG TYPE
  ELSIF no_match THEN
    response := tbl_chg_int(cust, stat, t_index, 80);
    no_match := false;
    look_in_file := true;
    wait_a_while := false;
    wait_for_barcdr := false;
    IF automcode(a308) THEN
      temp_tool_no := temp_tool_no + 1;
    END IF;
  END IF;

END verify_tool;
-----------------------------------------------------------------
-- ***************************************************************
-- * THIS PROCEDURE WILL DEDUCT THE LIFE CONSUMED FROM THE LIFE   *
-- * OF THE TOOL WHEN THE TOOL IS DONE.                           *
-- ***************************************************************
PROCEDURE updte_life IS

BEGIN

  v_type := tbl_val_int(cust, mtype, active_face);      --GET TYPE OF TOOL
  IF v_type < 900 THEN
    IF NOT block_dec_cancel THEN
      life_to_dec := float_0;
    END IF;
    IF tool_life_opt THEN
      t_val := life_to_dec;                 --GET VALUE OF LIFE TO BE DECREM
    ELSE
      t_val := - float_1;
    END IF;
    t_a_f(mlfe, active_face);            --DECREM LIFE FROM LIFE-TUR TABLES
    life_to_dec := float_0;
    tcntrl_state := tcntrl_setup;
  END IF;
  block_dec_cancel := false;
  put_save_bool(block_dec_cancel, 11);

END updte_life;
-----------------------------------------------------------------
-- ***************************************************************
-- * THIS FUNCTION WILL AUTOMATICALLY BEGIN THE TRANSFER OF TOOLS *
-- * FROM A NEW MAGAZINE TO THE CHAIN                             *
-- ***************************************************************
FUNCTION tools_in_chain RETURN boolean IS

status : boolean;

BEGIN

  status := false;
  CASE tools_into_chain IS
    WHEN start_taking =>
      mcode_val(load_tool_ch) := true;
      tools_into_chain := finished_taking;

    WHEN finished_taking =>
      IF tlexch_state = 0 AND NOT load_flag THEN
        tools_into_chain := start_taking;
        config_instald := true;
        put_save_bool(config_instald, 1);
        status := true;
      END IF;
    END CASE;
RETURN status;

END tools_in_chain;
-----------------------------------------------------------------
-- ***************************************************************
-- * THIS FUNCTION WILL AUTOMATICALLY BEGIN THE TRANSFER OF TOOLS *
-- * FROM THE CHAIN TO THE MAGAZINE WHEN A MAGAZINE CHANGE IS DUE *
-- ***************************************************************
PROCEDURE empty_chain IS
```

```
BEGIN

  CASE tools_from_chain IS
    WHEN empty_spin =>
      enum_resp := activate_off_td(0, 0, true, float_10);
      IF active_face /= 45 THEN
        updte_life;
        t_index := 45;
        chg_tool(t_index);
      END IF;
      tools_from_chain := wait_for_spin;

    WHEN wait_for_spin =>
      IF tlchg_state = 0 THEN
        transfer_data;
        active_face := t_index;
        tools_from_chain := wait_for_unload;
        mcode_val(unld_tool_ch) := true;
      END IF;

    WHEN wait_for_unload =>
      IF tlexch_state = 0 AND NOT unload_flag THEN
        config_instald := false;
        put_save_bool(config_instald, 1);
        tcntrl_state := old_mag;
        tools_from_chain := empty_spin;
      END IF;
    END CASE;

END empty_chain;
----------------------------------------------------------------------
-- ****************************************************************
-- * THIS PROCEDURE IS THE STANDBY STATE OF THE TOOL MANAGEMENT   *
-- * CONTROL. IT WILL DIRECT THE SYSTEM AS TO WHERE TO GO         *
-- * DEPENDING ON WHAT M CODE OR T CODE IS PROGRAMED.             *
-- ****************************************************************
PROCEDURE t_setup IS

temp_int : integer;

BEGIN

  IF automcode(a111) THEN                 --M111 MCODE MUST TURN ON PRELUDE
    tcntrl_state := save_mlife;
  ELSIF automcode(a312) THEN            -- M312 WRITE OFFSET TO HOLDER OFFSET
    automcode(a312)    false;
    IF ito_id = 0 T..
      act_off(- 1, 0);                           --DEACTIVATE ACTIVE OFFSET
      p_val(31);
      t_a_f(mrad, active_face);
      response := tbl_add_float(tdr, 1, 1, - t_val);
      tb_fl(mrad, active_face, 0, 0);
      chk_offset(1);
      p_val(32);
      t_a_f(mlgt, active_face);
      response := tbl_add_float(tdl, 1, 1, - t_val);
      tb_fl(mlgt, active_face, 0, 0);
      chk_offset(2);
      act_off(- 1, 1);               --REACTIVATE OFFSETS IF THEY WERE ACTIV

    END IF;
    IF tcntrl_fault = 0 THEN
      temp_int := (tbl_val_int(cust, stat, t_index) rem 100) + 100;
      response := tbl_chg_int(cust, stat, t_index, temp_int);
      prelude_req_off(v_prel);
    END IF;
  ELSIF automcode(a332) THEN             -- M332 WRITE ALL OFFSET TO TABLES
    act_off(- 1, 0);                             --DEACTIVATE ACTIVE OFFSET
    automcode(a332) := false;
    FOR i IN 1..magazine_size LOOP
      temp_int := tbl_val_int(cust, mtype, i);
```

```
    IF temp_int > 0 AND temp_int /= 999 THEN
      p_val(31);
      t_a_f(mrad, i);
      tb_fl(mrad, i, 0, 0);
      chk_offset(1);
      p_val(32);
      t_a_f(mlgt, i);
      tb_fl(mlgt, i, 0, 0);
      chk_offset(2);
      temp_int := (tbl_val_int(cust, stat, i) rem 100) + 100;
      response := tbl_chg_int(cust, stat, i, temp_int);
    END IF;
  END LOOP;
  IF active_face /= 45 THEN
    p_val(31);
    response := tbl_add_float(tdr, 1, 1, - t_val);
    p_val(32);
    response := tbl_add_float(tdl, 1, 1, - t_val);
  END IF;
  act_off(- 1, active_face);     --REACTIVATE OFFSETS IF THEY WERE ACTIVE
  prelude_req_off(v_prel);
ELSIF automcode(a320) THEN          --M320 CLEAR TRANSF.MCL FOR NEW PART
  IF file_command = command_standby THEN
    file_command := clear_transfer;
  ELSIF file_command = get_data THEN
    automcode(a320) := FALSE;
    prelude_req_off(v_prel);
    file_command := command_standby;
  END IF;
ELSIF next_part THEN                         --NOT ENOUGH TOOLS FOR NEXT PART
  IF host_available THEN
    IF NOT ok_to_send THEN
      ok_to_send := true;
      tcntrl_req := 19;                                          --NEXT PART
      next_part := false;
    END IF;
  ELSE
    next_part := false;
  END IF;
ELSIF tool_mag_req AND NOT automcode(a310) AND NOT request_pickup THEN
  IF host_req_mag THEN
    IF config_instald OR (ldin(mag_seatd_1) AND ldin(mag_seatd_2)) THEN
      automcode(a310) := true;
      request_pickup := true;
    ELSE
      install_magazine := true;
      tool_mag_req := false;
    END IF;
  END IF;
ELSIF automcode(a310) THEN                    --REMOVE MAGAZINE FROM MACHINE
  IF config_instald THEN                                             --M310
    tcntrl_state := save_mlife;
    postlude_request(v_post);
  ELSIF file_install THEN
    tcntrl_state := old_mag;
    automcode(a310) := false;
  ELSF
    automcode(a310) := false;
  END IF;
ELSIF send_for_file THEN                               --REQUEST CONFIG.MCL
  IF host_available THEN
    IF NOT ok_to_send THEN
      tcntrl_req := 14;                                  --CONFIG FILE REQ
      send_for_file := false;
      wait_for_file := true;
      p_msg(6827, 5);
      ok_to_send := true;
    END IF;
  ELSE
    put_msg(6827, 7, 3);
    send_for_file := false;
  END IF;
```

```
ELSIF config_file_rec THEN                          --CONFIG.MCL HAS BEEN RECEIVED
  k_msg(6827);
  config_file_rec := false;
  wait_for_file := false;
  tcntrl_state := new_mag;
ELSIF (new_mag_arrived AND NOT check_config AND NOT wait_for_file)
      OR automcode(a311) THEN
  automcode(a311) := false;                                  --M311  NEW MAG ARRIVED
  tcntrl_state := new_mag;
ELSIF install_magazine AND NOT new_mag_arrived THEN
  IF mag_pres AND NOT tool_mag_deliver THEN
    IF mag_seatd THEN
      tcntrl_state := ref_magazine;
      IF rdout(blk_del_light) THEN
        set_busy(block_delete);
      END IF;
      install_magazine := false;
      sent_for_mag := false;
      k_msg(6826);
      kill_msg(6874);
      msg_is_set := false;
    END IF;
  ELSE
    IF host_available THEN
      IF NOT ok_to_send THEN
        tcntrl_req := 4;                                    --MAG DELIVERY REQ
        standby_req := 4;
        put_save_int(standby_req, 4);
        mag_del_permit := true;
        p_msg(6826, 5);
        IF NOT msg_is_set THEN
          put_msg(6874, 7, 4);
          msg_is_set := true;
        END IF;
        ok_to_send := true;
        tool_mag_deliver := false;
        install_magazine := false;
      END IF;
    ELSE
      put_msg(6826, 7, 3);
      install_magazine := false;
    END IF;
  END IF;
ELSIF automcode(a112) AND NOT sent_for_mag THEN             --M112 TOOL CHECK
  IF config_instald THEN
    next_part := false;
    tool_count := 0;
    v_index := truncate(98);
    IF v_index < 1 OR v_index > v_tbl_size THEN
      v_index := 1;
    END IF;
    tcntrl_state := check_tools;
  ELSIF NOT mag_seatd THEN
    tool_mag_req := true;
    host_req_mag := true;
    sent_for_mag := true;
  ELSE
    tcntrl_fault := 6407;
    store_msg(6407);
  END IF;
ELSIF standby_tool AND host_available THEN    --REDUNDANT REQUEST-STANDBY
  IF standby_req = 0 THEN
    standby_tool := false;
  ELSE
    IF NOT ok_to_send THEN
      tcntrl_req := standby_req;
      standby_tool := false;
      ok_to_send := true;
    END IF;
  END IF;
ELSIF request_pickup AND NOT config_instald AND NOT file_instald THEN
  IF host_available AND request_pickup THEN
```

```
    IF NOT ok_to_send THEN
      IF tool_mag_req THEN                                          --EXCHANGE MAG
        tcntrl_req := 20;
        standby_req := 20;
        put_save_int(standby_req, 4);
        mag_del_permit := true;
        p_msg(6826, 5);
        IF NOT msg_is_set THEN
          put_msg(6874, 7, 4);
          msg_is_set := true;
        END IF;
        tool_mag_req := false;
      ELSE
        standby_req := 3;
        put_save_int(standby_req, 4);                               --MAG PICKUP
        tcntrl_req := 3;
      END IF;
      request_pickup := false;
      p_msg(6825, 5);
      ok_to_send := true;
    END IF;
  ELSE
    request_pickup := false;
  END IF;                                                          --PROBE LIFE COUNT
ELSIF probe_active THEN
  IF probe_active AND NOT nc_status(axis_gp1_in_psn) THEN
    IF probe_psn(1) /= save_x_psn OR probe_psn(2) /= save_z_p-n THEN
      save_x_psn := probe_psn(1);
      save_z_psn := probe_psn(2);
      t_val := - 0.000001;
      t_a_f(mlfe, active_face);
    END IF;
  END IF;
END IF;
IF NOT block_dec_cancel AND life_to_dec < float_0 THEN
  IF spn_prog_state = start THEN
    block_dec_cancel := true;
    put_save_bool(block_dec_cancel, 11);
  END IF;
END IF;
------------------------------------------------------------------
                --TOOL CODE AND UPDATE LIFE
IF tool_code_read THEN
  IF config_instald THEN
    prelude_request(v_prel);                                        --NEW T CODE READ
    IF t_code_ok THEN
      IF NOT automcode(a308) AND (t_type /= 0) THEN
        updte_life;
      END IF;
      tool_code_read := false;
      IF NOT automcode(a308) THEN
        v_index := truncate(98);
      ELSE
        v_index := 0;
      END IF;
      IF automcode(tool_pock) THEN
        t_index := t_type;
        bar_code_read_ok := false;
        wait_a_while := true;
        wait_for_barcdr := true;
        chg_tool(t_index);
        tcntrl_state := check_life;
      ELSIF t_type = 0 THEN
        IF t_off = 0 THEN
          act_off(0, 0);
        ELSE
          act_off(t_off, 1);
        END IF;
        prelude_req_off(v_prel);
      ELSE
        IF NOT automcode(a308) THEN
          check_face := true;
```

```
          t_index := active_face;
        ELSE
          t_index := 0;
          look_in_file := true;
        END IF;
        tool_life_req;
        IF tcntrl_fault = 0 THEN
          tcntrl_state := check_life;
          IF automcode(a308) THEN
            temp_tool_no := 0;
            IF t_type = prev_t_type THEN
              t_index := truncate(79);
              ELSE
                tcntrl_state := count_tools;
              END IF;
            END IF;
          END IF;
        END IF;
        save_t_off := act_offset_num;
        save_t_dat := act_t_data_num;
      ELSE
        act_off(save_t_off, save_t_dat);
        tcntrl_fault := 6402;
      END IF;
    ELSE
      tcntrl_fault := 6407;
      store_msg(6407);
    END IF;
  ELSIF automcode(a06) THEN
    tcntrl_fault := 6402;
    automcode(a06) := false;
  END IF;



END t_setup;
-------------------------------------------  ----------------------
-- ****************************************************************
-- * THIS PROCEDURE IS THE MAIN PROCEDURF OF THE TOOL MANAGEMENT  *
-- * SYSTEM. IT WILL CALL OTHER PROCEDURES IN ORDER TO EXECUTE    *
-- * THE CORRECT FUNCTION.                                        *
-- ****************************************************************
PROCEDURE tcntrl_main IS

BEGIN

  CASE tcntrl_master IS
    WHEN auto_init =>
      tcntrl_master := auto_run;

    WHEN auto_run =>
      IF tcntrl_ok THEN
        ---------------------------------------------------
        IF ok_to_send THEN
          IF command_request = 0 THEN
            command_request := tcntrl_req;
            dnc_bool(mc2000_cmd_req) := true;
            ok_to_send := false;
            tcntrl_req := 0;
          END IF;
        END IF;
          ---------------------------------------------------
        IF delete_putran or delete_config THEN
          IF file_command = command_standby THEN
            file_command := delete_a_file;
          END IF;
        END IF;
          ---------------------------------------------------
        CASE tcntrl_state IS
          WHEN tcntrl_setup =>                                      --STATE 0
            t_setup;
```

```
WHEN save_mlife =>                                                    --STATE 1
  IF m112_was_run THEN
    tool_count := 0;
    m112_was_run := false;
  END IF;
  IF automcode(a310) THEN
    tcntrl_state := empty_turret;
  ELSE
    FOR index IN vtype..serial LOOP
      response := tbl_clear(cust, index);
    END LOOP;
    automcode(a111) := false;
    prelude_req_off(v_prel);
    tcntrl_state := tcntrl_setup;
  END IF;
                                                                      --STATE 2
WHEN check_tools =>
  tool_search;
  tcntrl_state := tcntrl_setup;
                                                                      --STATE 3
WHEN check_life =>
  IF NOT wait_a_while THEN
    tool_life_check;
  ELSIF wait_for_barcdr THEN
    verify_tool;
  END IF;
                                                                      --STATE 4
WHEN empty_turret =>
  empty_chain;
                                                                      --STATE 5
WHEN new_mag =>
  IF NOT file_instald THEN
    IF file_command = command_standby THEN
      file_command := trans_to_table;
    ELSIF file_command = get_data THEN
      file_command := command_standby;
      file_instald := true;
      put_save_bool(file_instald, 20);
      IF (mcl_state = mcl_mdi) OR NOT mag_del_permit THEN
        install_magazine := true;
      END IF;
    ELSIF file_command = no_file THEN
      file_command := command_standby;
      send_for_file := true;
      tcntrl_state := tcntrl_setup;
    END IF;
  ELSE
    IF new_mag_arrived THEN
      check_config := true;
    ELSIF mcl_state = mcl_mdi THEN
      install_magazine := true;
      prelude_req_off(v_prel);
    END IF;
    kill_msg(6870);
    tcntrl_state := tcntrl_setup;
  END IF;
                                                                      --STATE 6
WHEN old_mag =>
  IF file_instald THEN
    IF file_command = command_standby THEN
      file_command := trans_to_file;
    ELSIF file_command = no_file THEN
      file_command := command_standby;
      send_for_file := true;
      tcntrl_state := tcntrl_setup;
    END IF;
  ELSIF  file_command = command_standby THEN
    FOR index IN mtype..mlfe LOOP
      response := tbl_clear(cust, index);
    END LOOP;
```

```
      put_save_bool(file_instald, 20);
      IF host_available THEN
        IF NOT ok_to_send THEN
          ok_to_send := true;
          tcntrl_req := 16;                          --UPLOAD CONFIG FILE
          postlude_req_off(v_post);
          mag_pu_permit := true;
          tcntrl_state := tcntrl_setup;
        END IF;
      ELSE
        prelude_req_off(v_prel);
        postlude_req_off(v_post);
        tcntrl_state := tcntrl_setup;
      END IF;
    END IF;

  WHEN ref_magazine =>                                     --STATE 7
    prelude_req_off(v_prel);
    IF tools_in_chain THEN
      tcntrl_state := tcntrl_setup;
    END IF;

  WHEN count_tools =>                                      --STATE 8
    do_the_count := true;
    type_number := 0;
    while do_the_count loop
      IF t_index < magazine_size THEN
        t_s_i(mtype, t_type, t_index);
      ELSE
        t_index := 0;
      END IF;
      IF t_index > 0 THEN
        ito_id := tbl_val_int(cust, stat, t_index)/100;
        tb_fl(mlfe, t_index, 0, 0);
        table_life := t_val;
        IF ito_id = 0 AND (t_val + float_001) > 0.1 THEN
          type_number := type_number + 1;
        END IF;
      ELSE
        do_the_count := false;
      END IF;
    END LOOP;
    IF type_number = 0 THEN
      block_no := truncate(185);
      IF block_no /= 0 THEN
        tcntrl_state := skip_program;
      ELSE
        take_one := true;
        type_number := 1;
      END IF;
    END IF;
    IF type_number /= 0 THEN
      enum_resp := parameter_change(160, int_to_float(type_number));
      tcntrl_state := check_life;
    END IF;

  WHEN no_bar_read =>                                      --STATE 9
    IF (rdin(retrace) OR rdin(cycle_start)) THEN
      IF rdin(retrace) THEN
        loc_id := 9;
        look_in_file := true;
        wait_a_while := false;
        IF automcode(a308) THEN
          temp_tool_no := temp_tool_no + 1;
        END IF;
      ELSIF rdin(cycle_start) THEN
        loc_id := 2;
        ser_no := tbl_val_int(cust, ser, t_index);
      END IF;
      no_read := false;
```

```
    bar_code_read_ok := true;
    response := tbl_chg_int(cust, stat, t_index,
                           (ito_id * 100) + (loc_id * 10));
    kill_msg(6408);
    cnt_dwn;
    inhibit_retrace := false;
    tcntrl_state := check_life;
  END IF;

WHEN no_tools =>                                          --STATE 10
  IF check_host = 1 THEN
    IF data_request = 0 THEN
      dnc_bool(mc2000_data_req) := true;
      data_request := 3;
      start_timer(host_ak_tmr, 1500);              --15 SECS TO ACK
      check_host := 2;
    END IF;
  ELSIF check_host = 2 THEN
    IF refurbish_mag THEN
      refurbish_mag := false;
      k_msg(6850);
      check_host := 0;
    ELSIF host_req_mag THEN
      tool_mag_req := true;
      tcntrl_state := tcntrl_setup;
      k_msg(6850);
      check_host := 0;
    ELSIF NOT timer_running(host_ak_tmr) THEN
      p_msg(6850, 5);
    END IF;
  ELSE
    i_to_c(t_type, 4, 1, inq_msg);
    file_msg_insert(1, 4, inq_msg);
    put_msg(6865, 10, 6);
    store_msg(6865);
    tcntrl_master := auto_recovery;
  END IF;

WHEN skip_program =>                                      --STATE 11
  IF step = 1 THEN
    automcode(a06) := false;
    prelude_req_off(v_prel);
    i_to_c(block_no, 4, 2, n_code);
    FOR i IN 2..5 LOOP
      IF n_code(i) = ' ' THEN
        n_code(i) := '0';
      END IF;
    END LOOP;
    step := 2;
  ELSIF step = 2 THEN
    IF cycle_stop_on = success THEN
      step := 3;
    END IF;
  ELSIF step = 3 THEN
    IF NOT nc_status(cyc_start_lt_on) THEN
      IF cycle_stop_off = success THEN
        step := 4;
      END IF;
    END IF;
  ELSIF step = 4 THEN
    IF prog_search_skip(5, n_code) = success THEN
      step := 5;
    END IF;
  ELSIF step = 5 THEN
    IF nc_status(search_complete) THEN
      enum_resp := parameter_change(185, float 0);
      step := 1;
      IF nc_status(search_success) THEN
        step := 6;
        cyc_strt_on := true;
```

```
            ELSE
              tcntrl_fault := 6416;
              store_msg(6416);
            END IF;
          END IF;
        ELSIF step = 6 THEN
          IF nc_status(cyc_start_lt_on) THEN
            step := 1;
            rdin(cycle_start) := false;
            tcntrl_state := tcntrl_setup;
          END IF;
        END IF;
      END CASE;
    ELSE                                                       -- NOT TCNTRL_OK
      put_msg(tcntrl_fault, 7, 5);
      tcntrl_master := auto_error;
    END IF;

  WHEN auto_error =>
    tcntrl_master := auto_recovery;

  WHEN auto_recovery =>
    NULL;                                       --WAIT UNTIL CLEAR OR CANCEL
  END CASE;

END tcntrl_main;
-----------------------------------------------------------------------
END tcntrl;
-- ****************************************************************
-- *                                                              *
-- * SOFTWARE BY DAN GARAFOLA (A&ES) FOR                          *
-- * AIRCRAFT ENGINE BUSINESS GROUP / GENERAL ELECTRIC COMPANY    *
-- *                                                              *
-- *                                                              *
-- * THIS PROGRAM AND RELATED MATERIAL ARE THE PROPERTY OF THE    *
-- * GENERAL ELECTRIC CO. (G.E.) AND CONTAINS CONFIDENTIAL AND    *
-- * PROPRIETARY INFORMATION OF G.E. THIS PROGRAM, THE RELATED    *
-- * MATERIAL, AND THE INFORMATION CONTAINED HEREIN, SHALL NOT    *
-- * BE DISCLOSED TO OTHERS WITHOUT WRITTEN PERMISSION OF G.E.,   *
-- * AND SHALL NOT BE DUPLICATED OR USED EXCEPT IN ACCORDANCE     *
-- * WITH THE LIMITED CONDITIONS UNDER WHICH IT WAS PROVIDED BY   *
-- * G.E.                                                         *
-- *                                                              *
-- * PROPERTY OF THE AIRCRAFT ENGINE BUSINESS GROUP OF THE        *
-- * GENERAL ELECTRIC COMPANY.                                    *
-- *                                                              *
-- ****************************************************************

WITH wndone;   USE wndone;
WITH oemdec;   USE oemdec;

PACKAGE xfer IS

xfer_master       : auto_masters := auto_run;
TYPE xfer_states IS (xfer_standby, xfer_start, part_arrived, ask_to_unload,
                     part_is_gone);
xfer_state        : xfer_states := xfer_standby;

TYPE ptmgmt_states IS (mgmt_standby, mgmt_unld, mgmt_ld, mgmt_cmplt);
ptmgmt_state      : ptmgmt_states := mgmt_standby;

xfer_fault        : integer := 0;
del_wait          : boolean := false;
load_button_on    : boolean := false;
load_light        : boolean := false;
no_go_off_line    : boolean := false;
standby_part      : boolean := false;
unld_cmd          : boolean := false;
waiting_cell      : boolean := false;
```

```
PROCEDURE xfer_clear;
PROCEDURE xfer_cancel;
PROCEDURE xfer_main;
PROCEDURE ptmgmt_main;
FUNCTION call_agv(oper_exp : IN integer) RETURN boolean;

END xfer;
-- ******************************************************************
-- *                                                                *
-- * SOFTWARE FOR                                                   *
-- * AIRCRAFT ENGINE BUSINESS GROUP / GENERAL ELECTRIC COMPANY      *
-- *                                                                *
-- * THIS PROGRAM AND RELATED MATERIAL ARE THE PROPERTY OF THE      *
-- * GENERAL ELECTRIC CO. (G.E.) AND CONTAINS CONFIDENTIAL AND      *
-- * PROPRIETARY INFORMATION OF G.E. THIS PROGRAM, THE RELATED      *
-- * MATERIAL, AND THE INFORMATION CONTAINED HEREIN, SHALL NOT      *
-- * BE DISCLOSED TO OTHERS WITHOUT WRITTEN PERMISSION OF G.E.,     *
-- * AND SHALL NOT BE DUPLICATED OR USED EXCEPT IN ACCORDANCE       *
-- * WITH THE LIMITED CONDITIONS UNDER WHICH IT WAS PROVIDED BY     *
-- * G.E.                                                           *
-- *                                                                *
-- * PROPERTY OF THE AIRCRAFT ENGINE BUSINESS GROUP OF THE          *
-- * GENERAL ELECTRIC COMPANY.                                      *
-- ******************************************************************

-- ******************************************************************
-- * PACKAGE DESCRIPTION:  XFER.PCL                                 *
-- *                                                                *
-- *    THIS PACKAGE CONTAINS TWO MAIN PRODEDURES AND ONE           *
-- * FUNCTION :                                                     *
-- *                                                                *
-- * XFER_MAIN ;                                                    *
-- *     THIS PROCEDURE MONITORS THE CONDITIONS OF THE TRANSFER     *
-- * AND QUEUE STATIONS AT THE WORK STATION.  XFER_MAIN WILL        *
-- * STAGE PARTS AUTOMATICALLY AFTER ANY LOAD OR UNLOAD FUNCTION*
-- * ( EX.  PART LOADED IN CHUCK THROUGH PROGRAM CALL XFER WILL *
-- * AUTOMATICALLY CYCLE PART IN TRANSFER STATION TO QUEUE STA.)*
-- *     THIS PROCEDURE ALSO MONITORS ALL PICK UP AND DELIVERIES*
-- * OCCURING DURING CYCLE, AND SETS FLAGS TO START THOSE           *
-- * FUNCTIONS.                                                     *
-- *                                                                *
-- * PTMGMT_MAIN ;                                                  *
-- *    THIS PROCEDURE IS A WATCH DOG FOR ALL EXTERNAL COMMANDS *
-- * FOR PART MOVMENT.  THIS PROCEDURE SETS THE PROPER FLAGS        *
-- * AND STATES FOR THE PART MOVMENT CALLED FOR.                    *
-- *                                                                *
-- * CALL_AGV ;                                                     *
-- *    THIS FUNCTION IS USED ONLY WHEN THE HOST IS AVAILABLE       *
-- * IT CALLS THE HOST TO DO A PICK UP OR DELIVERY.  WHEN A         *
-- * PICK UP IS CALLED IT WILL REQUEST A PLATE FILE UPLOAD TO       *
-- * THE HOST.                                                      *
-- ******************************************************************

WITH wndone;   USE wndone;
WITH mcldat;   USE mcldat;
WITH mcllib;   USE mcllib;
WITH oemdec;   USE oemdec;
WITH wndtwo;   USE wndtwo;
WITH wndtre;   USE wndtre;
WITH rel5;     USE rel5;
WITH rel6;     USE rel6;
WITH rel7;     USE rel7;
WITH bubdec;   USE bubdec;
WITH dncmcl;   USE dncmcl;
WITH dncdec;   USE dncdec;
WITH blkdlt;   USE blkdlt;
WITH lur;      USE lur;
WITH atmlib;   USE atmlib;
WITH oemmst;   USE oemmst;
WITH agvmon;   USE agvmon;
WITH dtmgmt;   USE dtmgmt;
WITH menu;     USE menu;
```

```
PACKAGE BODY xfer IS

pickup_needed      : boolean := false;
hld_del            : integer := 0;
wait_for_agv       : integer := 0;
--------------------------------------------------------------------------------
FUNCTION xfer_ok RETURN boolean IS

xfer_status : boolean;

BEGIN

  xfer_status := true;
  IF xfer_fault /= 0 THEN
    xfer_status := false;
  END IF;

RETURN xfer_status;

END xfer_ok;
--------------------------------------------------------------------------------
PROCEDURE xfer_clear IS

BEGIN

  xfer_fault := 0;

END xfer_clear;
--------------------------------------------------------------------------------
PROCEDURE xfer_cancel IS

BEGIN

  xfer_master := auto_init;
  del_answer := false;
  hld_del := 0;
  prelude_req_off(ptmgmt_lude);
  msub_post_off;
  ptmgmt_state := mgmt_standby;                              -- MONARCH ONLY

END xfer_cancel;
--------------------------------------------------------------------------------
PROCEDURE xfer_main IS

BEGIN

  CASE xfer_master IS
    WHEN auto_init =>
      xfer_master := auto_run;

    WHEN auto_run =>
      IF xfer_ok THEN -- WARNS HOST THAT PKUP OR DEL IS AVAIL WHEN HOST COME

        IF standby_part AND prog_chk_cmplt AND host_available THEN
          IF pkup_exp THEN
            IF call_agv(1) THEN
              standby_part := false;                         --CALL FOR PICKUP
            END IF;
          ELSIF deliv_exp THEN
            IF call_agv(2) THEN
              standby_part := false;                         --CALL FOR DELIVERY
            END IF;
          ELSE
            standby_part := false;
          END IF;

    END IF;
--------------------------------------------------------------------------------
    CASE xfer_state IS
      WHEN xfer_standby =>
        IF pkup_exp OR deliv_exp THEN                        --STATE 0
          xfer_state := xfer_start;
        END IF;
```

```
WHEN xfer_start =>                                              --STATE 1
  IF cell_is_up AND prog_was_running AND unld_cmd AND NOT
     no_go_off_line THEN
    no_go_off_line := true;
    set_busy(mcs_cancel);

  ELSIF automcode(ld_flag) THEN                                 --LOAD CHUCK
    IF ld_state = ld_standby AND plate_permit AND
       (host_available AND NOT load_light) THEN
      ld_state := ld_chuck;
    END IF;

  ELSIF plate_tra AND NOT pkup_exp AND
        unld_state = unld_standby THEN                          --PLATE ARRIVES
    IF find_trans THEN
      IF tran_num = 0 THEN
        xfer_fault := 6843;                                     --NO TRANSF.MCL FILE
        file_command := command_standby;
      ELSE
        IF tran_num = 4 THEN
          pickup_needed := true;
        ELSE
          pickup_needed := false;
        END IF;
        xfer_state := part_arrived;
      END IF;
    END IF;

  ELSIF NOT plate_tra AND pkup_exp THEN                         --PLATE DISAPPEARS
    IF unld_cmd AND NOT host_available AND
       (ws_status /= ready_auto) THEN
      load_light := true;
    END IF;
    xfer_state := part_is_gone;

  ELSIF deliv_exp THEN                                          --DELIVERY EXPECTED
    IF unld_cmd AND not del_wait then                           --UNLOAD COMMANDED
      xfer_state := ask_to_unload;
    END IF;

                                                --PLATE DISAPPEARS FROM TRANS STA
  ELSIF NOT plate_tra AND unld_state = unld_standby AND
        ld_state = ld_standby THEN
    del_wait := false;
    xfer_state := part_is_gone;
  END IF;

WHEN part_arrived =>                                            --STATE 2
  k_msg(6816);
  k_msg(6828);
  deliv_exp := false;
  put_save_bool(deliv_exp, 21);
  IF pickup_needed THEN
    IF call_agv(1) THEN                                         --CALL FOR PICKUP
      pickup_needed := false;
      xfer_state := xfer_start;
    END IF;
  ELSE
    IF nc_status(cyc_start_lt_on) AND NOT plate_que THEN
      IF plate_permit AND ld_state = ld_standby AND
         (host_available OR NOT load_light) THEN
        ld_state := ld_tq;
        flash_al := false;
      END IF;
    ELSE
      xfer_state := xfer_standby;
    END IF;
  END IF;

WHEN ask_to_unload =>                                           --STATE 3
```

```
IF host_available THEN
  IF waiting_cell THEN
    kill_msg(6866);
    cnt_dwn;
    waiting_cell := false;
  END IF;
  CASE hld_del IS
    WHEN 0 =>
      IF prog_chk_cmplt THEN
        IF data_request = 0 THEN
          del_sched_time := 0;
          dnc_bool(mc2000_data_req) := true;
          data_request := 2;
          hld_del := 1;
          start_timer(host_ak_tmr, 1500);      --15 SECS TO ACK
        END IF;
      END IF;

    WHEN 1 =>
      IF del_answer THEN
        IF sched_ret /= 0 THEN
          p_msg(6828, 6);
          hld_del := 0;
          del_wait := true;
          xfer_state := xfer_start;
        ELSE
          hld_del := 2;
        END IF;
        del_answer := false;
        k_msg(6850);
      ELSIF NOT timer_running(host_ak_tmr) THEN
        p_msg(6850, 5);
      END IF;

    WHEN 2 =>
      IF command_request = 0 THEN
        command_request := 18;
        hld_del := 0;
        dnc_bool(mc2000_cmd_req) := true;
        xfer_state := part_is_gone;
      END IF;

    WHEN OTHERS =>
      NULL;
  END CASE;
ELSIF ws_status = ready_manual AND NOT waiting_cell THEN
  put_msg(6866, 8, 6);
  store_msg(6866);
  waiting_cell := true;
ELSIF ws_status /= ready_manual THEN
  xfer_state := part_is_gone;
END IF;
    WHEN part_is_gone =>                                            --STATE 4
      k_msg(6817);
      pkup_exp := false;
      put_save_bool(pkup_exp, 22);
      k_msg(6816);
      deliv_exp := false;
      put_save_bool(deliv_exp, 21);
      IF unld_cmd THEN
        IF unld_state = unld_standby AND
            ld_state = ld_standby THEN
          unld_state := unld_start;
        END IF;
      ELSIF plate_que AND plate_mac THEN
        xfer_state := xfer_standby;
      ELSIF call_agv(2) THEN                                 --CALL FOR DELIVERY
        xfer_state := xfer_start;
      END IF;
  END CASE;
```

```
    ELSE
      p_msg(xfer_fault, 6);
      xfer_master := auto_error;
    END IF;

  WHEN others =>
    IF rrise(cycle_start) THEN
      k_msg(6843);
      xfer_fault := 0;
      xfer_state := xfer_start;
      xfer_master := auto_run;
    END IF;
END CASE;
-----------------------------------------------------------------------
CASE wait_for_agv IS                                              --STATE 0
  WHEN 0 =>
    IF (ws_status /= ready_auto) AND (ws_status /= ready_manual) AND NOT
        del_wait THEN
      IF (deliv_exp OR load_light) AND NOT host_available THEN
        wait_for_agv := 1;
      END IF;
    END IF;

  WHEN 1 =>
    IF NOT host_available THEN
      IF plate_tra OR (unld_cmd AND plate_mac) THEN
        load_light := true;
        p_msg(6844, 6);
        wait_for_agv := 2;
      END IF;
    ELSE
      wait_for_agv := 0;
    END IF;

  WHEN 2 =>
    IF load_button_on THEN
      flash_al := false;
      load_light := false;
      k_msg(6844);
      IF cim_fault(8) THEN
        cnt_dwn;
        cim_fault(8) := false;
      END IF;
      cim_fault(11) := false;
      wait_for_agv := 3;
    END IF;

  WHEN 3 =>
    IF NOT deliv_exp THEN
      wait_for_agv := 0;
    END IF;

  WHEN OTHERS =>
    NULL;
END CASE;

END xfer_main;
-----------------------------------------------------------------------
PROCEDURE ptmgmt_main IS

BEGIN

  CASE ptmgmt_state IS
    WHEN mgmt_standby =>                                          --STATE 0
      NULL;

    WHEN mgmt_unld =>                                             --STATE 1
      IF plate_mac THEN
        unld_cmd := true;                          --PREPARES FOR PART UNLOAD
        IF xfer_state = xfer_standby THEN
          xfer_state := xfer_start;
        END IF;
      END IF;
```

```
    ptmgmt_state := mgmt_cmplt;

   WHEN mgmt_ld =>
    IF plate_mac THEN                                           --STATE 2
      automcode(ld_flag) := true;
      IF xfer_state = xfer_standby THEN
        xfer_state := xfer_start;
      END IF;
    END IF;
    ptmgmt_state := mgmt_cmplt;

   WHEN mgmt_cmplt =>
    IF NOT unld_cmd AND NOT automcode(ld_flag) AND              --STATE 3
       unld_state = unld_standby THEN
      prelude_req_off(ptmgmt_lude);
      msub_post_off;                                            --MONARCH ONLY
      ptmgmt_state := mgmt_standby;
    END IF;
  END CASE;

END ptmgmt_main;
-------------------------------------------------------------------------
FUNCTION call_agv(oper_exp : IN integer) RETURN boolean IS

status : boolean;

BEGIN

  status := false;
  IF host_available AND NOT init_fault THEN
    IF NOT standby_part AND (pkup_exp OR deliv_exp) THEN
      status := true;
    ELSIF command_request = 0 THEN
      pickup_time := 0;
      del_time := 0;
      command_request := oper_exp;
      dnc_bool(mc2000_cmd_req) := true;
      IF oper_exp = 1 THEN
        p_msg(6817, 5);
        pkup_exp := true;
        put_save_bool(pkup_exp, 22);
      ELSIF oper_exp = 2 THEN
        p_msg(6816, 5);
        deliv_exp := true;
        put_save_bool(deliv_exp, 21);
      END IF;
      status := true;
    END IF;
  ELSE
    IF NOT init_fault THEN
      IF oper_exp = 1 THEN
        p_msg(6817, 5);
        pkup_exp := true;
        put_save_bool(pkup_exp, 22);
        IF plate_que OR plate_mac THEN
          flash_al := true;
        END IF;
      ELSE
        p_msg(6816, 5);
        deliv_exp := true;
        put_save_bool(deliv_exp, 21);
      END IF;
    END IF;
    status := true;
  END IF;

RETURN (status);

END call_agv;
-------------------------------------------------------------------------
END xfer;
```

We claim:

1. A manufacturing apparatus, comprising:

one or more machining apparatus;

a host controller connected to the one or more machining apparatus;

each of the machining apparatus including a workstation controller having operating control logic for controlling the operation of the machining apparatus; and the workstation controller also having automation control logic for automating the operation of the machining apparatus comprising:

a means for managing initialization of the workstation controller;

a means for managing communications between the host controller and the workstation controller in the machining apparatus;

a means for managing quality control requirements of the machining apparatus;

a means for managing interchanges of workpieces, tool magazines, and chip containers between automated guided vehicles and the machining apparatus;

a means for managing supply of coolant to the machining apparatus;

a means for managing removal of swarf from the machining apparatus;

a means for managing status and location of workpieces in the machining apparatus;

a means for managing tool supply and exchange in the machining apparatus;

a means for logging and reporting of data from the machining apparatus;

a means for managing end of program tasks in the machining apparatus;

a means for managing aborting of a program running in the machining apparatus; and a means for managing detection of tool breaks and tool wear and for managing recovery of the machining apparatus from such tool breaks and wear.

2. A manufacturing apparatus, comprising:

one or more machining apparatus;

a host controller connected to the one or more machining apparatus;

each of the machining apparatus including a workstation controller having operating control logic for controlling the operation of the machining apparatus; and the workstation controller also having automation control logic for automating the operation of the machining apparatus comprising:

a means for managing initialization of the workstation controller;

a means for managing communications between the host controller and the workstation controller in the machining apparatus;

a means for managing interchanges of workpieces, tool magazines, and chip containers between automated guided vehicles and the machining apparatus;

a means for managing status and location of workpieces in the machining apparatus;

a means for logging and reporting of data from the machining apparatus;

a means for managing end of program tasks in the machining apparatus; and a means for managing aborting of a program running in the machining apparatus.

3. The apparatus of claim 2, in which the automation control logic further comprises:

a means for managing quality control requirements of the machining apparatus.

4. The apparatus of claim 2, in which the automation control logic further comprises:

a means for managing supply of coolant to the machining apparatus.

5. The apparatus of claim 2, in which the automation control logic further comprises:

a means for managing removal of swarf from the machining apparatus.

6. The apparatus of claim 2, in which the automation control logic further comprises:

a means for managing tool supply and exchange in the machining apparatus.

7. The apparatus of claim 2, in which the automation control logic further comprises:

a means for managing detection of tool breaks and tool wear and for managing recovery of the machining apparatus from such tool breaks and wear.

* * * * *